US012096085B2

(12) United States Patent
Carrigan et al.

(10) Patent No.: US 12,096,085 B2
(45) Date of Patent: Sep. 17, 2024

(54) USER INTERFACES FOR VIEWING LIVE VIDEO FEEDS AND RECORDED VIDEO

(71) Applicant: Apple Inc., Cupertino, CA (US)

(72) Inventors: Taylor G. Carrigan, San Francisco, CA (US); Patrick L. Coffman, San Francisco, CA (US); Christopher Patrick Foss, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/375,457

(22) Filed: Sep. 29, 2023

(65) Prior Publication Data

US 2024/0040198 A1 Feb. 1, 2024

Related U.S. Application Data

(63) Continuation of application No. 17/116,938, filed on Dec. 9, 2020, which is a continuation of application No. 16/404,605, filed on May 6, 2019, now Pat. No. 10,904,628.

(60) Provisional application No. 62/843,512, filed on May 5, 2019, provisional application No. 62/668,090, filed on May 7, 2018.

(51) Int. Cl.
*H04N 21/2187* (2011.01)
*H04N 21/218* (2011.01)
*H04N 21/472* (2011.01)
*H04N 21/845* (2011.01)

(52) U.S. Cl.
CPC . *H04N 21/47217* (2013.01); *H04N 21/21805* (2013.01); *H04N 21/2187* (2013.01); *H04N 21/8456* (2013.01)

(58) Field of Classification Search
CPC ....... H04N 21/47217; H04N 21/21805; H04N 21/2187; H04N 21/8456
See application file for complete search history.

(56) References Cited

U.S. PATENT DOCUMENTS

| 5,086,385 A | 2/1992 | Launey et al. |
| 5,974,235 A | 10/1999 | Nunally et al. |
| 6,140,987 A | 10/2000 | Stein et al. |

(Continued)

FOREIGN PATENT DOCUMENTS

| CN | 1641589 A | 7/2005 |
| CN | 1679019 A | 10/2005 |

(Continued)

OTHER PUBLICATIONS

Office Action received for Japanese Patent Application No. 2022-155232, dated Dec. 15, 2023, 9 pages (4 pages of English Translation and 5 pages of Official Copy).

(Continued)

*Primary Examiner* — Hung Q Dang
*Assistant Examiner* — Jose M Mesa
(74) *Attorney, Agent, or Firm* — DLA Piper LLP (US)

(57) ABSTRACT

The present disclosure generally relates to user interfaces related to sources of video data. User interfaces enables users to configure and interact with the sources of video data, such as for displaying a live video feed and a recorded video from an external source of video data. In some embodiments, a device provides user interfaces for displaying video from a video source and controlling external devices related to the source.

21 Claims, 184 Drawing Sheets

(56) References Cited

U.S. PATENT DOCUMENTS

| | | |
|---|---|---|
| 6,456,306 B1 | 9/2002 | Chin et al. |
| 6,483,986 B1 | 11/2002 | Krapf |
| 6,901,439 B1 | 5/2005 | Bonasia et al. |
| 6,912,429 B1 | 6/2005 | Bilger |
| 6,931,594 B1 | 8/2005 | Jun |
| 7,043,477 B2 | 5/2006 | Mercer et al. |
| 7,092,768 B1 | 8/2006 | Labuda |
| 7,293,280 B1 | 11/2007 | Gupta et al. |
| 7,360,152 B2 | 4/2008 | Capps et al. |
| 7,401,351 B2 | 7/2008 | Boreczky et al. |
| 7,571,014 B1 | 8/2009 | Lambourne et al. |
| 7,730,223 B1 | 6/2010 | Bavor et al. |
| 7,859,571 B1 | 12/2010 | Brown et al. |
| 7,904,814 B2 | 3/2011 | Errico et al. |
| 8,031,230 B2 | 10/2011 | Takada |
| 8,214,494 B1 | 7/2012 | Slavin |
| 8,234,395 B2 | 7/2012 | Millington |
| 8,253,704 B2 | 8/2012 | Jang |
| 8,462,961 B1 | 6/2013 | Bywaters et al. |
| 8,516,374 B2 | 8/2013 | Fleischman et al. |
| 8,745,500 B1 | 6/2014 | Kostello et al. |
| 8,762,844 B2 | 6/2014 | Kim et al. |
| 8,914,752 B1 | 12/2014 | Spiegel |
| 8,954,889 B2 | 2/2015 | Fujibayashi |
| 8,990,861 B2 | 3/2015 | Nishikawa et al. |
| 9,021,526 B1 | 4/2015 | Baron et al. |
| 9,082,018 B1 | 7/2015 | Laska et al. |
| 9,158,974 B1 | 10/2015 | Laska et al. |
| 9,170,707 B1 | 10/2015 | Laska et al. |
| 9,185,062 B1 | 11/2015 | Yang et al. |
| 9,247,380 B1 | 1/2016 | Vincent |
| 9,313,556 B1 | 4/2016 | Borel et al. |
| 9,361,011 B1 | 6/2016 | Burns et al. |
| 9,361,521 B1* | 6/2016 | McLean ............. G06F 3/04847 |
| 9,413,606 B1 | 8/2016 | Roberts |
| 9,433,032 B1 | 8/2016 | Ghadge et al. |
| 9,454,336 B1 | 9/2016 | Rudradevan et al. |
| 9,582,178 B2 | 2/2017 | Grant et al. |
| 9,665,242 B2 | 5/2017 | Kim et al. |
| 9,680,982 B2 | 6/2017 | Fiedler |
| 9,727,346 B2 | 8/2017 | Shao |
| 9,728,230 B2 | 8/2017 | Cudak et al. |
| 9,750,116 B2 | 8/2017 | Witzgall |
| 9,759,917 B2 | 9/2017 | Osterhout et al. |
| 9,774,917 B1 | 9/2017 | Christie et al. |
| 9,784,417 B1 | 10/2017 | Springer |
| 9,858,739 B1 | 1/2018 | Johnson et al. |
| 9,898,175 B2 | 2/2018 | Fiedler |
| 10,055,094 B2 | 8/2018 | Li et al. |
| 10,068,364 B2 | 9/2018 | Cui |
| 10,091,017 B2 | 10/2018 | Landow et al. |
| 10,120,536 B2 | 11/2018 | Cha et al. |
| 10,142,122 B1 | 11/2018 | Hill et al. |
| 10,157,040 B2 | 12/2018 | Ballinger et al. |
| 10,219,026 B2 | 2/2019 | Eim et al. |
| 10,237,141 B2 | 3/2019 | Sasaki et al. |
| 10,282,068 B2 | 5/2019 | Dubin et al. |
| 10,284,980 B1 | 5/2019 | Woo et al. |
| 10,296,128 B1 | 5/2019 | Nold et al. |
| 10,298,643 B1 | 5/2019 | Toal et al. |
| 10,300,394 B1 | 5/2019 | Evans et al. |
| 10,303,422 B1 | 5/2019 | Woo et al. |
| 10,310,725 B2 | 6/2019 | Smith et al. |
| 10,339,769 B2 | 7/2019 | Mixter et al. |
| 10,409,239 B2 | 9/2019 | Reeder et al. |
| 10,436,977 B2 | 10/2019 | Bergman et al. |
| 10,454,781 B2 | 10/2019 | Sasaki et al. |
| 10,474,349 B2 | 11/2019 | Jang et al. |
| 10,511,456 B2 | 12/2019 | Smith et al. |
| 10,523,625 B1 | 12/2019 | Allen et al. |
| 10,631,123 B2 | 4/2020 | O'keeffe |
| 10,708,653 B1 | 7/2020 | Stinson et al. |
| 10,779,085 B1 | 9/2020 | Carrigan |
| 10,783,883 B2 | 9/2020 | Mixter et al. |
| 10,924,446 B1 | 2/2021 | Paul |
| 10,929,099 B2 | 2/2021 | Querze et al. |
| 10,963,145 B1 | 3/2021 | Voss et al. |
| 11,062,156 B1 | 7/2021 | Vallance et al. |
| 11,079,913 B1 | 8/2021 | Kim et al. |
| 11,164,580 B2 | 11/2021 | Kraker |
| 11,283,916 B2 | 3/2022 | Coffman et al. |
| 11,316,709 B2 | 4/2022 | Brown et al. |
| 11,343,613 B2 | 5/2022 | Gordon et al. |
| 11,523,166 B1 | 12/2022 | Tu et al. |
| 2001/0030597 A1 | 10/2001 | Inoue et al. |
| 2002/0012526 A1 | 1/2002 | Sai et al. |
| 2002/0060701 A1 | 5/2002 | Naughton et al. |
| 2002/0063737 A1 | 5/2002 | Feig et al. |
| 2002/0154888 A1 | 10/2002 | Allen et al. |
| 2002/0180774 A1 | 12/2002 | Errico et al. |
| 2003/0040813 A1 | 2/2003 | Gonzales et al. |
| 2003/0063130 A1 | 4/2003 | Barbieri et al. |
| 2003/0093790 A1 | 5/2003 | Logan et al. |
| 2003/0110511 A1 | 6/2003 | Schutte et al. |
| 2003/0112938 A1 | 6/2003 | Kanakubo et al. |
| 2004/0003051 A1 | 1/2004 | Krzyzanowski et al. |
| 2004/0095377 A1* | 5/2004 | Salandro ............ H04N 21/8456 348/700 |
| 2004/0131254 A1 | 7/2004 | Liang et al. |
| 2005/0055472 A1 | 3/2005 | Krzyzanowski et al. |
| 2005/0094610 A1 | 5/2005 | De et al. |
| 2005/0144247 A1 | 6/2005 | Christensen et al. |
| 2005/0163345 A1 | 7/2005 | Van et al. |
| 2005/0169503 A1 | 8/2005 | Howell et al. |
| 2005/0275626 A1 | 12/2005 | Mueller et al. |
| 2006/0002523 A1 | 1/2006 | Bettis et al. |
| 2006/0013554 A1 | 1/2006 | Poslinski et al. |
| 2006/0034586 A1 | 2/2006 | Millar et al. |
| 2006/0132455 A1 | 6/2006 | Rimas-ribikauskas et al. |
| 2006/0171453 A1 | 8/2006 | Rohlfing et al. |
| 2006/0174035 A1 | 8/2006 | Tufail |
| 2006/0221184 A1 | 10/2006 | Vallone et al. |
| 2006/0279628 A1 | 12/2006 | Fleming |
| 2006/0280186 A1 | 12/2006 | Carlton et al. |
| 2007/0033632 A1 | 2/2007 | Baynger et al. |
| 2007/0050452 A1 | 3/2007 | Raju et al. |
| 2007/0061020 A1 | 3/2007 | Bovee et al. |
| 2007/0064105 A1 | 3/2007 | Ohshima et al. |
| 2007/0065044 A1 | 3/2007 | Park et al. |
| 2007/0162762 A1 | 7/2007 | Huh et al. |
| 2007/0174774 A1 | 7/2007 | Lerman et al. |
| 2007/0192486 A1 | 8/2007 | Wilson et al. |
| 2007/0198111 A1 | 8/2007 | Oetzel et al. |
| 2007/0241945 A1 | 10/2007 | Moorer et al. |
| 2008/0034306 A1 | 2/2008 | Ording et al. |
| 2008/0080743 A1 | 4/2008 | Schneiderman et al. |
| 2008/0165160 A1 | 7/2008 | Kocienda et al. |
| 2009/0133070 A1 | 5/2009 | Hamano et al. |
| 2009/0153289 A1 | 6/2009 | Hope et al. |
| 2009/0199119 A1 | 8/2009 | Park et al. |
| 2009/0220206 A1 | 9/2009 | Kisliakov |
| 2009/0232028 A1 | 9/2009 | Baalbergen et al. |
| 2009/0282362 A1 | 11/2009 | Matsumoto |
| 2009/0299810 A1 | 12/2009 | Jardine et al. |
| 2010/0081375 A1 | 4/2010 | Rosenblatt et al. |
| 2010/0121636 A1 | 5/2010 | Burke et al. |
| 2010/0138007 A1 | 6/2010 | Clark et al. |
| 2010/0145485 A1 | 6/2010 | Duchene et al. |
| 2010/0191575 A1 | 7/2010 | Raleigh |
| 2010/0191833 A1 | 7/2010 | Hofrichter et al. |
| 2010/0201815 A1 | 8/2010 | Anderson et al. |
| 2010/0267370 A1 | 10/2010 | Lee |
| 2010/0318917 A1 | 12/2010 | Holladay et al. |
| 2010/0318928 A1 | 12/2010 | Neuman et al. |
| 2010/0318939 A1 | 12/2010 | Moon |
| 2011/0040754 A1 | 2/2011 | Peto et al. |
| 2011/0040760 A1 | 2/2011 | Fleischman et al. |
| 2011/0071656 A1 | 3/2011 | Mckiel, Jr. |
| 2011/0106279 A1 | 5/2011 | Cho et al. |
| 2011/0145745 A1 | 6/2011 | Hyeon et al. |
| 2011/0173545 A1 | 7/2011 | Meola et al. |
| 2011/0228084 A1 | 9/2011 | Colciago |
| 2011/0249861 A1 | 10/2011 | Tokutake |
| 2011/0252357 A1 | 10/2011 | Chaudhri |

(56) References Cited

U.S. PATENT DOCUMENTS

| | | |
|---|---|---|
| 2011/0254683 A1 | 10/2011 | Soldan et al. |
| 2012/0054278 A1 | 3/2012 | Taleb et al. |
| 2012/0066632 A1 | 3/2012 | Sundermeyer et al. |
| 2012/0070129 A1 | 3/2012 | Lin et al. |
| 2012/0079507 A1 | 3/2012 | Agarwal et al. |
| 2012/0169583 A1 | 7/2012 | Rippel et al. |
| 2012/0173767 A1 | 7/2012 | Kim et al. |
| 2012/0177339 A1 | 7/2012 | Chang et al. |
| 2012/0223890 A1 | 9/2012 | Borovsky et al. |
| 2012/0266199 A1 | 10/2012 | Noonan et al. |
| 2012/0269361 A1 | 10/2012 | Bhow et al. |
| 2012/0274850 A1 | 11/2012 | Hawkins et al. |
| 2012/0282974 A1 | 11/2012 | Green et al. |
| 2012/0291068 A1 | 11/2012 | Khushoo et al. |
| 2012/0311499 A1 | 12/2012 | Dellinger et al. |
| 2013/0060352 A1 | 3/2013 | Kouda et al. |
| 2013/0099672 A1 | 4/2013 | Lin et al. |
| 2013/0113822 A1 | 5/2013 | Putrevu et al. |
| 2013/0124997 A1 | 5/2013 | Speir et al. |
| 2013/0132865 A1 | 5/2013 | Li |
| 2013/0141223 A1 | 6/2013 | Brandsma et al. |
| 2013/0141378 A1 | 6/2013 | Yumiki et al. |
| 2013/0225152 A1 | 8/2013 | Matthews et al. |
| 2013/0227414 A1 | 8/2013 | Hwang et al. |
| 2013/0251329 A1 | 9/2013 | Mccoy et al. |
| 2013/0282180 A1 | 10/2013 | Layton |
| 2013/0283161 A1 | 10/2013 | Reimann et al. |
| 2013/0298021 A1 | 11/2013 | Park et al. |
| 2013/0331083 A1 | 12/2013 | Oslund |
| 2014/0013243 A1 | 1/2014 | Flynn et al. |
| 2014/0025798 A1 | 1/2014 | Apte et al. |
| 2014/0236325 A1 | 1/2014 | Sasaki et al. |
| 2014/0068439 A1 | 3/2014 | Lacaze et al. |
| 2014/0068486 A1 | 3/2014 | Sellers et al. |
| 2014/0070959 A1 | 3/2014 | Bhargava et al. |
| 2014/0075321 A1 | 3/2014 | Masera |
| 2014/0082501 A1 | 3/2014 | Bae et al. |
| 2014/0092292 A1 | 4/2014 | Kuznetsov et al. |
| 2014/0150029 A1 | 5/2014 | Avedissian et al. |
| 2014/0173082 A1 | 6/2014 | Shin |
| 2014/0380234 A1 | 6/2014 | Shim et al. |
| 2014/0215365 A1 | 7/2014 | Hiraga et al. |
| 2014/0215564 A1 | 7/2014 | Banatwala et al. |
| 2014/0218517 A1 | 8/2014 | Kim |
| 2014/0232273 A1 | 8/2014 | Sasaki et al. |
| 2014/0237419 A1 | 8/2014 | Ryu |
| 2014/0257532 A1 | 9/2014 | Kim et al. |
| 2014/0258854 A1 | 9/2014 | Li |
| 2014/0267068 A1 | 9/2014 | Smith et al. |
| 2014/0267549 A1 | 9/2014 | Pinter et al. |
| 2014/0285017 A1 | 9/2014 | Noguchi et al. |
| 2014/0293046 A1 | 10/2014 | Ni |
| 2014/0313032 A1 | 10/2014 | Sager et al. |
| 2014/0359524 A1 | 12/2014 | Sasaki et al. |
| 2014/0363024 A1 | 12/2014 | Apodaca |
| 2014/0365980 A1 | 12/2014 | Morrison et al. |
| 2014/0375819 A1 | 12/2014 | Larsen et al. |
| 2015/0008845 A1 | 1/2015 | Kim et al. |
| 2015/0010167 A1 | 1/2015 | Arling et al. |
| 2015/0040012 A1 | 2/2015 | Faaborg et al. |
| 2015/0042576 A1 | 2/2015 | Wang |
| 2015/0058780 A1 | 2/2015 | Malik et al. |
| 2015/0071601 A1 | 3/2015 | Dabous et al. |
| 2015/0081072 A1 | 3/2015 | Kallai et al. |
| 2015/0082225 A1 | 3/2015 | Shearer |
| 2015/0092009 A1 | 4/2015 | Deluca et al. |
| 2015/0095804 A1 | 4/2015 | Grossman et al. |
| 2015/0095937 A1 | 4/2015 | Tobin |
| 2015/0106721 A1 | 4/2015 | Cha et al. |
| 2015/0113418 A1 | 4/2015 | Sasaki et al. |
| 2015/0120768 A1 | 4/2015 | Wellen et al. |
| 2015/0135068 A1 | 5/2015 | Chiu |
| 2015/0142587 A1 | 5/2015 | Salgar et al. |
| 2015/0145435 A1 | 5/2015 | Ogawa |
| 2015/0146945 A1 | 5/2015 | Han |
| 2015/0147067 A1 | 5/2015 | Ryan et al. |
| 2015/0159895 A1 | 6/2015 | Quam et al. |
| 2015/0160797 A1 | 6/2015 | Shearer et al. |
| 2015/0177914 A1 | 6/2015 | Coyner et al. |
| 2015/0180922 A1 | 6/2015 | Draznin et al. |
| 2015/0188724 A1 | 7/2015 | Kim et al. |
| 2015/0193127 A1 | 7/2015 | Chai et al. |
| 2015/0193196 A1 | 7/2015 | Lin et al. |
| 2015/0198938 A1 | 7/2015 | Steele et al. |
| 2015/0201480 A1 | 7/2015 | Ogawa |
| 2015/0206529 A1 | 7/2015 | Kwon et al. |
| 2015/0207849 A1 | 7/2015 | Bingzhou et al. |
| 2015/0212705 A1 | 7/2015 | Sasaki et al. |
| 2015/0244539 A1 | 8/2015 | Ickman et al. |
| 2015/0256957 A1 | 9/2015 | Kim et al. |
| 2015/0264304 A1 | 9/2015 | Chastney et al. |
| 2015/0319006 A1 | 11/2015 | Plummer et al. |
| 2015/0319046 A1 | 11/2015 | Plummer et al. |
| 2015/0332586 A1 | 11/2015 | Hamm et al. |
| 2015/0341227 A1 | 11/2015 | Tatzel et al. |
| 2015/0348493 A1 | 12/2015 | Chae et al. |
| 2015/0350031 A1 | 12/2015 | Burks et al. |
| 2015/0370230 A1 | 12/2015 | Duchene et al. |
| 2015/0370426 A1 | 12/2015 | Carrigan et al. |
| 2015/0373178 A1 | 12/2015 | Felt et al. |
| 2016/0004499 A1 | 1/2016 | Kim et al. |
| 2016/0005280 A1* | 1/2016 | Laska .............. G08B 13/19608 386/230 |
| 2016/0005281 A1 | 1/2016 | Laska et al. |
| 2016/0033985 A1 | 2/2016 | Gulli' et al. |
| 2016/0037140 A1 | 2/2016 | Lindsey et al. |
| 2016/0037436 A1 | 2/2016 | Spencer et al. |
| 2016/0043905 A1 | 2/2016 | Fiedler |
| 2016/0043962 A1 | 2/2016 | Kim et al. |
| 2016/0070244 A1 | 3/2016 | Cipollo et al. |
| 2016/0073138 A1 | 3/2016 | Francisco et al. |
| 2016/0073197 A1 | 3/2016 | Hammer et al. |
| 2016/0073439 A1 | 3/2016 | Palin et al. |
| 2016/0073482 A1 | 3/2016 | Fok et al. |
| 2016/0085412 A1 | 3/2016 | Meganathan et al. |
| 2016/0088438 A1 | 3/2016 | Okeeffe |
| 2016/0092072 A1 | 3/2016 | So et al. |
| 2016/0093180 A1 | 3/2016 | Fitzgibbon et al. |
| 2016/0093338 A1* | 3/2016 | Laska .................... H04L 9/0822 386/224 |
| 2016/0099901 A1 | 4/2016 | Allen et al. |
| 2016/0103830 A1 | 4/2016 | Cheong et al. |
| 2016/0117402 A1 | 4/2016 | Gowel |
| 2016/0120009 A1 | 4/2016 | Aliakseyeu et al. |
| 2016/0301566 A1 | 4/2016 | Ramasubramani et al. |
| 2016/0133297 A1 | 5/2016 | Thornton et al. |
| 2016/0139752 A1 | 5/2016 | Shim et al. |
| 2016/0150135 A1 | 5/2016 | Chen |
| 2016/0165390 A1 | 6/2016 | Hartzell et al. |
| 2016/0173318 A1 | 6/2016 | Ha et al. |
| 2016/0179068 A1 | 6/2016 | Qian et al. |
| 2016/0187995 A1 | 6/2016 | Rosewall |
| 2016/0191992 A1 | 6/2016 | Kwon |
| 2016/0216879 A1 | 7/2016 | Park et al. |
| 2016/0224233 A1 | 8/2016 | Phang et al. |
| 2016/0231902 A1 | 8/2016 | Sirpal et al. |
| 2016/0253145 A1 | 9/2016 | Lee et al. |
| 2016/0255706 A1 | 9/2016 | Kim et al. |
| 2016/0259459 A1 | 9/2016 | Yang et al. |
| 2016/0267081 A1 | 9/2016 | Keene |
| 2016/0277903 A1 | 9/2016 | Poosala et al. |
| 2016/0286630 A1 | 9/2016 | Witzgall |
| 2016/0291824 A1 | 10/2016 | Grossman et al. |
| 2016/0320849 A1 | 11/2016 | Koo |
| 2016/0335041 A1 | 11/2016 | Wachter et al. |
| 2016/0364123 A1 | 12/2016 | Burns et al. |
| 2016/0364129 A1 | 12/2016 | Mclean et al. |
| 2016/0366481 A1 | 12/2016 | Lim et al. |
| 2017/0017531 A1 | 1/2017 | Choi et al. |
| 2017/0040039 A1 | 2/2017 | Snibbe et al. |
| 2017/0046025 A1 | 2/2017 | Dascola et al. |
| 2017/0053008 A1 | 2/2017 | Frenkel et al. |
| 2017/0070775 A1 | 3/2017 | Taxier et al. |
| 2017/0078767 A1 | 3/2017 | Borel et al. |

(56) References Cited

U.S. PATENT DOCUMENTS

| | | |
|---|---|---|
| 2017/0084132 A1 | 3/2017 | Scalisi |
| 2017/0084135 A1 | 3/2017 | Yu |
| 2017/0097621 A1 | 4/2017 | Ackmann et al. |
| 2017/0176035 A1 | 6/2017 | Reeder et al. |
| 2017/0185277 A1 | 6/2017 | Sundermeyer et al. |
| 2017/0195130 A1 | 7/2017 | Landow et al. |
| 2017/0206779 A1 | 7/2017 | Lee et al. |
| 2017/0223429 A1 | 8/2017 | Schreiner et al. |
| 2017/0230705 A1 | 8/2017 | Pardue et al. |
| 2017/0251314 A1 | 8/2017 | Pye et al. |
| 2017/0285788 A1 | 10/2017 | Park et al. |
| 2017/0302779 A1 | 10/2017 | Zhao et al. |
| 2017/0318322 A1 | 11/2017 | Lamb et al. |
| 2017/0337791 A1 | 11/2017 | Gordon-carroll |
| 2017/0352380 A1 | 12/2017 | Doumbouya et al. |
| 2017/0357425 A1 | 12/2017 | Smith et al. |
| 2017/0357434 A1 | 12/2017 | Coffman et al. |
| 2017/0359189 A1 | 12/2017 | Smith et al. |
| 2017/0359191 A1 | 12/2017 | Smith et al. |
| 2017/0359311 A1 | 12/2017 | Chen |
| 2017/0359555 A1 | 12/2017 | Irani et al. |
| 2018/0014043 A1 | 1/2018 | Zhang et al. |
| 2018/0014077 A1 | 1/2018 | Hou et al. |
| 2018/0018081 A1 | 1/2018 | Dattilo-green et al. |
| 2018/0019889 A1* | 1/2018 | Burns ................ H04L 12/4625 |
| 2018/0088795 A1 | 3/2018 | Van Os et al. |
| 2018/0101297 A1 | 4/2018 | Yang et al. |
| 2018/0109754 A1 | 4/2018 | Kwon |
| 2018/0113577 A1* | 4/2018 | Burns ............... H04N 21/47217 |
| 2018/0115788 A1* | 4/2018 | Burns ................... G06V 20/41 |
| 2018/0199080 A1 | 7/2018 | Jackson et al. |
| 2018/0227341 A1 | 8/2018 | Rizzi |
| 2018/0228003 A1 | 8/2018 | O'driscoll et al. |
| 2018/0232592 A1 | 8/2018 | Stewart et al. |
| 2018/0232705 A1 | 8/2018 | Baker et al. |
| 2018/0246639 A1 | 8/2018 | Han et al. |
| 2018/0249113 A1 | 8/2018 | Faulkner |
| 2018/0286395 A1 | 10/2018 | Li et al. |
| 2018/0308480 A1 | 10/2018 | Jang et al. |
| 2018/0310042 A1 | 10/2018 | Mayalil et al. |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0349707 A1 | 12/2018 | Bataller et al. |
| 2018/0349736 A1 | 12/2018 | Bapat et al. |
| 2018/0364665 A1 | 12/2018 | Clymer et al. |
| 2018/0367578 A1 | 12/2018 | Verma et al. |
| 2019/0025943 A1 | 1/2019 | Jobs et al. |
| 2019/0026021 A1 | 1/2019 | Coffman et al. |
| 2019/0028419 A1 | 1/2019 | Sullivan |
| 2019/0056907 A1 | 2/2019 | So et al. |
| 2019/0075105 A1 | 3/2019 | Rajakumar |
| 2019/0089934 A1 | 3/2019 | Goulden et al. |
| 2019/0090014 A1 | 3/2019 | Shoop |
| 2019/0102145 A1 | 4/2019 | Wilberding et al. |
| 2019/0130185 A1 | 5/2019 | Delaney et al. |
| 2019/0138951 A1 | 5/2019 | Brownhill et al. |
| 2019/0208282 A1 | 7/2019 | Singh et al. |
| 2019/0265946 A1 | 8/2019 | Bae et al. |
| 2019/0273664 A1 | 9/2019 | Fujita et al. |
| 2019/0279634 A1 | 9/2019 | Tak et al. |
| 2019/0286651 A1 | 9/2019 | Lee et al. |
| 2019/0294889 A1 | 9/2019 | Sriram et al. |
| 2019/0295393 A1 | 9/2019 | Lee et al. |
| 2019/0325229 A1 | 10/2019 | Koyama et al. |
| 2019/0332400 A1 | 10/2019 | Spoor et al. |
| 2019/0339769 A1 | 11/2019 | Cox et al. |
| 2019/0342621 A1 | 11/2019 | Carrigan et al. |
| 2019/0342622 A1 | 11/2019 | Carrigan et al. |
| 2019/0354252 A1 | 11/2019 | Badr |
| 2019/0361575 A1 | 11/2019 | Ni et al. |
| 2020/0042775 A1 | 2/2020 | Lim |
| 2020/0050502 A1 | 2/2020 | Ghafourifar et al. |
| 2020/0110443 A1 | 4/2020 | Leong et al. |
| 2020/0120378 A1 | 4/2020 | Elliot |
| 2020/0135191 A1 | 4/2020 | Nourbakhsh |
| 2020/0152186 A1 | 5/2020 | Koh et al. |
| 2020/0186378 A1 | 6/2020 | Six et al. |
| 2020/0220914 A1 | 7/2020 | Carrigan et al. |
| 2020/0225841 A1 | 7/2020 | Coffman et al. |
| 2020/0301575 A1 | 9/2020 | Lindholm et al. |
| 2020/0302913 A1 | 9/2020 | Marcinkiewicz |
| 2020/0335187 A1 | 10/2020 | Lefkofsky et al. |
| 2020/0382332 A1 | 12/2020 | Carrigan et al. |
| 2020/0382559 A1 | 12/2020 | Kramar et al. |
| 2020/0395012 A1 | 12/2020 | Kim et al. |
| 2020/0413197 A1 | 12/2020 | Carrigan et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0092491 A1 | 3/2021 | Carrigan et al. |
| 2021/0099829 A1 | 4/2021 | Soto et al. |
| 2021/0144422 A1 | 5/2021 | Wagner et al. |
| 2021/0158830 A1 | 5/2021 | Boehlke |
| 2021/0266274 A1 | 8/2021 | Liu et al. |
| 2021/0321197 A1 | 10/2021 | Annamraju |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0383130 A1 | 12/2021 | Deets et al. |
| 2021/0385417 A1 | 12/2021 | Park et al. |
| 2022/0004356 A1 | 1/2022 | Kim et al. |
| 2022/0078506 A1 | 3/2022 | Sanders et al. |
| 2022/0279022 A1 | 9/2022 | Kramar et al. |
| 2022/0365667 A1 | 11/2022 | Carrigan et al. |
| 2023/0041125 A1 | 2/2023 | Kim et al. |
| 2023/0057851 A1 | 2/2023 | Ansari et al. |
| 2023/0082492 A1 | 3/2023 | Coffman et al. |
| 2023/0209016 A1 | 6/2023 | Park et al. |
| 2023/0393714 A1 | 12/2023 | Giuliani |
| 2023/0403509 A1 | 12/2023 | Carrigan et al. |
| 2024/0069711 A1 | 2/2024 | Carrigan et al. |

FOREIGN PATENT DOCUMENTS

| | | |
|---|---|---|
| CN | 101517557 A | 8/2009 |
| CN | 101627361 A | 1/2010 |
| CN | 101989072 A | 3/2011 |
| CN | 102063253 A | 5/2011 |
| CN | 102202192 A | 9/2011 |
| CN | 102915630 A | 2/2013 |
| CN | 102932216 A | 2/2013 |
| CN | 103136497 A | 6/2013 |
| CN | 103347116 A | 10/2013 |
| CN | 103677711 A | 3/2014 |
| CN | 103970814 A | 8/2014 |
| CN | 104076757 A | 10/2014 |
| CN | 104155938 A | 11/2014 |
| CN | 104247449 A | 12/2014 |
| CN | 104284477 A | 1/2015 |
| CN | 104298188 A | 1/2015 |
| CN | 104429094 A | 3/2015 |
| CN | 104469512 A | 3/2015 |
| CN | 104581043 A | 4/2015 |
| CN | 104684207 A | 6/2015 |
| CN | 104766021 A | 7/2015 |
| CN | 104780654 A | 7/2015 |
| CN | 104820631 A | 8/2015 |
| CN | 104898603 A | 9/2015 |
| CN | 104956276 A | 9/2015 |
| CN | 104956417 A | 9/2015 |
| CN | 105069118 A | 11/2015 |
| CN | 105159107 A | 12/2015 |
| CN | 105263114 A | 1/2016 |
| CN | 105283840 A | 1/2016 |
| CN | 105359199 A | 2/2016 |
| CN | 105373165 A | 3/2016 |
| CN | 105374192 A | 3/2016 |
| CN | 105474580 A | 4/2016 |
| CN | 105531671 A | 4/2016 |
| CN | 105553796 A | 5/2016 |
| CN | 105900376 A | 8/2016 |
| CN | 107197441 A | 9/2017 |

(56) References Cited

FOREIGN PATENT DOCUMENTS

| | | |
|---|---|---|
| CN | 107533368 A | 1/2018 |
| CN | 107613235 A | 1/2018 |
| CN | 107637073 A | 1/2018 |
| CN | 107819928 A | 3/2018 |
| CN | 109117078 A | 1/2019 |
| CN | 109196825 A | 1/2019 |
| CN | 109287140 A | 1/2019 |
| CN | 109302531 A | 2/2019 |
| CN | 109348052 A | 2/2019 |
| CN | 109688441 A | 4/2019 |
| CN | 109688442 A | 4/2019 |
| EP | 1881649 A2 | 1/2008 |
| EP | 2675195 A2 | 12/2013 |
| EP | 2784611 A2 | 10/2014 |
| EP | 2797391 A1 | 10/2014 |
| EP | 2879470 A1 | 6/2015 |
| EP | 2894948 A2 | 7/2015 |
| EP | 2933953 A1 | 10/2015 |
| EP | 2981093 A1 | 2/2016 |
| EP | 3038427 A1 | 6/2016 |
| EP | 3445058 A1 | 2/2019 |
| EP | 3460770 A1 | 3/2019 |
| EP | 3038427 B1 | 12/2019 |
| EP | 3579093 A1 | 12/2019 |
| EP | 3751405 A1 | 12/2020 |
| GB | 2499123 A | 8/2013 |
| GB | 2512821 A | 10/2014 |
| GB | 2533101 A | 6/2016 |
| IN | 1038MUM2005 | 6/2007 |
| JP | 4-175921 A | 6/1992 |
| JP | 6-178356 A | 6/1994 |
| JP | 2001-67099 A | 3/2001 |
| JP | 2002-153678 A | 5/2002 |
| JP | 2003-228780 A | 8/2003 |
| JP | 2004-96397 A | 3/2004 |
| JP | 2004-110559 A | 4/2004 |
| JP | 2005-333294 A | 12/2005 |
| JP | 2006-350819 A | 12/2006 |
| JP | 2007-58663 A | 3/2007 |
| JP | 2008-99330 A | 4/2008 |
| JP | 2009-201127 A | 9/2009 |
| JP | 2011-124665 A | 6/2011 |
| JP | 2012-73839 A | 4/2012 |
| JP | 2012-123460 A | 6/2012 |
| JP | 2013-98613 A | 5/2013 |
| JP | 2013-200879 A | 10/2013 |
| JP | 2014-71835 A | 4/2014 |
| JP | 2014-87126 A | 5/2014 |
| JP | 2014-160461 A | 9/2014 |
| JP | 2014-170982 A | 9/2014 |
| JP | 2014-186961 A | 10/2014 |
| JP | 5628461 B1 | 11/2014 |
| JP | 2015-70327 A | 4/2015 |
| JP | 2015-125671 A | 7/2015 |
| JP | 2015-128043 A | 7/2015 |
| JP | 2015-128326 A | 7/2015 |
| JP | 2015-149710 A | 8/2015 |
| JP | 2015-154253 A | 8/2015 |
| JP | 2015-195222 A | 11/2015 |
| JP | 2015-211035 A | 11/2015 |
| JP | 2016-38615 A | 3/2016 |
| JP | 2016-51661 A | 4/2016 |
| JP | 2016-63520 A | 4/2016 |
| JP | 2016-72953 A | 5/2016 |
| JP | 2016-100791 A | 5/2016 |
| JP | 2016-119600 A | 6/2016 |
| JP | 2016-525732 A | 8/2016 |
| JP | 2016-157272 A | 9/2016 |
| JP | 2017-41008 A | 2/2017 |
| JP | 2017-508195 A | 3/2017 |
| JP | 2017-84253 A | 5/2017 |
| JP | 2017-158202 A | 9/2017 |
| JP | 2017-173998 A | 9/2017 |
| JP | 201-7158 A | 1/2018 |
| JP | 2018-63826 A | 4/2018 |
| JP | 2018-200624 A | 12/2018 |
| JP | 2019-526095 A | 9/2019 |
| KR | 10-2001-0091156 A | 10/2001 |
| KR | 10-2011-0022980 A | 3/2011 |
| KR | 10-2011-0075136 A | 7/2011 |
| KR | 10-2011-0093040 A | 8/2011 |
| KR | 10-2012-0059860 A | 6/2012 |
| KR | 10-2012-0079208 A | 7/2012 |
| KR | 10-2013-0115611 A | 10/2013 |
| KR | 10-2014-0075932 A | 6/2014 |
| KR | 10-2014-0148289 A | 12/2014 |
| KR | 10-2015-0005134 A | 1/2015 |
| KR | 10-2015-0043146 A | 4/2015 |
| KR | 10-1522311 B1 | 5/2015 |
| KR | 10-2015-0136440 A | 12/2015 |
| KR | 10-2017-0008601 A | 1/2017 |
| KR | 10-2017-0100358 A | 9/2017 |
| KR | 10-2018-0027707 A | 3/2018 |
| KR | 10-2018-0034637 A | 4/2018 |
| KR | 10-2018-0042013 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0057414 A | 5/2019 |
| KR | 10-2020-0039030 A | 4/2020 |
| TW | 201547326 A | 12/2015 |
| WO | 2000/39964 A1 | 7/2000 |
| WO | 2005/055521 A1 | 6/2005 |
| WO | 2011/027964 A1 | 3/2011 |
| WO | 2011/126502 A1 | 10/2011 |
| WO | 2012/085794 A1 | 6/2012 |
| WO | 2014/128800 A1 | 10/2013 |
| WO | 2014/030540 A1 | 2/2014 |
| WO | 2014/155429 A1 | 10/2014 |
| WO | 2014/197339 A1 | 12/2014 |
| WO | 2014/208057 A1 | 12/2014 |
| WO | 2014/210304 A1 | 12/2014 |
| WO | 2015/008409 A1 | 1/2015 |
| WO | 2015/105763 A1 | 1/2015 |
| WO | 2015/039000 A1 | 3/2015 |
| WO | 2015/114690 A1 | 8/2015 |
| WO | 2015/179031 A1 | 11/2015 |
| WO | 2016/052888 A1 | 4/2016 |
| WO | WO-2016079889 A1 * | 5/2016 ............ G08B 13/08 |
| WO | 2016/200603 A1 | 12/2016 |
| WO | 2017/027526 A1 | 2/2017 |
| WO | 2017/058293 A1 | 4/2017 |
| WO | 2017/147081 A1 | 8/2017 |
| WO | 2017/205657 A1 | 11/2017 |
| WO | 2017/218143 A1 | 12/2017 |
| WO | 2017/218192 A1 | 12/2017 |
| WO | 2018/144339 A2 | 8/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/090653 A1 | 5/2019 |
| WO | 2019/217341 A1 | 11/2019 |
| WO | 2021/231412 A1 | 11/2021 |

OTHER PUBLICATIONS

Office Action received for Korean Patent Application No. 10-2023-7011715, dated Dec. 20, 2023, 9 pages (4 pages of English Translation and 5 pages of Official Copy).
Applicant-Initiated Interview Summary received for U.S. Appl. No. 17/992,229, dated Nov. 30, 2023, 2 pages.
Office Action received for Korean Patent Application No. 10-2023-0001668, dated Nov. 3, 2023. 5 pages (2 pages of English Translation and 3 pages of Official Copy).
Notice of Acceptance received for Australian Patent Application No. 2022204466, dated Jul. 25, 2023, 3 pages.
Office Action received for Australian Patent Application No. 2019267527, dated Dec. 2, 2021, 4 pages.
Office Action received for Australian Patent Application No. 2019267527, dated Jun. 15, 2022, 3 pages.
Office Action received for Australian Patent Application No. 2019267527, dated Jun. 24, 2021, 8 pages.

(56) References Cited

OTHER PUBLICATIONS

Office Action received for Australian Patent Application No. 2019267527, dated Mar. 3, 2022, 3 pages.
Office Action received for Australian Patent Application No. 2022204466, dated Jun. 7, 2023, 4 pages.
Decision to Grant received for Japanese Patent Application No. 2022-104306, dated Jan. 4, 2024, 3 pages (1 page of English Translation and 2 pages of Official Copy).
Intention to Grant received for European Patent Application No. 20746426.4, dated Jan. 5, 2024, 9 pages.
Office Action received for Australian Patent Application No. 2023204396, dated Jan. 8, 2024, 5 pages.
Office Action received for Chinese Patent Application No. 202210463449.6, dated Dec. 19, 2023, 11 pages (6 pages of English Translation and 5 pages of Official Copy).
Office Action received for Korean Patent Application No. 10-2022-7001521, dated Dec. 19, 2023, 7 pages (3 pages of English Translation and 4 pages of Official Copy).
Advisory Action received for U.S. Appl. No. 16/404,605, dated Apr. 15, 2020, 10 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant Initiated Interview Summary received for U.S. Appl. No. 16/404,605, dated Nov. 13, 2019, 3 pages.
Applicant Initiated Interview Summary received for U.S. Appl. No. 16/817,328, dated Dec. 21, 2021, 3 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Applicant-Initiated Interview Summary received for U.S. Appl. No. 16/830,838, dated Apr. 6, 2022, 2 pages.
Applicant-Initiated Interview Summary received for U.S. Appl. No. 16/830,838, dated May 24, 2021, 3 pages.
Applicant-Initiated Interview Summary received for U.S. Appl. No. 16/830,838, dated Sep. 21, 2022, 2 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/028,176, dated Jun. 2, 2022, 5 pages.
Applicant-Initiated Interview Summary received for U.S. Appl. No. 17/028,176, dated Oct. 14, 2022, 5 pages.
Applicant-Initiated Interview Summary received for U.S. Appl. No. 17/116,938, dated Dec. 13, 2021, 3 pages.
Applicant-Initiated Interview Summary received for U.S. Appl. No. 17/116,938, dated Jun. 14, 2022, 2 pages.
Applicant-Initiated Interview Summary received for U.S. Appl. No. 17/116,938, dated Oct. 13, 2022, 3 pages.
Applicant-Initiated Interview Summary received for U.S. Appl. No. 17/223,794, dated Sep. 7, 2021, 3 pages.
Applicant-Initiated Interview Summary received for U.S. Appl. No. 17/337,110, dated Sep. 21, 2022, 2 pages.
Applicant-Initiated Interview Summary received for U.S. Appl. No. 17/464,477, dated Mar. 21, 2022, 3 pages.
Applicant-Initiated Interview Summary received for U.S. Appl. No. 17/464,477, dated Sep. 6, 2022, 3 pages.
Applicant-Initiated Interview Summary received for U.S. Appl. No. 17/476,404, dated Jul. 27, 2022, 6 pages.
Applicant-Initiated Interview Summary received for U.S. Appl. No. 17/476,404, dated Mar. 18, 2022, 2 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Blinkx.tv and Heinlein's Newsbox, Available at: <http://http://www.technovelgy.com/ct/Science-Fiction-News.asp?NewsNum=470>, 2005, 3 pages.
Bluejeans, "Video Conferencing Software | BlueJeans", Online Available at:—https://www.bluejeans.com/features/video-conferences Retrieved from online at: Apr. 28, 2020, 6 pages.
Brief Communication Regarding Oral Proceedings received for European Patent Application No. 17813777.4, dated Nov. 23, 2020, 6 pages.
Brief Communication Regarding Oral Proceedings received for European Patent Application No. 19182037.2, dated Apr. 15, 2021, 2 pages.
Brief Communication Regarding Oral Proceedings received for European Patent Application No. 19728558.8, dated Jul. 5, 2022, 1 page.
Brief Communication Regarding Oral Proceedings received for European Patent Application No. 20187610.9, dated May 31, 2022, 1 page.
CCTV Camera Pros, "View HD Security Cameras on iDVR-PRO iPhone App", Online Available at: https://www.youtube.com/watch?v=LAsZdfys2GM, Apr. 12, 2017, 3 pages.
Certificate of Examination received for Australian Patent Application No. 2019100487, dated Jan. 7, 2020, 2 pages.
Certificate of Examination received for Australian Patent Application No. 2020100303, dated Apr. 17, 2020, 2 pages.
Certificate of Examination received for Australian Patent Application No. 2020100886, dated Dec. 22, 2020, 2 pages.
Certificate of Examination received for Australian Patent Application No. 2021100721, dated Dec. 16, 2021, 2 pages.
Certification of Examination received for Australian Patent Application No. 2017100666, dated Jan. 29, 2018, 2 pages.
Corrected International Search Report and Written Opinion received for PCT Patent Application No. PCT/US2017/035293, dated Dec. 8, 2017, 21 pages.
Corrected Notice of Allowance received for U.S. Appl. No. 15/427,516, dated Apr. 29, 2019, 2 pages.
Corrected Notice of Allowance received for U.S. Appl. No. 15/427,516, dated May 8, 2019, 2 pages.
Corrected Notice of Allowance received for U.S. Appl. No. 16/143,379, dated Dec. 18, 2019, 2 pages.
Corrected Notice of Allowance received for U.S. Appl. No. 16/143,379, dated Feb. 14, 2020, 2 pages.
Corrected Notice of Allowance received for U.S. Appl. No. 16/143,379, dated Mar. 3, 2020, 2 pages.
Corrected Notice of Allowance received for U.S. Appl. No. 16/143,379, dated Mar. 12, 2020, 2 pages.
Corrected Notice of Allowance received for U.S. Appl. No. 16/404,605, dated Dec. 23, 2020, 3 pages.
Corrected Notice of Allowance received for U.S. Appl. No. 16/584,743, dated Dec. 30, 2020, 3 pages.
Corrected Notice of Allowance received for U.S. Appl. No. 17/027,373, dated Jul. 12, 2022, 2 pages.
Corrected Notice of Allowance received for U.S. Appl. No. 17/027,373, dated Oct. 26, 2022, 2 pages.
Corrected Notice of Allowance received for U.S. Appl. No. 16/143,379, dated Aug. 15, 2019, 2 pages.
Corrected Notice of Allowance received for U.S. Appl. No. 16/143,379, dated Nov. 12, 2019, 2 pages.
Corrected Notice of Allowance received for U.S. Appl. No. 16/143,379, dated Oct. 16, 2019, 2 pages.
Decision to Grant received for Danish Patent Application No. PA201670601, dated Jun. 21, 2019, 2 pages.
Decision to Grant received for Danish Patent Application No. PA201670602, dated Nov. 30, 2018, 2 pages.
Decision to Grant received for Danish Patent Application No. PA201670604, dated Aug. 22, 2018, 2 pages.
Decision to Grant received for Danish Patent Application No. PA201670605, dated Nov. 29, 2018, 2 pages.
Decision to Grant received for Danish Patent Application No. PA201870293, dated Dec. 3, 2018, 2 pages.
Decision to Grant received for Danish Patent Application No. PA201870435, dated Oct. 20, 2020, 2 pages.

(56) References Cited

OTHER PUBLICATIONS

Decision to Grant received for Danish Patent Application No. PA202070627, dated May 11, 2022, 2 pages.
Decision to Grant received for European Patent Application No. 19182037.2, dated Sep. 16, 2021, 3 pages.
Decision to Grant received for Japanese Patent Application No. 2021-051415, dated Jan. 6, 2022, 3 pages.
Decision to Refuse received for European Patent Application No. 20187610.9, dated Jul. 19, 2022, 13 pages.
D-Link USA, "How to Control Your Network with mydlink Lite", Online Available at: https://www.youtube.com/watch?v=2DWct_P3o7Y, Sep. 6, 2013, 3 pages.
D-Link, "D-Link Wi-Fi app—Complete Wi-Fi Management in the Palm of Your Hand", Online Available at: https://www.youtube.com/watch?v=EA8L7ZHxsbg, Apr. 12, 2019, 3 pages.
Examiner-Initiated Interview Summary received for U.S. Appl. No. 17/027,373, dated Mar. 31, 2022, 4 pages.
Examiner-Initiated Interview Summary received for U.S. Appl. No. 17/028,176, dated Nov. 17, 2021, 2 pages.
Extended European Search Report includes Supplementary European Search Report and Search Opinion) received for European Patent Application No. 17813777.4, dated Mar. 25, 2019, 8 pages.
Extended European Search Report received for European Patent Application No. 19182037.2, dated Oct. 31, 2019, 8 pages.
Extended European Search Report received for European Patent Application No. 20187610.9, dated Nov. 16, 2020, 7 pages.
Extended European Search Report received for European Patent Application No. 21160991.2, dated Jul. 16, 2021, 14 pages.
Extended European Search Report received for European Patent Application No. 22191264.5, dated Nov. 11, 2022, 8 pages.
Extended Search Report received for European Patent Application No. 21161005.0, dated Jun. 14, 2021, 12 pages.
Final Office Action Received for U.S. Appl. No. 11/462,696, dated Jan. 6, 2009, 22 pages.
Final Office Action Received for U.S. Appl. No. 11/462,696, dated Jul. 7, 2010, 24 pages.
Final Office Action Received for U.S. Appl. No. 11/462,696, dated May 5, 2011, 42 pages.
Final Office Action received for U.S. Appl. No. 16/404,605, dated Feb. 10, 2020, 21 pages.
Final Office Action received for U.S. Appl. No. 16/830,838, dated Dec. 9, 2021, 16 pages.
Final Office Action received for U.S. Appl. No. 16/830,838, dated Oct. 14, 2022, 16 pages.
Final Office Action received for U.S. Appl. No. 17/026,818, dated Jan. 29, 2021, 21 pages.
Final Office Action received for U.S. Appl. No. 17/028,176, dated Mar. 9, 2022, 22 pages.
Final Office Action received for U.S. Appl. No. 17/116,938, dated Dec. 29, 2022, 42 pages.
Final Office Action received for U.S. Appl. No. 17/116,938, dated Mar. 1, 2022, 27 pages.
Final Office Action received for U.S. Appl. No. 17/464,477, dated Jun. 22, 2022, 21 pages.
Final Office Action received for U.S. Appl. No. 17/476,404, dated May 5, 2022, 30 pages.
Final Office Action Received for U.S. Appl. No. 11/462,696, dated Nov. 16, 2011, 45 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
Intention to Grant received for Danish Patent Application No. PA201670601, dated Apr. 10, 2019, 2 pages.
Intention to Grant received for Danish Patent Application No. PA201670602, dated Aug. 1, 2018, 2 pages.
Intention to Grant received for Danish Patent Application No. PA201670604, dated Jun. 14, 2018, 2 Pages.
Intention to Grant received for Danish Patent Application No. PA201670604, dated Mar. 15, 2018, 2 pages.
Intention to Grant received for Danish Patent Application No. PA201670605, dated Aug. 1, 2018, 2 pages.
Intention to Grant received for Danish Patent Application No. PA201870293, dated Aug. 31, 2018, 2 pages.
Intention to Grant received for Danish Patent Application No. PA201870435, dated Jul. 1, 2020, 2 pages.
Intention to Grant received for Danish Patent Application No. PA202070617, dated Nov. 15, 2021, 2 pages.
Intention to Grant received for Danish Patent Application No. PA202070627, dated Jan. 4, 2022, 2 pages.
Intention to Grant received for European Patent Application No. 19182037.2, dated May 4, 2021, 9 pages.
International Preliminary Report on Patentability received for PCT Patent Application No. PCT/US2017/035293, dated Dec. 27, 2018, 16 pages.
International Preliminary Report on Patentability received for PCT Patent Application No. PCT/US2019/030963, dated Nov. 19, 2020, 12 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/035426, dated Dec. 9, 2021, 10 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2017/035293, dated Oct. 10, 2017, 25 pages.
International Search Report and Written Opinion received for PCT Patent Application No. PCT/US2019/030963, dated Oct. 17, 2019, 21 pages.
International Search Report and written Opinion received for PCT Patent Application No. PCT/US2020/024390, dated Aug. 17, 2020, 22 pages.
International Search Report and Written Opinion received for PCT Patent Application No. PCT/US2020/024390, dated Oct. 23, 2020, 26 pages.
International Search Report and Written Opinion received for PCT Patent Application No. PCT/US2020/035426, dated Sep. 11, 2020, 12 pages.
International Search Report and Written Opinion received for PCT Patent Application No. PCT/US2021/031760, dated Sep. 16, 2021, 18 pages.
International Search Report and Written Opinion received for PCT Patent Application No. PCT/US2021/035715, dated Nov. 15, 2021, 19 pages.
International Search Report and Written Opinion received for PCT Patent Application No. PCT/US2021/046861, dated Dec. 9, 2021, 11 pages.
International Search Report and Written Opinion received for PCT Patent Application No. PCT/US2022/029282, dated Nov. 9, 2022, 22 pages.
Invitation to Pay Addition Fees received for PCT Patent Application No. PCT/US2017/035293, mailed on Aug. 17, 2017, 3 pages.
Invitation to Pay Additional Fees and Partial International Search Report received for PCT Patent Application No. PCT/US2021/035715, dated Sep. 21, 2021, 15 pages.
Invitation to Pay Additional Fees and Partial International Search Report received for PCT Patent Application No. PCT/US2022/029282, dated Sep. 15, 2022, 15 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2019/030963, mailed on Aug. 22, 2019, 12 pages.
Invitation to Pay Search Fees received for European Patent Application No. 19728558.8, mailed on Apr. 20, 2021, 4 pages.
Invitation to Pay Search Fees received for European Patent Application No. 20719301.2, mailed on Dec. 17, 2020, 5 pages.

(56) References Cited

OTHER PUBLICATIONS

Invitation to Pay Search Fees received for European Patent Application No. 21728781.2, mailed on Dec. 2, 2022, 3 pages.
Minutes of the Oral Proceedings received for European Patent Application No. 20187610.9, mailed on Jun. 7, 2022, 6 pages.
Multi-camera view on Alexa, online available at: https://forums.wyzecam.com/t/multi-camera-view-on-alexa/24290, Retrieved on May 12, 2021, 8 pages.
Non-Final Office Action received for U.S. Appl. No. 17/464,477, dated Feb. 8, 2022, 16 pages.
Non-Final Office Action Received for U.S. Appl. No. 11/462,696, dated Aug. 5, 2008, 15 pages.
Non-Final Office Action Received for U.S. Appl. No. 11/462,696, dated Nov. 16, 2010, 43 pages.
Office Action Received for U.S. Appl. No. 11/462,696, dated Sep. 1, 2009, 18 pages.
Office Action received for U.S. Appl. No. 15/427,516, dated Aug. 28, 2018, 11 Pages.
Office Action received for U.S. Appl. No. 16/404,605, dated Jun. 24, 2020, 18 pages.
Office Action received for U.S. Appl. No. 16/404,605, dated Aug. 1, 2019, 19 Pages.
Office Action received for U.S. Appl. No. 16/404,612, dated Feb. 28, 2020, 13 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/817,328, dated Oct. 29, 2021, 9 pages.
Non-Final Office Action received for U.S. Appl. No. 16/830,838, dated Apr. 1, 2021, 13 pages.
Non-Final Office Action received for U.S. Appl. No. 16/830,838, dated Jun. 9, 2022, 17 pages.
Non-Final Office Action received for U.S. Appl. No. 17/026,818, dated Nov. 25, 2020, 20 pages.
Non-Final Office Action received for U.S. Appl. No. 17/027,373, dated Feb. 2, 2022, 17 pages.
Non-Final Office Action received for U.S. Appl. No. 17/028,176, dated Aug. 25, 2021, 20 pages.
Non-Final Office Action received for U.S. Appl. No. 17/028,176, dated Jul. 14, 2022, 23 pages.
Non-Final Office Action received for U.S. Appl. No. 17/116,938, dated Aug. 1, 2022, 15 pages.
Non-Final Office Action received for U.S. Appl. No. 17/116,938, dated Jul. 30, 2021, 19 pages.
Non-Final Office Action received for U.S. Appl. No. 17/223,794, dated Jun. 16, 2021, 32 pages.
Non-Final Office Action received for U.S. Appl. No. 17/337,110, dated Jun. 20, 2022, 30 pages.
Non-Final Office Action received for U.S. Appl. No. 17/476,404, dated Feb. 8, 2022, 26 pages.
Non-Final Office Action received for U.S. Appl. No. 17/476,404, dated Sep. 14, 2022, 31 pages.
Non-Final Office Action received for U.S. Appl. No. 17/742,273, dated Dec. 7, 2022, 47 pages.
Non-Final Office Action received for U.S. Appl. No. 16/143,379, dated Mar. 14, 2019, 10 pages.
Notice of Acceptance received for Australian Patent Application No. 2020217458, dated Sep. 7, 2022, 3 pages.
Notice of Acceptance received for Australian Patent Application No. 2020239711, dated Dec. 16, 2021, 3 pages.
Notice of Acceptance received for Australian Patent Application No. 2020257092, dated Aug. 27, 2021, 3 pages.
Notice of Acceptance received for Australian Patent Application No. 2021201403, dated Oct. 22, 2021, 3 pages.
Notice of Allowance received for Australian Patent Application No. 2017286129, dated Dec. 10, 2018, 3 pages.
Notice of Allowance received for Chinese Patent Application No. 201710493025.3, dated May 7, 2021, 6 pages.
Notice of Allowance received for Chinese Patent Apptication No. 201810730279.7, dated Nov. 5, 2020, 2 pages.
Notice of Allowance received for Chinese Patent Apptication No. 201811151702.4, dated Jul. 6, 2020, 6 pages.
Notice of Allowance received for Chinese Patent Apptication No. 201811152097.2, dated Oct. 28, 2019, 6 pages.
Notice of Allowance received for Chinese Patent Apptication No. 202010742019.9, dated Jul. 6, 2021, 7 pages.
Notice of Allowance received for Chinese Patent Apptication No. 202011336156.9, dated Jan. 6, 2022, 3 pages.
Notice of Allowance received for Chinese Patent Apptication No. 202011450203.2, dated Sep. 30, 2022, 4 pages.
Notice of Allowance received for Chinese Patent Apptication No. 202110248576.X, dated Mar. 21, 2022, 2 pages.
Notice of Allowance received for Chinese Patent Apptication No. 202110818370.6, dated Sep. 2, 2022, 7 pages.
Notice of Allowance received for Japanese Patent Application No. 2018-562659, dated Jul. 30, 2021, 4 pages.
Notice of Allowance received for Japanese Patent Applicatton No. 2020-159840, dated Jul. 8, 2022, 4 pages.
Notice of Allowance received for Japanese Patent Applicatton No. 2020-558885, dated Jul. 26, 2021, 4 pages.
Notice of Allowance received for Japanese Patent Application No. 2020-560927, dated May 30, 2022, 3 pages.
Notice of Allowance received for Japanese Patent Applicatton No. 2021-026630, dated Jan. 7, 2022, 4 pages.
Notice of Allowance received for Korean Patent Application No. 10-2018-7034909, dated Sep. 30, 2019, 4 pages.
Notice of Allowance received for Korean Patent Application No. 10-2019-7038093, dated Aug. 10, 2020, 5 pages.
Notice of Allowance received for Korean Patent Application No. 10-2020-0123805, dated Jun. 19, 2022, 5 pages.
Notice of Allowance received for Korean Patent Application No. 10-2020-7031319, dated Apr. 6, 2021, 5 pages.
Notice of Allowance received for Korean Patent Application No. 10-2020-7031700, dated Apr. 21, 2021, 4 pages.
Notice of Allowance received for Korean Patent Application No. 10-2020-7032488, dated Jun. 16, 2021, 4 pages.
Notice of Allowance received for Korean Patent Application No. 10-2021-7021047, dated Dec. 6, 2021, 3 pages.
Notice of Allowance received for Korean Patent Application No. 10-2021-7022610, dated Oct. 13, 2021, 3 pages.
Notice of Allowance received for Korean Patent Application No. 10-2022-0091730, dated Oct. 4, 2022, 5 pages.
Notice of Allowance received for Korean Patent Application No. 10-2022-7014651, dated Aug. 18, 2022, 5 pages.
Notice of Allowance received for Korean Patent Application No. 10-2022-7014651, dated Nov. 25, 2022, 7 pages.
Notice of Allowance received for U.S. Appl. No. 15/427,516, dated Mar. 4, 2019, 7 pages.
Notice of Allowance received for U.S. Appl. No. 16/143,379, dated Jan. 29, 2020, 5 pages.
Notice of Allowance received for U.S. Appl. No. 16/404,605, dated Sep. 18, 2020, 5 pages.
Notice of Allowance received for U.S. Appl. No. 16/404,612, dated Jul. 13, 2020, 6 pages.
Notice of Allowance received for U.S. Appl. No. 16/404,612, dated Aug. 7, 2019, 9 pages.
Notice of Allowance received for U.S. Appl. No. 16/584,743, dated Aug. 7, 2020, 8 pages.
Notice of Allowance received for U.S. Appl. No. 16/584,743, dated Nov. 16, 2020, 7 pages.
Notice of Allowance received for U.S. Appl. No. 16/586,002, dated Jun. 9, 2020, 5 pages.
Notice of Allowance received for U.S. Appl. No. 16/817,328, dated Apr. 18, 2022, 8 pages.
Notice of Allowance received for U.S. Appl. No. 16/817,328, dated Feb. 16, 2022, 9 pages.
Notice of Allowance received for U.S. Appl. No. 17/026,818, dated May 13, 2021, 10 pages.
Notice of Allowance received for U.S. Appl. No. 17/027,373, dated Aug. 2, 2022, 2 pages.

(56) References Cited

OTHER PUBLICATIONS

Notice of Allowance received for U.S. Appl. No. 17/027,373, dated Jun. 3, 2022, 8 pages.
Notice of Allowance received for U.S. Appl. No. 17/027,373, dated Oct. 3, 2022, 5 pages.
Notice of Allowance received for U.S. Appl. No. 17/337,110, dated Oct. 11, 2022, 11 pages.
Notice of Allowance received for U.S. Appl. No. 16/143,379, dated Jun. 26, 2019, 5 Pages.
Notice of Allowance received for U.S. Appl. No. 16/143,379, dated Sep. 25, 2019, 5 pages.
Notice of Allowance Received for U.S. Appl. No. 11/462,696, dated Apr. 2, 2012, 18 pages.
Office Action received for Australian Patent Application No. 2017100666, dated Jul. 27, 2017, 4 pages.
Office Action received for Australian Patent Application No. 2017286129, dated Oct. 18, 2018, 3 Pages.
Office Action received for Australian Patent Application No. 2019100487, dated Aug. 16, 2019, 5 pages.
Office Action received for Australian Patent Application No. 2019100523, dated Jan. 23, 2020, 3 pages.
Office Action received for Australian Patent Application No. 2019100523, dated Mar. 2, 2020, 3 pages.
Office Action received for Australian Patent Application No. 2019100523, dated Sep. 2, 2019, 3 pages.
Office Action received for Australian Patent Application No. 2019201853, dated Apr. 23, 2020, 5 pages.
Action received for Australian Patent Application No. 2019201853, dated Aug. 10, 2020, 4 pages.
Action received for Australian Patent Application No. 2019201853, dated Aug. 16, 2019, 5 pages.
Action received for Australian Patent Application No. 2019201853, dated Dec. 9, 2019, 5 pages.
Action received for Australian Patent Application No. 2020100886, dated Aug. 5, 2020, 6 pages.
Action received for Australian Patent Application No. 2020217458, dated Aug. 2, 2022, 4 pages.
Action received for Australian Patent Application No. 2020217458, dated May 10, 2022, 3 pages.
Action received for Australian Patent Application No. 2020217458, dated Sep. 2, 2021, 6 pages.
Action received for Australian Patent Application No. 2020239711, dated Sep. 13, 2021, 5 pages.
Action received for Australian Patent Application No. 2020257092, dated Mar. 3, 2021, 7 pages.
Action received for Australian Patent Application No. 2020257092, dated Nov. 30, 2020, 6 pages.
Action received for Australian Patent Application No. 2021100721, dated Jun. 4, 2021, 7 pages.
Action received for Australian Patent Application No. 2021100721, dated Oct. 18, 2021, 4 pages.
Action received for Australian Patent Application No. 2021201403, dated Mar. 16, 2021, 3 pages.
Action received for Australian Patent Application No. 2021261941, dated Nov. 3, 2022, 3 pages.
Action received for Chinese Patent Application No. 201710493025.3, dated Dec. 6, 2019, 11 pages.
Action received for Chinese Patent Application No. 201710493025.3, dated Jan. 6, 2021, 17 pages.
Action received for Chinese Patent Application No. 201710493025.3, dated Jul. 10, 2020, 17 pages.
Action received for Chinese Patent Application No. 201710493025.3, dated Sep. 19, 2017, 2 pages.
Office Action received for Chinese Patent Application No. 201810730279.7, dated Jul. 6, 2020, 7 pages.
Office Action received for Chinese Patent Application No. 201810730279.7, dated Mar. 4, 2020, 14 pages.
Office Action received for Chinese Patent Application No. 201810730279.7, dated May 7, 2019, 15 pages.
Office Action received for Chinese Patent Application No. 201810730279.7, dated Nov. 5, 2019, 14 pages.
Office Action received for Chinese Patent Application No. 201811151702.4, dated Mar. 4, 2020, 13 pages.
Office Action received for Chinese Patent Application No. 201811151702.4, dated May 7, 2019, 16 pages.
Office Action received for Chinese Patent Application No. 201811151702.4, dated Oct. 9, 2019, 11 pages.
Office Action received for Chinese Patent Application No. 201811152097.2, dated May 7, 2019, 18 pages.
Office Action received for Chinese Patent Application No. 201811152726.1, dated Apr. 22, 2019, 15 pages.
Office Action received for Chinese Patent Application No. 201811152726.1, dated Apr. 28, 2021, 14 pages.
Office Action received for Chinese Patent Application No. 201811152726.1, dated Jan. 28, 2021, 13 pages.
Office Action received for Chinese Patent Application No. 201811152726.1, dated Mar. 18, 2020, 12 pages.
Office Action received for Chinese Patent Application No. 201811152726.1, dated Oct. 24, 2019, 14 pages.
Office Action received for Chinese Patent Application No. 201811152726.1, dated Oct. 29, 2020, 12 pages.
Office Action received for Chinese Patent Application No. 202010742019.9, dated Feb. 3, 2021, 17 pages.
Office Action received for Chinese Patent Application No. 202011336156.9, dated May 20, 2021, 13 pages.
Office Action received for Chinese Patent Application No. 202011450203.2, dated Apr. 20, 2022, 9 pages.
Office Action received for Chinese Patent Application No. 202011450203.2, dated Sep. 1, 2021, 12 pages.
Action received for Chinese Patent Application No. 202110235995.X, dated Mar. 22, 2022, 17 pages.
Action received for Chinese Patent Application No. 202110235995.X, dated Sep. 30, 2022, 13 pages.
Action received for Chinese Patent Application No. 202110248576.X, dated Sep. 15, 2021, 28 pages.
Action received for Chinese Patent Application No. 202110818370.6, dated Jun. 22, 2022, 7 pages.
Action received for Chinese Patent Application No. 202110818370.6, dated Mar. 2, 2022, 13 pages.
Action received for Chinese Patent Application No. 202110819254.6, dated May 16, 2022, 16 pages.
Action received for Chinese Patent Application No. 202110819254.6, dated Sep. 15, 2022, 13 pages.
Action received for Chinese Patent Application No. 202111652452.4, dated Aug. 29, 2022, 23 pages.
Action Received for Danish Patent Application No. PA201670601, dated Apr. 10, 2018, 3 pages.
Action received for Danish Patent Application No. PA201670601, dated Aug. 9, 2018, 2 pages.
Action Received for Danish Patent Application No. PA201670601, dated Dec. 11, 2018, 3 pages.
Action Received for Danish Patent Application No. PA201670601, dated Feb. 6, 2017, 5 pages.
Action Received for Danish Patent Application No. PA201670601, dated Oct. 21, 2016, 9 pages.
Action Received for Danish Patent Application No. PA201670601, dated Sep. 26, 2017, 3 pages.
Action received for Danish Patent Application No. PA201670602, dated Apr. 16, 2018, 3 pages.
Action received for Danish Patent Application No. PA201670602, dated Feb. 9, 2017, 3 pages.
Action received for Danish Patent Application No. PA201670602, dated Oct. 25, 2016, 9 pages.
Action received for Danish Patent Application No. PA201670602, dated Sep. 26, 2017, 3 pages.
Office Action received for Danish Patent Application No. PA201670603, dated Nov. 1, 2016, 9 pages.
Office Action received for Danish Patent Application No. PA201670604, dated Feb. 19, 2018, 3 pages.
Office Action received for Danish Patent Application No. PA201670604, dated Jun. 9, 2017, 3 pages.

(56) References Cited

OTHER PUBLICATIONS

Office Action received for Danish Patent Application No. PA201670604, dated Nov. 8, 2016, 8 pages.
Office Action received for Danish Patent Application No. PA201670605, dated Apr. 9, 2018, 2 pages.
Office Action received for Danish Patent Application No. PA201670605, dated Feb. 19, 2018, 2 pages.
Office Action received for Danish Patent Application No. PA201670605, dated Jun. 13, 2017, 4 pages.
Office Action received for Danish Patent Application No. PA201670605, dated Nov. 14, 2016, 8 pages.
Office Action received for Danish Patent Application No. PA201870293, dated Jul. 17, 2018, 2 pages.
Office Action received for Danish Patent Application No. PA201870293, dated Jun. 19, 2018, 8 pages.
Office Action received for Danish Patent Application No. PA201870435, dated Feb. 6, 2020, 3 pages.
Office Action received for Danish Patent Application No. PA201870435, dated May 2, 2019, 3 pages.
Office Action received for Danish Patent Application No. PA201870435, dated May 25, 2020, 3 pages.
Office Action received for Danish Patent Application No. PA202070617, dated Sep. 24, 2021, 4 pages.
Office Action received for Danish Patent Application No. PA202070627, dated Oct. 19, 2021, 3 pages.
Office Action received for European Patent Application No. 17813777.4, dated Jan. 3, 2020, 5 pages.
Office Action received for European Patent Application No. 19182037.2, dated Jun. 16, 2020, 6 pages.
Office Action received for European Patent Application No. 19728558.8, dated Jun. 21, 2021, 9 pages.
Office Action received for European Patent Application No. 20187610.9, dated May 21, 2021, 7 pages.
Office Action received for European Patent Application No. 20719301.2, dated Feb. 21, 2022, 9 pages.
Office Action received for European Patent Application No. 20719301.2, dated Jan. 28, 2021, 15 pages.
Office Action received for European Patent Application No. 21160991.2, dated Mar. 24, 2022, 11 pages.
Office Action received for European Patent Application No. 21161005.0, dated Apr. 22, 2022, 11 pages.
Office Action received for Indian Patent Application No. 202014041529, dated Dec. 6, 2021, 6 pages.
Office Action received for Indian Patent Application No. 202118046028, dated Apr. 6, 2022, 6 pages.
Office Action received for Japanese Patent Application No. 2018-562659, dated Dec. 6, 2019, 7 pages.
Office Action received for Japanese Patent Application No. 2018-562659, dated Jul. 26, 2019, 9 pages.
Office Action received for Japanese Patent Application No. 2018-562659, dated Mar. 12, 2021, 79 pages.
Office Action received for Japanese Patent Application No. 2018-562659, dated May 28, 2020, 5 pages.
Office Action received for Japanese Patent Application No. 2020-047952, dated Aug. 27, 2021, 13 pages.
Office Action received for Japanese Patent Application No. 2020-047952, dated Feb. 8, 2021, 6 pages.
Office Action received for Japanese Patent Application No. 2020-047952, dated Jul. 1, 2022, 8 pages.
Office Action received for Japanese Patent Application No. 2020-159840, dated Dec. 10, 2021, 13 pages.
Office Action received for Japanese Patent Application No. 2020-159840, dated Mar. 28, 2022, 6 pages.
Office Action received for Japanese Patent Application No. 2020-560927, dated Dec. 1, 2021, 3 pages.
Office Action received for Japanese Patent Application No. 2020-560927, dated Jun. 10, 2021, 5 pages.
Office Action received for Japanese Patent Application No. 2021-026630, dated Aug. 20, 2021, 7 pages.
Office Action received for Japanese Patent Application No. 2021-051415, dated Jul. 19, 2021, 4 pages.
Office Action received for Korean Patent Application No. 10-2019-7038093, dated Feb. 13, 2020, 11 pages.
Office Action received for Korean Patent Application No. 10-2020-7031319, dated Dec. 8, 2020, 14 pages.
Office Action received for Korean Patent Application No. 10-2020-7031700, dated Dec. 15, 2020, 6 pages.
Office Action received for Korean Patent Application No. 10-2020-7032488, dated Feb. 9, 2021, 11 pages.
Office Action received for Korean Patent Application No. 10-2021-7021047, dated Aug. 13, 2021, 5 pages.
Office Action received for Korean Patent Application No. 10-2021-7029861, dated Jan. 25, 2022, 11 pages.
Office Action received for Korean Patent Application No. 10-2021-7029861, dated Nov. 1, 2022, 7 pages.
Result of Consultation received for European Patent Application No. 19182037.2, dated Mar. 22, 2021, 5 pages.
Result of Consultation received for European Patent Application No. 19728558.8, dated Jun. 28, 2022, 4 pages.
Result of Consultation received for European Patent Application No. 20187610.9, dated Jun. 1, 2022, 3 pages.
Reviewdork, "Linksys Smart Wifi App Linksys Wireless Router Setup and Tutorial Android or Iphone)", Online Available at: https://www.youtube.com/watch?v=UjJUq1g1738, Feb. 13, 2017, 3 pages.
Ring, "Using the Motion Detection Control to Completely Disable Recording", Online available at: https://support.ring.com/hc/en-us/articles/360021797252-Using-the-Motion-Detection-Control-to-Completely-Disable-Recording, Retrieved on May 4, 2021, 4 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870435, dated Oct. 26, 2018, 9 pages.
Search Report and Opinion received for Danish Patent Application No. PA202070617, dated Dec. 23, 2020, 8 pages.
Search Report and Opinion received for Danish Patent Application No. PA202070627, dated Jan. 26, 2021, 9 pages.
Search Report and Opinion received for Danish Patent Application No. PA202270086, dated Apr. 7, 2022, 11 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
SolarWinds Network Configuration Manager Administrator Guide, Available online at:—https://web.archive.org/web/20141031133207/http://www.solarwinds.com/documentation/orionNCM/docs/OrionNCMAdministratorGuide.pdf, Oct. 31, 2014, 466 pages.
Spectrum, "Using the Picture-in-Picture PIP) Feature _ Spectrum Support", Online available at:—https://www.spectrum.net/support/tv/dvr-picture-picture/, 2 pages.
Steve Does, "Arlo's New App with new Feature + Giveaway)", Available online at: https://www.youtube.com/watch?v=jiyWEYCH1BA, Sep. 5, 2019, 5 pages.
Summons to Attend Oral Proceedings received for European Patent Application No. 17813777.4, dated Jun. 18, 2020, 8 pages.
Summons to Attend Oral Proceedings received for European Patent Application No. 19182037.2, dated Nov. 24, 2020, 12 pages.
Summons to Attend Oral Proceedings received for European Patent Application No. 19728558.8, dated Jan. 18, 2022, 9 pages.
Summons to Attend Oral Proceedings received for European Patent Application No. 20187610.9, dated Dec. 16, 2021, 12 pages.
Summons to Attend Oral Proceedings received for European Patent Application No. 20187610.9, dated Jan. 27, 2022, 2 pages.
Summons to Attend Oral Proceedings received for European Patent Application No. 21160991.2, dated Oct. 19, 2022, 10 pages.
Summons to Attend Oral Proceedings received for European Patent Application No. 21161005.0, dated Dec. 13, 2022, 9 pages.
Supplemental Notice of Allowance received for U.S. Appl. No. 16/584,743, dated Nov. 25, 2020, 2 pages.

(56) References Cited

OTHER PUBLICATIONS

Advisory Action received for U.S. Appl. No. 16/830,838, dated Oct. 10, 2023, 5 pages.
Applicant-Initiated Interview Summary received for U.S. Appl. No. 16/830,838, dated Dec. 16, 2022, 2 pages.
Applicant-Initiated Interview Summary received for U.S. Appl. No. 16/830,838, dated Jun. 1, 2023, 2 pages.
Applicant-Initiated Interview Summary received for U.S. Appl. No. 16/830,838, dated Sep. 22, 2023, 2 pages.
Applicant-Initiated Interview Summary received for U.S. Appl. No. 17/464,477, dated May 26, 2023, 2 pages.
Applicant-Initiated Interview Summary received for U.S. Appl. No. 17/476,404, dated Dec. 20, 2022, 2 pages.
Applicant-Initiated Interview Summary received for U.S. Appl. No. 17/476,404, dated Jun. 2, 2023, 2 pages.
Applicant-Initiated Interview Summary received for U.S. Appl. No. 17/476,404, dated Oct. 31, 2023, 4 pages.
Applicant-Initiated Interview Summary received for U.S. Appl. No. 17/742,273, dated Jan. 18, 2023, 4 pages.
Applicant-Initiated Interview Summary received for U.S. Appl. No. 17/742,273, dated Mar. 30, 2023, 5 pages.
Applicant-Initiated Interview Summary received for U.S. Appl. No. 17/742,273, dated Sep. 27, 2023, 4 pages.
Applicant-Initiated Interview Summary received for U.S. Appl. No. 17/992,229, dated Aug. 28, 2023, 3 pages.
Corrected Notice of Allowance received for U.S. Appl. No. 17/019,845, dated Aug. 7, 2023, 4 pages.
Corrected Notice of Allowance received for U.S. Appl. No. 17/028,176, dated Mar. 6, 2023, 3 pages.
Corrected Notice of Allowance received for U.S. Appl. No. 17/337,110, dated Jan. 19, 2023, 7 pages.
Corrected Notice of Allowance received for U.S. Appl. No. 18/111,484, dated Nov. 8, 2023, 7 pages.
Examiner's Answer to Appeat Brief received for U.S. Appl. No. 17/116,938, dated Oct. 31, 2023, 55 pages.
Examiner's Pre-Review Report received for Japanese Patent Application No. 2020-047952, dated Dec. 13, 2022, 10 pages (5 pages of English Translation and 5 pages of Official Copy).
Extended European Search Report received for European Patent Application No. 22196865.4, dated Jan. 13, 2023, 7 pages.
Final Office Action received for U.S. Appl. No. 16/830,838, dated Jun. 26, 2023, 16 pages.
Final Office Action received for U.S. Appl. No. 17/476,404, dated Sep. 12, 2023, 30 pages.
Final Office Action received for U.S. Appl. No. 12/742,273, dated Feb. 15, 2023, 56 pages.
Final Office Action received for U.S. Appl. No. 17/174,273, dated Oct. 12, 2023, 58 pages.
Final Office Action received for U.S. Appl. No. 17/992,229, dated Sep. 25, 2023, 16 pages.
Intention to Grant received for European Patent Application No. 21728781.2, dated Jul. 28, 2023, 9 pages.
International Preliminary Report on Patentability received for PCT Patent Application No. PCT/US2021/035715, dated Dec. 15, 2022, 14 pages.
International Preliminary Report on Patentability received for PCT Patent Application No. PCT/US2021/046861, dated Mar. 16, 2023, 8 pages.
Non-Final Office Action received for U.S. Appl. No. 16/830,838, dated Mar. 30, 2023, 16 pages.
Non-Final Office Action received for U.S. Appl. No. 17/464,477, dated Mar. 10, 2023, 21 pages.
Non-Final Office Action received for U.S. Appl. No. 17/476,404, dated Mar. 30, 2023, 29 pages.
Non-Final Office Action received for U.S. Appl. No. 17/742,273, dated Sep. 13, 2023, 58 pages.
Non-Final Office Action received for U.S. Appl. No. 17/746,789, dated Jun. 22, 2023, 8 pages.
Non-Final Office Action received for U.S. Appl. No. 17/992,229, dated Jul. 13, 2023, 14 pages.
Non-Final Office Action received for U.S. Appl. No. 18/111,484, dated Aug. 2, 2023, 8 pages.
Notice of Acceptance received for Australian Patent Application No. 2021261941, dated Mar. 15, 2023, 3 pages.
Notice of Acceptance received for Australian Patent Application No. 2022201532, dated May 22, 2023, 3 pages.
Notice of Allowance received for Chinese Patent Application No. 202110819254.6, dated Dec. 27, 2022, 4 pages (1 page of English Translation and 3 pages of Official Copy).
Notice of Allowance received for Chinese Patent Application No. 202210646482.2, dated Sep. 2, 2023, 2 pages (1 page of English Translation and 1 page of Official Copy).
Notice of Allowance received for Japanese Patent Application No. 2020-047952, dated Jun. 26, 2023, 25 pages (1 page of English Translation and 24 pages of Official Copy).
Notice of Allowance received for Japanese Patent Application No. 2022-014389, dated Jan. 27, 2023, 4 pages (1 page of English Translation and 3 pages of Official Copy).
Notice of Allowance received for Japanese Patent Application No. 2022-016138, dated Sep. 25, 2023, 3 pages (1 page of English Translation and 2 pages of Official Copy).
Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2021-7029861, dated Jan. 4, 2023, (2pages of English Translation & 5 pages of Official Copy).
Notice of Allowance received for Korean Patent Application No. 10-2022-7001332, dated Oct. 25, 2023, 7 pages (2 pages of English Translation and 5 pages of Official Copy).
Notice of Allowance received for Korean Patent Application No. 10-2022-7040554, dated Sep. 26, 2023, 7 pages (2 pages of English Translation and 5 pages of Official Copy).
Notice of Allowance received for U.S. Appl. No. 17/019,845, dated Jun. 5, 2023, 10 pages.
Notice of Allowance received for U.S. Appl. No. 17/028,176, dated Jan. 19, 2023, 9 pages.
Notice of Allowance received for U.S. Appl. No. 17/464,477, dated Jul. 25, 2023, 5 pages.
Notice of Allowance received for U.S. Appl. No. 17/746,89, dated Aug. 9, 2023, 7 pages.
Notice of Allowance received for U.S. Appl. No. 18/111,484, dated Oct. 24, 2023, 10 pages.
Notice of Reasons for Refusal received for Japanese Patent Application No. 2020-047952, dated Apr. 3, 2023, 4 pages (2 pages of English Translation and 2 pages of Official Copy).
Office Action received for Australian Patent Application No. 2022201532, dated Dec. 19, 2022, 5 pages.
Office Action received for Australian Patent Application No. 2022291522, dated Jul. 20, 2023, 3 pages.
Office Action received for Australian Patent Application No. 2022291522, dated Oct. 11, 2023, 2 pages.
Office Action received for Chinese Patent Application No. 202111652452.4, dated Feb. 11, 2023, 28 pages (13 pages of English Translation and 15 pages of Official Copy).
Office Action received for Chinese Patent Application No. 202111652452.4, dated May 19, 2023, 15 pages (8 pages of English Translation and 7 pages of Official Copy).
Office Action received for Chinese Patent Application No. 202210646482.2, dated Dec. 28, 2022, 17 pages (9 pages of English Translation and 8 pages of Official Copy).
Office Action received for European Patent Application No. 20719301.2, dated Jan. 24, 2023, 9 pages.
Office Action received for European Patent Application No. 20719301.2, dated Oct. 20, 2023, 11 pages.
Office Action received for European Patent Application No. 20746426.4, dated Aug. 17, 2023, 5 pages.
Office Action received for European Patent Application No. 21728781.2, dated Mar. 1, 2023, 13 pages.
Office Action received for Indian Patent Application No. 202215025360, dated Mar. 29, 2023, 5 pages.
Office Action received for Indian Patent Application No. 202215025361, dated Mar. 29, 2023, 6 pages.

(56) References Cited

OTHER PUBLICATIONS

Office Action received for Indian Patent Application No. 202215025363, dated Mar. 29, 2023, 6 pages.
Office Action received for Indian Patent Application No. 202215025364, dated Mar. 29, 2023, 6 pages.
Office Action received for Japanese Patent Application No. 2022-016138, dated Apr. 24, 2023, 9 pages (5 pages of English Translation and 4 pages of Official Copy).
Office Action received for Japanese Patent Application No. 2022-104306, dated Sep. 19, 2023, 4 pages (2 pages of English Translation and 2 pages of Official Copy).
Office Action received for Korean Patent Application No. 10-2022-7001332, dated Apr. 20, 2023, 8 pages (4 pages of English Translation and 4 pages of Official Copy).
Office Action received for Korean Patent Application No. 10-2022-7001521, dated Dec. 26, 2022, 13 pages (6 pages of English Translation and 7 pages of Official Copy).
Office Action received for Korean Patent Application No. 10-2022-7001521, dated Jun. 21, 2023, 10 pages (5 page of English Translation and 5 pages of Official Copy).
Office Action received for Korean Patent Application No. 10-2022-7040554, dated Jun. 20, 2023, 5 pages (2 pages of English Translation and 3 pages of Official Copy).
Office Action received for Korean Patent Application No. 10-2022-7044372, dated Aug. 21, 2023, 9 pages (4 pages of English Translation and 5 pages of Official Copy).
Intention to Grant received for European Patent Application No. 21728781.2, dated Dec. 12, 2023, 9 pages.
International Preliminary Report on Patentability received for PCT Patent Application No. PCT/US2022/029282, dated Nov. 30, 2023, 17 pages.
International Search Report and Written Opinion received for PCT Patent Application No. PCT/US2023/024279, dated Nov. 17, 2023, 20 pages.
Invitation to Pay Additional Fees and Partial International Search Report received for PCT Patent Application No. PCT/US2023/024279, dated Sep. 26, 2023, 12 pages.
Office Action received for Chinese Patent Application No. 202110817799.3, dated Oct. 26, 2023, 22 pages (13 pages of English Translation and 9 pages of Official Copy).
Notice of Allowance received for Chinese Patent Application No. 202210463449.6, mailed on Mar. 9, 2024, 2 pages (1 page of English Translation and 1 page of Official Copy).
Extended European Search Report received for European Patent Application No. 23203433.0, mailed on Feb. 7, 2024, 7 pages.
Applicant-Initiated Interview Summary received for U.S. Appl. No. 16/830,838, mailed on Mar. 11, 2024, 2 pages.
Applicant-Initiated Interview Summary received for U.S. Appl. No. 17/992,229. mailed on Mar. 11, 2024, 2 pages.
Decision to Grant received for European Patent Application No. 21728781.2, mailed on Feb. 8, 2024, 3 pages.
Extended European Search Report received for European Patent Application No. 23203414.0, mailed on Jan. 26, 2024, 10 pages.
Non-Final Office Action received for U.S. Appl. No. 16/830,838, mailed on Jan. 22, 2024, 17 pages.
Non-Final Office Action received for U.S. Appl. No. 17/970,417, mailed on Apr. 10, 2024. 16 pages.
Non-Final Office Action received for U.S. Appl. No. 17/992,229, mailed on Feb. 15, 2024, 17 pages.
Notice of Acceptance received for Australian Patent Application No. 2022291522, mailed on Jan. 31, 2024, 3 pages.
Notice of Allowance received for Japanese Patent Application No. 2022-155232, mailed on Feb. 26, 2024, 4 pages (1 page of English Translation and 3 pages of Official Copy).
Notice of Allowance received for Korean Patent Application No. 10-2022-7001521, mailed on Mar. 22, 2024, 7 pages (2 pages of English Translation and 5 pages of Official Copy).
Office Action received for Australian Patent Application No. 2022291522, mailed on Jan. 19, 2024, 2 pages.
Office Action received for Australian Patent Application No. 2023203357, mailed on Feb. 14, 2024, 3 pages.
Office Action received for Chinese Patent Application No. 202110817799.3, mailed on Feb. 22, 2024, 24 pages (15 pages of English Translation and 9 pages of Official Copy).
Office Action received for Japanese Patent Application No. 2023-022576, mailed on Feb. 26, 2024, 10 pages (5 pages of English Translation and 5 pages of Official Copy).
Office Action received for Japanese Patent Application No. 2023-028786, mailed on Mar. 22, 2024, 10 pages (5 pages of English Translation and 5 pages of Official Copy).
Office Action received for Korean Patent Application No. 10-2022-7044372, mailed on Feb. 13. 2024, 10 pages (4 pages of English Translation and 6 pages of Official Copy).
Final Office Action received for U.S. Appl. No. 16/830,838, mailed on Apr. 11, 2024, 17 pages.
Intention to Grant received for European Patent Application No. 20746426.4, mailed on Apr. 12, 2024, 9 pages.
Notice of Allowance received for U.S. Appl. No. 17/992,229, mailed on Apr. 17, 2024, 9 pages.
Extended European Search Report received for European Patent Application No. 23200934.0, mailed on Apr. 19, 2024, 11 pages.
Notice of Acceptance received for Australian Patent Application No. 2023204396, mailed on Apr. 15, 2024, 3 pages.

* cited by examiner

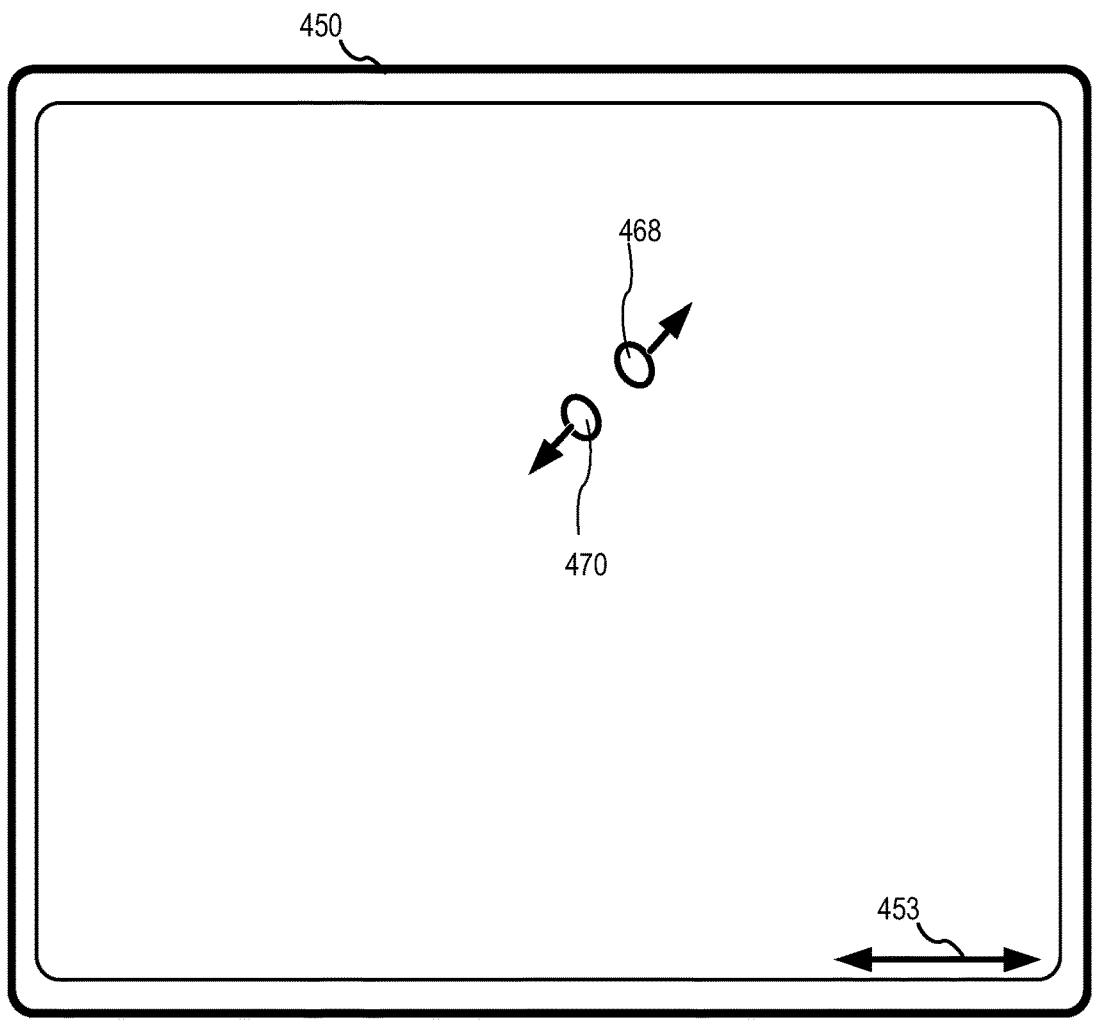
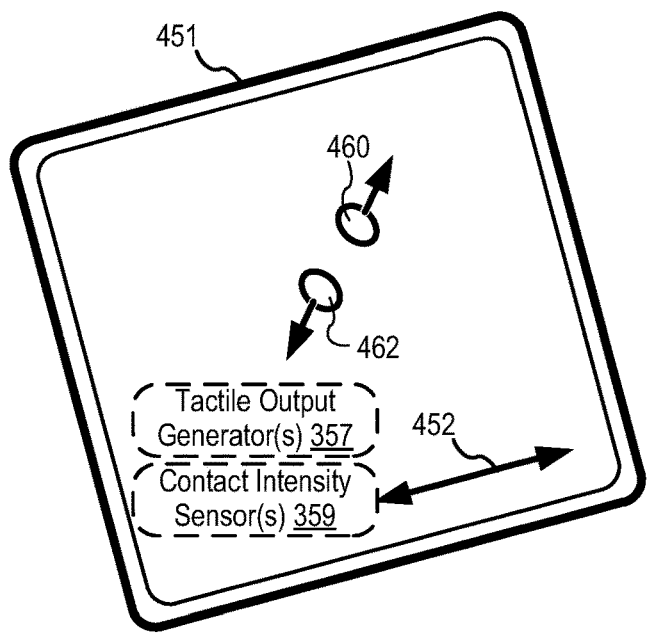
*FIG. 4B*

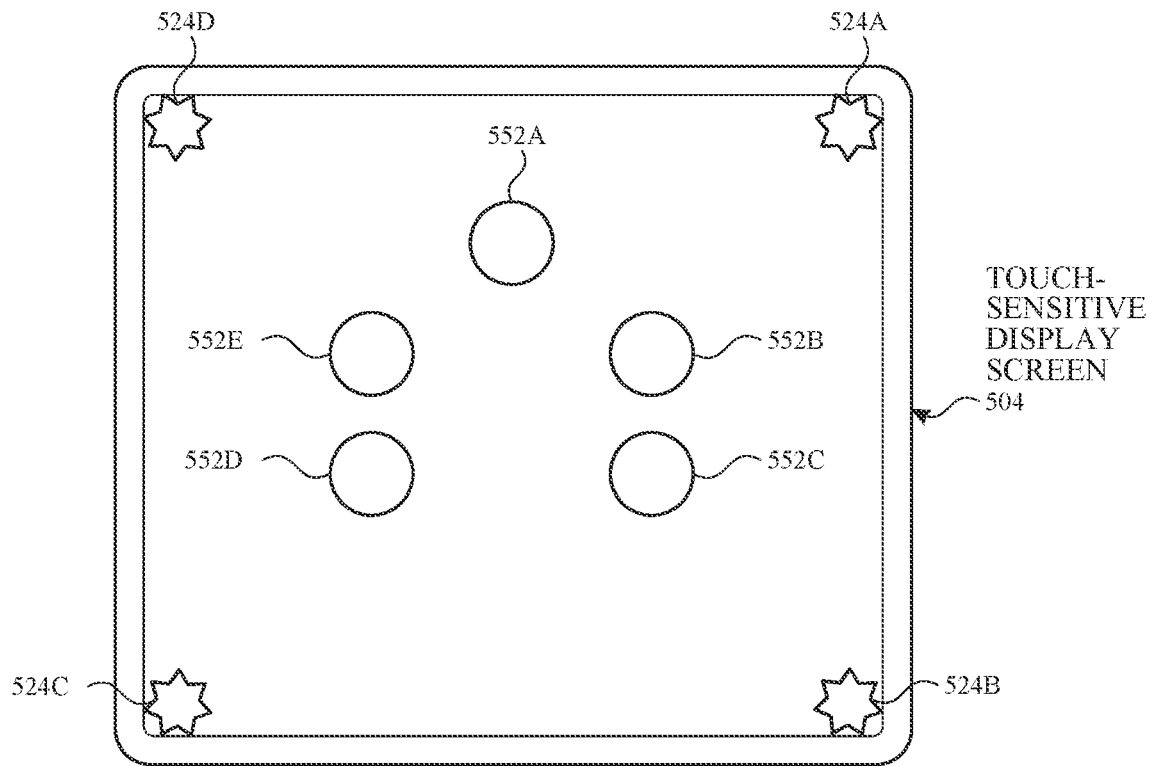
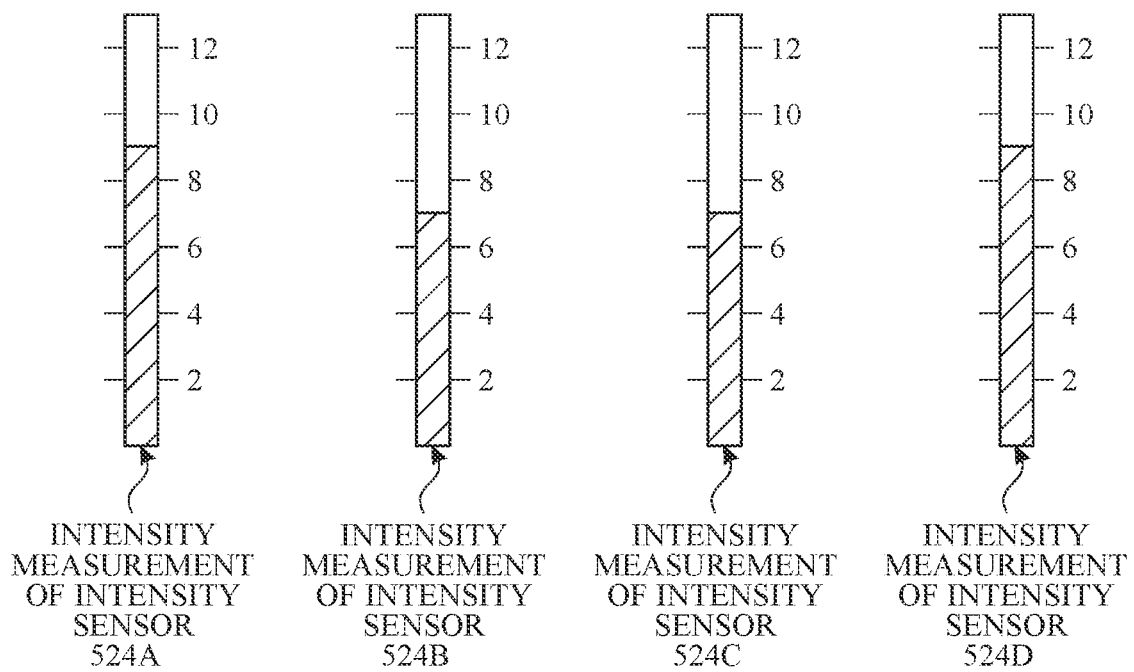
FIG. 5C

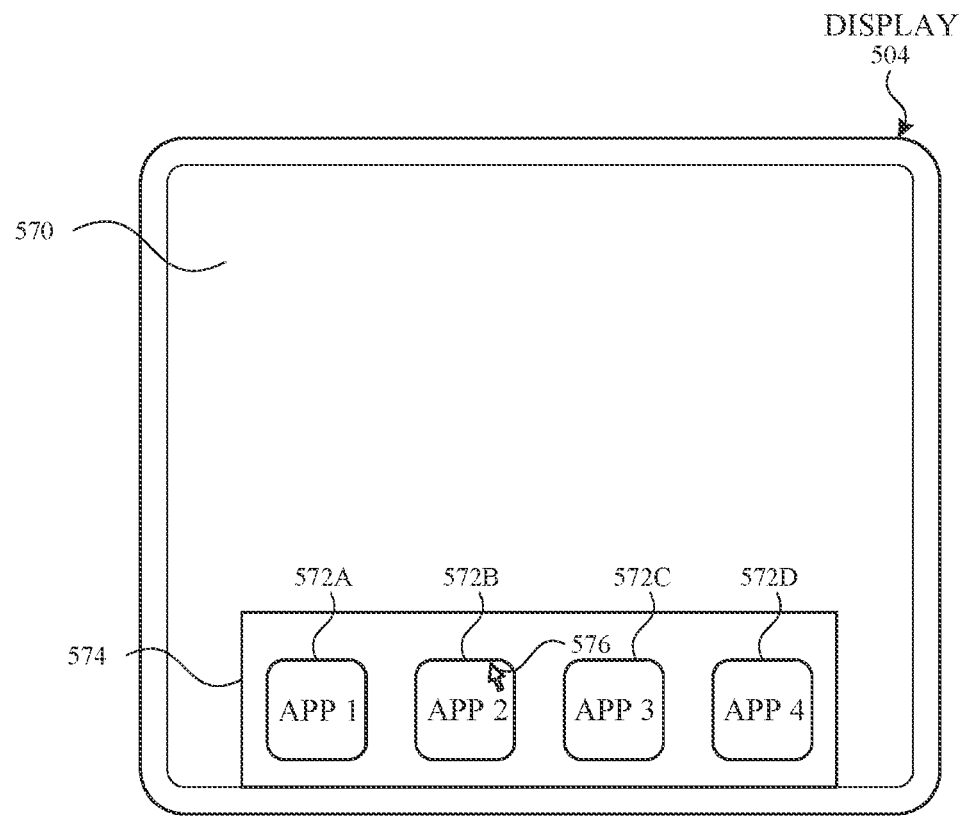
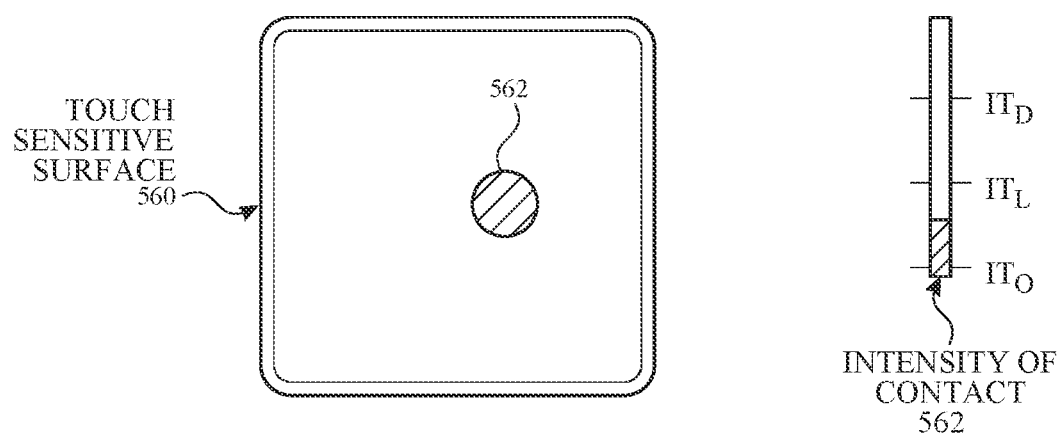
*FIG. 5E*

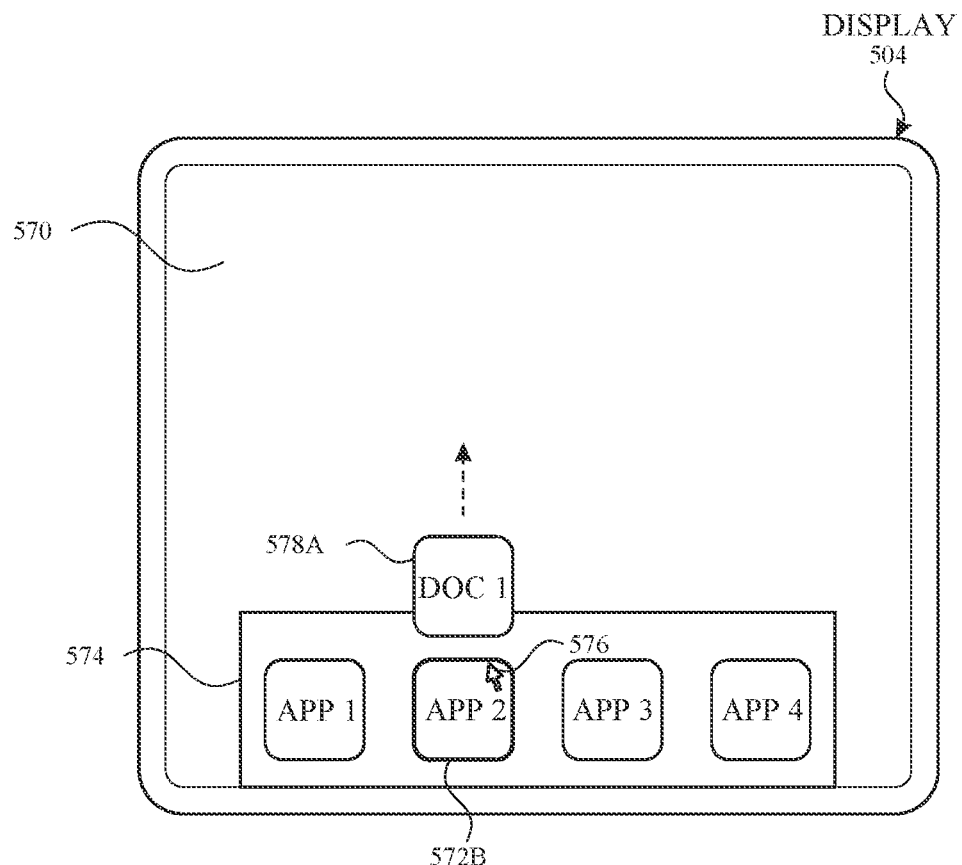
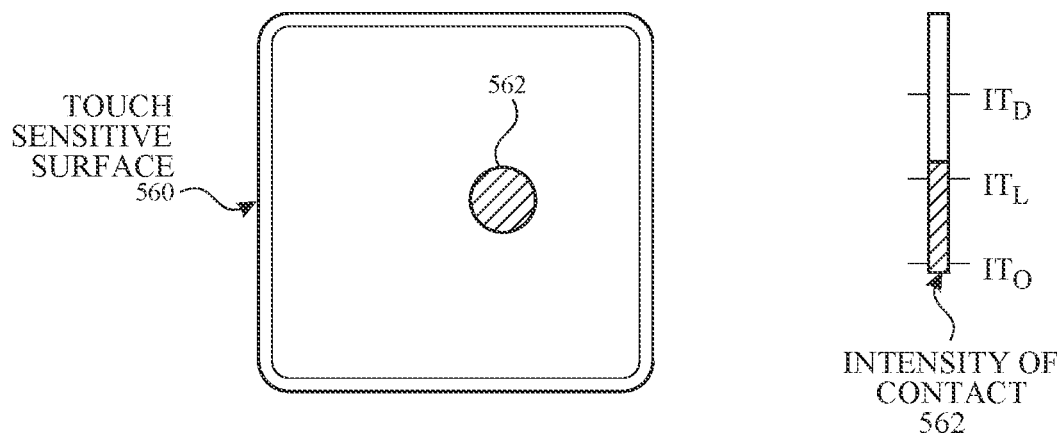
FIG. 5F

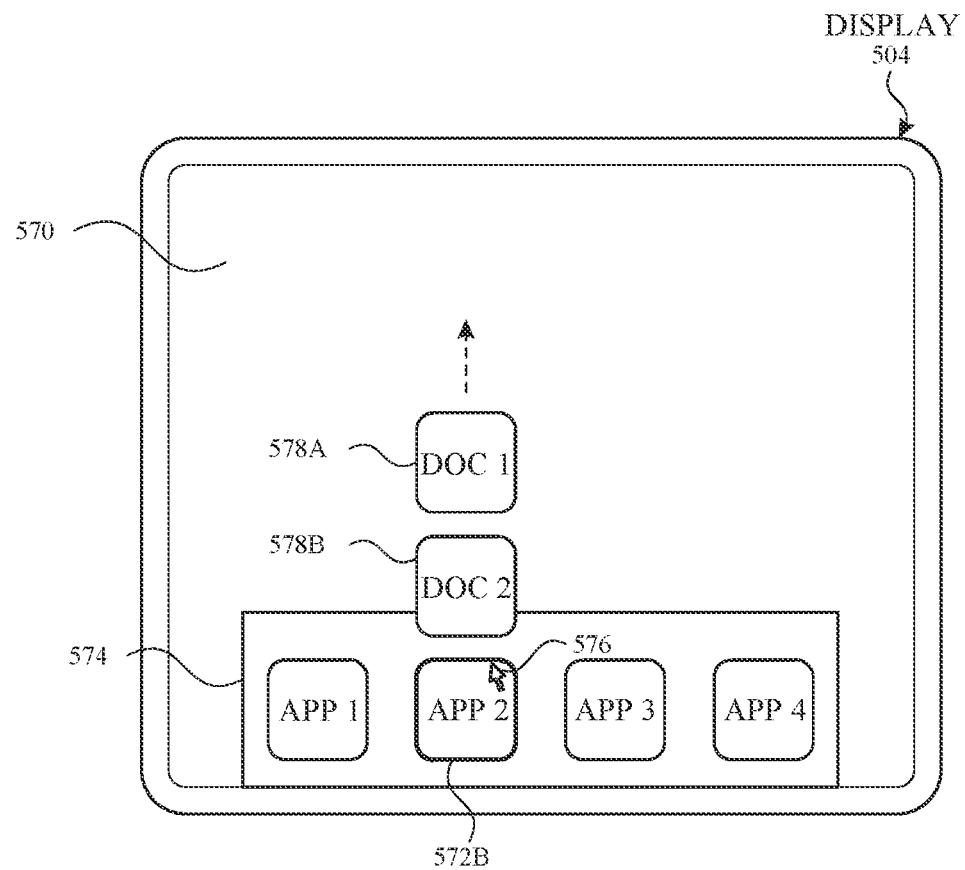
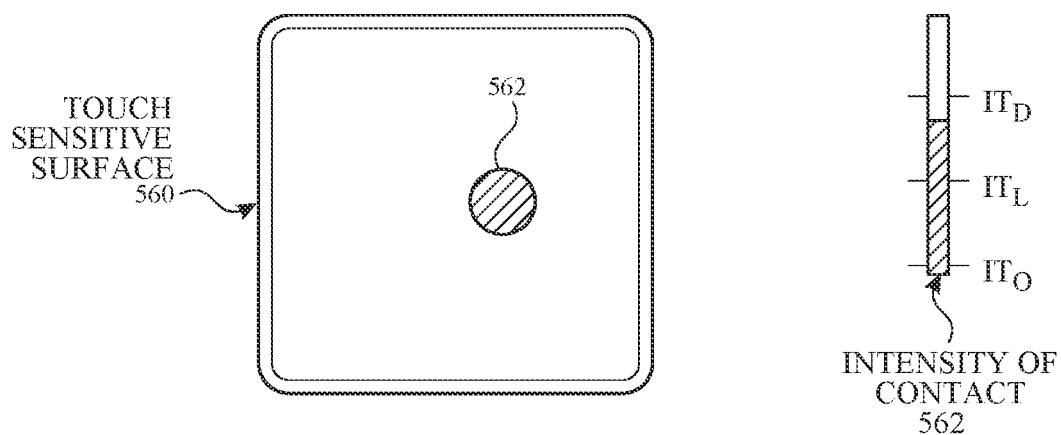
*FIG. 5G*

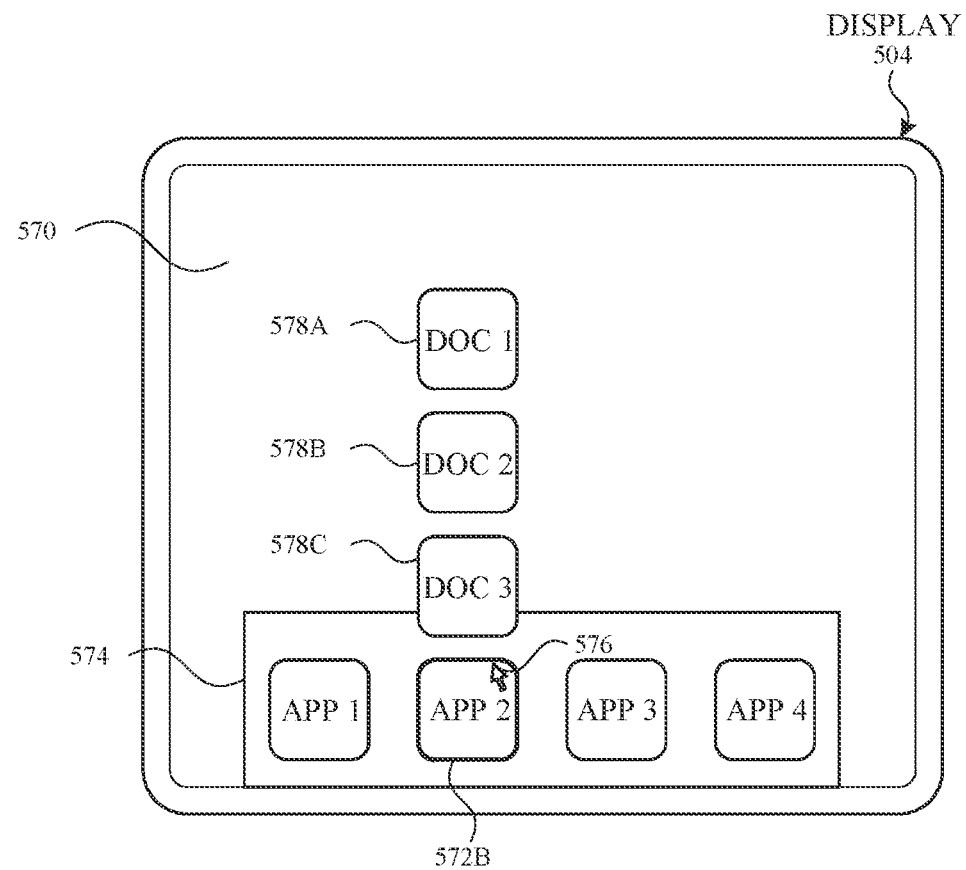
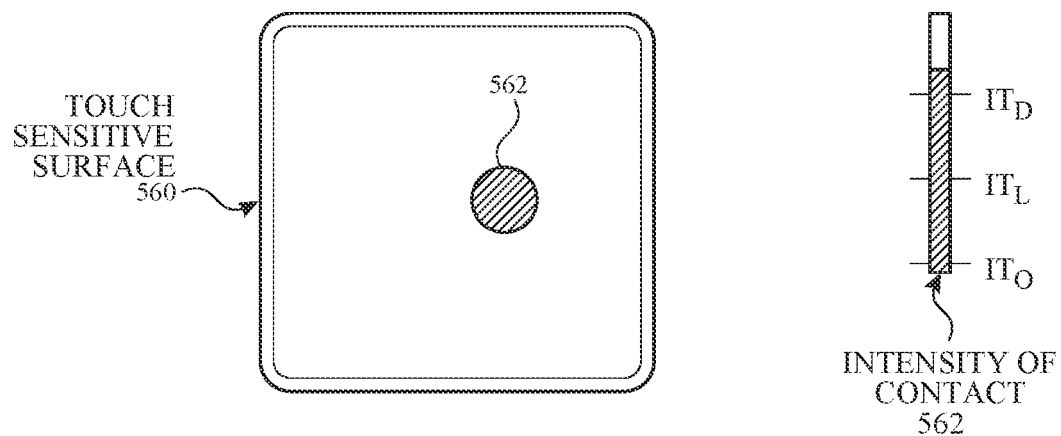
FIG. 5H

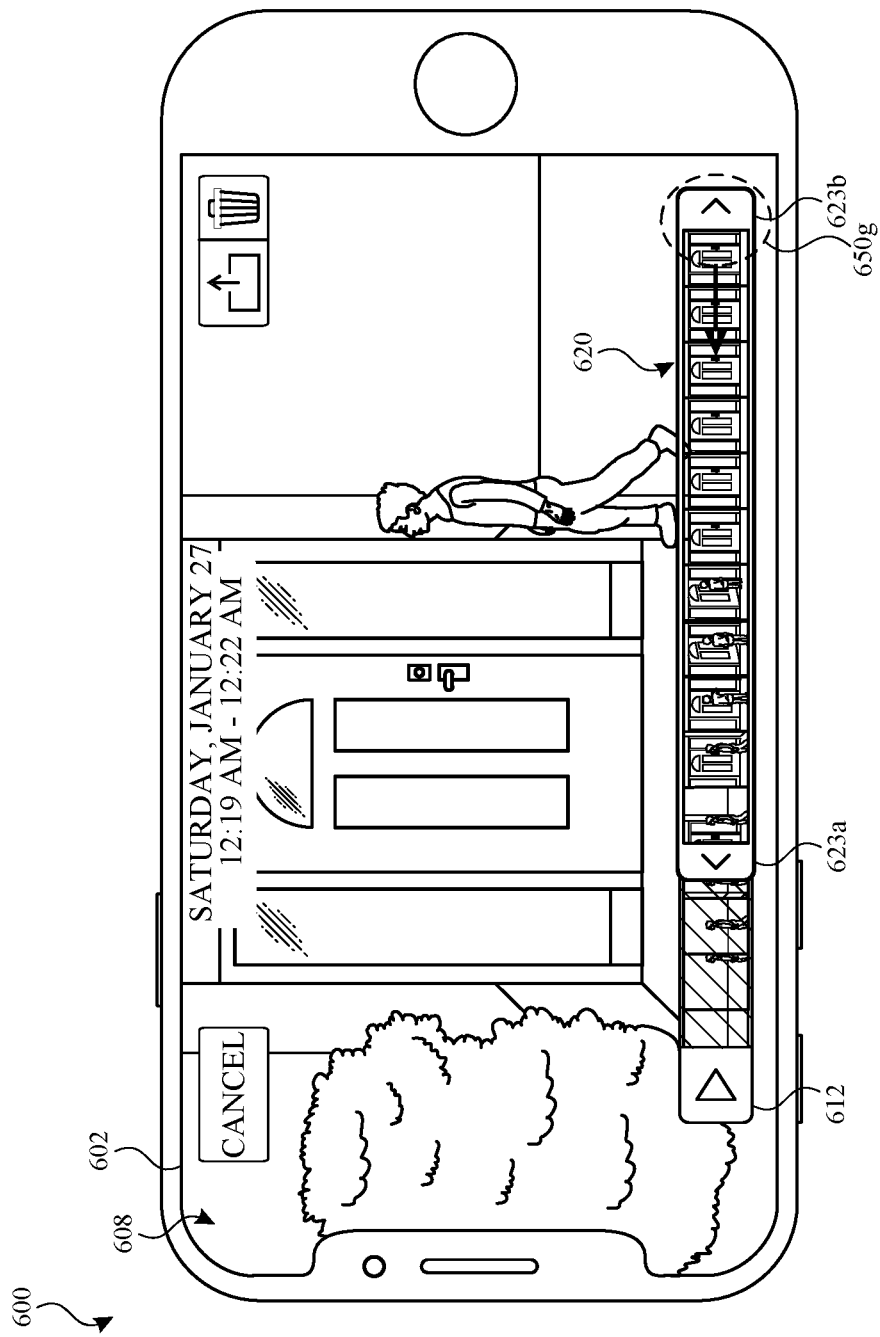

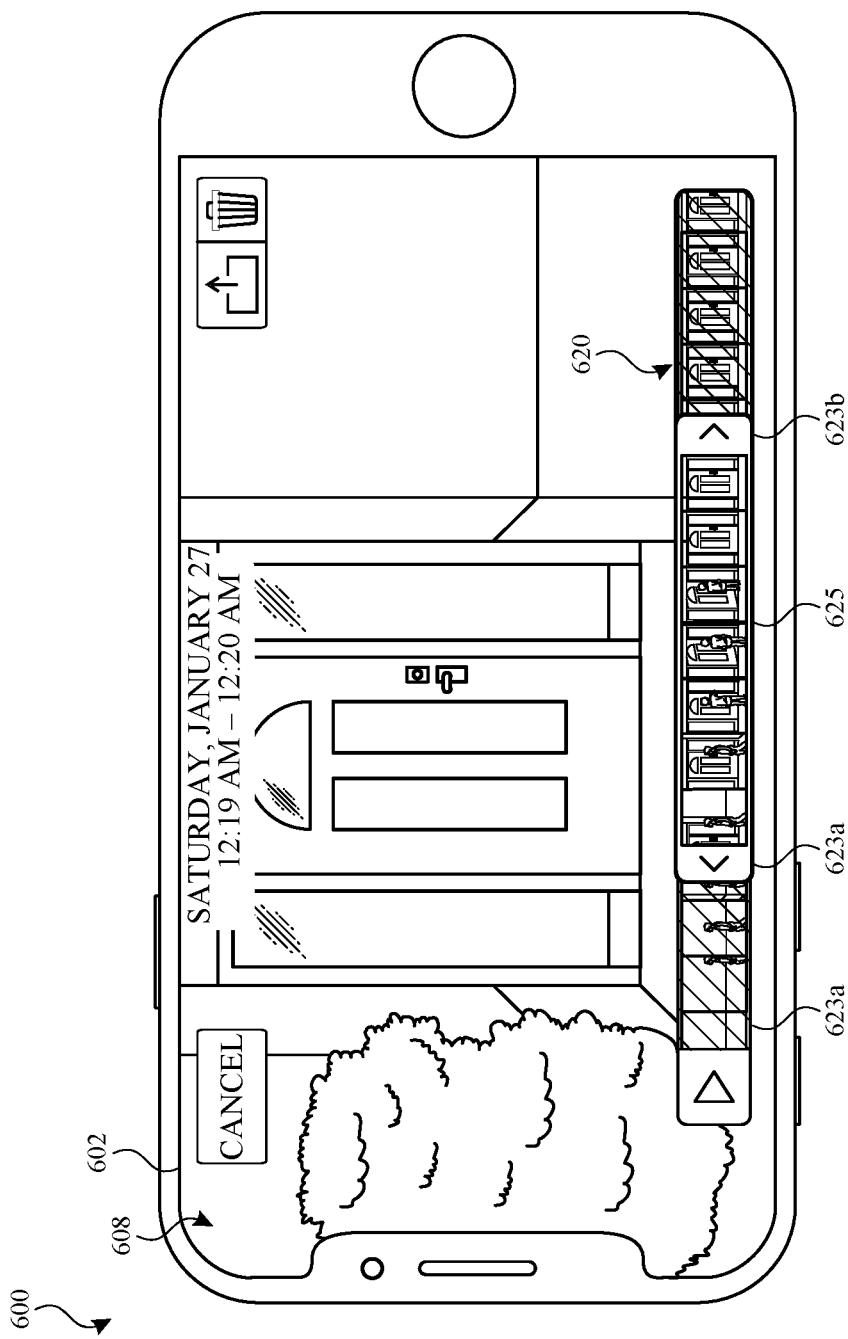

700

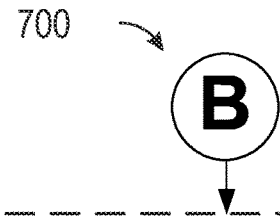

In response to detecting the third user input corresponding to selection of the second affordance:

722
Display the live video feed.

724
Update the scrubber bar to indicate that the live video feed is displayed.

726
Receive data representing a second recorded clip of video from the first source.

728
Display a representation of the second recorded clip of video in the scrubber.

730
Detect a fourth user input corresponding to selection of a third affordance.

732
Initiate a process for selecting a segment of recorded video and sharing the selected segment of recorded video.

FIG. 7C

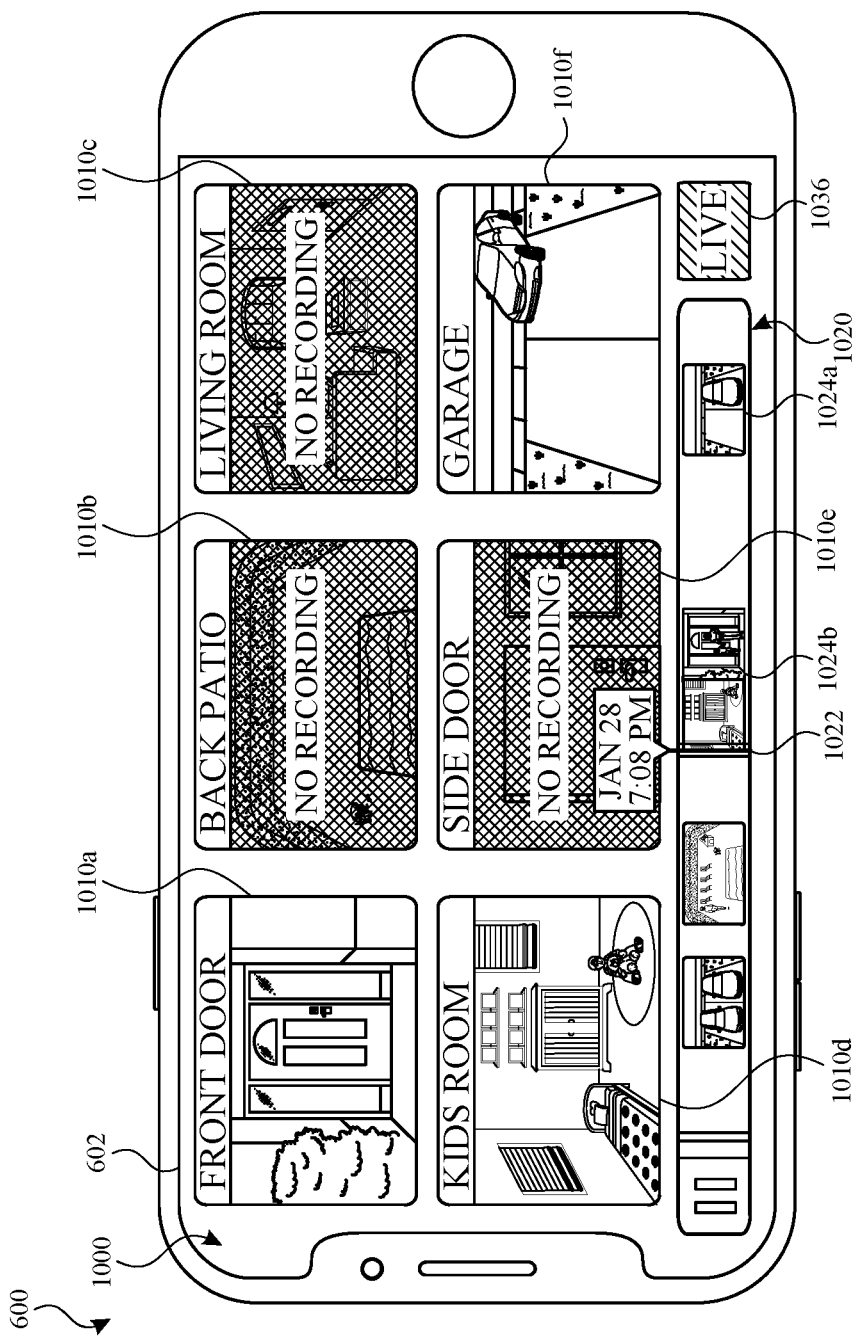

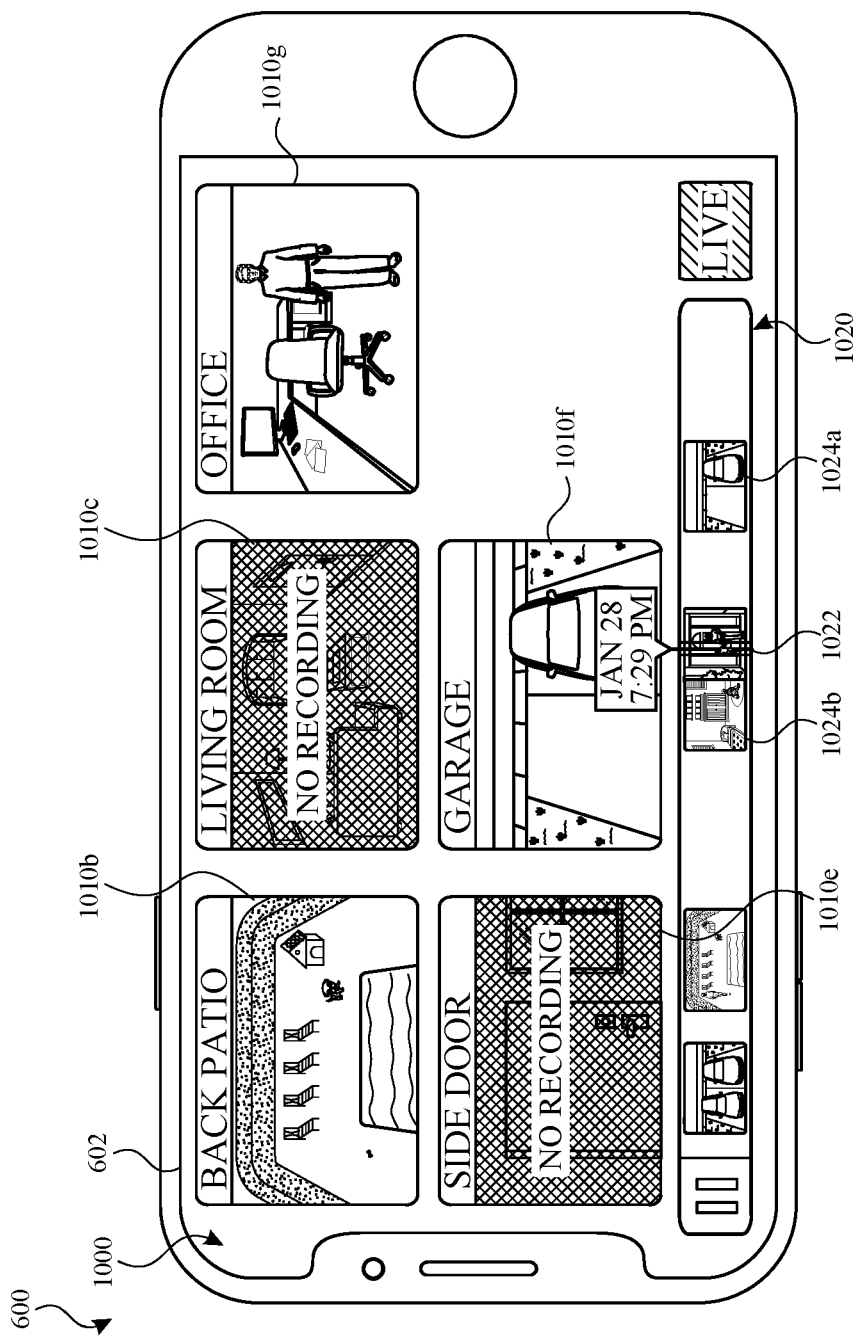

```
                                    1100 ─┐

┌──────────────────────────────────────────────────────────────────────┐
    │                                  1102                                │
    │ Display, at a first time, a user interface that includes a first live video feed from a first source │
    │   at a first location of the user interface, a second live video feed from a second source at a      │
    │ second location of the user interface, and a scrubber bar including a representation of recorded    │
    │              video content from at least one of the first source or the second source.               │
    └──────────────────────────────────────────────────────────────────────┘
                                        │
                                        ▼
    ┌──────────────────────────────────────────────────────────────────────┐
    │                                  1104                                │
    │                            Detect a user input.                      │
    └──────────────────────────────────────────────────────────────────────┘
                                        │
                                        ▼
    ┌──────────────────────────────────────────────────────────────────────┐
    │                    In response to detecting the user input:          │
    │                                                                      │
    │   ┌──────────────────────────────────────────────────────────────┐   │
    │   │                              1106                            │   │
    │   │ Replace the first live video feed with a first image associated with the first │   │
    │   │           source at the first location of the user interface.           │   │
    │   └──────────────────────────────────────────────────────────────┘   │
    │                                                                      │
    │   ┌──────────────────────────────────────────────────────────────┐   │
    │   │                              1108                            │   │
    │   │ Replace the second live video feed with a second image associated with the │   │
    │   │            second source at the second location of the user interface.           │   │
    │   └──────────────────────────────────────────────────────────────┘   │
    │                                                                      │
    │   ┌──────────────────────────────────────────────────────────────┐   │
    │   │                              1110                            │   │
    │   │   Update the scrubber bar to indicate the portion of the representation of the  │   │
    │   │         recorded video content that corresponds to a second time.        │   │
    │   └──────────────────────────────────────────────────────────────┘   │
    │                                                                      │
    │   ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐   │
    │                                  1112                                │
    │   │                       Display an affordance.                 │   │
    │   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘   │
    └──────────────────────────────────────────────────────────────────────┘
                                        │
                                        ▼
                                      ( A )
```

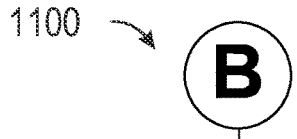

1124
Display a third image associated with a third source that is not represented on the user interface at the first time.

1126
Detect a fourth user input corresponding to selection of the first location of the user interface.

1128
Enlarge the first live video feed from the first source or the first image associated with data from the first source at the second time.

1130
Receive data representing a first recorded clip of video from the first source.

1132
Update the scrubber bar to represent the first recorded clip of video.

1134
Detect a rotation of the electronic device.

1136
Replace the user interface with a second user interface, where the second user interface includes the live video feed from the first source and information associated with a location associated with the first source.

1702
Display a user interface associated with a source of video data, where the user interface includes a first affordance representing a status of a storage resource and a second affordance for deleting, from the storage resource, data associated with the source of video data, where the first affordance includes a first representation of data stored by the storage resource that corresponds to the source of video data.

1704
Detect a user input on a display.

In response to the user input:

1706
In accordance with the first user input corresponding to selection of the first affordance, initiate a process for deleting, from the storage resource, data that does not correspond to the source of video data.

1708
In accordance with the first user input corresponding to selection of the second affordance, initiate a process for deleting, from the storage resource, data that corresponds to the source of video data.

1710
Display a menu for setting storage options associated with the first device in accordance with the first user input corresponding to selection of the representation of data stored by the storage resource that corresponds to the first device.

2104
After receiving the data identifying the source of video data:

2114
Detect activation of the options affordance.

In response to detecting activation of the options affordance:

2116
Display a plurality of motion detection affordances, including:

2118
A first motion detection affordance corresponding to a first motion detection condition.

2120
A second motion detection affordance corresponding to a second motion detection condition different from the first motion detection condition.

2122
Detect a second user input corresponding to a selection of the first motion detection condition.

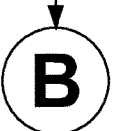

2302
Receive data identifying a source of video data.

2304
After receiving the data identifying the source of video data:

2306
Detect activation of a notification settings affordance, wherein the notification settings affordance is for enabling notifications by the source of video data independent of an operational state of the source of video data.

2308
The operational state of the source of video data is not a recording state when the notification settings affordance is activated.

2310
The notification settings of the source of video data are not associated with a context of the source of video data.

In response to detecting activation of the notification settings affordance:

2312
Receive an alert associated with an event from the source of video data when the first motion detection condition is enabled in the configuration profile of the source of video data and the first motion detection condition is satisfied.

2304
After receiving the data identifying the source of video data:

In response to detecting activation of the notification settings affordance:

2314
Display a plurality of motion detection affordances, including:

2316
A first motion detection affordance corresponding to the first motion detection condition.

2318
A second motion detection affordance corresponding to the second motion detection condition different from the first motion detection condition.

2320
Detect a first input corresponding to a selection of the first motion detection condition.

2304
After receiving the data identifying the source of video data:

2322
Subsequent to detecting the first input, transmit information to update notification settings of a configuration profile of the source of video data according to the first motion detection condition without transmitting information to update motion detection conditions associated with an operational state of the configuration profile of the source of video data.

2324
Detect a second input corresponding to a selection of the second motion detection condition.

2326
Subsequent to detecting the second input, transmit information to update notification settings of the configuration profile of the source of video data according the selected second motion detection condition, wherein the configuration profile causes the source of video data to transmit an alert when the first selected motion detection condition or the selected second motion detection condition is satisfied

2502
Receive data identifying a source of video data.

---
2504
Sources of video data of the first type include a camera and do not include an input mechanism for generating alerts.

---
2506
Sources of video data of the second type include a camera and an input mechanism for generating alerts.

---

In response to receiving the data identifying the source of video data:

2508
In accordance with a determination that the source of video data is a first type of source of video data display, on the display device, a first notification settings affordance without displaying a second notification settings affordance, wherein the first notification settings affordance enables a first type of notifications for the source of video data.

In response to receiving the data identifying the source of video data:

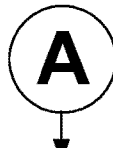

2510
In accordance with a determination that the source of video data is a second type of source of video data, concurrently display, on the display device:

2512
The first notification settings affordance.

2514
The second notification settings affordance, wherein the second notification settings affordance enables a second type of notifications for the source of video data.

2516
Detect a first input.

2518
In accordance with a determination that the first input corresponds to activation of the first notification settings affordance, transmit information to set the configuration profile of the source of video data according to the first notification settings affordance such that first type of notifications are enabled.

In response to receiving the data identifying the source of video data:

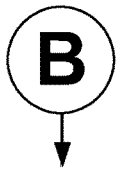

2520
In accordance with a determination that the first input corresponds to activation of the second notification settings affordance, transmit information to set the configuration profile of the source of video data according to the second notification settings affordance such that the second type of notifications are enabled.

2522
Display, on the display device, a plurality of motion detection affordances, including:

2524
A first motion detection affordance corresponding to a first motion detection condition.

2526
A second motion detection affordance corresponding to a second motion detection condition different from the first motion detection condition.

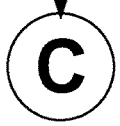

In response to receiving the data identifying the source of video data:

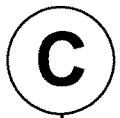

2528
Detect a second input corresponding to a selection of the first motion detection condition.

2530
Subsequent to detecting the second input, transmit information to update notification settings of the configuration profile of the source of video data according to the selected motion detection condition without updating the notification settings of the second type of notifications.

2532
While displaying the second notification settings affordance, detect a third input corresponding to activation of the second notification settings affordance.

2534
Subsequent to detecting the third input, transmit information to update notification settings of the configuration profile of the source of video data according to the second notification settings affordance such that the second type of notifications are disabled without updating the notification settings of the first type of notifications.

2702
Display, on the display device, a video media user interface, including concurrently displaying: a video feed from a source of video data and a scrubber bar.

2704
Receive first data including a first representation of a first recorded clip of video and first triggering information for the first recorded clip of video.

2706
In accordance with a determination that the first triggering information indicates recording of the first recorded clip of video was triggered by a first type of condition, concurrently display, on the display device, in the scrubber bar: a first indication corresponding to the first type of condition and the first representation of the first recorded clip of video.

2708
In accordance with a determination that the first triggering information indicates recording of the first recorded clip of video was triggered by the second type of condition different from the first type of condition, concurrently display, on the display device, in the scrubber bar: a second indication corresponding to the second type of condition, wherein the second indication is different from the first indication and the first representation of the first recorded clip of video.

2710
In accordance with a determination that first triggering information does not indicate recording of the first clip of video was triggered by a condition, display, in the scrubber bar, the first representation of the first recorded clip of video without concurrently displaying an indication corresponding to a condition.

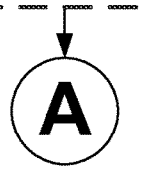

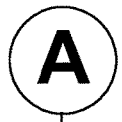

2712
Detect a first input corresponding to a selection of a portion of the first recorded clip of video.

In response to detecting the first user input:

2714
Update the display of the video feed to correspond to the selected portion of the first recorded clip of video.

2716
Concurrently shifting display of the first representation of the first recorded clip of video and the respective indication to a new position in the scrubber bar, wherein the first representation of the first recorded clip and the respective indicator are shifted in unison.

*FIG. 27B*

USER INTERFACES FOR VIEWING LIVE VIDEO FEEDS AND RECORDING VIDEO

CROSS-REFERENCE TO RELATED APPLICATIONS

This application is a continuation of U.S. patent application Ser. No. 17/116,938, titled "USER INTERFACES FOR VIEWING LIVE VIDEO FEEDS AND RECORDING VIDEO," filed Dec. 9, 2020, which is a continuation of U.S. patent application Ser. No. 16/404,605, titled "USER INTERFACES FOR VIEWING LIVE VIDEO FEEDS AND RECORDED VIDEO," filed May 6, 2019, which claims priority to U.S. Patent Application No. 62/668,090 titled "USER INTERFACES FOR VIEWING LIVE VIDEO FEEDS AND RECORDED VIDEO," filed May 7, 2018, and U.S. Patent Application No. 62/843,512 titled "USER INTERFACES FOR VIEWING LIVE VIDEO FEEDS AND RECORDED VIDEO," filed May 5, 2019, each of which is hereby incorporated by reference in its entirety for all purposes.

This application also relates to U.S. patent application Ser. No. 15/427,516, titled "USER INTERFACE FOR MANAGING CONTROLLABLE EXTERNAL DEVICES," and published as U.S. Pat. Pub. 2017/0357434, the content of which is hereby incorporated by reference in its entirety.

FIELD

The present disclosure relates generally to computer user interfaces, and more specifically to techniques for displaying live video feeds and recorded video.

BACKGROUND

Video cameras capture media content that can be displayed live or that can be recorded to be viewed at a later time. A user can have multiple video cameras that capture media content at various locations.

BRIEF SUMMARY

Some techniques for displaying live video feeds and recorded video using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying live video feeds and recorded video. Such methods and interfaces optionally complement or replace other methods for displaying live video feeds and recorded video. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at an electronic device with a display: displaying a video media user interface including: a live video feed from a first source; and a scrubber bar, the scrubber bar including a representation of a recorded clip of video from the first source, the representation located at a first position in the scrubber bar; while displaying the video media user interface, detecting a first user input; and in response to detecting the first user input: replacing the live video feed with a display of the recorded clip of video; and updating the scrubber bar to indicate that the display of the recorded clip of video corresponds to the representation of the recorded clip of video in the scrubber bar.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying a video media user interface including: a live video feed from a first source; and a scrubber bar, the scrubber bar including a representation of a recorded clip of video from the first source, the representation located at a first position in the scrubber bar; while displaying the video media user interface, detecting a first user input; and in response to detecting the first user input: replacing the live video feed with a display of the recorded clip of video; and updating the scrubber bar to indicate that the display of the recorded clip of video corresponds to the representation of the recorded clip of video in the scrubber bar.

In accordance with some embodiments, a transitory computer-readable storage medium is described. The transitory computer-readable storage medium stores one or more programs configured to be executed by one or more processors of an electronic device with a display, the one or more programs including instructions for: displaying a video media user interface including: a live video feed from a first source; and a scrubber bar, the scrubber bar including a representation of a recorded clip of video from the first source, the representation located at a first position in the scrubber bar; while displaying the video media user interface, detecting a first user input; and in response to detecting the first user input: replacing the live video feed with a display of the recorded clip of video; and updating the scrubber bar to indicate that the display of the recorded clip of video corresponds to the representation of the recorded clip of video in the scrubber bar.

In accordance with some embodiments, an electronic device is described. The electronic device comprises: a display; one or more processors; and memory storing one or more programs configured to be executed by the one or more processors, the one or more programs including instructions for: displaying a video media user interface including: a live video feed from a first source; and a scrubber bar, the scrubber bar including a representation of a recorded clip of video from the first source, the representation located at a first position in the scrubber bar; while displaying the video media user interface, detecting a first user input; and in response to detecting the first user input: replacing the live video feed with a display of the recorded clip of video; and updating the scrubber bar to indicate that the display of the recorded clip of video corresponds to the representation of the recorded clip of video in the scrubber bar.

In accordance with some embodiments, an electronic device is described. The electronic device comprises: a display; means for displaying a video media user interface including: a live video feed from a first source; and a scrubber bar, the scrubber bar including a representation of a recorded clip of video from the first source, the representation located at a first position in the scrubber bar; means for, while displaying the video media user interface, detecting a first user input; and means responsive to detecting the first user input for: replacing the live video feed with a display of the recorded clip of video; and updating the scrubber bar to indicate that the display of the recorded clip of video corresponds to the representation of the recorded clip of video in the scrubber bar.

In accordance with some embodiments, a method is described. The method comprises: at an electronic device with a display: displaying a first user interface including: a representation of video data from a source of video data; and a first affordance for accessing controls for at least one controllable external device that is associated with the source of video data; while displaying the first user interface, detecting a first user input corresponding to selection of the first affordance; in response to detecting the first user input, displaying a second user interface, wherein displaying the second user interface includes: displaying at least a second affordance representing a first controllable external device of the at least one controllable external device that is associated with the source of video data; detecting a selection of the second affordance representing the first controllable external device; and in response to detecting the selection of the second affordance representing the first controllable external device, initiating a process for controlling the first controllable external device.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying a first user interface including: a representation of video data from a source of video data; and a first affordance for accessing controls for at least one controllable external device that is associated with the source of video data; while displaying the first user interface, detecting a first user input corresponding to selection of the first affordance; in response to detecting the first user input, displaying a second user interface, wherein displaying the second user interface includes: displaying at least a second affordance representing a first controllable external device of the at least one controllable external device that is associated with the source of video data; detecting a selection of the second affordance representing the first controllable external device; and in response to detecting the selection of the second affordance representing the first controllable external device, initiating a process for controlling the first controllable external device.

In accordance with some embodiments, a transitory computer-readable storage medium is described. The transitory computer-readable storage medium stores one or more programs configured to be executed by one or more processors of an electronic device with a display, the one or more programs including instructions for: displaying a first user interface including: a representation of video data from a source of video data; and a first affordance for accessing controls for at least one controllable external device that is associated with the source of video data; while displaying the first user interface, detecting a first user input corresponding to selection of the first affordance; in response to detecting the first user input, displaying a second user interface, wherein displaying the second user interface includes: displaying at least a second affordance representing a first controllable external device of the at least one controllable external device that is associated with the source of video data; detecting a selection of the second affordance representing the first controllable external device; and in response to detecting the selection of the second affordance representing the first controllable external device, initiating a process for controlling the first controllable external device.

In accordance with some embodiments, an electronic device is described. The electronic device comprises: a display; one or more processors; and memory storing one or more programs configured to be executed by the one or more processors, the one or more programs including instructions for: displaying a first user interface including: a representation of video data from a source of video data; and a first affordance for accessing controls for at least one controllable external device that is associated with the source of video data; while displaying the first user interface, detecting a first user input corresponding to selection of the first affordance; in response to detecting the first user input, displaying a second user interface, wherein displaying the second user interface includes: displaying at least a second affordance representing a first controllable external device of the at least one controllable external device that is associated with the source of video data; detecting a selection of the second affordance representing the first controllable external device; and in response to detecting the selection of the second affordance representing the first controllable external device, initiating a process for controlling the first controllable external device.

In accordance with some embodiments, an electronic device is described. The electronic device comprises: a display; means for displaying a first user interface including: a representation of video data from a source of video data; and a first affordance for accessing controls for at least one controllable external device that is associated with the source of video data; means for, while displaying the first user interface, detecting a first user input corresponding to selection of the first affordance; means responsive to detecting the first user input for displaying a second user interface, wherein displaying the second user interface includes: displaying at least a second affordance representing a first controllable external device of the at least one controllable external device that is associated with the source of video data; means for detecting a selection of the second affordance representing the first controllable external device; and means responsive to detecting the selection of the second affordance representing the first controllable external device for initiating a process for controlling the first controllable external device.

In accordance with some embodiments, a method is described. The method comprises: at an electronic device with a display: displaying, at a first time, a user interface including: a first live video feed from a first source at a first location of the user interface and a second live video feed from a second source at a second location of the user interface; and a scrubber bar including a representation of recorded video content from at least one of the first source or the second source; while displaying the user interface, detecting a user input; and in response to detecting the user input: replacing the first live video feed with a first image associated with the first source at the first location of the user interface, the first image associated with data from the first source at a second time that is before the first time; replacing the second live video feed with a second image associated with the second source at the second location of the user interface, the second image associated with data from the second source at the second time; and updating the scrubber bar to indicate the portion of the representation of the recorded video content that corresponds to the second time.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying, at a first time, a user interface including: a first live video feed from a first source at a first location of the user interface and a second live video feed from a second source at a second location of the user interface; and a scrubber bar including a representation of recorded video content from at least one of the first source or the second source; while displaying the user interface, detecting a user input; and in response to detecting the user input: replacing the first live video feed with a first image associated with the first source at the first location of the user interface, the first image associated with data from the first source at a second time that is before the first time; replacing the second live video feed with a second image associated with the second source at the second location of the user interface, the second image associated with data from the second source at the second time; and updating the scrubber bar to indicate the portion of the representation of the recorded video content that corresponds to the second time.

In accordance with some embodiments, a transitory computer-readable storage medium is described. The transitory computer-readable storage medium stores one or more programs configured to be executed by one or more processors of an electronic device with a display, the one or more programs including instructions for: displaying, at a first time, a user interface including: a first live video feed from a first source at a first location of the user interface and a second live video feed from a second source at a second location of the user interface; and a scrubber bar including a representation of recorded video content from at least one of the first source or the second source; while displaying the user interface, detecting a user input; and in response to detecting the user input: replacing the first live video feed with a first image associated with the first source at the first location of the user interface, the first image associated with data from the first source at a second time that is before the first time; replacing the second live video feed with a second image associated with the second source at the second location of the user interface, the second image associated with data from the second source at the second time; and updating the scrubber bar to indicate the portion of the representation of the recorded video content that corresponds to the second time.

In accordance with some embodiments, an electronic device is described. The electronic device comprises: a display; one or more processors; and memory storing one or more programs configured to be executed by the one or more processors, the one or more programs including instructions for: displaying, at a first time, a user interface including: a first live video feed from a first source at a first location of the user interface and a second live video feed from a second source at a second location of the user interface; and a scrubber bar including a representation of recorded video content from at least one of the first source or the second source; while displaying the user interface, detecting a user input; and in response to detecting the user input: replacing the first live video feed with a first image associated with the first source at the first location of the user interface, the first image associated with data from the first source at a second time that is before the first time; replacing the second live video feed with a second image associated with the second source at the second location of the user interface, the second image associated with data from the second source at the second time; and updating the scrubber bar to indicate the portion of the representation of the recorded video content that corresponds to the second time.

In accordance with some embodiments, an electronic device is described. The electronic device comprises: a display; means for displaying, at a first time, a user interface including: a first live video feed from a first source at a first location of the user interface and a second live video feed from a second source at a second location of the user interface; and a scrubber bar including a representation of recorded video content from at least one of the first source or the second source; means for, while displaying the user interface, detecting a user input; and means responsive to detecting the user input for: replacing the first live video feed with a first image associated with the first source at the first location of the user interface, the first image associated with data from the first source at a second time that is before the first time; replacing the second live video feed with a second image associated with the second source at the second location of the user interface, the second image associated with data from the second source at the second time; and updating the scrubber bar to indicate the portion of the representation of the recorded video content that corresponds to the second time.

In accordance with some embodiments, a method is described. The method comprises: at an electronic device with a display: displaying a user interface including: a first plurality of affordances associated with a first context, the first plurality of affordances corresponding to respective available operational modes of a first controllable external device in the first context; and a second plurality of affordances associated with a second context, the second plurality of affordances corresponding to respective available operational modes of the first controllable external device in the second context; while displaying the first user interface: detecting a first user input at a location on the display corresponding to a first affordance in the first plurality of affordances, the first affordance corresponding to a first operational mode of the respective available operational modes of the first controllable external device in the first context; and detecting a second user input at a location on the display corresponding to a second affordance in the second plurality of affordances, the second affordance corresponding to a second operational mode of the respective available operational modes of the first controllable external device in the second context; and after detecting the first user input and the second user input, sending instructions to, based on the first user input and the second user input, set a configuration profile of the first controllable external device according to the first operational mode for the first context and the second operational mode for the second context.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying a user interface including: a first plurality of affordances associated with a first context, the first plurality of affordances corresponding to respective available operational modes of a first controllable external device in the first context; and a second plurality of affordances associated with a second context, the second plurality of affordances corresponding to respective available operational modes of the first controllable external device in the second context; while displaying the first user interface: detecting a first user input at a location on the display corresponding to a first affordance in the first plurality of affordances, the first affordance corresponding to a first operational mode of the respective available operational modes of the first controllable external device in the first context; and detecting a second user input at a location on the display corresponding to a second affordance in the second plurality of affordances, the second affordance corresponding to a second operational mode of the respective available operational modes of the first controllable external device in the second context; and after detecting the first user input and the second user input, sending instructions to, based on the first user input and the second user input, set a configuration profile of the first controllable external device according to the first operational mode for the first context and the second operational mode for the second context.

In accordance with some embodiments, a transitory computer-readable storage medium is described. The transitory computer-readable storage medium stores one or more programs configured to be executed by one or more processors of an electronic device with a display, the one or more programs including instructions for: displaying a user interface including: a first plurality of affordances associated with a first context, the first plurality of affordances corresponding to respective available operational modes of a first controllable external device in the first context; and a second plurality of affordances associated with a second context, the second plurality of affordances corresponding to respective available operational modes of the first controllable external device in the second context; while displaying the first user interface: detecting a first user input at a location on the display corresponding to a first affordance in the first plurality of affordances, the first affordance corresponding to a first operational mode of the respective available operational modes of the first controllable external device in the first context; and detecting a second user input at a location on the display corresponding to a second affordance in the second plurality of affordances, the second affordance corresponding to a second operational mode of the respective available operational modes of the first controllable external device in the second context; and after detecting the first user input and the second user input, sending instructions to, based on the first user input and the second user input, set a configuration profile of the first controllable external device according to the first operational mode for the first context and the second operational mode for the second context.

In accordance with some embodiments, an electronic device is described. The electronic device comprises: a display; one or more processors; and memory storing one or more programs configured to be executed by the one or more processors, the one or more programs including instructions for: displaying a user interface including: a first plurality of affordances associated with a first context, the first plurality of affordances corresponding to respective available operational modes of a first controllable external device in the first context; and a second plurality of affordances associated with a second context, the second plurality of affordances corresponding to respective available operational modes of the first controllable external device in the second context; while displaying the first user interface: detecting a first user input at a location on the display corresponding to a first affordance in the first plurality of affordances, the first affordance corresponding to a first operational mode of the respective available operational modes of the first controllable external device in the first context; and detecting a second user input at a location on the display corresponding to a second affordance in the second plurality of affordances, the second affordance corresponding to a second operational mode of the respective available operational modes of the first controllable external device in the second context; and after detecting the first user input and the second user input, sending instructions to, based on the first user input and the second user input, set a configuration profile of the first controllable external device according to the first operational mode for the first context and the second operational mode for the second context.

In accordance with some embodiments, an electronic device is described. The electronic device comprises: a display; means for displaying a user interface including: a first plurality of affordances associated with a first context, the first plurality of affordances corresponding to respective available operational modes of a first controllable external device in the first context; and a second plurality of affordances associated with a second context, the second plurality of affordances corresponding to respective available operational modes of the first controllable external device in the second context; means for, while displaying the first user interface: detecting a first user input at a location on the display corresponding to a first affordance in the first plurality of affordances, the first affordance corresponding to a first operational mode of the respective available operational modes of the first controllable external device in the first context; and detecting a second user input at a location on the display corresponding to a second affordance in the second plurality of affordances, the second affordance corresponding to a second operational mode of the respective available operational modes of the first controllable external device in the second context; and means for, after detecting the first user input and the second user input, sending instructions to, based on the first user input and the second user input, set a configuration profile of the first controllable external device according to the first operational mode for the first context and the second operational mode for the second context.

In accordance with some embodiments, a method is described. The method comprises: at an electronic device with a display: receiving data identifying a source of video data; and after receiving the data identifying the source of video data: displaying a first user interface including a menu for selecting an operational state of the source of video data, wherein the operational state is associated with a context; detecting a first user input corresponding to a selection of the operational state associated with the context; displaying a second user interface including a menu for selecting a duration for storing video data from the source of video data; detecting a second user input corresponding to a selection of the duration for storing video data from the source of video data; and in accordance with the first user input and the second user input, sending instructions to set a configuration profile of the source of video data according to the selected operational state and the selected duration.

In accordance with some embodiments, a non-transitory computer-readable storage medium is described. The non-transitory computer-readable storage medium stores one or more programs configured to be executed by one or more processors of an electronic device with a display, the one or more programs including instructions for: receiving data identifying a source of video data; and after receiving the data identifying the source of video data: displaying a first user interface including a menu for selecting an operational state of the source of video data, wherein the operational state is associated with a context; detecting a first user input corresponding to a selection of the operational state associated with the context; displaying a second user interface including a menu for selecting a duration for storing video data from the source of video data; detecting a second user input corresponding to a selection of the duration for storing video data from the source of video data; and in accordance with the first user input and the second user input, sending instructions to set a configuration profile of the source of video data according to the selected operational state and the selected duration.

In accordance with some embodiments, a transitory computer-readable storage medium is described. The transitory computer-readable storage medium stores one or more programs configured to be executed by one or more processors of an electronic device with a display, the one or more programs including instructions for: receiving data identifying a source of video data; and after receiving the data identifying the source of video data: displaying a first user interface including a menu for selecting an operational state of the source of video data, wherein the operational state is associated with a context; detecting a first user input corresponding to a selection of the operational state associated with the context; displaying a second user interface including a menu for selecting a duration for storing video data from the source of video data; detecting a second user input corresponding to a selection of the duration for storing video data from the source of video data; and in accordance with the first user input and the second user input, sending instructions to set a configuration profile of the source of video data according to the selected operational state and the selected duration.

In accordance with some embodiments, an electronic device is described. The electronic device comprises: a display; one or more processors; and memory storing one or more programs configured to be executed by the one or more processors, the one or more programs including instructions for: receiving data identifying a source of video data; and after receiving the data identifying the source of video data: displaying a first user interface including a menu for selecting an operational state of the source of video data, wherein the operational state is associated with a context; detecting a first user input corresponding to a selection of the operational state associated with the context; displaying a second user interface including a menu for selecting a duration for storing video data from the source of video data; detecting a second user input corresponding to a selection of the duration for storing video data from the source of video data; and in accordance with the first user input and the second user input, sending instructions to set a configuration profile of the source of video data according to the selected operational state and the selected duration.

In accordance with some embodiments, an electronic device is described. The electronic device comprises: a display; means for receiving data identifying a source of video data; and means for, after receiving the data identifying the source of video data: displaying a first user interface including a menu for selecting an operational state of the source of video data, wherein the operational state is associated with a context; detecting a first user input corresponding to a selection of the operational state associated with the context; displaying a second user interface including a menu for selecting a duration for storing video data from the source of video data; detecting a second user input corresponding to a selection of the duration for storing video data from the source of video data; and means for, in accordance with the first user input and the second user input, sending instructions to set a configuration profile of the source of video data according to the selected operational state and the selected duration.

In accordance with some embodiments, a method is described. The method comprises: at an electronic device with a display: displaying a user interface associated with a source of video data, the user interface including: a first affordance representing a status of a storage resource, the first affordance including a first representation of data stored by the storage resource that corresponds to the source of video data and a second representation of data stored by the storage resource that does not correspond to the source of video data; and a second affordance for deleting, from the storage resource, data associated with the source of video data; while displaying the user interface, detecting a user input on the display; and in response to the user input: in accordance with the first user input corresponding to selection of the first affordance, initiating a process for deleting, from the storage resource, data that does not correspond to the source of video data; and in accordance with the first user input corresponding to selection of the second affordance, initiating a process for deleting, from the storage resource, data that corresponds to the source of video data.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying a user interface associated with a source of video data, the user interface including: a first affordance representing a status of a storage resource, the first affordance including a first representation of data stored by the storage resource that corresponds to the source of video data and a second representation of data stored by the storage resource that does not correspond to the source of video data; and a second affordance for deleting, from the storage resource, data associated with the source of video data; while displaying the user interface, detecting a user input on the display; and in response to the user input: in accordance with the first user input corresponding to selection of the first affordance, initiating a process for deleting, from the storage resource, data that does not correspond to the source of video data; and in accordance with the first user input corresponding to selection of the second affordance, initiating a process for deleting, from the storage resource, data that corresponds to the source of video data.

In accordance with some embodiments, a transitory computer-readable storage medium is described. The transitory computer-readable storage medium stores one or more programs configured to be executed by one or more processors of an electronic device with a display, the one or more programs including instructions for: displaying a user interface associated with a source of video data, the user interface including: a first affordance representing a status of a storage resource, the first affordance including a first representation of data stored by the storage resource that corresponds to the source of video data and a second representation of data stored by the storage resource that does not correspond to the source of video data; and a second affordance for deleting, from the storage resource, data associated with the source of video data; while displaying the user interface, detecting a user input on the display; and in response to the user input: in accordance with the first user input corresponding to selection of the first affordance, initiating a process for deleting, from the storage resource, data that does not correspond to the source of video data; and in accordance with the first user input corresponding to selection of the second affordance, initiating a process for deleting, from the storage resource, data that corresponds to the source of video data.

In accordance with some embodiments, an electronic device is described. The electronic device comprises: a display; one or more processors; and memory storing one or more programs configured to be executed by the one or more processors, the one or more programs including instructions for: displaying a user interface associated with a source of video data, the user interface including: a first affordance representing a status of a storage resource, the first affordance including a first representation of data stored by the storage resource that corresponds to the source of video data and a second representation of data stored by the storage resource that does not correspond to the source of video data; and a second affordance for deleting, from the storage resource, data associated with the source of video data; while displaying the user interface, detecting a user input on the display; and in response to the user input: in accordance with the first user input corresponding to selection of the first affordance, initiating a process for deleting, from the storage resource, data that does not correspond to the source of video data; and in accordance with the first user input corresponding to selection of the second affordance, initiating a process for deleting, from the storage resource, data that corresponds to the source of video data.

In accordance with some embodiments, an electronic device is described. The electronic device comprises: a display; means for displaying a user interface associated with a source of video data, the user interface including: a first affordance representing a status of a storage resource, the first affordance including a first representation of data stored by the storage resource that corresponds to the source of video data and a second representation of data stored by the storage resource that does not correspond to the source of video data; and a second affordance for deleting, from the storage resource, data associated with the source of video data; means for, while displaying the user interface, detecting a user input on the display; and means responsive to the user input for: in accordance with the first user input corresponding to selection of the first affordance, initiating a process for deleting, from the storage resource, data that does not correspond to the source of video data; and in accordance with the first user input corresponding to selection of the second affordance, initiating a process for deleting, from the storage resource, data that corresponds to the source of video data.

In accordance with some embodiments, a method is described. The method comprises: at an electronic device with a display: receiving data identifying a source of video data; and after receiving the data identifying the source of video data: displaying a first user interface including a menu for selecting an operational state of the source of video data; while displaying the menu for selecting an operational state of the source of video data, detecting a first input corresponding to a selection of the operational state; in response to detecting the first input: in accordance with a determination that the selected operational state includes a recording state, displaying an options affordance; detecting activation of the options affordance; in response to detecting activation of the options affordance: displaying a plurality of motion detection affordances, including: a first motion detection affordance corresponding to a first motion detection condition, and a second motion detection affordance corresponding to a second motion detection condition different from the first motion detection condition; detecting a second input corresponding to a selection of the first motion detection condition; and subsequent to detecting the second input, transmitting information to set a configuration profile of the source of video data according to the selected operational state and the selected first motion detection condition.

In accordance with some embodiments, a non-transitory computer-readable storage medium is described. The non-transitory computer-readable storage medium stores one or more programs configured to be executed by one or more processors of an electronic device with a display, the one or more programs including instructions for: receiving data identifying a source of video data; and after receiving the data identifying the source of video data: displaying a first user interface including a menu for selecting an operational state of the source of video data; while displaying the menu for selecting an operational state of the source of video data, detecting a first input corresponding to a selection of the operational state; in response to detecting the first input: in accordance with a determination that the selected operational state includes a recording state, displaying an options affordance; detecting activation of the options affordance; in response to detecting activation of the options affordance: displaying a plurality of motion detection affordances, including: a first motion detection affordance corresponding to a first motion detection condition, and a second motion detection affordance corresponding to a second motion detection condition different from the first motion detection condition; detecting a second input corresponding to a selection of the first motion detection condition; and subsequent to detecting the second input, transmitting information to set a configuration profile of the source of video data according to the selected operational state and the selected first motion detection condition.

In accordance with some embodiments, a transitory computer-readable storage medium is described. The transitory computer-readable storage medium stores one or more programs configured to be executed by one or more processors of an electronic device with a display, the one or more programs including instructions for: receiving data identifying a source of video data; and after receiving the data identifying the source of video data: displaying a first user interface including a menu for selecting an operational state of the source of video data; while displaying the menu for selecting an operational state of the source of video data, detecting a first input corresponding to a selection of the operational state; in response to detecting the first input: in accordance with a determination that the selected operational state includes a recording state, displaying an options affordance; detecting activation of the options affordance; in response to detecting activation of the options affordance: displaying a plurality of motion detection affordances, including: a first motion detection affordance corresponding to a first motion detection condition, and a second motion detection affordance corresponding to a second motion detection condition different from the first motion detection condition; detecting a second input corresponding to a selection of the first motion detection condition; and subsequent to detecting the second input, transmitting information to set a configuration profile of the source of video data according to the selected operational state and the selected first motion detection condition.

In accordance with some embodiments, an electronic device is described. The electronic device comprises: a display; one or more processors; and memory storing one or more programs configured to be executed by the one or more processors, the one or more programs including instructions for: receiving data identifying a source of video data; and after receiving the data identifying the source of video data:

displaying a first user interface including a menu for selecting an operational state of the source of video data; while displaying the menu for selecting an operational state of the source of video data, detecting a first input corresponding to a selection of the operational state; in response to detecting the first input: in accordance with a determination that the selected operational state includes a recording state, displaying an options affordance; detecting activation of the options affordance; in response to detecting activation of the options affordance: displaying a plurality of motion detection affordances, including: a first motion detection affordance corresponding to a first motion detection condition, and a second motion detection affordance corresponding to a second motion detection condition different from the first motion detection condition; detecting a second input corresponding to a selection of the first motion detection condition; and subsequent to detecting the second input, transmitting information to set a configuration profile of the source of video data according to the selected operational state and the selected first motion detection condition.

In accordance with some embodiments, an electronic device is described. The electronic device comprises: a display; means for receiving data identifying a source of video data; and means for, after receiving the data identifying the source of video data: means for displaying a first user interface including a menu for selecting an operational state of the source of video data; means for, while displaying the menu for selecting an operational state of the source of video data, detecting a first input corresponding to a selection of the operational state; means, in response to detecting the first input for: means for, in accordance with a determination that the selected operational state includes a recording state, means for displaying an options affordance; means for detecting activation of the options affordance; means for, in response to detecting activation of the options affordance: means for displaying a plurality of motion detection affordances, including: a first motion detection affordance corresponding to a first motion detection condition, and a second motion detection affordance corresponding to a second motion detection condition different from the first motion detection condition; means for detecting a second input corresponding to a selection of the first motion detection condition; and means for, subsequent to detecting the second input, transmitting information to set a configuration profile of the source of video data according to the selected operational state and the selected first motion detection condition.

In accordance with some embodiments, a method is described. The method comprises: at an electronic device with a display: receiving data identifying a source of video data; and after receiving the data identifying the source of video data: detecting activation of a notifications settings affordance, wherein the notifications settings affordance is for enabling notifications by the source of video data independent of an operational state of the source of video data; in response to detecting activation of the notification setting affordance: displaying a plurality of motion detection affordances, including: a first motion detection affordance corresponding to the first motion detection condition, and a second motion detection affordance corresponding to the second motion detection condition different from the first motion detection condition; detecting a first input corresponding to a selection of the first motion detection condition; and subsequent to detecting the first input, transmitting information to update notifications settings of a configuration profile of the source of video data according to the first motion detection condition without transmitting information to update motion detection conditions associated with an operational state of the configuration profile of the source of video data.

In accordance with some embodiments, a non-transitory computer-readable storage medium is described. The non-transitory computer-readable storage medium stores one or more programs configured to be executed by one or more processors of an electronic device with a display, the one or more programs including instructions for: receiving data identifying a source of video data; and after receiving the data identifying the source of video data: detecting activation of a notifications settings affordance, wherein the notifications settings affordance is for enabling notifications by the source of video data independent of an operational state of the source of video data; in response to detecting activation of the notification setting affordance: displaying a plurality of motion detection affordances, including: a first motion detection affordance corresponding to the first motion detection condition, and a second motion detection affordance corresponding to the second motion detection condition different from the first motion detection condition; detecting a first input corresponding to a selection of the first motion detection condition; and subsequent to detecting the first input, transmitting information to update notifications settings of a configuration profile of the source of video data according to the first motion detection condition without transmitting information to update motion detection conditions associated with an operational state of the configuration profile of the source of video data.

In accordance with some embodiments, a transitory computer-readable storage medium is described. The transitory computer-readable storage medium stores one or more programs configured to be executed by one or more processors of an electronic device with a display, the one or more programs including instructions for: receiving data identifying a source of video data; and after receiving the data identifying the source of video data: detecting activation of a notifications settings affordance, wherein the notifications settings affordance is for enabling notifications by the source of video data independent of an operational state of the source of video data; in response to detecting activation of the notification setting affordance: displaying a plurality of motion detection affordances, including: a first motion detection affordance corresponding to the first motion detection condition, and a second motion detection affordance corresponding to the second motion detection condition different from the first motion detection condition; detecting a first input corresponding to a selection of the first motion detection condition; and subsequent to detecting the first input, transmitting information to update notifications settings of a configuration profile of the source of video data according to the first motion detection condition without transmitting information to update motion detection conditions associated with an operational state of the configuration profile of the source of video data.

In accordance with some embodiments, an electronic device is described. The electronic device comprises: a display; one or more processors; and memory storing one or more programs configured to be executed by the one or more processors, the one or more programs including instructions for: receiving data identifying a source of video data; and after receiving the data identifying the source of video data: detecting activation of a notifications settings affordance, wherein the notifications settings affordance is for enabling notifications by the source of video data independent of an operational state of the source of video data; in response to detecting activation of the notification setting affordance:

displaying a plurality of motion detection affordances, including: a first motion detection affordance corresponding to the first motion detection condition, and a second motion detection affordance corresponding to the second motion detection condition different from the first motion detection condition; detecting a first input corresponding to a selection of the first motion detection condition; and subsequent to detecting the first input, transmitting information to update notifications settings of a configuration profile of the source of video data according to the first motion detection condition without transmitting information to update motion detection conditions associated with an operational state of the configuration profile of the source of video data.

In accordance with some embodiments, an electronic device is described. The electronic device comprises: a display; means for, receiving data identifying a source of video data; and means for, after receiving the data identifying the source of video data: means for, detecting activation of a notifications settings affordance, wherein the notifications settings affordance is for enabling notifications by the source of video data independent of an operational state of the source of video data; means for, in response to detecting activation of the notification setting affordance: means for, displaying a plurality of motion detection affordances, including: a first motion detection affordance corresponding to the first motion detection condition, and a second motion detection affordance corresponding to the second motion detection condition different from the first motion detection condition; means for, detecting a first input corresponding to a selection of the first motion detection condition; and means for, subsequent to detecting the first input, transmitting information to update notifications settings of a configuration profile of the source of video data according to the first motion detection condition without transmitting information to update motion detection conditions associated with an operational state of the configuration profile of the source of video data.

In accordance with some embodiments, a method is described. The method comprises: at an electronic device with a display device: receiving data identifying a source of video data; in response to receiving the data identifying the source of video data: in accordance with a determination that the source of video data is a first type of source of video data displaying, on the display device, a first notifications settings affordance without displaying a second notifications settings affordance, wherein the first notifications settings affordance enables a first type of notifications for the source of video data; in accordance with a determination that the source of video data is a second type of source of video data, concurrently displaying, on the display device: the first notifications settings affordance, and the second notifications settings affordance, wherein the second notifications settings affordance enables a second type of notifications for the source of video data; detecting a first input; in accordance with a determination that the first input corresponds to activation of the first notifications settings affordance, transmitting information to set the configuration profile of the source of video data according to the first notifications settings affordance such that first type of notifications are enabled; and in accordance with a determination that the first input corresponds to activation of the second notifications settings affordance, transmitting information to set the configuration profile of the source of video data according to the second notifications settings affordance such that the second type of notifications are enabled.

In accordance with some embodiments, a non-transitory computer-readable storage medium is described. The non-transitory computer-readable storage medium stores one or more programs configured to be executed by one or more processors of an electronic device with a display, the one or more programs including instructions for: receiving data identifying a source of video data; in response to receiving the data identifying the source of video data: in accordance with a determination that the source of video data is a first type of source of video data displaying, on the display device, a first notifications settings affordance without displaying a second notifications settings affordance, wherein the first notifications settings affordance enables a first type of notifications for the source of video data; in accordance with a determination that the source of video data is a second type of source of video data, concurrently displaying, on the display device: the first notifications settings affordance, and the second notifications settings affordance, wherein the second notifications settings affordance enables a second type of notifications for the source of video data; detecting a first input; in accordance with a determination that the first input corresponds to activation of the first notifications settings affordance, transmitting information to set the configuration profile of the source of video data according to the first notifications settings affordance such that first type of notifications are enabled; and in accordance with a determination that the first input corresponds to activation of the second notifications settings affordance, transmitting information to set the configuration profile of the source of video data according to the second notifications settings affordance such that the second type of notifications are enabled.

In accordance with some embodiments, a transitory computer-readable storage medium is described. The transitory computer-readable storage medium stores one or more programs configured to be executed by one or more processors of an electronic device with a display, the one or more programs including instructions for: receiving data identifying a source of video data; in response to receiving the data identifying the source of video data: in accordance with a determination that the source of video data is a first type of source of video data displaying, on the display device, a first notifications settings affordance without displaying a second notifications settings affordance, wherein the first notifications settings affordance enables a first type of notifications for the source of video data; in accordance with a determination that the source of video data is a second type of source of video data, concurrently displaying, on the display device: the first notifications settings affordance, and the second notifications settings affordance, wherein the second notifications settings affordance enables a second type of notifications for the source of video data; detecting a first input; in accordance with a determination that the first input corresponds to activation of the first notifications settings affordance, transmitting information to set the configuration profile of the source of video data according to the first notifications settings affordance such that first type of notifications are enabled; and in accordance with a determination that the first input corresponds to activation of the second notifications settings affordance, transmitting information to set the configuration profile of the source of video data according to the second notifications settings affordance such that the second type of notifications are enabled.

In accordance with some embodiments, an electronic device is described. The electronic device comprises: a display; one or more processors; and memory storing one or more programs configured to be executed by the one or more processors, the one or more programs including instructions for: receiving data identifying a source of video data; in response to receiving the data identifying the source of video data: in accordance with a determination that the source of video data is a first type of source of video data displaying, on the display device, a first notifications settings affordance without displaying a second notifications settings affordance, wherein the first notifications settings affordance enables a first type of notifications for the source of video data; in accordance with a determination that the source of video data is a second type of source of video data, concurrently displaying, on the display device: the first notifications settings affordance, and the second notifications settings affordance, wherein the second notifications settings affordance enables a second type of notifications for the source of video data; detecting a first input; in accordance with a determination that the first input corresponds to activation of the first notifications settings affordance, transmitting information to set the configuration profile of the source of video data according to the first notifications settings affordance such that first type of notifications are enabled; and in accordance with a determination that the first input corresponds to activation of the second notifications settings affordance, transmitting information to set the configuration profile of the source of video data according to the second notifications settings affordance such that the second type of notifications are enabled.

In accordance with some embodiments, an electronic device is described. The electronic device comprises: a display; means for, receiving data identifying a source of video data; means for, in response to receiving the data identifying the source of video data: means for, in accordance with a determination that the source of video data is a first type of source of video data displaying, on the display device, a first notifications settings affordance without displaying a second notifications settings affordance, wherein the first notifications settings affordance enables a first type of notifications for the source of video data; means for, in accordance with a determination that the source of video data is a second type of source of video data, concurrently displaying, on the display device: the first notifications settings affordance, and the second notifications settings affordance, wherein the second notifications settings affordance enables a second type of notifications for the source of video data; means for, detecting a first input; means for, in accordance with a determination that the first input corresponds to activation of the first notifications settings affordance, transmitting information to set the configuration profile of the source of video data according to the first notifications settings affordance such that first type of notifications are enabled; and means for, in accordance with a determination that the first input corresponds to activation of the second notifications settings affordance, transmitting information to set the configuration profile of the source of video data according to the second notifications settings affordance such that the second type of notifications are enabled.

In accordance with some embodiments, a method is described. The method comprises: at an electronic device with a display device: displaying, on the display device, a video media user interface, including concurrently displaying: a video feed from a source of video data; and a scrubber bar; receiving: first data including a first representation of a first recorded clip of video, and first triggering information for the first recorded clip of video; in accordance with a determination that the first triggering information indicates recording of the first recorded clip of video was triggered by a first type of condition, concurrently displaying, on the display device, in the scrubber bar: a first indication corresponding to the first type of condition, and the first representation of the first recorded clip of video; and in accordance with a determination that the first triggering information indicates recording of the first recorded clip of video was triggered by the second type of condition different from the first type of condition, concurrently displaying, on the display device, in the scrubber bar: a second indication corresponding to the second type of condition, wherein the second indication is different from the first indication, and the first representation of the first recorded clip of video.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying, on the display device, a video media user interface, including concurrently displaying: a video feed from a source of video data; and a scrubber bar; receiving: first data including a first representation of a first recorded clip of video, and first triggering information for the first recorded clip of video; in accordance with a determination that the first triggering information indicates recording of the first recorded clip of video was triggered by a first type of condition, concurrently displaying, on the display device, in the scrubber bar: a first indication corresponding to the first type of condition, and the first representation of the first recorded clip of video; and in accordance with a determination that the first triggering information indicates recording of the first recorded clip of video was triggered by the second type of condition different from the first type of condition, concurrently displaying, on the display device, in the scrubber bar: a second indication corresponding to the second type of condition, wherein the second indication is different from the first indication, and the first representation of the first recorded clip of video.

In accordance with some embodiments, a transitory computer-readable storage medium is described. The transitory computer-readable storage medium stores one or more programs configured to be executed by one or more processors of an electronic device with a display, the one or more programs including instructions for: displaying, on the display device, a video media user interface, including concurrently displaying: a video feed from a source of video data; and a scrubber bar; receiving: first data including a first representation of a first recorded clip of video, and first triggering information for the first recorded clip of video; in accordance with a determination that the first triggering information indicates recording of the first recorded clip of video was triggered by a first type of condition, concurrently displaying, on the display device, in the scrubber bar: a first indication corresponding to the first type of condition, and the first representation of the first recorded clip of video; and in accordance with a determination that the first triggering information indicates recording of the first recorded clip of video was triggered by the second type of condition different from the first type of condition, concurrently displaying, on the display device, in the scrubber bar: a second indication corresponding to the second type of condition, wherein the second indication is different from the first indication, and the first representation of the first recorded clip of video.

In accordance with some embodiments, an electronic device is described. The electronic device comprises: a display; one or more processors; and memory storing one or more programs configured to be executed by the one or more processors, the one or more programs including instructions for: displaying, on the display device, a video media user interface, including concurrently displaying: a video feed from a source of video data; and a scrubber bar; receiving:

first data including a first representation of a first recorded clip of video, and first triggering information for the first recorded clip of video; in accordance with a determination that the first triggering information indicates recording of the first recorded clip of video was triggered by a first type of condition, concurrently displaying, on the display device, in the scrubber bar: a first indication corresponding to the first type of condition, and the first representation of the first recorded clip of video; and in accordance with a determination that the first triggering information indicates recording of the first recorded clip of video was triggered by the second type of condition different from the first type of condition, concurrently displaying, on the display device, in the scrubber bar: a second indication corresponding to the second type of condition, wherein the second indication is different from the first indication, and the first representation of the first recorded clip of video.

In accordance with some embodiments, an electronic device is described. The electronic device comprises: a display; means for, displaying, on the display device, a video media user interface, including concurrently displaying: a video feed from a source of video data; and a scrubber bar; means for, receiving: first data including a first representation of a first recorded clip of video, and first triggering information for the first recorded clip of video; means for, in accordance with a determination that the first triggering information indicates recording of the first recorded clip of video was triggered by a first type of condition, concurrently displaying, on the display device, in the scrubber bar: a first indication corresponding to the first type of condition, and the first representation of the first recorded clip of video; and means for, in accordance with a determination that the first triggering information indicates recording of the first recorded clip of video was triggered by the second type of condition different from the first type of condition, concurrently displaying, on the display device, in the scrubber bar: a second indication corresponding to the second type of condition, wherein the second indication is different from the first indication, and the first representation of the first recorded clip of video.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying live video feeds and recorded video, thereby increasing the effectiveness, efficiency, and user satisfaction with such devices. Such methods and interfaces may complement or replace other methods for displaying live video feeds and recorded video.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7C are a flow diagram illustrating methods of displaying live video feeds and recorded video in accordance with some embodiments.

FIGS. 10A-10J illustrate exemplary user interfaces for displaying and navigating video from multiple sources of video data in accordance with some embodiments.

FIGS. 11A-11C are a flow diagram illustrating methods of displaying and navigating video from multiple sources of video data in accordance with some embodiments.

FIG. 17 is a flow diagram illustrating methods of managing a storage resource in accordance with some embodiments.

FIGS. 21A-21C are a flow diagram illustrating methods of configuring recording settings in accordance with some embodiments.

FIGS. 23A-23C are a flow diagram illustrating methods of configuring notifications settings in accordance with some embodiments.

FIGS. 25A-25D are a flow diagram illustrating methods of configuring a first type of notifications for a first type of camera and a second type of notifications for a second type of camera in accordance with some embodiments.

FIGS. 27A-27B are a flow diagram illustrating methods for displaying clip representations and indicators that indicate the type of conditions that triggered the recording in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying live video feeds and recorded video. For example, in some embodiments, a device simultaneously displays images from multiple cameras, and provides a composite scrubber bar for simultaneously navigating recorded video from multiple cameras. In some embodiments, a device provides intuitive user interfaces for setting context-based camera setting. Such techniques can reduce the cognitive burden on a user who view live video feeds and recorded video, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for displaying live video feeds and recorded video.

Figure 6A:
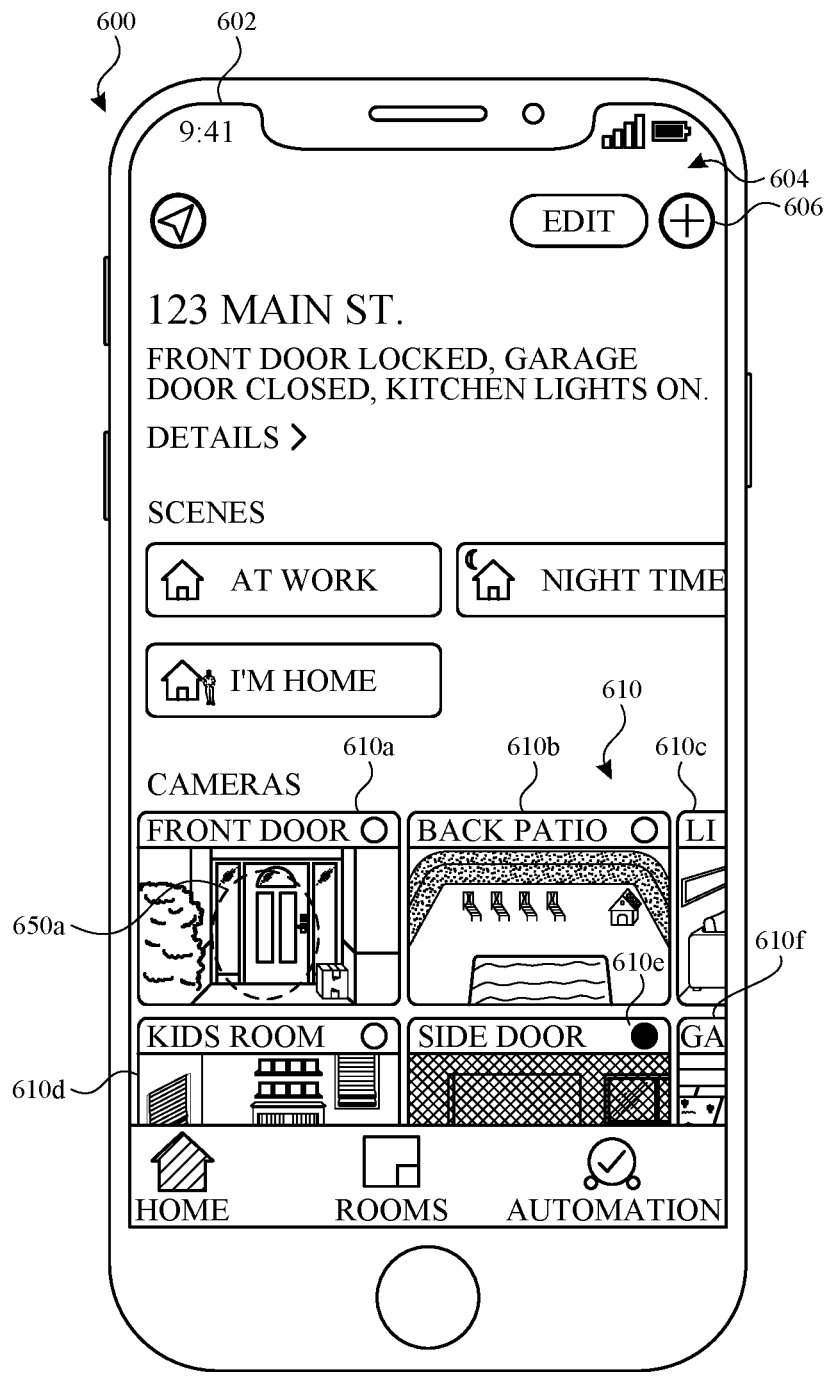
FIGS. 6A-6S illustrate exemplary user interfaces for displaying live video feeds and recorded video in accordance with some embodiments.
Figure 6B:
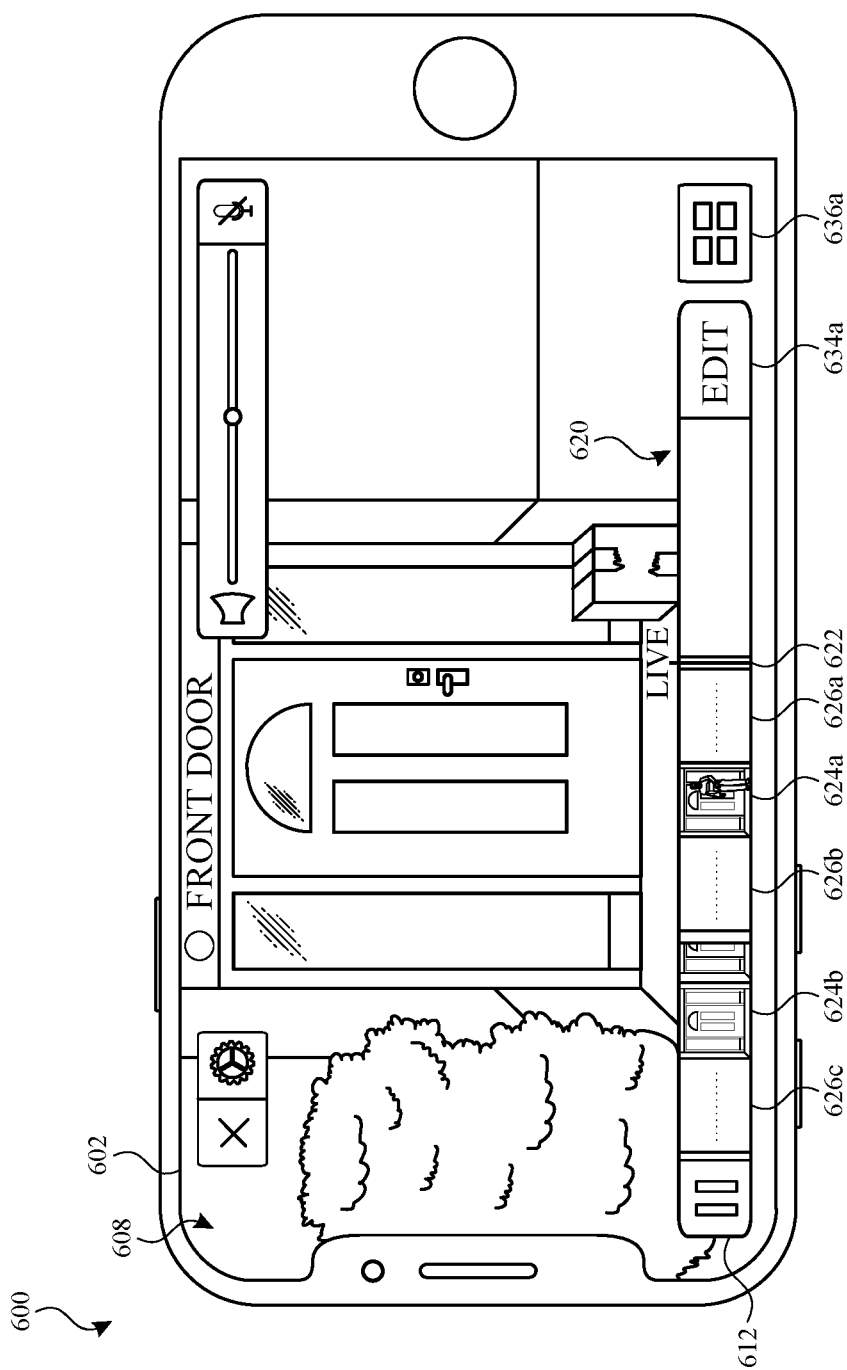
Figure 6C:
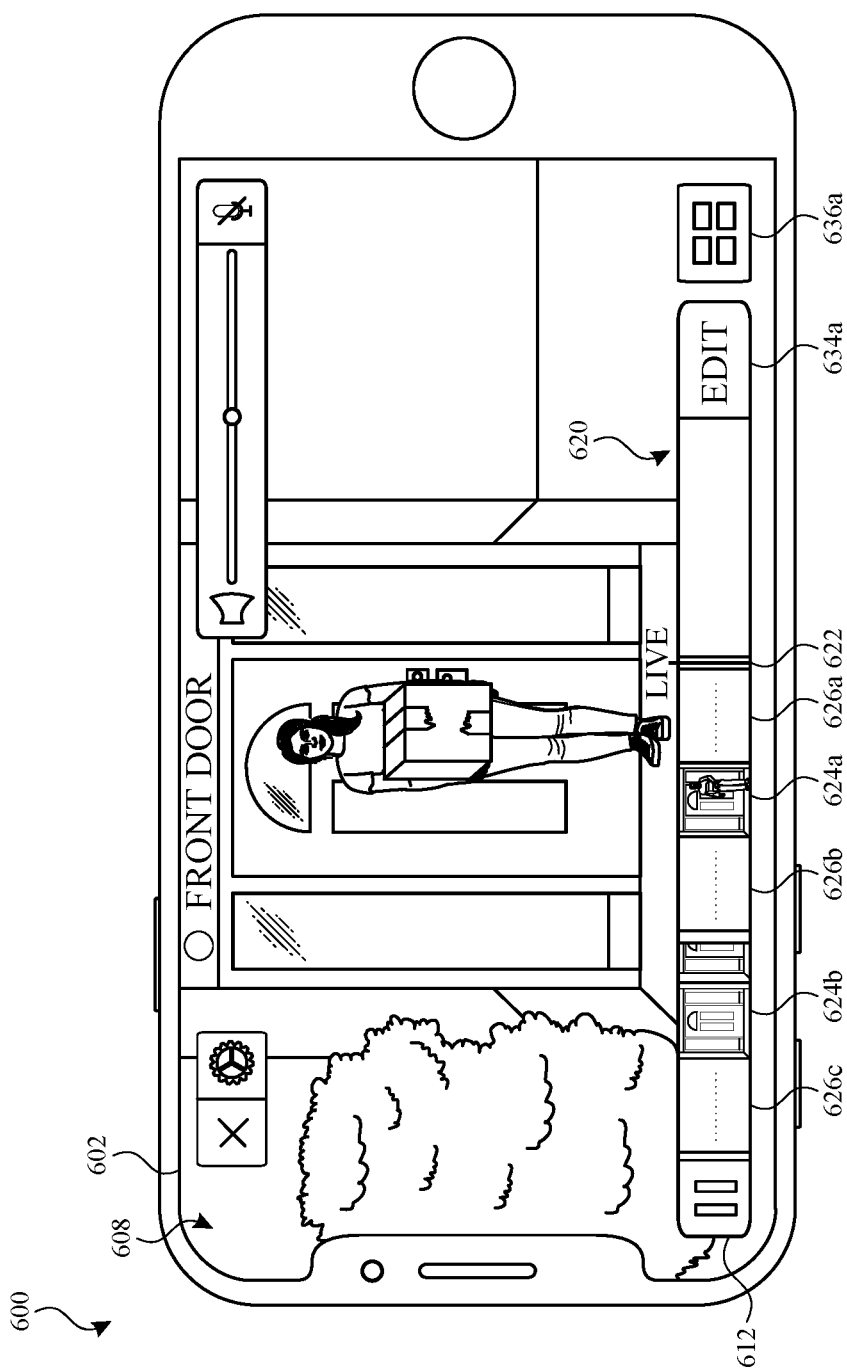
Figure 6D:
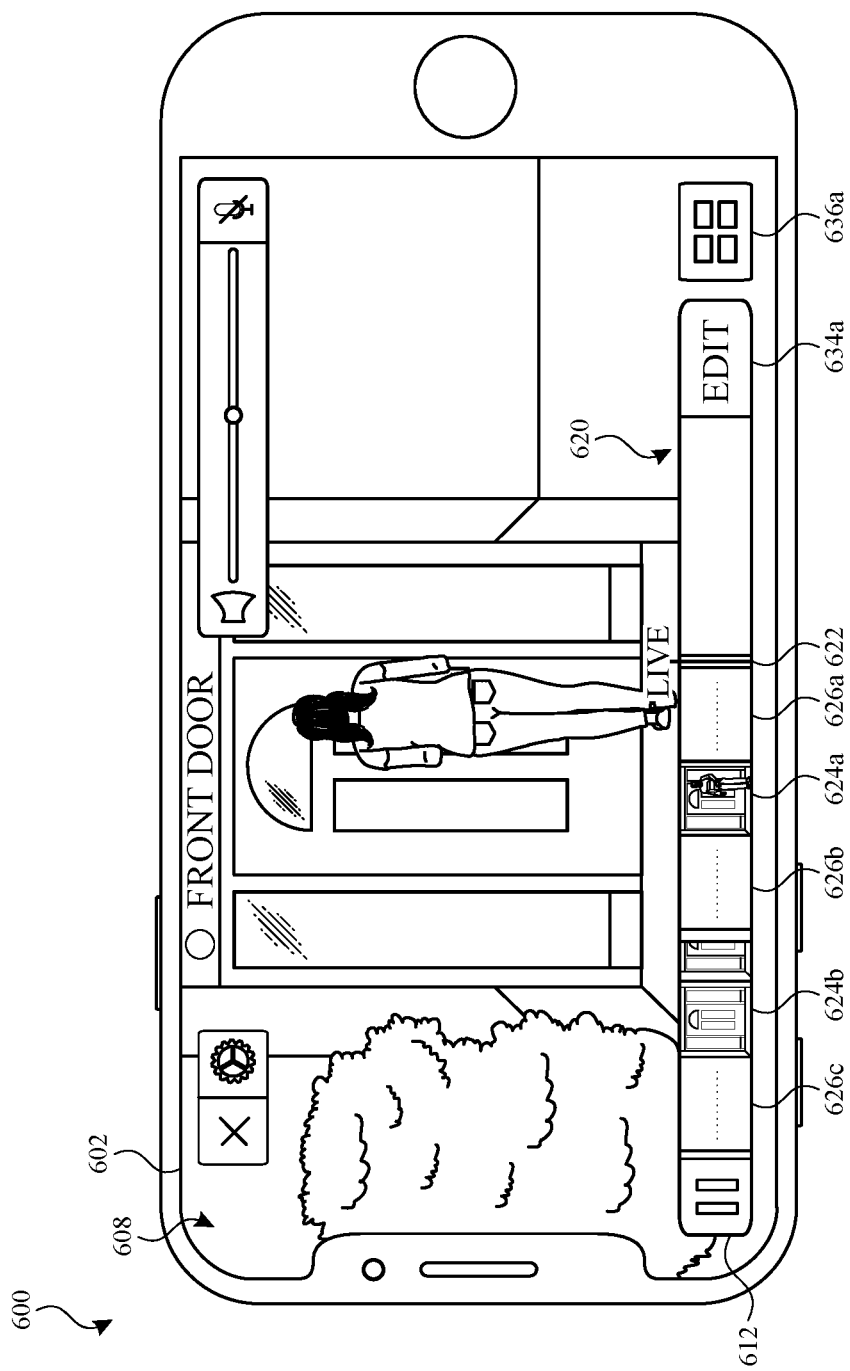
Figure 6E:
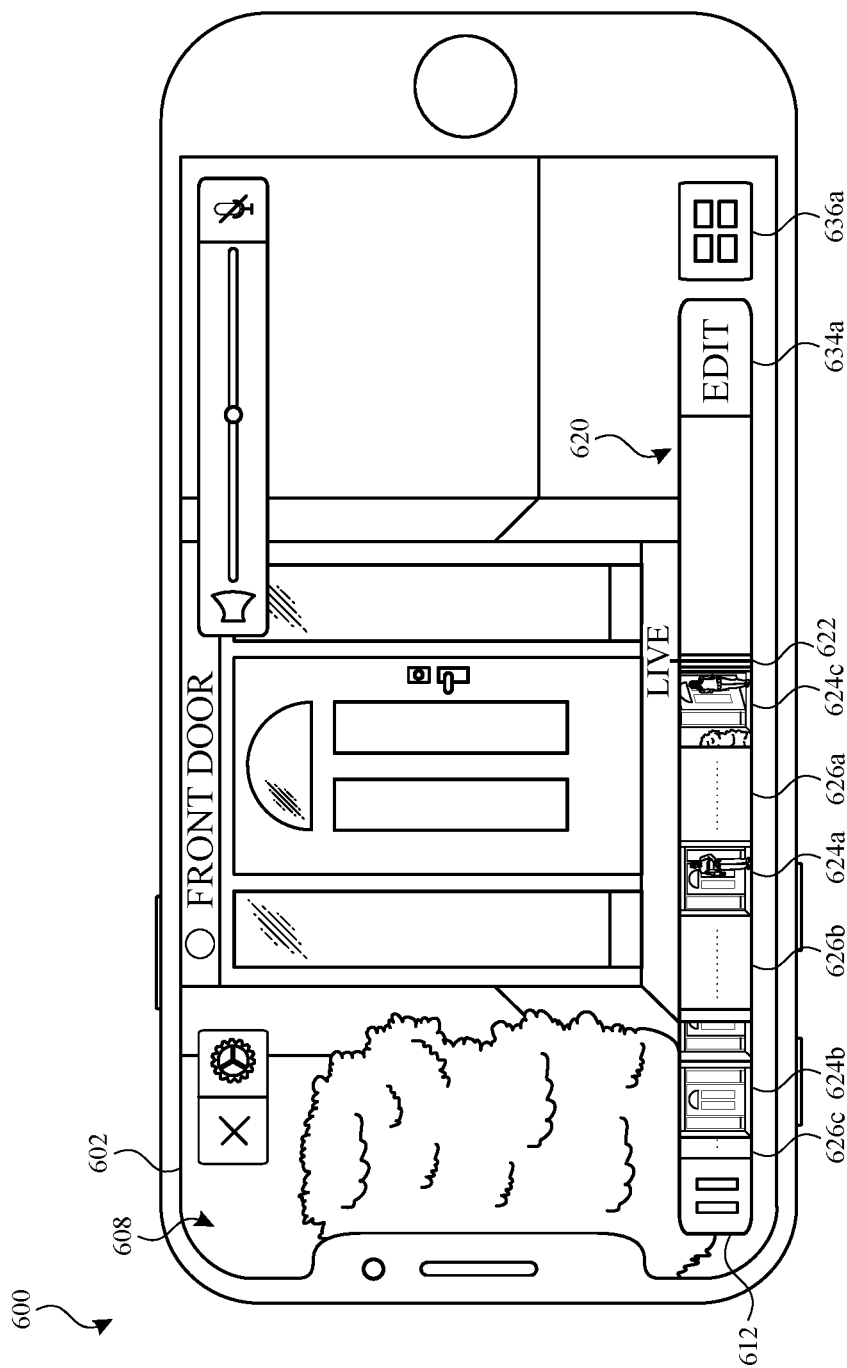
Figure 6F:
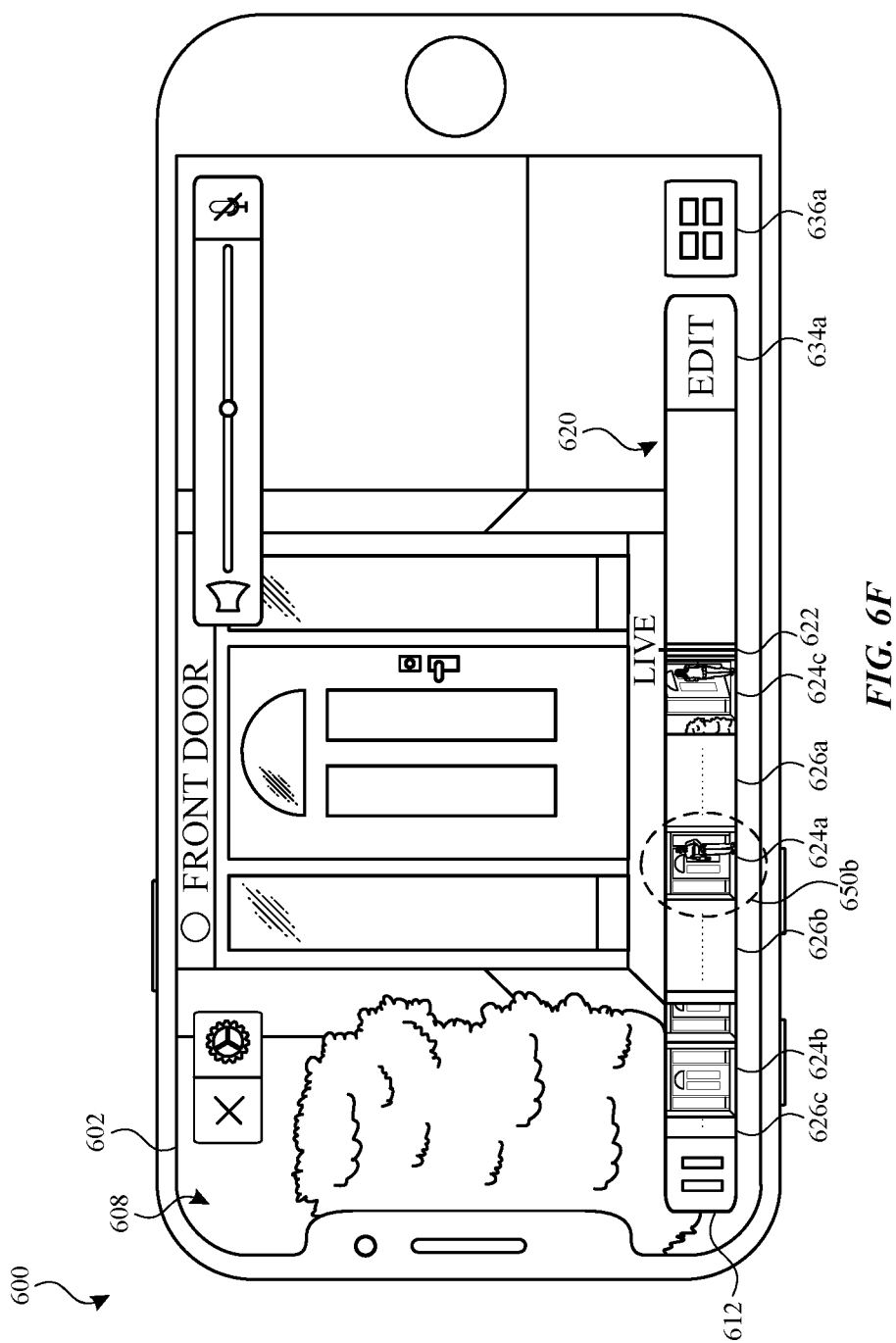
Figure 6G:
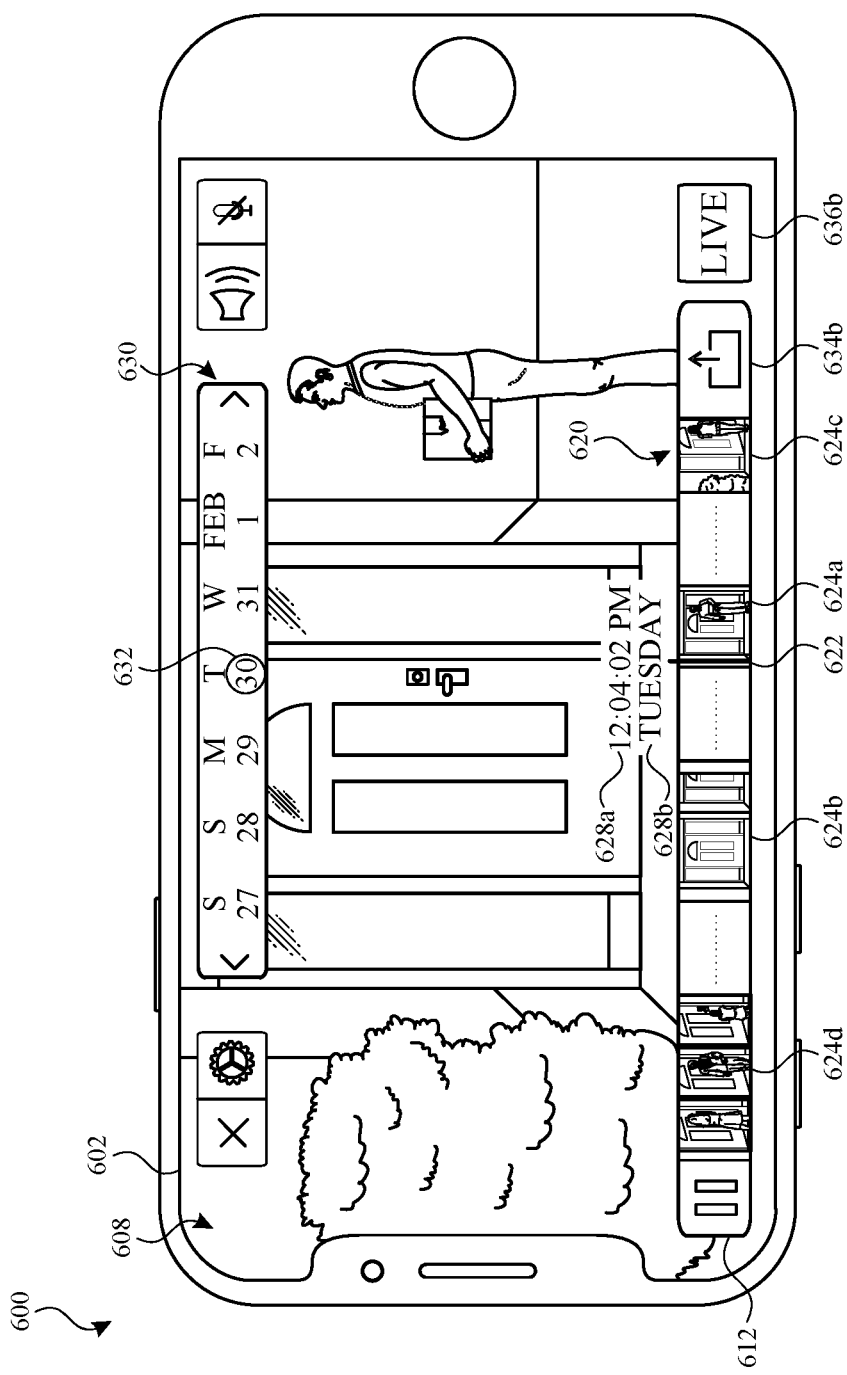
Figure 6H:
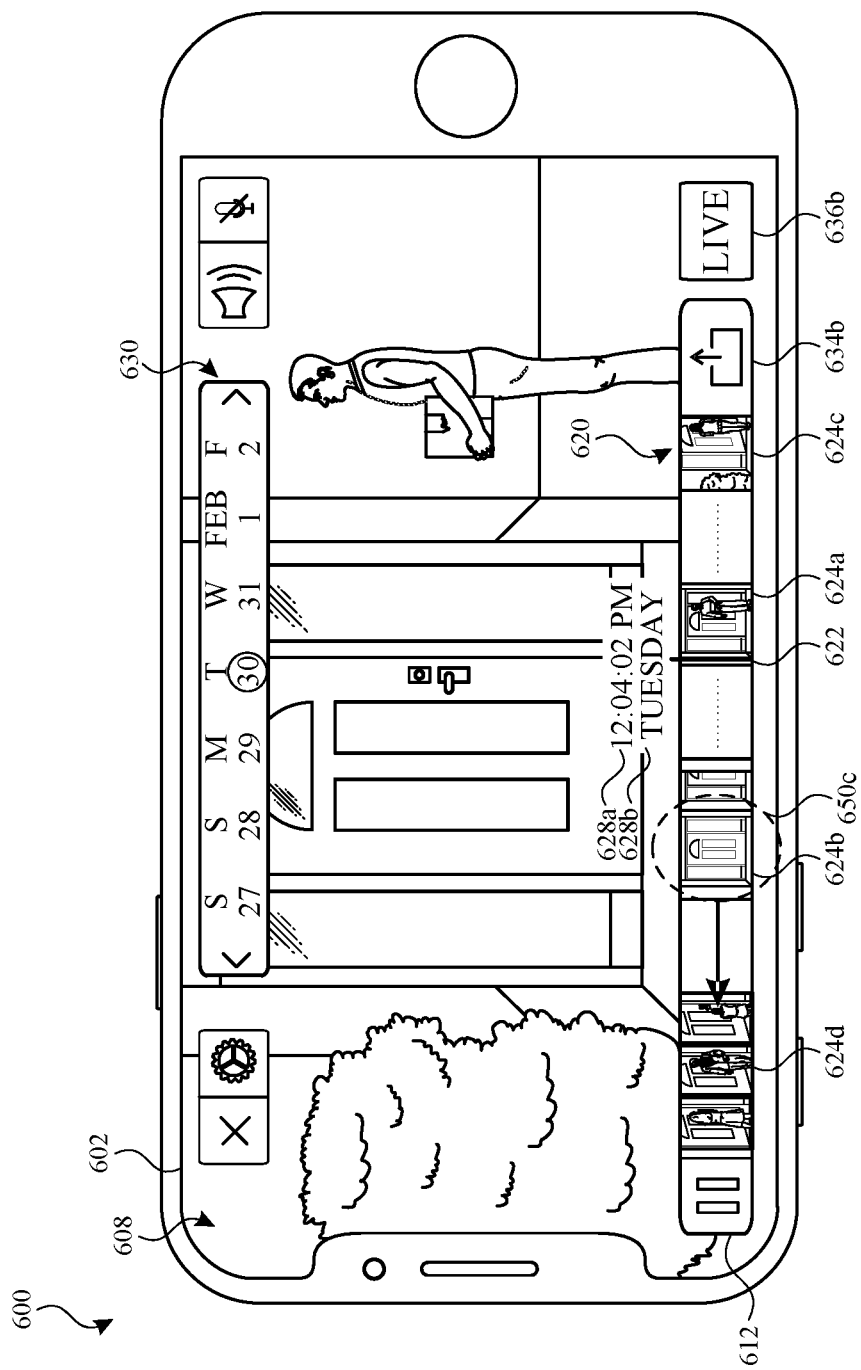
Figure 6I:
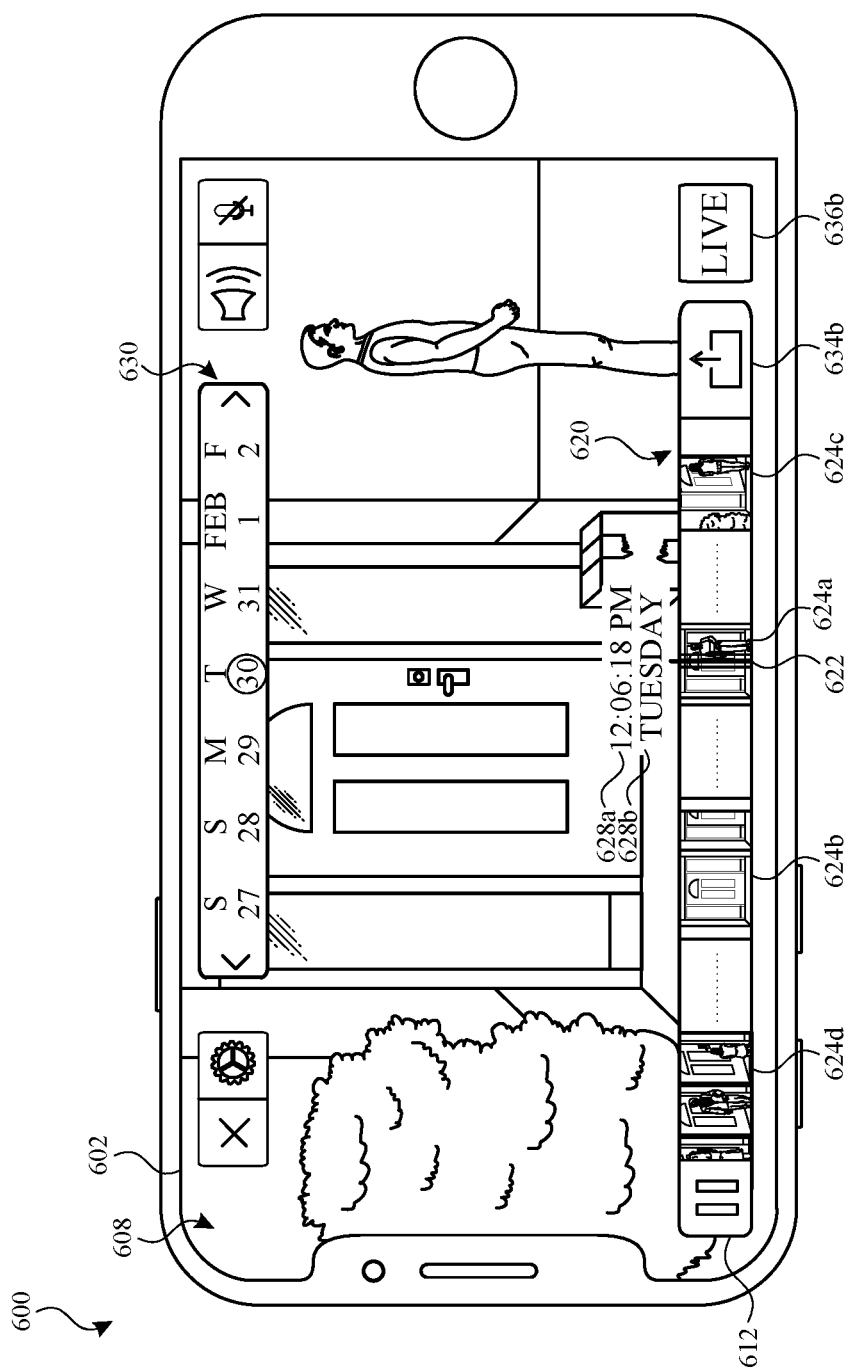
Figure 6J:
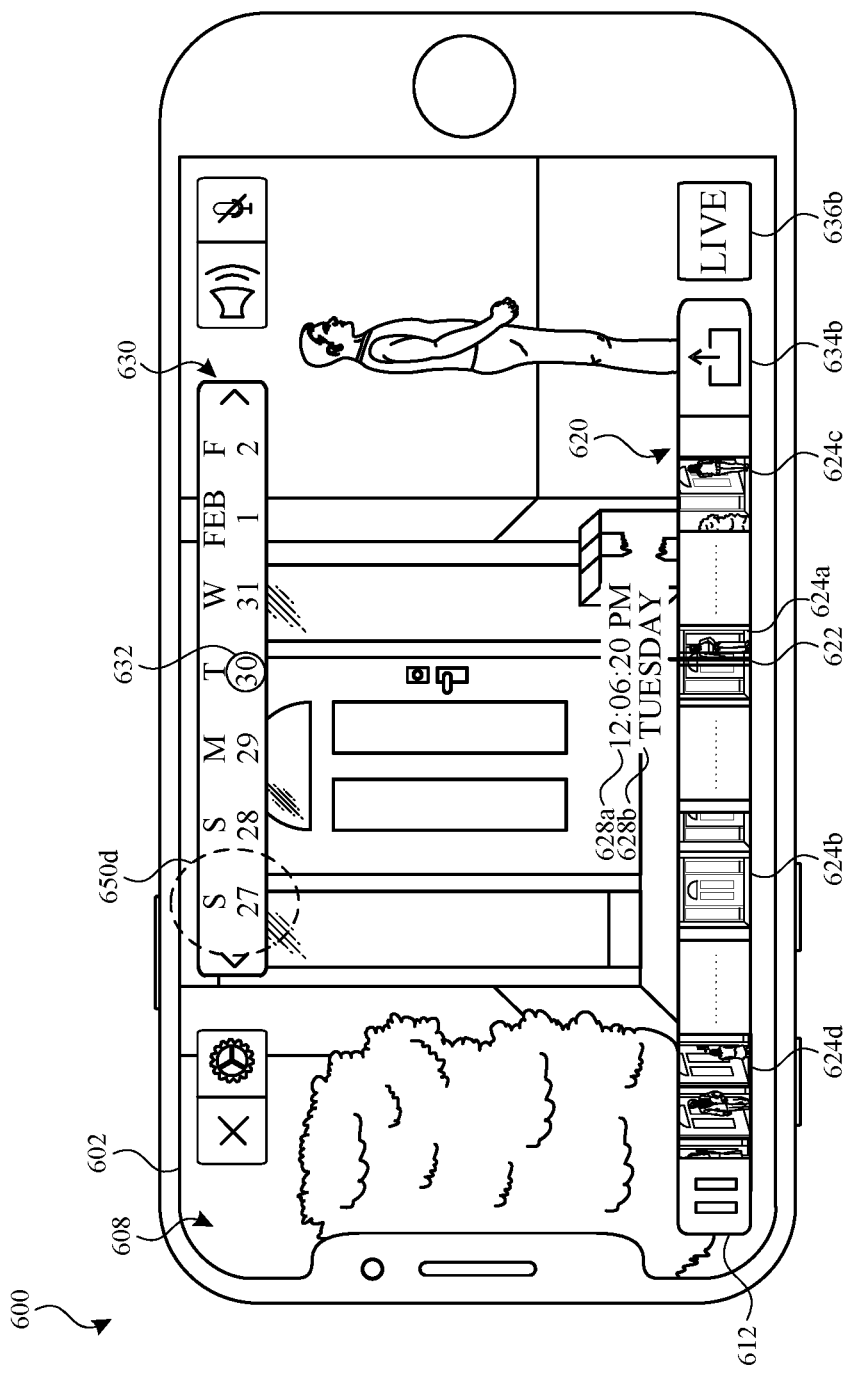
Figure 6K:
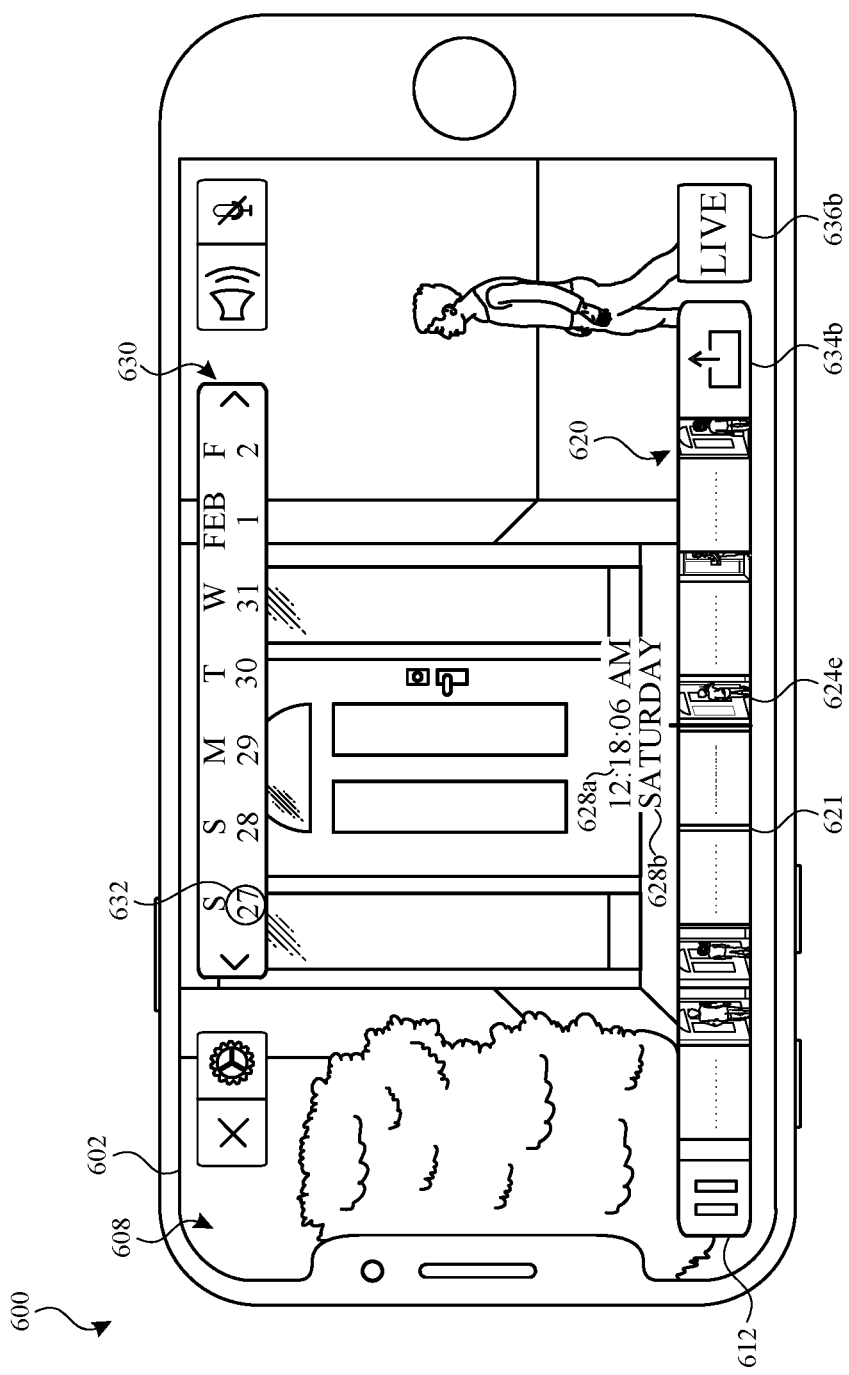
Figure 6L:
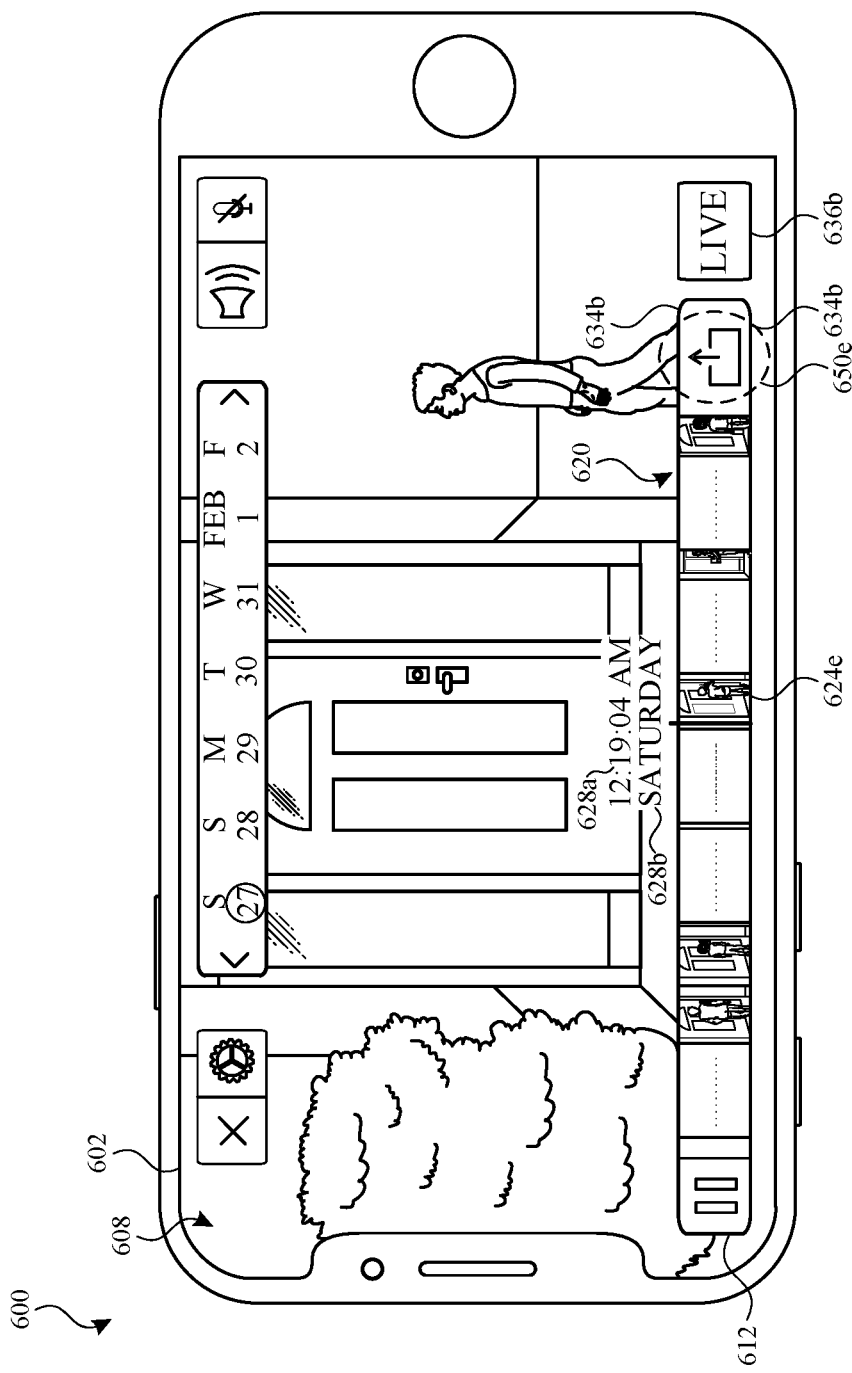
Figure 6M:
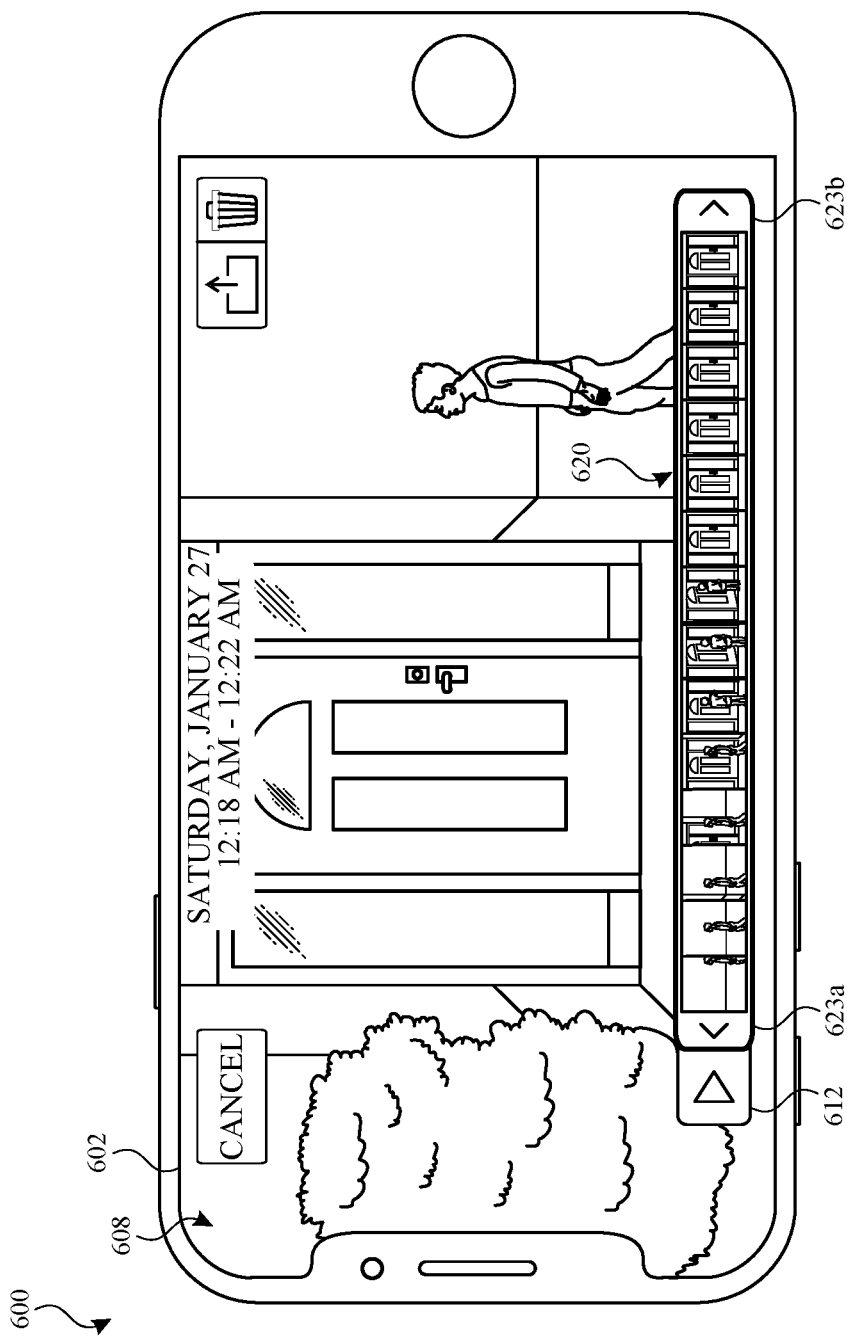
Figure 6N:
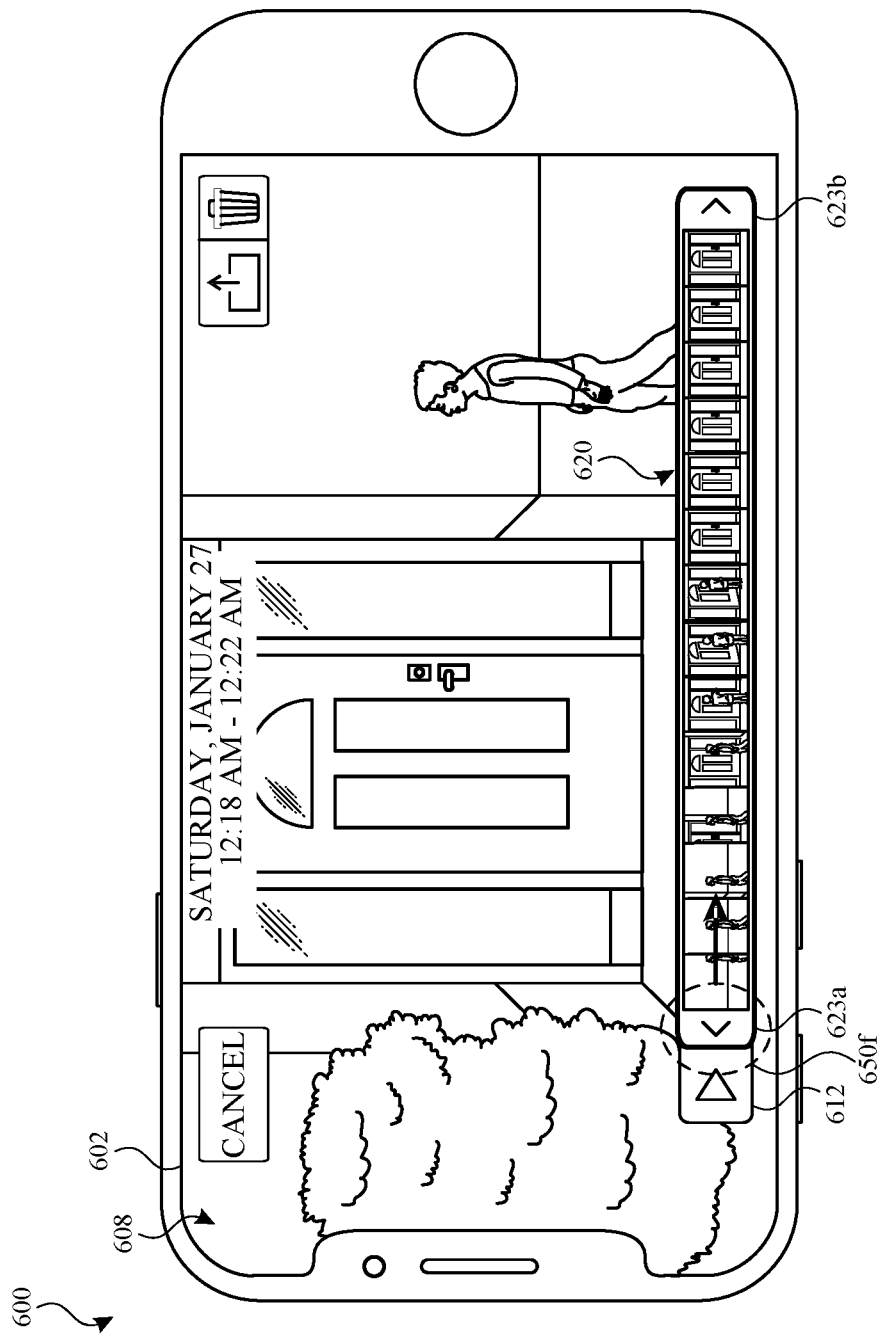
Figure 6O:
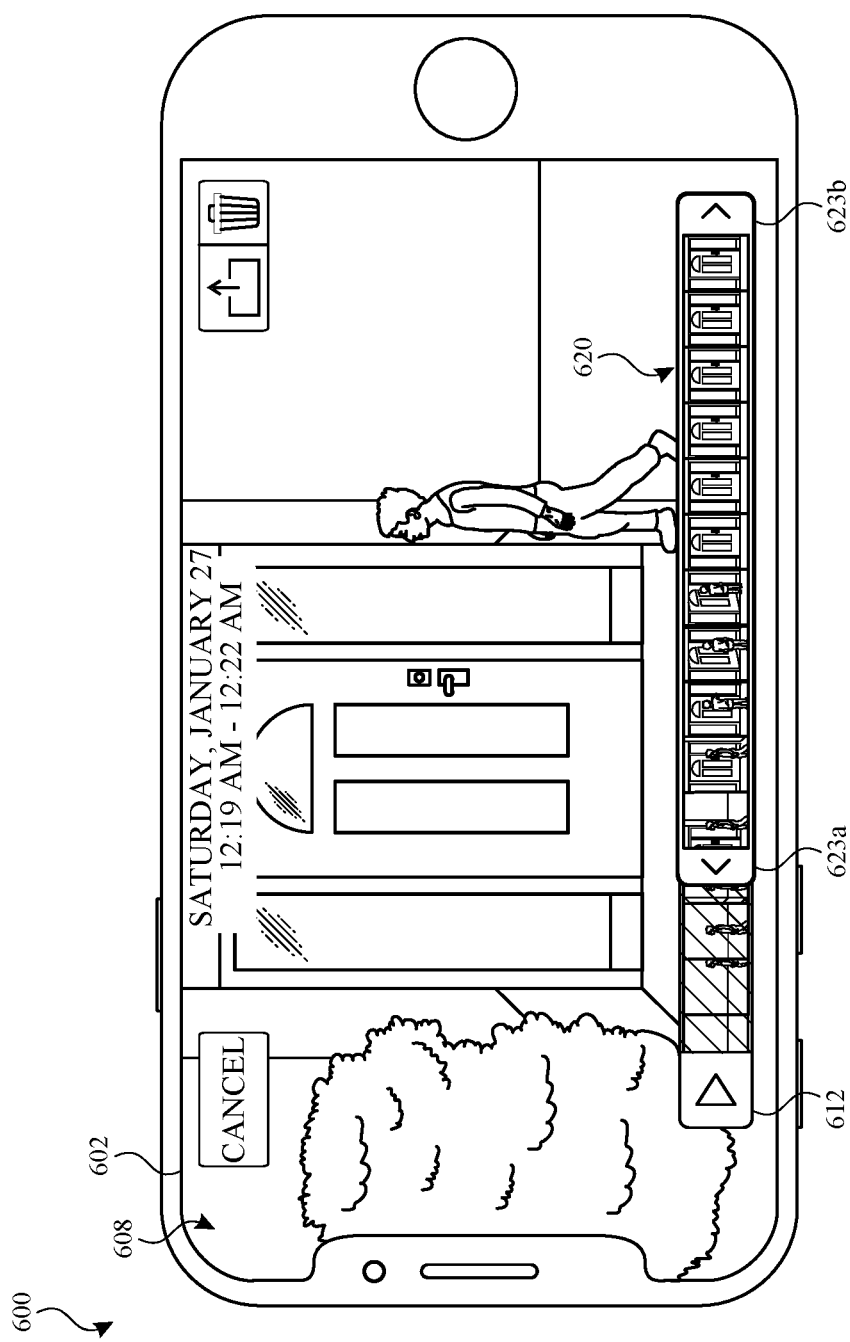
Figure 6R:
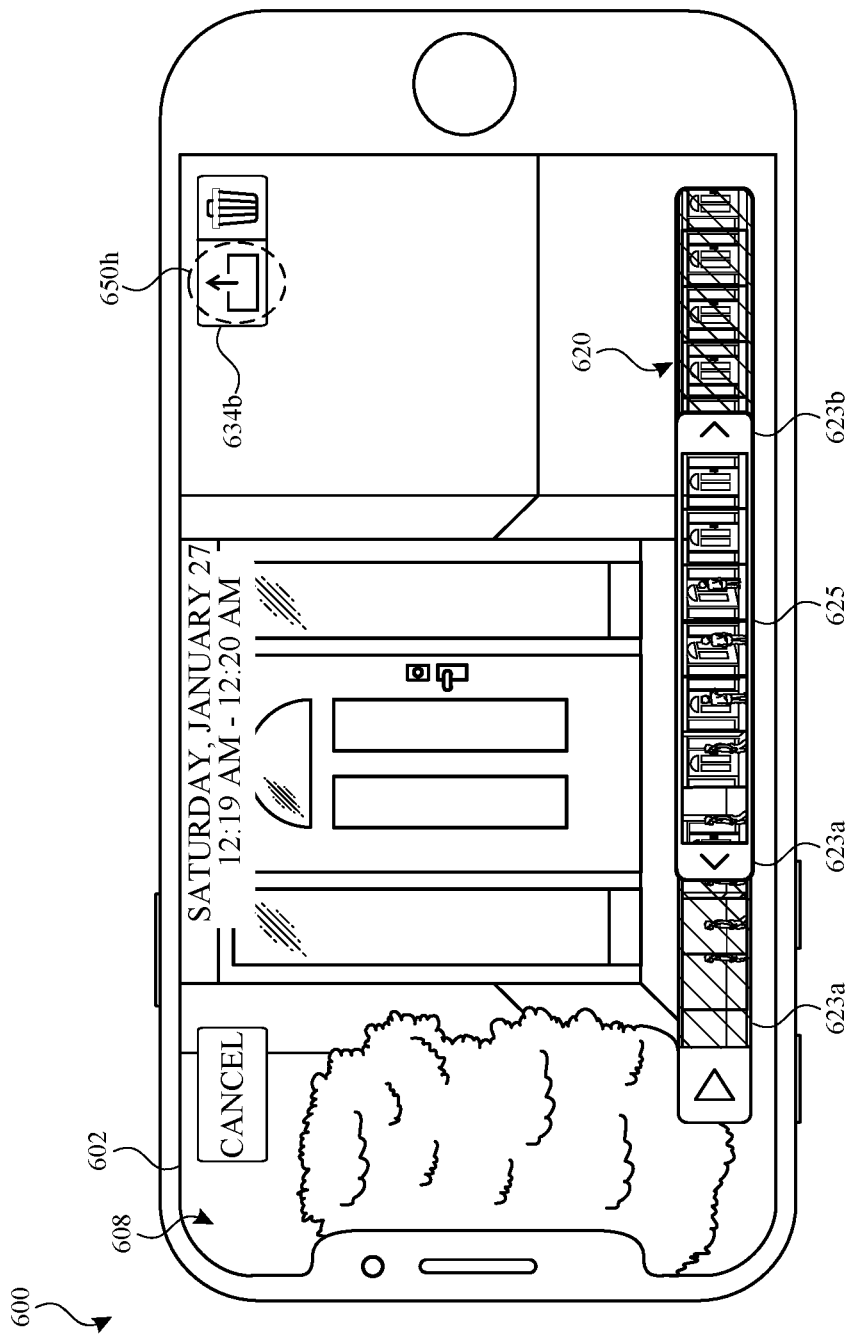
Figure 6S:
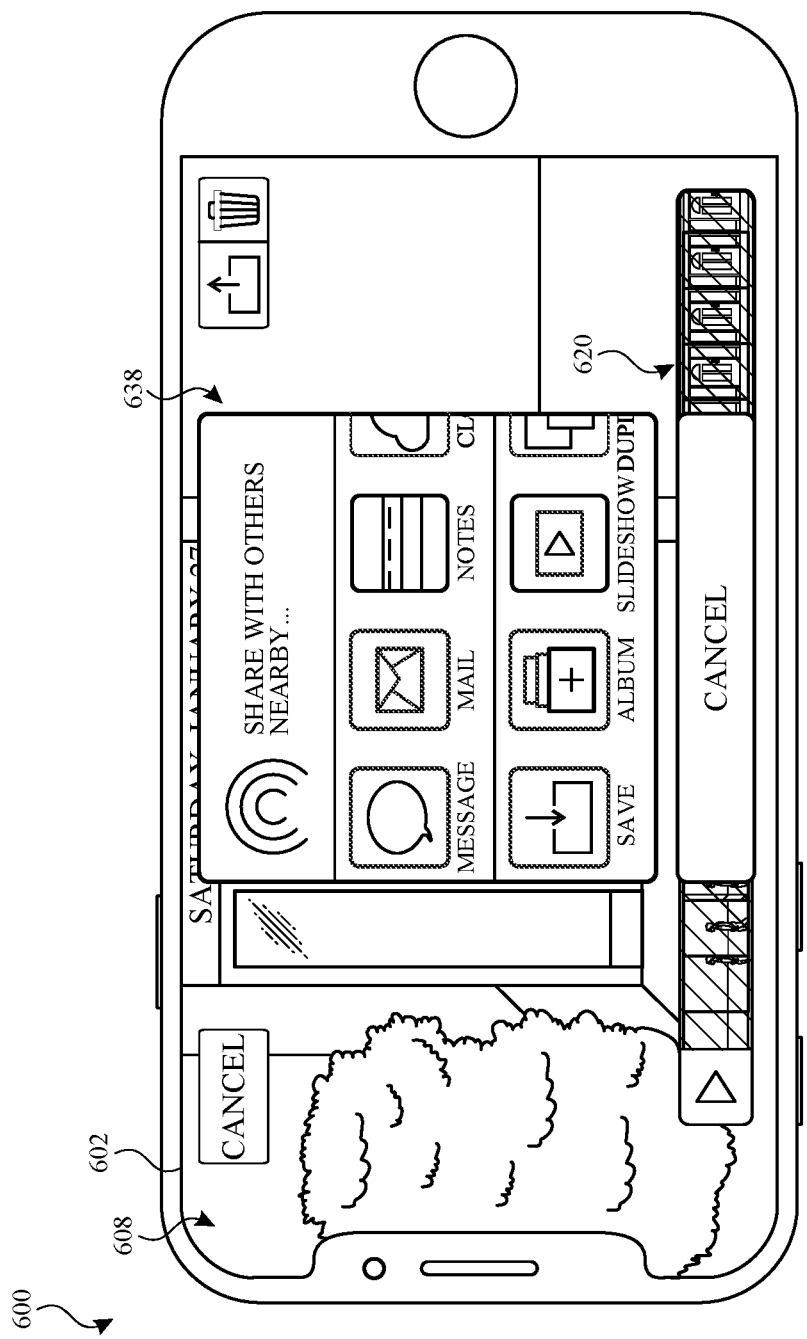
Figure 7A:
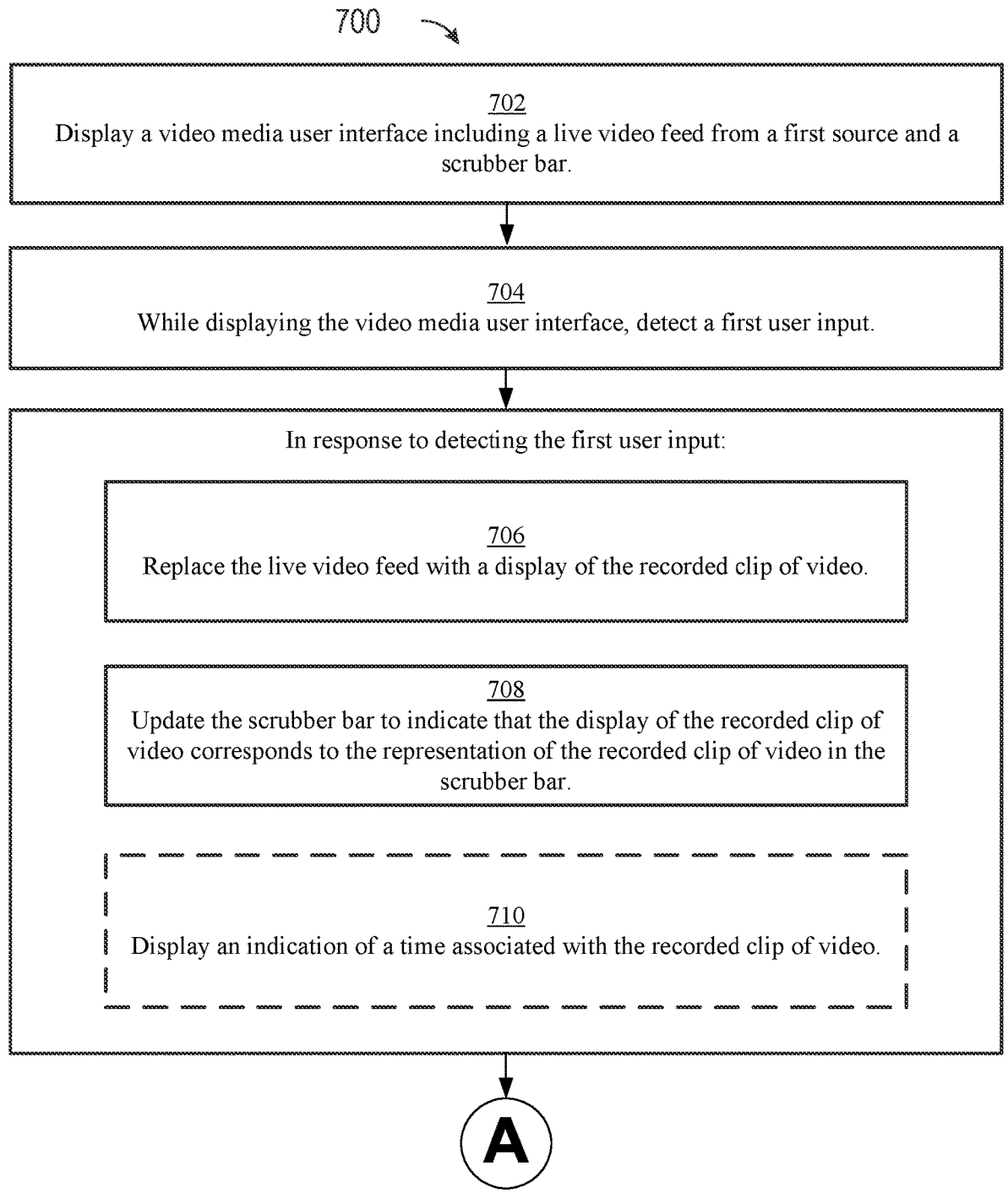
Figure 7B:
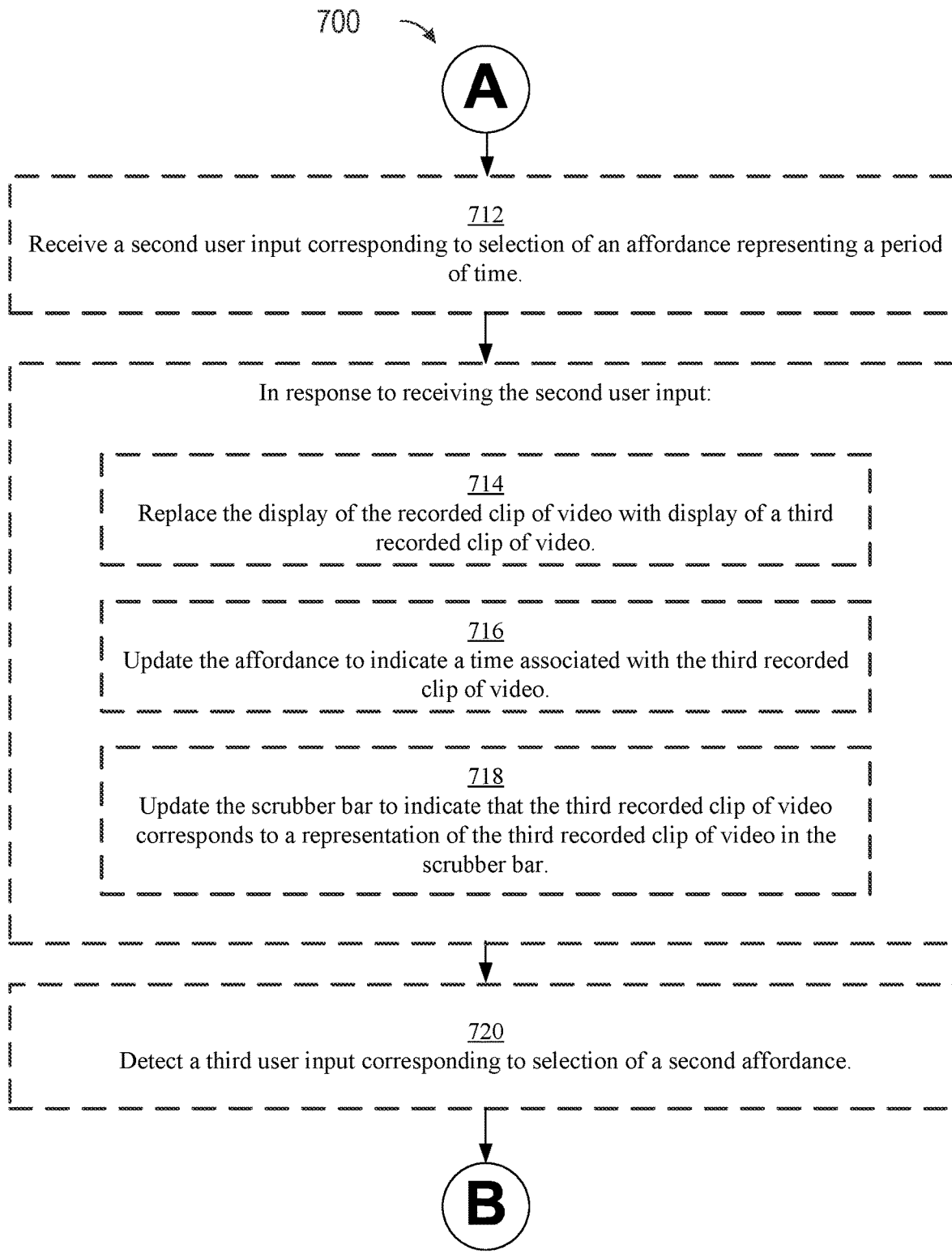

FIGS. 6A-6S illustrate exemplary user interfaces for displaying live video feeds and recorded video. FIGS. 7A-7C are a flow diagram illustrating methods of displaying live video feeds and recorded video in accordance with some embodiments. The user interfaces in FIGS. 6A-6S are used to illustrate the processes described below, including the processes in FIGS. 7A-7C.

FIGS. 8A-8J illustrate exemplary user interfaces for displaying video from a video source and controlling external devices related to the source. FIG. 9 is a flow diagram illustrating methods of displaying video from a video source and controlling external devices related to the source in accordance with some embodiments. The user interfaces in FIGS. 8A-8J are used to illustrate the processes described below, including the processes in FIG. 9.

FIGS. 10A-10J illustrate exemplary user interfaces for displaying and navigating video from multiple sources of video data. FIGS. 11A-11C are a flow diagram illustrating methods of displaying and navigating video from multiple sources of video data in accordance with some embodiments. The user interfaces in FIGS. 10A-10J are used to illustrate the processes described below, including the processes in FIGS. 11A-11C.

Figure 12A:
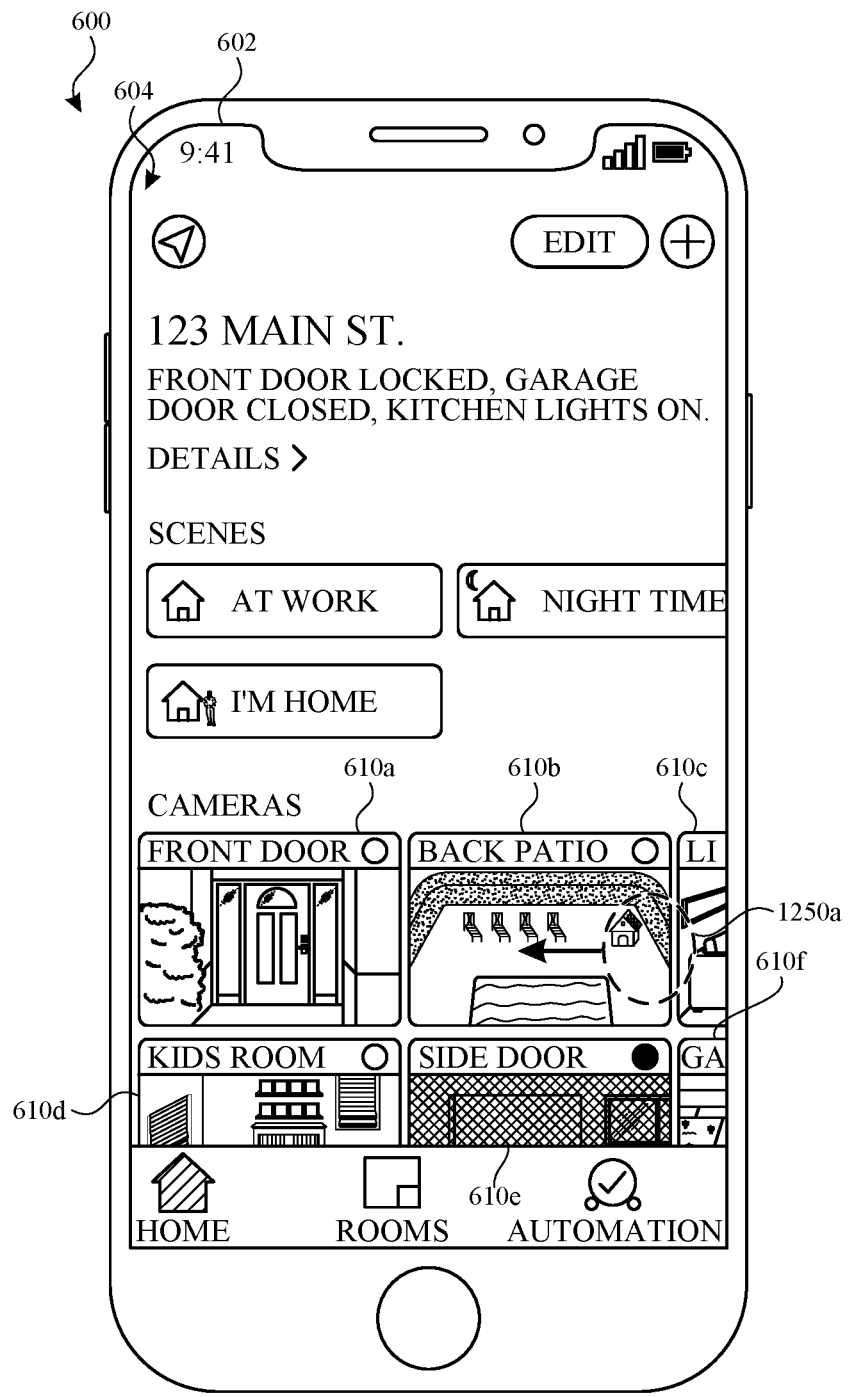
FIGS. 12A-12T illustrate exemplary user interfaces for configuring a source of video data for different contexts in accordance with some embodiments.
Figure 12B:
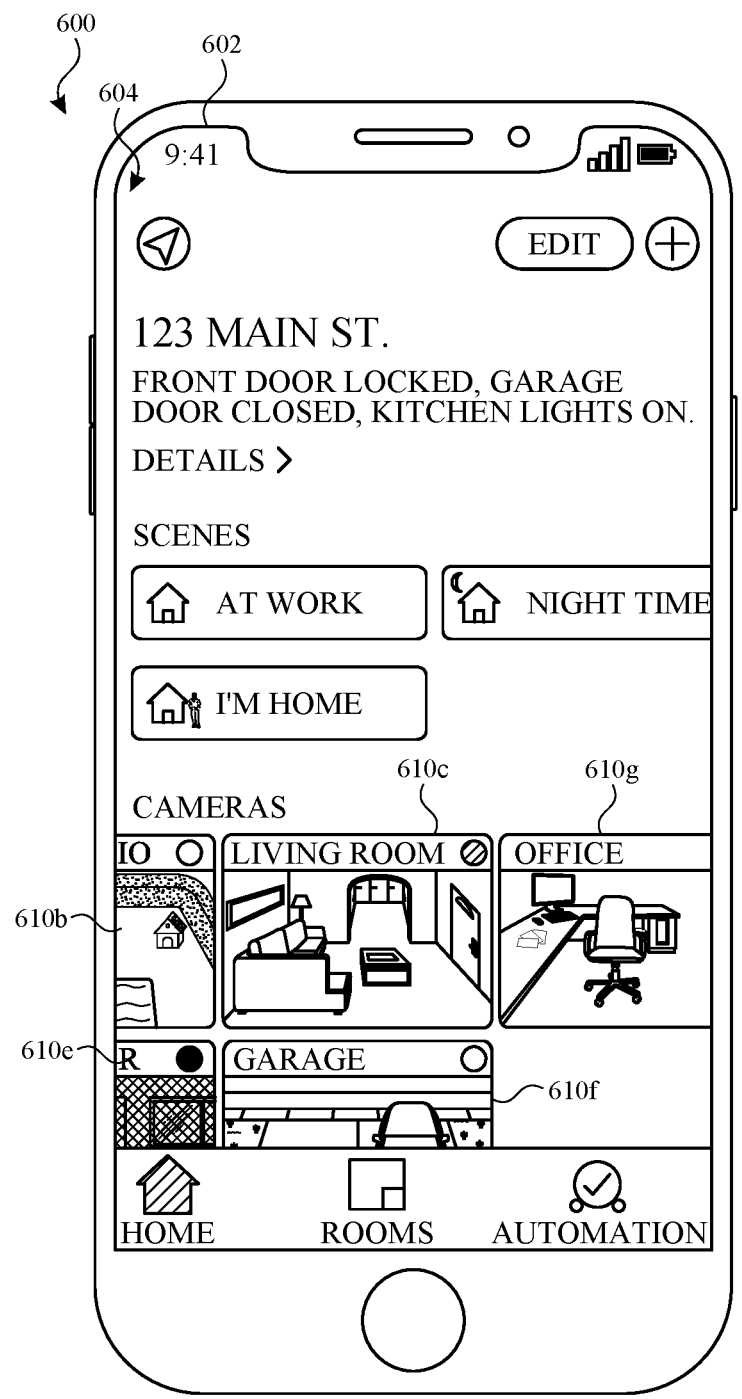
Figure 12C:
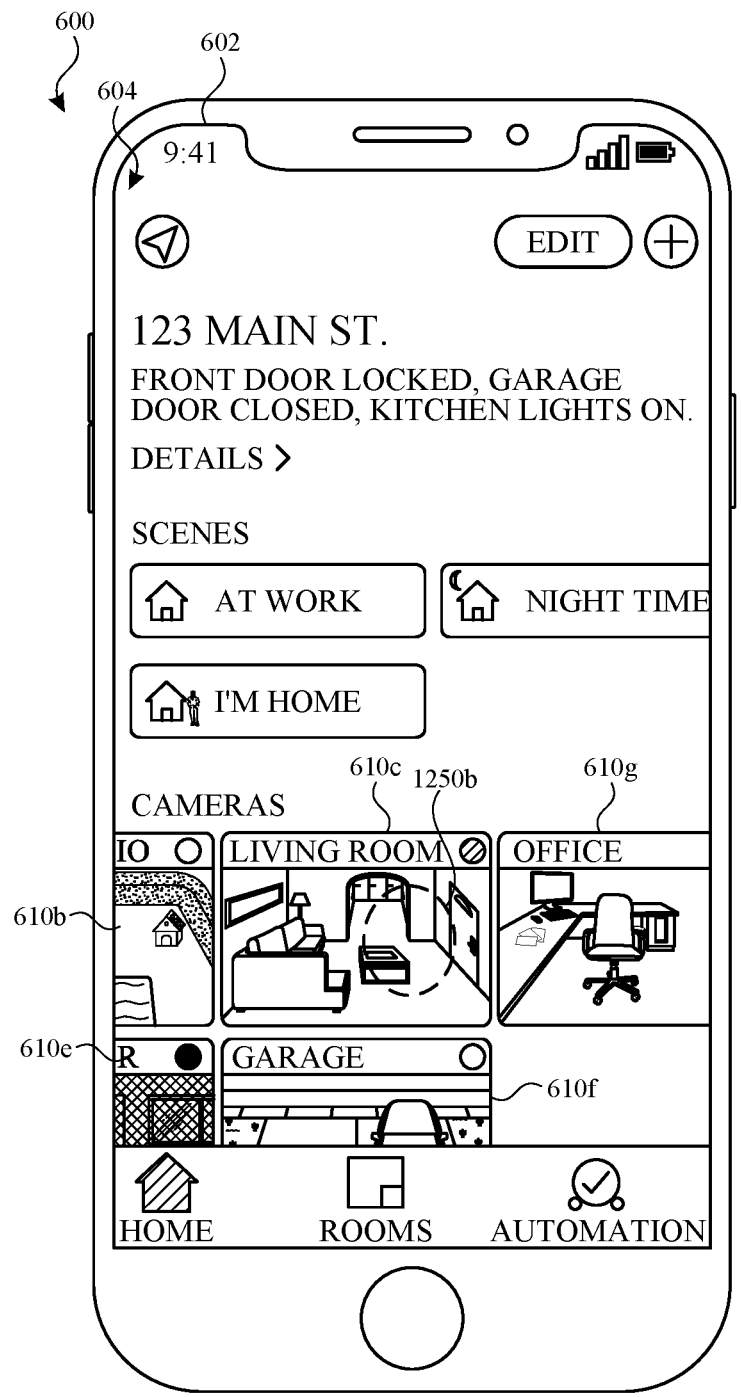
Figure 12D:
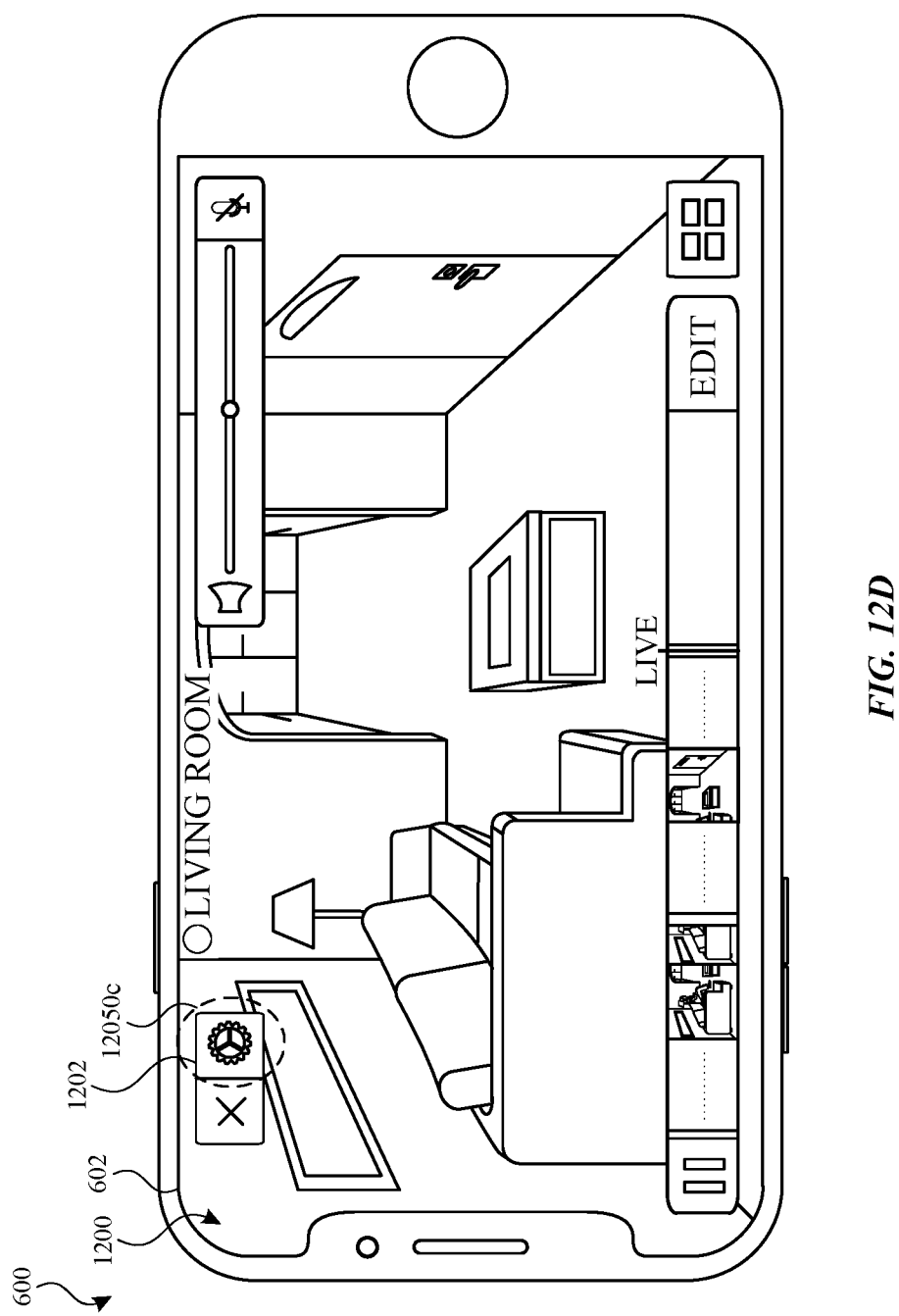
Figure 12E:
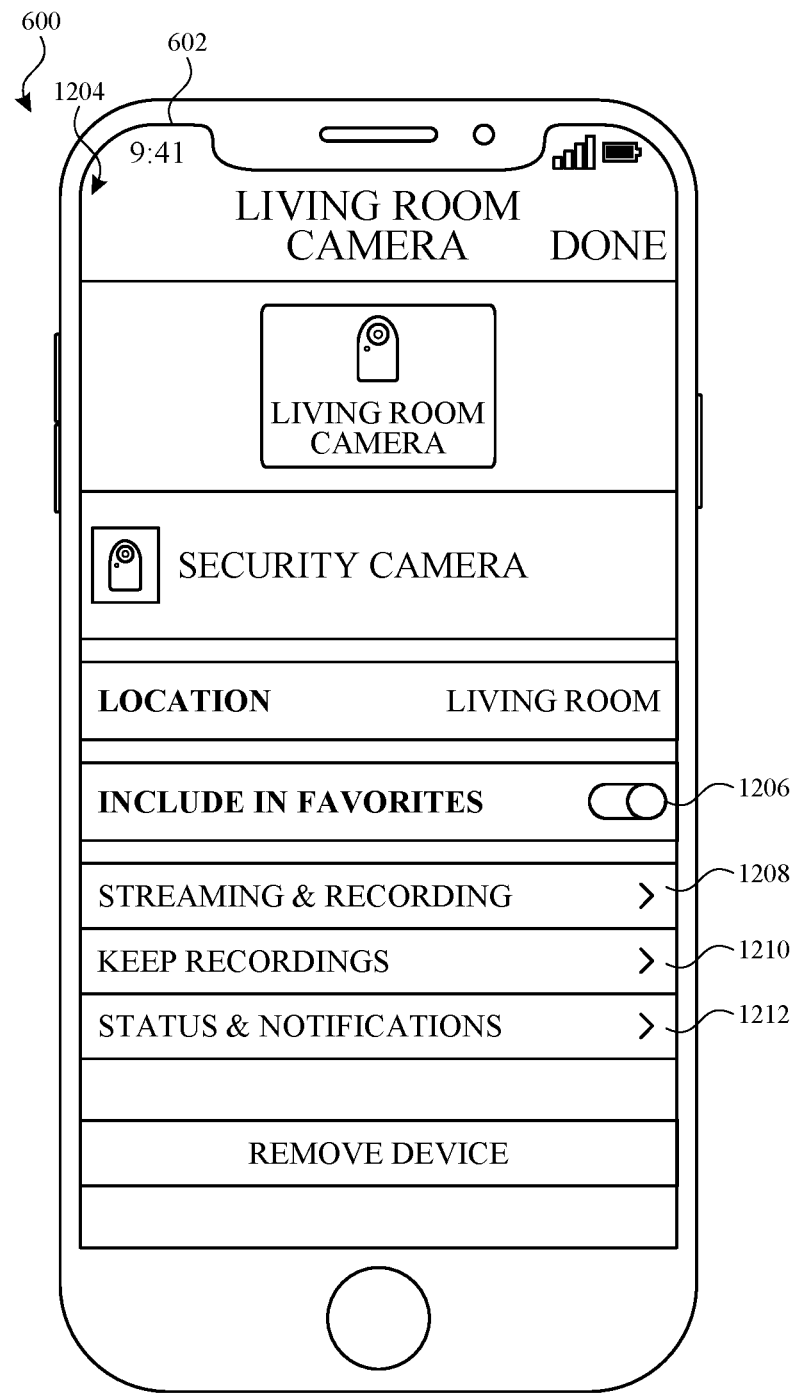
Figure 12F:
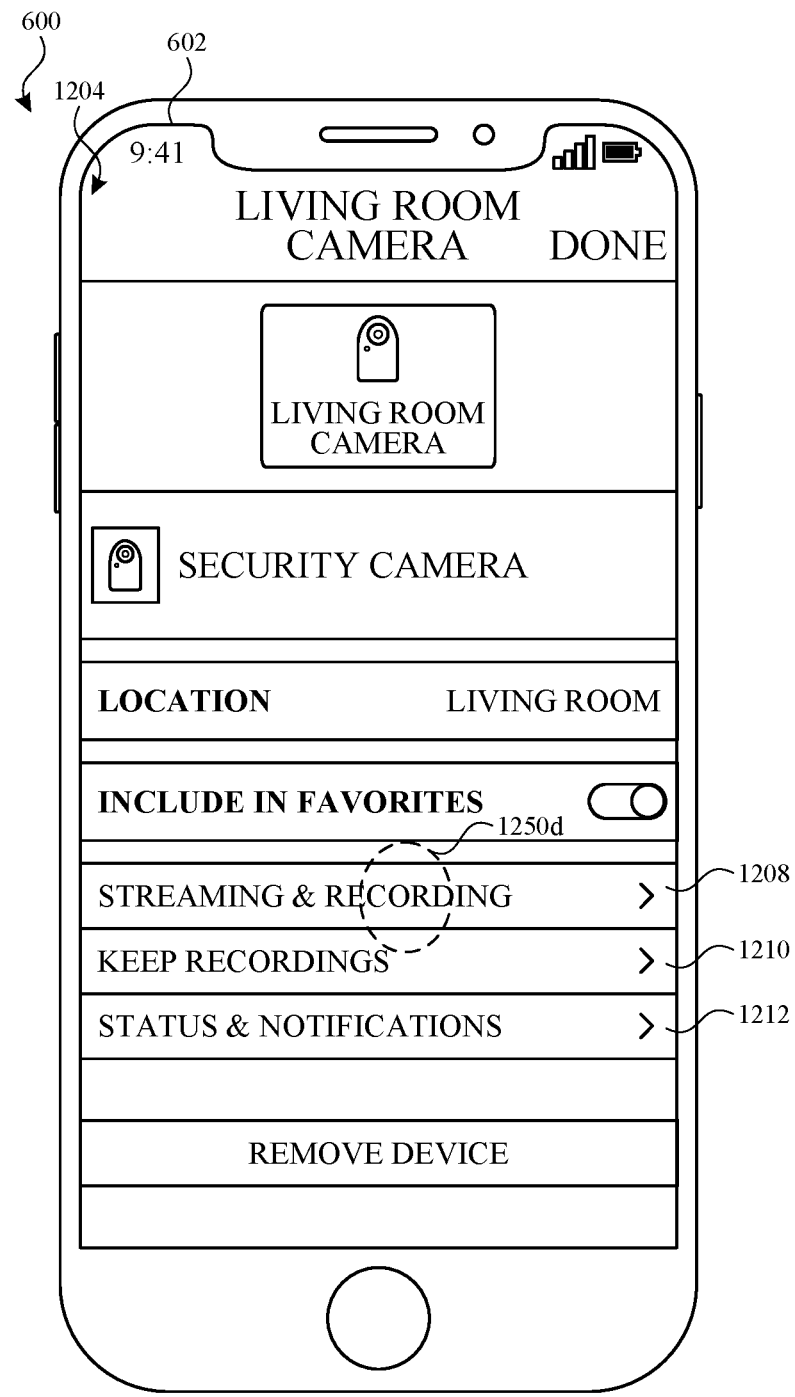
Figure 12G:
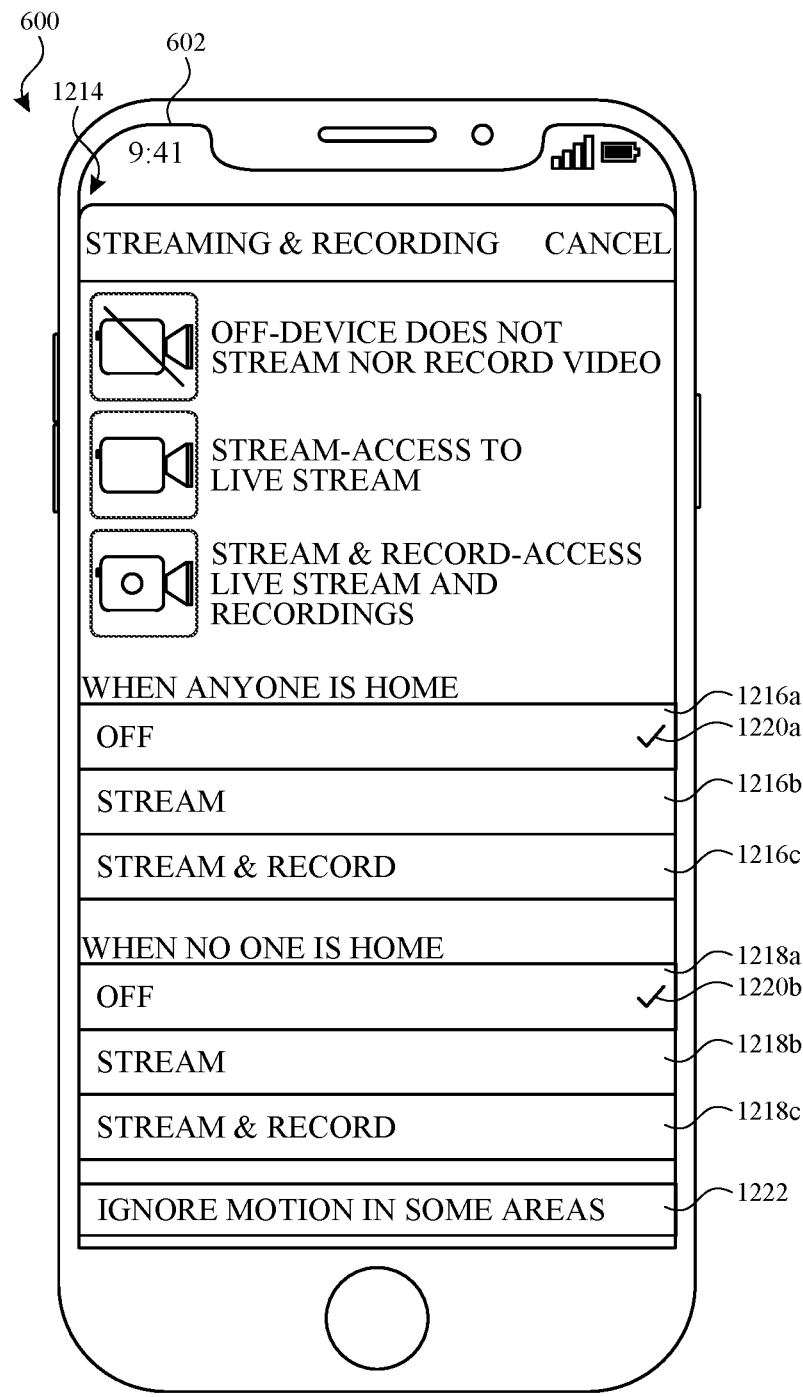
Figure 12H:
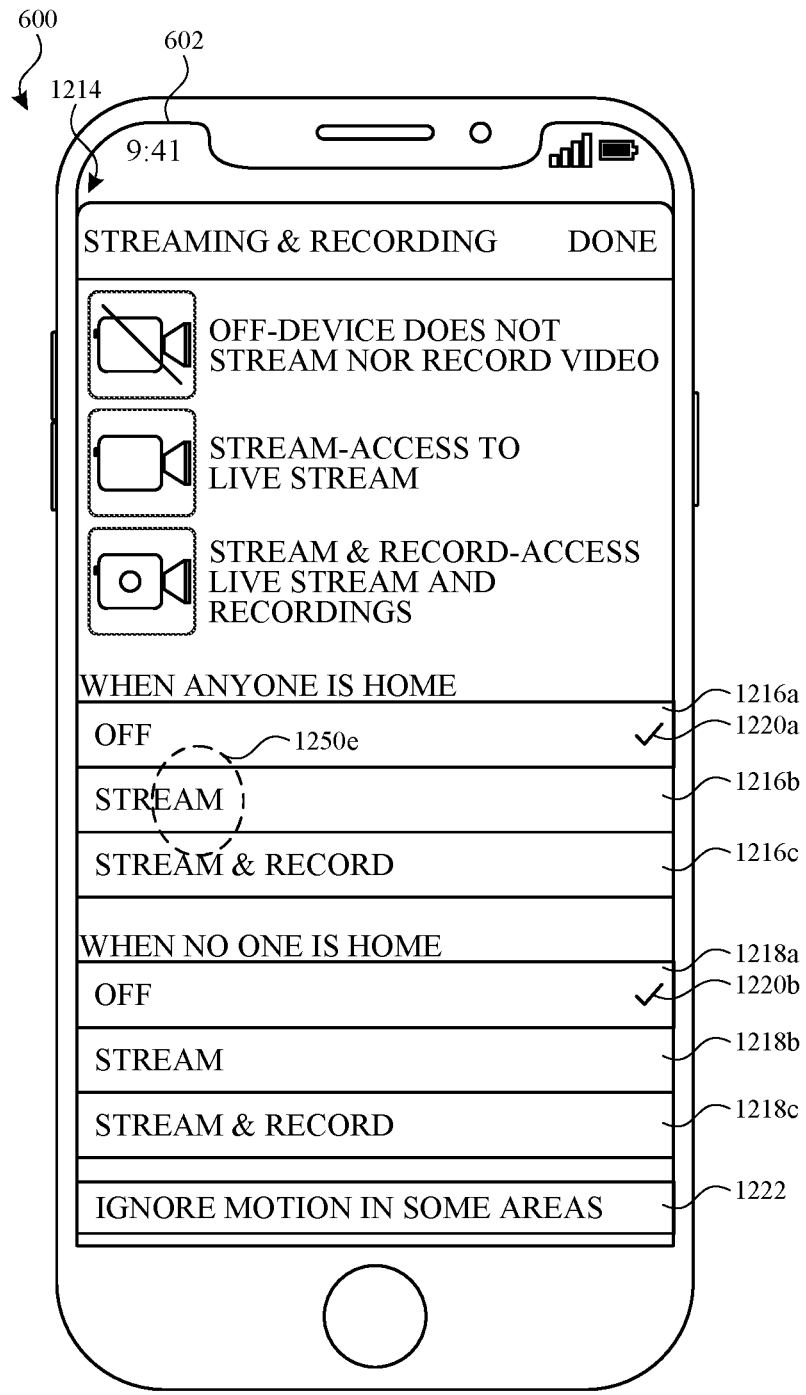
Figure 12I:
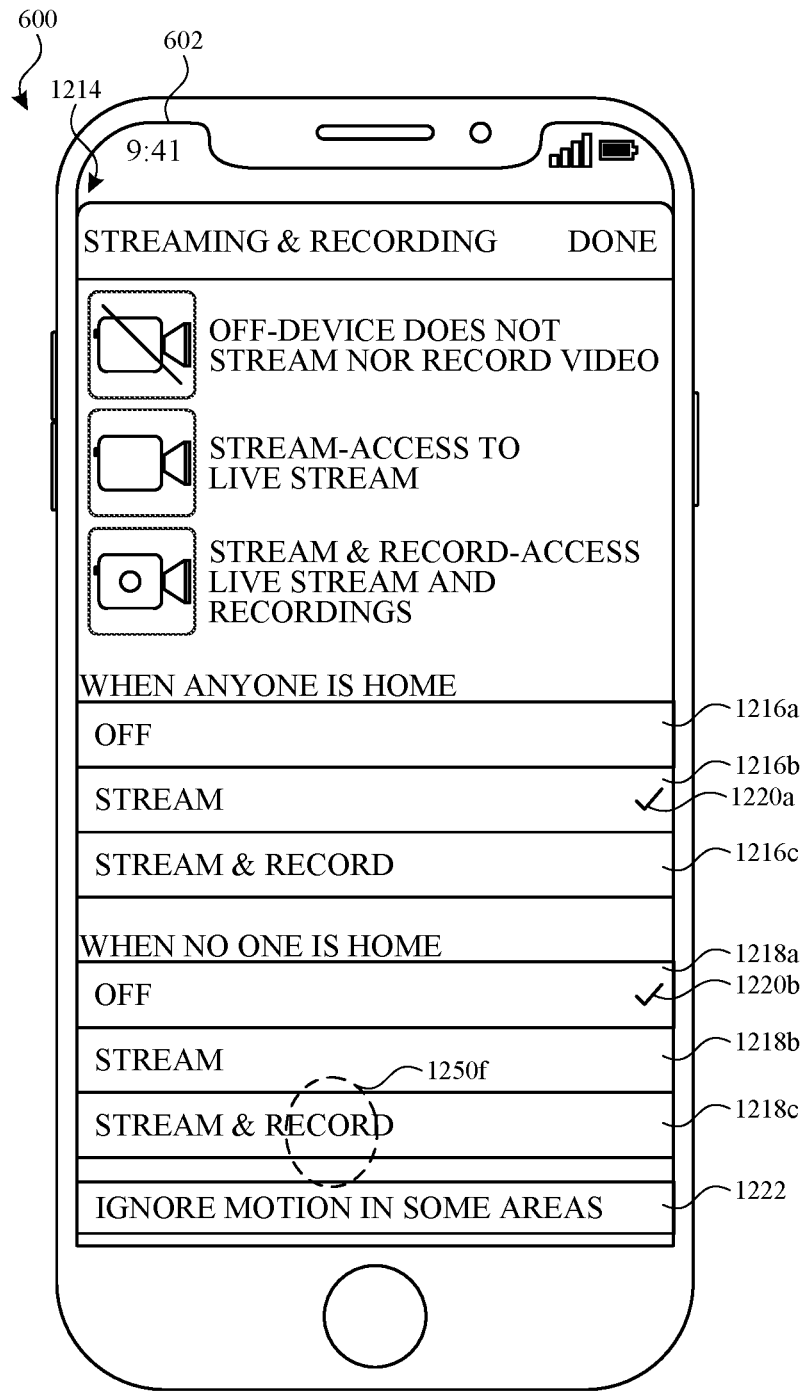
Figure 12J:
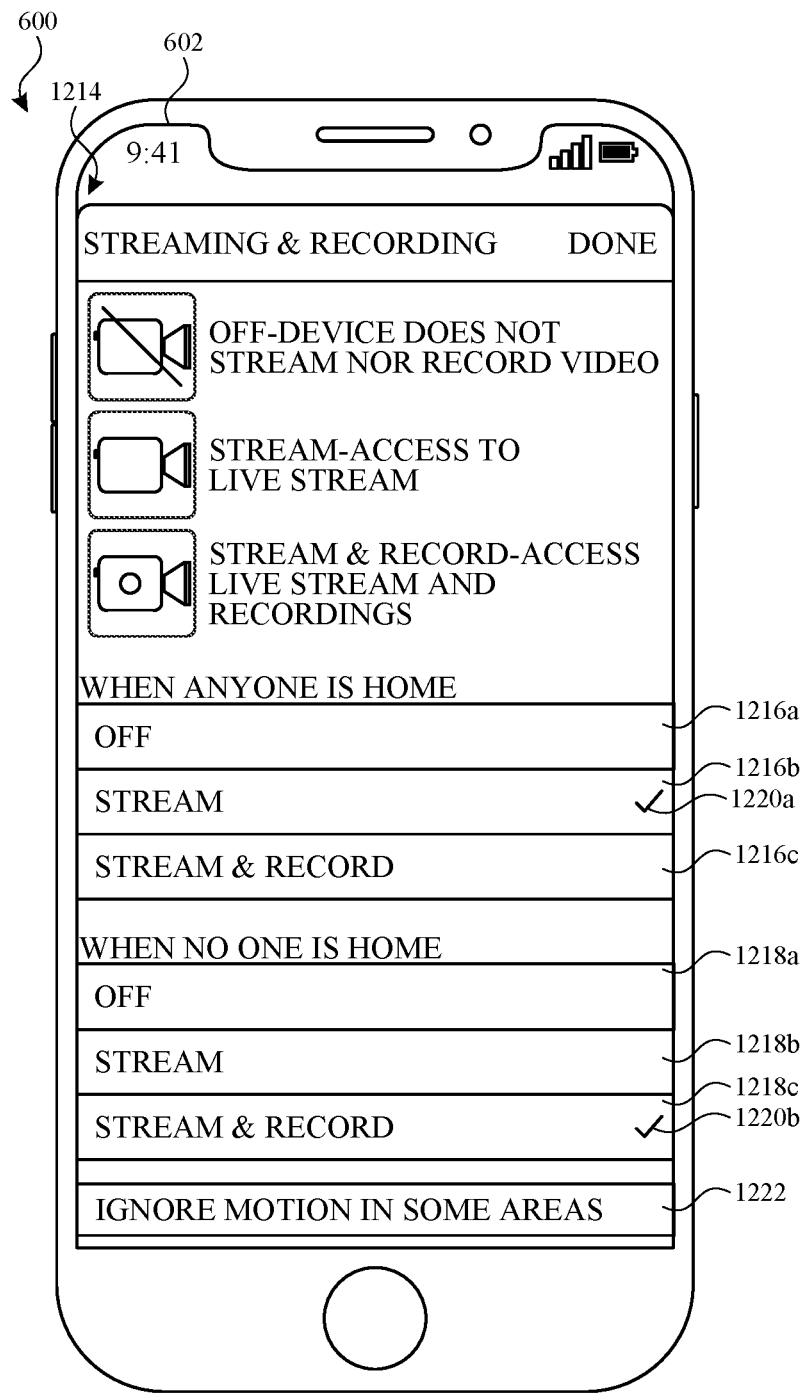
Figure 12K:
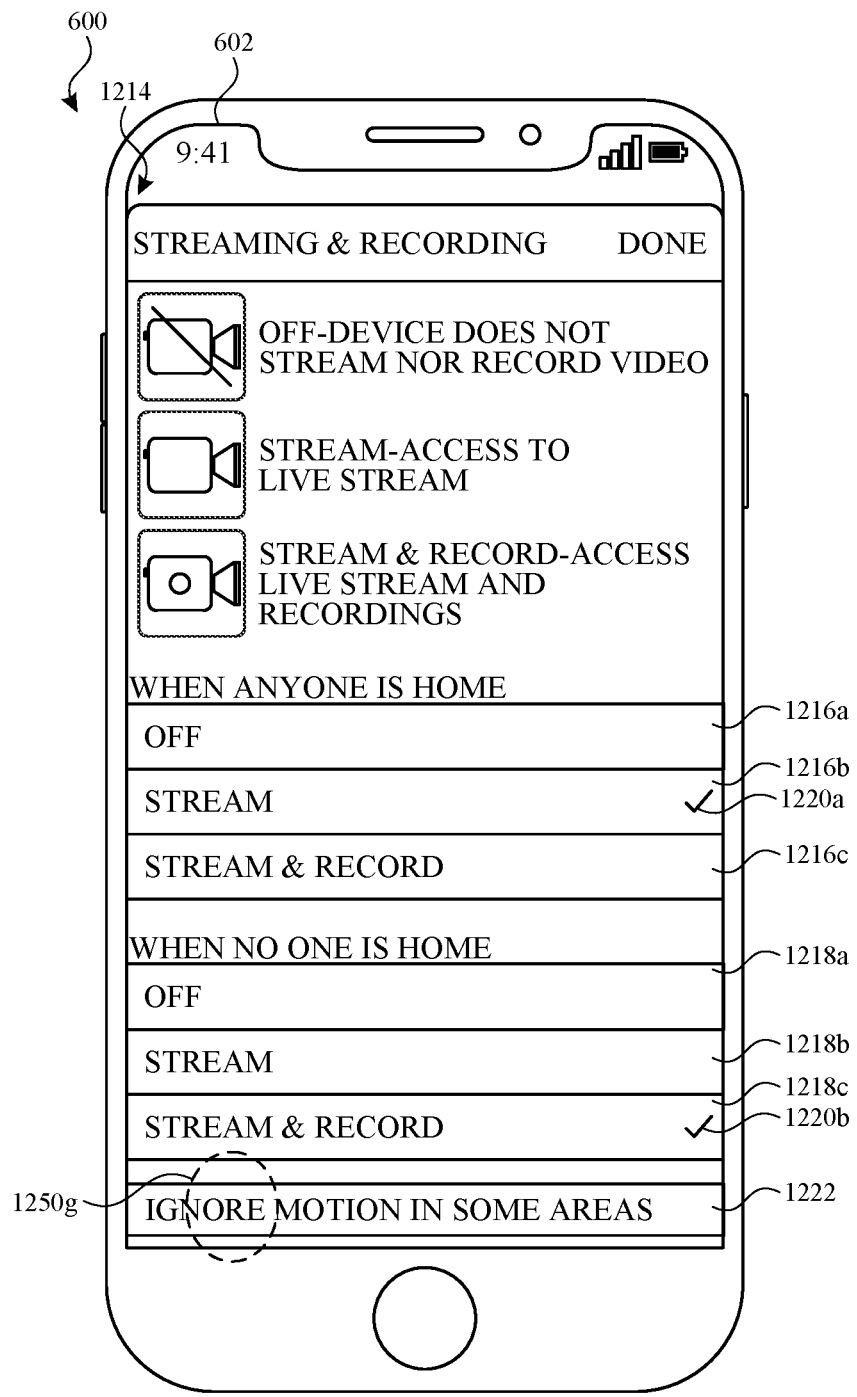
Figure 12L:
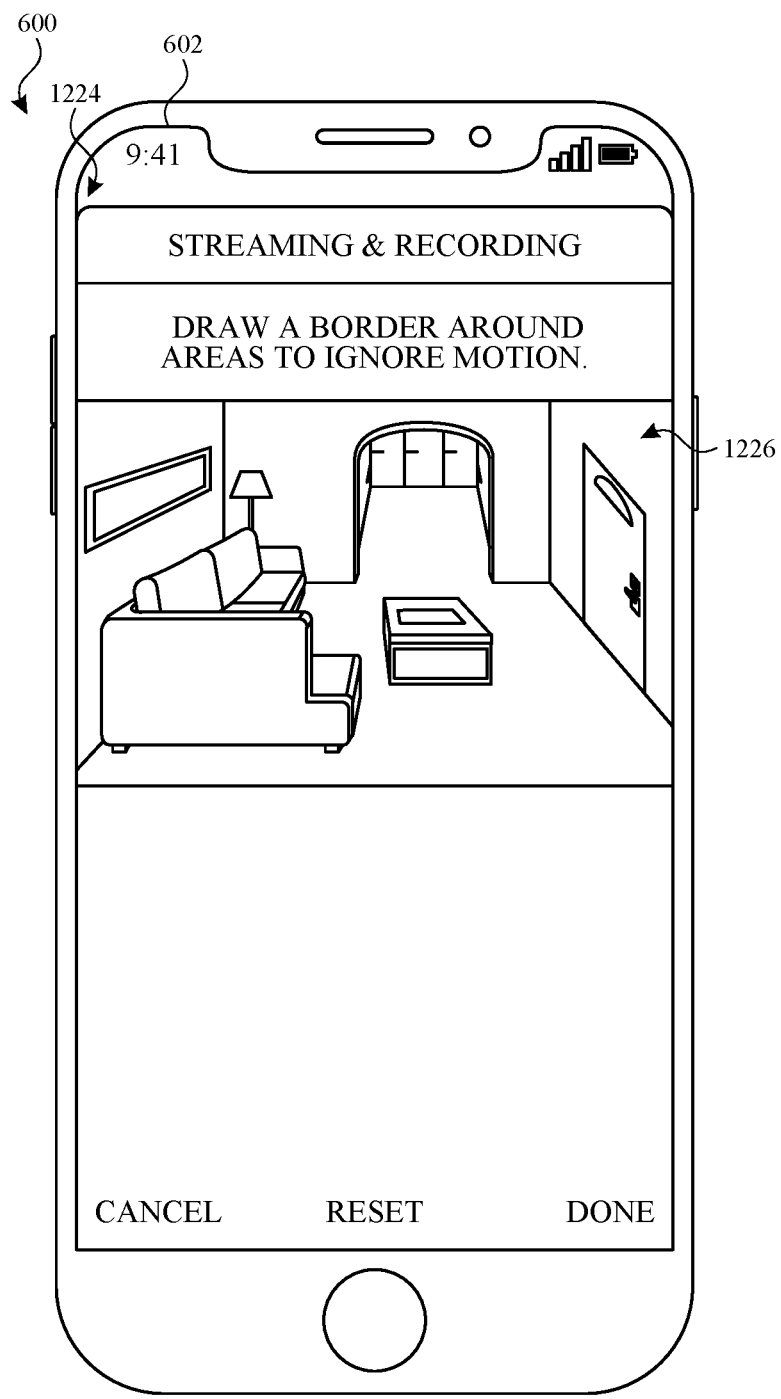
Figure 12M:
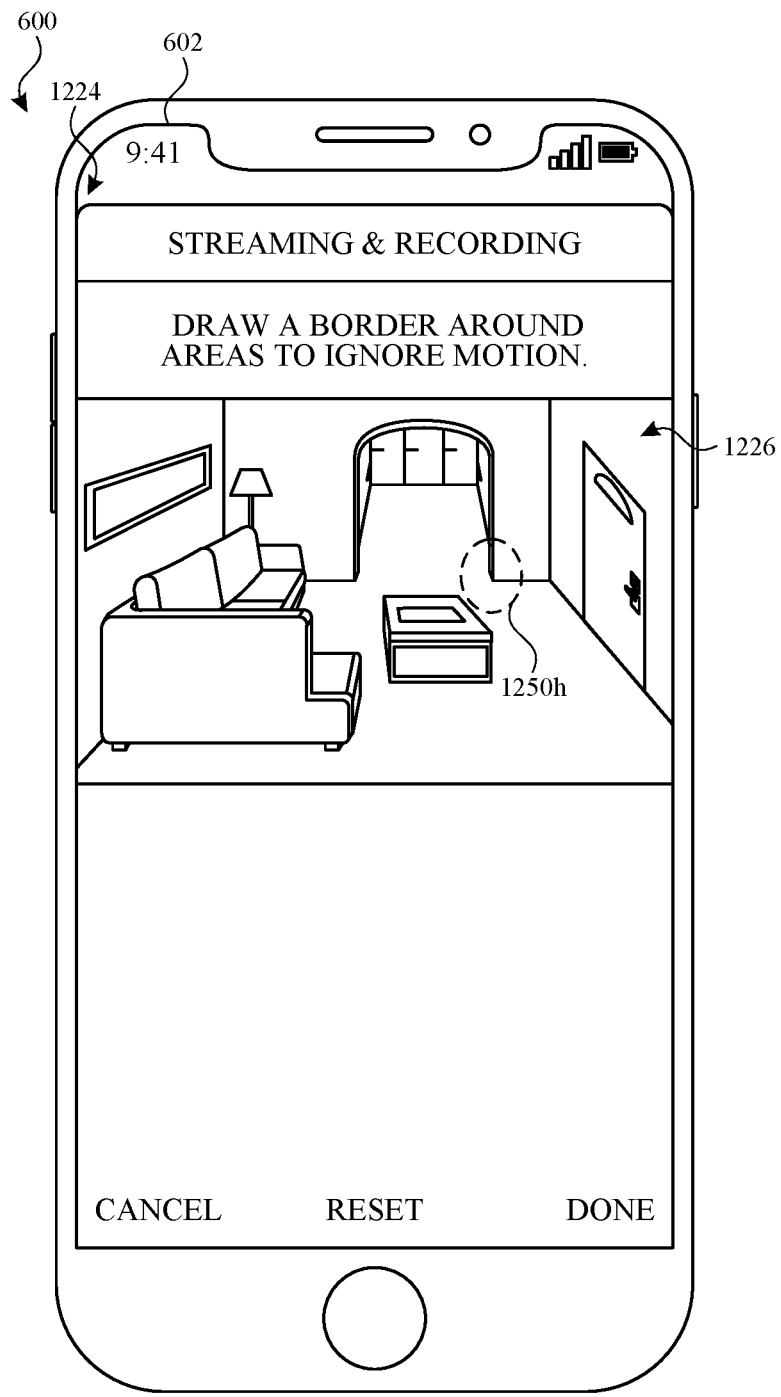
Figure 12N:
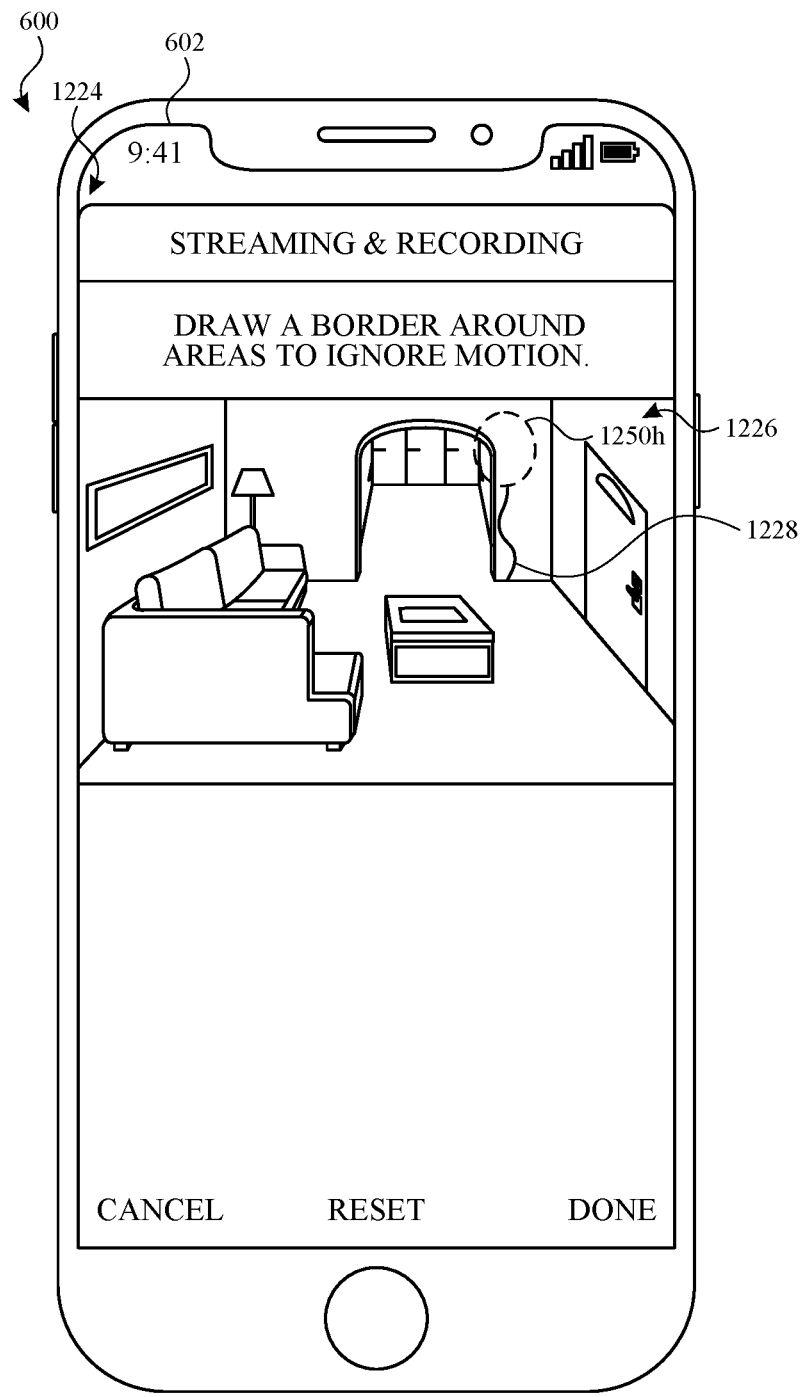
Figure 12O:
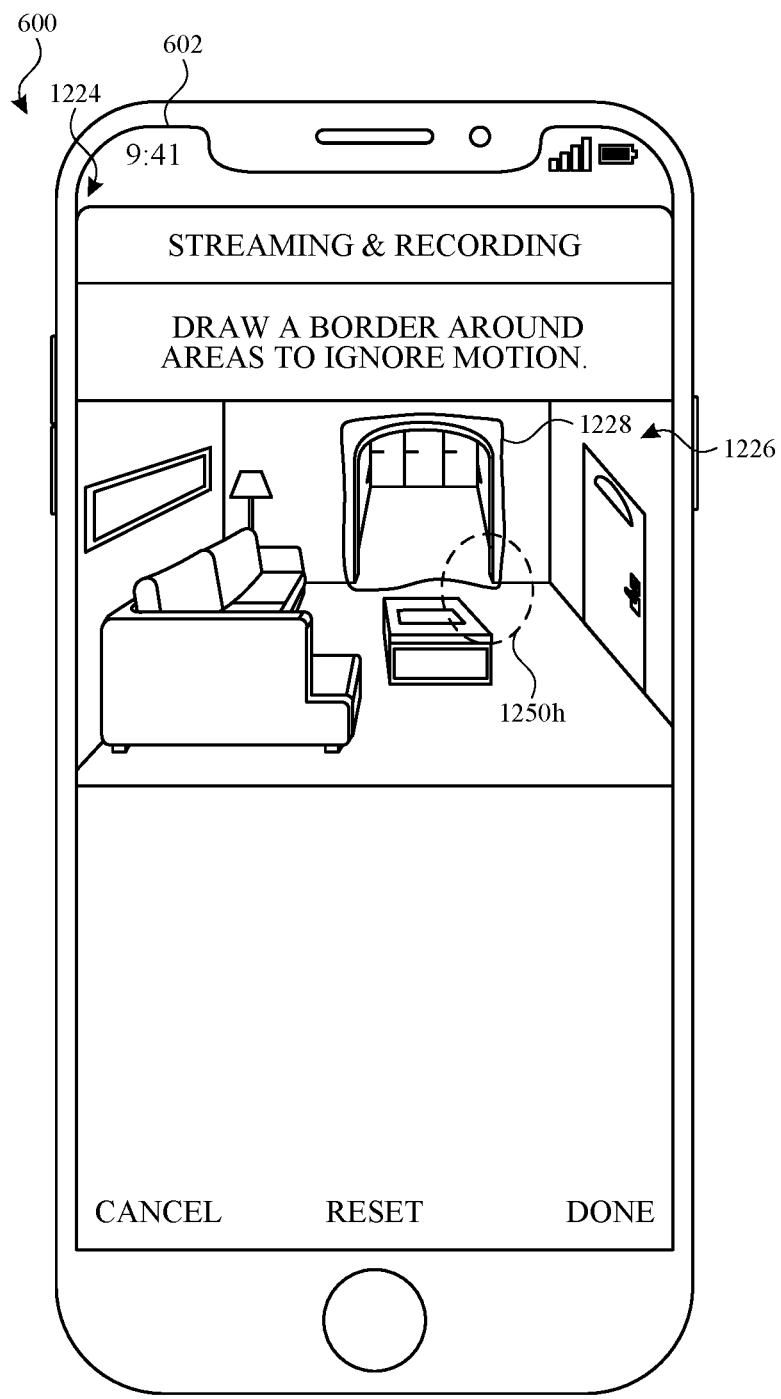
Figure 12P:
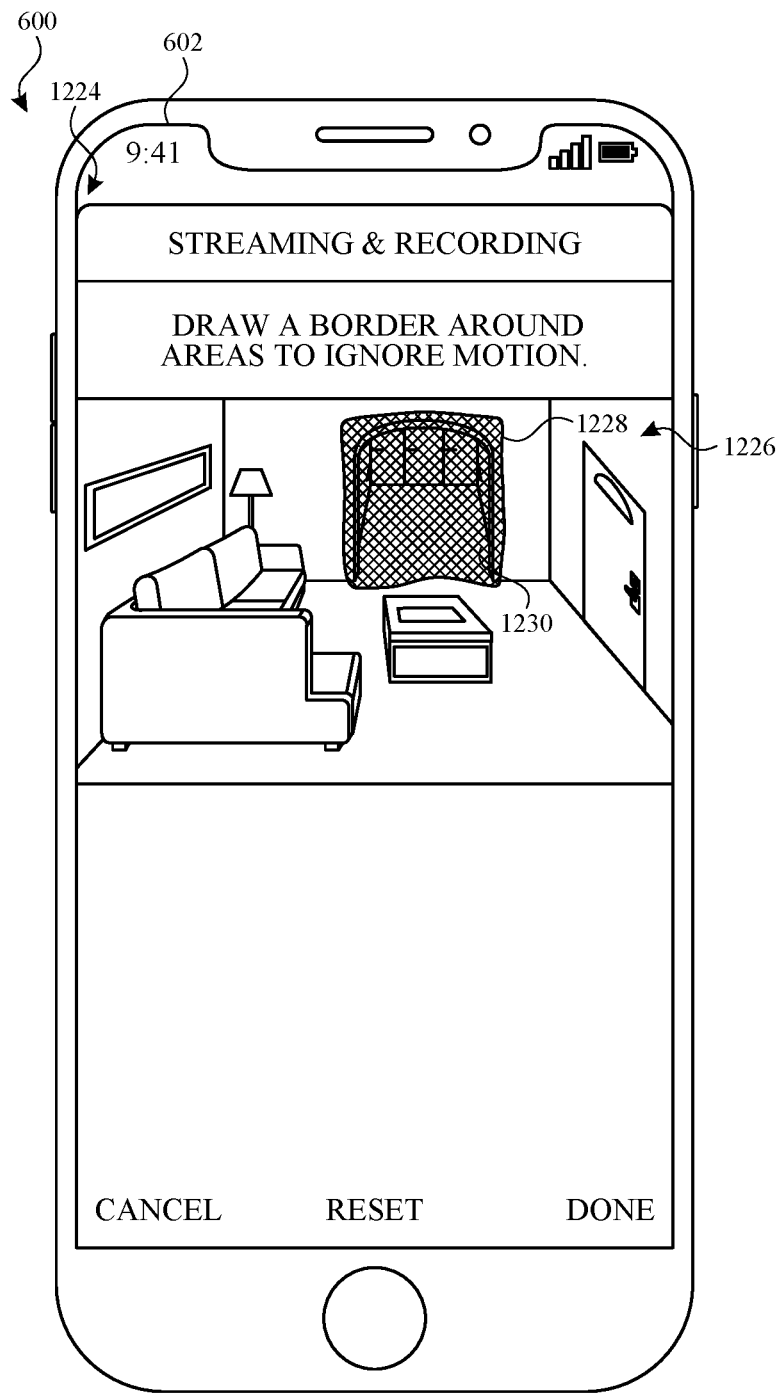
Figure 12Q:
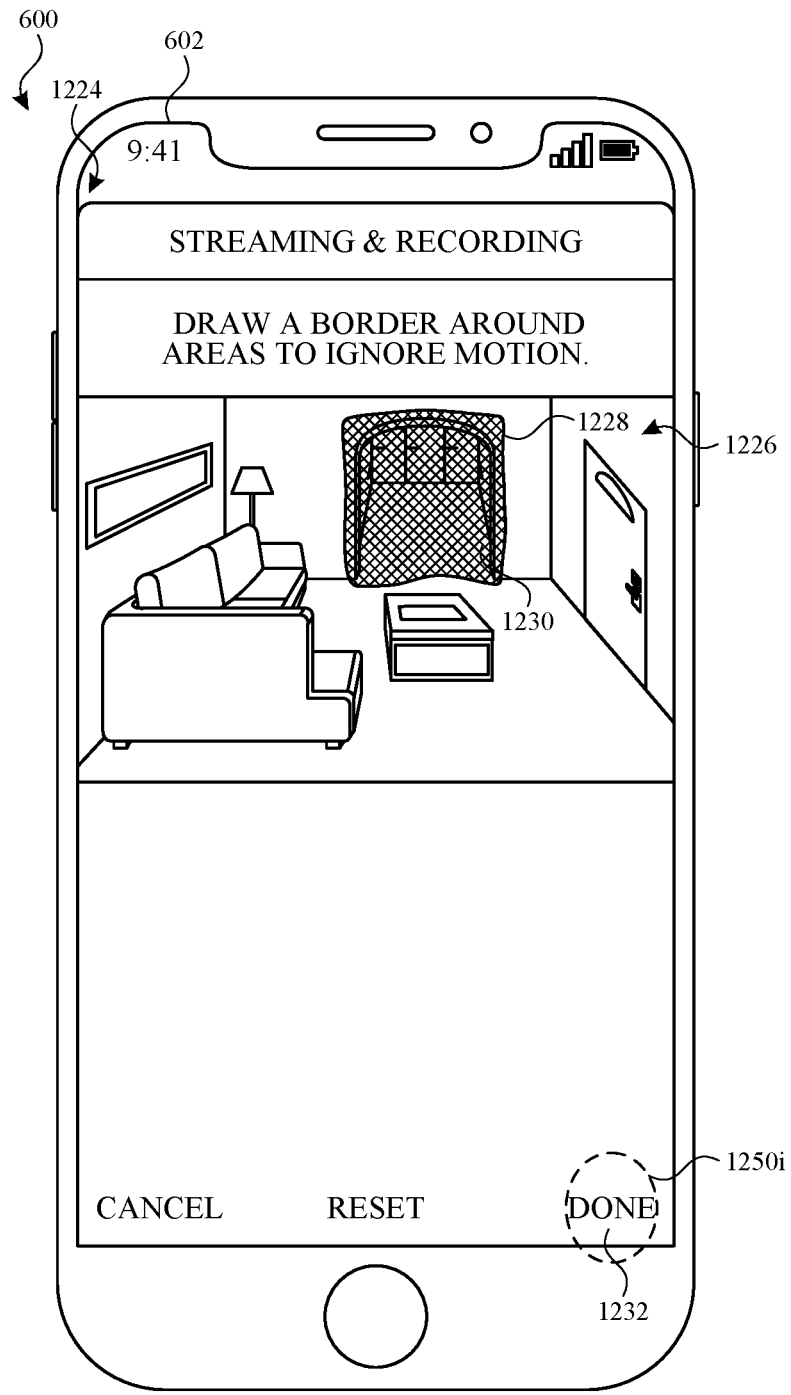
Figure 12R:
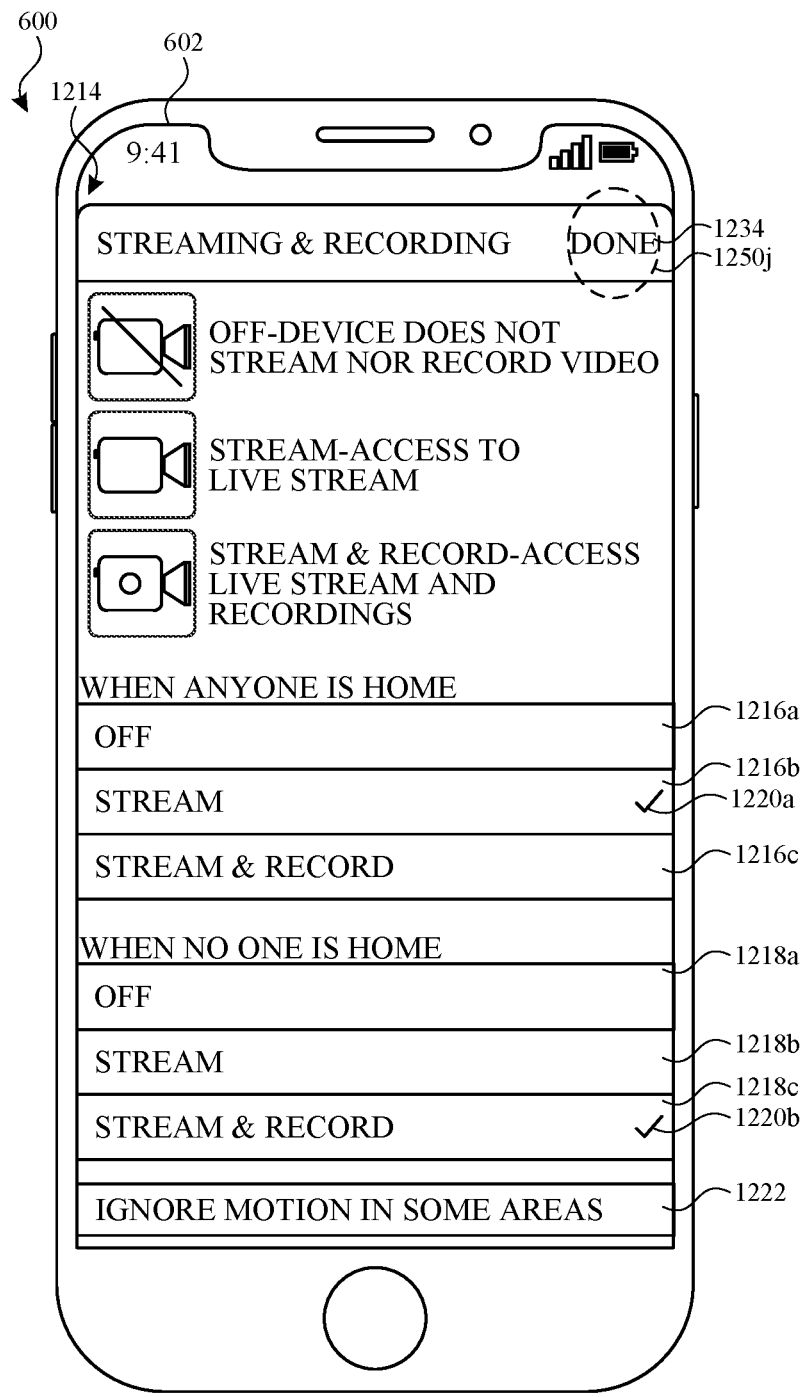
Figure 12S:
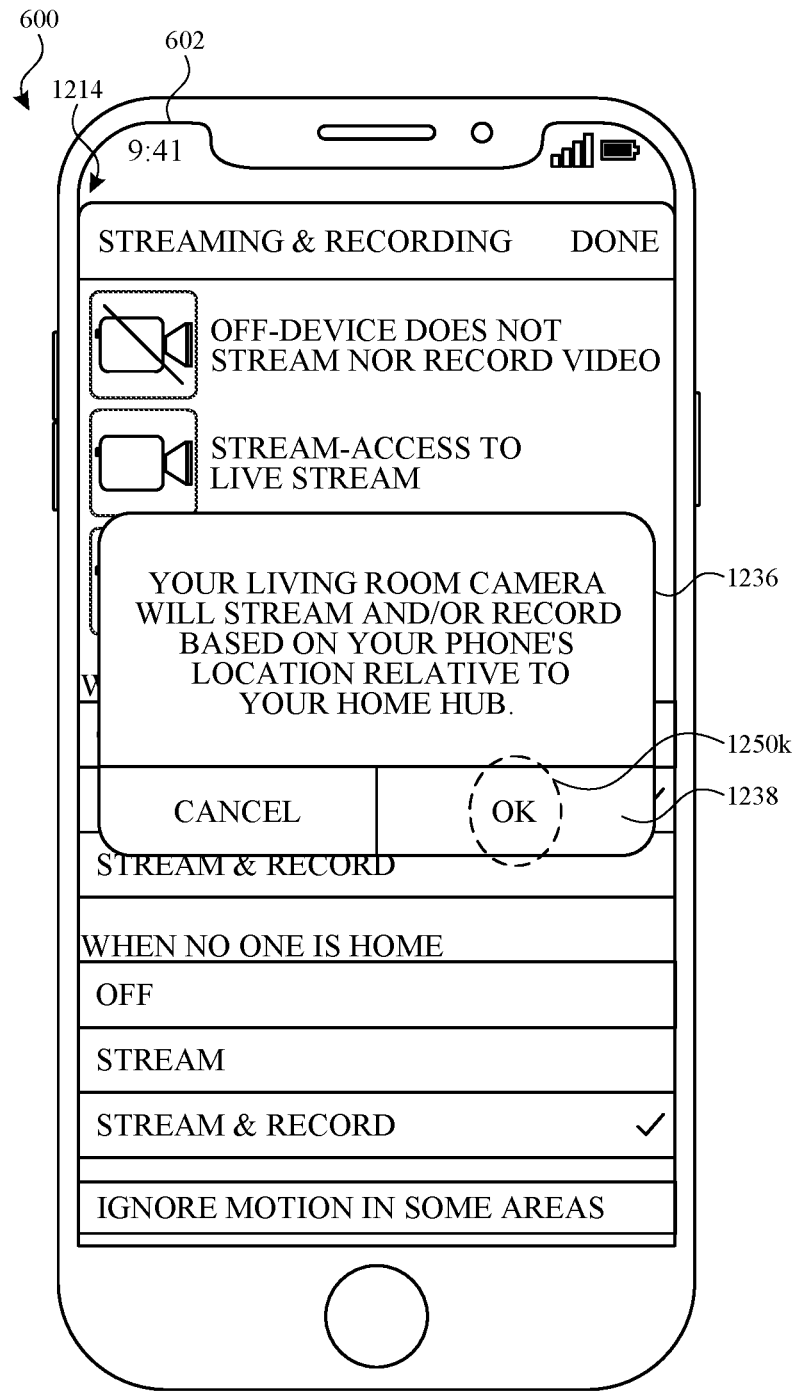
Figure 12T:
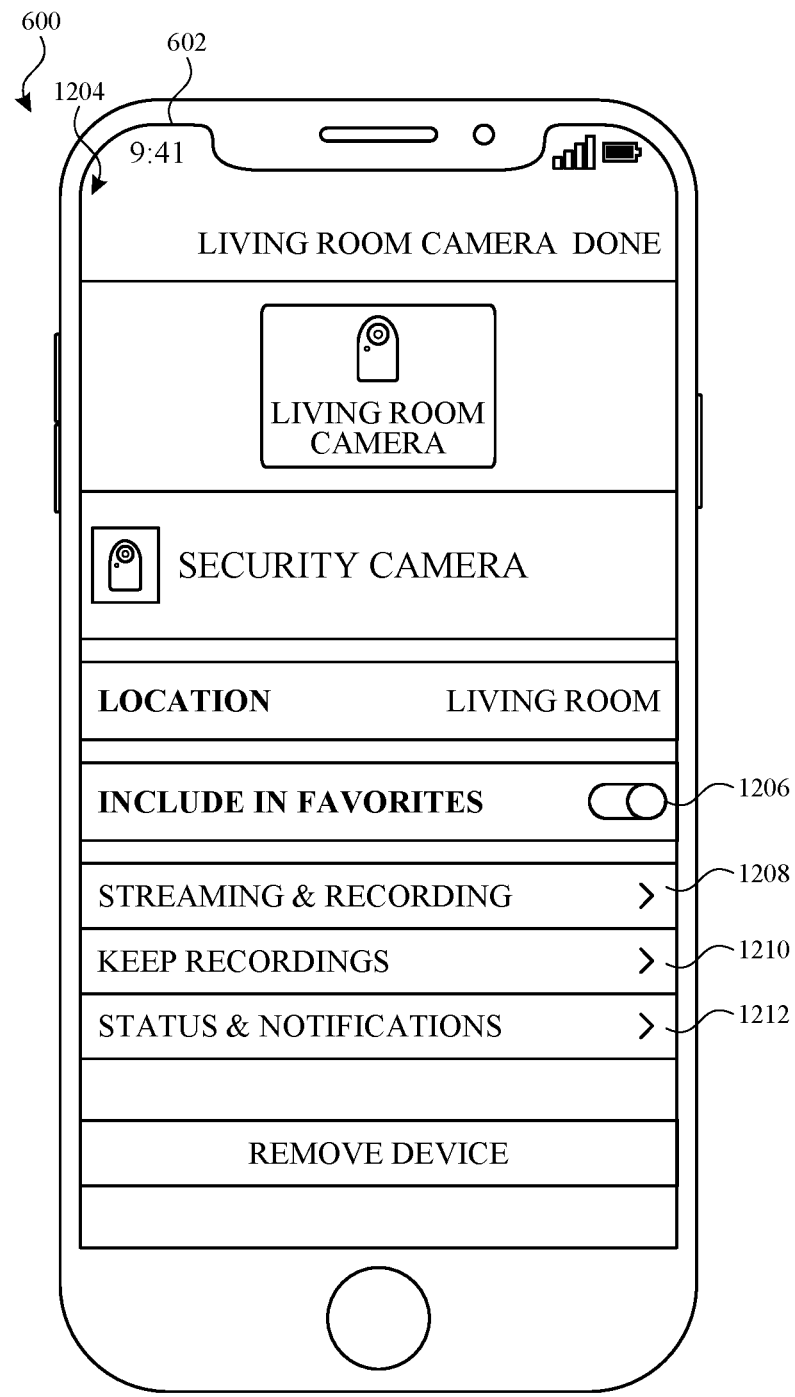
Figure 13:
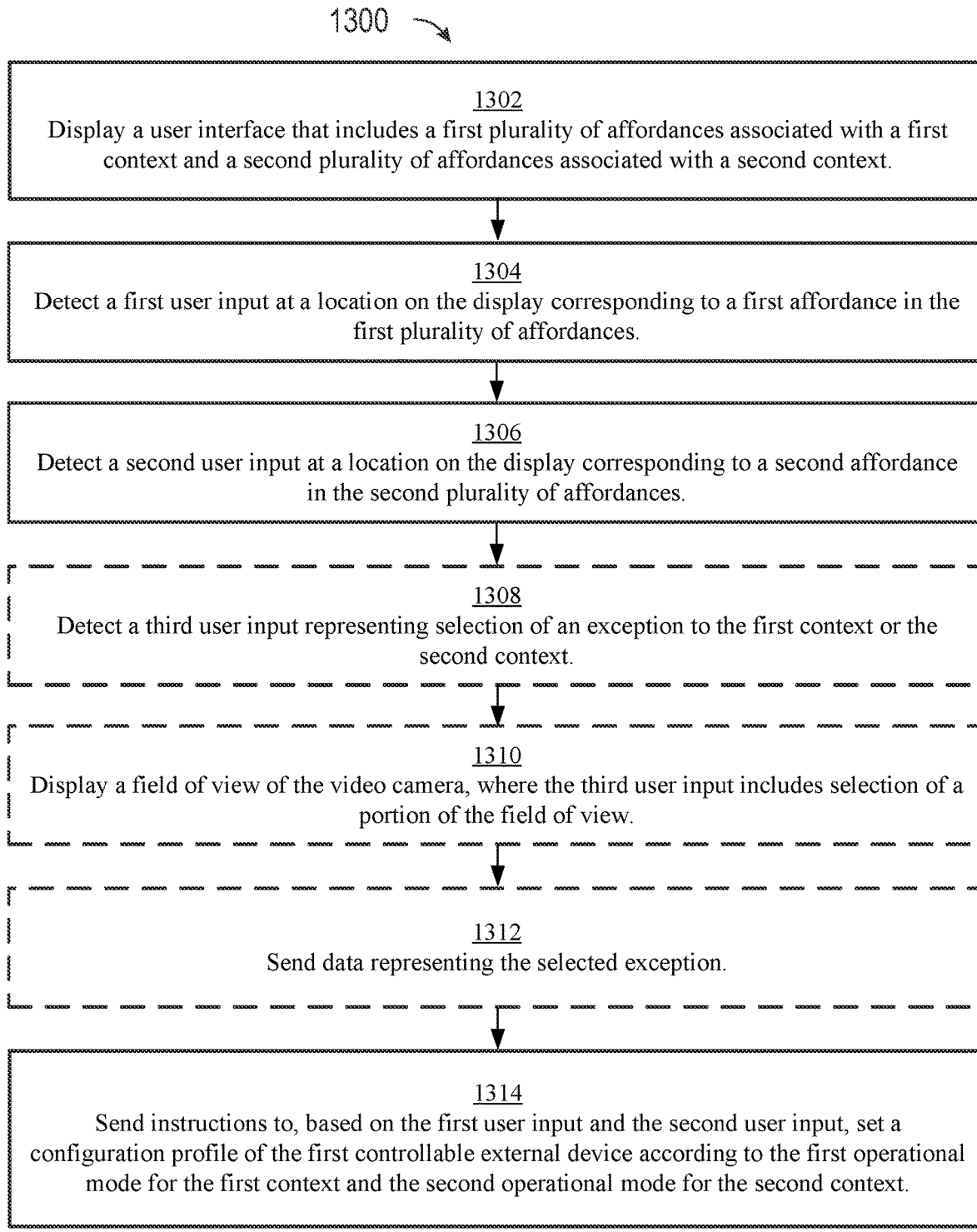
FIG. 13 is a flow diagram illustrating methods of configuring a source of video data for different contexts in accordance with some embodiments.

FIGS. 12A-12T illustrate exemplary user interfaces for configuring a source of video data for different contexts. FIG. 13 is a flow diagram illustrating methods of configuring a source of video data for different contexts in accordance with some embodiments. The user interfaces in FIGS. 12A-12T are used to illustrate the processes described below, including the processes in FIG. 13.

Figure 14A:
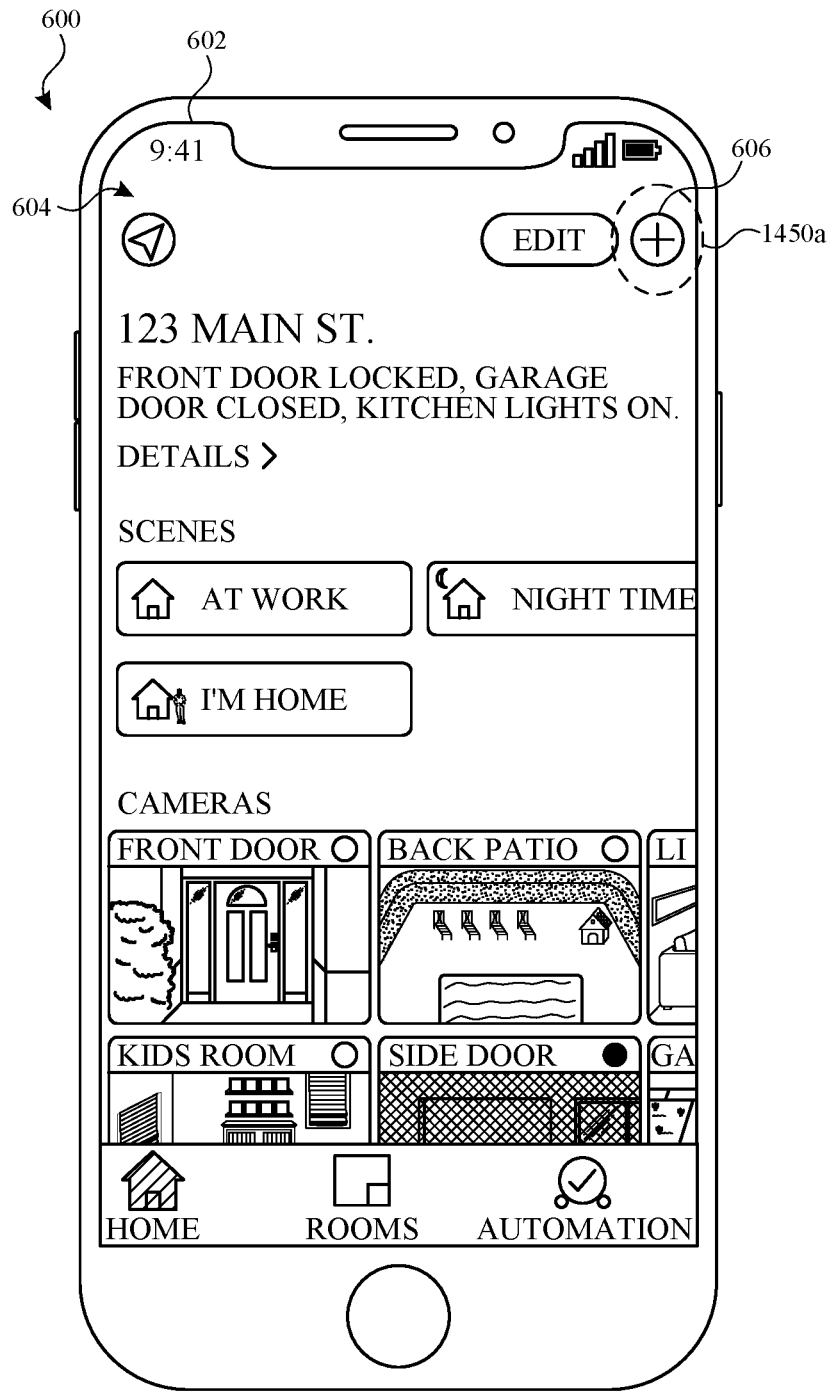
FIGS. 14A-14W illustrate exemplary user interfaces for configuring a source of video data in accordance with some embodiments.
Figure 14B:
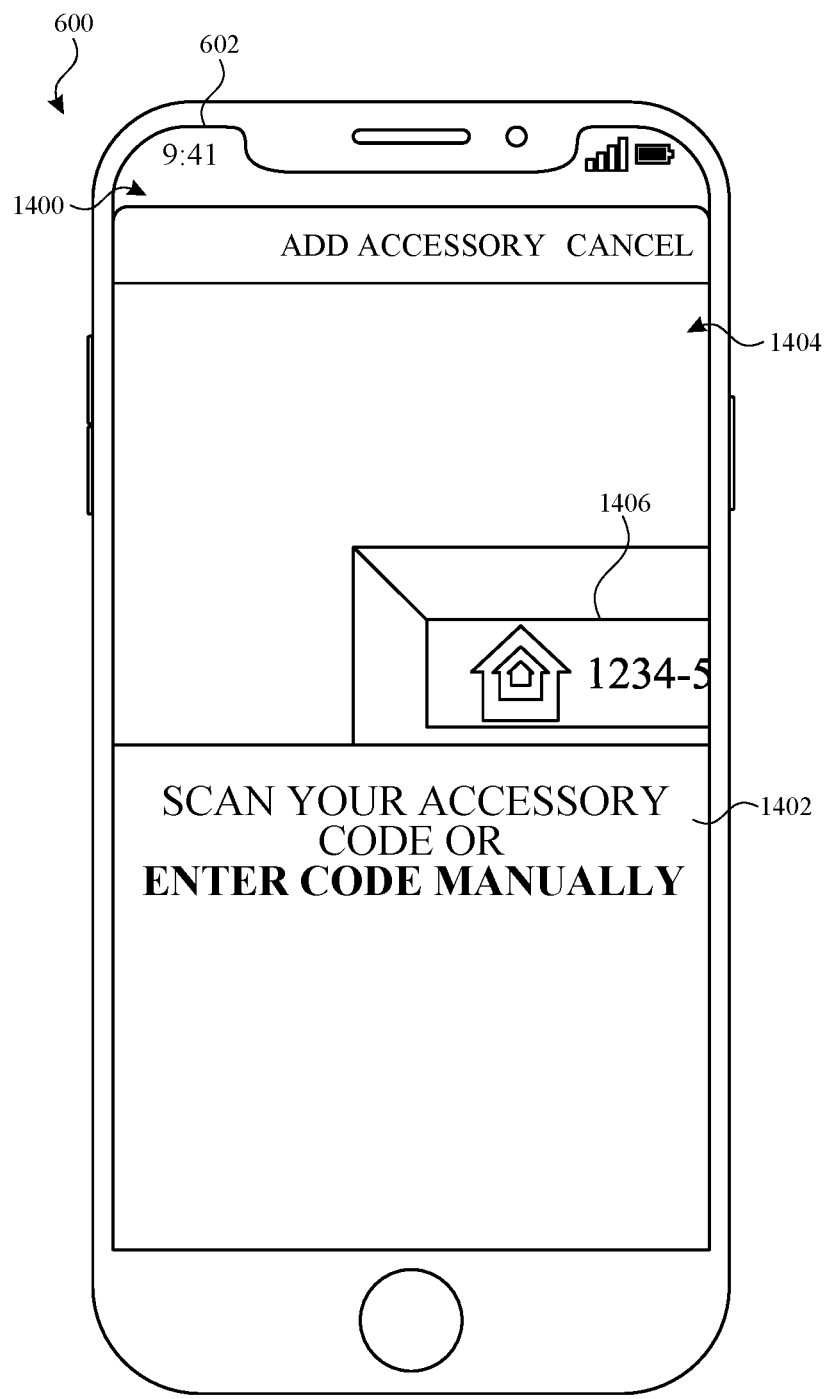
Figure 14C:
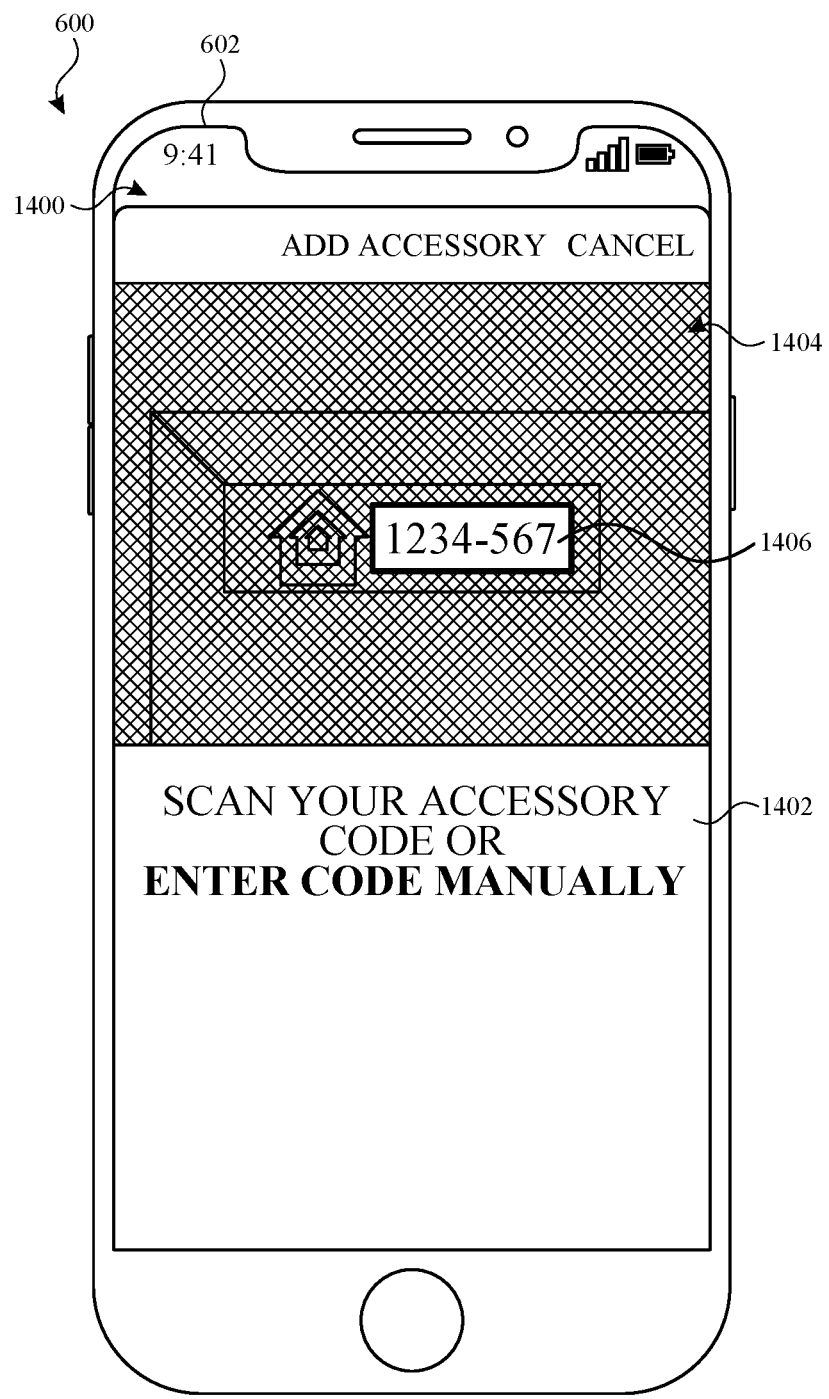
Figure 14D:
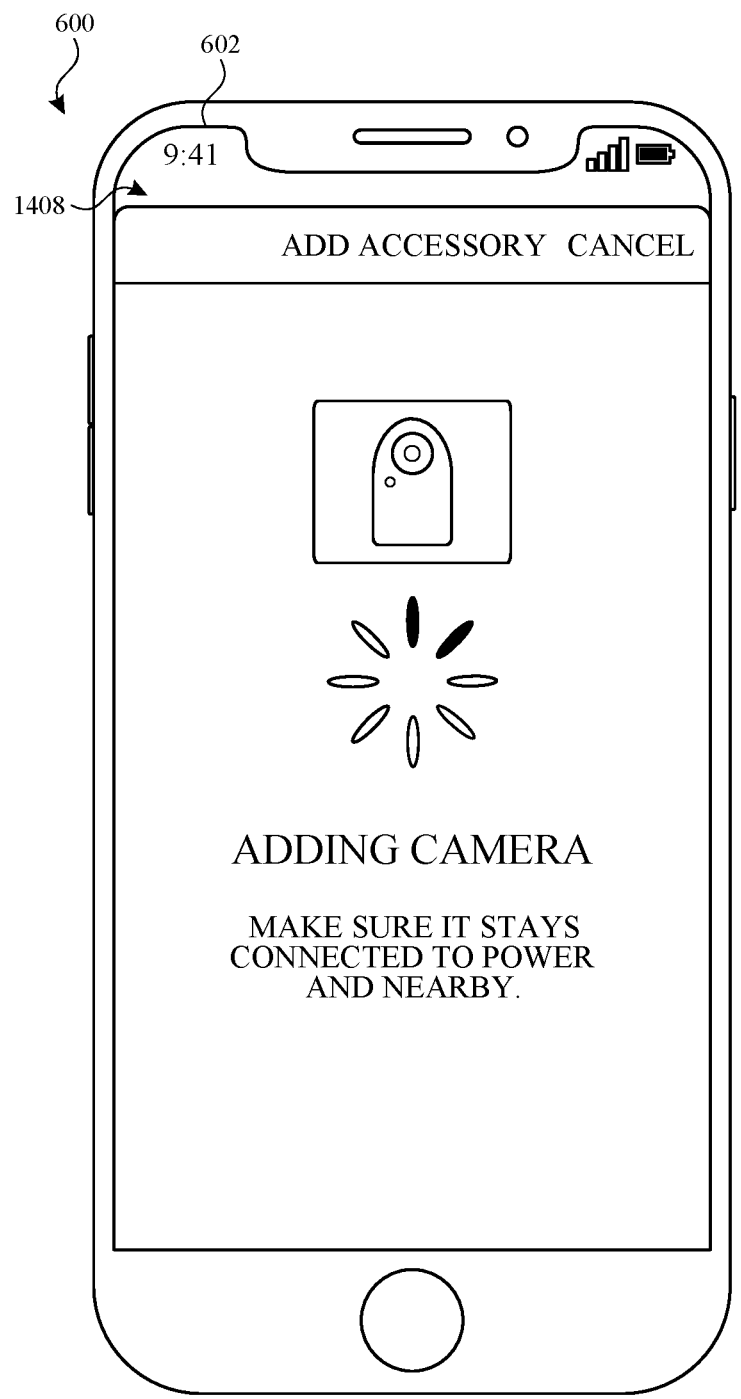
Figure 14E:
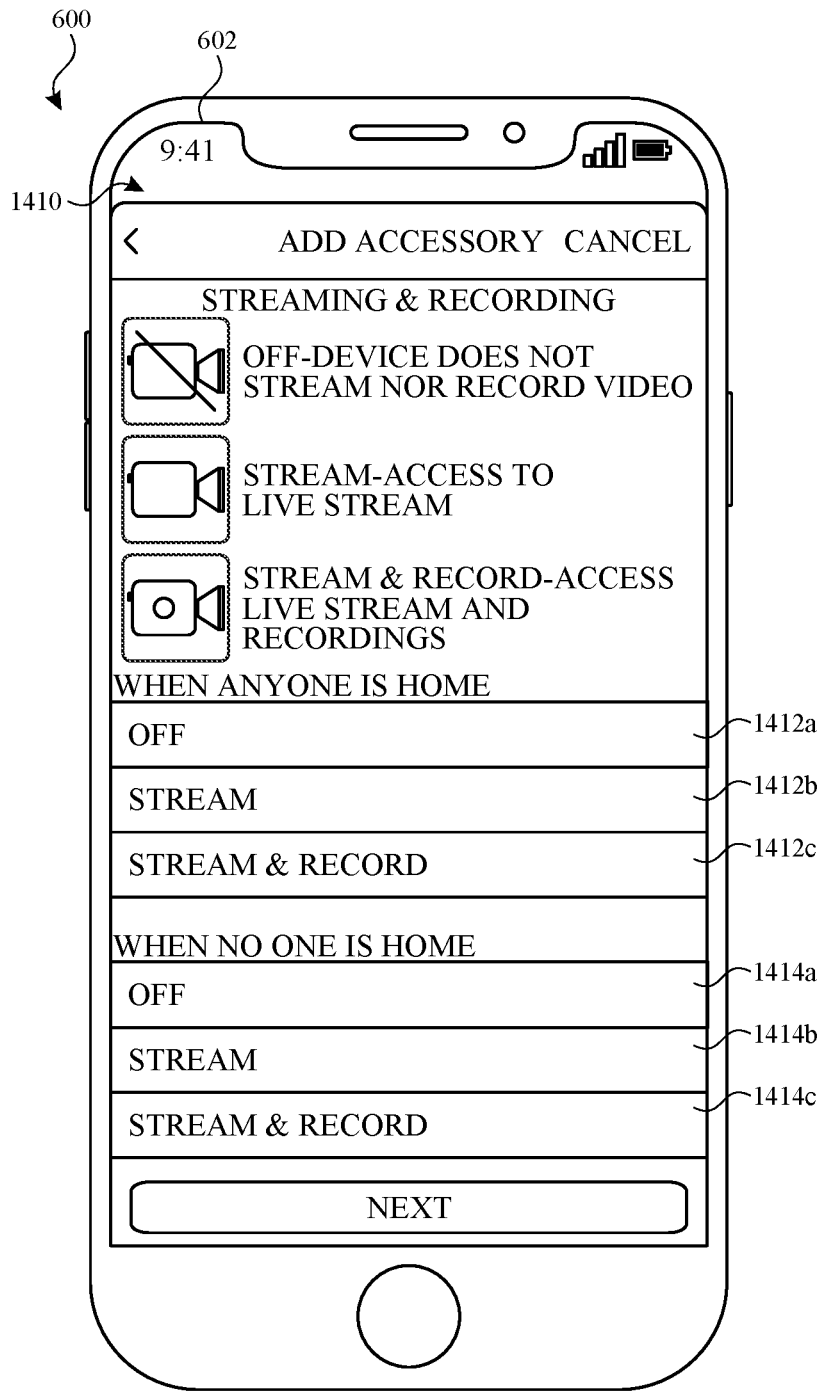
Figure 14F:
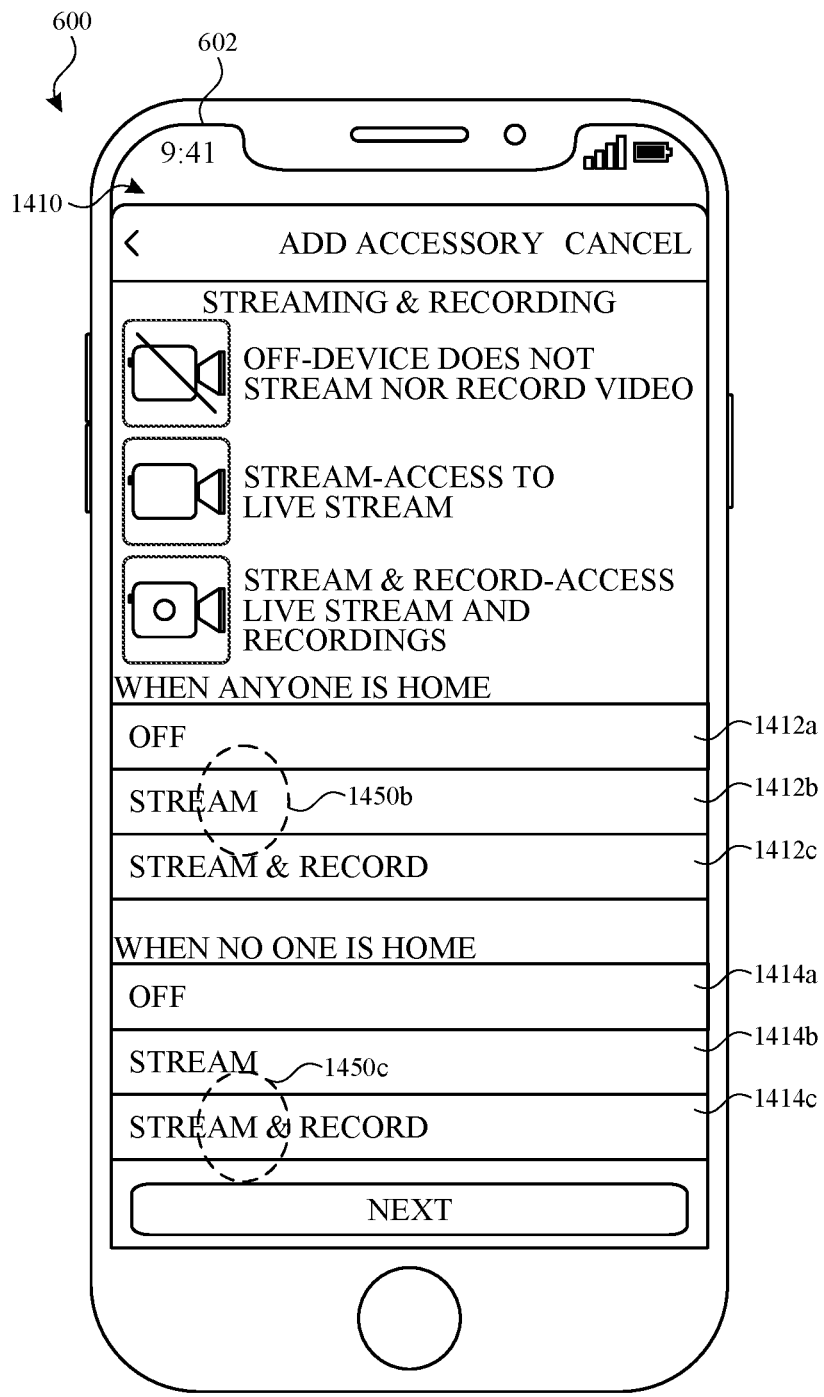
Figure 14G:
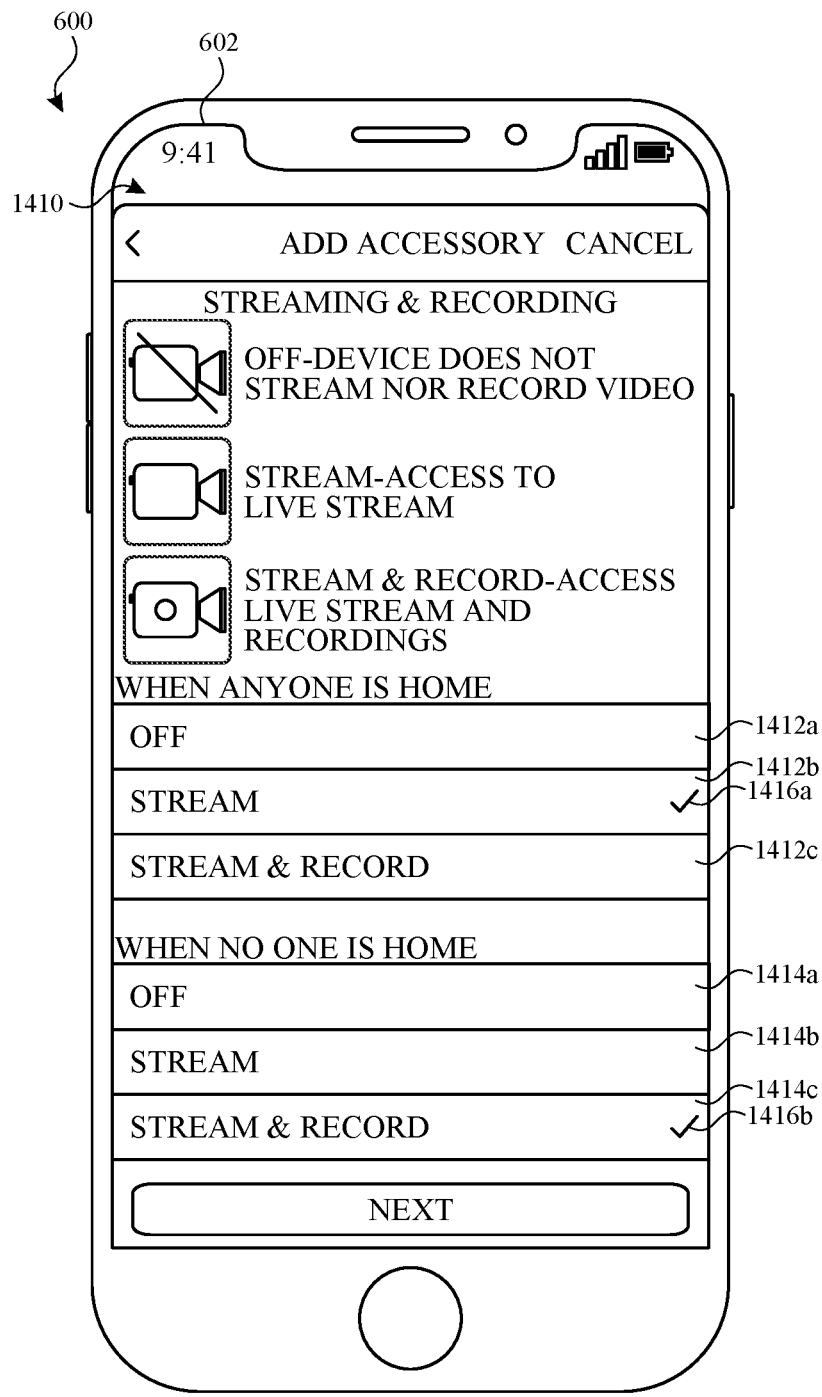
Figure 14H:
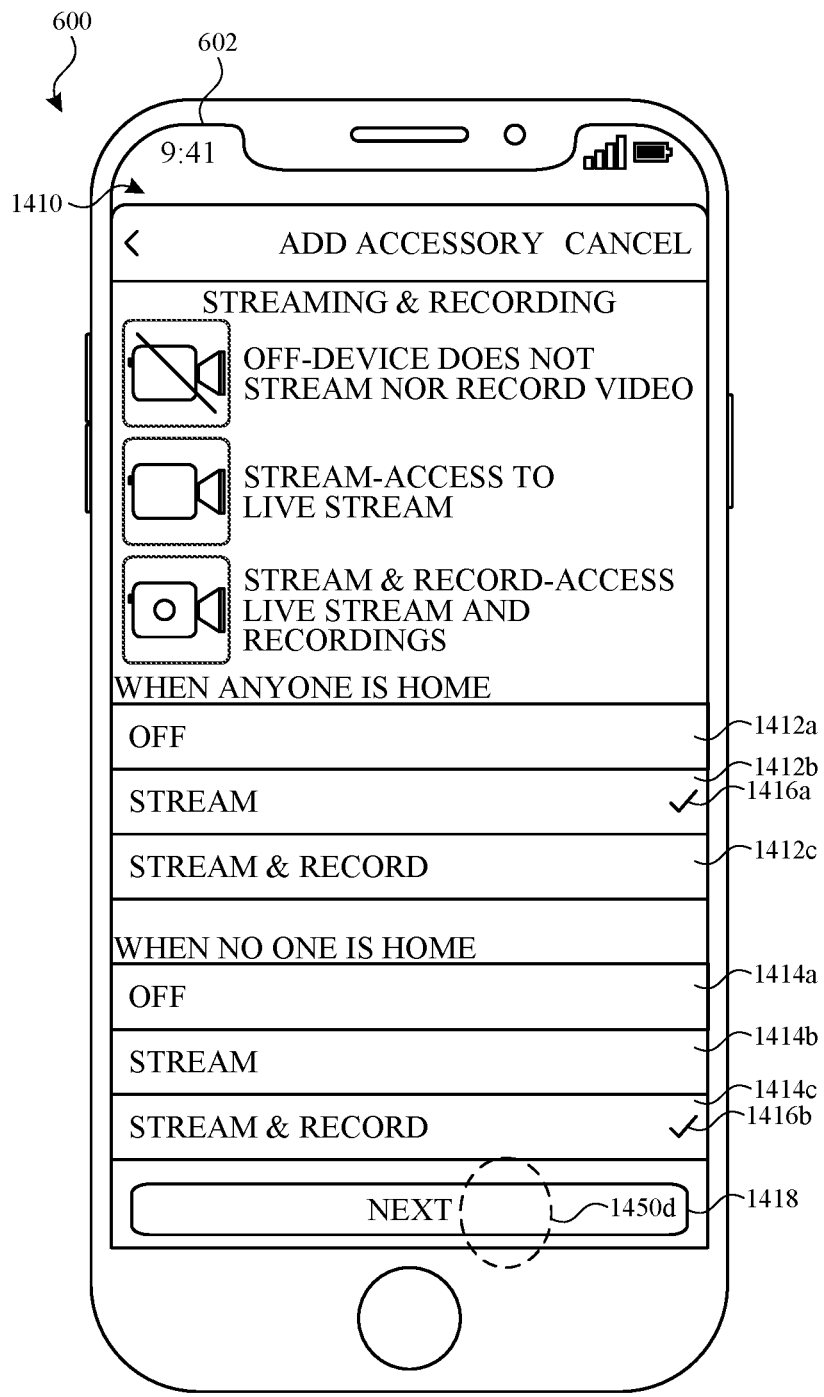
Figure 14I:
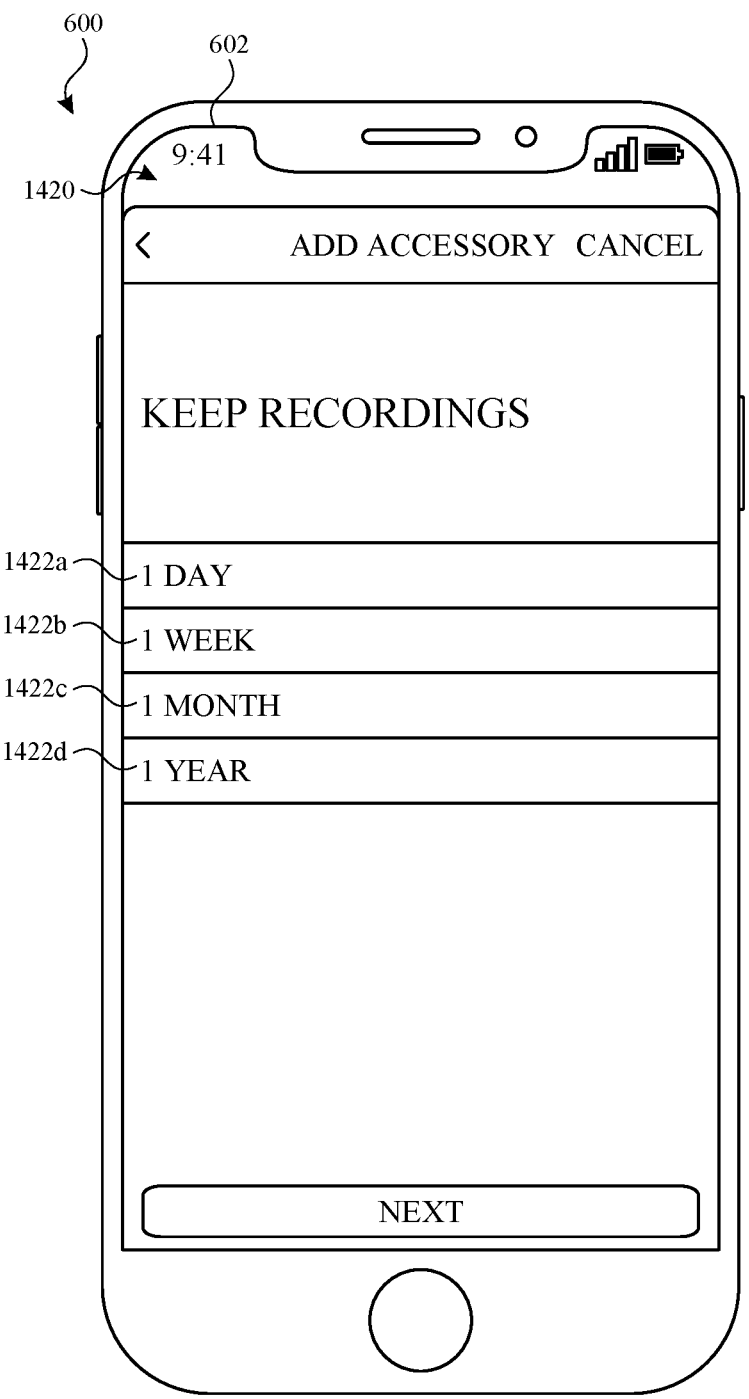
Figure 14J:
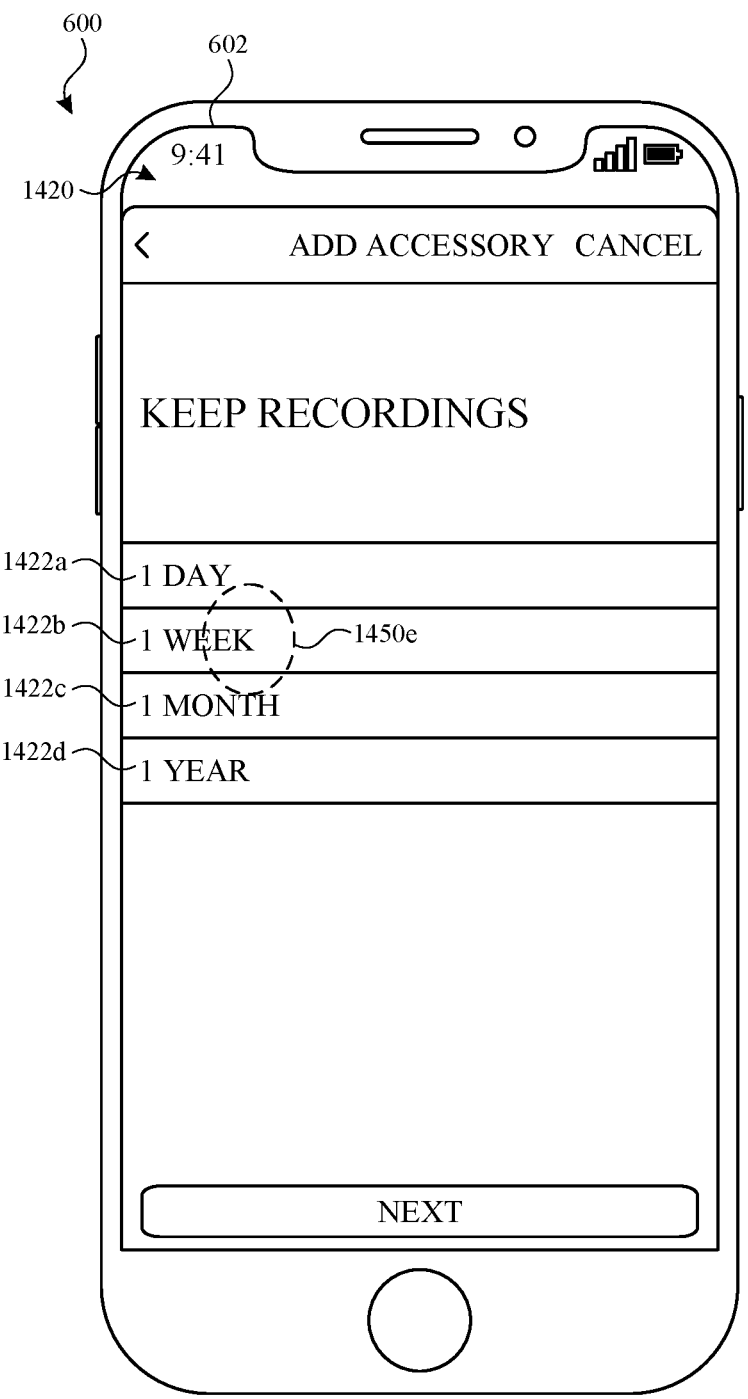
Figure 14K:
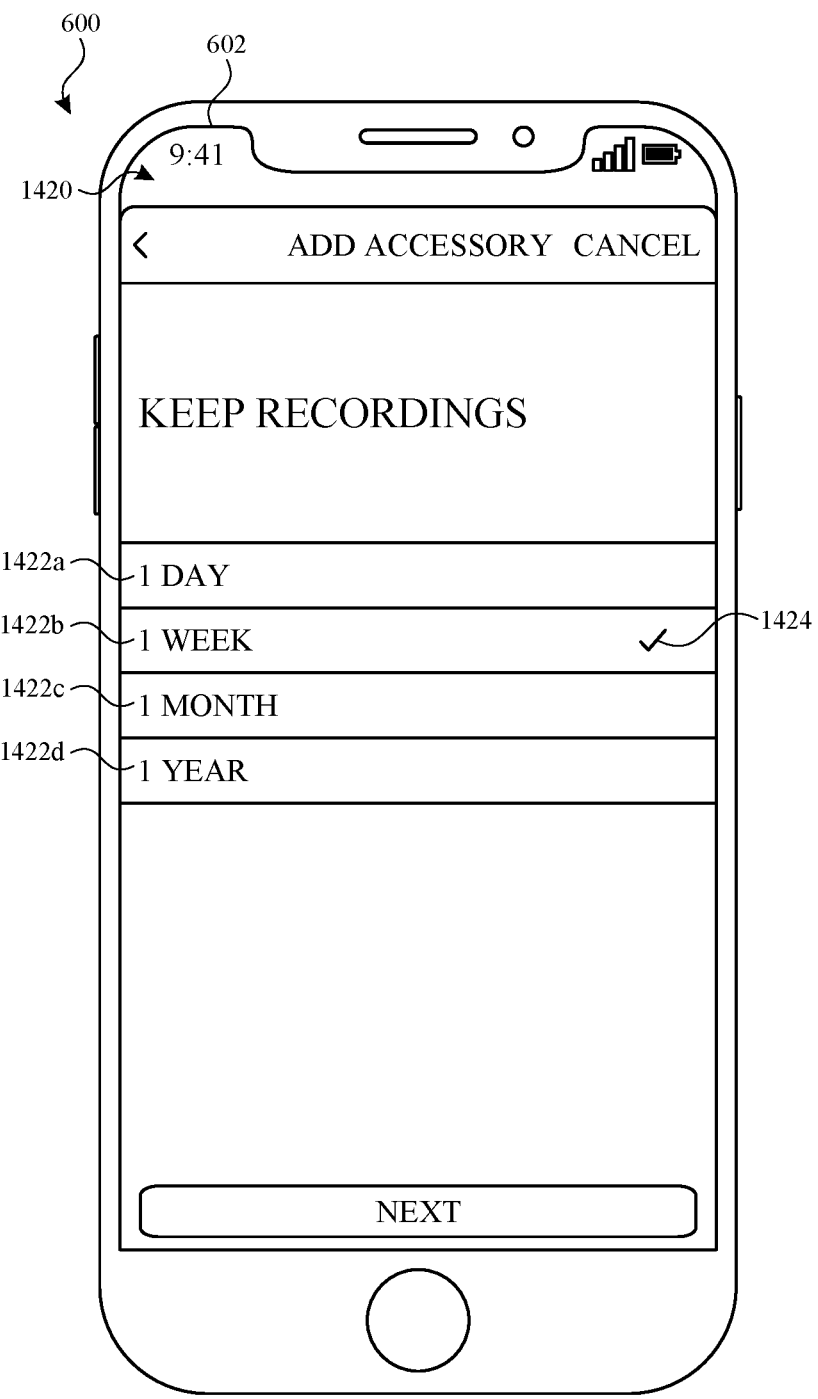
Figure 14L:
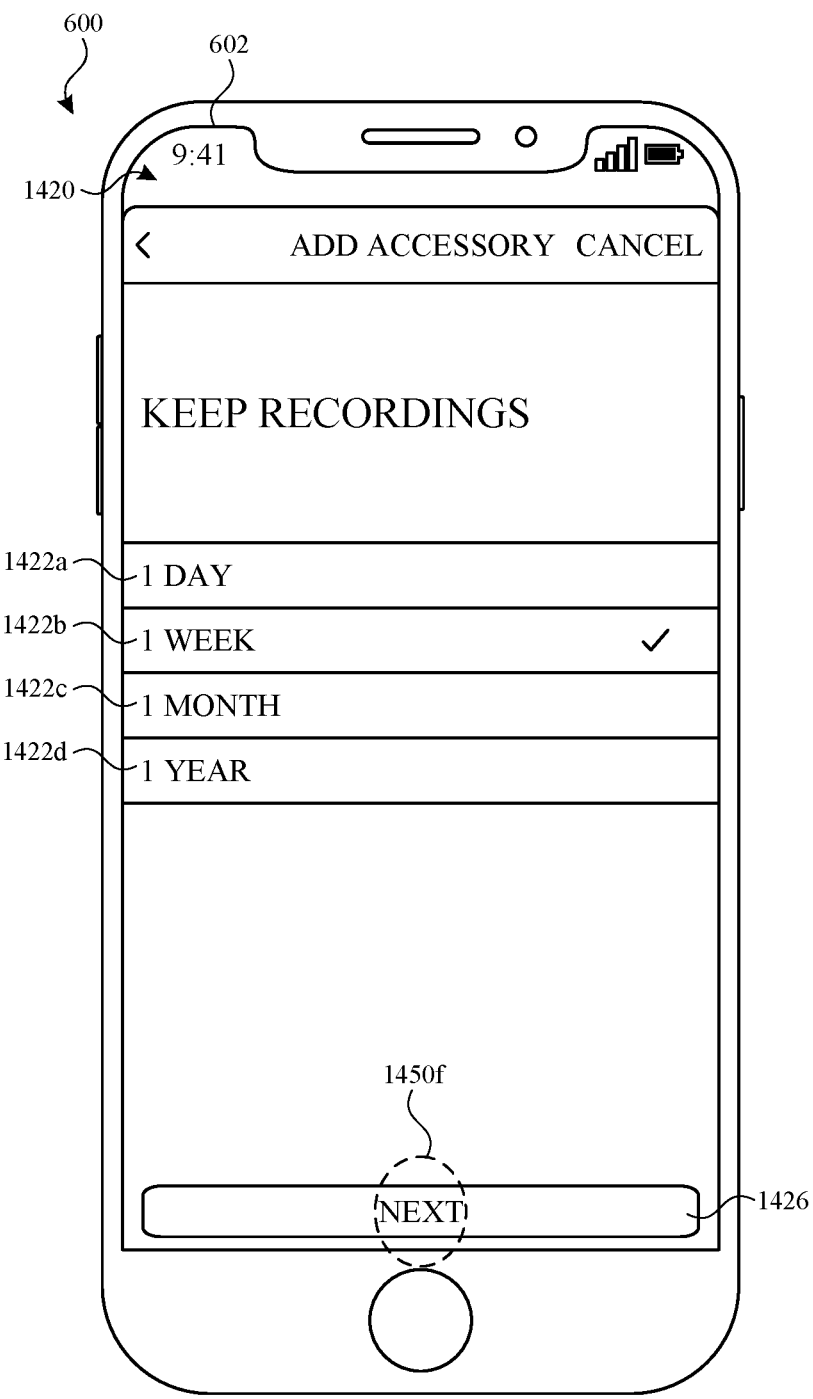
Figure 14M:
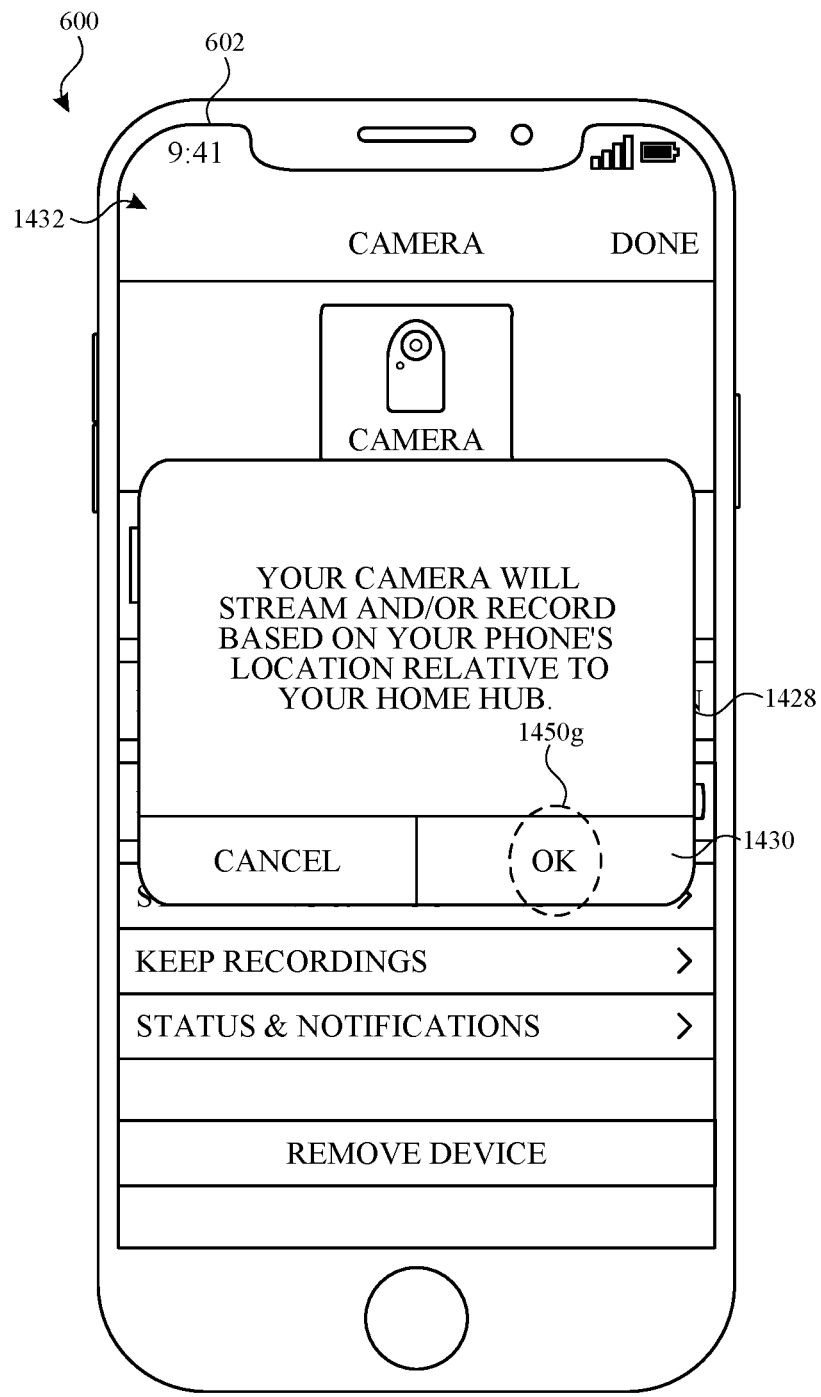
Figure 14N:
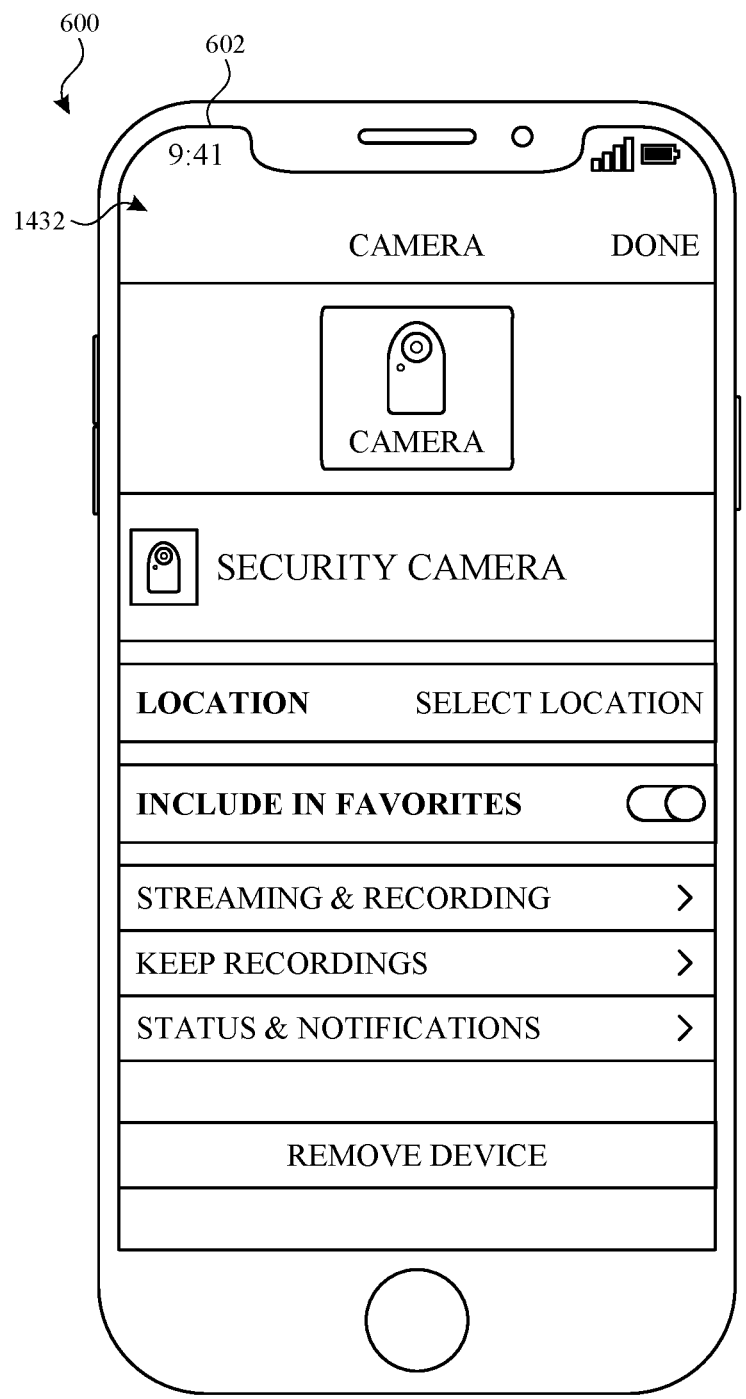
Figure 14O:
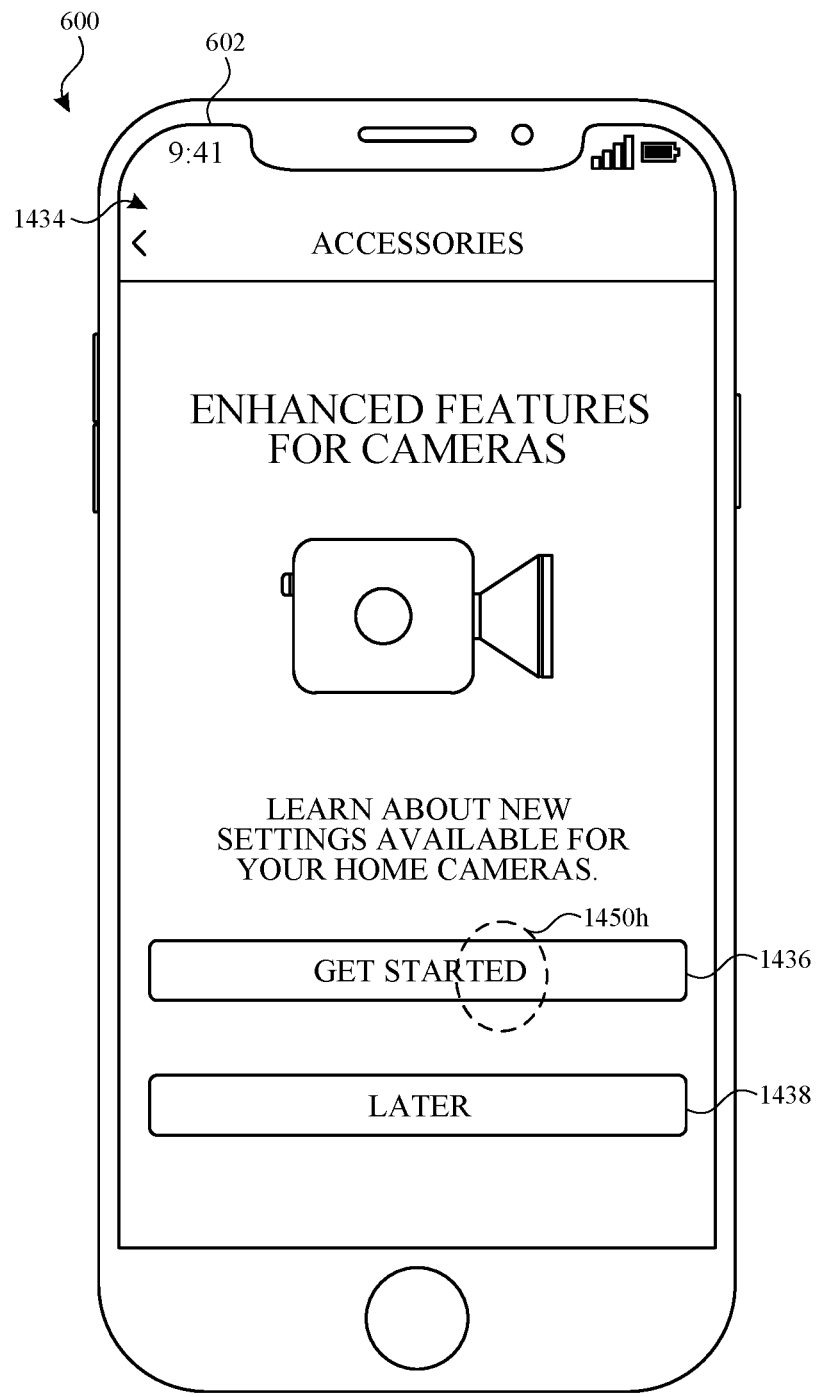
Figure 14P:
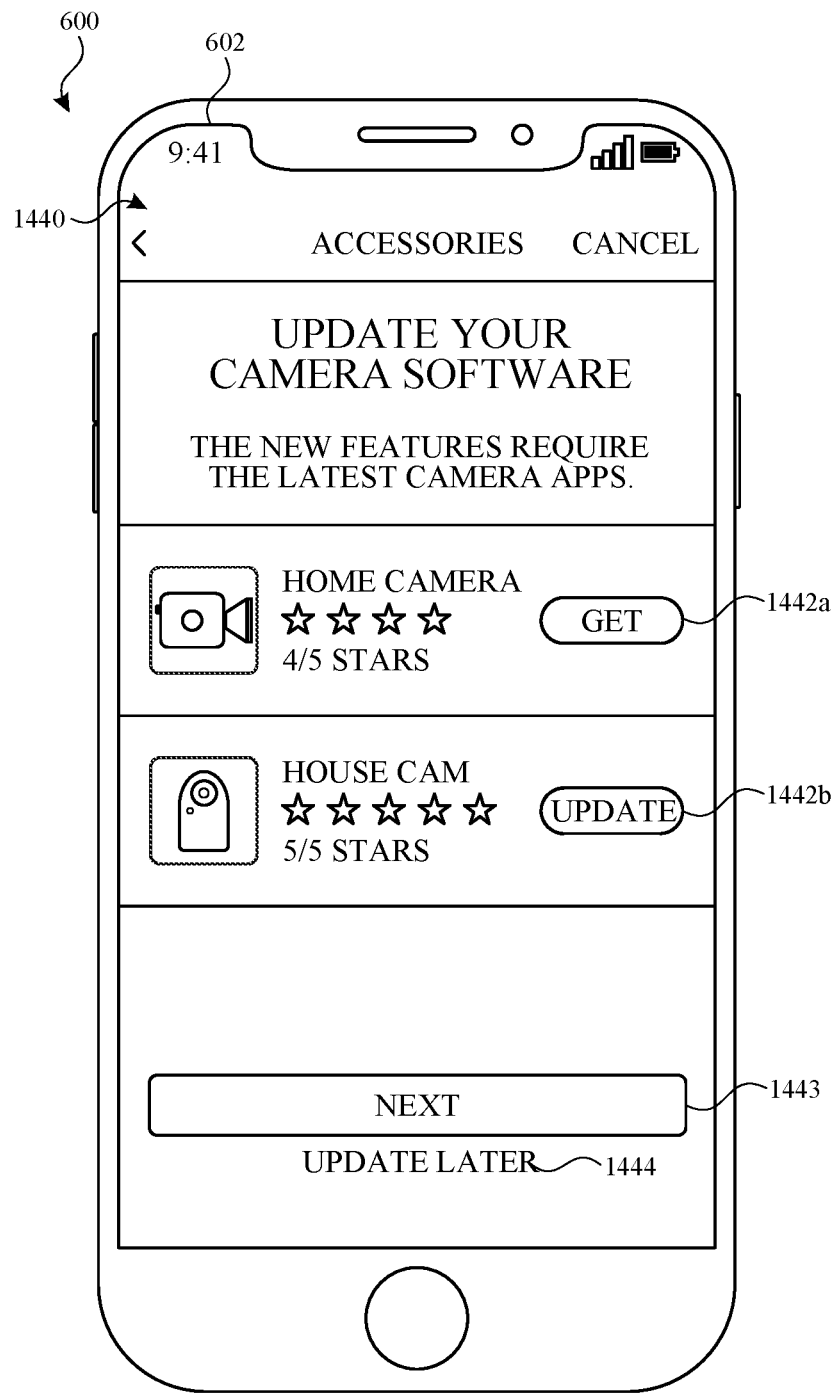
Figure 14Q:
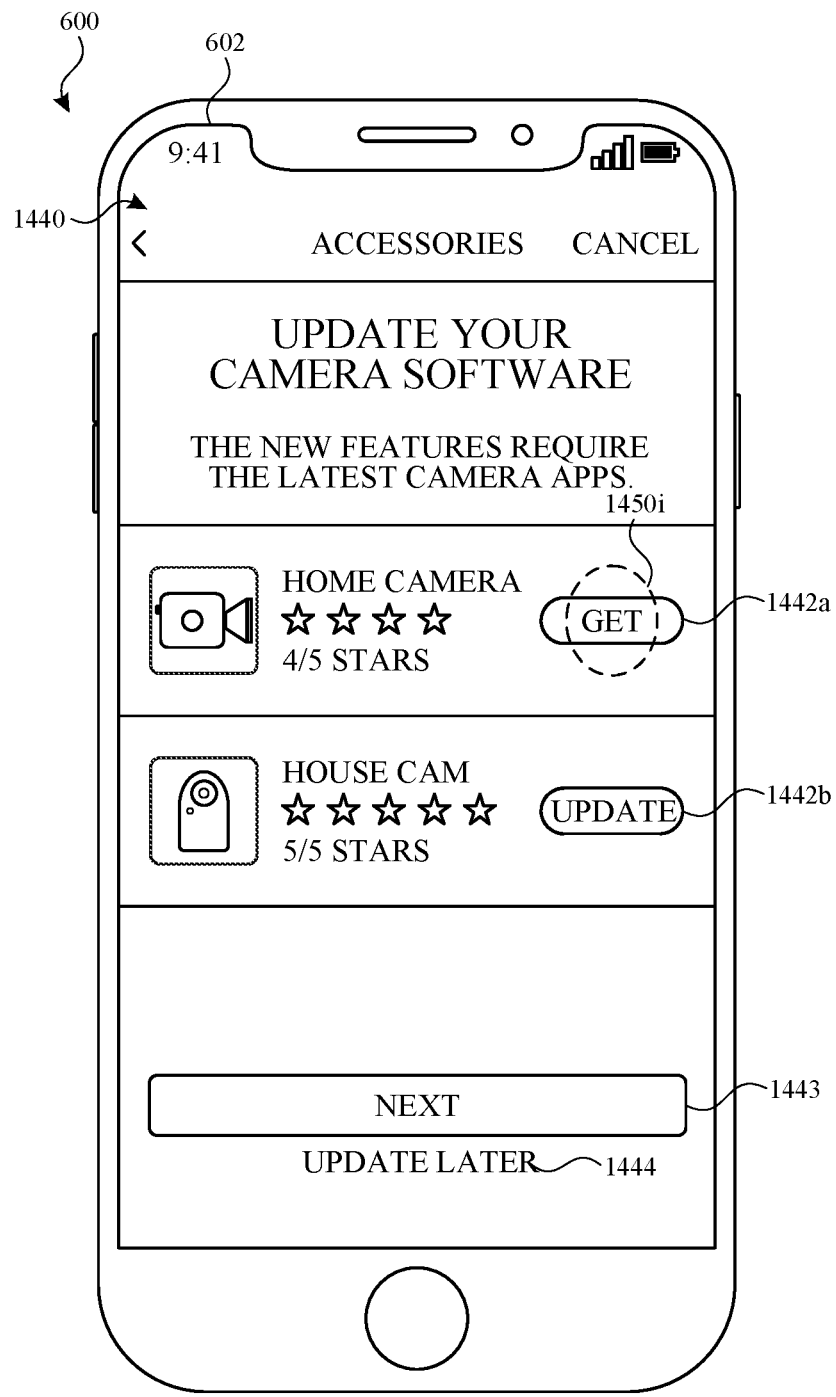
Figure 14R:
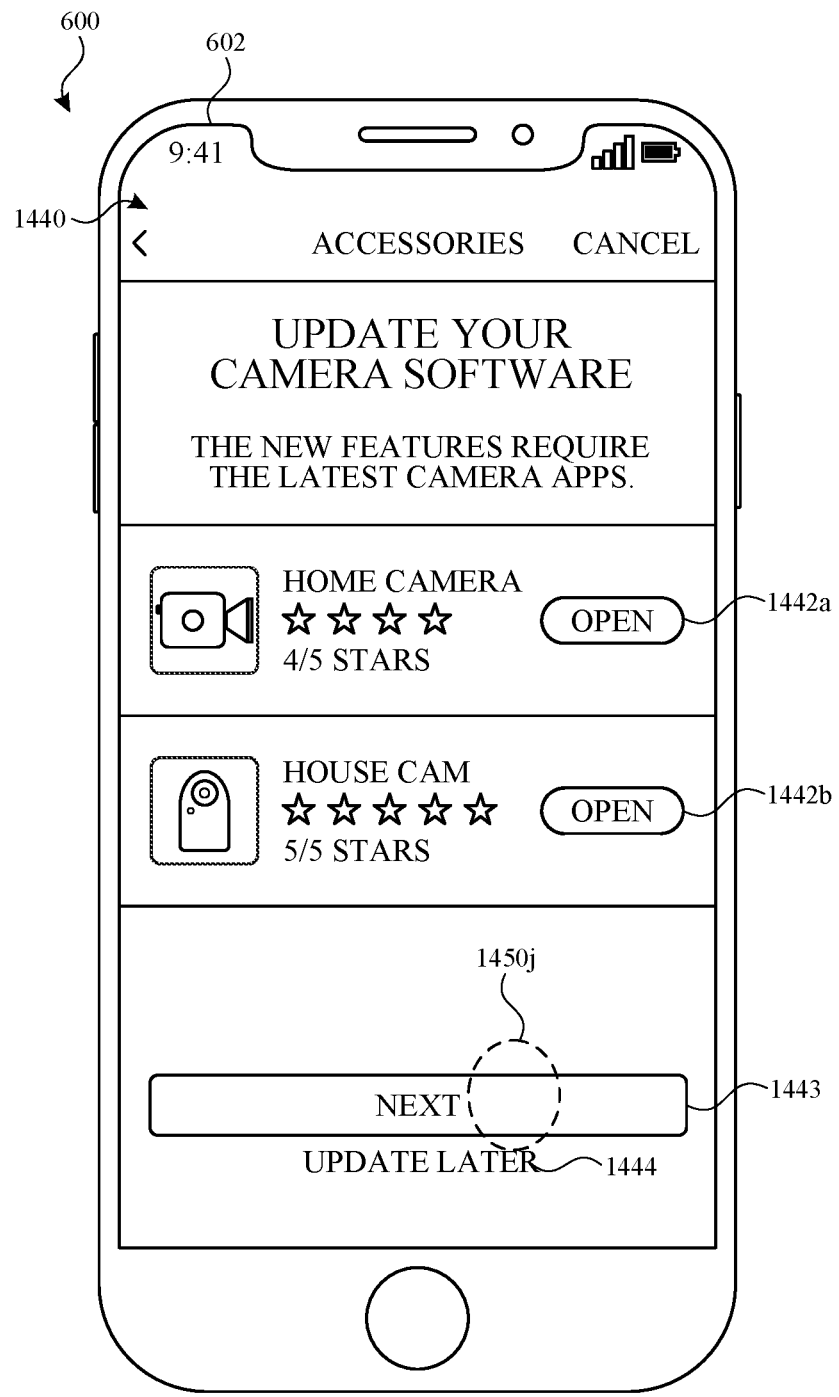
Figure 14S:
Figure 14T:
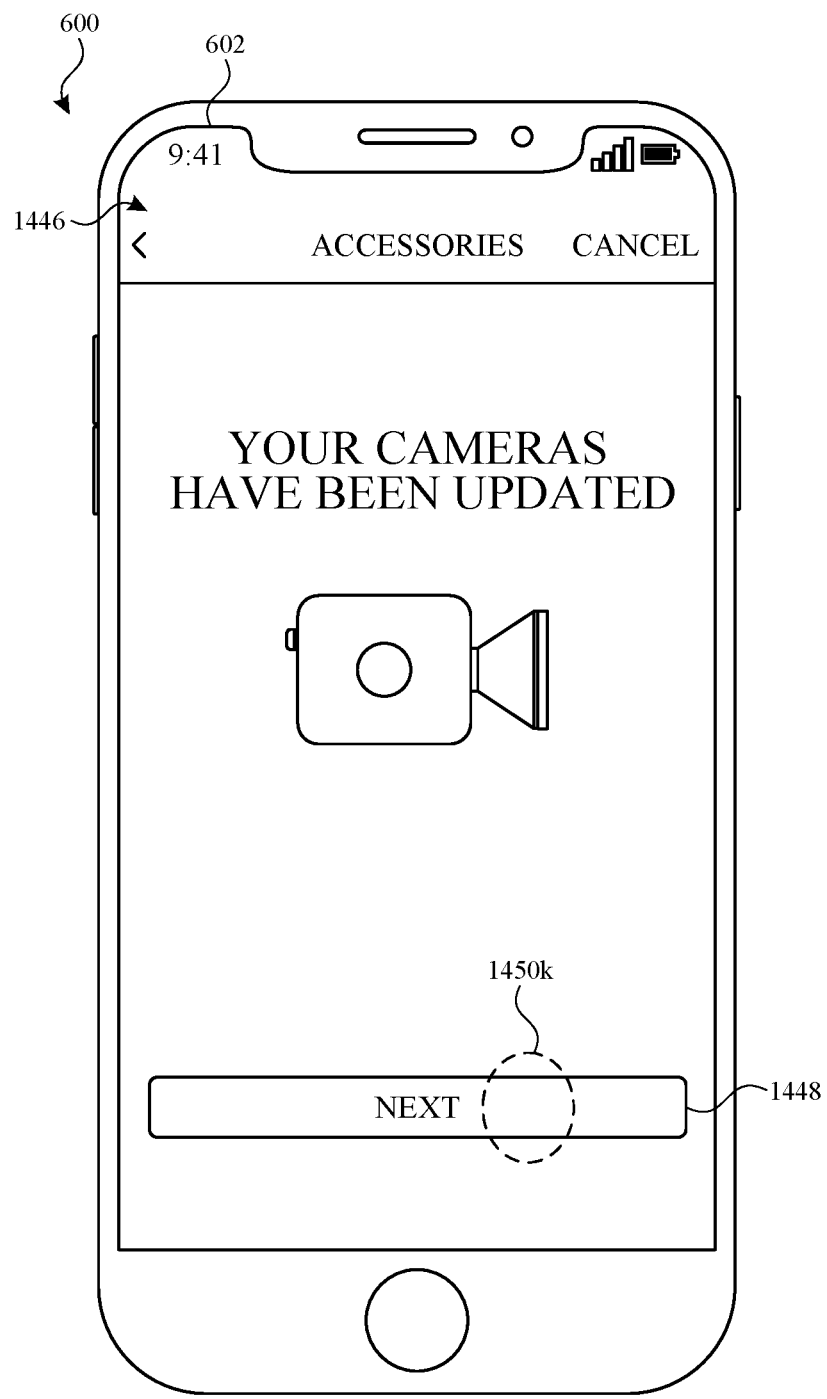
Figure 14U:
Figure 14V:
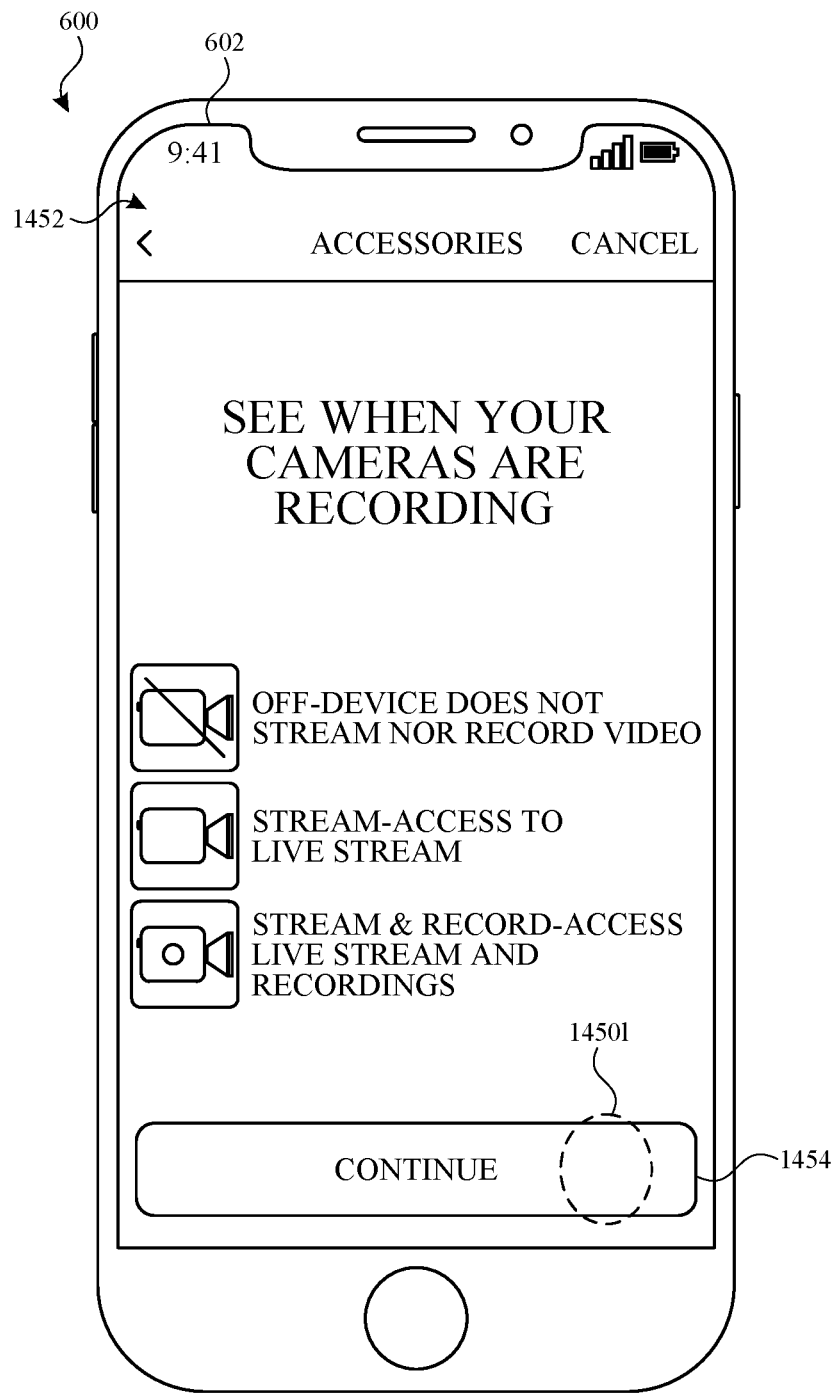
Figure 14W:
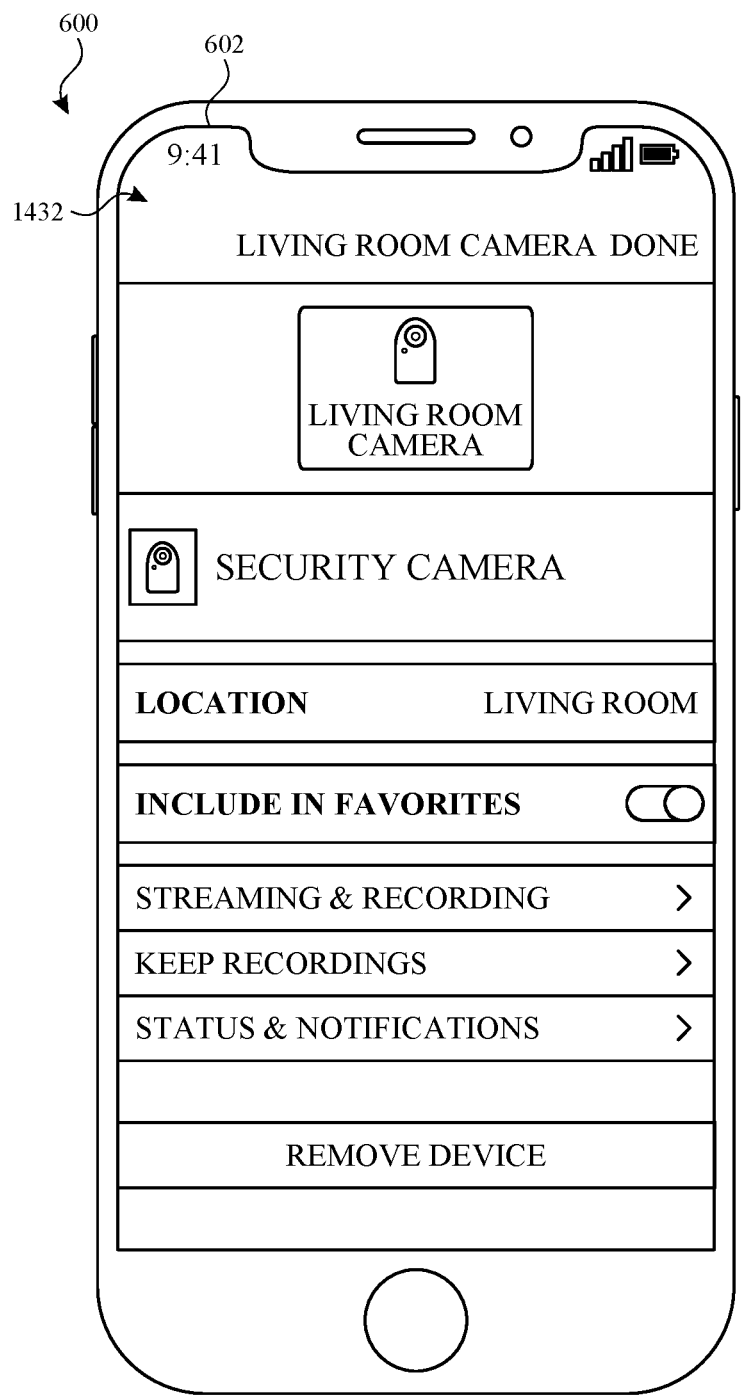
Figure 15A:
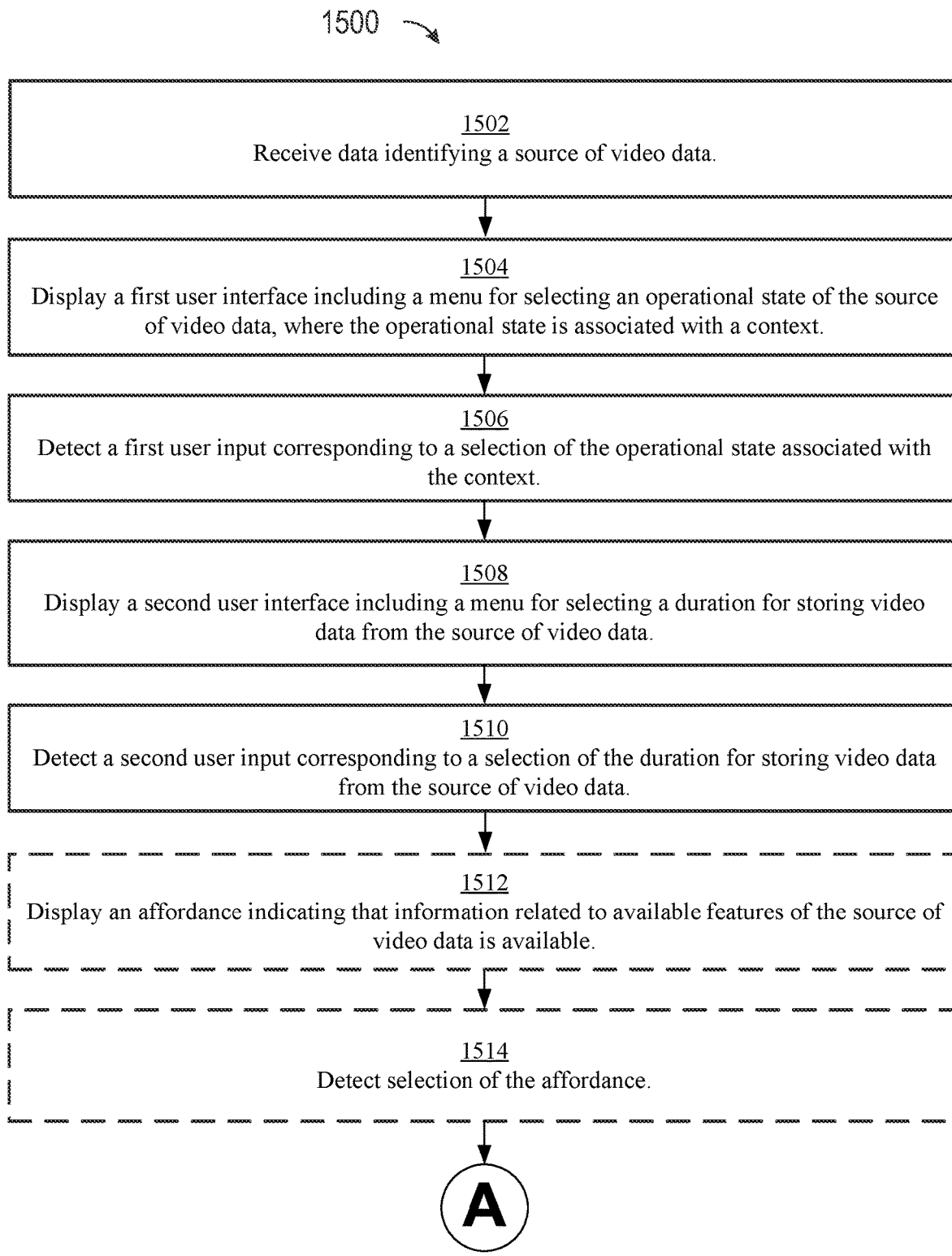
FIGS. 15A-15B are a flow diagram illustrating methods of configuring a source of video data in accordance with some embodiments.
Figure 15B:
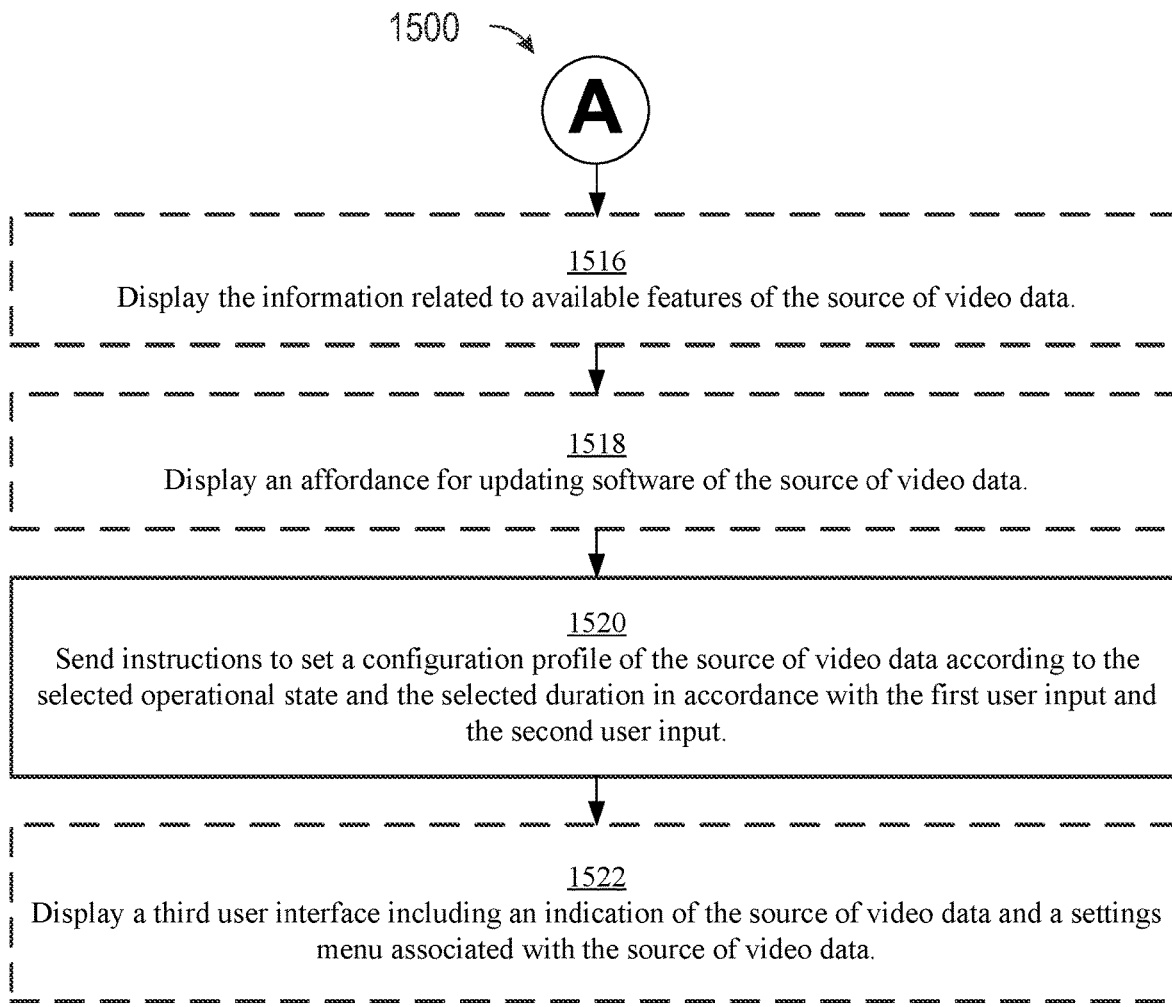

FIGS. 14A-14W illustrate exemplary user interfaces for configuring a source of video data. FIGS. 15A-15B are a flow diagram illustrating methods of configuring a source of video data in accordance with some embodiments. The user interfaces in FIGS. 14A-14W are used to illustrate the processes described below, including the processes in FIGS. 15A-15B.

FIGS. 16A-16I illustrate exemplary user interfaces for managing a storage resource. FIG. 17 is a flow diagram illustrating methods of managing a storage resource in accordance with some embodiments. The user interfaces in FIGS. 16A-16I are used to illustrate the processes described below, including the processes in FIG. 17.

FIGS. 18A-18D illustrate exemplary user interfaces for setting status and notifications settings.

FIGS. 19A-19D illustrate exemplary user interfaces for displaying video from a video source and controlling external devices related to the source.

Figure 20A:
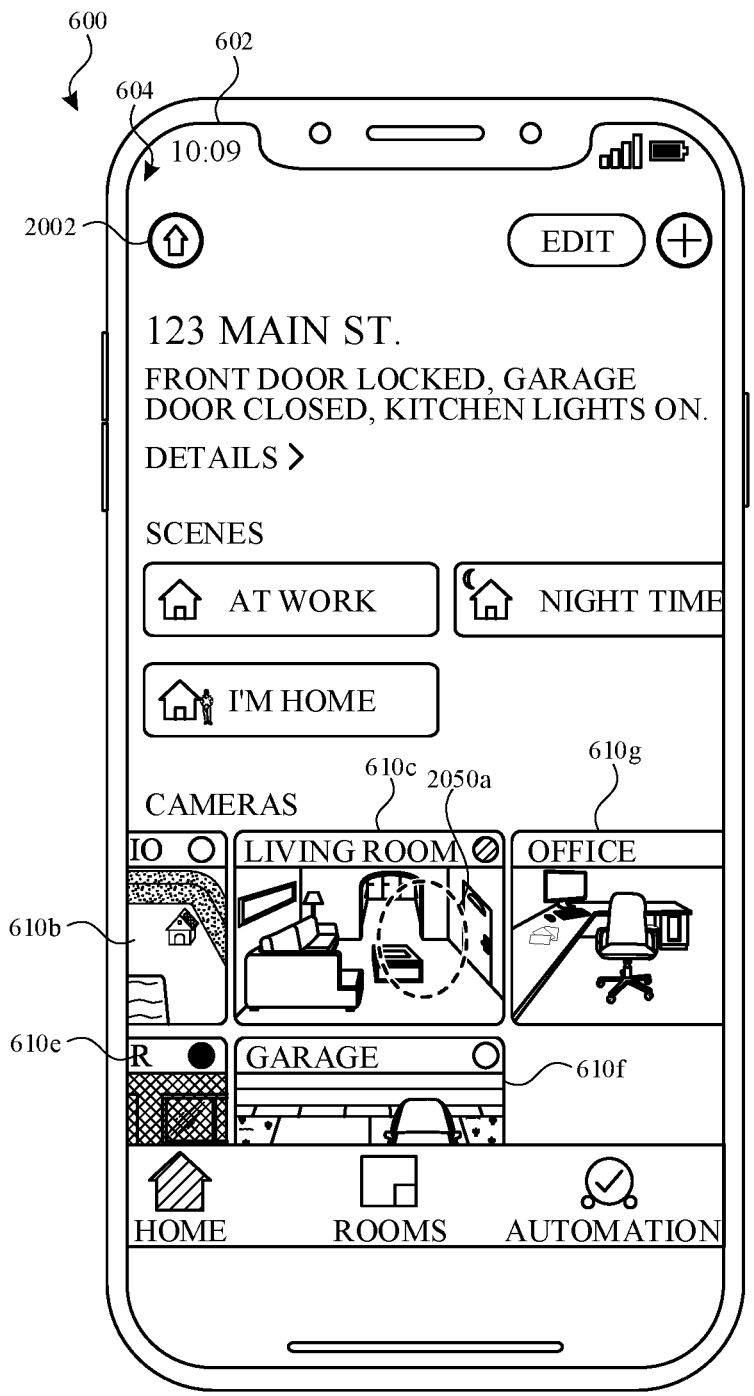
FIGS. 20A-20X illustrate exemplary user interfaces for configuring recording settings in accordance with some embodiments.
Figure 20B:
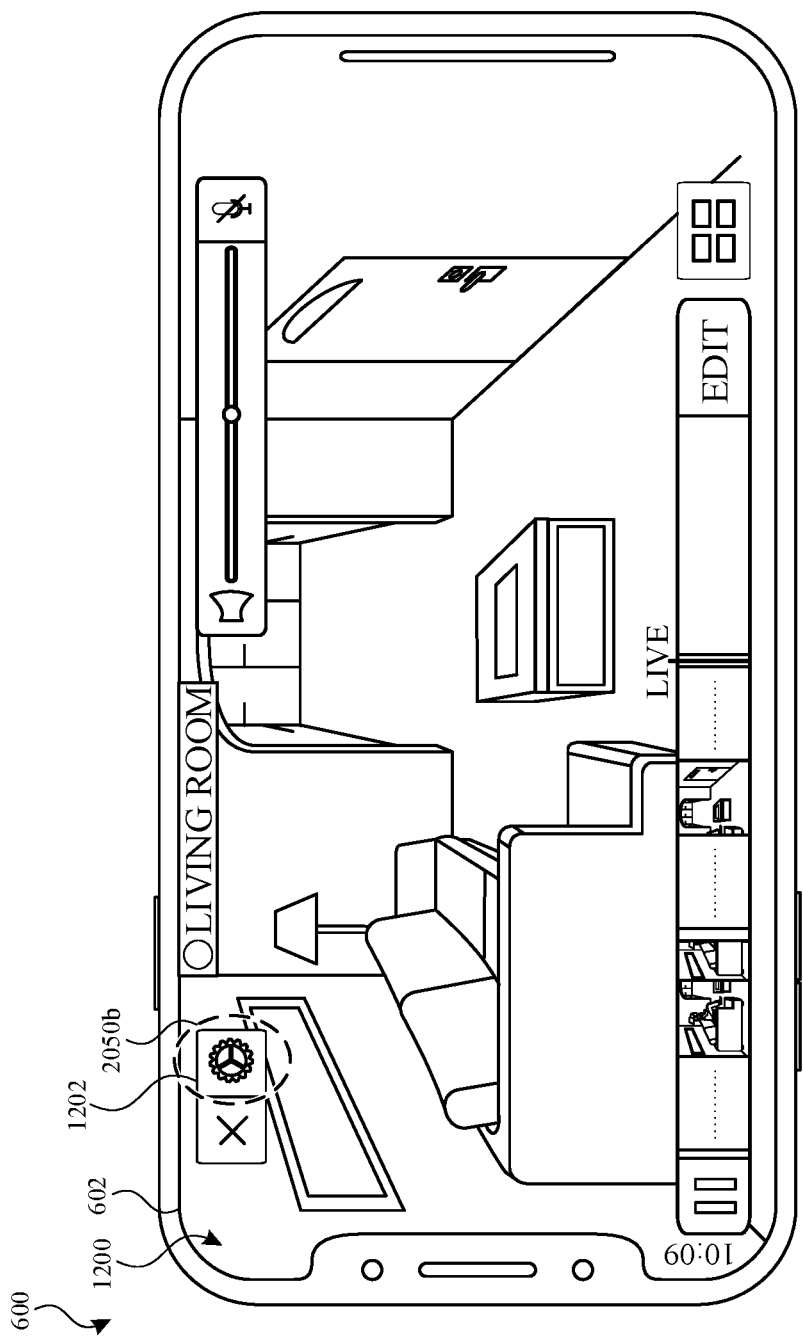
Figure 20C:
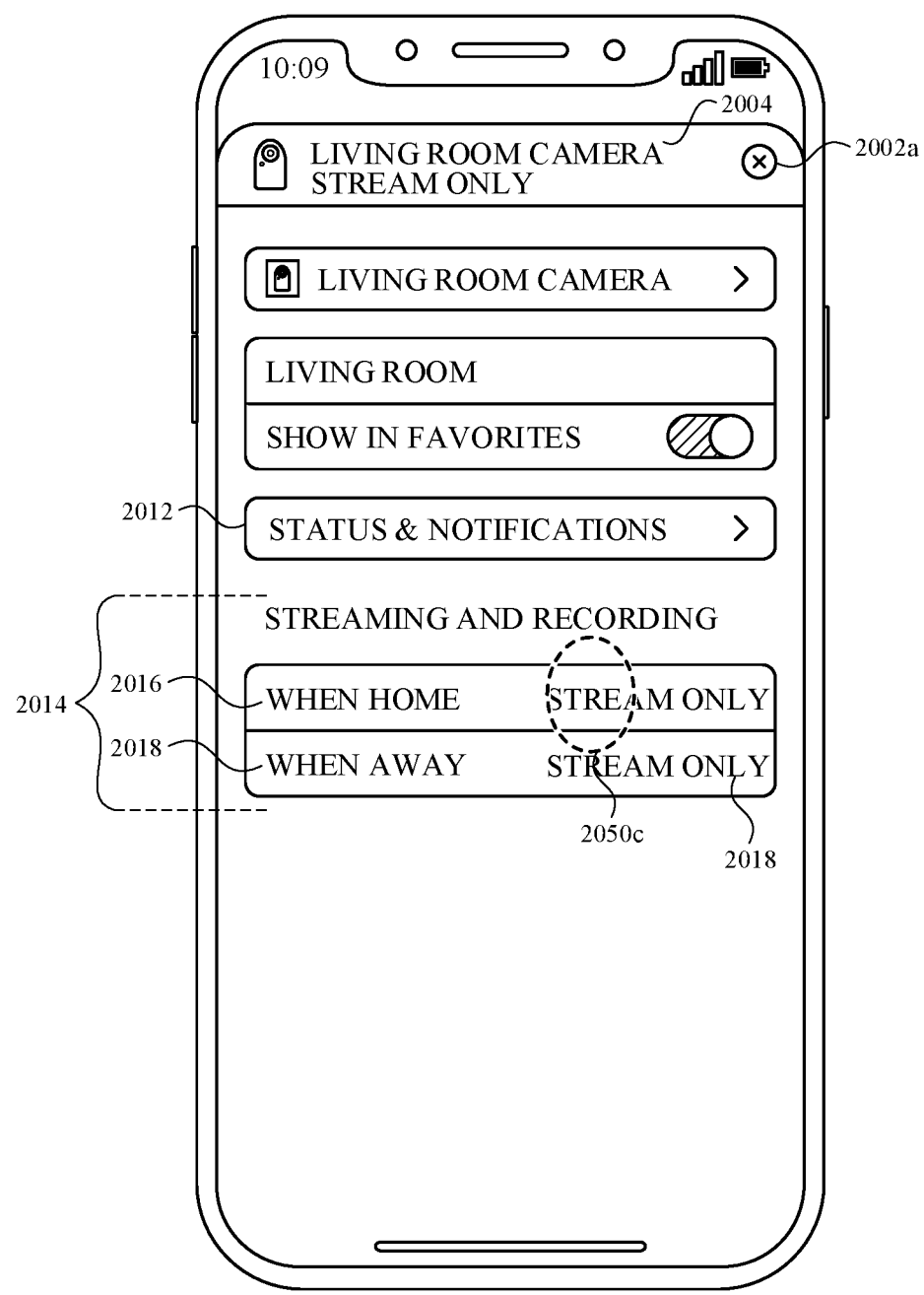
Figure 20D:
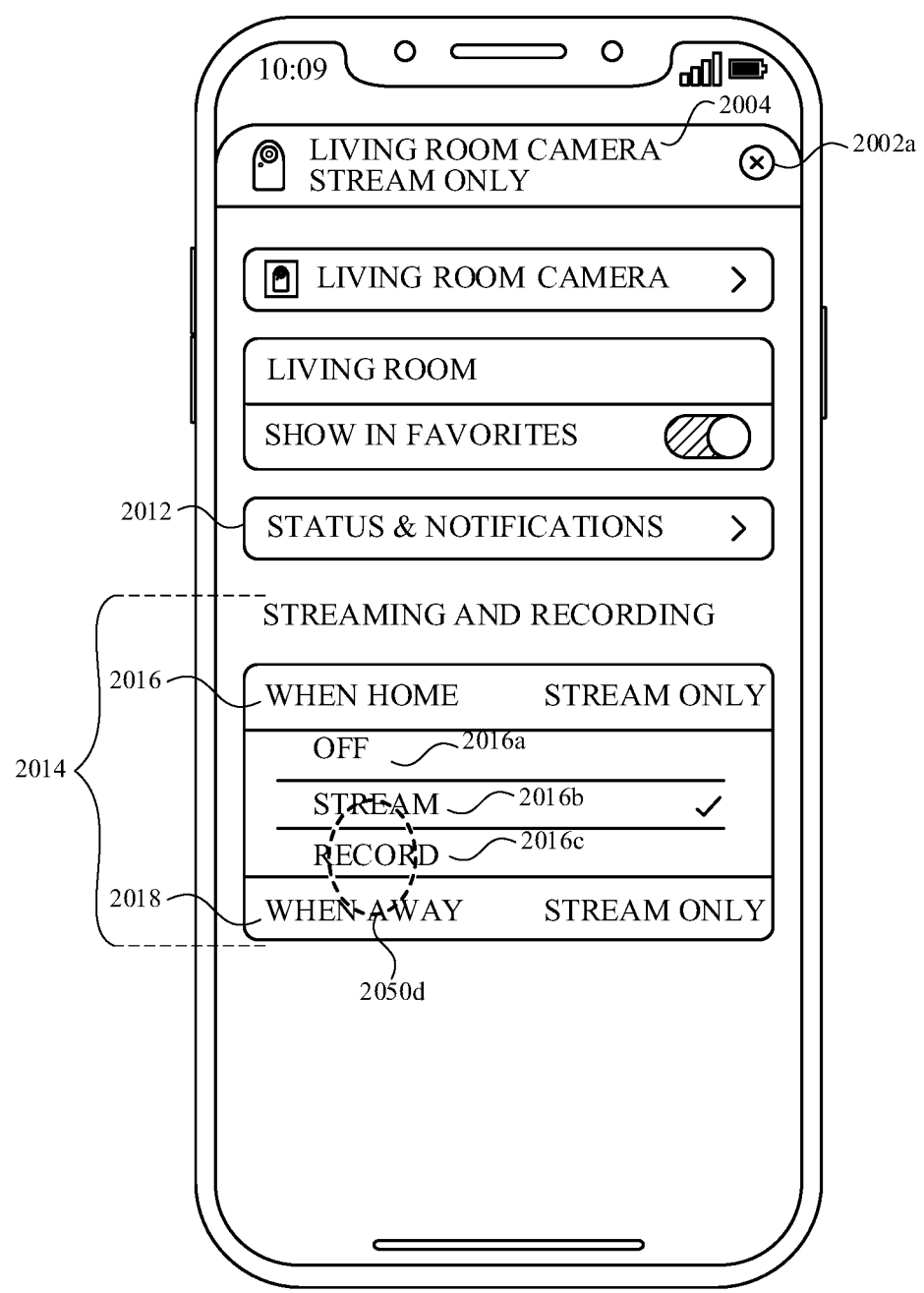
Figure 20E:
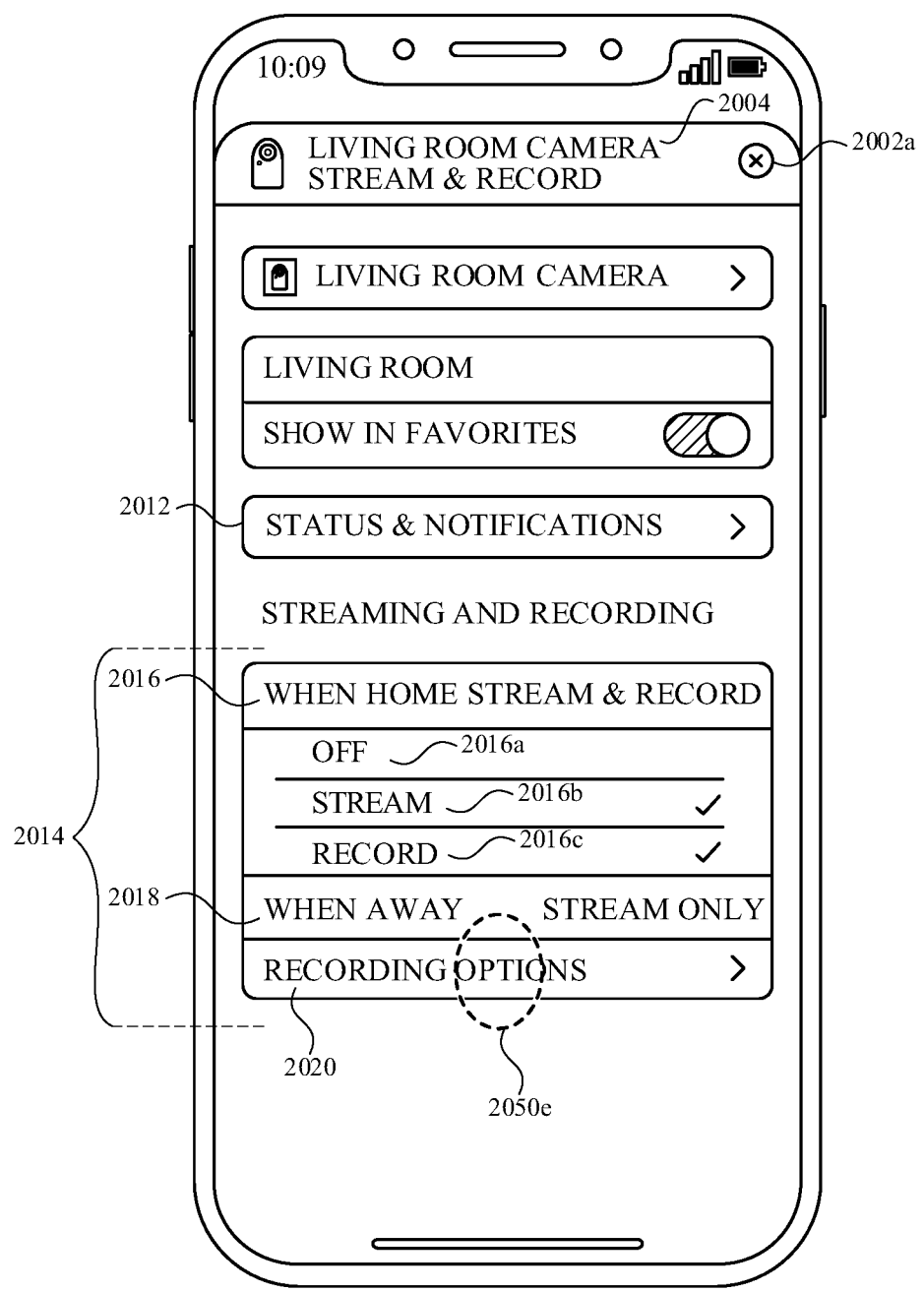
Figure 20F:
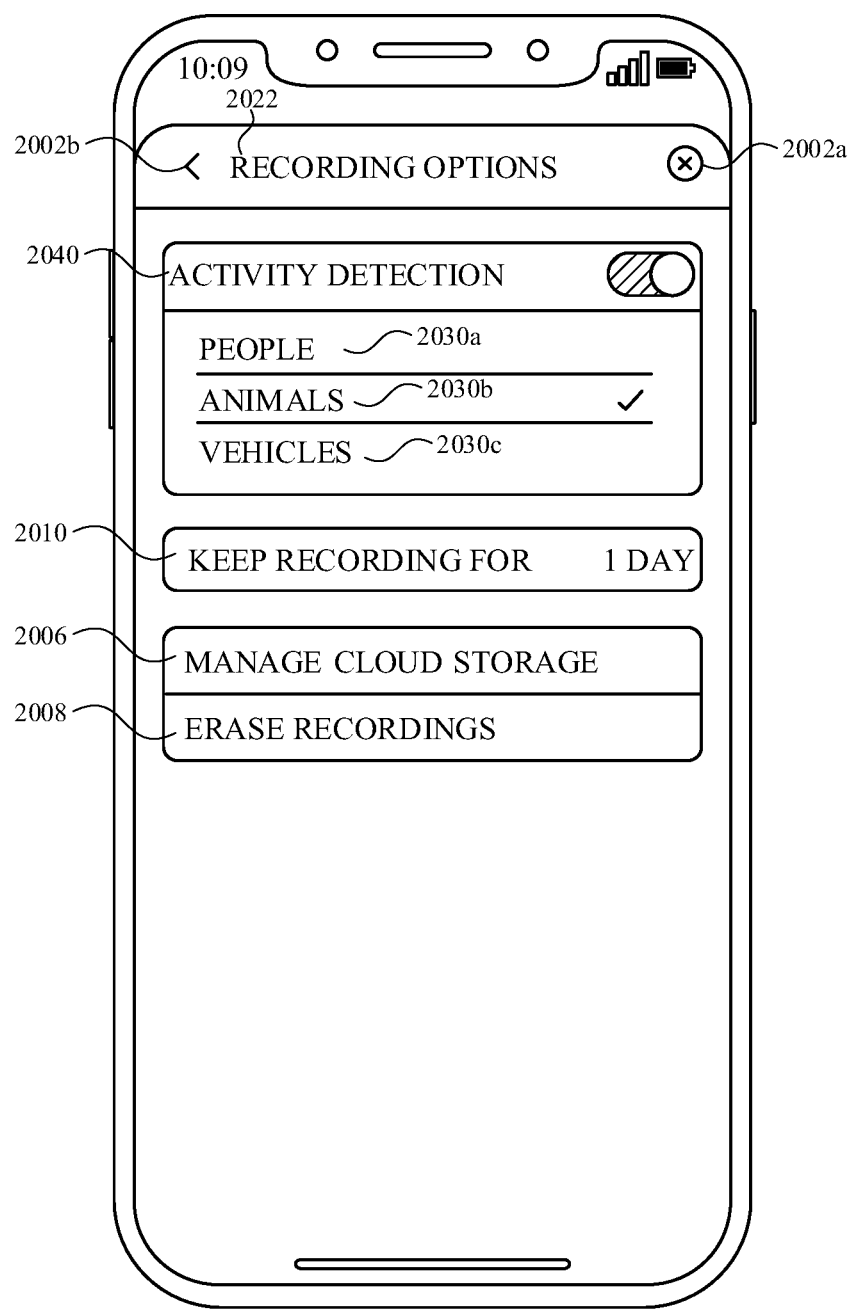
Figure 20G:
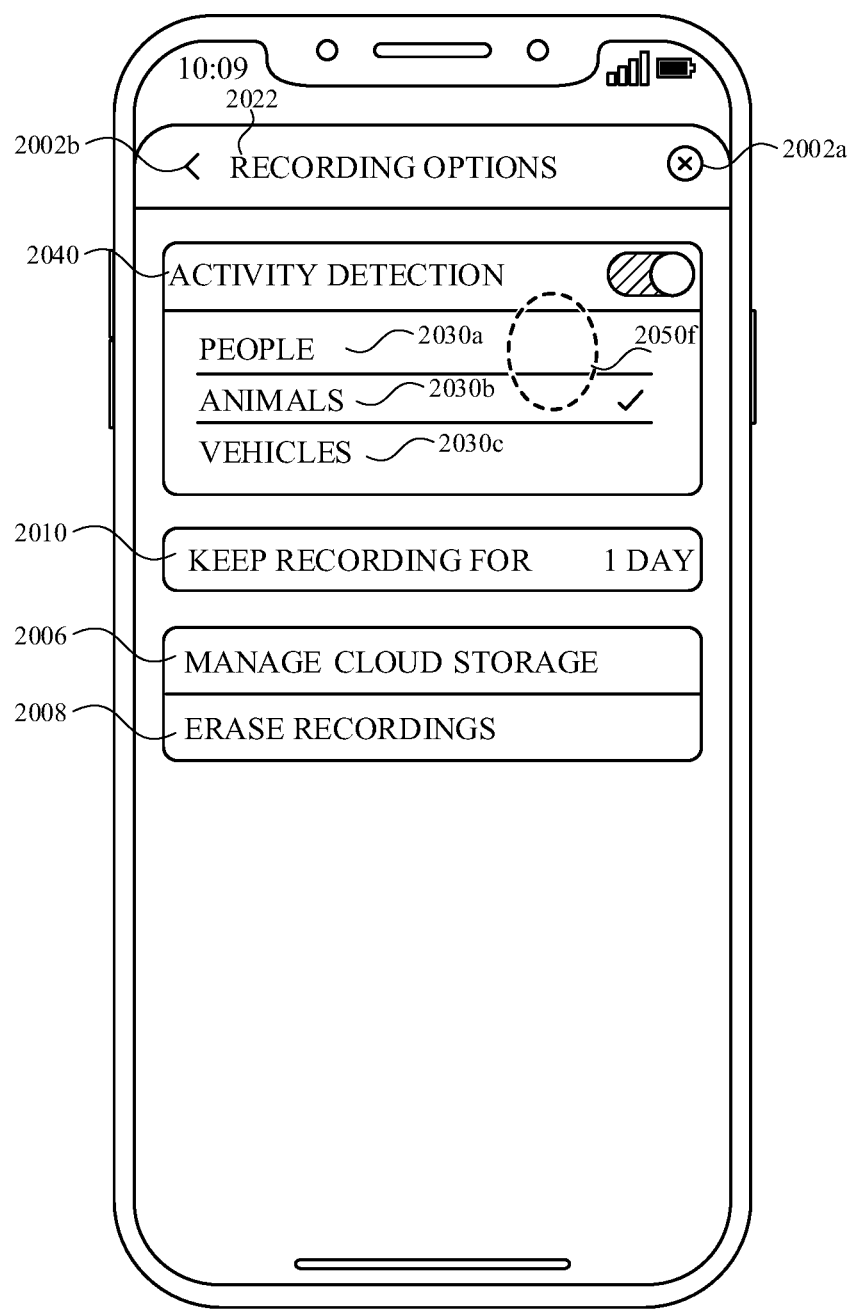
Figure 20H:
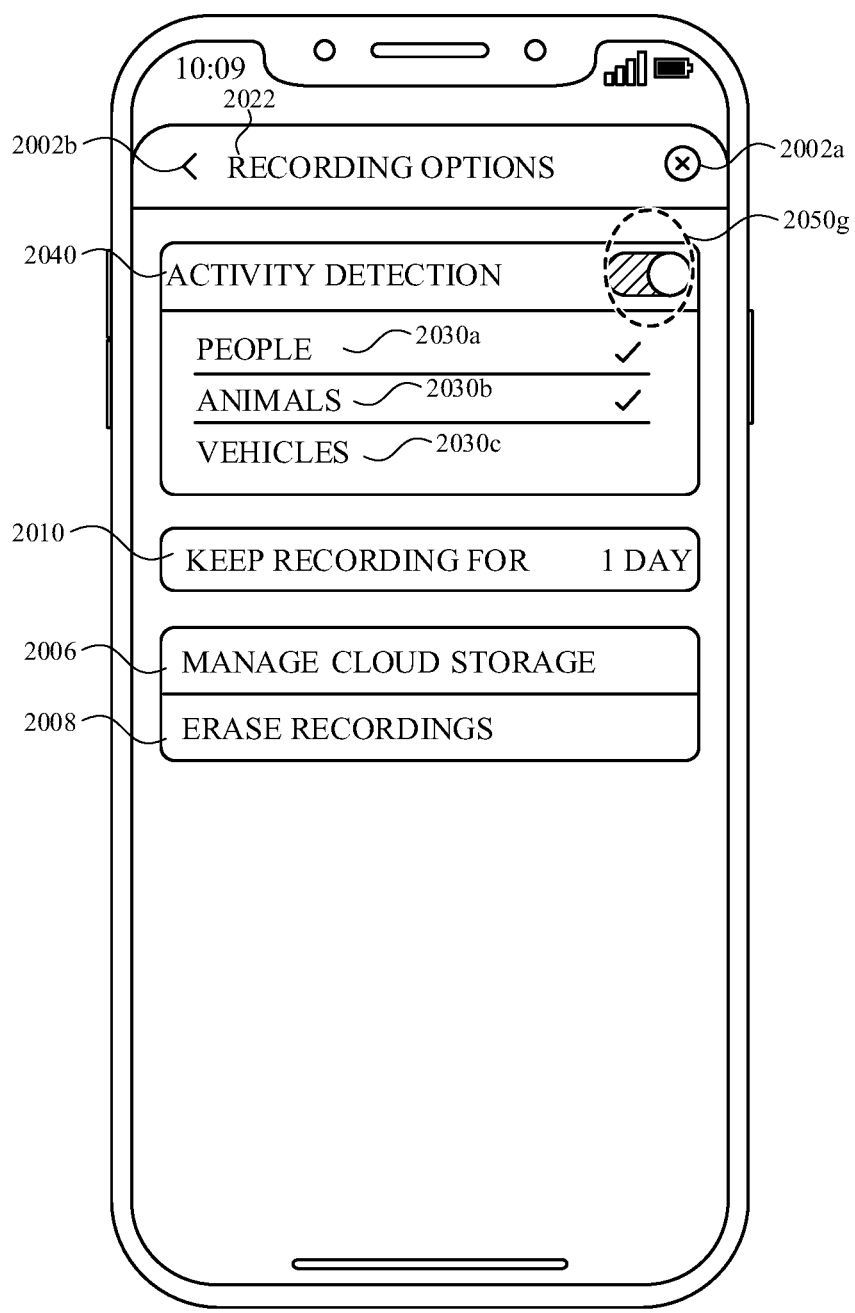
Figure 20I:
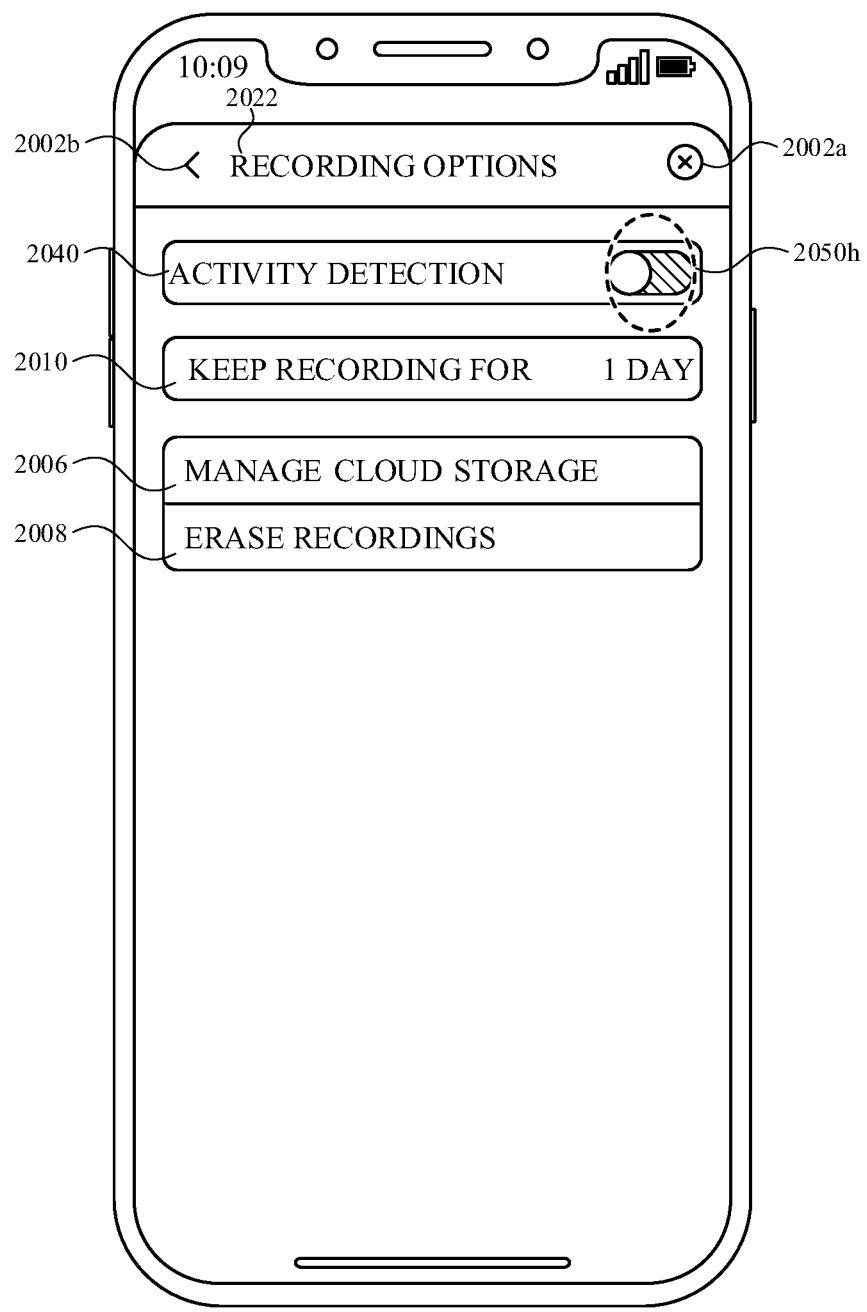
Figure 20J:
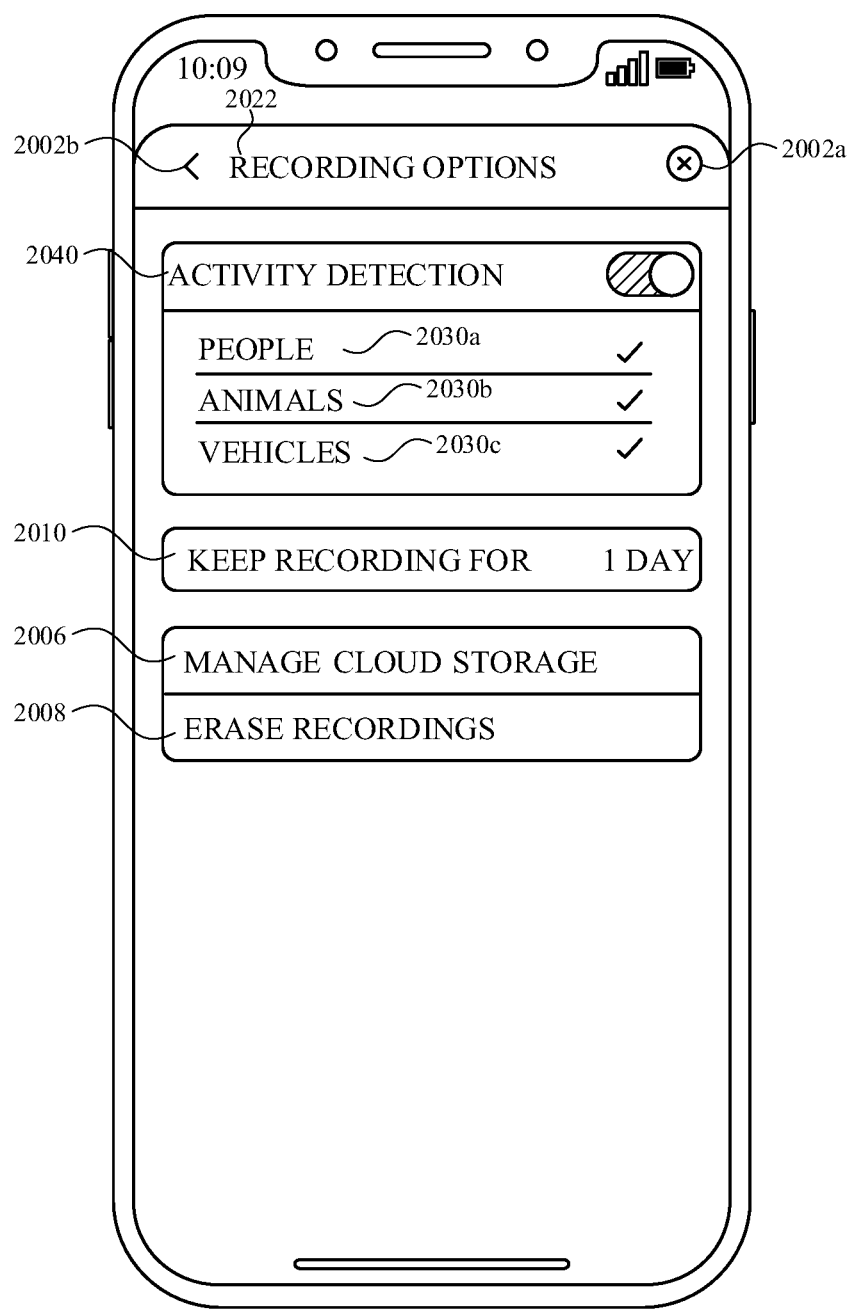
Figure 20K:
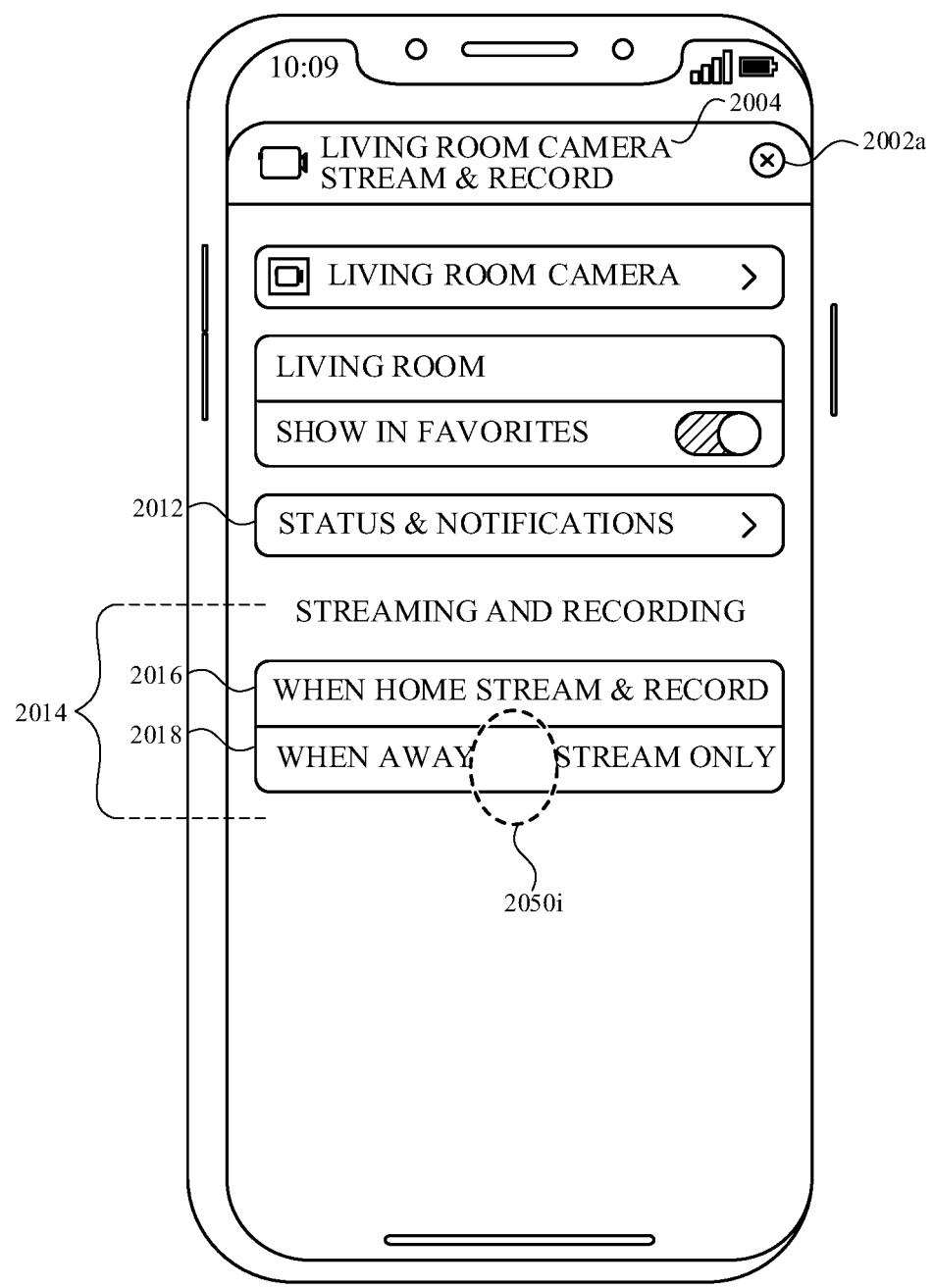
Figure 20L:
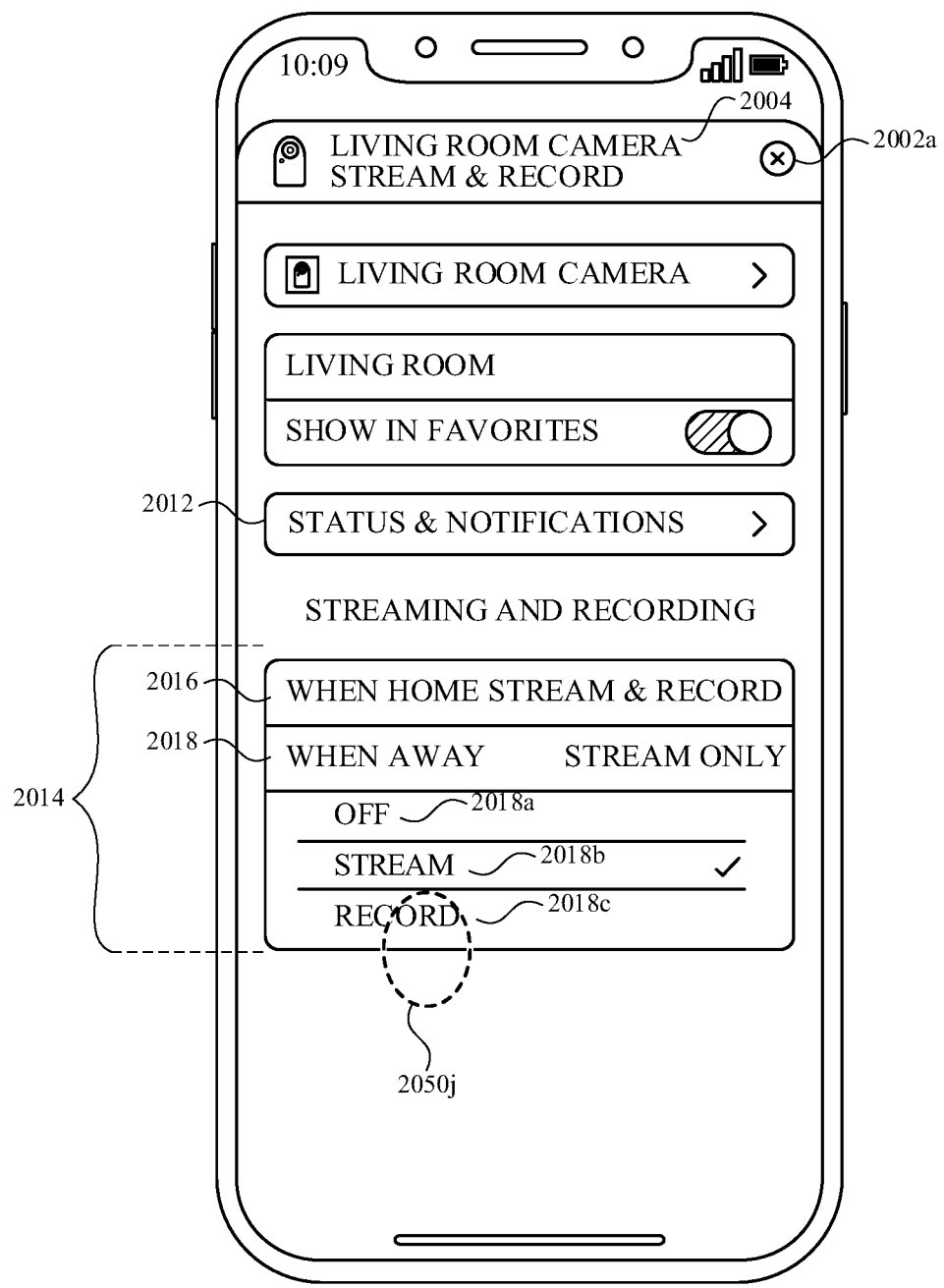
Figure 20M:
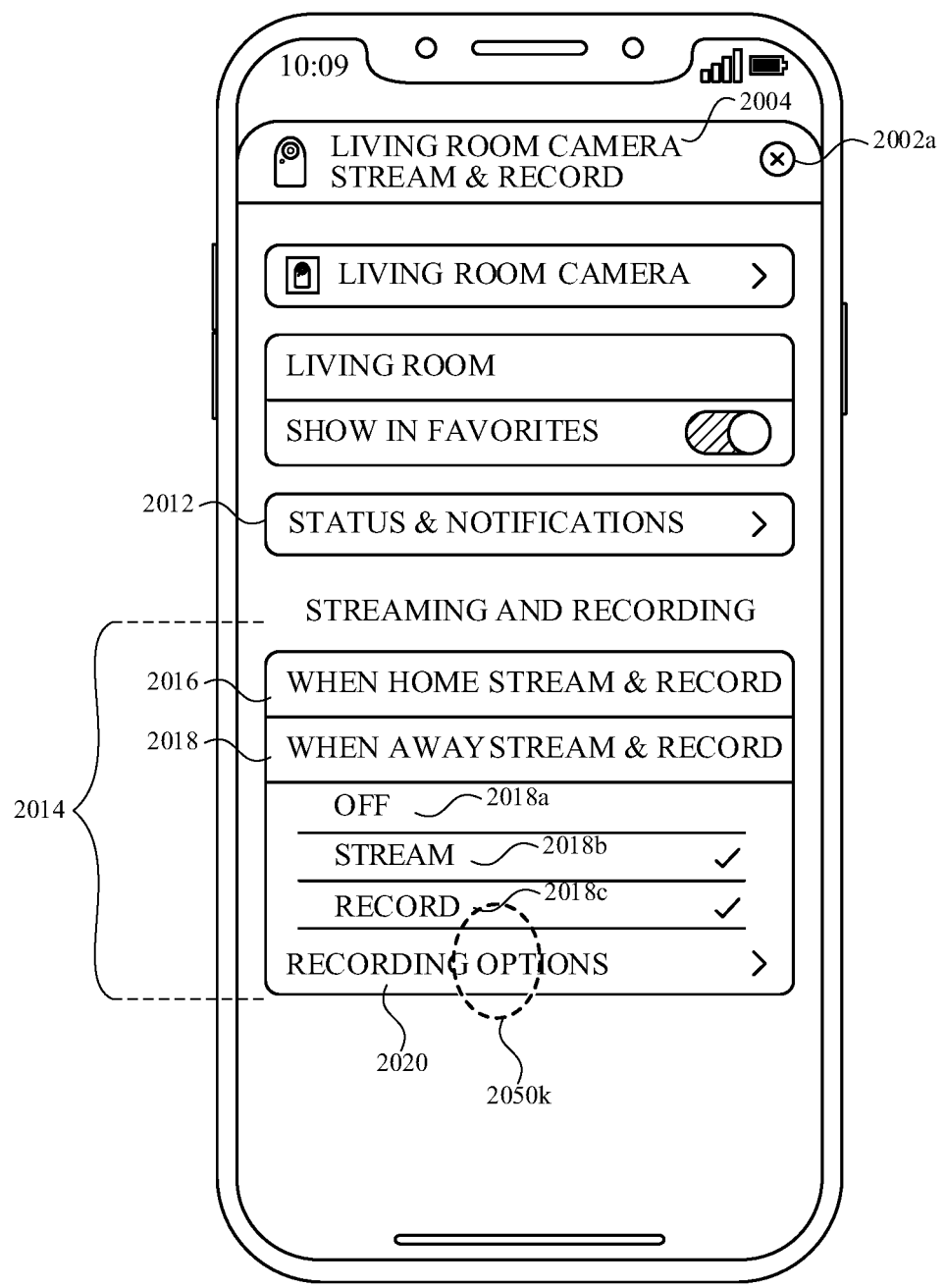
Figure 20N:
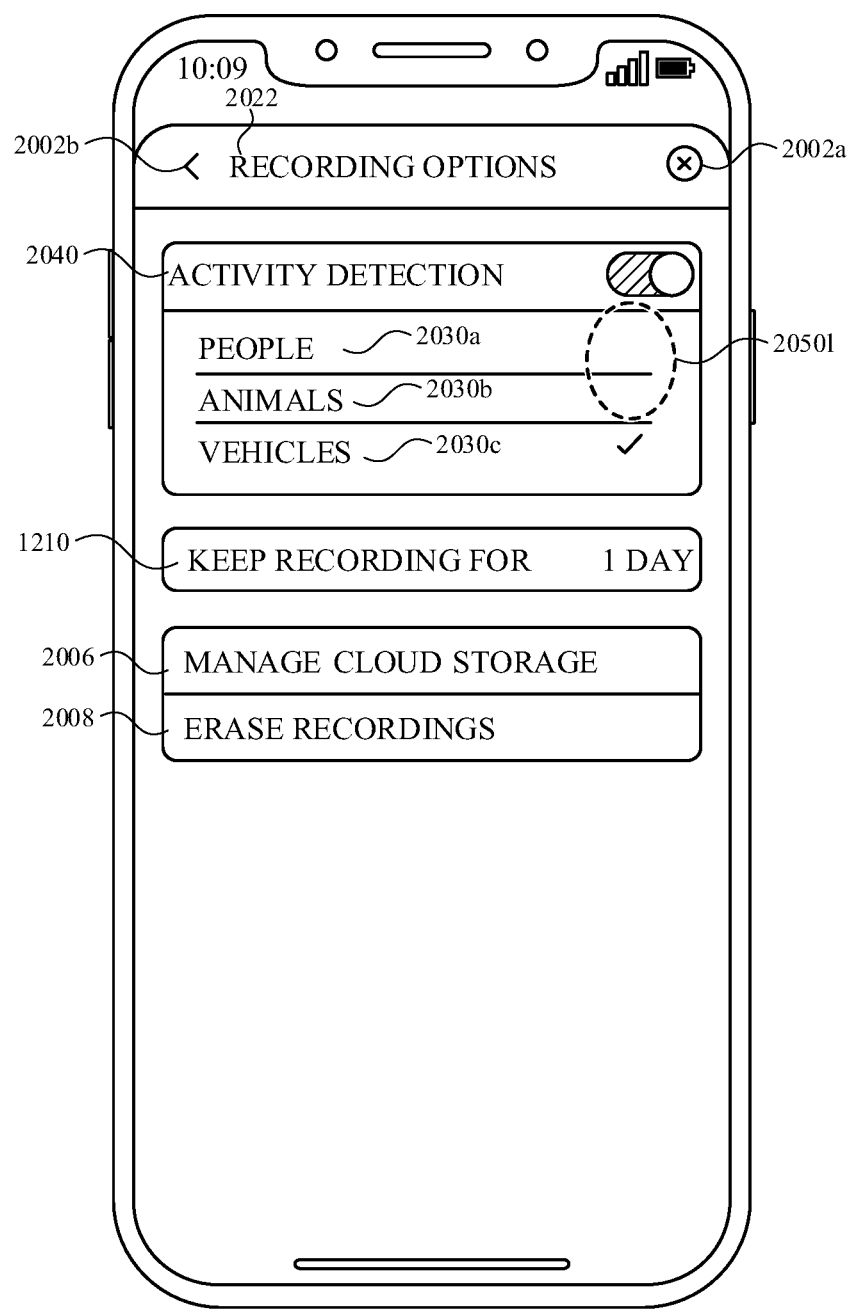
Figure 20O:
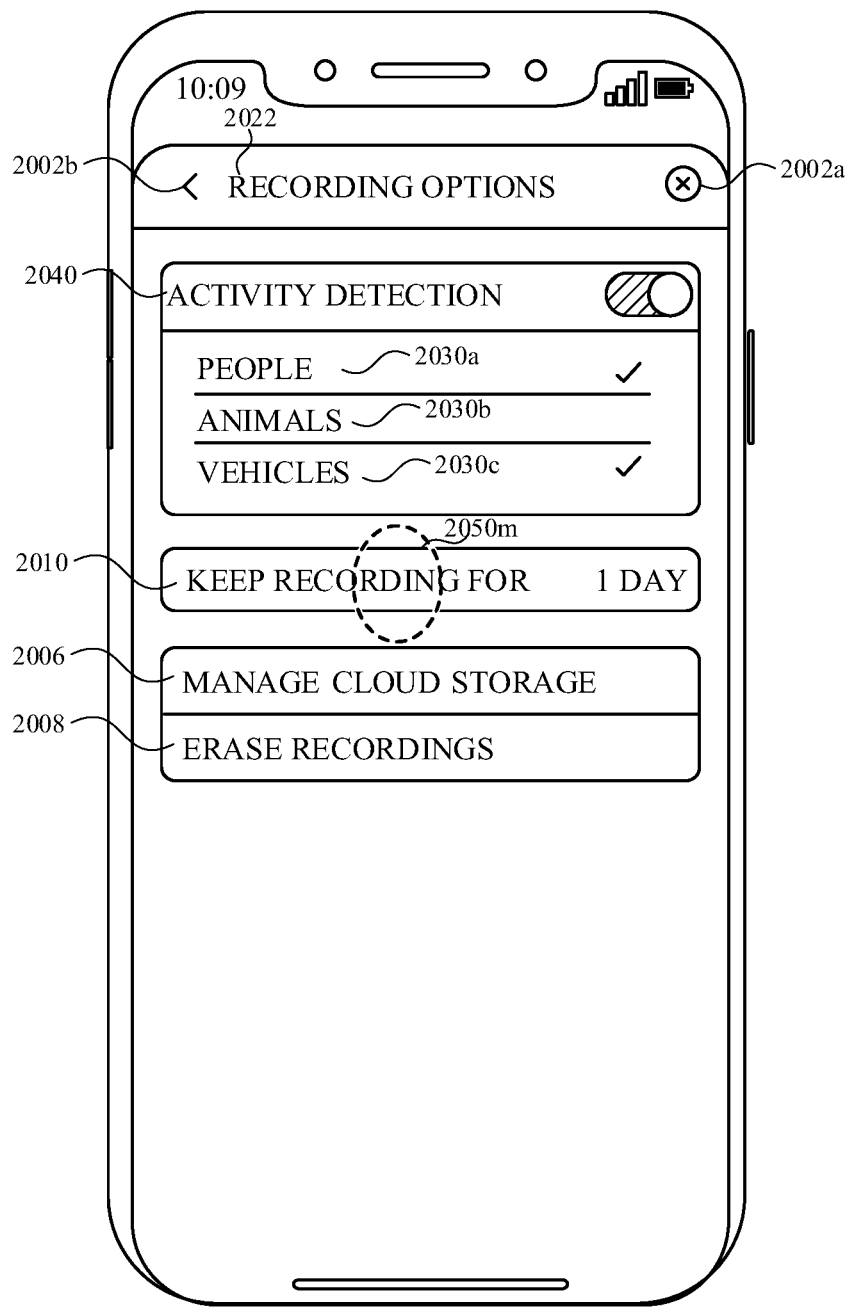
Figure 20P:
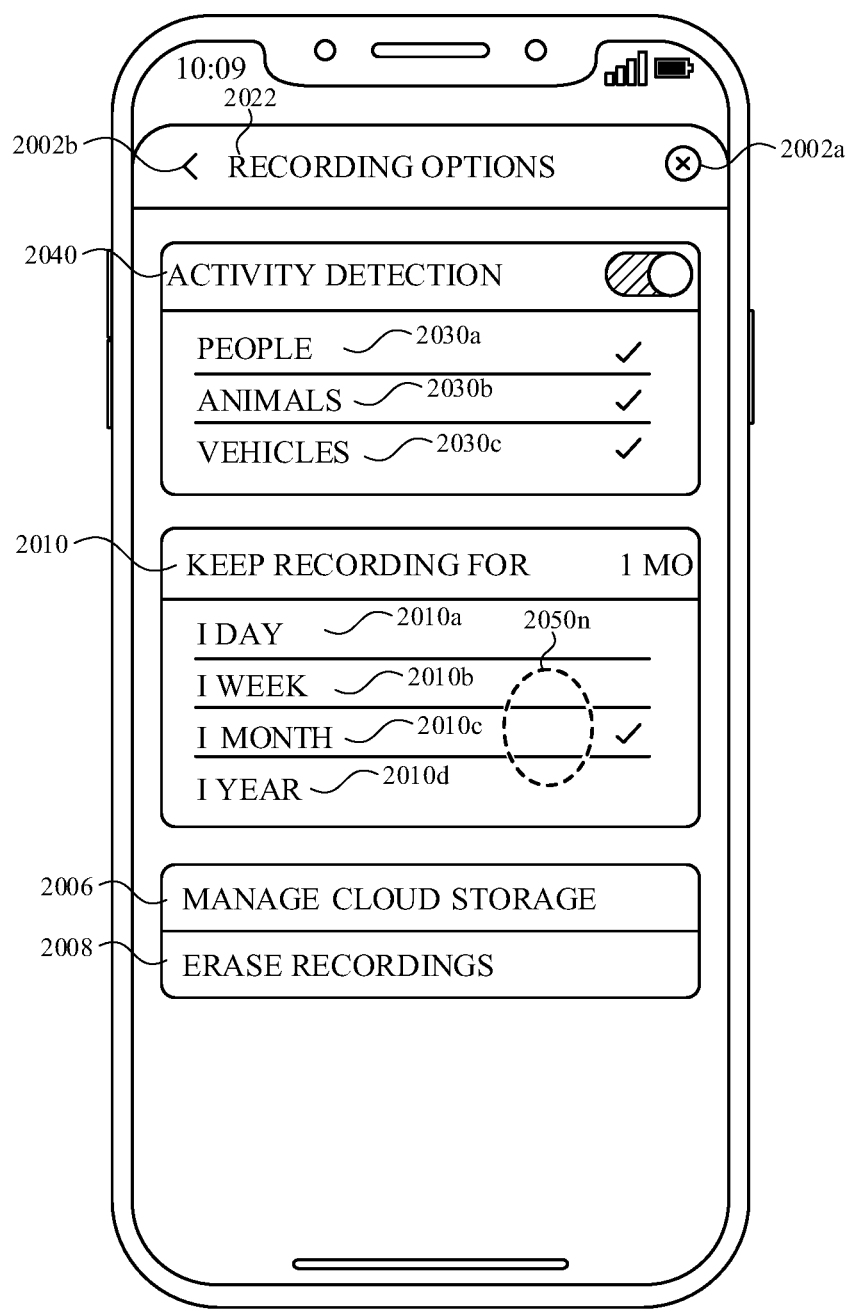
Figure 20Q:
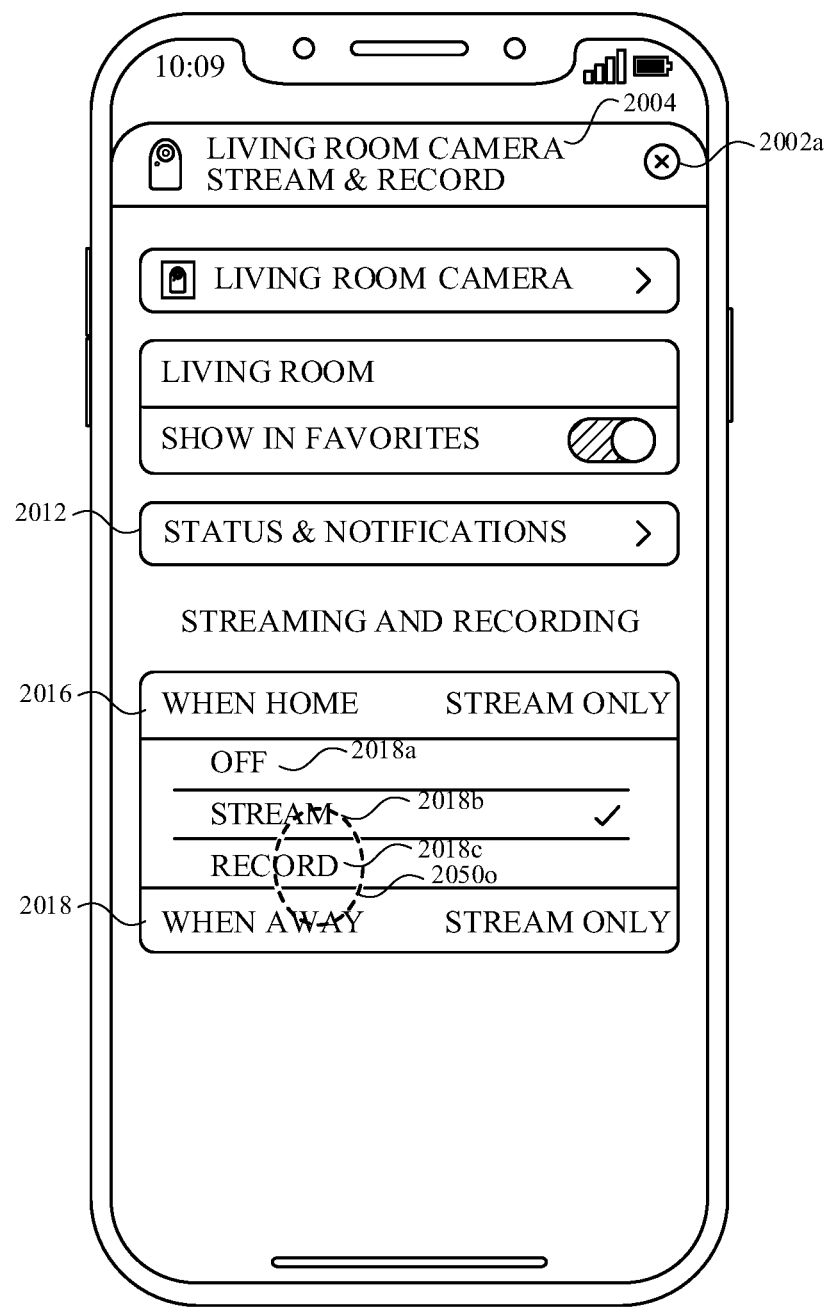
Figure 20R:
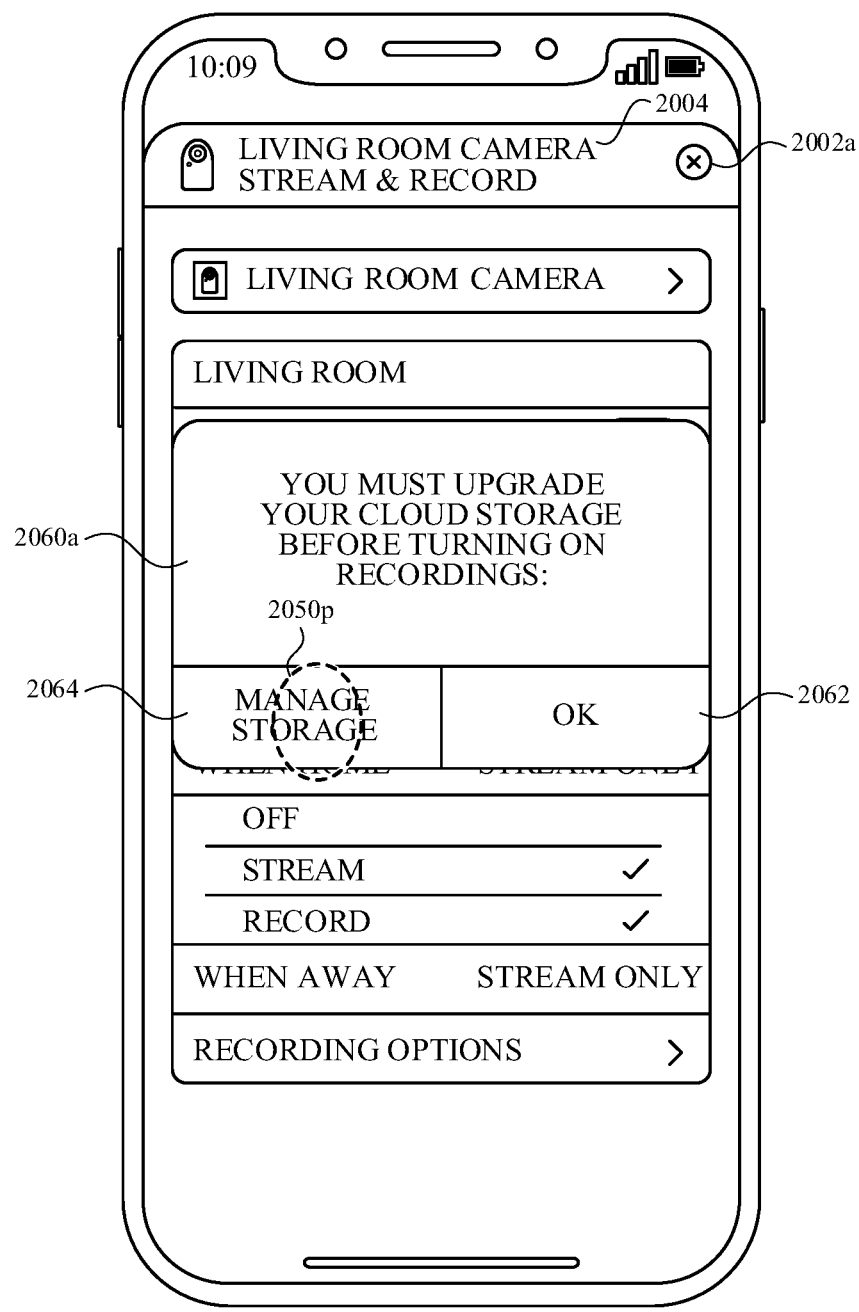
Figure 20S:
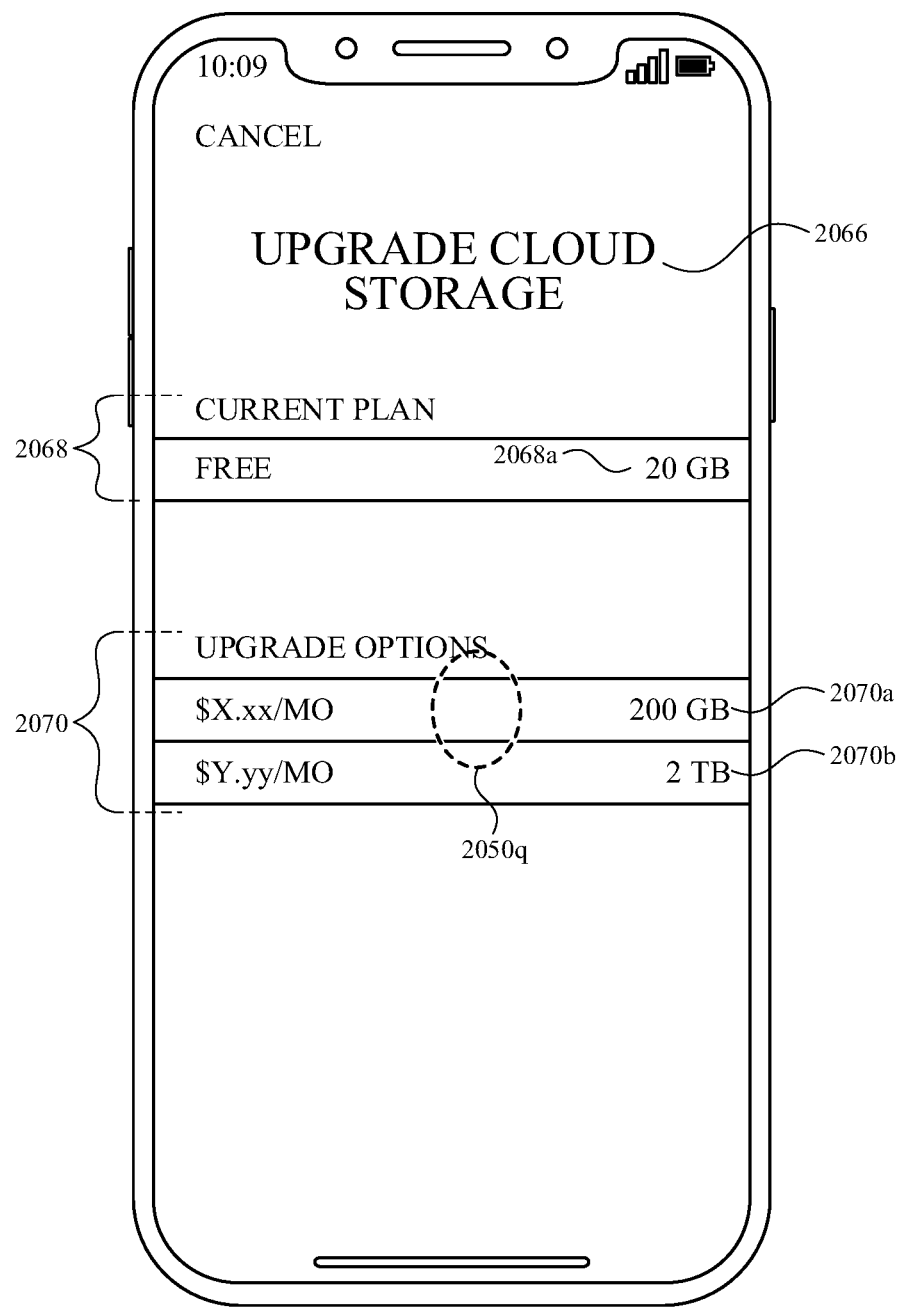
Figure 20T:
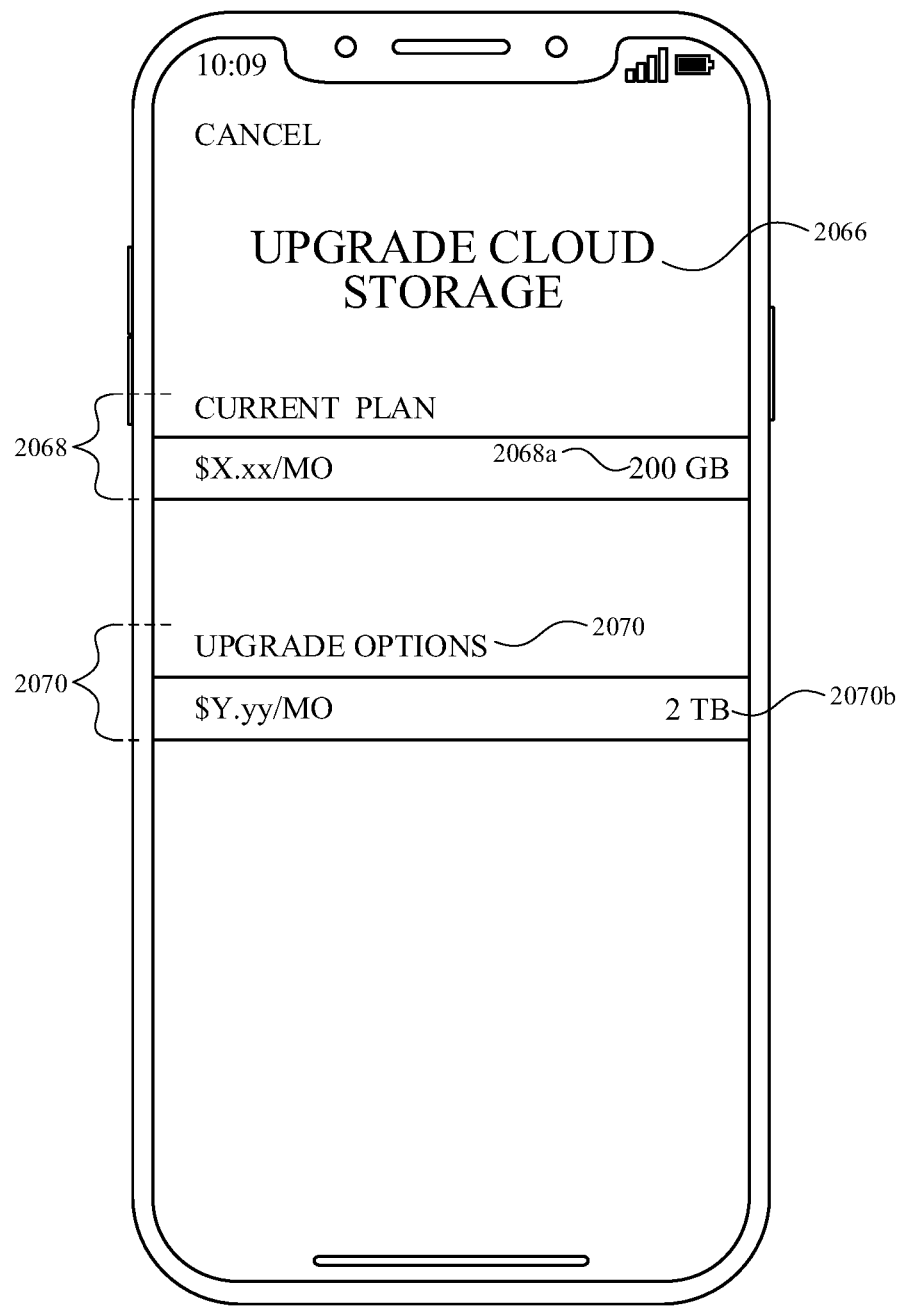
Figure 20U:
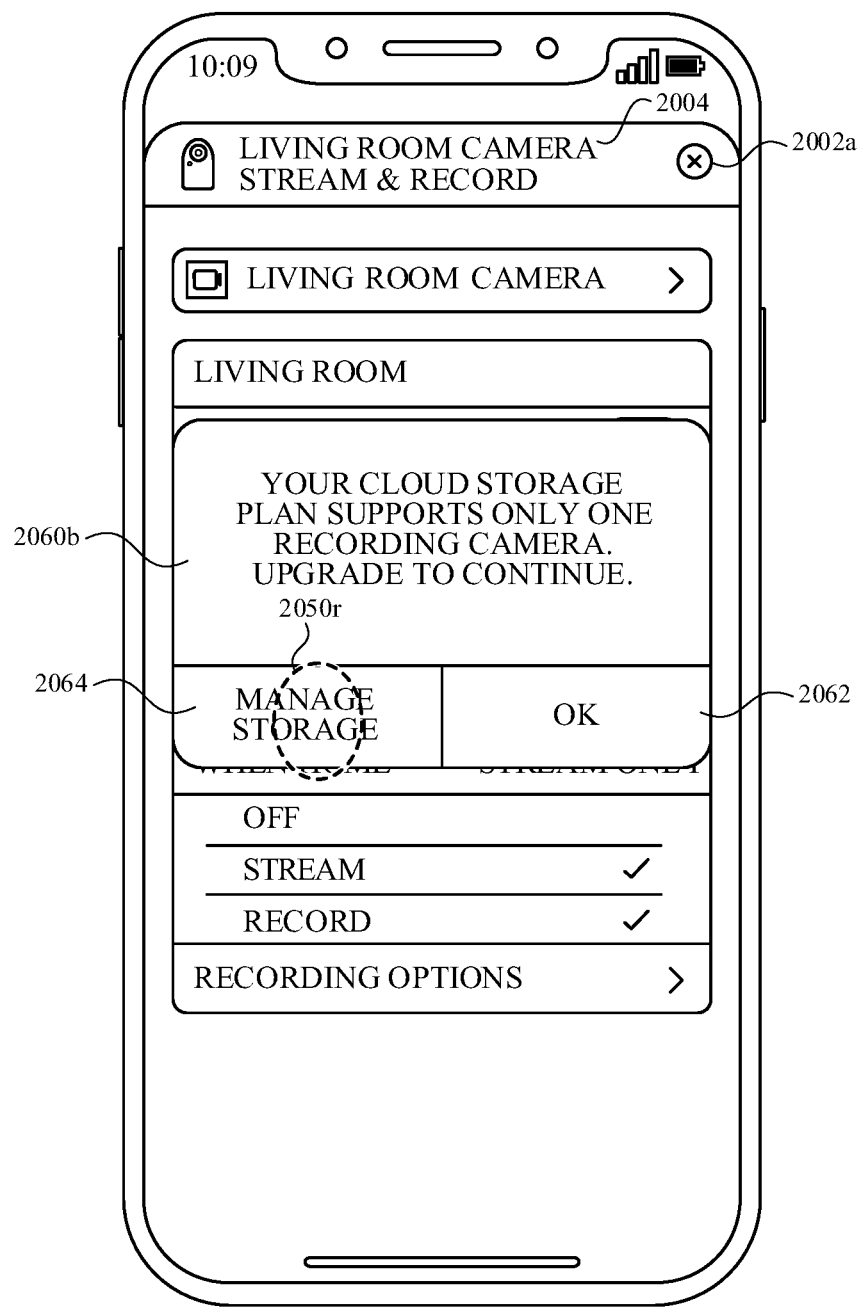
Figure 20V:
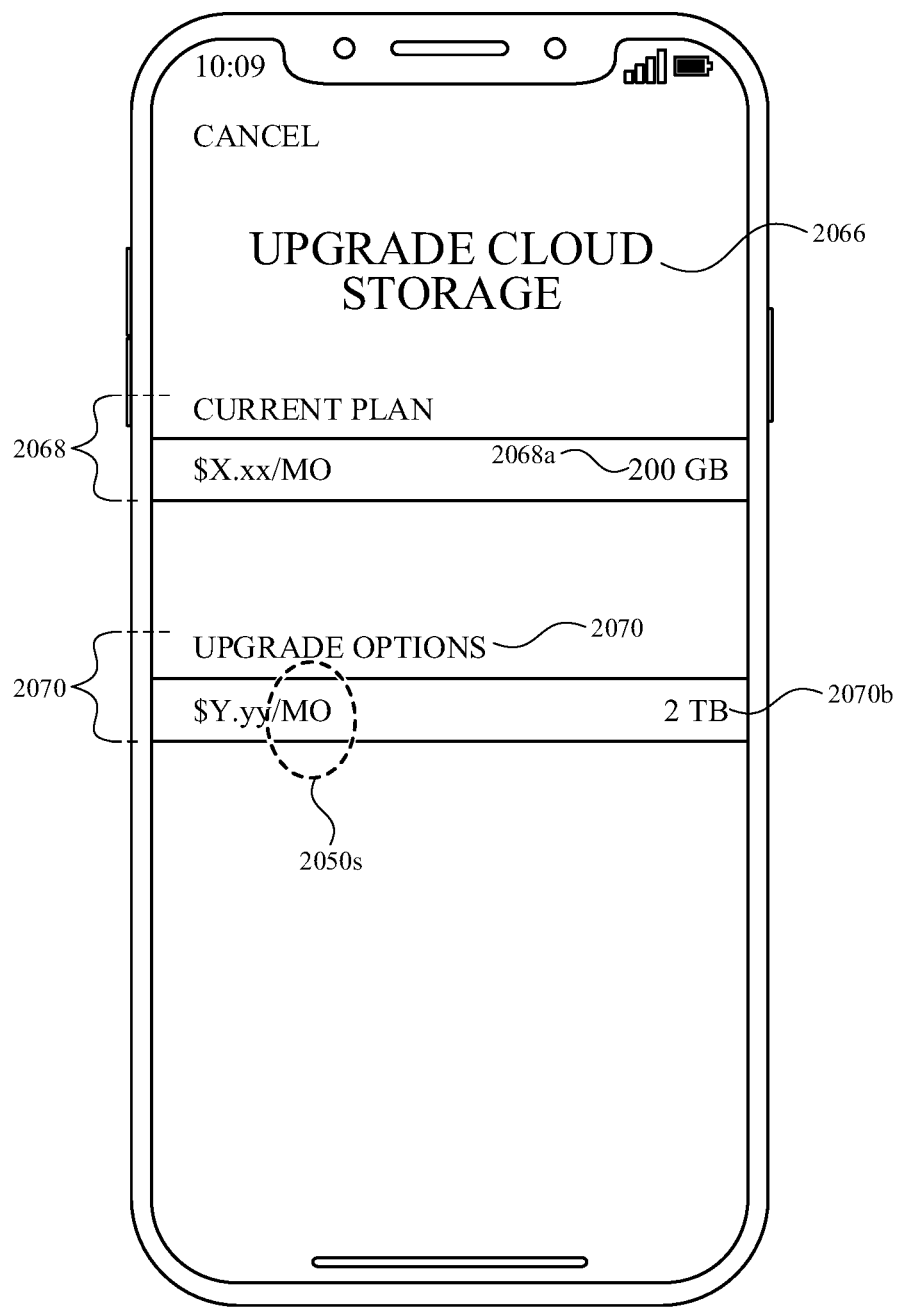
Figure 20W:
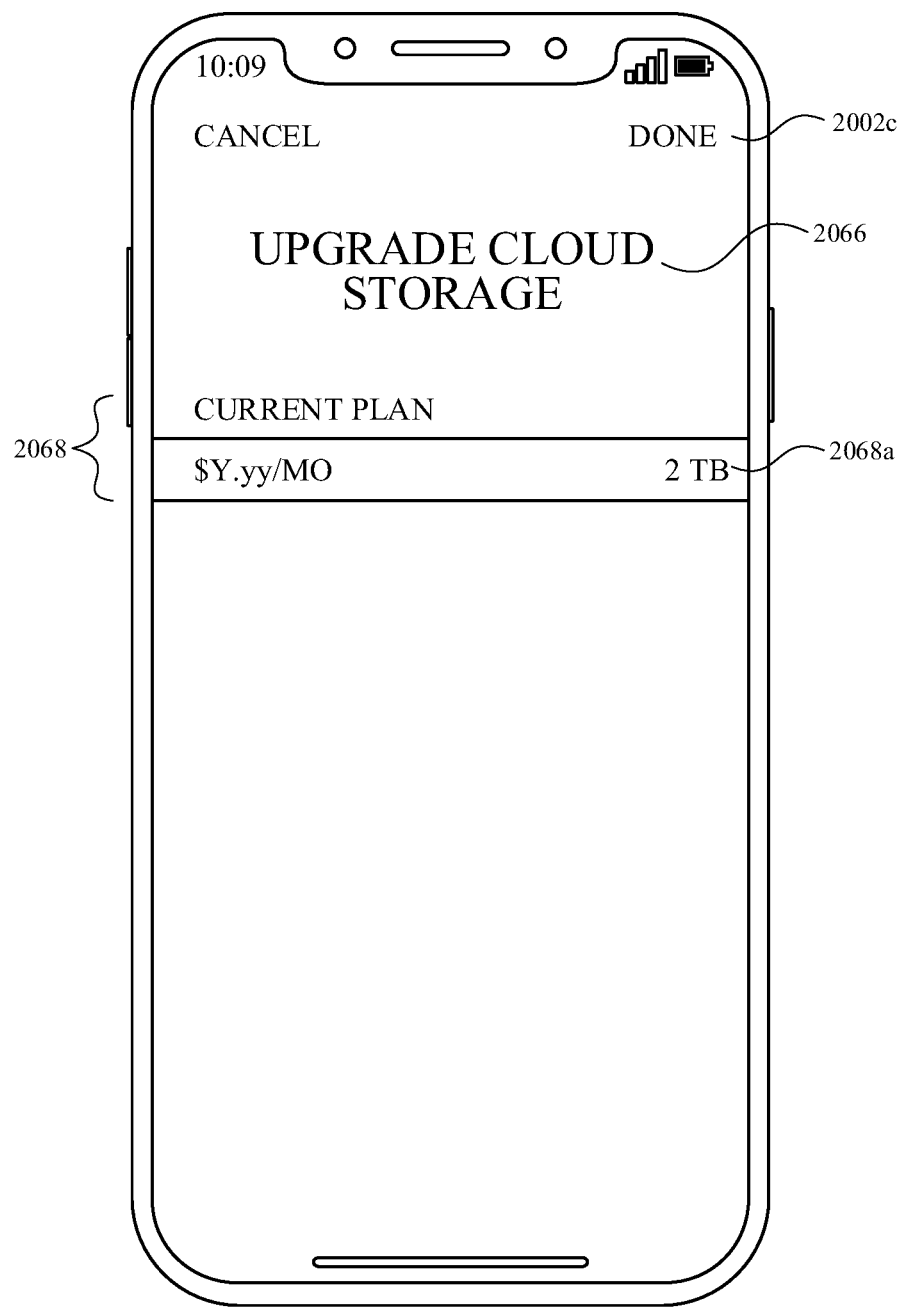
Figure 20X:
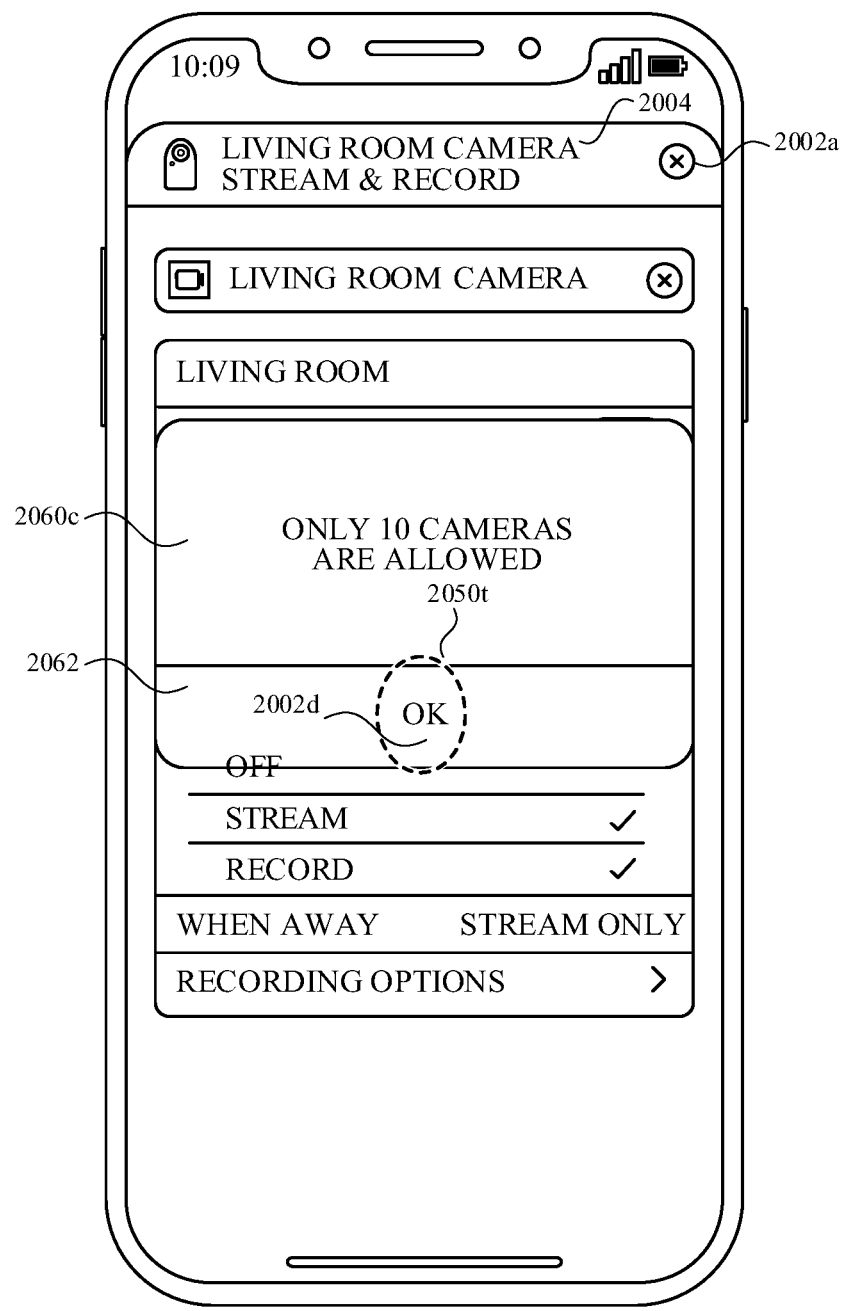
Figure 21A:
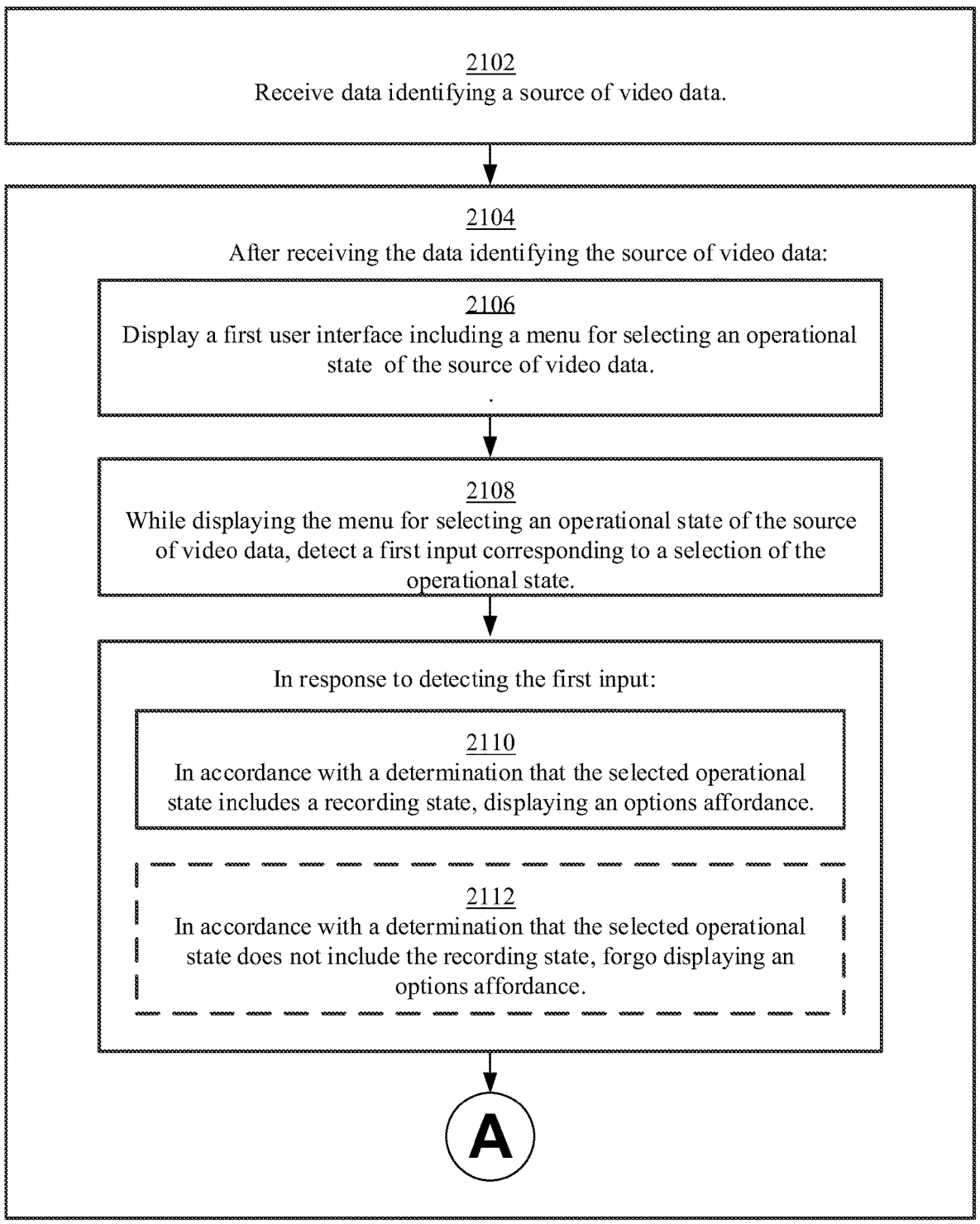
Figure 21C:
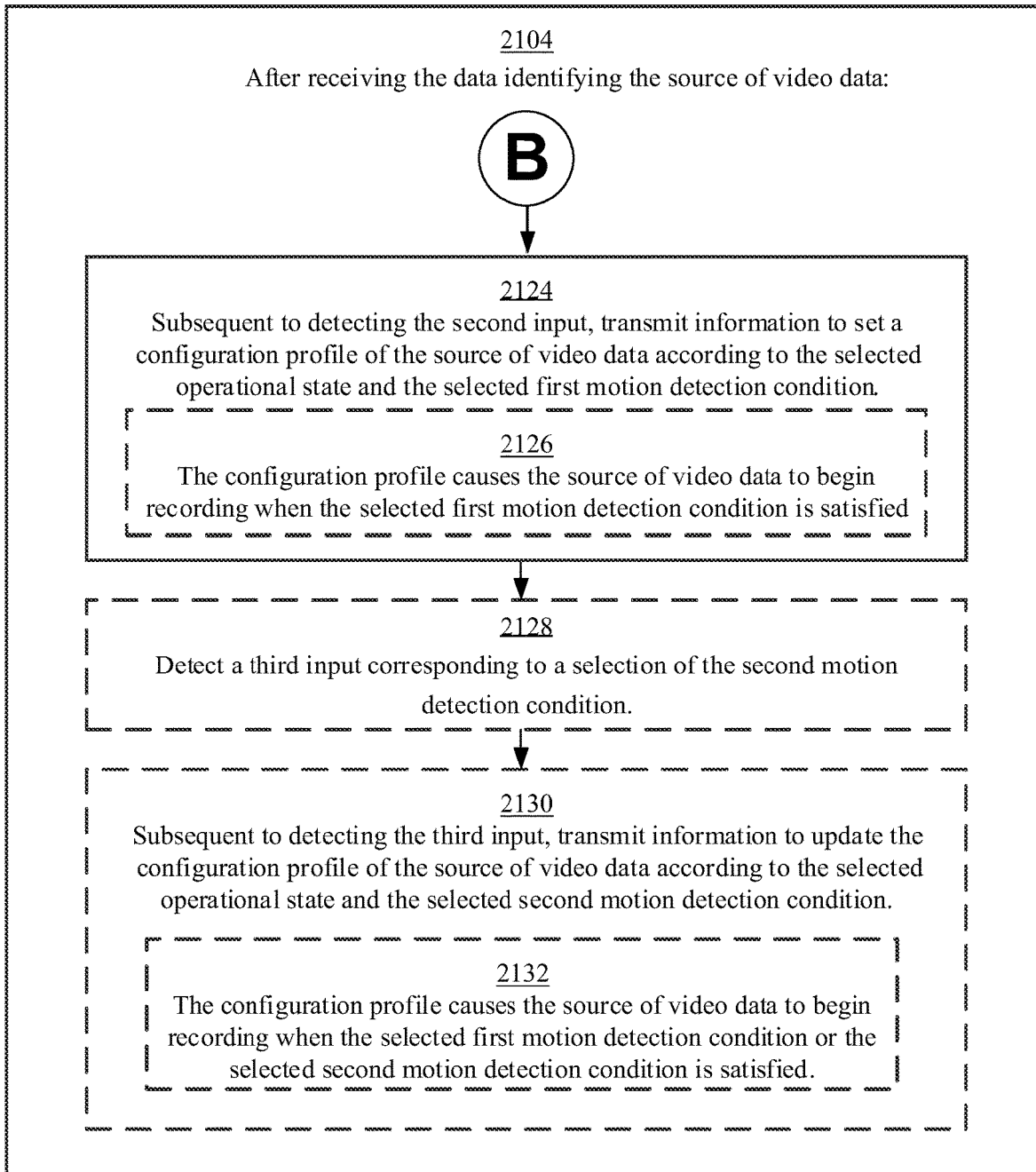

FIGS. 20A-20X illustrate exemplary user interfaces for configuring recording settings. FIGS. 21A-21C are a flow diagram illustrating methods of configuring recording settings. The user interfaces in FIGS. 20A-20X are used to illustrate the processes described below, including the processes in FIGS. 21A-21C.

FIGS. 22A-22H illustrate exemplary user interfaces for configuring notifications settings. FIGS. 23A-23C are a flow diagram illustrating methods of configuring notifications settings. The user interfaces in FIGS. 22A-22H are used to illustrate the processes described below, including the processes in FIGS. 23A-23C.

FIGS. 24A-24J illustrate exemplary user interfaces for configuring a first type of notifications for a first type of source of video data and a second type of notifications for a second type of source of video data. FIGS. 25A-25D are a flow diagram illustrating methods of configuring a first type of notifications for a first type of source of video data and a second type of notifications for a second type of source of video data. The user interfaces in FIGS. 24A-24J are used to illustrate the processes described below, including the processes in FIGS. 25A-25D.

FIGS. 26A-26I illustrate exemplary user interfaces for displaying clip representations and indicators that indicate the type of conditions that triggered the recording in accordance with some embodiments. FIGS. 27A-27B are a flow diagram illustrating methods for displaying clip representations and indicators that indicate the type of conditions that triggered the recording in accordance with some embodiments. The user interfaces in FIGS. 26A-26I are used to illustrate the processes described below, including the processes in FIGS. 27A-27B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
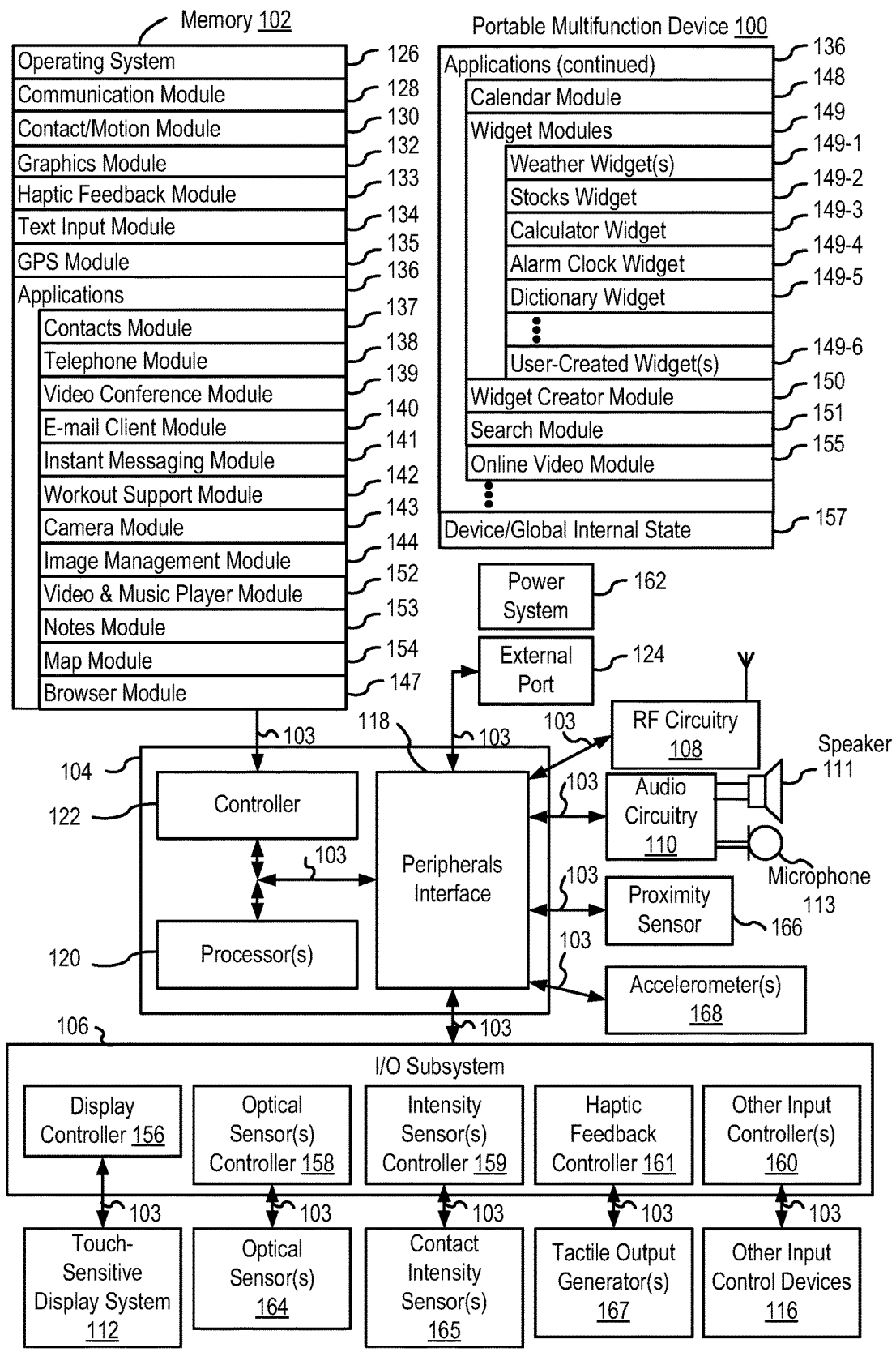
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
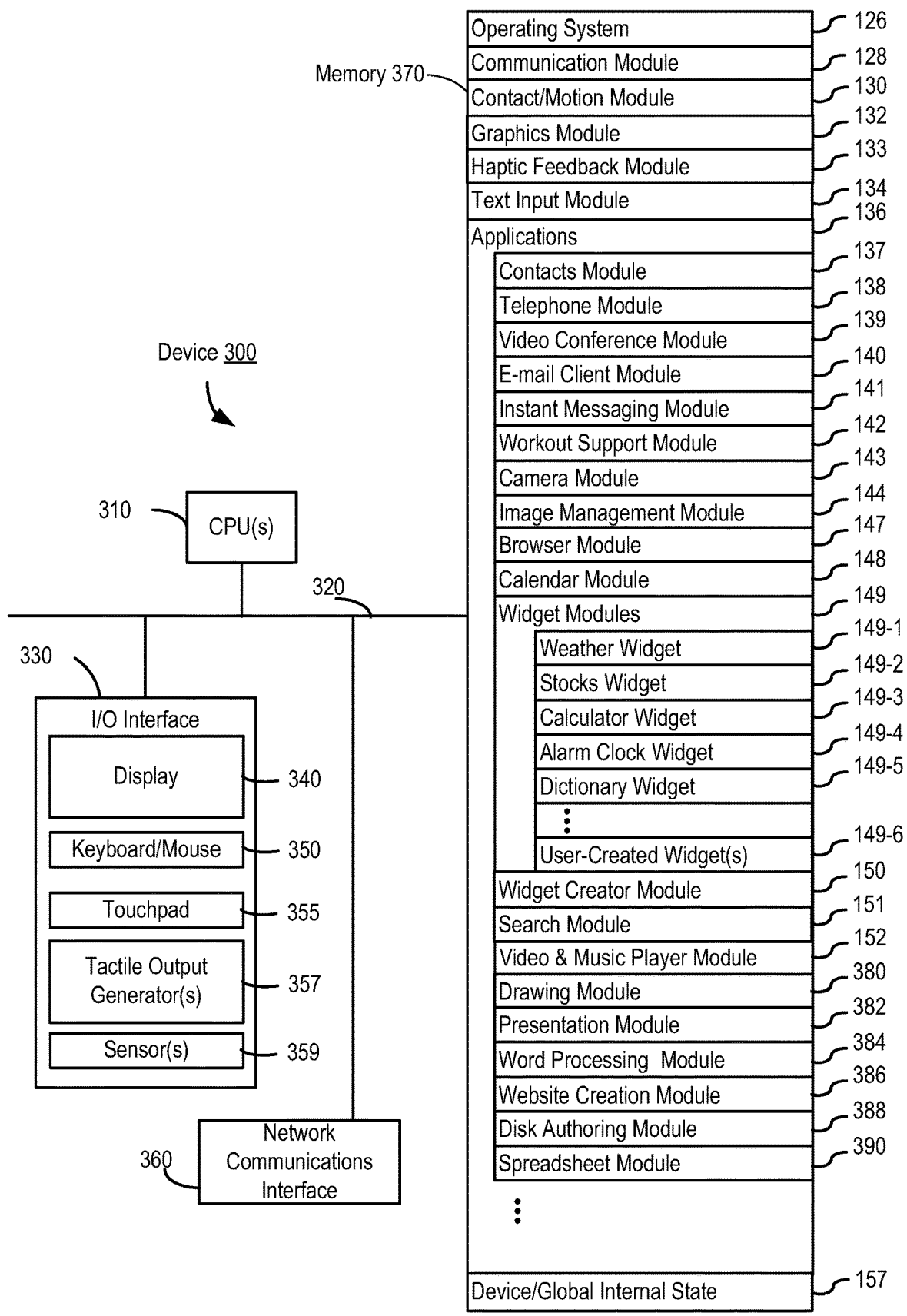
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
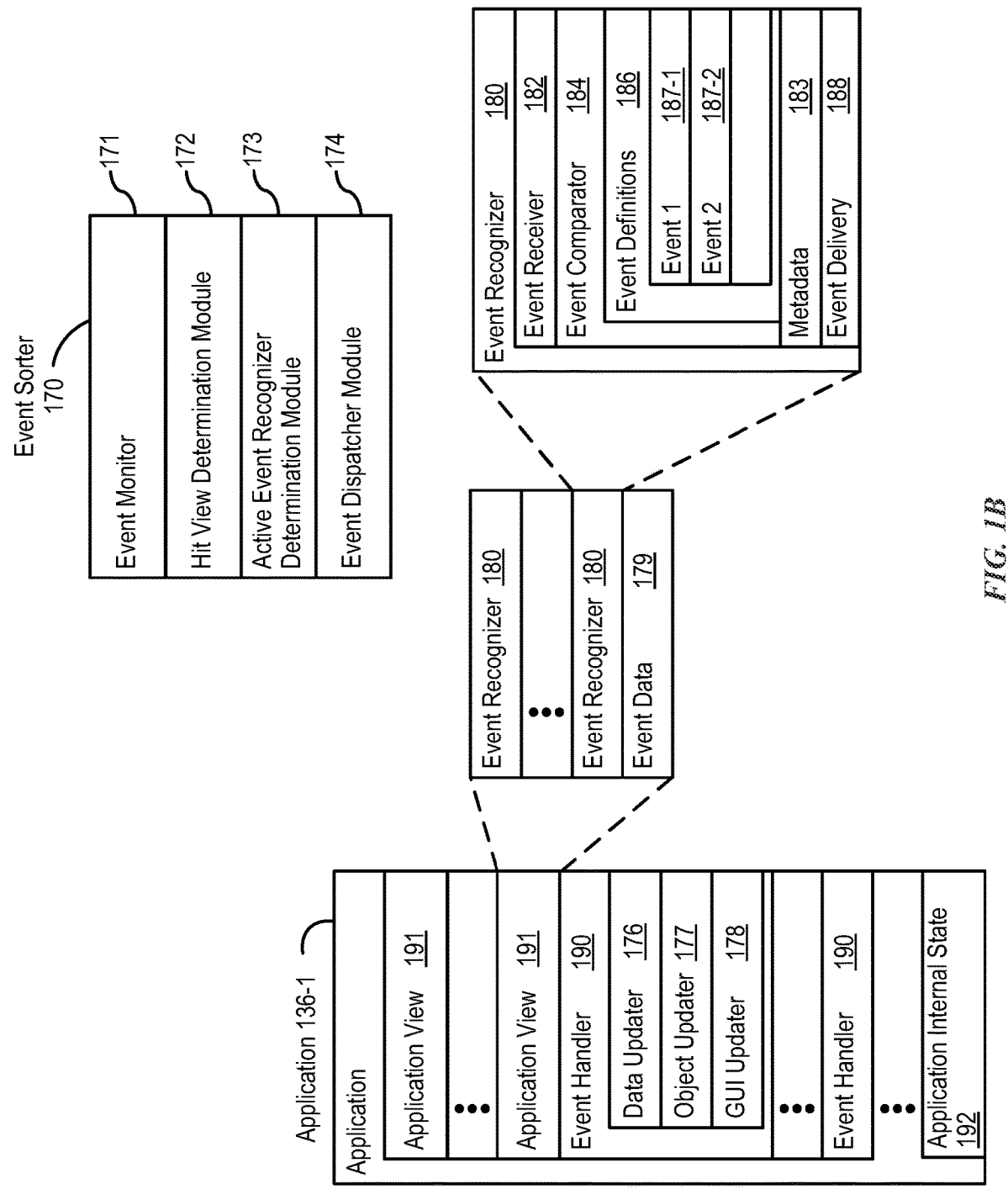
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
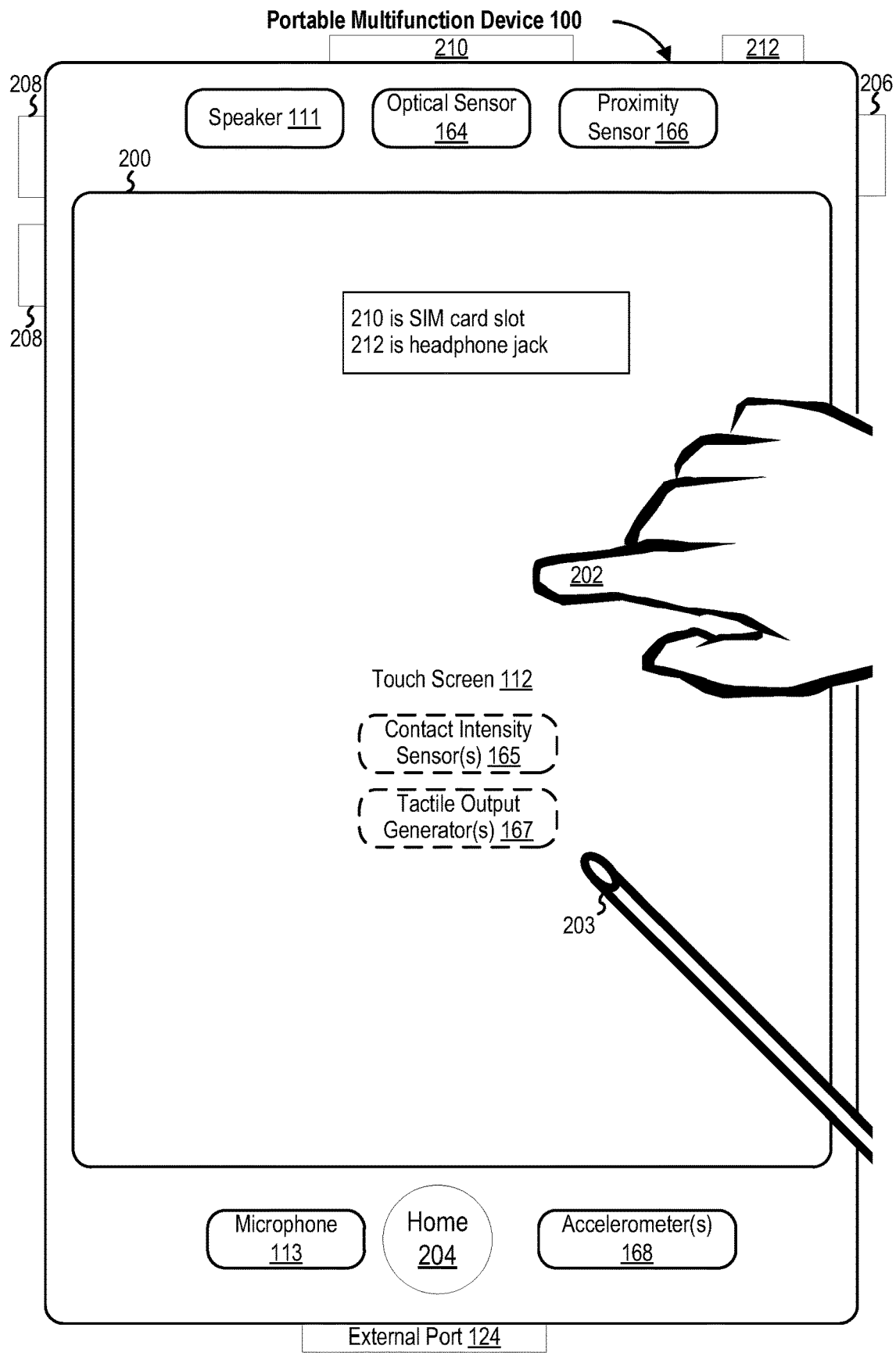
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
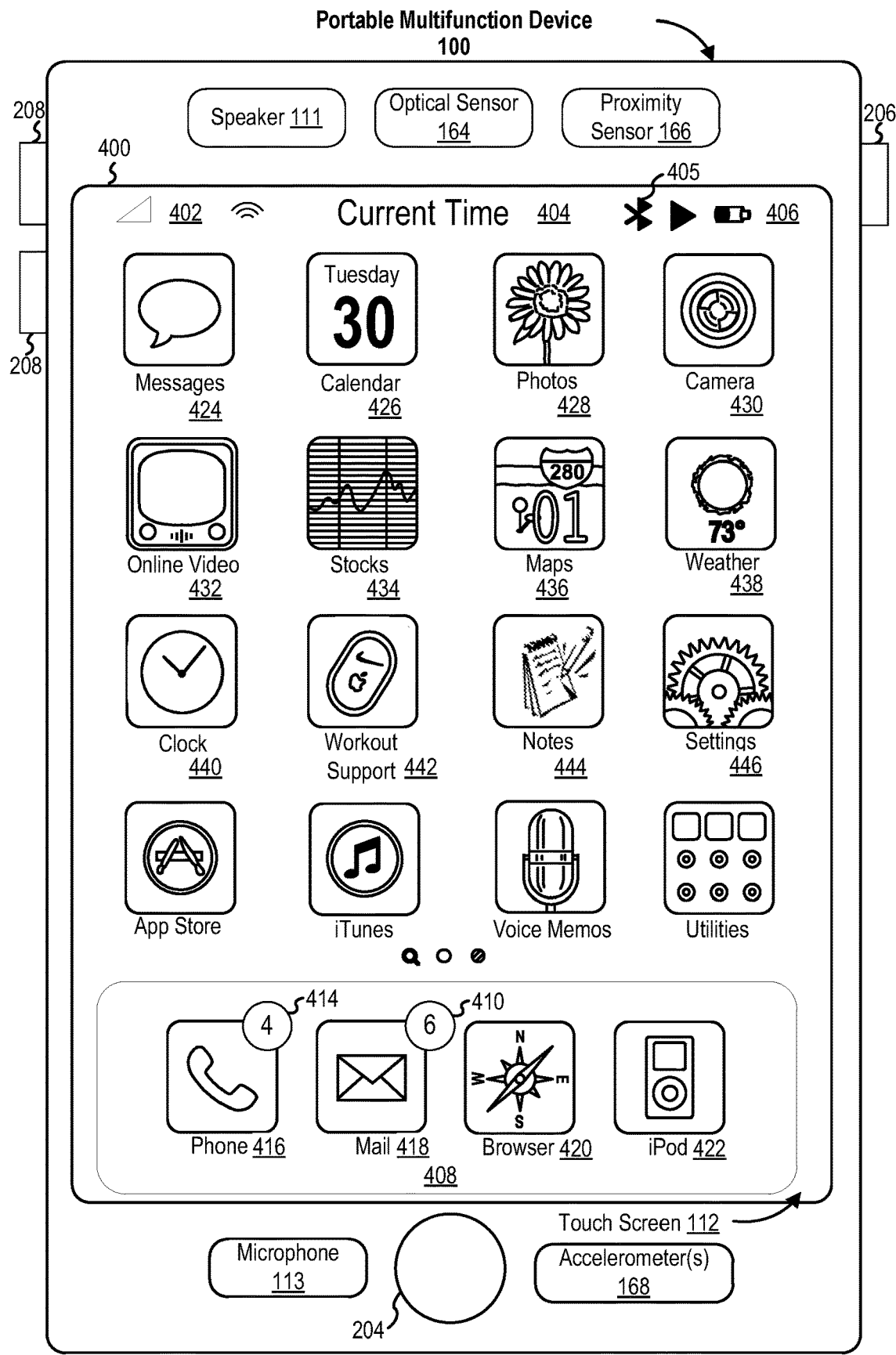
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
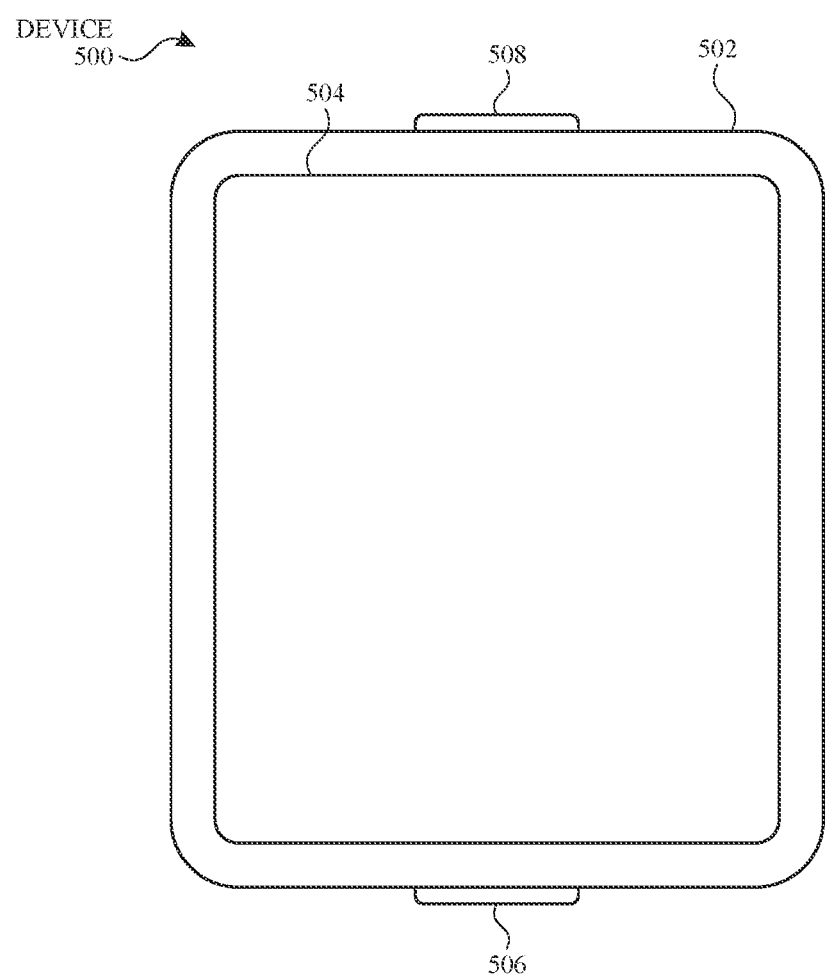
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
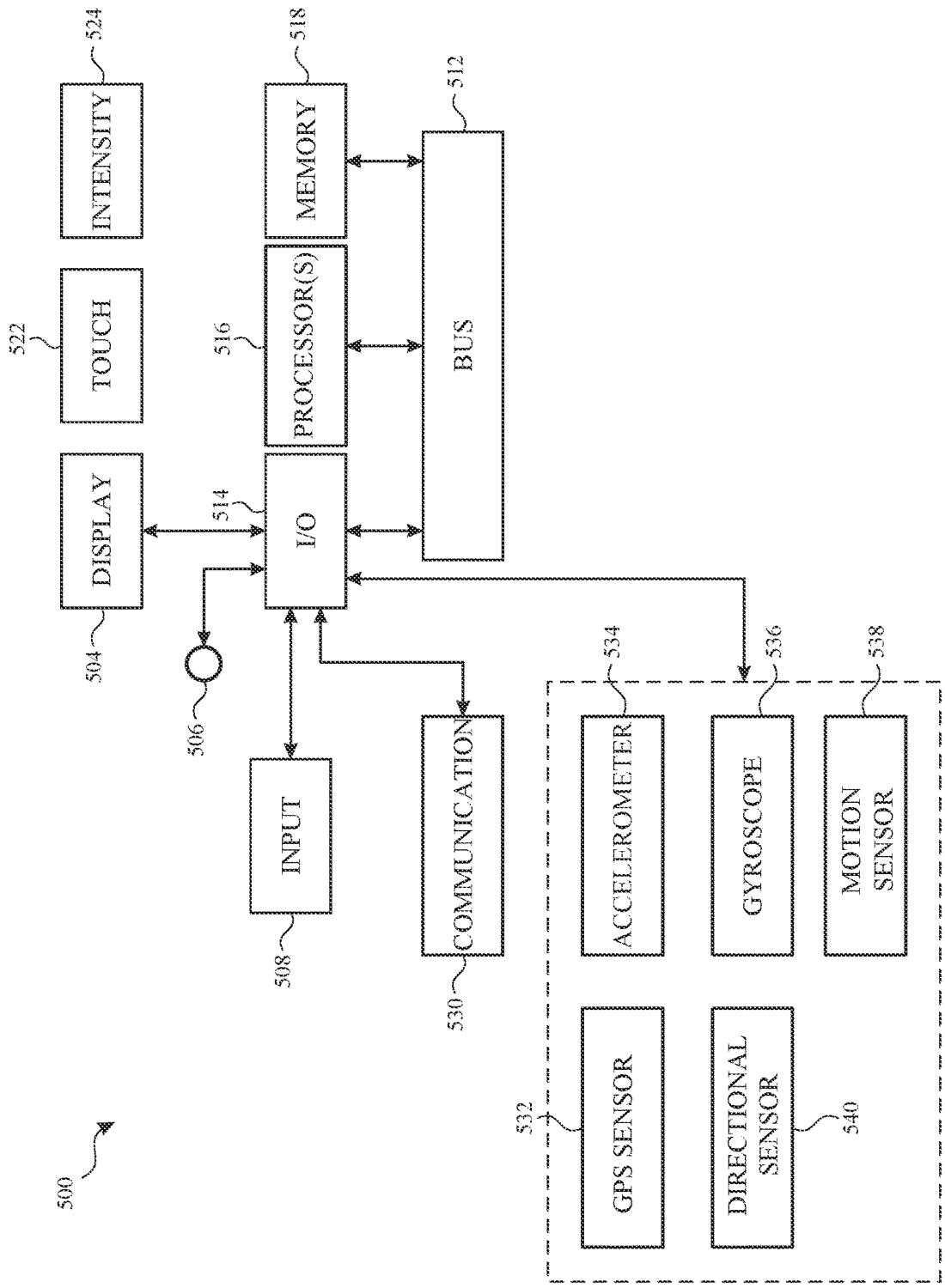
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, and 1700 (FIGS. 7A-7C, 9, 11A-11C, 13, 15A-15B, and 17). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
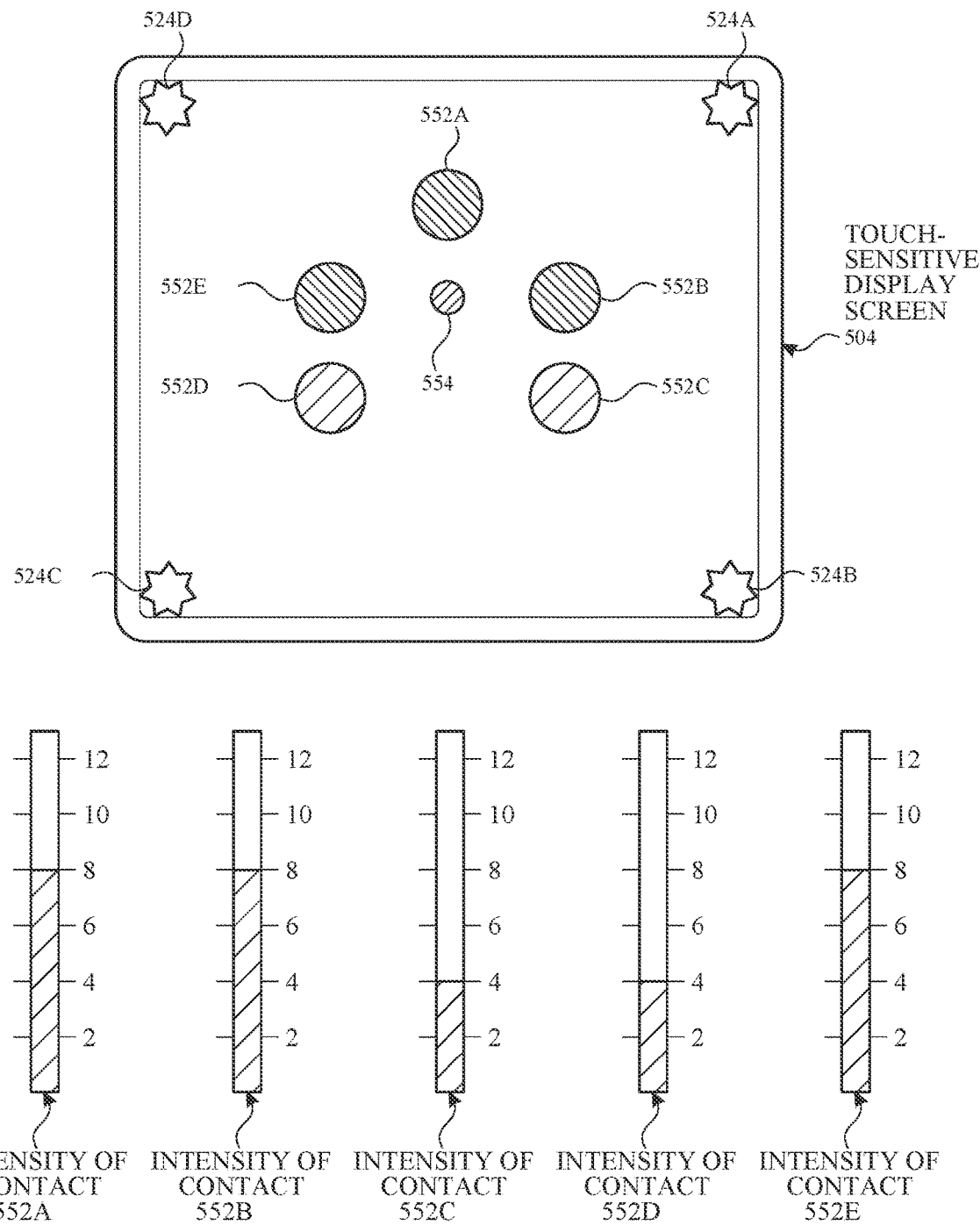

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for displaying a live video feed and recorded video from a source of video data (e.g., a camera), in accordance with some embodiments. The user interfaces in these figures are used to illustrate the processes described below, including the processes in FIGS. 7A-7C.

FIG. 6A illustrates electronic device 600 with touch-sensitive display 602. In some embodiments, device 600 includes some or all of the features of devices 100, 300, and 500. In FIG. 6A, device 600 displays a home user interface 604 of an application for managing devices (e.g., controllable devices) associated with a location 123 Main St. Home user interface 604 includes, inter alia, the name of the location (123 Main St.), add accessory affordance 606 and camera representations 610 corresponding to respective sources of video data (e.g., cameras), and affordances associated with various other features of the application (e.g., device status, such as lights ON/OFF, doors locked/unlocked, etc.). As illustrated in FIG. 6A, camera representations 610 correspond respectively to Camera 1 (front door camera; 610a), Camera 2 (back patio camera; 610b), Camera 3 (living room camera; 610c), Camera 4 (kid's room camera; 610d), Camera 5 (side door camera; 610e), and Camera 6 (garage camera; 610f).

In FIG. 6A, device 600 receives (e.g., detects) user input 650a (e.g., a tap) corresponding to selection of camera representation 610a associated with a front door camera.

As illustrated in FIG. 6B, in response to receiving user input 650a, device 600 displays a video media user interface 608 that includes a live (e.g., non-recorded, real-time) video feed from the front door camera. Play/pause affordance 612 can be selected (e.g., with a tap input on display 602) to pause the live video feed. Video media user interface 608 also includes scrubber bar 620. As illustrated in FIG. 6B, scrubber bar 620 includes an interactive, elongated region on display 602 that includes a representation of media content that can be scrolled along the direction parallel to direction of elongation. In some embodiments, the media content (e.g., video) can be played back at arbitrary and variable rates based on a characteristic (e.g., the speed of a received user input). In some embodiments, the scrubber bar represents approximately one day of content at a time.

Current display indicator 622 in scrubber bar 620 indicates what portion of scrubber bar 620 corresponds to the currently displayed image. As illustrated in FIG. 6B, current display indicator 622 indicates that the currently displayed video is a live feed. Positions on scrubber bar 620 to the left of the current display indicator correspond to times before the time associated with the currently displayed image, whereas positions on scrubber bar 620 to the right of the current display indicator 622 correspond to times after the time associated with the currently displayed image.

As illustrated in FIG. 6B, scrubber bar 620 includes clip representations 624a and 624b of recorded clips of video from the front door camera. In some embodiments, a recorded clip of video is represented by a rounded rectangle or a shaded area of scrubber bar 620. As illustrated in FIG. 6B, the clip representations each include a representation of an image from the respective recorded clip of video (e.g., a thumbnail representation or an actual image from the clip).

In some embodiments, the image represents the first frame or a frame in the middle of the recorded clip of video (e.g., a representative frame).

As illustrated in FIG. 6B, each clip representation video has a visual width in scrubber bar 620 that is proportional to a duration of the corresponding recorded clip of video. For example, representation 624a is narrower than representation 624b, which indicates that the duration of the recorded clip of video represented by clip representation 624b is shorter than the duration of the recorded clip of video represented by clip representation 624a. In some embodiments, a representation of a recorded clip of video includes a number of representative images from the recorded clip of video, where the number of representative images is directly proportional to the duration of the recorded clip of video. As illustrated in FIG. 6B, clip representation 624b includes approximately one and a half representative images from the corresponding clip, whereas clip representation 624a includes one representative image, indicating that the clip represented by clip representation 624b is approximately fifty percent longer than the clip represented by clip representation 624a.

Scrubber bar 620 also includes break indications 626a-626c of periods of time during which recorded video from the front door camera is not available. As illustrated in FIG. 6B, the periods of time during which recorded video from the front door camera is not available are indicated by spaces (e.g., areas with uniform color) and dots between representations of recorded clips of video.

In some embodiments, the indication of the period of time during which recorded video from the source is not available is independent from the duration of the period of time. As illustrated in FIG. 6B, the distance on scrubber bar 620 between two clip representations (e.g., between representation 624a and 624b) is independent from the amount of time between the end of one clip (e.g., the clip associated with clip representation 624b) and the beginning of the subsequent clip (e.g., the clip associated with clip representation 624a). As illustrated in FIG. 6B, the distance between representation 624a and 624b is the same regardless of the amount of time between the end of one clip and the beginning of the subsequent clip. (e.g., the distance between representations is fixed or constant from one representation to the next). In some embodiments, the distance on scrubber bar 620 between clip representations varies from one clip representation to the next. In some embodiments, the distance between two clip representations is based on (e.g., is directly proportional to) the amount of time between the end of one clip and the beginning of the subsequent clip.

As illustrated in FIG. 6B, the live video feed shows that there is a package on the front door step. As illustrated in FIGS. 6C-6D, a person picks up the package and takes it into the house. This activity is detected (e.g., via motion detection processing). In response to detecting the motion, the live video feed from the front door camera is recorded (e.g., by the front door camera, a server remote to the front door camera, or device 600). In some embodiments, video from the front door camera is recorded for a predetermined amount of time (e.g., 10 seconds from the time motion is detected or from the time motion is detected until 10 seconds after motion ceases to be detected).

In some embodiments, device 600 receives data representing a newly recorded clip of video from the front door camera. As illustrated in FIG. 6E, in response to receiving data representing the a recorded clip of the video illustrated in FIGS. 6C-6D, clip representation 624c of the recorded clip is added to scrubber bar 620 at a position representative of the time the clip was recorded.

Turning to FIG. 6F, while displaying the video media user interface 608 with the live video feed, device 600 receives (e.g., detects) user input 650*b*, which includes a tap on touch-sensitive display 602 at the location corresponding to clip representation 626A.

As illustrated in FIG. 6G, in response to receiving user input 650B, device 600 displays the recorded clip of video corresponding to selected clip representation 624*a* (e.g., by replacing the live video feed with a display of the recorded clip of video corresponding to selected clip representation 624*a*) and changes (e.g., updates or scrolls) the display of scrubber bar 620 to indicate the portion of scrubber bar 620 that corresponds to the image currently displayed in the main region of the display. As illustrated in FIG. 6G, scrubber bar 620 is updated to indicate that the video being displayed corresponds to the recorded clip of video represented by clip representation 624*a* by scrolling scrubber bar 620 such that clip representation 624*a* is moved from the position illustrated in FIG. 6B to the position of current display indicator 622.

As illustrated in FIG. 6G, in response to receiving user input 650*b*, device 600 also displays indications of date and time associated with the displayed image (e.g., the date and time at which the displayed image was recorded). The indications include date bar 630 at the top of display 602 and the time 628*a* (e.g., in hour, minute, second, and AM/PM format) and day of the week 628*b* associated with the displayed image. Date bar 630 represents a period of time (e.g., seven days) and includes day indicator 632 corresponding to the day of the week.

Similarly, receiving a user input corresponding to selection of clip representation 626*b* causes device 600 to display the recorded clip corresponding to clip representation 624*b*, update scrubber bar 620 to place clip representation 624*a* at current display indicator 622, and display indicators (e.g., date bar 630, time 628*a*, and day of the week 628*b*) for the date and time associated with the recorded clip corresponding to clip representation 624*b*.

As illustrated in FIG. 6G, displaying the recorded clip includes playing the recorded clip (e.g., starting at the first frame). In some embodiments, displaying the recorded clip of video includes displaying a portion of the selected clip (e.g., paused video of a first frame of the clip or a still image of a representative from of the clip). In some embodiments, the recorded clip is initially paused and play/pause affordance 612 represents a play button instead of a pause button so that the clip can be played. In some embodiments, the display of the recorded clip of video is based on the position of user input 650*b* (e.g., the selected clip is played from a frame corresponding to the portion of clip representation 624*a* contacted by user input 650*b*).

In some embodiments, device 600 displays the recorded clip of video corresponding to clip representation 624*a* in response to a swipe (e.g., a left-to-right swipe) on touch-sensitive display 602 (e.g., on the display of the live video feed or the scrubber bar). In some embodiments, the displayed video is based on a length or velocity of the swipe (e.g., a shorter or slower swipe will display a more recent clip or a more recent portion of a clip than a longer or faster swipe). For example, a relatively short swipe will cause the clip corresponding to clip representation 624*a* to be displayed, whereas a longer swipe will display the clip corresponding to clip representation 624*b*.

In some embodiments, instead of scrolling the representations in the scrubber bar to indicate which portion of the content is being displayed, the current display indicator 622 is moved to the clip representation of the displayed clip (e.g., the positions of clip representations 624*a* and 624*b* remain the same).

In some embodiments, in response to a user input that scrolls scrubber bar 620 to a time at which no recorded video from the front door camera is not available, device 600 displays a placeholder image (e.g., a paused or blurred image of the most recently captured image from the live feed or a recorded image that is closest in time to the selected time).

In some embodiments, in response to receiving user input corresponding to a command to display video from the front door camera at a previous time (e.g., a tap on a clip representation of a recorded clip of video or a left-to-right swipe or drag gesture), device 600 displays an affordance for returning to the live video feed from the front door camera. As illustrated in FIG. 6G, in response to receiving user input 650*b* in FIG. 6F, live affordance 636*b* is displayed to the right of scrubber bar 620. In some embodiments, live affordance 636*b* replaces related applications affordance 636A (e.g., in response to user input to display video from a previous time). In response to receiving a user input corresponding to selection of live affordance 636*b* (e.g., a tap on live affordance 636*b*), device 600 displays a live video feed from the front door camera and updates scrubber bar 620 to indicate that the displayed video is a live video feed (e.g., as shown in FIG. 6B, except with video at the current time). In some embodiments, date bar 630 and indication of time 628*a* and day of the week 628*b* are removed.

Turning now to FIG. 6H, device 600 receives (e.g., detects) user input 650*c*. As illustrated in FIG. 6H, user input 650*c* includes a drag gesture from right-to-left on scrubber bar 620. As illustrated in FIG. 6I, in response to user input 650C, device 600 advances the clip forward in time, scrolls scrubber bar 620 to the left, and updates time and day indicators 628*a*-628*b*. In some embodiments, day indicator 632 on date bar 630 updates when scrubber bar 620 is scrolled to a different day (e.g., past a day break indication 621 as discussed below with respect to FIG. 6K). In some embodiments, the duration of time represented by the date bar remains fixed while the scrubber bar is scrolled until an end of the time range represented by the date bar is reached (e.g., scrubber bar 620 is scrolled to a time beyond the extent of the range currently represented by the date bar). If scrubber bar 620 is scrolled to a time beyond the range represented by the date bar, the date bar will be updated to show the preceding or subsequent period of time (e.g., previous 7 day range).

In some embodiments, date bar 630 includes an affordance that can be used to display video from a selected day. As illustrated in FIG. 6J, device 600 receives (e.g., detects) user input 650*d* (e.g., a tap) at a position on date bar 630 corresponding to Saturday, January 27. As illustrated in FIG. 6K, in response to receiving user input 650*d*, device 600 displays a clip of video from the front door camera that was recorded on Saturday, January 27, starting at 12:18:06 AM. Scrubber bar 620 is updated to indicate that clip representation 624*e* corresponds to the displayed clip, and date bar 630 (including day indicator 632), time indicator 628*a*, and day of the week indicator 628*b* are updated to indicate the selected day and time. In some embodiments, in response to receiving an input (e.g., a tap) on forward arrow (">") or backward arrow ("<") on the ends of date bar 630, device 600 scrolls date bar 630 forward or backward in time, respectively, by a predetermined amount of time (e.g., 1 day, 7 days, or the time range displayed by date bar 630). In some embodiments, further in response to receiving an input on forward arrow or backward arrow on date bar 630, device 600 displays an image corresponding to a predetermined amount of after or before, respectively, the time corresponding to the currently displayed image (e.g., 7 days after or before January 30, as illustrated in FIG. 6J) and updates scrubber bar 620 accordingly.

As illustrated in FIG. 6K, scrubber bar 620 also includes day break indication 621 of a boundary between two days (e.g., Friday and Saturday). As illustrated in FIG. 6K, the boundary is indicated by a vertical line on/through scrubber bar 620.

As illustrated in FIG. 6L, device 600 receives (e.g., detects) user input 650e (e.g., a tap) on share affordance 634b (e.g., adjacent to scrubber bar 620). In some embodiments, share affordance 634b replaces edit affordance 634a (illustrated, e.g., in FIGS. 6B-6F) in response to an input corresponding to selection of a previously recorded clip (e.g., user input 650b in FIG. 6F) or previous time (e.g., user input 650c in FIG. 6H). In response to receiving user input 650e, device 600 initiates a process for selecting a segment of recorded video and sharing the selected segment of recorded video. As illustrated in FIG. 6M, device 600 displays a more detailed representation of the currently displayed clip of video in scrubber bar 620 (e.g., a plurality of representative images from only the currently displayed clip). The date and time range of the current clip is displayed at the top of display 602 (e.g., in replace of date bar 630). Device 600 also displays selector handle affordances 623a and 623b on scrubber bar 620 for selecting a portion of the displayed clip to share.

As illustrated in FIGS. 6N-6Q, device 600 receives (e.g., detects) user inputs 650f and 650g (e.g., drag gestures) on selector handle affordances 623a and 623b, which move selector handle affordances 623a and 623b to select a portion 625 in the middle of the displayed clip. As illustrated in FIG. 6R, device 600 receives (e.g., detects) user input 650h (e.g., a tap) on share affordance 634b (which was moved from the position illustrated in, e.g., FIG. 6L to the top of display 602 in response to user input 650e). As illustrated in FIG. 6S, in response to receiving user input 650h, device 600 displays sharing menu 638, which includes various options for sharing, saving, or performing other operations associated with the selected portion of the displayed clip.

FIGS. 7A-7C are a flow diagram illustrating a method for displaying a live video feed and recorded video from a source of video data (e.g., a camera) using an electronic device in accordance with some embodiments. Method 700 is performed at a device (e.g., 100, 300, 500, or 600) with a display. Some operations in method 700 are, optionally, combined, the orders of some operations are, optionally, changed, and some operations are, optionally, omitted.

As described below, method 700 provides an intuitive way for displaying a live video feed and recorded video from a source of video data (e.g., a camera) using an electronic device. The method reduces the cognitive burden on a user for displaying a live video feed and recorded video, thereby creating a more efficient human-machine interface. For battery-operated computing devices, enabling a user to display a live video feed and recorded video faster and more efficiently conserves power and increases the time between battery charges.

At block 702, the device displays a video media user interface (e.g., 608) that includes a live (e.g., non-recorded, real-time) video feed from a first source (e.g., a camera) and a scrubber bar (e.g., 620). In some embodiments, a scrubber bar is an interactive, elongated region on the display (e.g., 602) that includes a representation of media content (e.g., 624a, 624b) that can be scrolled along the direction parallel to direction of elongation. In some embodiments, the media content (e.g., the video) can be played back at arbitrary and variable rates based on a characteristic (e.g., the speed of a received user input). In some embodiments, the scrubber bar represents approximately one day of content at a time.

The scrubber bar (e.g., 620) includes a representation of a recorded clip of video (e.g., 624a) from the first source (e.g., a rounded rectangle or shaded area of the scrubber bar). The representation is located at a first position in the scrubber bar (e.g., the position corresponding to a time before the current time). In some embodiments, the representation of the recorded clip of video has a visual width in the scrubber bar that is proportional to a duration of the recorded clip of video. In some embodiments, the representation of the recorded clip of video includes a representation of an image from the recorded clip of video (e.g., a thumbnail representation or an actual image from the clip). In some embodiments, the image represents the first frame or a frame in the middle of the recorded clip of video. In some embodiments, the representation of the recorded clip of video includes a number of representative images from the recorded clip of video, where the number of representative images is directly proportional to the duration of the recorded clip of video.

In some embodiments, the scrubber bar further includes an indication (e.g., 626a, 626b, 626c) of a period of time during which recorded video from the first source is not available. In some embodiments, the periods of time during which recorded video from the first source is not available are indicated by spaces (e.g., uniform color or dots; e.g., 626b) between representations of recorded clips of video. In some embodiments, the indication of the period of time during which recorded video from the first source is not available is independent from the duration of the period of time. In some embodiments, the distance on the scrubber bar between two representations of recorded clips of video is independent from the amount of time between the end of one clip and the beginning of the subsequent clip (e.g., the distance is fixed). In some embodiments, the distance on the scrubber bar between two representations of recorded clips of video is variable (e.g., the distance is based on (e.g., is directly proportional to) the amount of time between the end of one clip and the beginning of the subsequent clip. In some embodiments, the scrubber bar further includes an indication of a boundary between a first day and a second day. In some embodiments, the boundary between two days is indicated by a vertical line on or through the scrubber bar.

At block 704, while displaying the video media user interface (e.g., 608), the device detects a first user input (e.g., 650b) (e.g., a right swipe on the display or a tap on the clip). In some embodiments, the first user input includes a swipe on a touch-sensitive surface of the electronic device. In some embodiments, the swipe is a left-to-right swipe on a touch-sensitive display (e.g., on the live video feed or on the scrubber bar). In some embodiments, the displayed video is based on a length or velocity of the swipe (e.g., a shorter or slower swipe will display a more recent clip (or more recent portion of a clip) than a longer or faster swipe). In some embodiments, the first user input includes a tap on a touch-sensitive surface of the electronic device, where the tap has a location corresponding to the representation of the recorded clip of video.

At block 706, the device replaces the live video feed (e.g., feed of FIG. 6E) with a display of the recorded clip of video (e.g., paused video of the first frame of the clip, a representative frame of the clip, play the clip from the beginning, or play the clip from a frame based on the position to which the scrubber bar is scrolled) (e.g., feed of FIG. 6G). In some embodiments, the device replaces the live video feed with a display of the recorded clip of video in response to detecting the first user input. In some embodiments, displaying the recorded clip of video includes displaying a portion of the clip (e.g., paused video of a first frame of the clip or a frame corresponding to a position in the clip selected by the first input). In some embodiments, displaying the recorded clip includes playing the recorded clip (e.g., starting at the first frame or a frame corresponding to the position in the clip selected by the first input). Replacing the live video feed with a display of the recorded clip of video provides the user with feedback regarding the current state of the media content being displayed on the device. The feedback indicates to the user that the user is no longer viewing the live video feed. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 708, the device updates the scrubber bar (e.g., 620) to indicate that the display of the recorded clip of video corresponds to the representation of the recorded clip of video in the scrubber bar (e.g., FIG. 6G). In some embodiments, the device updates the scrubber bar to indicate that the display of the recorded clip of video corresponds to the representation of the recorded clip of video in the scrubber bar in response to detecting the first user input. In some embodiments, a pointer element (e.g., 622) is moved to the representation of the clip. In some embodiments, the representation of the clip is moved to a different position in the scrubber bar (e.g., the center). In some embodiments, the representation of the entire video content in the scrubber bar is scrolled such that the content represented at a fixed position (e.g., the center) in the scrubber bar is displayed in the main region). Updating the scrubber bar to indicate that the display of the recorded clip of video corresponds to the representation of the recorded clip of video in the scrubber bar provides the user with feedback as to the current state of the media content being displayed on the device. The feedback indicates to the user that the user is no longer viewing the live video feed. Additionally, the feedback indicates to the user that the user is able to control the content being displayed by interacting with the scrubber bar. Further, the feedback indicates to the user the approximate date/time the clip was recorded as it is shown in a position that is relative to the other clips in the scrubber bar. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 710, the device displays an indication of a time (e.g., 632) associated with the recorded clip of video (e.g., in response to detecting the first user input). In some embodiments, the indication includes a date bar (e.g., 630) (e.g., displayed at or near the top of the display) highlighting the day during which the displayed portion of video was recorded. In some embodiments, the date bar represents a fixed duration of time (e.g., seven days). In some embodiments, the indication includes text (e.g., above the scrubber bar) indicating the time and day of the week at which the video was recorded. In some embodiments, the duration of time represented by the date bar remains fixed while the scrubber bar is scrolled until an end of the date bar is reached (e.g., the user scrubs to a time beyond the extent of the date bar).

In some embodiments, the indication of time (e.g., 628a) associated with the recorded clip of video includes an affordance representing a period of time and indicating the time associated with the recorded clip of video. Optionally, at block 712, the device receives a second user input (e.g., 650d) corresponding to selection of the affordance representing the period of time (e.g., selection of a particular day or a forward/backward arrow at an end of the date bar). In some embodiments, selecting the forward/backward arrow will scroll the affordance to a subsequent/previous period of time (e.g., the subsequent/previous seven days). Optionally, in response to receiving the second user input, the device performs the operations of blocks 714, 716, and 718. At block 714, the device replaces the display of the recorded clip of video with display of a third recorded clip of video (e.g., a video recorded on the date selected in the date bar or, if the forward/backward arrow is selected, a video recorded seven days after/before the day on which the currently displayed portion was recorded); at block 716, the device updates the affordance to indicate a time associated with the third recorded clip of video (e.g., move a circle indicator from the previous day to the selected day); and at block 718, the device updates the scrubber bar to indicate that the third recorded clip of video corresponds to a representation of the third recorded clip of video in the scrubber bar (e.g., 624e). Updating the affordance to indicate a time associated with the third recorded clip of video provides the user with feedback that the user is capable of quickly jumping between different clips that were recorded on different days. Additionally, the feedback indicates to the user that the user is able to control the content being displayed by interacting with the date bar. Further, updating the scrubber bar to indicate that the third recorded clip of video corresponds to a representation of the third recorded clip of video in the scrubber bar provides the user with feedback regarding the approximate date/time the clip was recorded as it is shown in a position that is relative to the other clips in the scrubber bar. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the device displays a second affordance (e.g., 636b) (e.g., in response to detecting the first user input). In some embodiments, the second affordance is an icon displayed adjacent to the scrubber bar. Optionally, at block 720, the device detects a third user input (e.g., a tap) corresponding to selection of the second affordance. Optionally, in response to detecting the third user input corresponding to selection of the second affordance, the device performs the operations of blocks 722 and 724. At block 722, the device displays the live video feed (e.g., feed of FIG. 6B). At block 724, the device updates the scrubber bar to indicate that the live video feed is displayed. In some embodiments, the date bar and indication of time are removed from the display. Displaying a second affordance (e.g., "LIVE" icon) provides a user with feedback as to the current state of the media content being displayed on the device. In particular, the second affordance provides feedback to the user that the user is no longer viewing live content, and that the user can switch back to the live content by selecting the second affordance. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 726, the device receives data representing a second recorded clip of video from the first source. Optionally, at block 728, the device displays a representation of the second recorded clip of video (e.g., 624c) in the scrubber bar in response to receiving data representing the second recorded clip of video from the first source.

In some embodiments, the video media user interface includes a third affordance (e.g., 634b) (e.g., a "share" affordance). Optionally, at block 730, the device detects a fourth user input (e.g., 650e) (e.g., a tap) corresponding to selection of the third affordance. Optionally, at block 732, in response to detecting the fourth user input corresponding to selection of the third affordance, the device initiates a process for selecting a segment of recorded video and sharing the selected segment of recorded video. In some embodiments, the process for selecting a segment of recorded video includes displaying an affordance (e.g., selector handles on the scrubber bar (e.g., 623a, 623b) for selecting a portion of recorded content to share, detecting an input on the affordance (e.g., adjustment of the selector handles), and selection of an affordance for designating a recipient and communication method for sharing the selected segment of recorded video.

Note that details of the processes described above with respect to method 700 (e.g., FIGS. 7A-7C) are also applicable in an analogous manner to the methods described below. For example, method 700 optionally includes one or more of the characteristics of the various methods described above with reference to methods 900, 1100, 1300, 1500, 1700, 2100, 2300, 2500, and 2700. For example, the controllable external device described in method 900 can provide the live video feed in method 700. For brevity, these details are not repeated below.

FIGS. 8A-8J illustrate exemplary user interfaces for displaying video (e.g., live or recorded) from a video source (e.g., a camera) and controlling external devices related to the source, in accordance with some embodiments. The user interfaces in these figures are used to illustrate the processes described below, including the processes in FIG. 9.

Figure 8A:
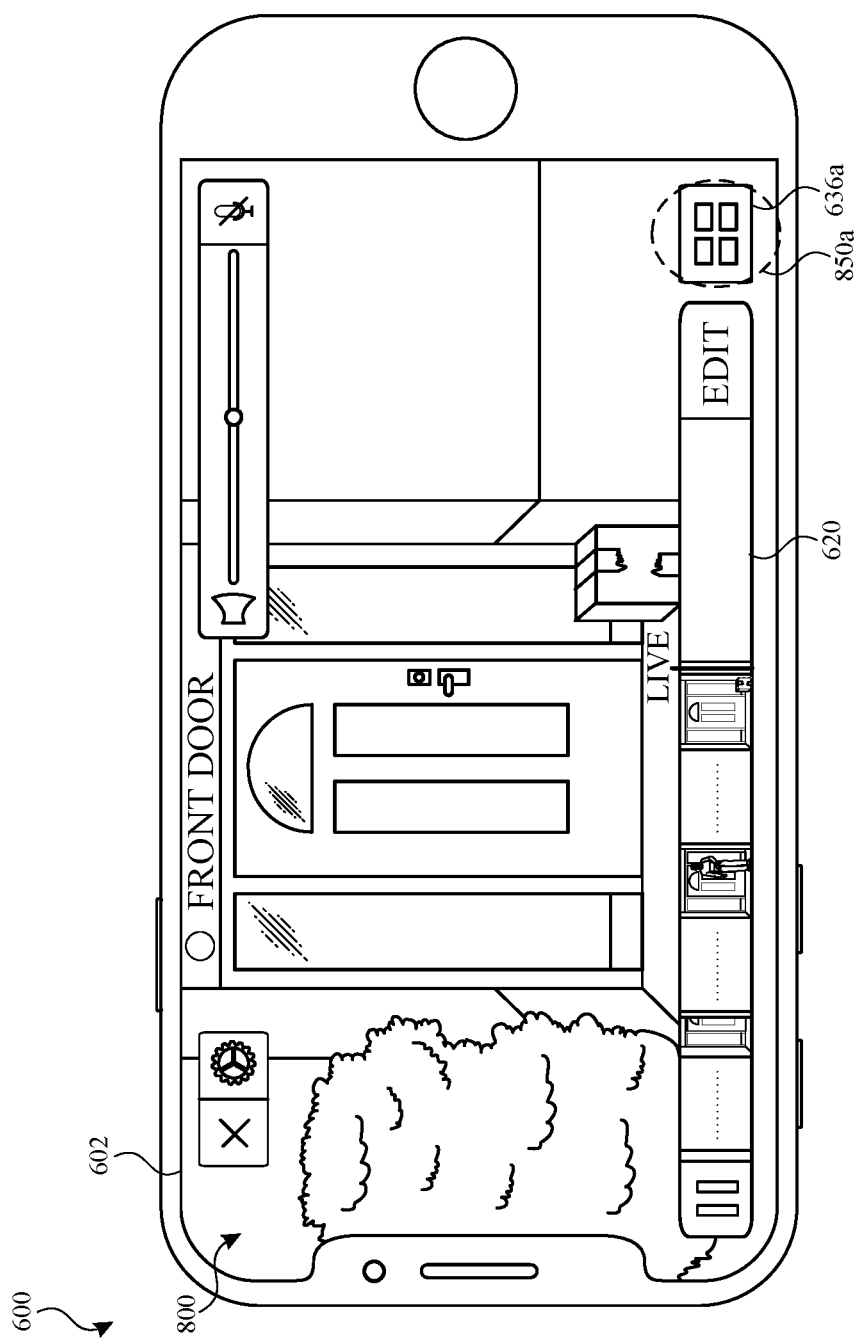
FIGS. 8A-8J illustrate exemplary user interfaces for displaying video from a video source and controlling external devices related to the source in accordance with some embodiments.

FIG. 8A illustrates device 600 displaying user interface 800, which includes a live video feed from the front door camera (described above) and scrubber bar 620. In some embodiments, instead of a live video feed from the front door camera, device 600 displays another representation of video data such as a notification corresponding to an event (e.g., motion detection) associated with the front door camera, as described in greater detail below with reference to FIGS. 8A-8J.

User interface 800 also includes related devices affordance 636A for accessing controls for at least one controllable external device that is associated with the front door camera. As illustrated in FIG. 8A, related devices affordance 636a is a separate icon next to scrubber bar 620.

Figure 8B:
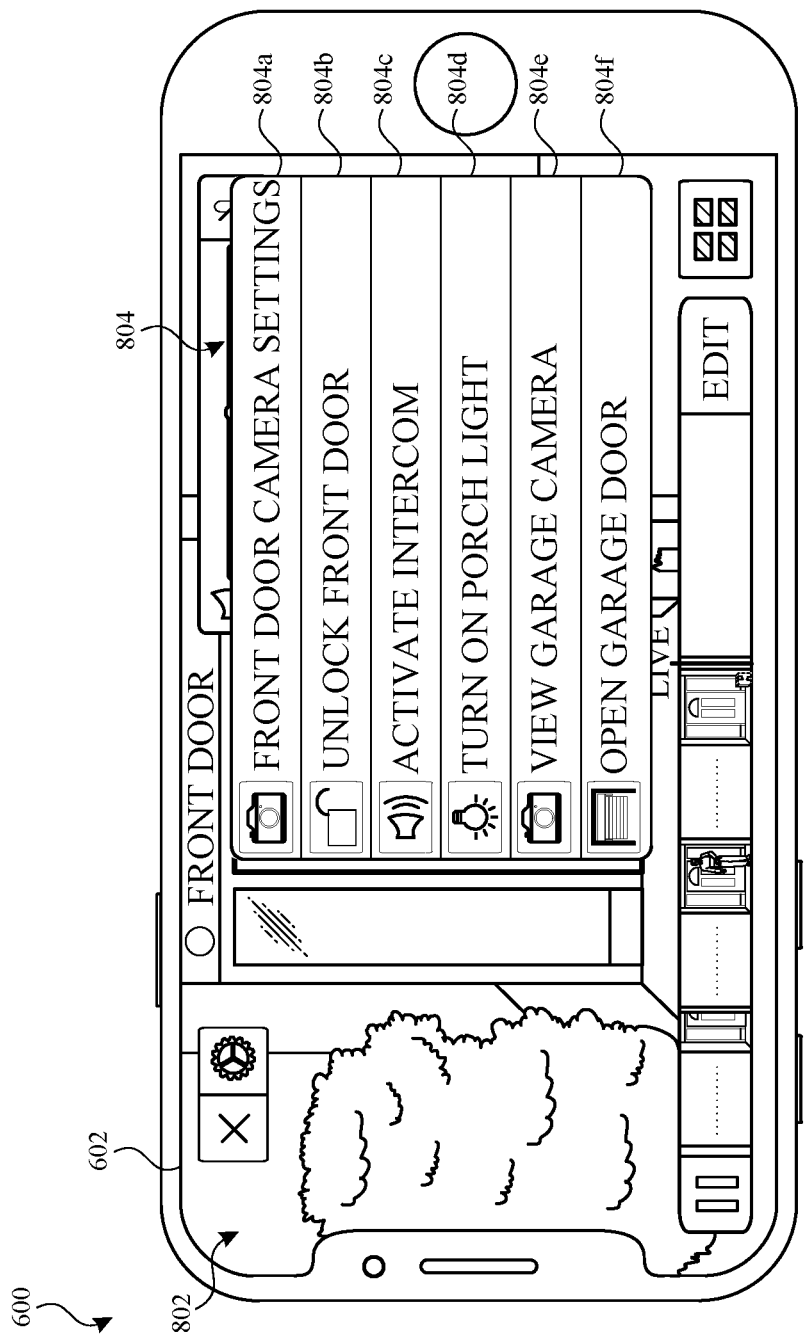
Figure 9:
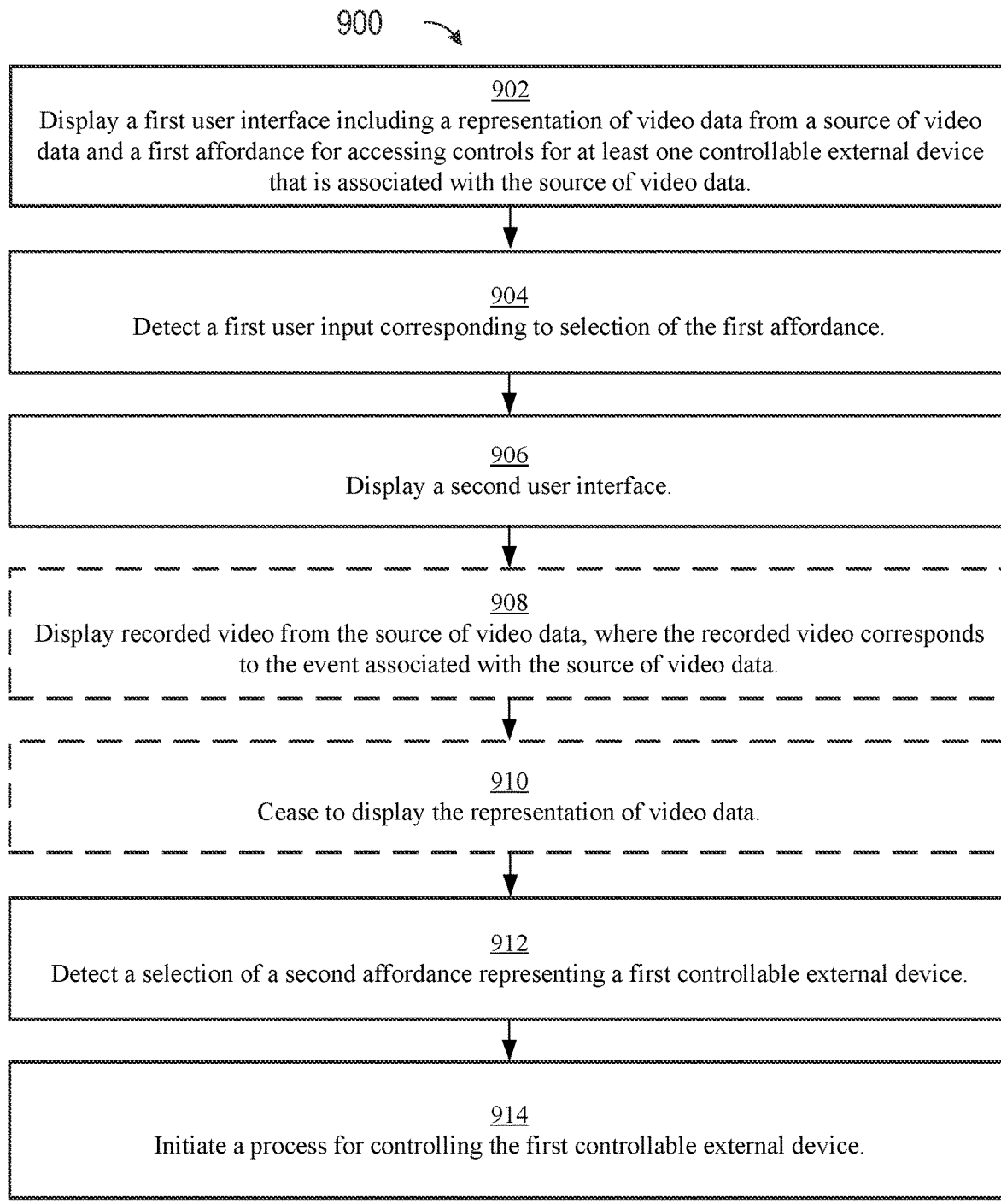
FIG. 9 is a flow diagram illustrating methods of displaying video from a video source and controlling external devices related to the source in accordance with some embodiments.

At FIG. 8A, device 600 receives (e.g., detects) user input 850a (e.g., a tap) corresponding to selection of related devices affordance 636A. As illustrated in FIG. 8B, in response to receiving user input 850a, device 600 displays user interface 802, which includes menu 804 of device affordances 804a-804f that represent respective controllable external devices. One or more of the controllable external devices represented by affordances 804a-804f are associated with the front door camera. In some embodiments, a controllable external device is associated with the front door camera based on at least one of physical proximity to the source of video data (e.g., the controllable external device and the video source are physically located in the same room or portion of a building), a designated association with the front door camera (e.g., the controllable external device and the video source are manually associated by a user, such as through an graphical user interface), or common functionality with the front door camera. In some embodiments, the controllable external device and the front door camera serve a security function (e.g., a security camera (the video source) is associated with lights (the controllable external device(s)) a user may want to turn on and door locks (more controllable external device(s)) that a user may want to lock, even if the device is not in physical proximity to the camera (e.g., all external doors, including a back door)). As illustrated in FIG. 8B, menu 804 is a pop-up menu overlaid on user interface 802. In some embodiments, in response to selection of related devices affordance 636a, device 600 replaces user interface 800 (e.g., ceases displaying the live video feed and scrubber bar 620) with a separate user interface that includes menu 804.

Figure 8C:
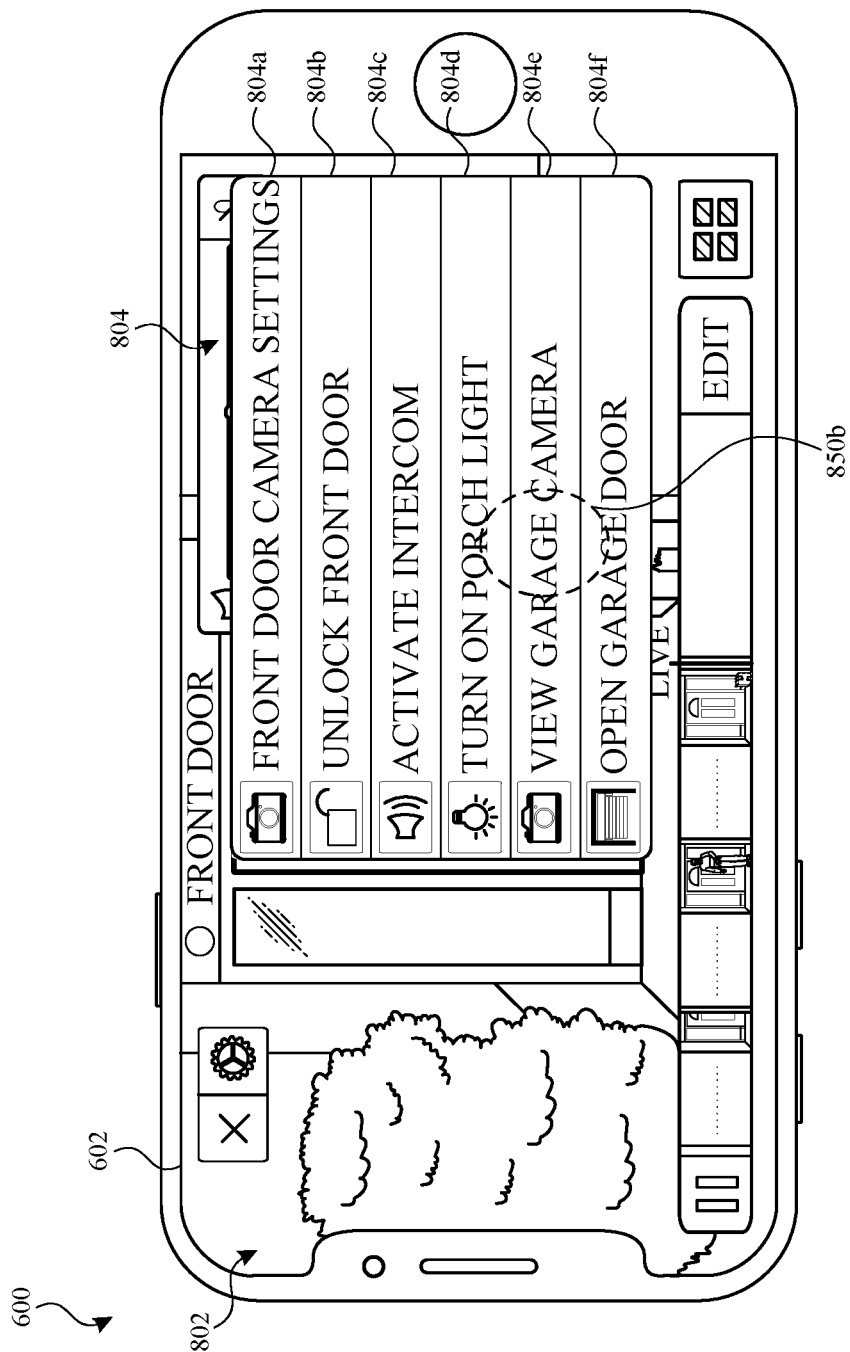
Figure 8D:
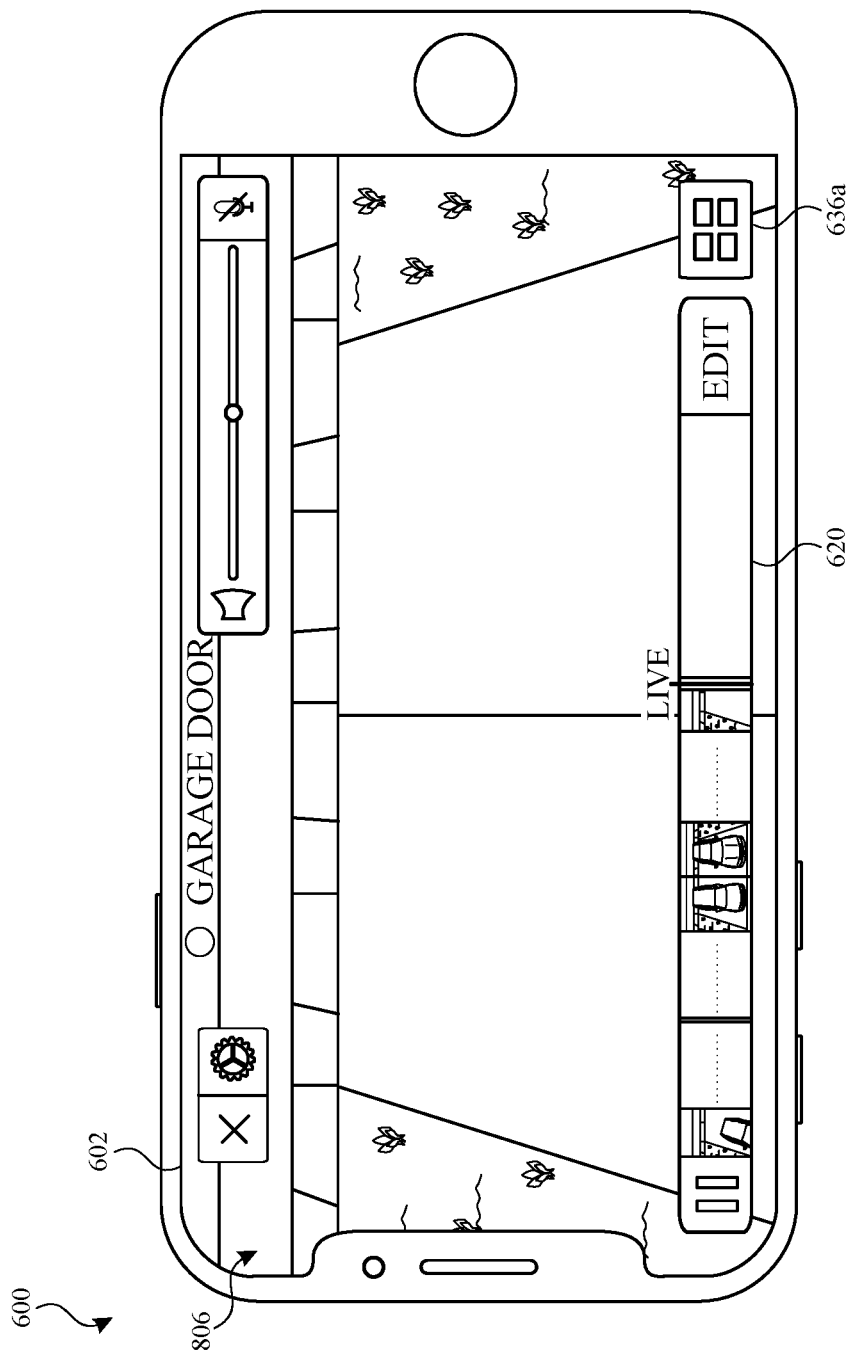

As illustrated in FIG. 8C, device 600 receives (e.g., detects) user input 850b (e.g., a tap) corresponding to selection of affordance 804e representing a garage door camera. In response to receiving user input 850b, device 600 initiates a process for controlling the selected controllable external device. As illustrated in FIG. 8D, device 600 ceases to display the live video feed from the front door camera and replaces the live video feed from the front door camera with separate user interface 806 having controls (e.g., scrubber bar 620, etc.) for the garage door camera. In some embodiments, a selected device is controlled directly in response to selection of the corresponding affordance. For example, in response to selection of affordance 804b, the front door is unlocked (e.g., device 600 sends instructions to the front door lock or sends data to a central controller device indicating that the front door is to be unlocked). In some embodiments, instead of directly controlling the selected device, the process for controlling the selected device includes one or more intervening steps (e.g., displaying a menu of operational states for the selected device, receiving an input corresponding to selection of one of the states, and sending instructions to cause the selected device to operate according to the selected state).

Figure 8E:
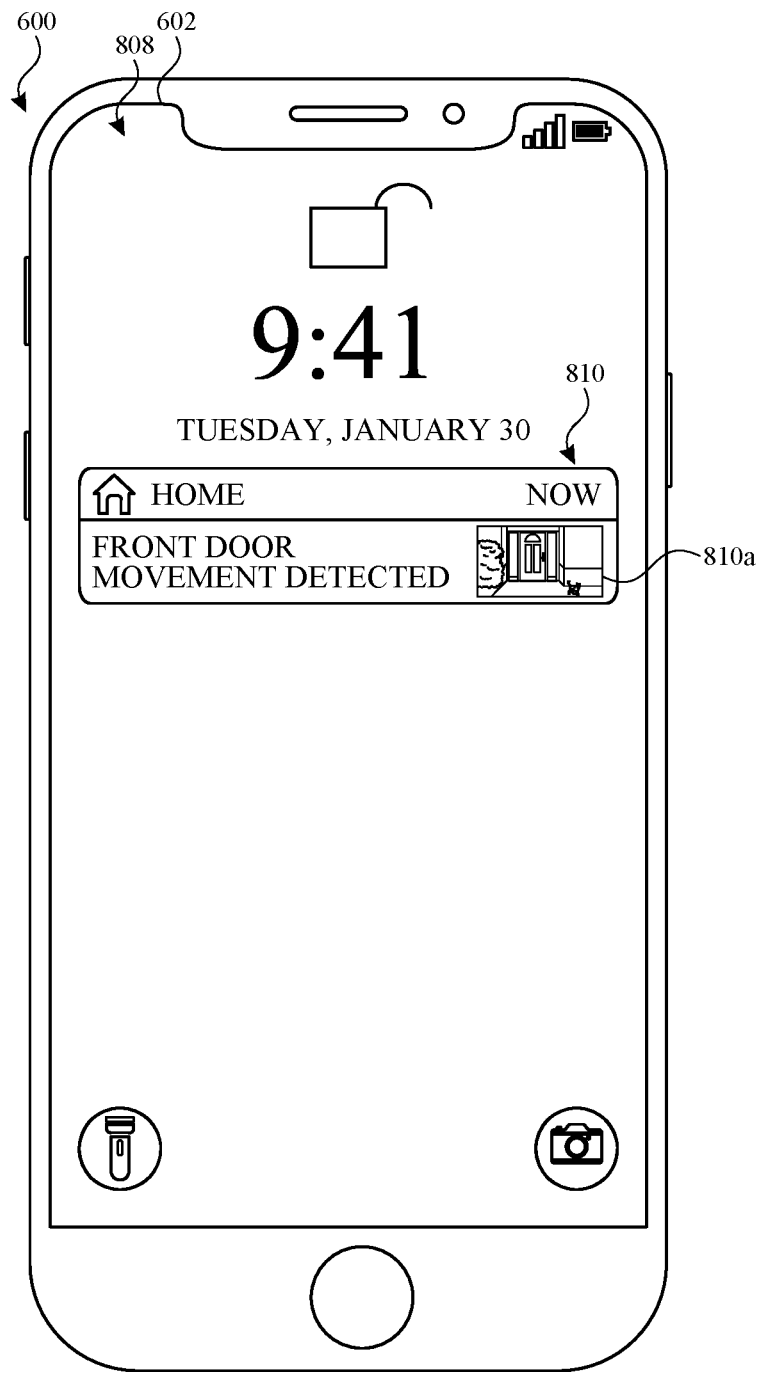
Figure 8F:
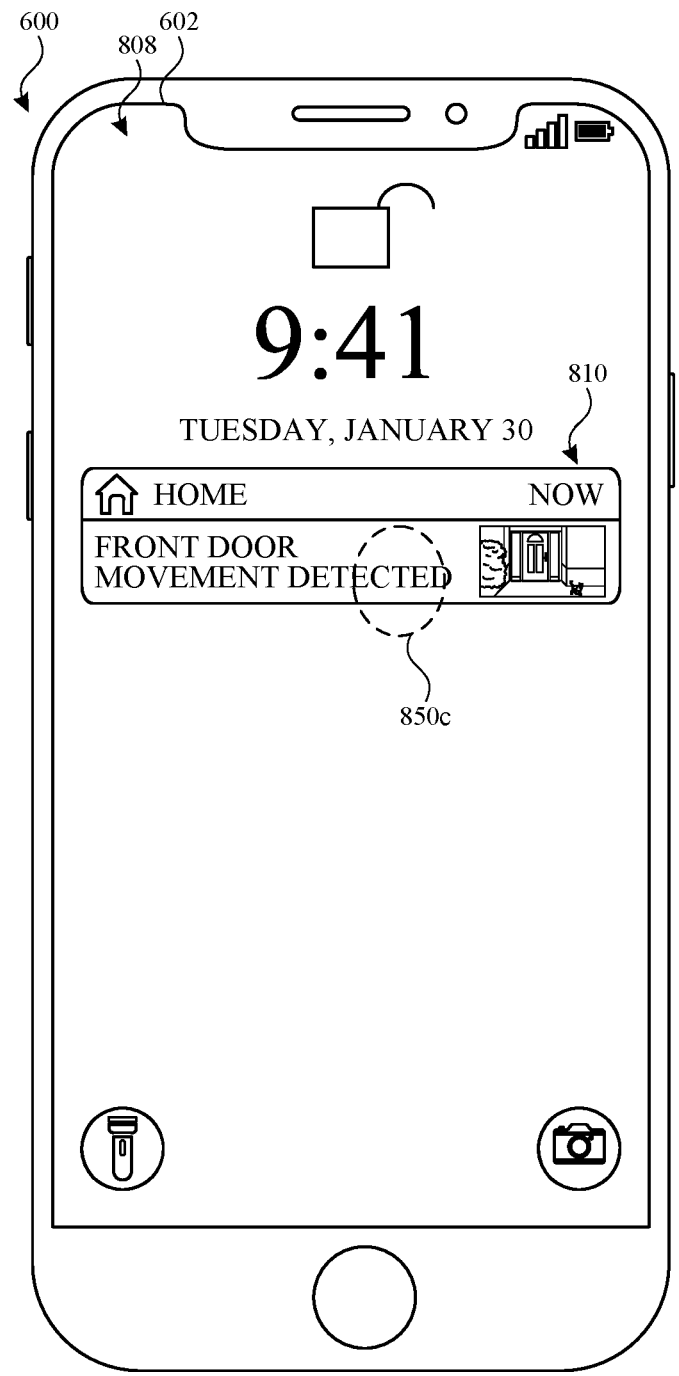

Turning now to FIG. 8E, another embodiment for accessing controls for devices related to a source of video data is described. As illustrated in FIG. 8E, device 600 displays user interface 808 with notification 810, which represents the front door camera (e.g., via representative image 810a from the front door camera and text "FRONT DOOR"). In some embodiments, notification 810 is displayed in response to motion detected by the front door camera. In some embodiments, notification 810 is displayed in response to activation of a device associated with the front door camera (e.g., activation of the front doorbell).

Figure 8G:
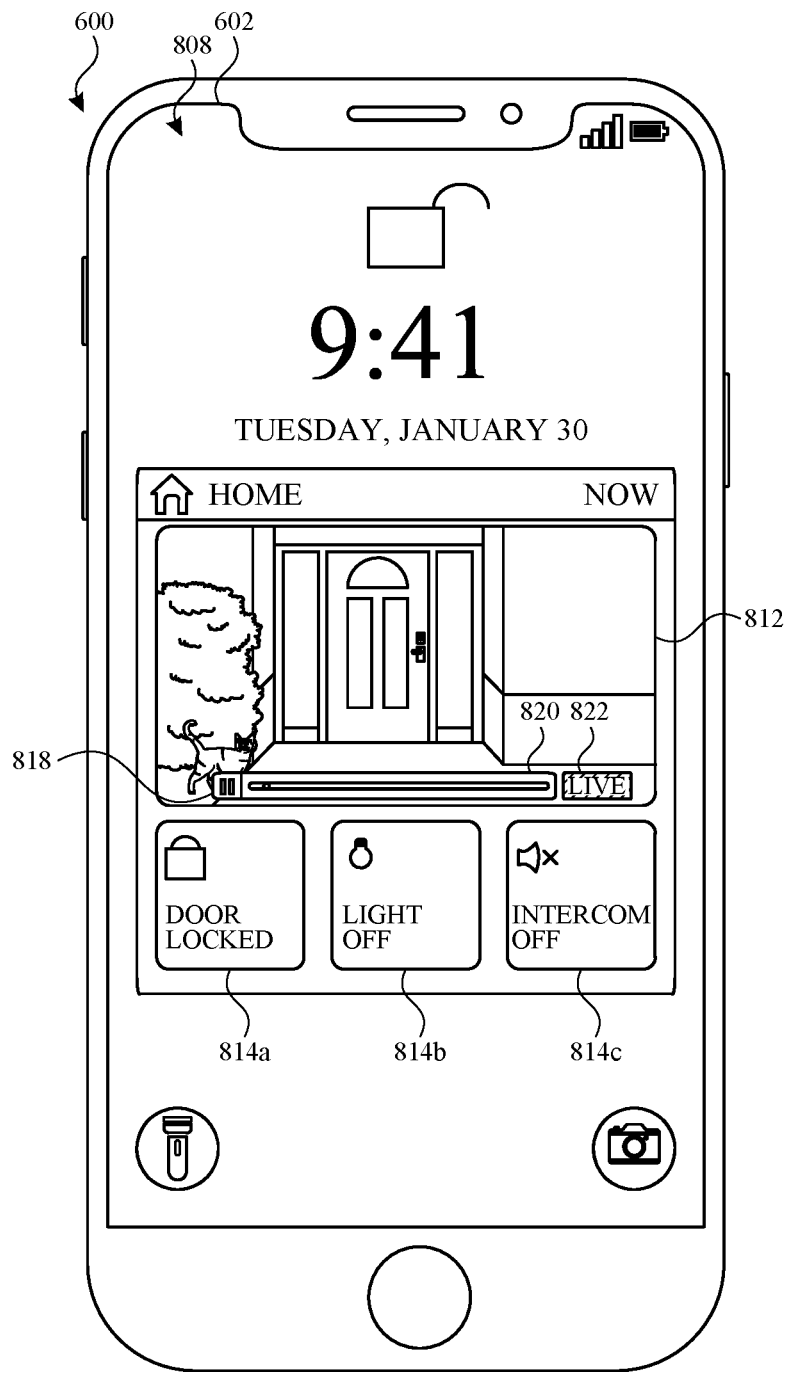

Notification 810 includes an affordance for accessing controls for at least one controllable external device that is associated with the front door camera. In some embodiments, the affordance is included in notification 810 itself, which is selectable (e.g., notification 810 is the affordance). At FIG. 8F, device 600 receives (e.g., detects) user input 850c (e.g., a tap) corresponding to selection of notification 810. In response to receiving user input 850c, device 600 displays an image from the front door camera (e.g., a live or paused video stream, a playing or paused recorded video clip, or a notification of a recorded video clip). As illustrated in FIG. 8G, in response to receiving user input 850c, device 600 removes notification 810 and displays recorded video clip 812 from the front door camera corresponding to the event that caused the notification (e.g., detecting the motion of a cat).

Figure 8H:
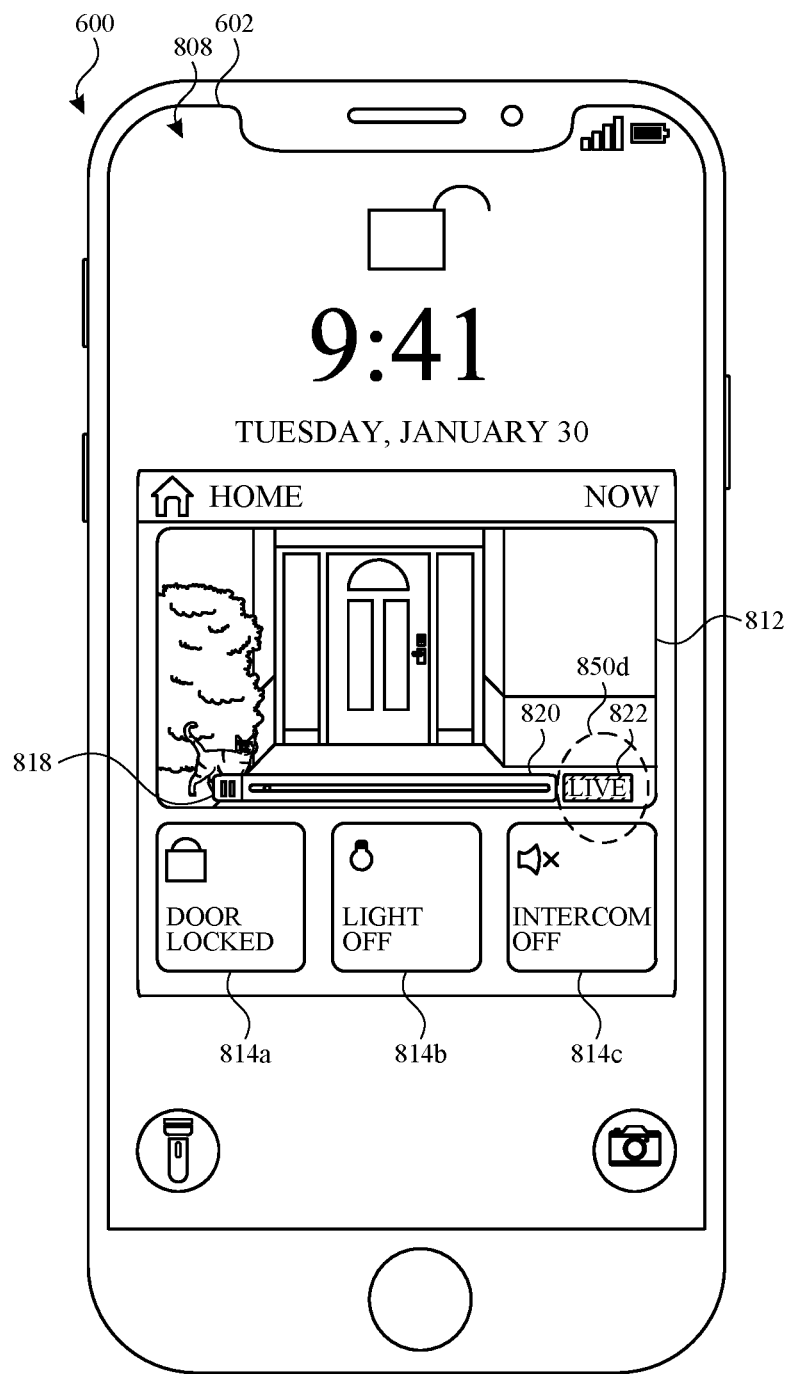
Figure 8I:
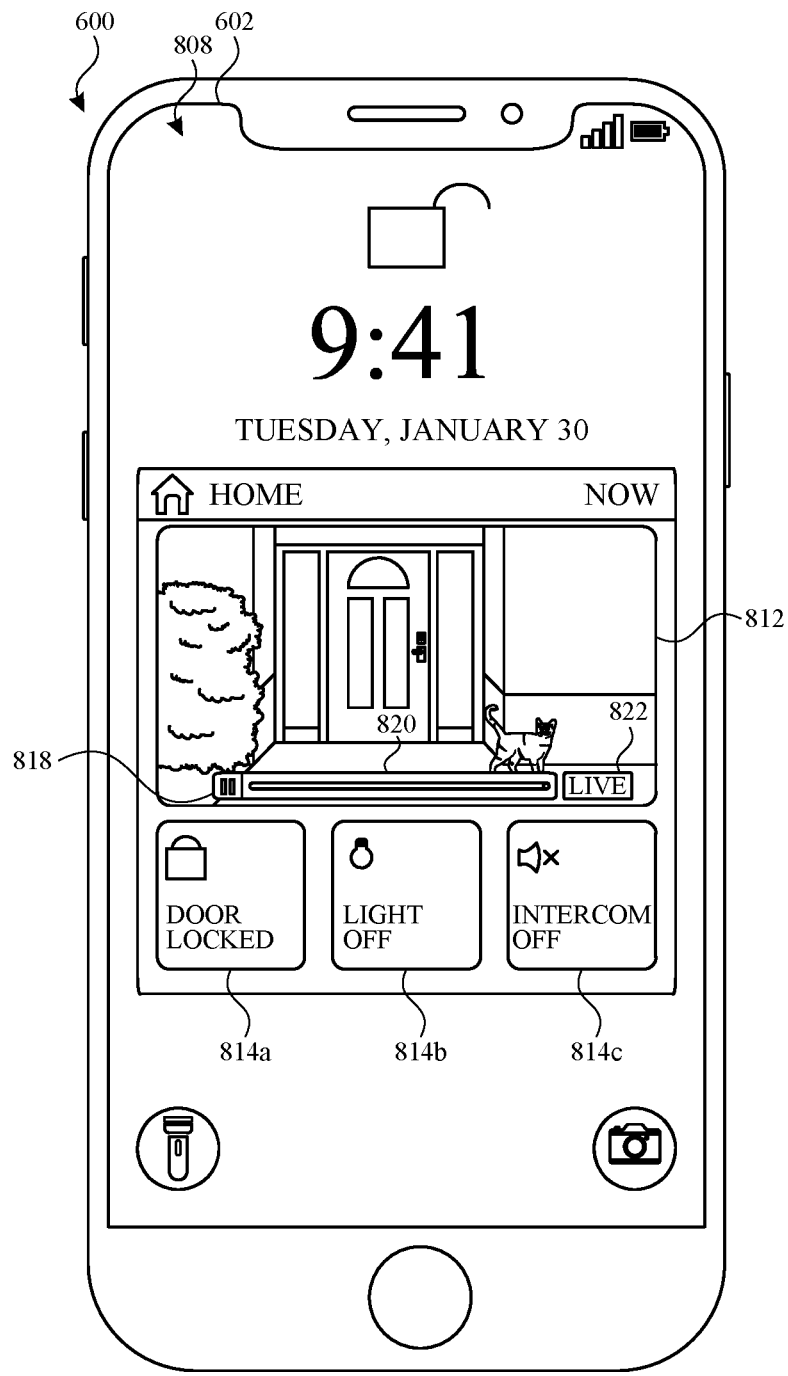
Figure 8J:
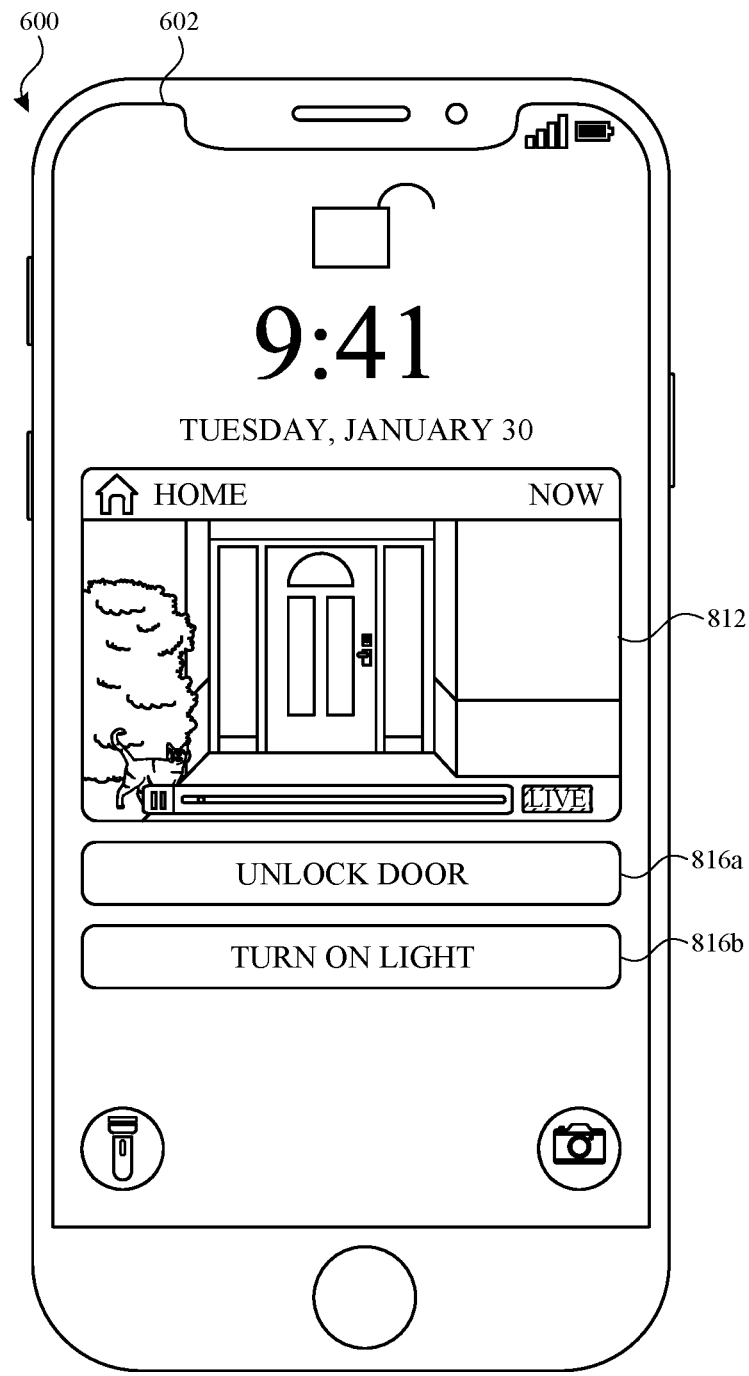

Device 600 also displays affordances 814a-814c for controlling (or accessing controls for) a front door lock, front porch light, and front porch intercom, respectively, all of which are associated with the front door camera. In FIG. 8G, affordances 814a-814c include an indication of the current state of the respective device. In some embodiments, as illustrated in FIG. 8J, device 600 displays affordances 816a-816b that indicate the action that will result from selection of the affordance.

In some embodiments, device 600 displays video controls with the image from the front door camera. As illustrated in FIG. 8G, device 600 displays play/pause affordance 818, scrubber bar 820, and "LIVE" affordance 822. As illustrated in FIGS. 8H-8I, device 600 receives user input 850d (e.g., a tap) on "LIVE" affordance 822 and, in response, displays a live video feed from the front door camera (e.g., in place of the recorded clip of video). In FIG. 8I, LIVE" affordance 822 is modified (as compared to FIG. 8H) to indicate that the displayed image is a live video feed.

FIG. 9 is a flow diagram illustrating a method for displaying video (e.g., live or recorded) from a video source (e.g., a camera) and controlling external devices related to the source using an electronic device in accordance with some embodiments. Method 900 is performed at a device (e.g., 100, 300, 500, or 600) with a display. Some operations in method 900 are, optionally, combined, the orders of some operations are, optionally, changed, and some operations are, optionally, omitted.

As described below, method 900 provides an intuitive way for displaying video (e.g., live or recorded) from a video source (e.g., a camera) and controlling external devices related to the source. The method reduces the cognitive burden on a user for displaying video (e.g., live or recorded) from a video source (e.g., a camera) and controlling external devices related to the source, thereby creating a more efficient human-machine interface. For battery-operated computing devices, enabling a user to display video (e.g., live or recorded) from a video source (e.g., a camera) and control external devices related to the source faster and more efficiently conserves power and increases the time between battery charges.

At block 902, the device displays a first user interface (e.g., 800) that includes a representation of video data from a source of video data (e.g., a live or paused video stream, a playing or paused recorded clip, a notification of a recorded clip (e.g., 810), etc.) and a first affordance (e.g., 636a) for accessing controls for at least one controllable external device that is associated with the source of video data. In some embodiments, when the representation of the video data is the main video viewing UI, the affordance is a separate icon (e.g., next to the scrubber bar). In some embodiments, when the representation of video data is part of a notification, the notification itself is the affordance. In some embodiments, the representation of video data includes a live video feed from the source of video data. In some embodiments, the representation of video data includes a notification corresponding to an event associated with the source of video data. In some embodiments, a notification is displayed in response to motion detected by the source of video data. In some embodiments, the notification is displayed in response to activation of an accessory associated with the source of video data (e.g., a notification associated with a front door camera is displayed in response to activation of the front doorbell).

At block 904, the device detects a first user input (e.g., 850a, 850c) corresponding to selection of the first affordance. In some embodiments, the device detects the first user input corresponding to selection of the first affordance while displaying the first user interface.

At block 906, the device displays a second user interface (e.g., 802) in response to detecting the first user input. Displaying the second user interface includes displaying at least a second affordance (e.g., 804a-804f, 814a-814c, 816a-816b) representing a first controllable external device of the at least one controllable external device that is associated with the source of video data. In some embodiments, the at least one controllable external device is associated with the source of video data based on at least one of physical proximity to the source of video data (e.g., the accessory and the video source are physically located in the same room or portion of a building), a designated association with the source of video data (e.g., the accessory and the video source are manually associated by a user, such as through an graphical user interface), or common functionality with the source of video data. In some embodiments, the accessory and the video source serve a security function (e.g., a security camera is associated with lights a user may want to turn on and doors that a user may want to lock, even if the camera is not in physical proximity to the camera). Displaying a second affordance representing a first controllable external device that is associated with the source of video data provides the user with feedback that that the second affordance is related to the source of video data that the user is/was viewing. The feedback thus indicates to the user that the second affordance is for controlling the external device associated with the source of video data. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 908, the device displays recorded video (e.g., 812) from the source of video data, where the recorded video corresponds to the event associated with the source of video data.

Optionally, at block 910, the device ceases to display the representation of video data (e.g., 800). In some embodiments, in which the representation of video data includes a live video feed, selecting the second affordance (e.g., 636a) replaces the live video feed with a separate user interface (e.g., 802) with controls for the related accessories (e.g., 804b-804f). In some embodiments, in which the representation of video data includes a notification, the notification is removed when the second affordance is selected. Ceasing to display the representation of video data helps to prevent diverting the user's focus or attention when the user is interacting with the user interface. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 912, the device detects a selection (e.g., 850b) of the second affordance representing the first controllable external device.

At block 914, the device initiates a process for controlling the first controllable external device (e.g., garage camera) in response to detecting the selection of the second affordance representing the first controllable external device. In some embodiments, initiating a process allows for either controlling the external device directly in response to selection of the affordance or intervening steps (e.g., displaying a menu of accessory states that can then be selected to control the accessory).

Note that details of the processes described above with respect to method 900 (e.g., FIG. 9) are also applicable in an analogous manner to the methods described above/below. For example, method 900 optionally includes one or more of the characteristics of the various methods described above with reference to methods 700, 1100, 1300, 1500, 1700, 2100, 2300, 2500, and 2700. For example, the controllable external device described in method 900 can provide the live video feed in method 700. For brevity, these details are not repeated below.

FIGS. 10A-10J illustrate exemplary user interfaces for displaying and navigating video (e.g., live or recorded) from multiple sources of video data (e.g., multiple cameras), in accordance with some embodiments. The user interfaces in these figures are used to illustrate the processes described below, including the processes in FIGS. 11A-11C.

Figure 10A:
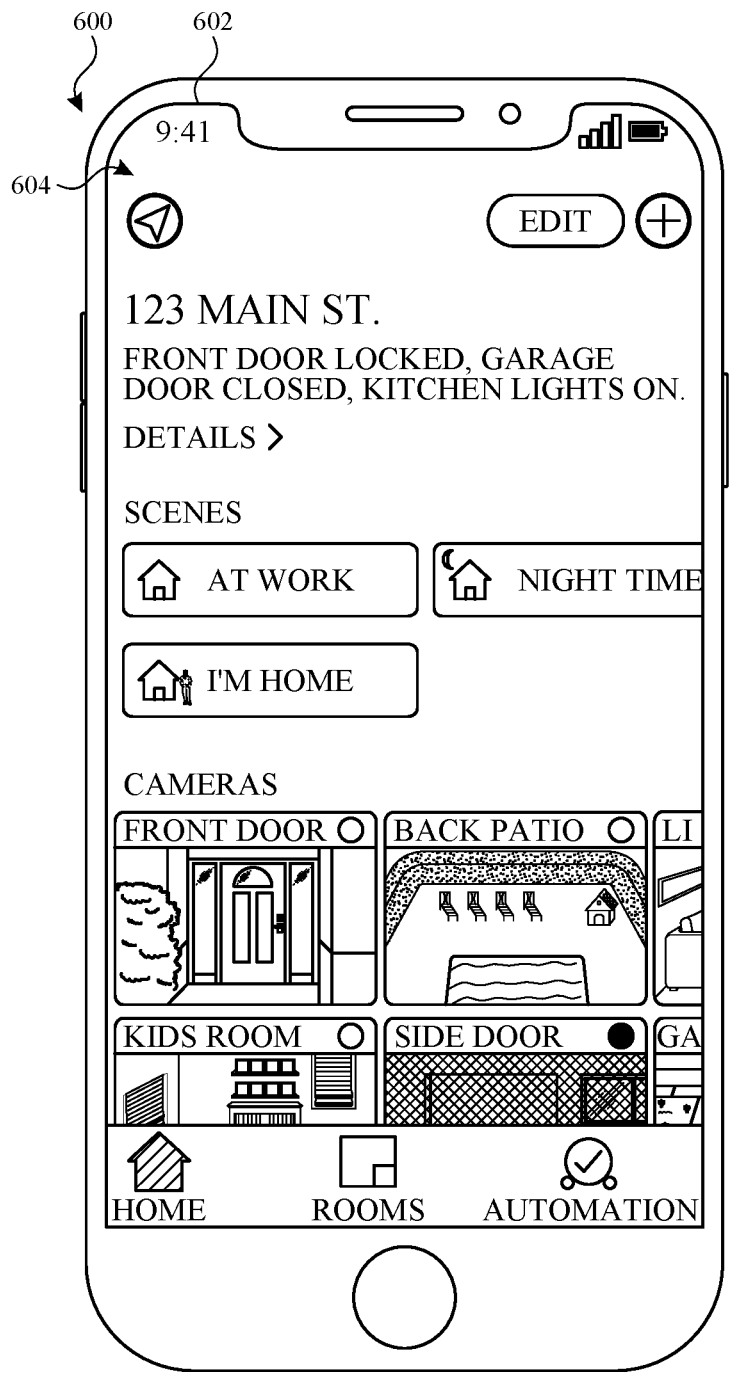
Figure 11B:
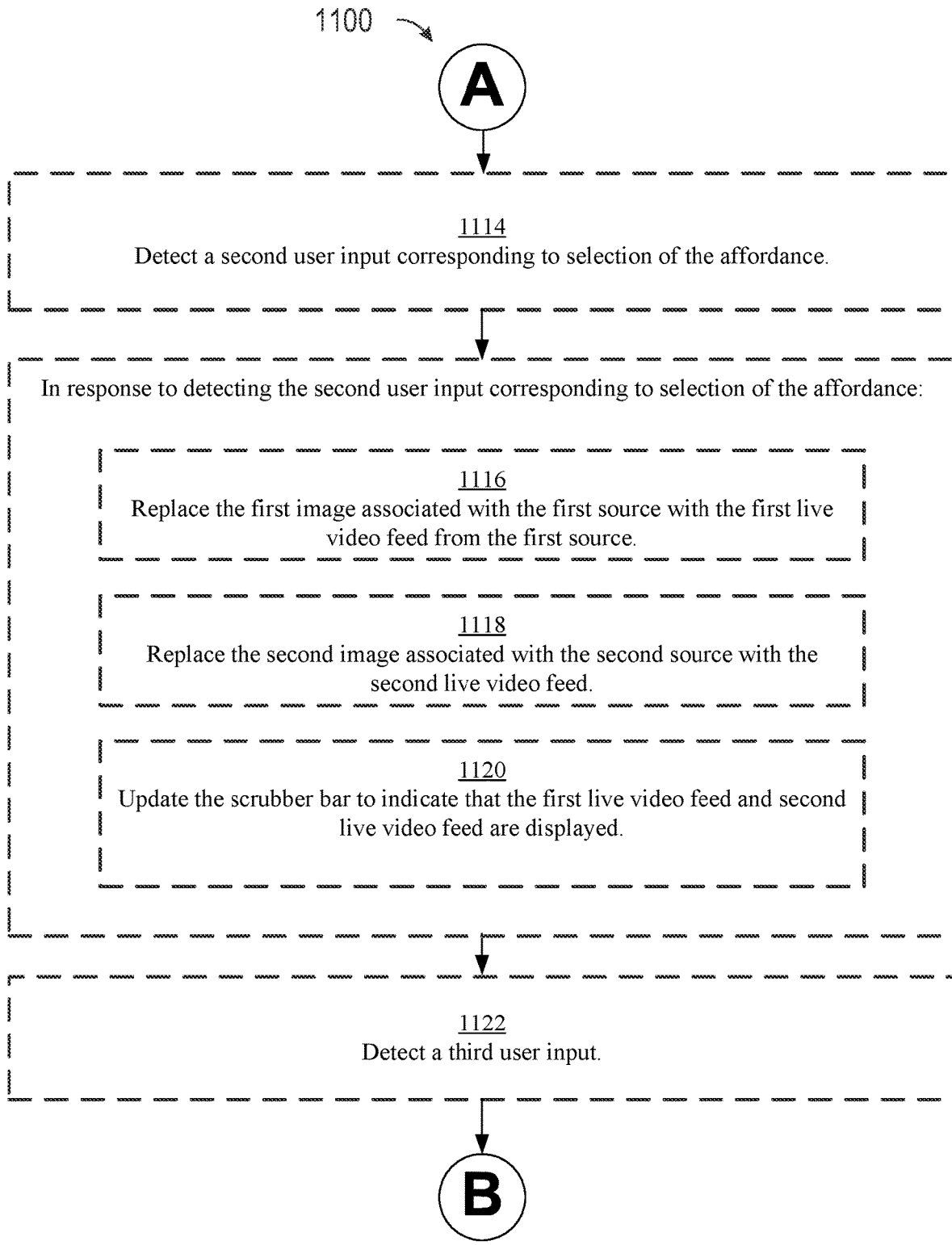

FIG. 10A illustrates device 600 displaying home user interface 604 of the application for managing devices associated with a location 123 Main St. (as illustrated and described above in reference to FIG. 6A). In some embodiments, home user interface 604 is displayed in accordance with a determination that device 600 is oriented in a portrait orientation (e.g., upright orientation).

Figure 10B:
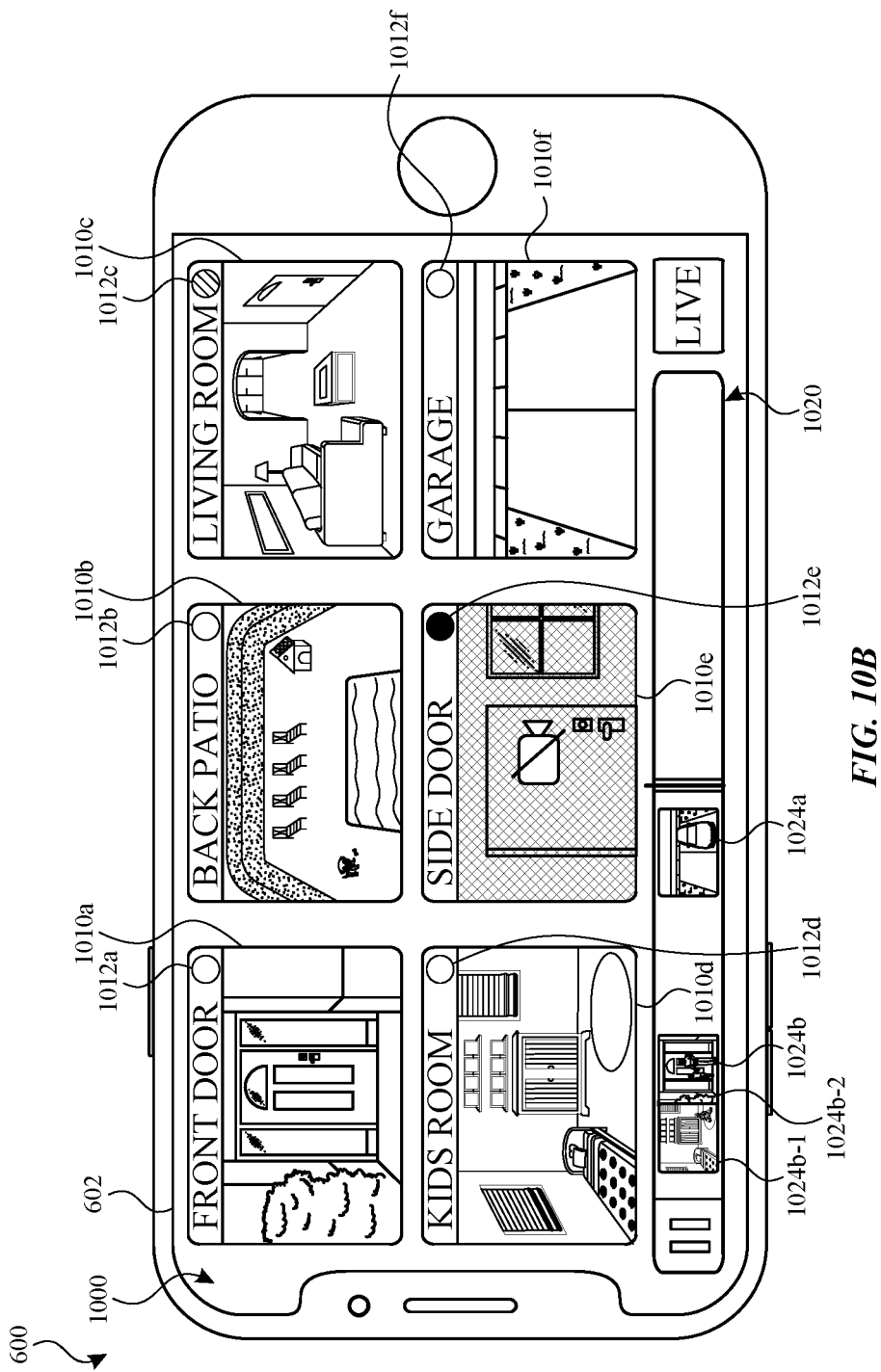

As illustrated in FIG. 10B, in accordance with a determination that device 600 is oriented in a landscape orientation (e.g., in response to device 600 being physically rotated from the portrait orientation in FIG. 10A to the landscape orientation in FIG. 10B), device 600 displays user interface 1000 focused on the sources of video data (e.g., Cameras 1-6). As illustrated in FIG. 10B, user interface 1000 includes camera representations 1010a-1010f (e.g., images) for the sources of video data represented in FIG. 10A. In some embodiments, camera representations 1010 are enlarged and rotated versions of camera representations 610 illustrated in FIG. 10A.

In some embodiments, device 600 detects a change in orientation (e.g., from portrait orientation to landscape orientation), and in response, replaces user interface 604 with user interface 1000. In some embodiments, device 600 detects a change in orientation (e.g., from landscape orientation to portrait orientation), and in response, replaces user interface 1000 with user interface 604.

Camera representations 1010a-1010f include status indicators 1012a-1012f for each source of video data to indicate an operational mode associated with the respective source. Status indicators 1012a, 1012b, 1012d, and 1012f indicate that the corresponding sources of data are set to operate in a "stream" mode in which the source provides a live video feed (the live video feed will not be recorded); status indicator 1012c indicates that the corresponding source of data is set to operate in a "stream and record" mode in which the source provides a live video feed that will be recorded according to certain criteria; and status indicator 1012e indicates that the corresponding source of data is set to operate in an "off" mode in which the corresponding source provides no live video feed. Since the source corresponding to image 1012e "off", the image is greyed out or blurred and includes an icon of a camera with a line through it to indicate that no live video is currently available (e.g., the image is a blurred image of the most recent frame of video captured by the source).

As illustrated in FIG. 10B, user interface 1000 also includes composite scrubber bar 1020. Composite scrubber bar 1020 includes an interactive, elongated region on the display that includes a representation of media content that can be scrolled along the direction parallel to direction of elongation. In some embodiments, the media content (e.g., the video) can be played back at arbitrary and variable rates based on a characteristic (e.g., the speed of a received user input). Composite scrubber bar 1020 is capable of including representations of media content from one or more of the sources of video data available to device 600. As illustrated in FIG. 10B, composite scrubber bar 1020 includes composite clip representations 1024a and 1024b. In some embodiments, a composite clip representation represents recorded video from more than one source. Composite clip representation 1024a represents a recorded clip of video from only Camera 6 (garage camera), and composite clip representation 1024b represents both a recorded clip of video from Camera 1 (front door camera) and a recorded clip of video from Camera 4 (kids room camera). In FIG. 10B, composite clip representation 1024b represents recorded video from both Camera 1 and source 4 by including thumbnail 1024b-1 of a recorded image from Camera 1 and thumbnail 1024b-2 of a recorded image from Camera 4. In some embodiments, a composite clip representation in scrubber bar 1020 represents an uninterrupted duration of time during which recorded video is available from at least one source (e.g., there is no time represented by the composite clip representation at which recorded video is available for none of the sources). In some embodiments, scrubber bar 1020 includes some or all of the features of scrubber bar 620. For example, as new recorded clips of video from any of the sources of video associated with the location become available, the recorded clips are received by device 600 and a corresponding composite clip representation of the newly recorded clip is added to scrubber bar 1020 (e.g., similar to the technique described with reference to FIGS. 6C-6E). In some embodiments, the newly recorded clip is represented separately from any existing composite clip representation(s) of video content from the video sources (e.g., if no other sources were recording video while the newly recorded clip of video was recorded). In some embodiments, an existing composite clip representation of recorded video content is modified to represent the newly recorded clip of video (e.g., if the newly recorded clip of video overlaps with a recording from another source).

Figure 10C:
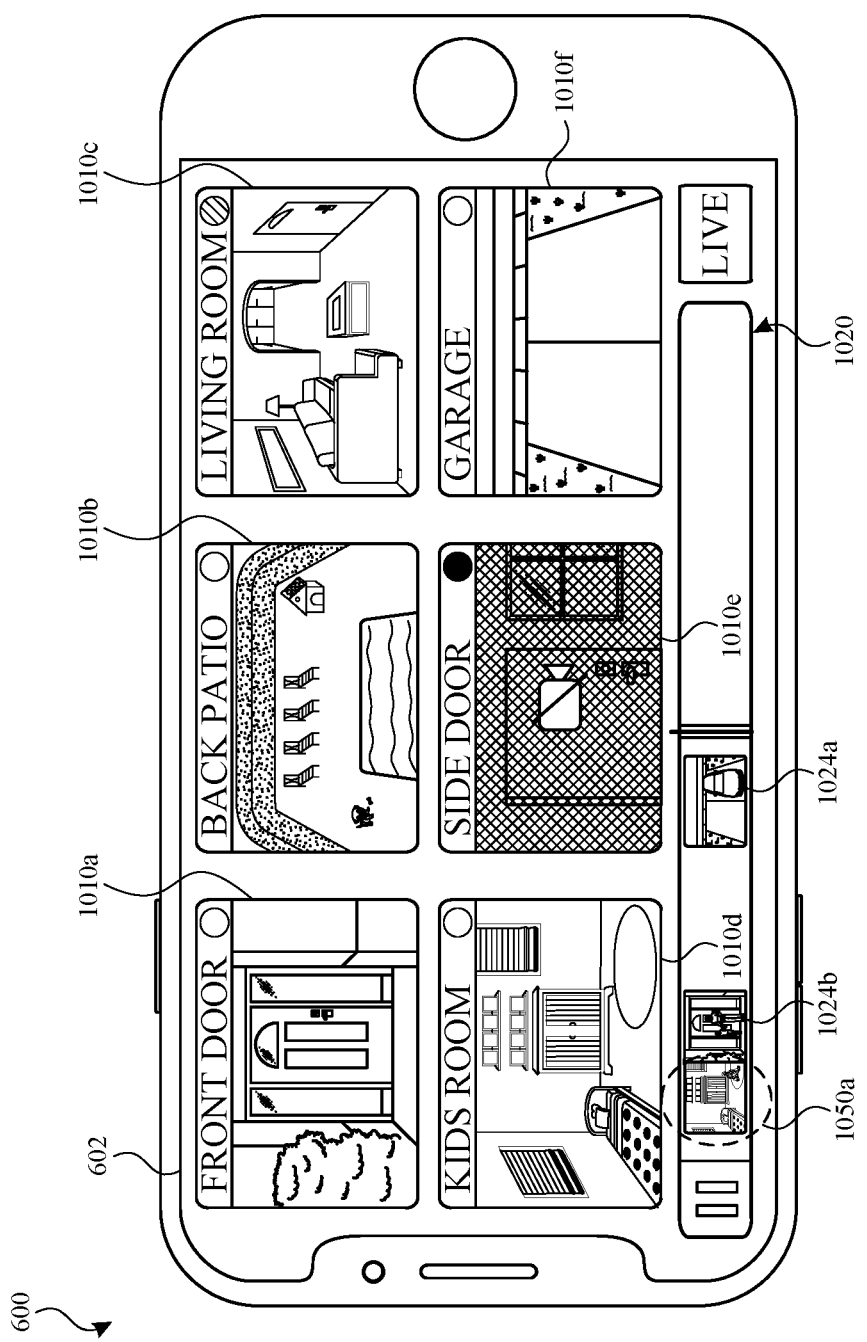

In some embodiments, composite clip representations 1024 include some or all of the features of clip representations 624. As illustrated in FIG. 10C, device 600 receives (e.g., detects) user input 1050a (e.g., a tap) on scrubber bar 1020 at composite clip representation 1024b). In some embodiments, user input 1050a includes a swipe on display 602 (e.g., a left-to-right swipe on the area including the live video feeds or on scrubber bar 1020).

In response to receiving user input 1050a, device 600 displays images from the cameras, where the images correspond to a time associated with user input 1050*a* and updates scrubber bar 1020 to reflect the selected time.

As illustrated in FIG. 10D, device 600 replaces the live video feeds of Cameras 1-6 with images associated with Cameras 1-6 from the time at which the video clip corresponding to clip representation 1024*b* was recorded. Image 1010*d* includes the clip corresponding to composite clip representation 1024*b*. Recorded video from Camera 1 and Camera 6 associated with images 1010*a* and 1010*f* is also available for the selected time (e.g., JAN 28 at 7:08 PM), so images 1010*a* and 1010*f* are also replaced with the recorded video from the respective cameras. No recorded video is available from Cameras 2, 3, and 5 associated with images 1010*b*, 1010*c*, and 1010*e* at the selected time (e.g., Cameras 2, 3, and 5 were not providing live video at the selected time or were providing live video that was not being recorded), so images 1010*b*, 1010*c*, and 1010*e* are replaced with indications that no recording is available.

As illustrated in FIG. 10D, composite scrubber bar 1020 is updated (e.g., scrolled) to align the portion of composite scrubber bar 1020 corresponding to the displayed images with current display indicator 1022. Device 600 also displays date and time indicator 1028 above composite scrubber bar 1020 to indicate the date and time at which the displayed images were recorded.

As illustrated in FIG. 10D, user interface 1000 includes "LIVE" affordance 1036. Compared to FIGS. 10B-10C, "LIVE" affordance 1036 is altered (e.g., greyed out) to indicate that the displayed images in FIG. 10D are not live video feeds. In some embodiments, device 600 receives an input corresponding to selection of "LIVE" affordance 1036, and in response, returns to live video feeds from the cameras for which live video feeds are available and updates scrubber bar 1020 to indicate that the displayed video(s) are live video feeds.

Figure 10E:
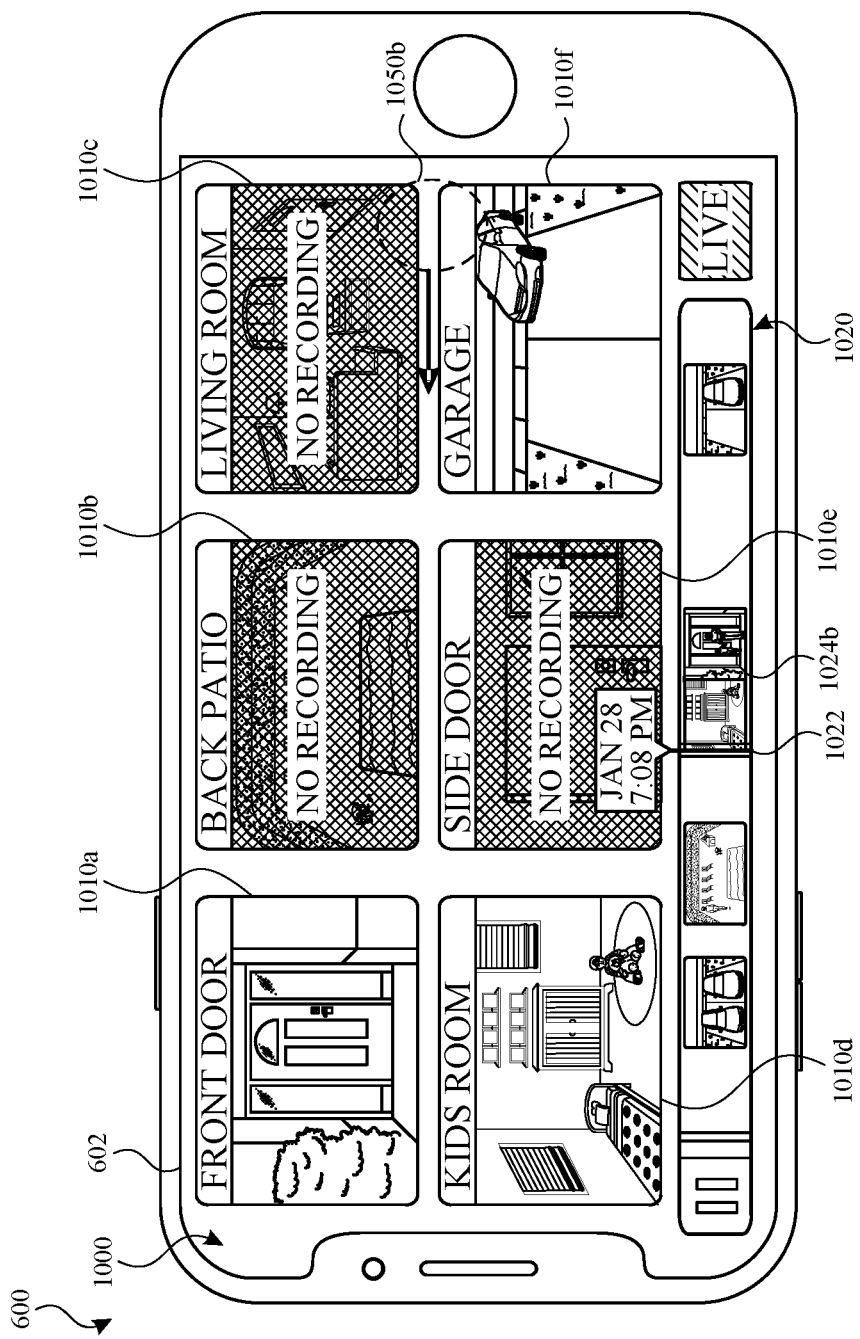
Figure 10F:
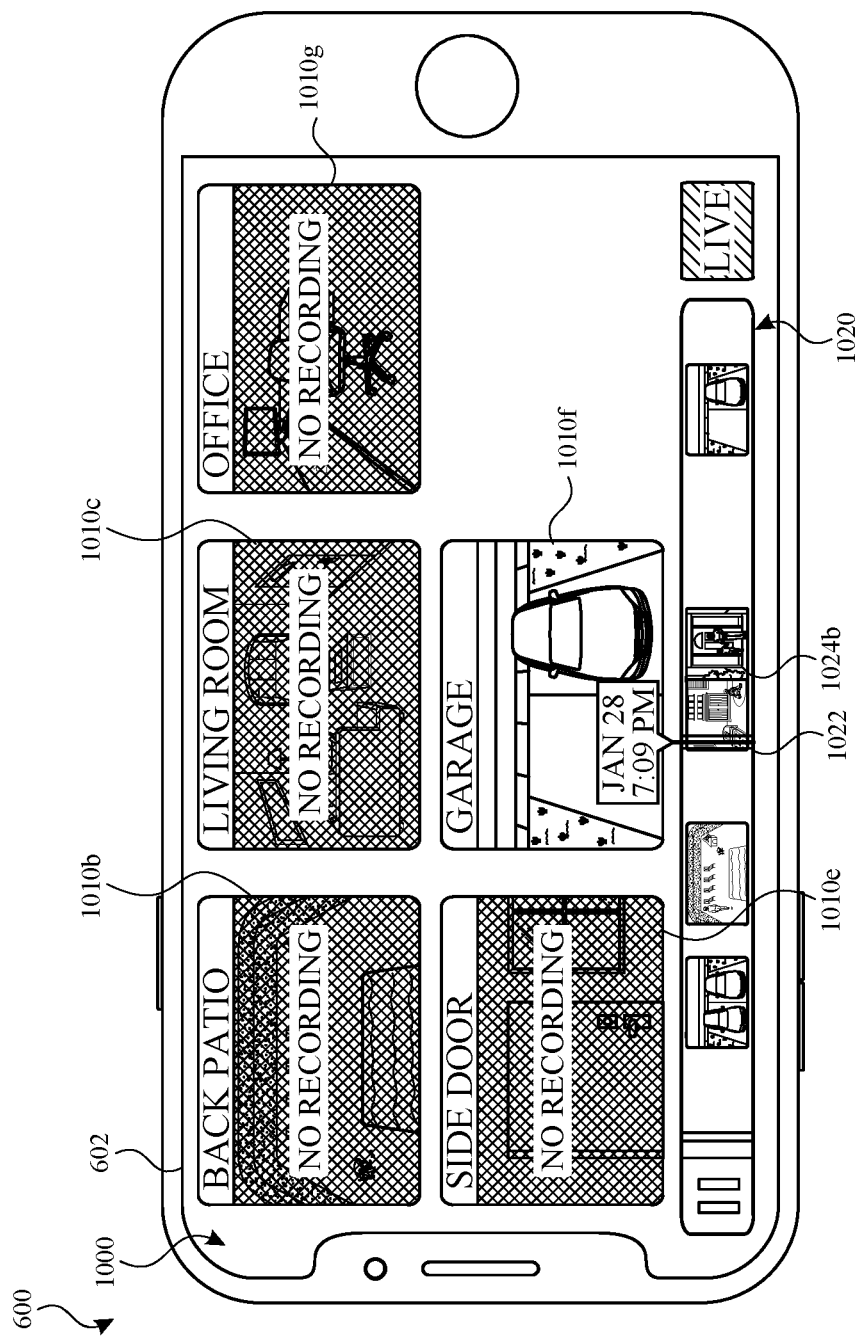

In some embodiments, user interface 1000 is scrolled to display one or more images from additional sources of video (e.g., cameras) available to device 600. As illustrated in FIG. 10E, device 600 receives (e.g., detects) user input 1050*b* (e.g., right-to-left swipe on display 602). As illustrated in FIG. 10F, in response to receiving user input 1050*b*, device 600 scrolls user interface 1000, including images 1010*a*-1010*f*, and displays (e.g., reveals) image 1010*g* corresponding to a seventh source of video data (e.g., Camera 7, office camera) available to device 600.

Figure 10G:
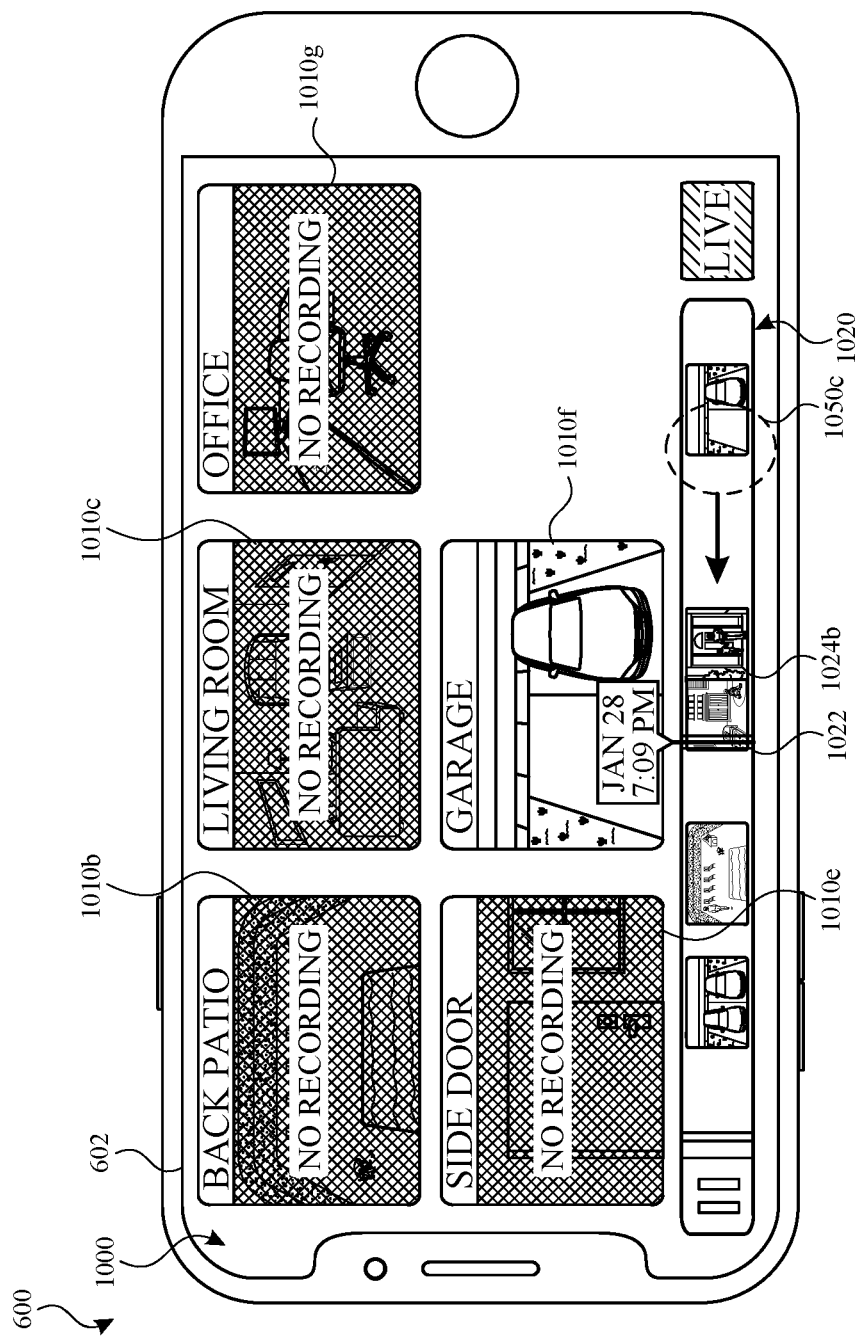

In some embodiments, composite scrubber bar 1020 is scrolled to advance to a different time. As illustrated in FIG. 10G, device 600 receives (e.g., detects) user input 1050*c* (e.g., a right-to-left swipe on scrubber bar 1020) corresponding to selection of a time after the time associated with the currently displayed images (JAN 28, 7:09 PM). As illustrated in FIG. 10H, device 600 replaces the images displayed in FIG. 10G with images from the respective cameras corresponding to the newly selected time (JAN 28, 7:29 PM). Device 600 also updates composite scrubber bar 1020 to reflect the newly selected time (JAN 28, 7:29 PM). As indicated by composite scrubber bar 1020, the newly selected time is a later time represented within composite clip representation 1024*a*. As illustrated in FIG. 10H, recorded video from Cameras 3, 6, and 7 is available at the newly selected time (JAN 28, 7:29 PM).

In some embodiments, an image 1010 can be selected to display a user interface dedicated to the source corresponding to the selected image (e.g., images 1010*a*-1010*g* and composite scrubber bar 1020 are replaced with an image from the selected source and a scrubber bar (e.g., 620) representing media content from only the selected source).

Figure 10I:
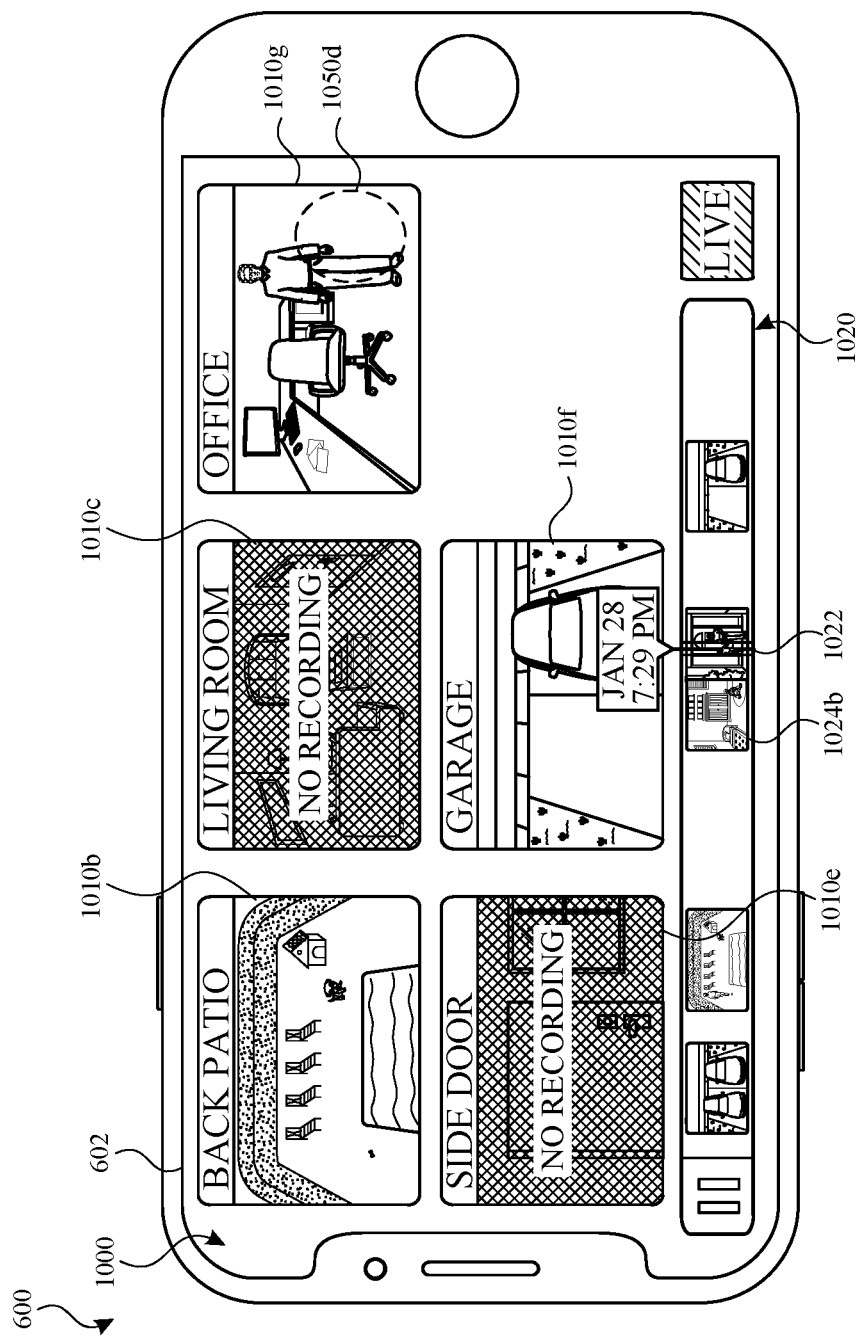
Figure 10J:
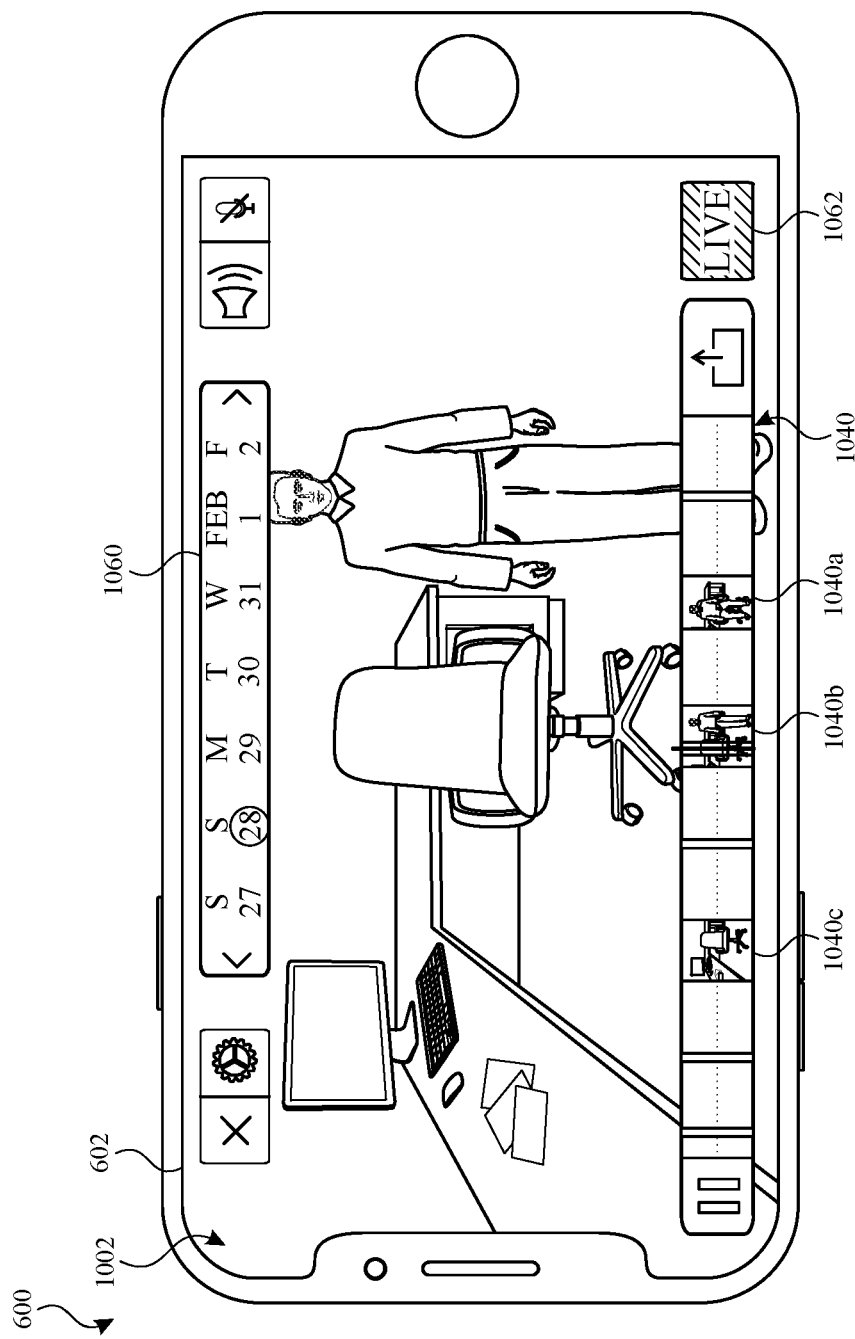

As illustrated in FIG. 10I, device 600 receives (e.g., detects) user input 1050*d* (e.g., a tap) corresponding to selection of image 1010*g*. As illustrated in FIG. 10J, in response to receiving user input 1050*d*, device 600 displays user interface 1002, which includes, inter alia, an enlarged version of the recorded video from Camera 7 at the time corresponding to FIG. 10I (JAN 28 at 7:29 PM) and scrubber bar 1040 including representations 1044*a*-1044*c* of recorded clips of video from only Camera 7. In some embodiments, user interface 1002 is analogous to user interface 608 of FIG. 6G. For example, the controls on user interface 1002 (e.g., scrubber bar 1040, date bar 1060, "LIVE" affordance 1062, etc.) can be used to navigate video (e.g., live or recorded) from Camera 7. Similarly, referring back to, e.g., FIG. 10B, in response to selection of, e.g., image 1010*a*, device 600 displays a user interface analogous to FIG. 6B, including, inter alia, an enlarged display of a live video feed from Camera 1 and a scrubber bar including representations of recorded clips of video from only Camera 1 and indicating that the displayed video is a live video feed.

FIGS. 11A-11C are a flow diagram illustrating a method for displaying and navigating video (e.g., live or recorded) from multiple sources of video data (e.g., multiple cameras) using an electronic device in accordance with some embodiments. Method 1100 is performed at a device (e.g., 100, 300, 500, or 600) with a display. Some operations in method 1100 are, optionally, combined, the orders of some operations are, optionally, changed, and some operations are, optionally, omitted.

As described below, method 1100 provides an intuitive way for displaying and navigating video (e.g., live or recorded) from multiple sources of video data (e.g., multiple cameras). The method reduces the cognitive burden on a user for displaying and navigating video (e.g., live or recorded) from multiple sources of video data (e.g., multiple cameras), thereby creating a more efficient human-machine interface. For battery-operated computing devices, enabling a user to display and navigate video (e.g., live or recorded) from multiple sources of video data (e.g., multiple cameras) faster and more efficiently conserves power and increases the time between battery charges.

At block 1102, the device displays, at a first time, a user interface (e.g., 1000) that includes a first live video feed (e.g., 1010*a*-1010*f*) from a first source at a first location of the user interface, a second live video feed (e.g., 1010*a*-1010*f*) from a second source at a second location of the user interface, and a scrubber bar (e.g., 1020) including a representation (e.g., 1024*a*, 1024*b*) (e.g., a rounded rectangle or shaded area of the scrubber bar) of recorded video content from at least one of the first source or the second source. In some embodiments, a scrubber bar is an interactive, elongated region on the display that includes a representation of media content that can be scrolled along the direction parallel to direction of elongation. In some embodiments, the media content (e.g., the video) can be played back at arbitrary and variable rates based on a characteristic (e.g., the speed of a received user input). In some embodiments, the representation of recorded video content has a visual width in the scrubber bar that is proportional to a duration of the recorded video content. In some embodiments, the scrubber bar further includes an indication of a period of time during which recorded video is not available. In some embodiments, the periods of time during which no recorded video is available from any source are indicated by spaces (e.g., uniform color or dots) between representations of recorded video content. In some embodiments, the indication of the period of time during which recorded video is not available is independent from the duration of the period of time. In some embodiments, the distance on the scrubber bar between two representations of recorded video content is independent from the amount of time that no recorded video content is available (e.g., the distance is fixed). In some embodiments, the distance on the scrubber bar between two representations of recorded video content is variable (e.g., the distance is based on (e.g., is directly proportional to) the amount of time that no recorded video content is available. In some embodiments, the scrubber bar further includes an indication of a boundary between a first day and a second day. In some embodiments, the boundary between two days is indicated by a vertical line on or through the scrubber bar. In some embodiments, the user interface further includes an indication of an operational state of the first source and an indication of an operational state of the second source. In some embodiments, the operational state of a source is one of "off" (not streaming or recording), "live" (streaming, but will not record), and "record" (streaming and will record, e.g., if motion is detected).

At block 1104, the device detects a user input (e.g., 1050*a*) (e.g., a right swipe on the scrubber bar or a tap on a clip). In some embodiments, the device detects the user input while displaying the user interface. In some embodiments, the user input includes a swipe on a touch-sensitive surface of the electronic device. In some embodiments, the swipe is a left-to-right swipe on a touch-sensitive display (e.g., on the live video feed or on the scrubber bar). In some embodiments, the second time is based on a length or velocity of the swipe (e.g., a shorter or slower swipe will display more recently recorded content than a longer or faster swipe). In some embodiments, the user input includes a tap on a touch-sensitive surface of the electronic device, the tap having a location on the scrubber bar corresponding to the second time.

In response to detecting the user input (e.g., 1050*a*), the device performs the operations of blocks 1106, 1108, and 1110. At block 1106, the device replaces the first live video feed (e.g., 1010*f* of FIG. 10B) with a first image associated with the first source at the first location of the user interface (e.g., 1010*f* of FIG. 10D). The first image is associated with data from the first source at a second time that is before the first time. In some embodiments, the image associated with the first source is a frame of recorded video captured by the first source at the second time. In some embodiments, the image associated with the first source is a "placeholder image" (e.g., 1010*b* of FIG. 10D) that indicates that there is no recorded video data available from the first source corresponding to the second time. In some embodiments, in accordance with recorded video from the first source at the second time not being available (e.g., the first source did not provide recorded video at the second time), the first image is blurry. In some embodiments, the first image is a blurred image of the most recent frame of video captured by the first source. Replacing the first live video feed with a first image associated with the first source provides the user with feedback regarding the current state of the media content being displayed on the device. The feedback indicates to the user that the user is no longer viewing the live video feed for the first source. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1108, the device replaces the second live video feed (e.g., 1010*d* of FIG. 10B) with a second image associated with the second source at the second location of the user interface (e.g., 1010*d* of FIG. 10D). The second image is associated with data from the second source at the second time. In some embodiments, the image associated with the second source is a frame of recorded video captured by the second source at the second time. In some embodiments, the image associated with the second source is a "placeholder image" (e.g., 1010*e* of FIG. 10D) that indicates that there is no recorded video data available from the second source corresponding to the second time. Replacing the second live video feed with a second image associated with the second source provides the user with feedback regarding the current state of the media content being displayed on the device. The feedback indicates to the user that the user is no longer viewing the live video feed for the second source. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1110, the device updates the scrubber bar to indicate the portion of the representation of the recorded video content that corresponds to the second time. In some embodiments, a pointer element (e.g., 1022) is moved to the portion of the scrubber bar corresponding to the second time. In some embodiments, the representation of the video content in the scrubber bar is scrolled such that the representation corresponding to the second time is displayed at a fixed position (e.g., the center) in the scrubber bar. In some embodiments, updating the scrubber bar includes translating the representation of recorded video content. Updating the scrubber bar to indicate the portion of the representation of the recorded video content that corresponds to the second time provides the user with feedback as to the current state of the media content being displayed on the device. The feedback indicates to the user that the user is no longer viewing the live video feed. Additionally, the feedback indicates to the user that the user is able to control the content being displayed by interacting with the scrubber bar. Further, the feedback indicates to the user the approximate date/time the clip was recorded as it is shown in a position that is relative to the other clips in the scrubber bar. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to detecting the user input, the device displays an affordance (e.g., 1036) (block 1112). In some embodiments, the affordance is a "LIVE" icon (e.g., 1036), e.g., displayed adjacent to the scrubber bar. Optionally, at block 1114, the device detects a second user input (e.g., a tap) corresponding to selection of the affordance (e.g., 1036). Optionally, in response to detecting the second user input corresponding to selection of the affordance, the device performs the operations of blocks 1116, 1118, and 1120. At block 1116, the device replaces the first image associated with the first (e.g., 1010*f* of FIG. 10D) source with the first live video feed from the first source (e.g., 1010*f* of FIG. 10B). At block 1118, the device replaces the second image associated with the second source (e.g., 1010d in FIG. 10D) with the second live video feed (e.g., 1010d of FIG. 10B). At block 1120, the device updates the scrubber bar to indicate that the first live video feed and second live video feed are displayed (e.g., FIG. 10B). In some embodiments, the content in the scrubber bar is scrolled to the left. In some embodiments, an indicator is moved to the right. Displaying an affordance (e.g., "LIVE" icon) provides a user with feedback as to the current state of the media content being displayed on the device. In particular, the affordance provides feedback to the user that the user is no longer viewing live content, and that the user can switch back to the live content by selecting the affordance. Further, replacing the first and second images with the first and second live video feed, respectively, and/or updating the scrubber bar provides the user with feedback regarding the current state of the media content being displayed on the device. The feedback indicates to the user that the user is now viewing a live video feed. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1122, the device detects a third user input (e.g., 1050c) (e.g., a right-to-left swipe on the display). Optionally, at block 1124, the device displays a third image associated with a third source that is not represented on the user interface at the first time in response to detecting the third user input. In some embodiments, if the number of sources of video data exceeds the number of images displayed on the first user interface, the user interface is scrollable to display an image (e.g., a live video feed or recorded image) from a source not initially represented on the user interface.

Optionally, at block 1126, the device detects a fourth user input (e.g., 1050d) corresponding to selection of the first location of the user interface. In some embodiments, the fourth user input is a contact (e.g., a single tap, a double tap, or a press with a characteristic intensity that exceeds a threshold intensity) on the first live video feed or the first image (e.g., 1010g) associated with the first source. Optionally, at block 1128, the device enlarges the first live video feed from the first source or the first image associated with data from the first source at the second time in response to detecting the fourth user input. In some embodiments, images from all other sources are removed from the display. In some embodiments, a scrubber bar (e.g., 1040) representing content from the first source is displayed (e.g., the composite scrubber bar is replaced with a scrubber bar solely for the first source).

Optionally, at block 1130, the device receives (e.g., after the first time) data representing a first recorded clip of video from the first source. Optionally, at block 1132, the device updates the scrubber bar (e.g., 1020) to represent the first recorded clip of video (e.g., 1024a) in response to receiving the data representing the first recorded clip of video from the first source. In some embodiments, the first recorded clip of video is represented separately from the existing representation(s) of video content from the video sources (e.g., if no other sources were recording video while the first recorded clip of video was recorded). In some embodiments, an existing representation of recorded video content is modified to represent the first recorded clip of video (e.g., if the first recorded clip of video overlaps with a recording from another source).

Optionally, at block 1134, the device detects a rotation of the electronic device (e.g., a rotation from landscape orientation to portrait orientation). Optionally, at block 1136, the device replaces the user interface (e.g., 1000) with a second user interface (e.g., 604) in response to detecting the rotation of the electronic device, where the second user interface includes the live video feed from the first source and information associated with a location associated with the first source. In some embodiments, the second user interface is a home or status screen of the location associated with the first and second sources, which includes location information or accessory status (e.g., lights ON/OFF, doors locked/unlocked, etc.). Replacing the user interface with a second user interface in response to detecting the rotation of the device provides the user with more control of the device by providing access to an alternative user interface without having to select a displayed user interface element. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIGS. 11A-11C) are also applicable in an analogous manner to the methods described above/below. For example, method 1100 optionally includes one or more of the characteristics of the various methods described above with reference to methods 700, 900, 1300, 1500, 1700, 2100, 2300, 2500, and 2700. For example, the controllable external device described in method 900 can provide the live video feed in method 1100. For brevity, these details are not repeated below.

FIGS. 12A-12T illustrate exemplary user interfaces for configuring a source of video data for different contexts, in accordance with some embodiments. The user interfaces in these figures are used to illustrate the processes described below, including the processes in FIG. 13.

FIG. 12A illustrates device 600 displaying user interface 604 (e.g., FIG. 6A). As illustrated in FIG. 12A, device 600 receives (e.g., detects) user input 1250a (e.g., a left swipe in the area of display 602 corresponding to camera images 610). As illustrated in FIG. 12B, in response to receiving user input 1250a, device 600 scrolls camera images 610 to fully reveal image 610c (which is partially hidden in FIG. 12A) and to display image 610g (which is completely hidden in FIG. 12A). As illustrated in FIG. 12C, device 600 receives (e.g., detects) user input 1250b (e.g., a tap) corresponding to selection of image 610c representing the Camera 3, the living room camera. As illustrated in FIG. 12D, in response to receiving user input 1250b, device 600 displays individual camera user interface 1200 for the living room camera. Individual camera user interface 1200 is analogous to individual camera user interface 608 for the front door camera illustrated in, e.g., FIG. 6B.

Individual camera user interface 1200 includes settings affordance 1202. As illustrated in FIG. 12D, device 600 receives (e.g., detects) user input 1250c (e.g., a tap) corresponding to selection of settings affordance 1202.

In response to receiving user input 1250c, device 600 displays a settings user interface for the source of video data (e.g., Camera 3) associated with user interface 1200. As illustrated in FIG. 12E, device 600 displays settings user interface 1204. Settings user interface 1204 includes, inter alia, a graphical representation, a name, and a location associated with the camera. Settings user interface 1204 also includes affordance 1206 for designating the camera (e.g., as a favorite accessory). In some embodiments, in accordance with Camera 3 being designated (e.g., the toggle button of affordance 1206 is positioned to the right), device 600 displays a representation of Camera 3 on home user interface 604. In some embodiments, in accordance with Camera 3 not being designated (e.g., the toggle button of affordance 1206 is positioned to the left), device 600 does not display a representation of Camera 3 on home user interface 604.

Settings user interface 1204 also includes affordance 1208 for displaying settings of the Camera 3 related to streaming and recording, affordance 1210 for displaying settings related to data storage (e.g., storage of recordings of video from Camera 3 and other sources), and affordance 1212 for displaying settings related to status and notifications associated with Camera 3.

As illustrated in FIG. 12F, device 600 receives (e.g., detects) user input 1250*d* (e.g., a tap) corresponding to selection of affordance 1208. As illustrated in FIG. 12G, in response to receiving user input 1250*d*, device 600 displays streaming and recording user interface 1214. Streaming and recording user interface 1214 includes affordances 1216*a*-1216*c* associated with a first context in which at least one person associated with the location of the source of video data is determined to be present at the location (e.g., anyone is home). Streaming and recording user interface 1214 also includes affordances 1218*a*-1218*c* associated with a second context in which no person associated with the location of the source of video data is determined to be present at the location (e.g., no one is home). In some embodiments, the first context and the second context are predetermined. In some embodiments, the presence of a person at a location is determined based on detecting that a device (e.g., a smartphone) that is associated with that person is at the location. In some embodiments, determining whether a person is present at a location based on the location of two or more devices that are associated with that person. For example, a person associated with more than one device is considered to be away from a location if any one of the devices is determined to be away from the location.

Affordances 1216*a*-1216*c* correspond to respective available operational modes (e.g., camera off, stream video, stream and record video) of the source of video data in the first context. Affordances 1218*a*-1218*c* correspond to respective available operational modes (e.g., camera off, stream video, stream and record video) of the source of video data in the second context. In some embodiments, the available operational modes are predetermined. As illustrated in FIG. 12G, operational mode "OFF" is selected as a default mode for the first context and the second context, as indicated by check mark indicators 1220*a* and 1220*b*, respectively.

As illustrated in FIG. 12H, device 600 receives (e.g., detects) user input 1250*e* (e.g., a tap) corresponding to selection of affordance 1216*b* and operational mode "STREAM" for the first context. As illustrated in FIG. 12I, in response to receiving user input 1250*e*, device 600 moves check mark affordance 1220*a* from "OFF" to "STREAM".

As illustrated in FIG. 12I, device 600 receives (e.g., detects) user input 1250*f* (e.g., a tap) corresponding to selection of affordance 1218*c* and operational mode "STREAM & RECORD" for the second context. As illustrated in FIG. 12J, in response to receiving user input 1250*f*, device 600 moves check mark affordance 1220*b* from "OFF" to "STREAM & RECORD".

In some embodiments, device 600 provides the capability to select an exception to the first context or the second context. For example, as illustrated in FIG. 12K, device 600 receives (e.g., detects) user input 1250*g* (e.g., a tap) corresponding to selection of affordance 1222 ("IGNORE MOTION IN SOME AREAS") on user interface 1214. In response to receiving user input 1250*g*, device 600 displays a user interface for selecting an exception to the first context or the second context. As illustrated in FIG. 12L, in response to receiving user input 1250*g*, device 600 displays user interface 1224 (e.g., replaces user interface 1214 with user interface 1224). User interface 1224 includes field of view 1226 of the living room camera. In some embodiments, displayed field of view 1226 includes a captured still image or a live video stream of the field of view.

In some embodiments, device 600 receives an input corresponding to a selection of a portion of the field of view. As illustrated in FIGS. 12M-12O, device 600 receives (e.g., detects) a contact 1250*h* that moves along path 1228 (e.g., a freeform path) on display 602. Contact 1250*h* corresponds to selection of the portion 1230 of the field of view bounded by path 1228, as illustrated in FIG. 12P. In some embodiments, a rectangular portion of the field of view is selected by a sequence of one or more user inputs corresponding to selection of a first corner of the rectangular portion and a second corner of the rectangular portion diagonal to the first corner.

As illustrated in FIG. 12P, in response to contact 1250*h* ceasing to be detected on display 602, device 600 visually distinguishes selected portion 1230 from the rest of field of view 1226. In some embodiments, device detects selection of two or more distinct portions of the field of view (e.g., by detecting two or more distinct contacts). In the embodiment illustrated in FIGS. 12M-12P, the exception to the first context or the second context is based on the selected portion(s) of the field of view.

In some embodiments, the exception applies to a particular operational mode. As indicated in FIGS. 12M-12P, the exception applies to the "STREAM & RECORD" mode. In some embodiments, according to the "STREAM & RECORD" mode, access is provided to a live video stream from the corresponding source of video data, and the video is recorded if an event (e.g., motion) is detected in the captured video.

In the embodiment illustrated in FIGS. 12M-12P, the exception includes not operating the living room camera according to the "STREAM & RECORD" mode if the exception is met such that video is not recorded in response to an event (e.g., motion) detected in the selected portion of the field of view, even if the "STREAM & RECORD" mode is selected and the corresponding context applies (e.g., STREAM & RECORD" mode is selected for the first context and someone is determined to be present at the location). In some embodiments, the exception does not apply to at least one operational mode. In the illustrated embodiment, the "OFF" and "STREAM" modes do not depend on whether activity (e.g., motion) is detected and thus are not affected by the exception.

As illustrated in FIG. 12Q, after the portion(s) of the field of view are selected, device 600 receives (e.g., detects) user input 1250*i* (e.g., a tap) corresponding to selection of "DONE" affordance 1232. As illustrated in FIG. 12R, in response to receiving user input 1250*i*, device 600 returns to user interface 1214.

As illustrated in FIG. 12R, device receives (e.g., detects) user input 1250*j* (e.g., a tap) corresponding to selection of "DONE" affordance 1234. As illustrated in FIG. 12S, in response to receiving user input 1250*j*, device 600 displays menu 1236 to confirm that the living room camera will operate according to a selected mode (e.g., "STREAM & RECORD") and that the first context and second context will be based on the location of device 600 relative to an external device (e.g., the user's presence at the location will be determined based on the location of device 600 relative to the external device). In some embodiments, the external device is a hub device (e.g., AppleTV or an iPad). In some embodiments, the hub device stores device or user profiles or sends control instructions (e.g., commands) to the source of video data.

As illustrated in FIG. 12S, device 600 receives (e.g., detects) user input 1250*k* (e.g., a tap) corresponding to selection of "OK" affordance 1238. In the illustrated embodiment, in response to user input 1250*k*, device 600 sends instructions to set a configuration profile of the source of video data according to the selected operational mode for the first context (e.g., "STREAM") and the selected operational mode for the second context (e.g., "STREAM & RECORD") (e.g., based on user input 1250*e* and user input 1250*f*).

In the illustrated embodiment, in response to user input 1250*k*, device 600 also sends data representing the selected exception (e.g., device 600 sends instructions to set the configuration profile of the source of video data to operate according to the selected exception). In some embodiments, device 600 sends the instructions to set a configuration profile of the source of video data and/or the data representing the selected exception in response to receiving user input 1250*i*, user input 1250*j*, or user input 1250*k*. In some embodiments, the instructions to set a configuration profile of the source of video data and/or the data representing the selected exception are sent to an external device other than the first controllable external device. In some embodiments, the instructions to set a configuration profile of the source of video data and/or the data representing the selected exception are sent to the hub device (e.g., AppleTV or an iPad).

As illustrated in FIG. 12T, in response to user input 1250*k*, device 600 displays (e.g., returns to) settings user interface 1204.

FIG. 13 is a flow diagram illustrating a method for configuring a source of video data for different contexts using an electronic device in accordance with some embodiments. Method 1300 is performed at a device (e.g., 100, 300, 500, or 600) with a display. Some operations in method 1300 are, optionally, combined, the orders of some operations are, optionally, changed, and some operations are, optionally, omitted.

As described below, method 1300 provides an intuitive way for configuring a source of video data for different contexts. The method reduces the cognitive burden on a user for configuring a source of video data for different contexts, thereby creating a more efficient human-machine interface. For battery-operated computing devices, enabling a user to configure a source of video data for different contexts faster and more efficiently conserves power and increases the time between battery charges.

At block 1302, the device displays a user interface (e.g., 1214) that includes a first plurality of affordances (e.g., 1216*a*-1216*c*) associated with a first context (e.g., anyone is home) and a second plurality of affordances (e.g., 1218*a*-1218*c*) associated with a second context (e.g., no one is home), where the first plurality of affordances corresponds to respective available operational modes (e.g., camera off, stream video, stream and record video) of a first controllable external device (e.g., a camera) in the first context and the second plurality of affordances corresponding to respective available operational modes (e.g., camera off, stream video, stream and record video) of the first controllable external device in the second context. In some embodiments, the first context and the second context are predetermined. In some embodiments, the first context is based on the presence of a person at a location associated with the first controllable external device. In some embodiments, the first context is that at least one person is determined to be at the location. In some embodiments, the second context is based on the presence of a person at the location associated with the first controllable external device. In some embodiments, the second context is that no person is determined to be at the location. In some embodiments, the presence of a person is determined based on detecting that a device (e.g., a smartphone) that is associated with that person is at the location.) In some embodiments, the presence of the person at the location is determined based on the location of a first electronic device associated with the person and the location of a second electronic device associated with the person. In some embodiments, a person associated with more than one electronic device is considered to be away from a location if any one of the devices is determined to be away from the location. In some embodiments, the available operational modes of the first controllable external device in the first context are predetermined operational modes. In some embodiments, the available operation modes of the first controllable external device in the second context are predetermined modes. Displaying a first plurality of affordances and a second plurality of affordances that both correspond to a controllable external device provides a user with the ability to configure the external device for different contexts via a single user interface. Further, presenting the different contexts in a single user interface indicates to the user that these different contexts are associated with the same external device. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1304, the device detects (e.g., while displaying the first user interface) a first user input (e.g., 1250*e*) at a location on the display corresponding to a first affordance in the first plurality of affordances, where the first affordance corresponds to a first operational mode of the respective available operational modes of the first controllable external device in the first context.

At block 1306, the device detects (e.g., while displaying the first user interface) a second user input (e.g., 1250*f*) at a location on the display corresponding to a second affordance in the second plurality of affordances, where the second affordance corresponding to a second operational mode of the respective available operational modes of the first controllable external device in the second context.

Optionally, at block 1308, the device detects a third user input (e.g., 1250*g*) representing selection of an exception to the first context or the second context. In some embodiments, the exception applies to a particular operational mode (e.g., for the "stream and record" mode, video is not recorded if the exception is met (e.g., motion is detected in a designated area), even if the first or second context applies. In some embodiments, the exception does not apply to at least one operational mode (e.g., the "Off" and "Stream" modes do not depend on whether motion is detected in a designated area).

In some embodiments, the first controllable external device includes a video camera. Optionally, at block 1310, the device displays a field of view (e.g., 1226) of the video camera, where the third user input includes selection of a portion of the field of view. In some embodiments, the displayed field of view includes a captured image or a live video stream of the field of view. In some embodiments, the third user input includes a free form input (e.g., 1250*h*) encompassing the portion of the field of view. In some embodiments, the third user input includes selection of a rectangular portion of the field of view by selection of a first corner of the rectangular portion and a second corner of the rectangular portion diagonal to the first corner. In some embodiments, the exception to the first context or the second context includes not operating the first controllable external device according to the first operational mode in the first context or not operating the first controllable external device according to the second operational mode in the second context in response to an event detected in the selected portion of the field of view.

Optionally, at block 1312, the device sends data representing the selected exception (e.g., send instructions to set the configuration profile of the first controllable external device to operate according to the selected exception.

At block 1314, the device sends (e.g., after detecting the first user input and the second user input) instructions to, based on the first user input (e.g., 1250*e*) and the second user input (e.g., 1250*f*), set a configuration profile of the first controllable external device according to the first operational mode for the first context and the second operational mode for the second context. In some embodiments, the instructions are sent to an external device other than the first controllable external device. In some embodiments, the instructions are sent to a hub device (e.g., Apple TV or an iPad). In some embodiments, the hub device stores device or user profiles or sends control instructions (e.g., commands) to the first controllable external device.

Note that details of the processes described above with respect to method 1300 (e.g., FIG. 13) are also applicable in an analogous manner to the methods described above/below. For example, method 1300 optionally includes one or more of the characteristics of the various methods described above with reference to methods 700, 900, 1100, 1500, 1700, 2100, 2300, 2500, and 2700. For example, the controllable external device described in method 900 can be the controllable external device of method 1300 for which a configuration profile is set. For brevity, these details are not repeated below.

FIGS. 14A-14W illustrate exemplary user interfaces for configuring a source of video data (e.g., a camera), in accordance with some embodiments. The user interfaces in these figures are used to illustrate the processes described below, including the processes in FIGS. 15A-15B.

FIG. 14A illustrates device 600 displaying home user interface 604. Device 600 receives (e.g., detects) user input 1450*a* (e.g., tap) corresponding to selection of add accessory affordance 606. As illustrated in FIG. 14B, in response to receiving user input 1450*a*, device 600 displays prompt 1402 for data (e.g., a code) identifying a new source of video data (e.g., a new camera). As illustrated in FIG. 14B, prompt 1402 directs a user to scan or manually enter a code (e.g., an alphanumeric code or quick response code on a device or packaging of the device that identifies the type of device or the specific device). As illustrated in FIG. 14B, device 600 also activates an image sensor (e.g., camera) on device 600 and displays image 1404 captured by the image sensor that includes a portion of code 1406 for the new source of video data.

As illustrated in FIG. 14C, device 600 receives code 1406 (e.g., code 1406 is automatically identified when the entire code is positioned within the field of view of the image sensor). As illustrated in FIG. 14D, in response to receiving code 1406, device 600 displays user interface 1408 indicating that the new source of video data is being added to the location (123 Main St.).

After the new source of video data is added, device 600 displays a menu for selecting one or more operational states of the source of video data, where the one or more operational states are associated with respective contexts. As illustrated in FIG. 14E, after the new source of video data is added, device 600 displays user interface 1410, which includes a menu with affordances 1412*a*-1412*c* and 1414*a*-1414*c* for selecting two operational states of the source of video data—one operational state for a first context (e.g., when anyone is home) and one operational state for a second context (e.g., when no one is home). In some embodiments, the context(s) are predetermined. As illustrated in FIG. 14E, the operational states and contexts are the same as in user interface 1214 in FIG. 12G. In some embodiments, device 600 provides different operational states and/or contexts than user interface 1214 in FIG. 12G.

As illustrated in FIG. 14F, device 600 receives (e.g., detects) user input 1450*b* (e.g., a tap) corresponding to selection of affordance 1412*b* representing an operational state for the first context and receives (e.g., detects) user input 1450*c* (e.g., a tap) corresponding to selection of affordance 1414*c* representing an operational state for the second context. As illustrated in FIG. 14G, in response to receiving user inputs 1450*b* and 1450*c*, device 600 displays check mark indicators 1416*a* and 1416*b* to indicate that the operational states "STREAM" and "STREAM & RECORD" have been selected for the first context and second context, respectively.

In FIG. 14H, device 600 receives (e.g., detects) user input 1450*d* (e.g., a tap) corresponding to selection of "NEXT" affordance 1418. As illustrated in FIG. 14I, in response to receiving user input 1450*d*, device 600 displays user interface 1420 including a menu for selecting a duration for storing video data from the source of video data.

As illustrated in FIG. 14J, device 600 receives (e.g., detects) user input 1450*e* (e.g., a tap) corresponding to selection of affordance 1422*b* representing a duration of 1 week for storing video data from the source of video data. As illustrated in FIG. 14K, in response to receiving user input 1450*e*, device 600 displays check mark indicator 1424 to indicate that the duration "1 WEEK" has been selected.

As illustrated in FIG. 14L, device 600 receives (e.g., detects) user input 1450*f* (e.g., a tap) corresponding to selection of "NEXT" affordance 1426. As illustrated in FIG. 14M, in response to receiving user input 1450*f*, device 600 displays menu 1428 to confirm that the source of video data will operate according to a selected mode (e.g., "STREAM & RECORD") and that the first context and second context will be based on the location of device 600 relative to an external device (e.g., the user's presence at the location will be determined based on the location of device 600 relative to the external device). In some embodiments, the external device is a hub device (e.g., AppleTV or an iPad). In some embodiments, the hub device stores device or user profiles or sends control instructions (e.g., commands) to the source of video data.

As illustrated in FIG. 14M, device 600 receives (e.g., detects) user input 1450g (e.g., a tap) corresponding to selection of "OK" affordance 1430. In the illustrated embodiment, in response to receiving user input 1450g, device 600 sends instructions to set a configuration profile of the source of video data according to the selected operational state(s) and the selected duration for storing video data from the source of video data in accordance with the first user input and the second user input. In some embodiments, the instructions are sent to an external device other than the source of video data. In some embodiments, the instructions are sent to a hub device (e.g., AppleTV or an iPad). In some embodiments, the hub device stores device or user profiles or sends control instructions (e.g., commands) to the source of video data.

As illustrated in FIG. 14N, in response to receiving user input 1450g, device 600 displays settings user interface 1432, analogous to settings user interface 1204 for the living room camera illustrated in FIG. 12E.

In some embodiments, device 600 provides an option for a user to view information related to available features of the source of video data. As illustrated in FIG. 14O, device 600 displays user interface 1434, with affordance 1436, indicating that information related to available features of the source of video data is available. In some embodiments, device 600 displays user interface 1434 after the new source of video data is added to the profile associated with the location (e.g., after displaying user interface 1408 illustrated in FIG. 14D) or after (e.g., in response to) receiving user input 1450g corresponding to selection of "OK" affordance 1430 (e.g., before displaying settings user interface 1432 illustrated in FIG. 14N). In some embodiments, affordance 1436 is displayed in a pop-up menu.

In some embodiments, user interface 1434 is displayed in accordance with a determination that no other sources of video data are associated with device 600 or an account (e.g., location profile) associated with device 600 (e.g., it is the first camera being added by the user). In some embodiments, user interface 1434 is displayed if new features have become available since the last time a source of video data was associated with the electronic device or an account associated with the electronic device. In some embodiments, user interface 1434 also includes affordance 1438 to bypass display of information related to the available features.

As illustrated in FIG. 14O, device 600 receives (e.g., detects) user input 1450h (e.g., a tap) corresponding to selection of affordance 1436. As illustrated in FIG. 14P, in response to receiving user input 1450h, device 600 displays user interface 1440 for obtaining and/or updating software for one or more sources of video data (e.g., in order to access new of additional features). User interface 1440 includes affordance 1442A for getting software for the camera "HOME CAMERA" and affordance 1442b for updating software for camera "HOUSE CAM." In some embodiments, user interface 1440 and/or affordances 1443A and 1443B are displayed in accordance with a determination that a software update is available for the source of video data (e.g., based on the identifying data). As illustrated in FIG. 14Q, affordance 1444 to bypass updating software is also displayed.

As illustrated in FIG. 14Q, device 600 receives (e.g., detects) user input 1450i (e.g., a tap) corresponding to selection of affordance 1442A. As illustrated in FIG. 14R, in response to receiving user input 1450i, device 600 obtains software for camera "HOME CAMERA."

As illustrated in FIG. 14R, device 600 receives (e.g., detects) user input 1450j (e.g., a tap) corresponding to selection of "NEXT" affordance 1443. As illustrated in FIG. 14S, after the software has been updated, device 600 displays user interface 1446 indicating that the cameras have been updated.

As illustrated in FIG. 14T, device 600 receives (e.g., detects) user input 1450k (e.g., a tap) corresponding to selection of "NEXT" affordance 1448. In response to receiving user input 1450k, device 600 displays information related to available features of the source of video data. As illustrated in FIG. 14U, in response to receiving user input 1450k, device 600 displays user interface 1452, which includes descriptions of the operational modes "OFF", "STREAM", and "STREAM & RECORD".

As illustrated in FIG. 14V, device 600 receives (e.g., detects) user input 1450L (e.g., a tap) corresponding to selection of "CONTINUE" affordance 1454. As illustrated in FIG. 14W, in response to receiving user input 14501, device 600 displays setting user interface 1432.

FIGS. 15A-15B are a flow diagram illustrating a method for configuring a source of video data (e.g., a camera) using an electronic device in accordance with some embodiments. Method 1500 is performed at a device (e.g., 100, 300, 500, or 600) with a display. Some operations in method 1500 are, optionally, combined, the orders of some operations are, optionally, changed, and some operations are, optionally, omitted.

As described below, method 1500 provides an intuitive way for configuring a source of video data (e.g., a camera). The method reduces the cognitive burden on a user for configuring a source of video data (e.g., a camera), thereby creating a more efficient human-machine interface. For battery-operated computing devices, enabling a user to configure a source of video data (e.g., a camera) faster and more efficiently conserves power and increases the time between battery charges.

At block 1502, the device receives data (e.g., 1406) identifying a source of video data (e.g., a newly added camera). In some embodiments, before receiving data identifying the source of video data, the device displays a prompt for the data. In some embodiments, a prompt is displayed for a user to enter a code (e.g., an alphanumeric code) that identifies a type of accessory or a specific device.

At block 1504, the device displays (e.g., after or in response to receiving the data identifying the source of video data) a first user interface (e.g., 1408) including a menu for selecting an operational state of the source of video data, where the operational state is associated with a context (e.g., someone is home, nobody is home, etc.). In some embodiments, the context is predetermined. In some embodiments, the context is that no person is at a location associated with the source of video data or that at least one person is present at the location. In some embodiments, the menu for selecting an operational state of the source of video data includes a plurality of predetermined available operational states (e.g., off, stream, stream & record). In embodiments where the first user interface is displayed automatically in response to receiving the data identifying the source of video data, a user is able to quickly recognize that the configuration process for the source of video data has been initiated. Further, the displaying of the first user interface indicates to the user that the source of video data has been successfully identified by the device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1506, the device detects a first user input (e.g., 1450*b*, 1450*c*) corresponding to a selection of the operational state associated with the context.

At block 1508, the device displays a second user interface (e.g., 1420) including a menu for selecting a duration for storing video data from the source of video data.

At block 1510, the device detects a second user input (e.g., 1450*e*) corresponding to a selection of the duration for storing video data from the source of video data.

Optionally, at block 1512 (e.g., after receiving the data identifying the source of video data), the device displays an affordance (e.g., 1436) indicating that information related to available features of the source of video data is available. In some embodiments, the affordance is displayed in accordance with a determination that no other sources of video data are associated with the electronic device. Optionally, at block 1514, the device detects selection (e.g., 1450*h*) of the affordance. Optionally, at block 1516, the device displays (e.g., in response to detecting selection of the affordance) the information related to available features of the source of video data. In some embodiments, after selection of the operational state associated with the context and the duration for storing video, the affordance is displayed (e.g., on a separate user interface or a pop-up menu) to provide the user with an option to display the information related to the available features. In some embodiments, the affordance is displayed if no other sources of video data are associated with the electronic device or an account associated with the electronic device (e.g., this is the first camera being added by the user). In some embodiments, the affordance is displayed if new features have become available since the last time a source of video data was associated with the electronic device or an account associated with the electronic device. In some embodiments, an affordance to bypass display of the information related to the available features is displayed.

Optionally, at block 1518 (e.g., after receiving the data identifying the source of video data), the device displays an affordance (e.g., 1442*a*, 1442*b*) for updating software of the source of video data. In some embodiments, the affordance is displayed in accordance with a determination that a software update is available for the source of video data (e.g., based on the identifying data). In some embodiments, an affordance (e.g., 1444) to bypass updating the software is displayed.

At block 1520, the device sends instructions to set a configuration profile of the source of video data according to the selected operational state and the selected duration in accordance with the first user input (e.g., 1450*b*, 1450*c*) and the second user input (e.g., 1450*e*). In some embodiments, the instructions are sent to an external device other than the source of video data. In some embodiments, the instructions are sent to a hub device (e.g., Apple TV or an iPad). In some embodiments, the hub device stores device or user profiles or sends control instructions (e.g., commands) to the source of video data.

Optionally, at block 1522 (e.g., after detecting the first user input and the second user input), the device displays a third user interface (e.g., 1432) including an indication of the source of video data and a settings menu associated with the source of video data. In some embodiments, the third user interface includes a graphical representation, a name, or a location associated with the source of video data. In some embodiments, the third user interface includes an affordance for designating the source of video data (e.g., as a favorite accessory). In some embodiments, the third user interface includes an affordance for accessing the menu for selecting an operational state of the source of video data. In some embodiments, the third user interface includes an affordance for accessing the menu for selecting a duration for storing video data from the source of video data.

Note that details of the processes described above with respect to method 1500 (e.g., FIGS. 15A-15B) are also applicable in an analogous manner to the methods described above/below. For example, method 1500 optionally includes one or more of the characteristics of the various methods described above with reference to methods 700, 900, 1100, 1300, 1700, 2100, 2300, 2500, and 2700. For example, the controllable external device described in method 900 can be the source of video data described in method 1500. For brevity, these details are not repeated below.

FIGS. 16A-16I illustrate exemplary user interfaces for managing a storage resource, in accordance with some embodiments. The user interfaces in these figures are used to illustrate the processes described below, including the processes in FIG. 17.

Figure 16A:
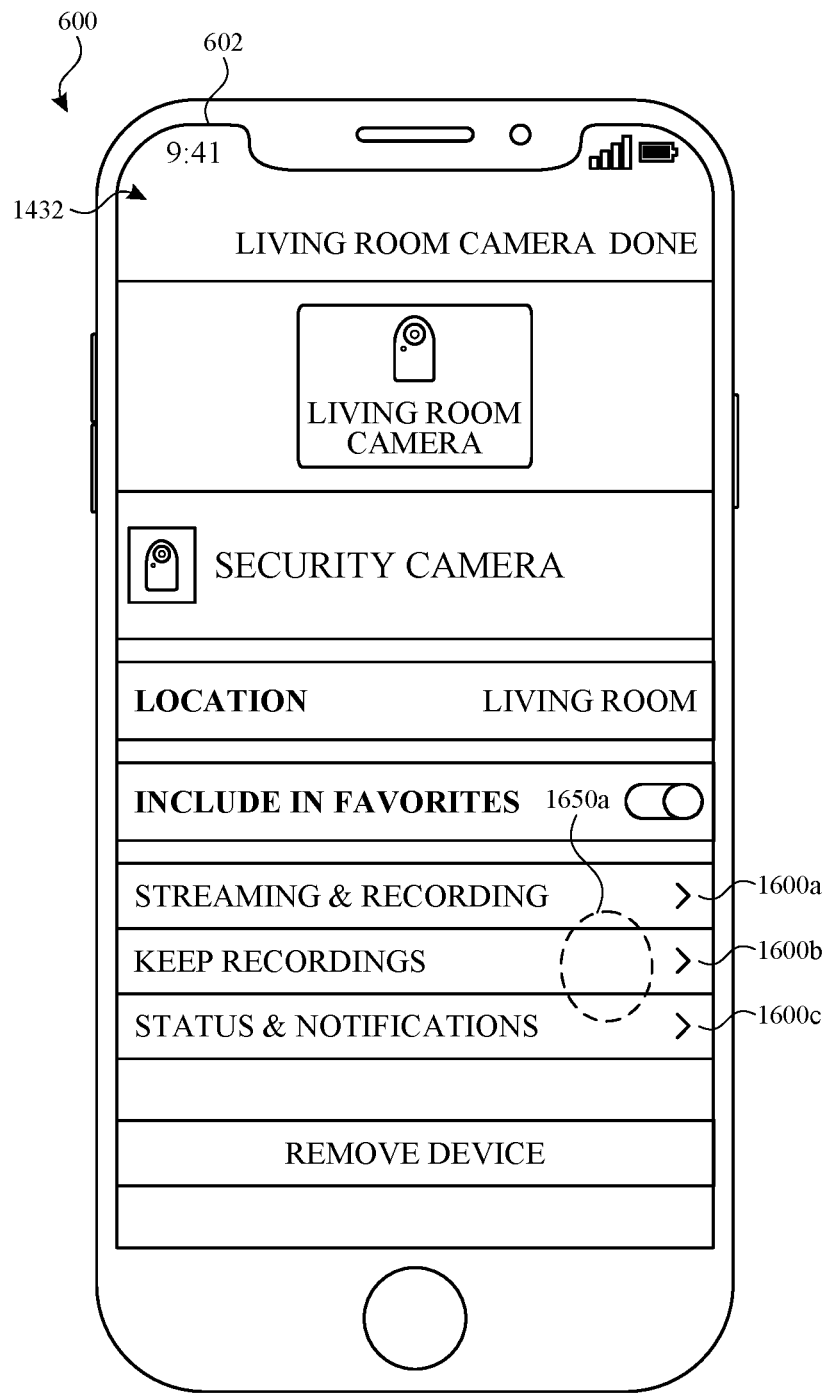
FIGS. 16A-16I illustrate exemplary user interfaces for managing a storage resource in accordance with some embodiments.
Figure 16B:
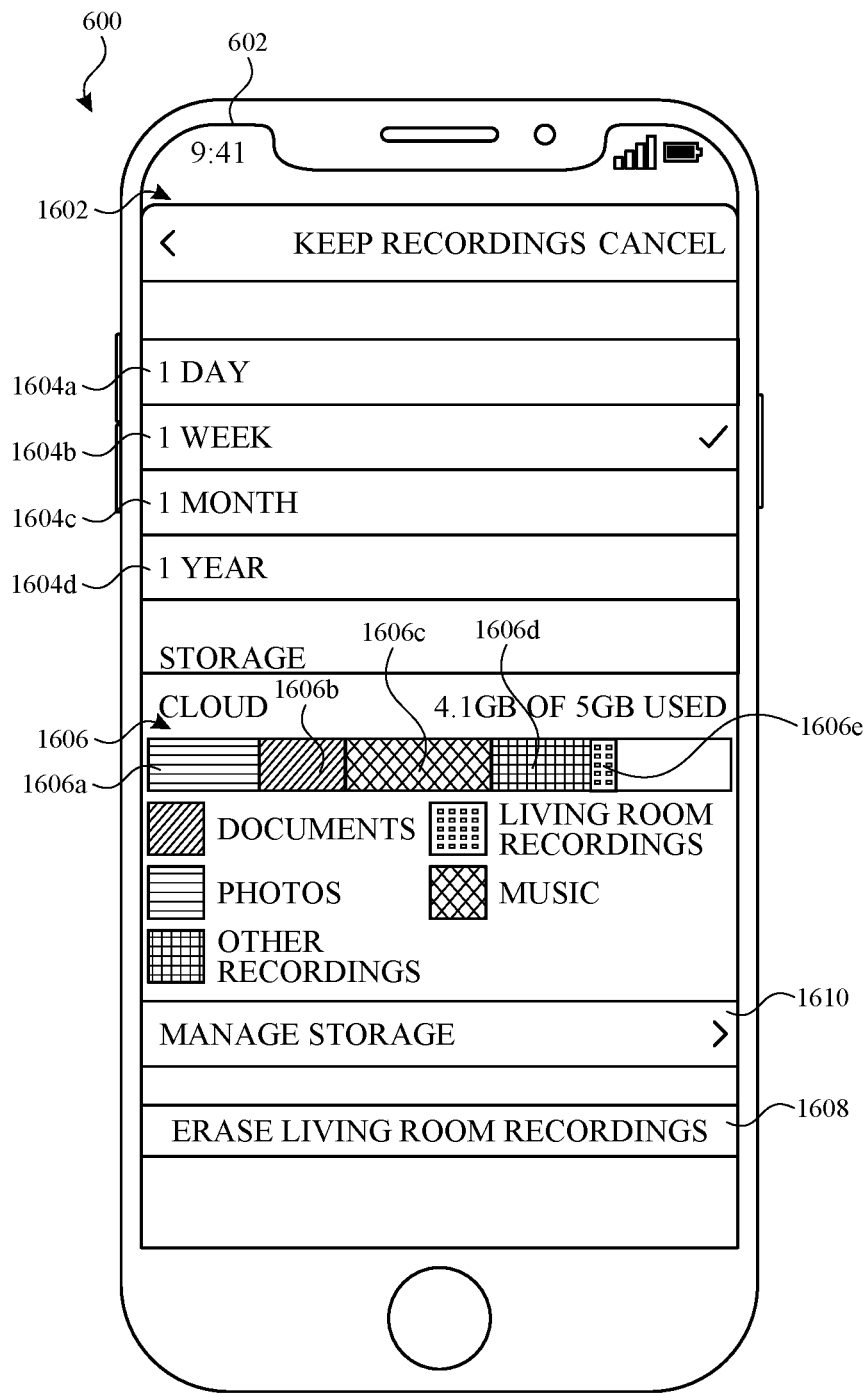

FIG. 16A illustrates device 600 displaying settings user interface 1432 for the living room camera, as also illustrated in FIGS. 14N and 14W. As illustrated in FIG. 16A, device 600 receives (e.g., detects) user input 1650*a* (e.g., a tap) corresponding to selection of affordance 1600B. As illustrated in FIG. 16B, in response to receiving user input 1650*a*, device 600 displays "KEEP RECORDINGS" user interface 1602. User interface 1602 includes affordances 1604*a*-1604*d* that can be selected to set a duration for which recorded video from the living room camera will be stored. In some embodiments, the storage durations are predetermined. In some embodiments, the recordings of video data from the living room camera are deleted (e.g., automatically) after the storage duration has expired.

User interface 1602 also includes storage resource status bar 1606 representing a status of a storage resource. A storage resource can be a physical storage device, storage associated with a user account (e.g., iCloud), or a portion thereof. As illustrated in FIG. 16B, storage resource bar 1606 includes segments 1606*a*-1606*e*, where the size of each segment indicates the portion of the storage resource consumed by particular data (e.g., documents, photos, living room recordings, music, and other recordings). In some embodiments, a segment is associated with a particular device or data type (e.g., video data). For example, segment 1605*e* is a representation of recorded video data from the living room camera that is stored by the storage resource. In some embodiments, a segment represents a total capacity of the storage resource, a total allocated capacity of the storage resource, an available capacity of the storage resource, an amount of the storage resource allocated to video data associated with the source of video data, an amount of the storage resource allocated to a device other than the source of video data, an amount of the storage resource allocated to all devices other than the source of video data, or an amount of the storage resource allocated to types of data other than video data (e.g., documents, applications, etc.).

Figure 16C:
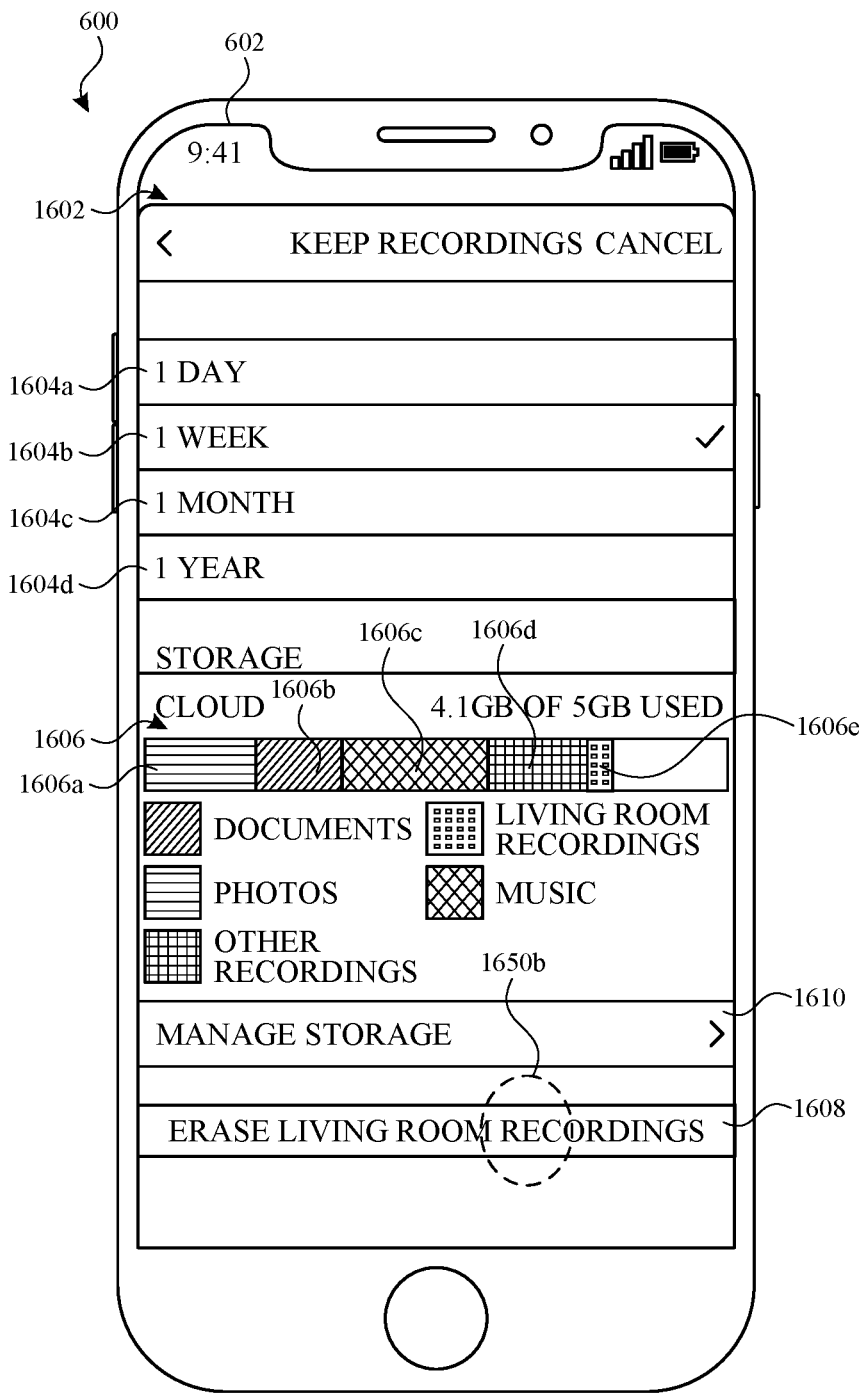
Figure 16D:
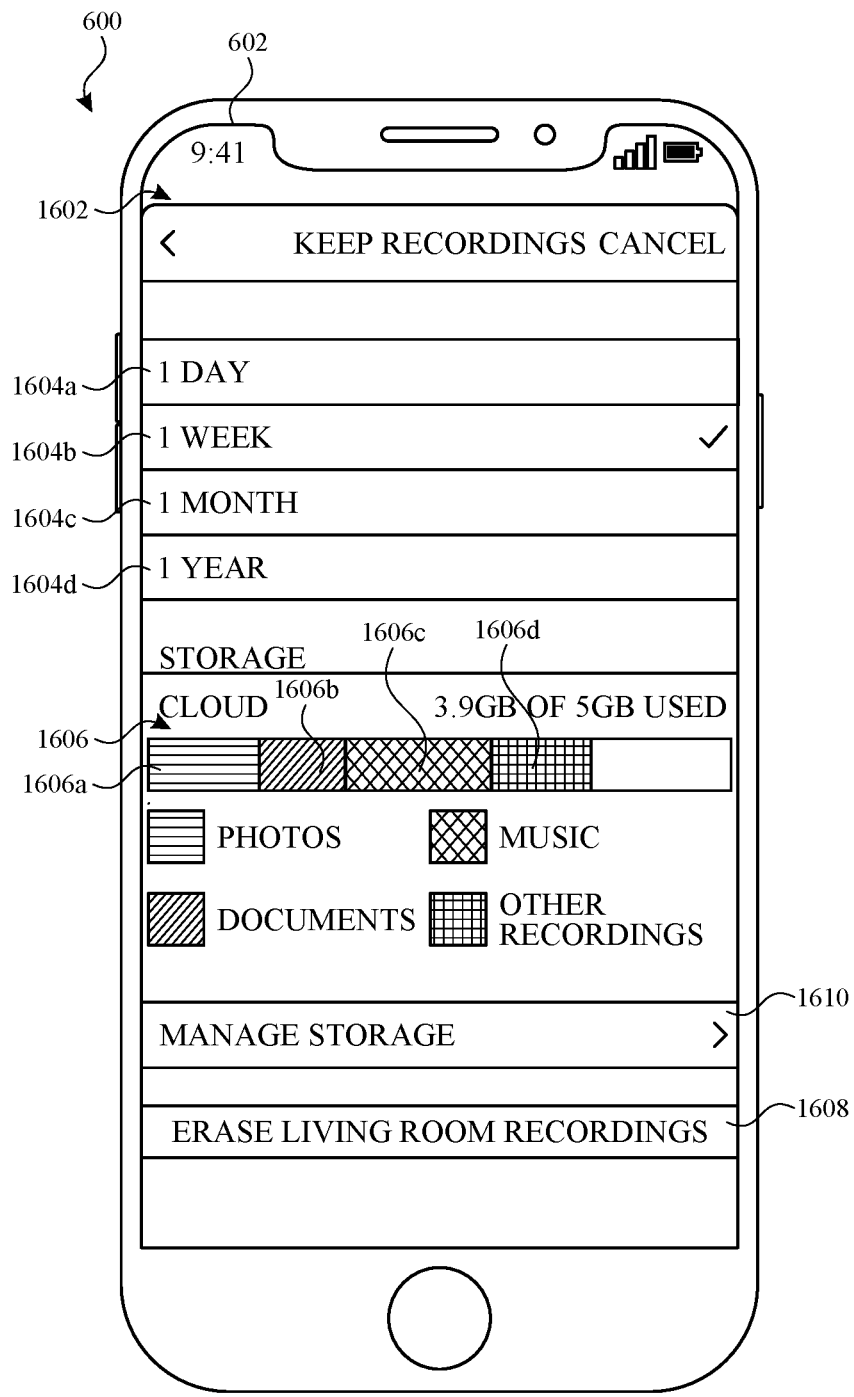

User interface 1602 also includes affordance 1608 for deleting, from the storage resource, data associated with the living room camera. As illustrated in FIG. 16C, device 600 receives (e.g., detects) user input 1650*b* (e.g., a tap) corresponding to selection of affordance 1608. In response to receiving user input 1650*b*, device 600 initiates a process for deleting, from the storage resource, data that corresponds to the living room camera. In some embodiments, initiating the process for deleting data that corresponds to the living room camera includes displaying a confirmation affordance, which when selected, causes the data corresponding to the living room camera to be deleted from the storage resource. As illustrated in FIG. 16D, in response to receiving user input 1650b, the data corresponding to the living room camera is caused to be deleted from the storage resource, and segment 1606e is removed from storage status bar 1606.

Figure 16E:
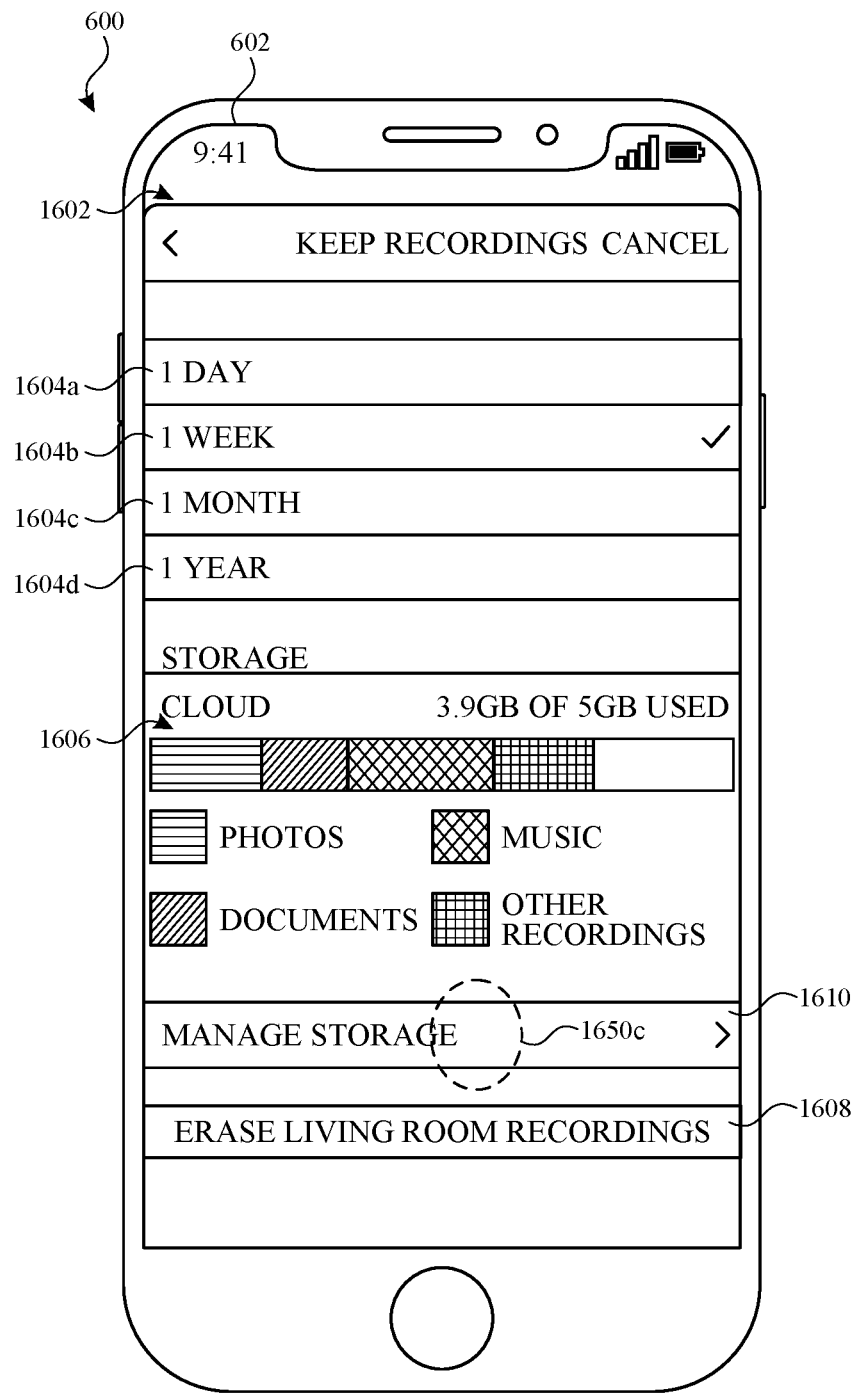
Figure 16F:
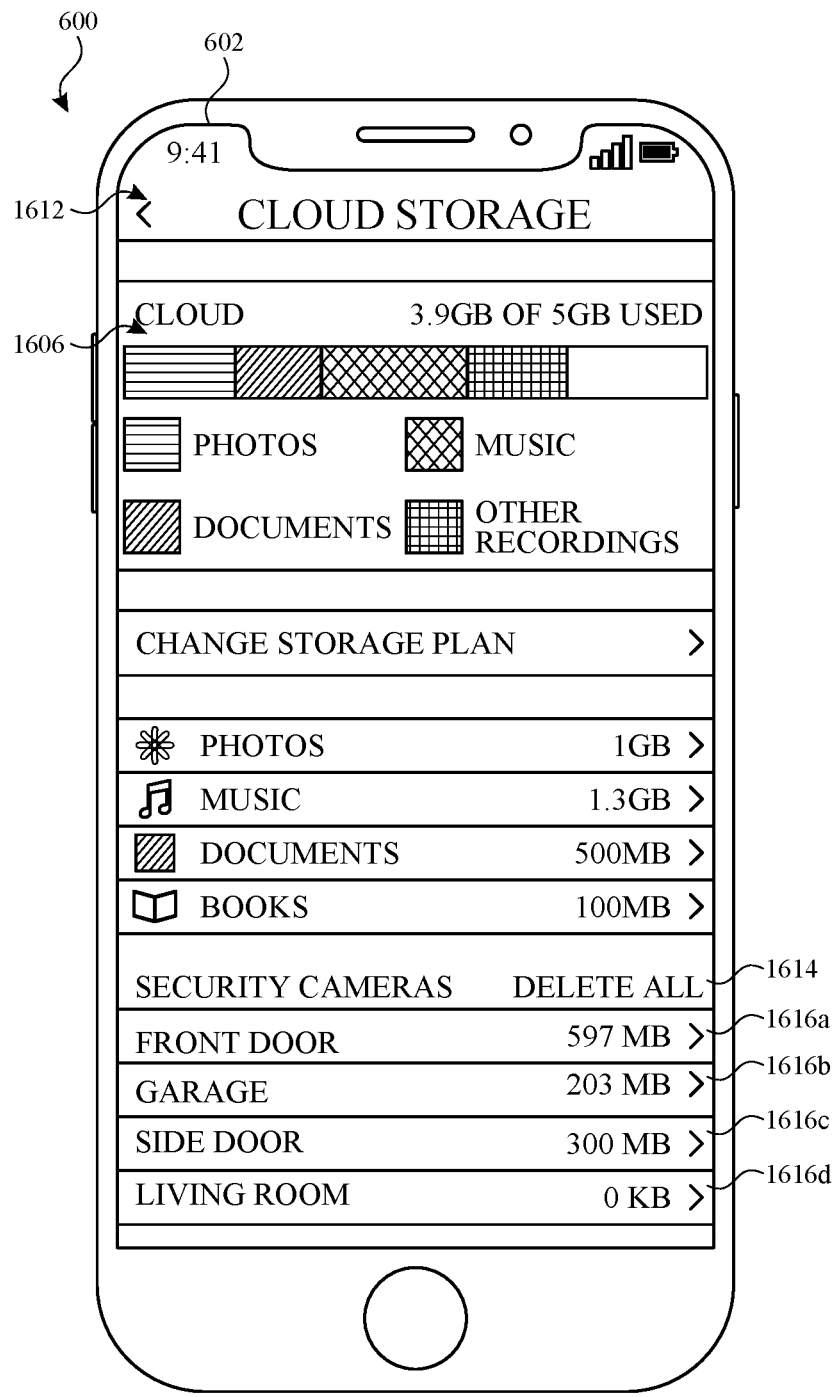

As illustrated in FIG. 16E, device 600 receives (e.g., detects) user input 1650c (e.g., a tap) corresponding to selection of "MANAGE STORAGE" affordance 1610. In response to receiving user input 1650c, device 600 initiates a process for deleting, from the storage resource, data that does not correspond to the living room camera. As illustrated in FIG. 16F, in response to receiving user input 1650c, device 600 displays storage user interface 1612. In some embodiments, storage user interface 1612 is displayed in response to selection of storage resource bar 1606 (e.g., storage resource bar 1606 is or includes an affordance). Storage user interface 1612 includes "DELETE ALL" affordance 1614 for deleting recordings associated with all sources of video data associated with device 600 or an account associated with device 600 (e.g., all cameras associated with the location "123 MAIN ST.").

Figure 16G:
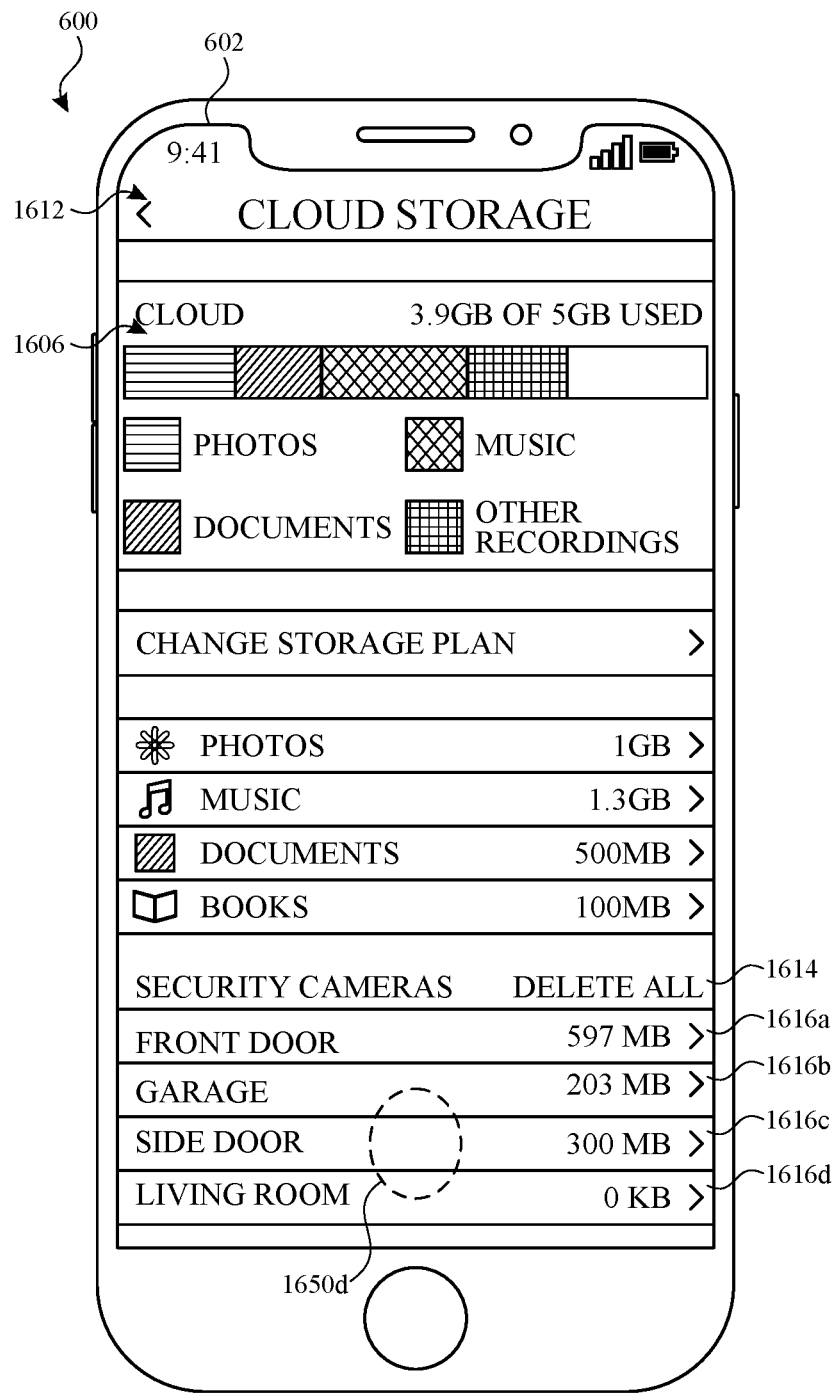
Figure 16H:
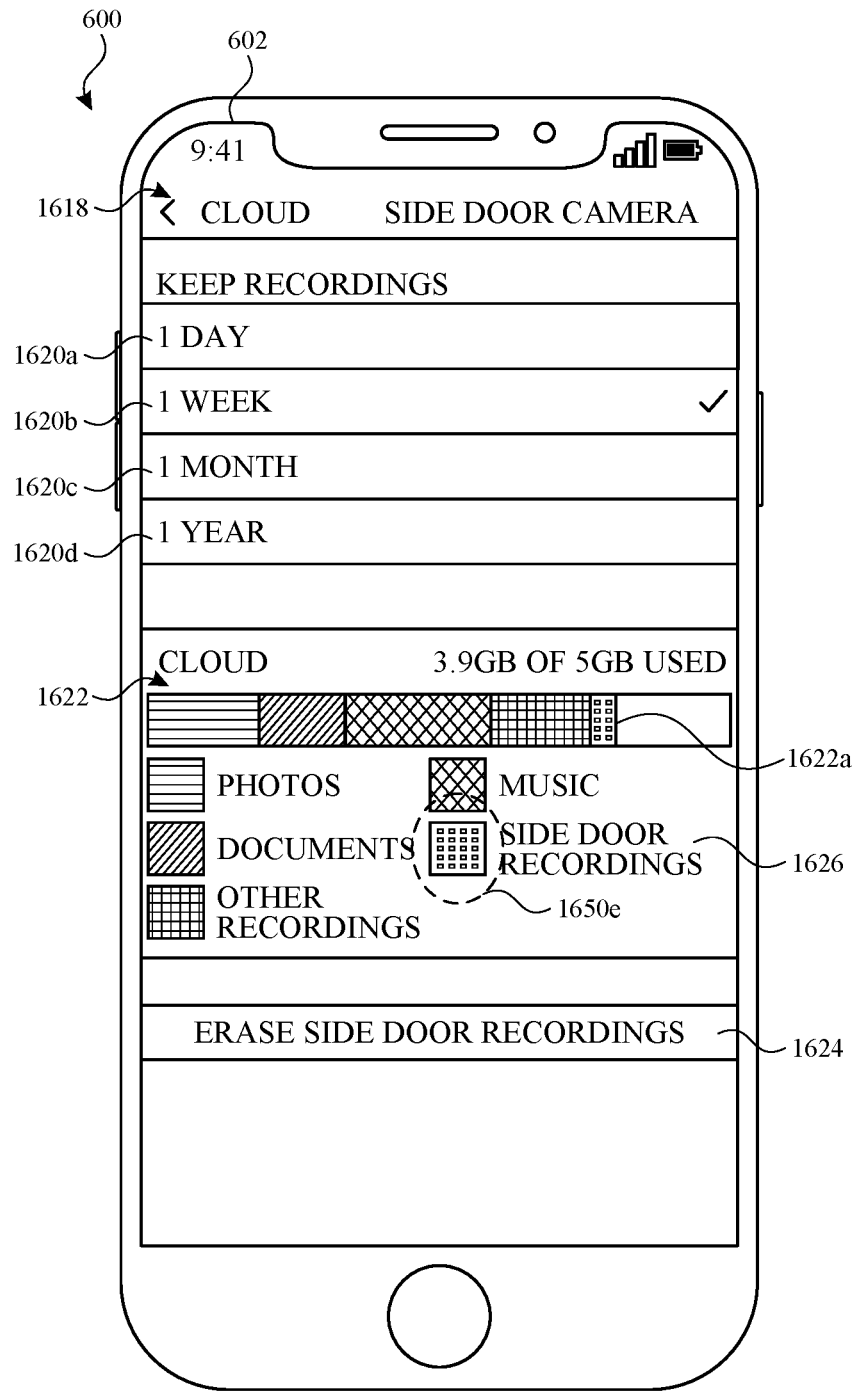

As illustrated in FIG. 16G, storage user interface 1612 includes affordances 1616A-1616D for accessing storage options associated with other sources of video data. As illustrated in FIG. 16G, device 600 receives (e.g., detects) user input 1650d (e.g., a tap) corresponding to selection of affordance 1616C corresponding to a side door camera. As illustrated in FIG. 16H, in response to receiving user input 1650d, device 600 displays storage settings user interface 1618 for the side door camera. Storage settings user interface 1618 includes affordances 1620a-1620d for selecting a storage duration for data associated with the side door camera, storage resource status bar 1622 with segment 1622a representing recordings of video from the side door camera, and an affordance 1624 for deleting from the storage resource the data that corresponds to the side door camera.

Figure 16I:
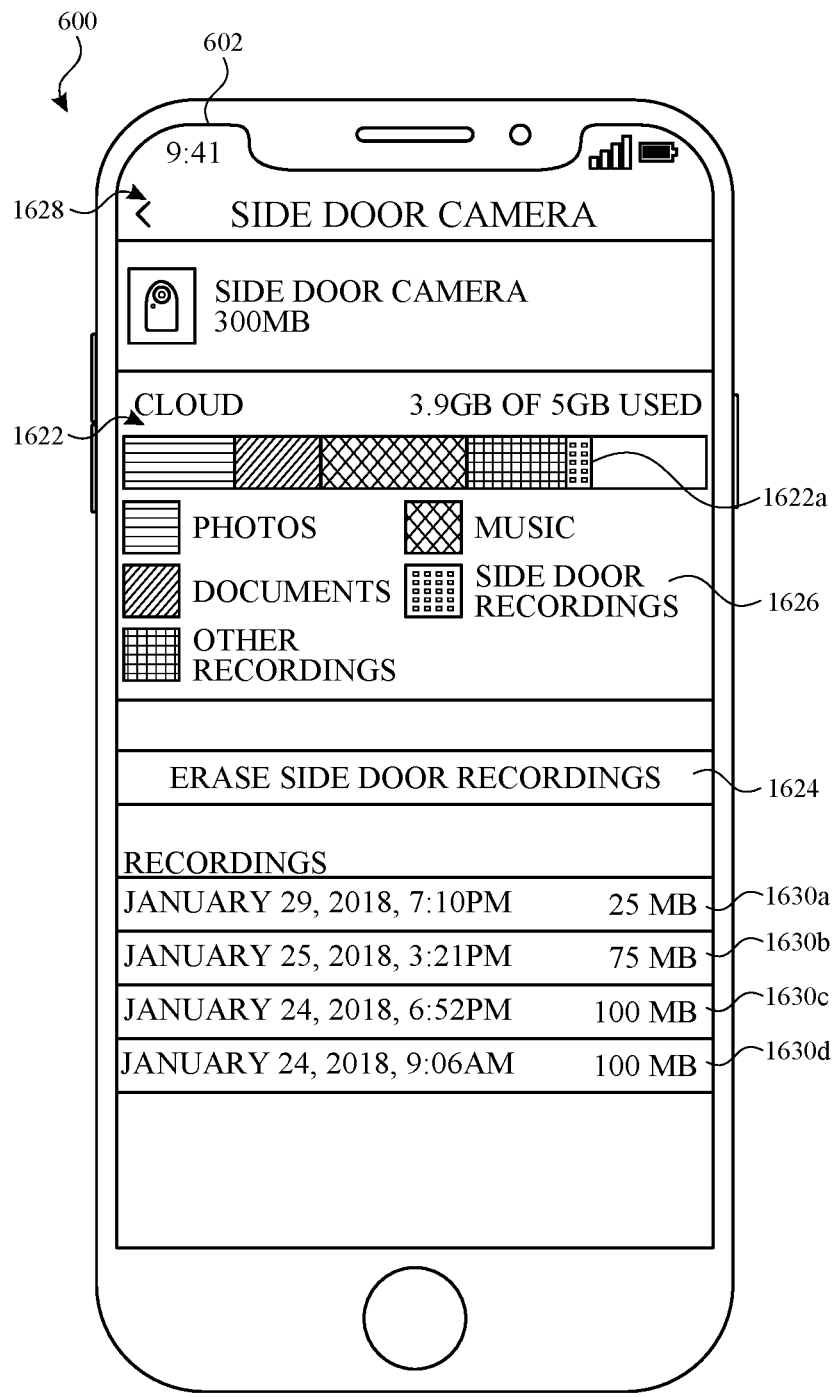

As illustrated in FIG. 16H, device 600 receives (e.g., detects) user input 1650e (e.g., a tap) corresponding to selection of side door recordings affordance 1626. In some embodiments, user input 1650e is located on storage resource status bar 1622 and/or segment 1622a (e.g., storage resource status bar 1622 is or includes an affordance). As illustrated in FIG. 16I, in response to receiving user input 1650e, device 600 displays user interface 1628 including a list of recordings 1630a-1630d of video data from the side door camera.

FIG. 17 is a flow diagram illustrating a method for managing a storage resource using an electronic device in accordance with some embodiments. Method 1700 is performed at a device (e.g., 100, 300, 500, or 600) with a display. Some operations in method 1700 are, optionally, combined, the orders of some operations are, optionally, changed, and some operations are, optionally, omitted.

As described below, method 1700 provides an intuitive way for managing a storage resource. The method reduces the cognitive burden on a user for managing a storage resource, thereby creating a more efficient human-machine interface. For battery-operated computing devices, enabling a user to manage a storage resource faster and more efficiently conserves power and increases the time between battery charges.

At block 1702, the device displays a user interface (e.g., 1602) associated with a source of video data, where the user interface includes a first affordance (e.g., 1606) representing a status of a storage resource and a second affordance (e.g., 1608) for deleting, from the storage resource, data associated with the source of video data, where the first affordance includes a first representation of data stored by the storage resource that corresponds to the source of video data. In some embodiments, the first affordance is a bar with segments, where the size of each segment (e.g., 1606a-1606e) indicates the portion of the storage resource consumed by particular data. A storage resource can be a physical storage device, storage associated with a user account (e.g., iCloud), or a portion thereof. In some embodiments, the data is associated with a particular device or data type (e.g., video data). In some embodiments, the user interface includes a menu for selecting a storage duration for recordings of video data from the source of video data. In some embodiments, the recordings of video data from the source of video data are deleted (e.g., automatically) after the storage duration has expired. In some embodiments, the menu includes a plurality of predetermined storage duration options. In some embodiments, the options include 1 day (e.g., 1604a), 1 week (e.g., 1604b), 1 month (e.g., 1604c), or 1 year (e.g., 1604d). Displaying a user interface with both a representation of a status of the storage resource and a representation of data stored by the storage resource that corresponds to the source of video data provides a user with the ability to quickly discern the impact of the source of video data on the overall storage resource. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first affordance (e.g., 1606) includes a representation of at least one of: a total capacity of the storage resource, a total allocated capacity of the storage resource, an available capacity of the storage resource, an amount of the storage resource allocated to video data associated with the source of video data, an amount of the storage resource allocated to a device other than the source of video data, an amount of the storage resource allocated to all devices other than the source of video data, or an amount of the storage resource allocated to types of data other than video data (e.g., documents, applications, etc.).

At block 1704, the device detects (e.g., while displaying the user interface) a user input (e.g., 1650b, 1650c) on the display (e.g., a tap on the first affordance or the second affordance).

In response to the user input, the device performs the operation of block 1706 or block 1708. At block 1706, in accordance with the first user input (e.g., 1650c) corresponding to selection of the first affordance (e.g., 1610), the device initiates a process for deleting, from the storage resource, data that does not correspond to the source of video data. At block 1708, in accordance with the first user input (e.g., 1650b) corresponding to selection of the second affordance (e.g., 1608), the device initiates a process for deleting, from the storage resource, data that corresponds to the source of video data. In some embodiments, initiating the process for deleting, from the storage resource, data that does not correspond to the source of video data includes displaying an option to delete recordings associated with all sources of video data associated with the electronic device.

In some embodiments, the first affordance (e.g., 1606) includes a representation of data stored by the storage resource that corresponds to a first device other than the source of video data. Optionally, at block 1710 (e.g., further in response to the user input), the device displays a menu (e.g., 1618) for setting storage options associated with the first device in accordance with the first user input corresponding to selection of the representation of data stored by the storage resource that corresponds to the first device. In some embodiments, the menu for setting storage options associated with the first device includes options (e.g., 1620*a*-1620*d*) for storage duration of data associated with the first device or an option (e.g., 1624) to delete from the storage resource the data that corresponds to the first device.

Note that details of the processes described above with respect to method 1700 (e.g., FIG. 17) are also applicable in an analogous manner to the methods described above/below. For example, method 1700 optionally includes one or more of the characteristics of the various methods described above with reference to methods 700, 900, 1100, 1300, 1500, 2100, 2300, 2500, and 2700. For example, the controllable external device described in method 900 can be the source of video data described in method 1100. For brevity, these details are not repeated below.

FIGS. 18A-18D illustrate exemplary user interfaces for setting status and notifications settings, in accordance with some embodiments.

Figure 18A:
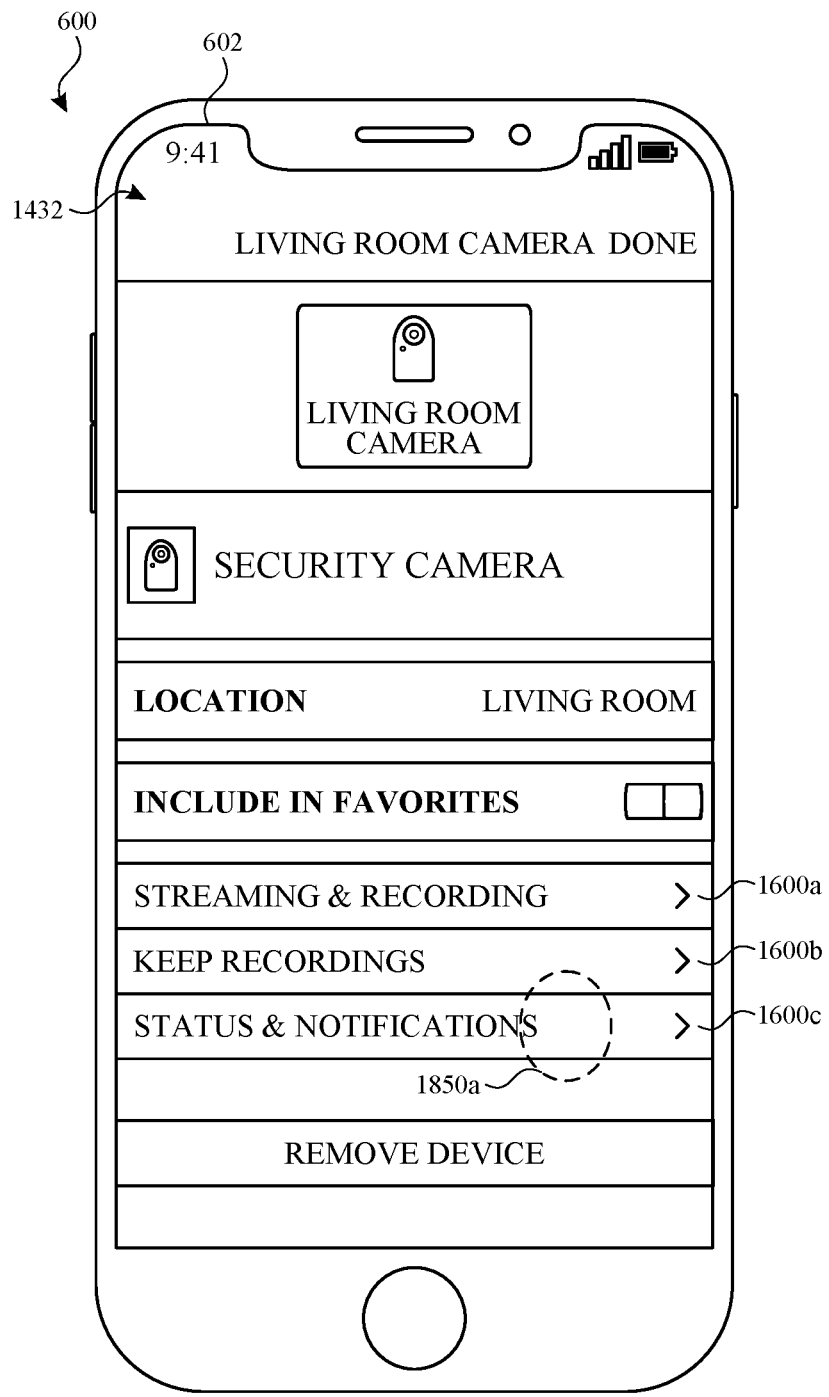
FIGS. 18A-18D illustrate exemplary user interfaces for setting status and notifications settings in accordance with some embodiments.
Figure 18B:
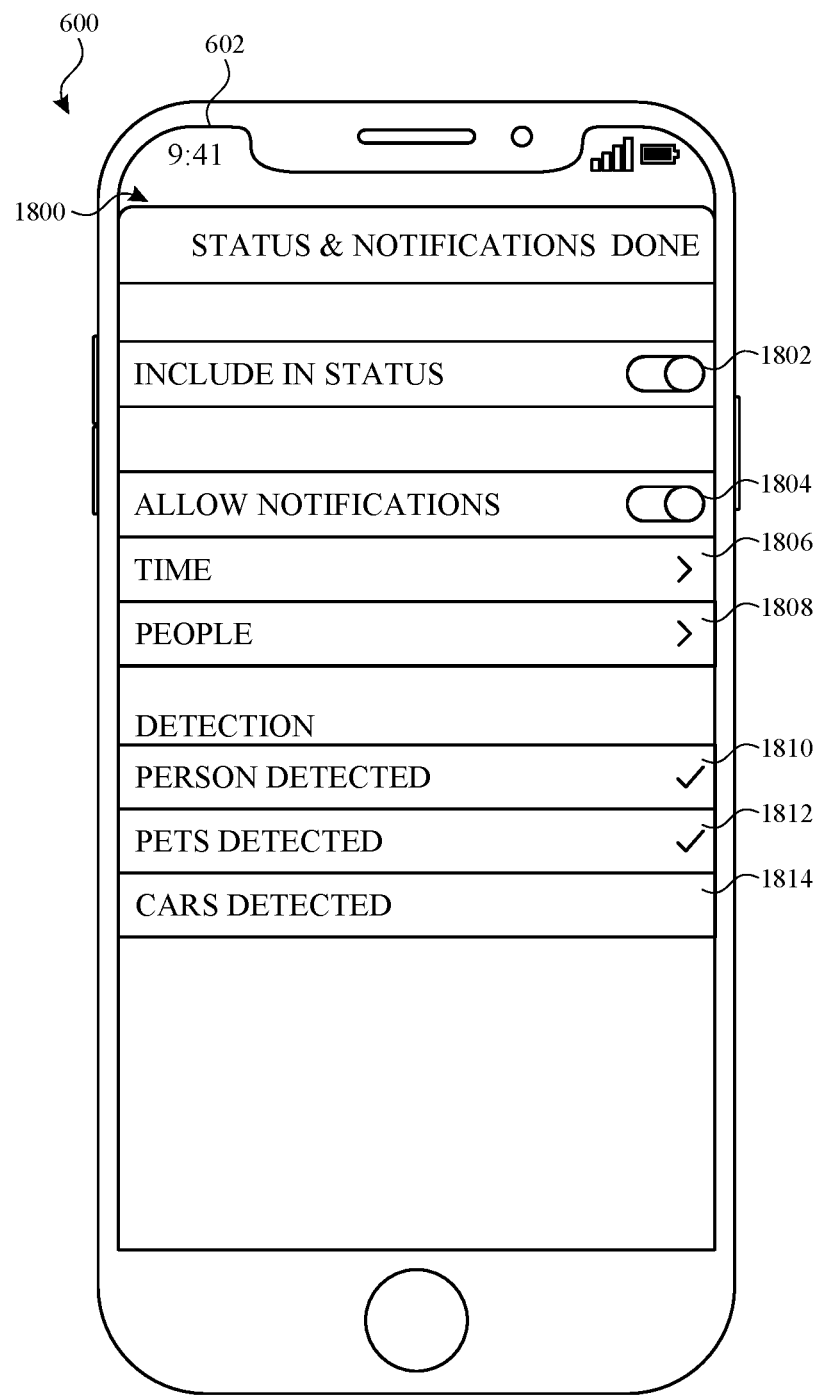

FIG. 18A illustrates device 600 displaying settings user interface 1432 for the living room camera. Device 600 receives (e.g., detects) user input 1850*a* (e.g., a tap) corresponding to selection of affordance 1600*c*, STATUS & NOTIFICATIONS. As illustrated in FIG. 18B, in response to receiving user input 1850*a*, device 600 displays STATUS & NOTIFICATIONS user interface 1800, which includes affordances 1802-1814.

In some embodiments, selection of affordance 1802 toggles the state of a setting that determines whether a representation of the source of video data is included in a status user interface (e.g., the "CAMERAS" portion of home user interface 604).

In some embodiments, selection of affordance 1804 toggles the state of a setting that determines whether notifications related to the source of video data are displayed by device 600 (e.g., a notification that the source of video data has detected motion).

In some embodiments, selection of affordance 1806 causes device 600 to display notifications settings options associated with time (e.g., ranges of time in which notifications related with the source of video data are or are not to be displayed by device 600).

Figure 18C:
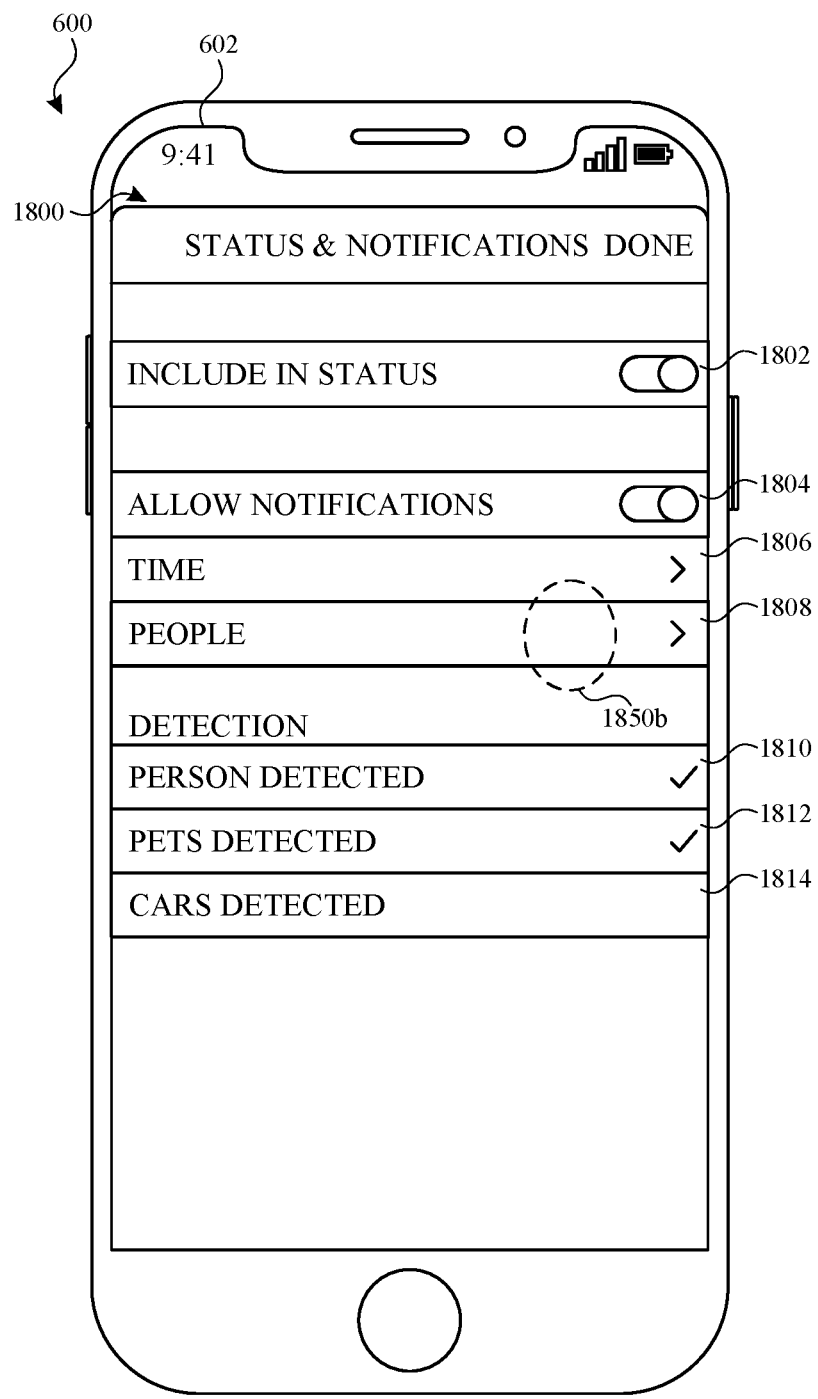
Figure 18D:
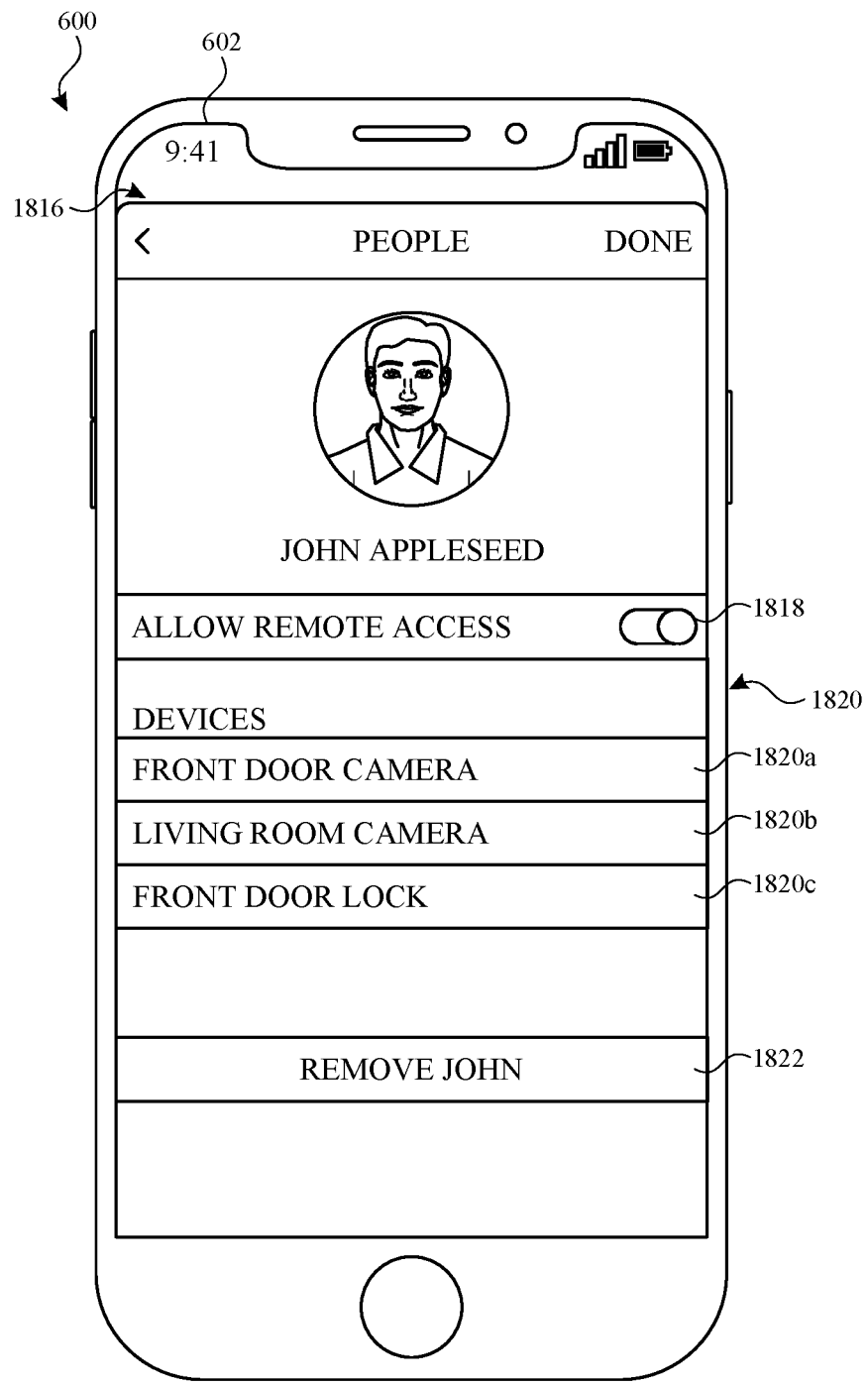

As illustrated in FIG. 18C, device 600 receives (e.g., detects) user input 1850*b* (e.g., a tap) corresponding to selection of affordance 1808 for displaying notifications settings options associated with people. As illustrated in FIG. 18D, in response to receiving user input 1850*b*, device 600 displays people settings user interface 1816 for a user JOHN APPLESEED. People settings user interface 1816 includes affordance 1818 for toggling the state of a setting that determines whether the user is allowed to remotely access or control devices associated with location 123 Main St. People settings user interface 1816 includes list 1820 of devices 1820*a*-1820*c* that the user JOHN APPLESEED is permitted to access remotely (e.g., when the status of "ALLOW REMOTE ACCESS" is "ON" or "YES" (e.g., toggle switch positioned to the right)). In some embodiments, list 1820 represents the devices that user JOHN APPLESEED is permitted to access or control regardless of whether or not he is at the location (e.g., the user JOHN APPLESEED is not permitted to access or control devices that do not appear in list 1820 when he is at the location). In some embodiments, the user JOHN APPLESEED is not permitted to access or control devices that do not appear in list 1820 when he is not at the location. In some embodiments, people setting user interface includes an affordance for adding or removing devices from list 1820. In some embodiments, in response to receiving a sequence of one or more user inputs, device 600 adds or removes devices from list 1820.

In some embodiments, in accordance with the status of "ALLOW REMOTE ACCESS" being "OFF" or "NO" (e.g., toggle switch positioned to the left), the user JOHN APPLESEED is allowed to access or control devices only when he is present at the location (e.g., as determined by the location of a device associated with the user).

In response to receiving (e.g., detecting) selection of affordance 1822, device 600 causes the user JOHN APPLESEED to not be permitted to access or control devices at the location.

FIGS. 19A-19D illustrate exemplary user interfaces for interacting with cameras on wearable device 1900 (e.g., a watch) with a smaller screen and with rotatable input mechanism 1970, in accordance with some embodiments. The user interfaces of FIGS. 19A-19D are used to illustrate the processes described below.

Figure 19A:
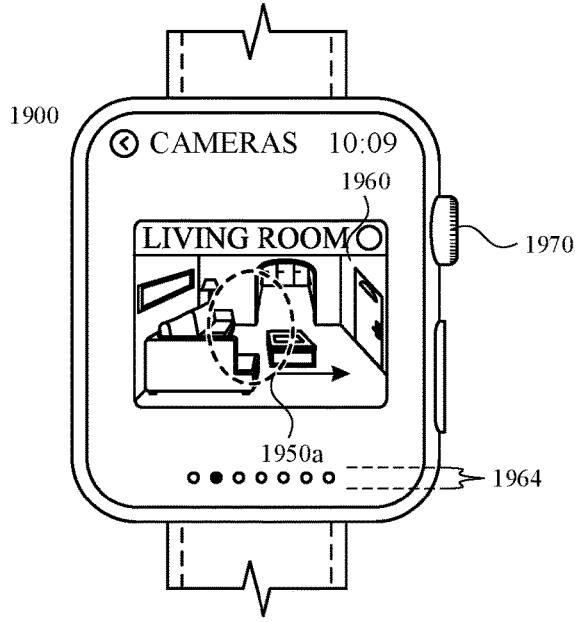
FIGS. 19A-19D illustrate exemplary user interfaces for displaying video from a video source and controlling external devices related to the source in accordance with some embodiments.

In FIG. 19A, wearable device 1900 displays user interface 1960, which includes a display of Camera 3 showing the living room. User interface 1960 of wearable device 1900 is analogous to user interface 610 of device 600, where a user may view recordings or live video feed from a camera and interact with associated accessories (e.g., turn on lights, turn on microphone) of the camera. In some embodiments, an indicator is displayed with the display of the camera to indicate the operational state of the camera (e.g., off, stream, or record). In some embodiments, user interfaces 1960 and 1908 are designed for smaller screens of wearable device 1900. In some embodiments, the indicator includes a color associated with an operational state (e.g., red for the off state, blue for the stream state, green for the record state).

User interface 1960 includes indication 1964 which includes a series of dots, where each dot (or at least two dots) represents a camera that is linked to device 1900. In FIG. 19A, the filled in second dot of indication 1964 indicates device 600 is currently displaying Camera 3, which is the second camera in the list of linked cameras. Device 1900 detects user input including a swipe gesture from left to right or right to left to switch to a different camera displayed in the list of cameras. For example, a user may swipe left to access the third camera in the list of cameras or swipe right to access the first camera in the list of cameras. In some embodiments, device 1900 detects rotation of rotatable input mechanism 1970 to display the next camera in the list of cameras (or rotation in the opposite direction to display the previous camera). In some embodiments, device 1900 displays the next camera in the list of cameras when the detected input from the rotation of rotatable input mechanism 1970 has a rotational velocity that exceeds a non-zero threshold value.

In FIG. 19A, device 1900 detects user input 1950*a* (e.g., a swipe gesture to the right), corresponding to a request to access the first camera (e.g., Camera 1, the front door camera) in the list of cameras.

Figure 19B:
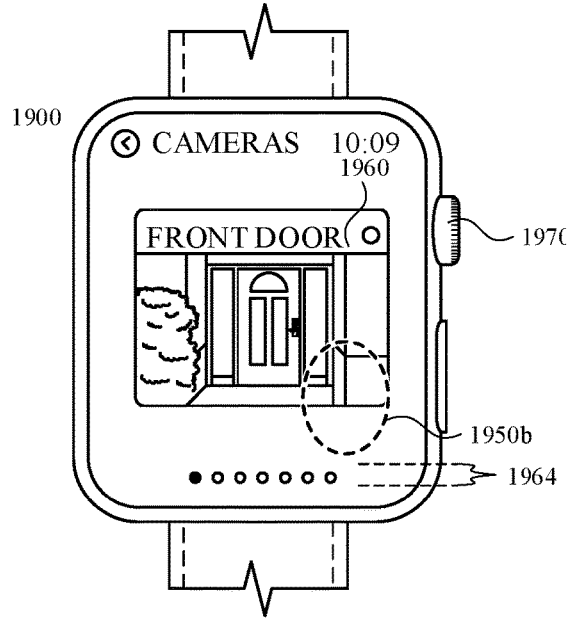

In FIG. 19B, in response to device 1900 detecting a user input 1950*a*, device 1900 displays the first camera in the list (e.g., the front door camera) and updates indication 1964 to include a filled in first dot to show the display of the first camera in the list of cameras. Device 1900 detects user input 1950*b* (e.g., a tap) to select Camera 1.

Figure 19C:
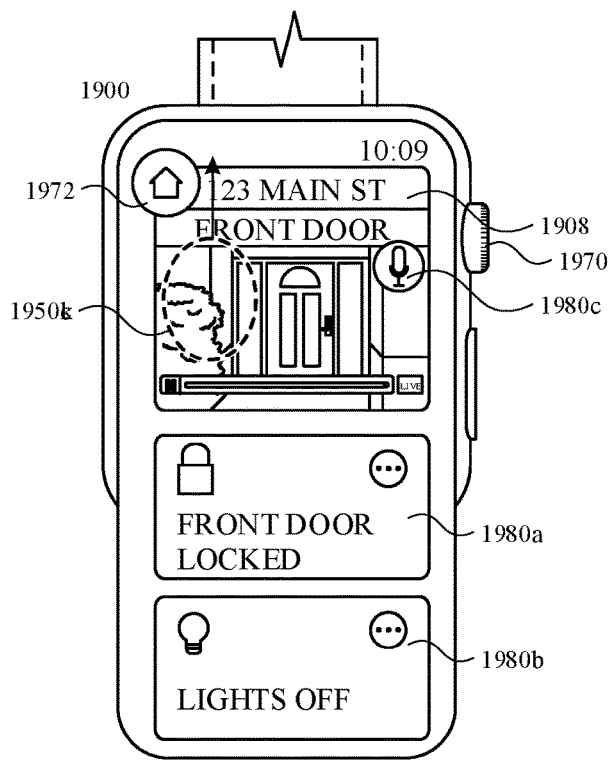

In FIG. 19C, in response to detecting user input 1950b, device 1900 displays video media user interface 1908 that includes a live (e.g., non-recorded, real-time) video feed from Camera 1. In some embodiments, in response to device 1900 detecting a user input on a displayed notification received from Camera 1, the device displays user interface 1908, which includes a video user interface displaying Camera 1. User interface 1908 is analogous to user interface 812 in FIG. 8G, and is further described with respective to FIG. 8G above. In some embodiments, device 1900 detects a user input on the notification. In response to device 1900 detecting a user input on the notification, device 1900 displays video media user interface 1908 which includes a clip of a video recording, as discussed with respect to FIG. 8G. Video media user interface 1908 includes a play/pause button, a scrubber bar, and a home settings button 1972, which allows the user to configure camera settings. Video media user interface 1980 is analogous to video media user interface 608 of FIG. 6B and is further described with respect to FIG. 6B. While displaying video media user interface 1908, device 600 detects user input 1950c (e.g., a vertical swipe gesture up or a detected rotation from rotatable input mechanism 1970) to display affordances 1980a and 1980b. FIG. 19C is illustrated in a manner to enable the reader to better understand the technique. In practice, a portion of the user interface is displayed on the device at a time, and the user can provide inputs (e.g., vertical swipe gesture, rotation of rotatable input mechanism) to cause the user interface to scroll.

In FIG. 19C, user interface element 1980a allows the user to toggle the lock and unlock status of the front door. User interface element 1980b allows the user to toggle the lights on and off. Device 1900 scrolls through user interfaces 1980a-1980b to display a next user interface in the sequence when a swipe gesture (e.g., swiping vertically up and down) or rotation of rotatable input mechanism 1970 is detected.

Figure 19D:
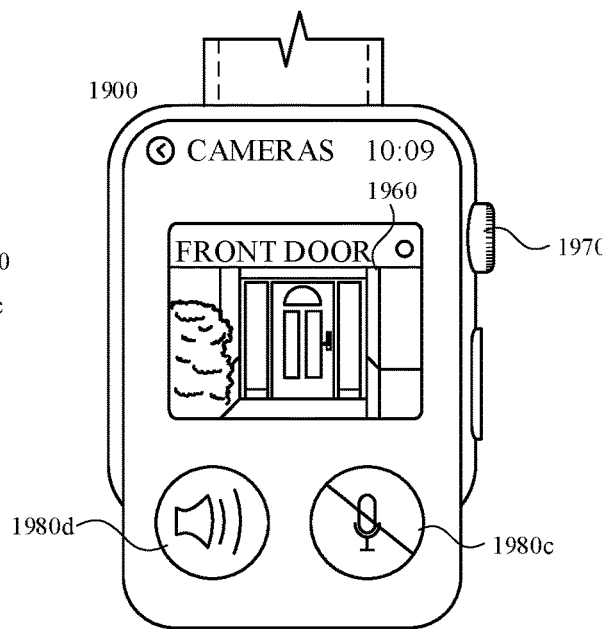

In FIG. 19D, device 1900 displays user interface 1960 with user interface elements 1980c and 1980d in response to detecting user input (e.g., a tap) on user interface 1960 (as illustrated in FIG. 19C). User interface elements 1980c and 1980d provide controls to enable/disable sound and the microphone associated with camera that is streaming video data.

FIGS. 20A-20X illustrate exemplary user interfaces for configuring recording settings based on motion detection conditions for a camera for one or more contexts, in accordance with some embodiments. The user interfaces of FIGS. 20A-20X are used to illustrate the processes described below, including the processes in FIGS. 21A-21C.

FIG. 20A illustrates device 600 displaying user interface 604, which is the same as user interface 604 illustrated in FIG. 6A and FIG. 12A. User interface 604 includes a home settings button 2002 which links to a home settings user interface as discussed below with respect to FIG. 24A. At FIG. 20A, device 600 receives (e.g., detects) user input 2050a (e.g., a tap) to select a displayed living room camera (Camera 3) (e.g., 610c) (as described in further detail with respect to FIG. 12A). As illustrated in FIG. 20B, in response to receiving user input 2050a in FIG. 20A, device 600 displays individual camera user interface 1200 for Camera 3, which is the same as user interface 1200 in FIG. 12D and is described in further detail with respect to FIG. 12D. Individual camera user interface 1200 is analogous to individual camera user interface 608 for the front door camera illustrated in and described with respect to, for example, FIG. 6B. Individual camera user interface 1200 includes settings affordance 1202. As illustrated in FIG. 20B, device 600 detects user input 2050b corresponding to selection of settings affordance 1202.

In FIG. 20C, in response to receiving user input 2050b (as illustrated in FIG. 20B), device 600 displays settings user interface 2004 for Camera 3, which is the analogous to user interface 1204 illustrated in FIG. 12E. Settings user interface 2004 includes graphical representations and affordances that correspond to those illustrated in (and described with respect to) settings user interface 1204 of FIG. 12E. For example, status and notifications affordance 2012 of FIG. 20C has the same or similar functionality as status and notifications affordance 1212 of FIG. 12E. Streaming and recording user interface 2014 of FIG. 20C has similar functionality as streaming and recording user interface 1214 of FIG. 12F. Settings user interface 2004 includes streaming and recording user interface 2014 and status and notifications affordance 1212. Streaming and recording user interface 2014 includes affordances 2016 and 2018 for configuring the operational modes of Camera 3. Status and notifications user affordance 2012 includes settings for configuring when notifications should be sent by Camera 3. Streaming and recording user interface 2014 includes affordance 2016 associated with a first context in which at least one person associated with the location of the source of video data is determined to be present at the location (e.g., any associated person is home), as described above with respect to FIG. 12G. Streaming and recording user interface 2014 also includes affordance 2018 associated with a second context in which no person associated with the location of the source of video data is determined to be present at the location (e.g., no associated person is home). As described above with respect to FIG. 12G, the presence of a person at a location is determined based on detecting that one or more devices associated with that person is at the location. In some embodiments, the first context and the second contexts are predetermined. In some embodiments, the first context and the second context are analogous to the contexts described with respect to FIG. 12G. Each context is associated with one or more camera operational modes (e.g., stream, record, or stream and record), as further discussed below with respective to FIG. 20D. In some embodiments, an operational mode is analogous to an operational state. In some embodiments, the first context and the second context are based on the location of device 600 relative to the camera. In some embodiments, the first context and second context are based on the location of device 600 relative to an external device (e.g., the user's presence at the location will be determined based on the location of device 600 relative to the external device) as describe above with respect to FIG. 12S. In some embodiments, the external device is a hub device (e.g., such as a tablet). In some embodiments, the hub device stores device or user profiles or sends control instructions (e.g., commands) to the source of video data.

As illustrated in FIG. 20C, prior to device 600 detecting user input 2050c, device 600 displays the current operational mode in the first context (e.g. when any associated person is home) is "STREAM" only, which has previously been enabled in affordance 2016. Device 600 detects user input 2050c corresponding to selection of affordance 2016 associated with the first context. In response to receiving user input 2050c, device 600 displays expanded affordance 2016 associated with the first context to concurrently display affordances 2016a-2016c that correspond to operational modes, as illustrated in FIG. 20D.

In FIG. 20D, device 600 displays affordances 2016a-2016c corresponding to respective available operational modes "OFF", "STREAM", and "RECORD" of Camera 3 associated with the first context. Affordances 2016a-2016c are displayed in a menu within affordance 2016. In response to detecting user input 2050c, affordance 2018 remains collapsed, while affordance 2016 is expanded to reveal affordances 2016a-2016c. Similarly, expanding affordance 2018, as illustrated in FIG. 20L, results in the display of affordance 2018 concurrently with affordances 2018a-2018c, corresponding to operational modes. Affordances 2018a-2018c correspond to respective available operational modes "OFF", "STREAM", and "RECORD" of Camera 3 in the second context (e.g., no associated person is home).

As illustrated in FIG. 20D, device 600 detects user input 2050d corresponding to selection of affordance 2016c, which enables the "RECORD" operational mode that was previously disabled. Selection of an operational mode affordance 2016a-2016c and 2018a-2018c toggles the state of the corresponding operational mode, such that a previously disabled operational mode becomes enabled and a previously enabled operational mode becomes disabled.

As illustrated in FIG. 20E, in response to detecting user input 2050d (as illustrated in FIG. 20D), device 600 displays a check mark indicator adjacent to the "RECORD" text in affordance 2016c, indicating that the "RECORD" operational mode is enabled for the first context. A check mark indicator is also displayed next to the "STREAM" text in affordance 2016b indicating that the "STREAM" operational mode is also enabled for the first context. Thus, the user can see which modes are enabled/disabled based on the displayed check mark indicators for the first context (e.g., when home) of Camera 3 and can enable/disable additional modes for the same context for Camera 3. When an operational mode is not enabled, the respective affordance (e.g., 2016a) is displayed without a check mark indicator. Device 600 displays multiple check mark indicators when multiple operational modes (e.g., "STREAM" and "RECORD") are enabled. In response to device 600 detecting user input 2050d, device 600 updates the display of the current operational mode to "STREAM" and "RECORD" for the first context in affordance 2016. Thus, the user can see the current operational mode of Camera 3 for the first context after the selection of the operational mode is applied. In some embodiments, subsequent to (e.g., in response to) detecting user input 2050d, device 600 transmits (e.g., to Camera 3 or a hub that is in communication with Camera 3) information to update the configuration profile of Camera 3 in accordance with the enabled "RECORD" operational mode that was previously disabled. In some embodiments, device 600 transmits (e.g., to Camera 3 or a hub that is in communication with Camera 3) information to update the configuration profile of Camera 3 according to the changes made to the operational modes corresponding to the first context after detecting additional user input on a confirmation affordance (e.g., "X" button 2002a). In some embodiments, the transmitted information includes instructions for updating the configuration profile of Camera 3.

At FIG. 20E, device 600 determines whether the enabled operational modes (e.g., as indicated by 2016a-2016c) in affordance 2016 (of the first context) include the "RECORD" operational mode. In accordance with a determination that the "RECORD" operational mode is not enabled, device 600 does not display recording options affordance 2020. In accordance with a determination that the "RECORD" operational mode is enabled, device 600 displays recording options affordance 2020. While displaying recording options affordance 2020, device 600 detects user input 2050e corresponding to selection of recording options affordance 2020. Thus, device 600 determines whether the selected camera (e.g., Camera 3) has been configured to enable the "RECORD" operational mode for the selected context (e.g., "when home") and, if so, displays an option (e.g., recording options affordance 2020) to configure the recordings settings.

As illustrated in FIG. 20F, in response to detecting user input 2050e (as illustrated in FIG. 20E) on recording options affordance 2020, device 600 displays recording options user interface 2022. Recording options user interface 2022 includes activity detection affordance 2040, duration affordance 2010, cloud storage management affordance 2006, and erase recordings affordance 2008. In some embodiments, recording options user interface 2022 further includes an affordance for local storage management, which allows the user to manage storage of recordings on local flash memory or on additional storage cards (e.g., an SD card) on device 600.

Recording options user interface 2022 includes activity detection affordance 2040, including a menu of motion detection affordances 2030a-2030c. Motion detection affordances 2030a-2030c correspond to motion detection conditions that configure Camera 3 to trigger recording when motion is detected from "People", "Animals", and "Vehicles" respectively. Thus, the motion detection conditions for recording are used to independent configure a corresponding camera to trigger recording when a movement of a person is detected within a field of view of the camera, when a movement of an animal (non-human animal) is detected within a field of view of the camera, and when a movement of a vehicle (e.g., a car, truck, van, motorcycle) is detected within a field of view of the camera. In some embodiments, a motion detection condition is based on the detection of the presence of particular subjects (e.g., specified in a list). For example, affordance 2030a optionally configures Camera 3 to trigger recording when specific people are detected in the room (e.g., JOHN APPLESEED). Similarly, affordance 2030b optionally configures Camera 3 to trigger recording when specific animals (e.g., cat or dog) or vehicles (e.g., based on license plate) are determined to be present in the field of view of the camera. In FIG. 20F, device 600 displays a check mark indicator next to motion detection condition "Animals," that has previously been (and currently is) enabled. In some embodiments, when one or more motion detection conditions are enabled, activity detection affordance 2040 is toggled to an enabled state. In some embodiments, when no motion detection conditions are enabled, activity detection affordance 2040 is toggled to a disabled state.

In FIG. 20G, while device 600 is displaying the motion detection affordances 2030a-2030c, device 600 detects user input 2050f to select motion detection affordance 2030a, which enables the corresponding "People" motion detection condition that was previously disabled. Selection of a motion detection affordance 2030a-2030c toggles the state of the corresponding motion detection condition, such that a previously disabled motion detection condition is now enabled and a previously enabled operational mode is now disabled. In response to detecting user input 2050f, device 600 displays a check mark indicator adjacent to the "People" text, indicating that the "People" motion detection condition is enabled, as illustrated in FIG. 20H. In addition, a check mark indicator remains displayed next to the "Animals" text, which indicates the condition was previously enabled. Motion detection conditions that are not enabled are not displayed with check mark indicators. In some embodiments, device 600 displays multiple check mark indicators next to the corresponding enabled motion detection conditions when multiple motion detection conditions are enabled. In some embodiments, subsequent to (e.g., in response to) detecting user input 2050*f*, device 600 transmits information (e.g., to Camera 3 or a hub that is in communication with Camera 3) to update the configuration profile of Camera 3 in accordance with the enabled motion detection condition for "People" that was previously disabled. In some embodiments, device 600 transmits information (e.g., to Camera 3 or a hub that is in communication with Camera 3) to update the configuration profile of Camera 3 according to the changes made to the motion detection conditions corresponding to the "RECORD" operational mode of the first context after detecting additional user input on a confirmation affordance (e.g., "X" button 2002*a* or "back" button 2002*b*).

FIG. 20H illustrates device 600 detecting user input 2050*g* on activity detection affordance 2040 to disable (e.g., toggle off) activity detection such that motion detection (for any of People, Animals, Vehicles) is not used to trigger recording on Camera 3. In FIG. 20I, in response to device 600 detecting user input 2050*g* (as illustrated in FIG. 20H), device 600 ceases display of motion detection affordances 2030*a*-2030*c*, while activity detection affordance 2040 is displayed in the disabled state. Duration affordance 2010, cloud storage affordance 2006 and erase recording affordance 2008 remain displayed. In response to device 600 detecting user input 2050*g* (as illustrated in FIG. 20H), recording triggered by motion detection conditions is disabled. In some embodiments, subsequent to (e.g., in response to) device 600 receiving user input 2050*g*, device 600 transmits information (e.g., to Camera 3 or a hub that is in communication with Camera 3) to update the configuration profile of Camera 3 in accordance with detected user input 2050*g* to disable all motion detection conditions for triggering recording. In some embodiments, device 600 transmits information (e.g., to Camera 3 or a hub that is in communication with Camera 3) to update the configuration profile of Camera 3 according to the disabled motion detection settings in the first context after detecting additional user input on a confirmation affordance (e.g., "X" button 2002*a* or back button 2002*b*).

In FIG. 20I, device 600 detects user input 2050*h* to enable activity detection, which was previously disabled by user input 2050*g* (as illustrated in FIG. 20H). In FIG. 20J, in response to device 600 detecting user input 2050*h* (as illustrated in FIG. 20I), device 600 displays activity detection affordance 2040 concurrently with motion detection affordances 2030*a*-2030*c*, where motion detection affordances 2030-2030*c* are automatically enabled without additional user input. Check mark indicators are displayed next to each of the displayed motion detection conditions to indicate that each of the motion detection conditions is enabled. In some embodiments, enabling activity detection affordance 2040 enables all motion detection conditions and disabling activity detection affordance 2040 disables all motion detection conditions. In response to device 600 detecting user input 2050*h* (as illustrated in FIG. 20I), recording triggered by motion detection conditions is enabled. In some embodiments, subsequent to (e.g., in response to) device 600 receiving user input 2050*h*, device 600 transmits information to update the configuration profile of Camera 3 in accordance with the enabled motion detection conditions that were previously disabled. In some embodiments, device 600 transmits information (e.g., to Camera 3 or a hub that is in communication with Camera 3) to update the configuration profile of Camera 3 according to the changes made to the motion detection conditions corresponding to the "RECORD" operational mode of the first context after detecting additional user input on a confirmation affordance (e.g., "X" button 2002*a* or back button 2002*b*).

As illustrated in FIG. 20K, prior to device 600 detecting user input 2050*i*, device 600 displays that the current operational mode for the second context (e.g., when away) is "STREAM" when the "STREAM" operational mode is enabled in the second context (e.g., when no associated person is home) as illustrated in affordance 2018. Device 600 detects user input 2050*i* corresponding to a selection of affordance 2018 associated with the second context (e.g., when no associated person is home). In response to receiving user input 2050*i*, device 600 displays expanded affordance 2018 associated with the second context to concurrently display affordances 2018*a*-2018*c* that correspond to operational modes, as illustrated in FIG. 20L. In some embodiments, the operational modes associated with the second context are the same as (correspond to) the operational modes associated with the first context, though the operational modes are configured independently for each context. In some embodiments, the operational modes of the second context are different than the operational modes of the first context. In some embodiments, Camera 3 is turned off in the second context (e.g., check mark next to OFF 2018*a*) (e.g., not recording, not triggered for recording, not available for streaming), when no one is home.

In FIG. 20L, in response to receiving user input 2050*i* (as illustrated in FIG. 20K), device 600 displays expanded affordance 2018 associated with the second context to concurrently display operational modes corresponding to affordances 2018*a*-2018*c*. Affordances 2018*a*-2018*c* correspond to respective available operational modes "OFF", "STREAM", and "RECORD" of Camera 3 in the second context (e.g., no associated person is home). Affordances 2018*a*-2018*c* are displayed in a menu within affordance 2018. In response to detecting user input 2050*i* (at FIG. 20K), affordance 2016 remains collapsed while affordance 2018 is expanded, as illustrated in FIG. 20L. Expanding affordance 2018, as illustrated in FIG. 20L results in the display of affordance 2018 concurrently with affordances 2018*a*-2018*c* corresponding to operational modes in the second context.

In FIG. 20L, device 600 detects user input 2050*j* corresponding to selection of affordance 2018*c*, which enables the "RECORD" operational mode that was previously disabled. As illustrated in FIG. 20M, in response to detecting user input 2050*j* (as illustrated in FIG. 20L), device 600 displays the respective affordance 2018*c* with a check mark indicator adjacent to the "RECORD" text, indicating that the "RECORD" operational mode is enabled. A check mark indicator is displayed next to the "STREAM" operational mode which was previously enabled. In some embodiments, selecting the "OFF" operational mode disables any other selected operational modes (e.g., "STREAM" or "RECORD" operational modes). In response to device 600 detecting user input 2050*j*, device 600 updates the display of the current operational mode to "STREAM" and "RECORD" for the second context in affordance 2018. Thus, the user can see the current operational mode of Camera 3 for the second context after the selection of the operational mode is applied. In some embodiments, subsequent to (e.g., in response to) detecting user input 2050*j*, device 600 transmits information (e.g., to Camera 3 or a hub that is in communication with Camera 3) to update the configuration profile of Camera 3 in accordance with the enabled "RECORD" operational mode that was previously disabled. In some embodiments, device 600 transmits information (e.g., to Camera 3 or a hub that is in communication with Camera 3) to update the configuration profile of Camera 3 according to the changes made to the operational modes corresponding to the second context after detecting additional user input on a confirmation affordance (e.g., "X" button 2002a).

In FIG. 20M, device 600 determines whether the enabled operational modes (e.g., 2018a-2018c) in affordance 2016 include the "RECORD" operational mode. In accordance with a determination that the "RECORD" operational mode is enabled, device 600 displays recording options affordance 2020, as illustrated in FIG. 20M. In this example, input 2050j (at FIG. 20L) enabled the "RECORD" operational mode, thereby causing display of recording options affordance 2020. While displaying recording options affordance 2020, device 600 detects user input 2050k corresponding to selection of recording options affordance 2020.

As illustrated in FIG. 20N, in response to device 600 detecting user input 2050k (as illustrated in FIG. 20M) of recording options affordance 2020, device 600 displays recording options user interface 2022, which is the same user interface as discussed above with respect to FIG. 20F. Device 600 detects user input 2050l corresponding to a selection of affordance 2030a, corresponding to the motion detection condition when motion is detected from "People". As discussed above with respect to FIG. 20F, in response to detecting user input 2050l, device 600 displays a check mark indicator adjacent to the "People" text, indicating that the "People" motion detection condition is enabled. In addition, previously enabled "Vehicle" motion detection condition remains checked as indicated by the displayed check mark indicator at affordance 2030c. In some embodiments, subsequent to (e.g., in response to) detecting user input 2050l, device 600 transmits information (e.g., to Camera 3 or a hub that is in communication with Camera 3) to update the configuration profile of Camera 3 in accordance with the enabled "People" motion detection condition that was previously disabled in the second context. In some embodiments, device 600 transmits information (e.g., to Camera 3 or a hub that is in communication with Camera 3) to update the configuration profile of Camera 3 according to the changes made to the motion detection conditions corresponding to the "RECORD" operational mode of the second context after detecting additional user input on a confirmation affordance (e.g., "X" button 2002a or back button 2002b).

As discussed above, the operational modes and recording settings for the first context (e.g., when home) and the second context (e.g., when away) are configured independently from each other. For example, FIG. 20H illustrates device 600 transmitting information to update the configuration profile of Camera 3 to "STREAM" and "RECORD" operational modes and to trigger recording based on motion detected from "People" and "Animals" in the first context, without modifying the settings for the second context. In contrast, FIG. 20N illustrates device 600 transmitting information to update the configuration profile of Camera 3 to the "STREAM" and "RECORD" operational modes and to trigger recording based on motion detected from "People" and "Vehicles" in the second context, without modifying the settings for the first context.

FIG. 20O illustrates device 600 detecting user input 2050m corresponding to selection of duration affordance 2010. Duration affordance 2010 corresponds an affordance in which the user can select a duration for keeping the recorded video data in cloud storage as illustrated in FIG. 14H. In FIG. 20P, in response to device 600 detecting user input 2050n (as illustrated in FIG. 20O), device 600 displays expanded duration affordance 2010 to concurrently display affordances 2010a-2010d corresponding to predetermined durations in which the recorded video data for Camera 3 should be retained in cloud storage. In some embodiments, each of affordances 2010a-2010d correspond to differing time periods. In some embodiments, affordance 2010a corresponds to 1 day, affordance 2010b corresponds to 1 week, affordance 2010c corresponds to 1 month and affordance 210d corresponds to 1 year. In some embodiments, affordances 2010a-2010d are sorted in order of increasing duration. In some embodiments, affordances 2010a-2010d are sorted in order of decreasing duration. In some embodiments, affordances 2010a-2010d correspond to custom durations. In some embodiments, affordances 2010a-2010d correspond to predetermined durations.

FIG. 20P illustrates device 600 detecting user input 2050n corresponding to selection of affordance 2010c, which is a 1 month duration. In response to detecting selection of user input 2050n, device 600 displays a check mark indicator next to the selected duration of 1 month, as illustrated in FIG. 20P. Selection of a duration affordance 2010a-2010d toggles the state of the corresponding duration, such that a previously disabled duration becomes enabled and a previously enabled duration is disabled. Only one duration can be enabled at a time. Thus, selection of 1 month duration affordance 2010c results in a previously selected duration of 1 day being disabled. In some embodiments, in response to detecting user input 2050n, device 600 transmits information (e.g., to a server or a hub that is storing the recorded data that is in communication with Camera 3) in accordance with the enabled duration for storing the recorded video data (of Camera 3) that was previously disabled. In some embodiments, the duration for storing video data of Camera 3 is configured without changing the duration for which other cameras store recorded video data. In some embodiments, device 600 transmits information (e.g., to a server or a hub that is storing the recorded data that is in communication with Camera 3) to update the configuration profile of Camera 3 according to the changes made to the duration for storing the recorded video data after detecting additional user input on a confirmation affordance (e.g., "X" button 2002a or back button 2002b).

Figure 22A:
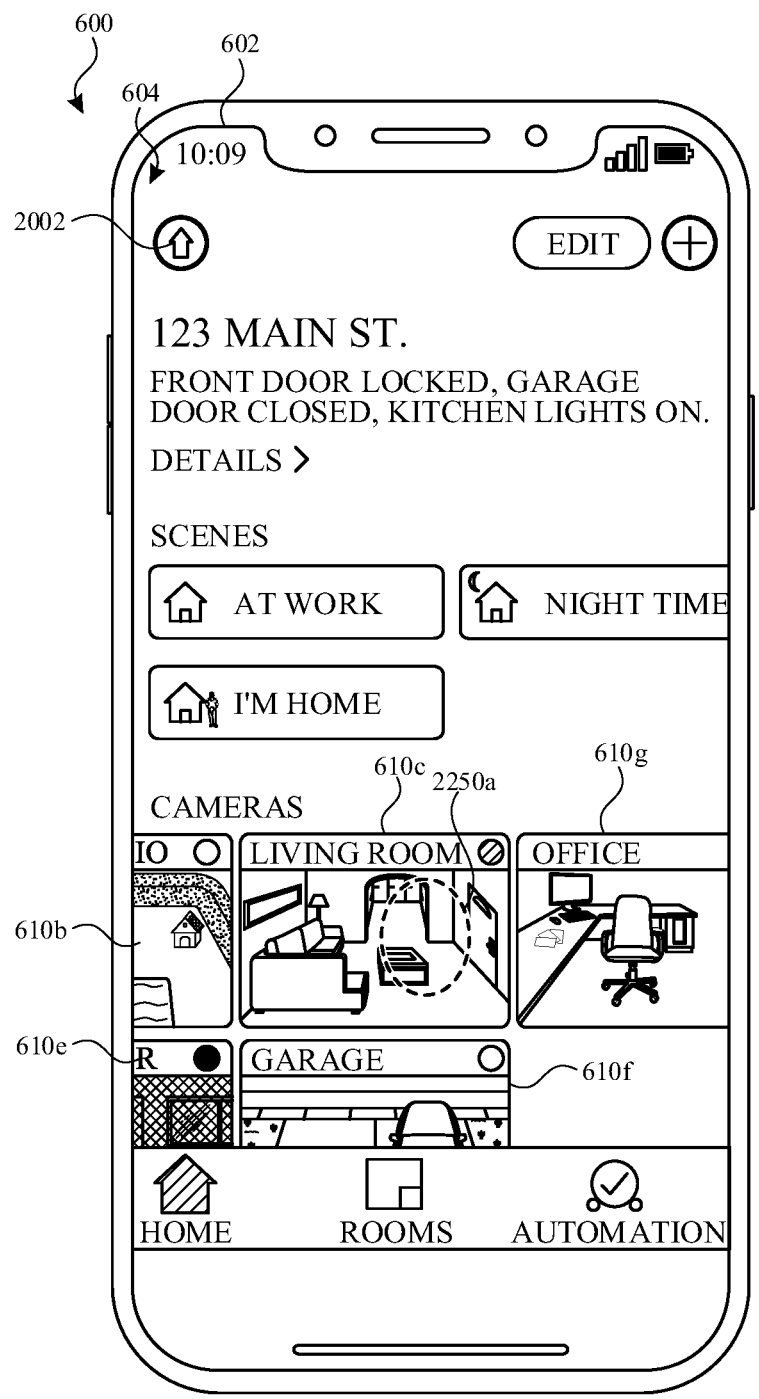
FIGS. 22A-22H illustrate exemplary user interfaces for configuring notifications settings in accordance with some embodiments.
Figure 22B:
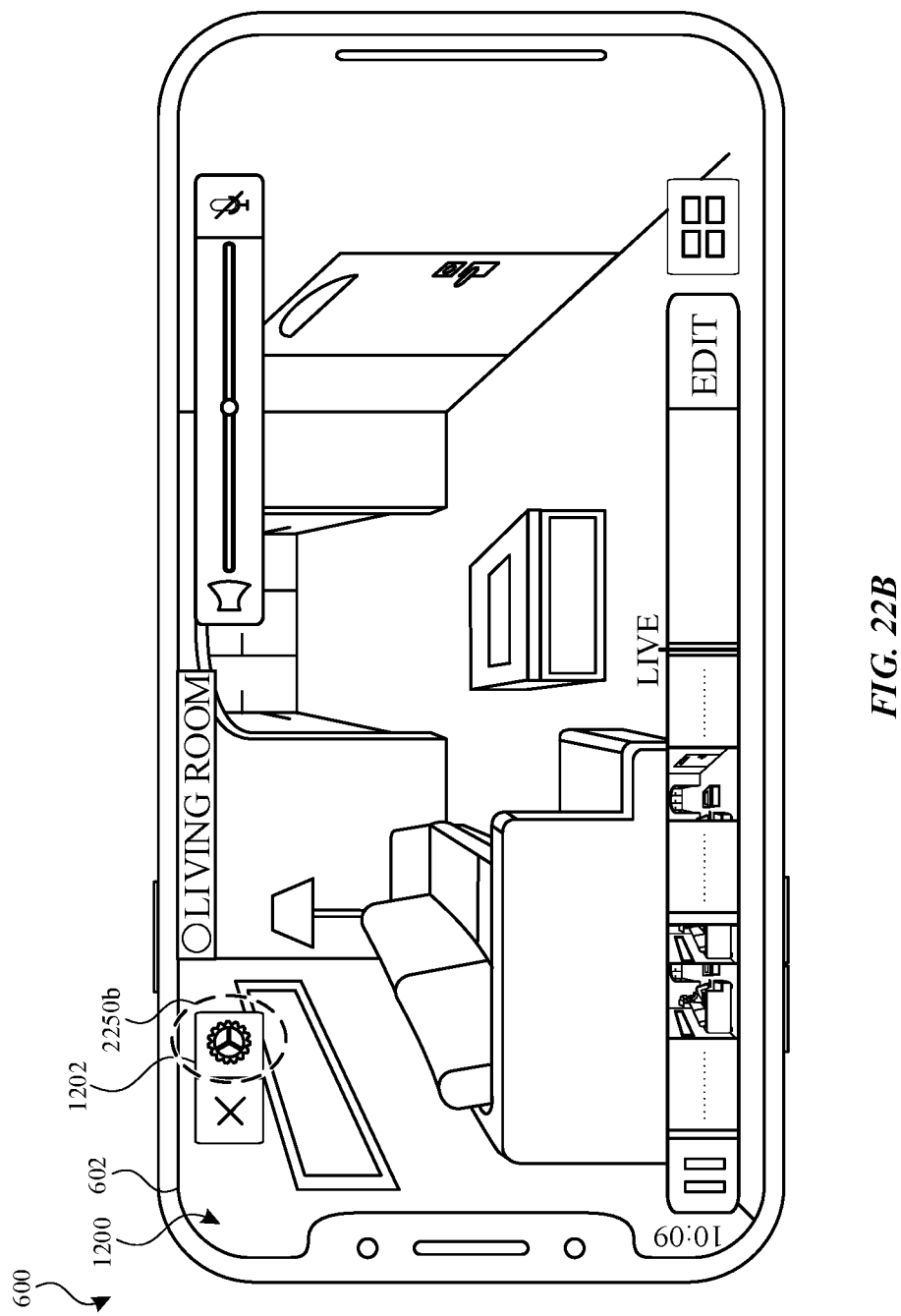
Figure 22C:
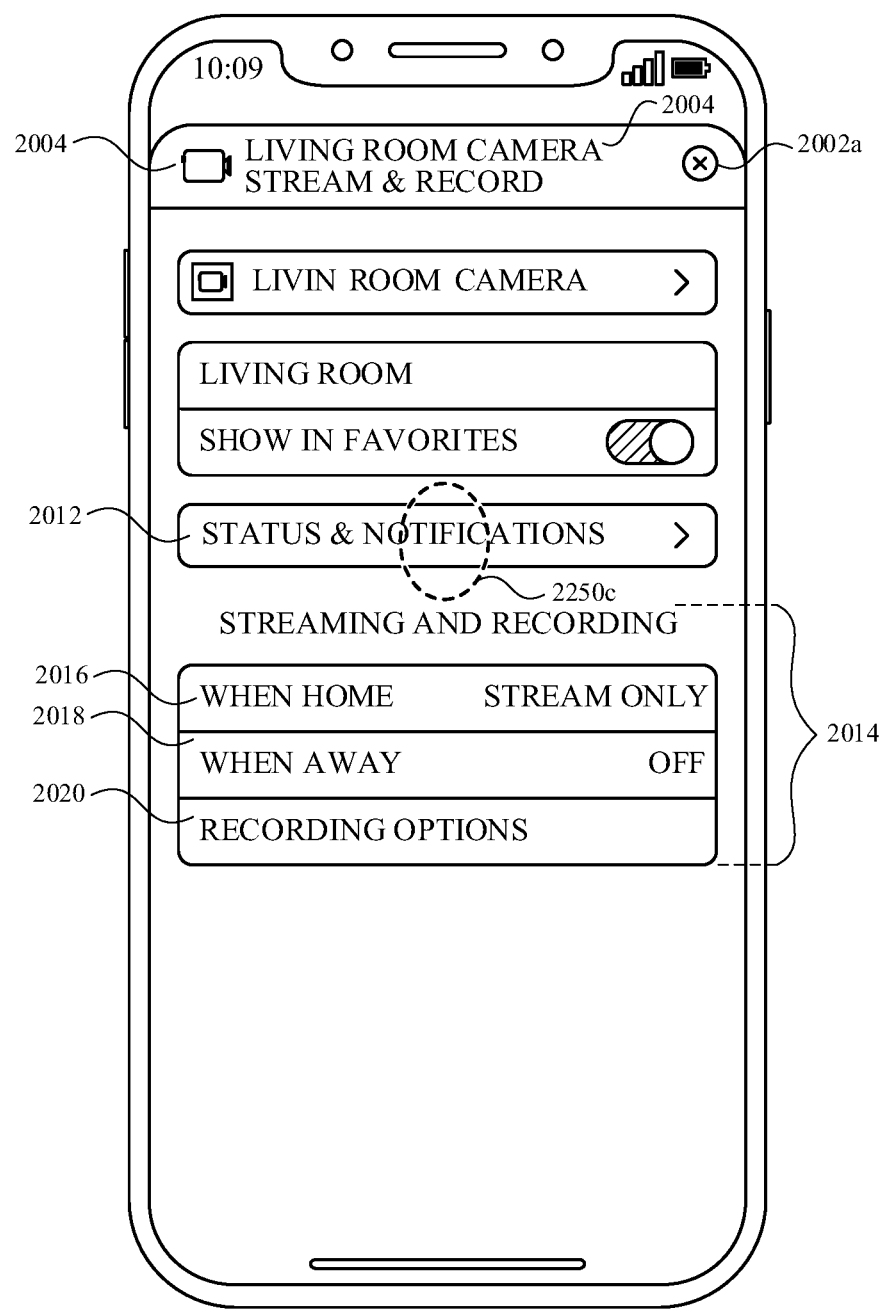
Figure 22D:
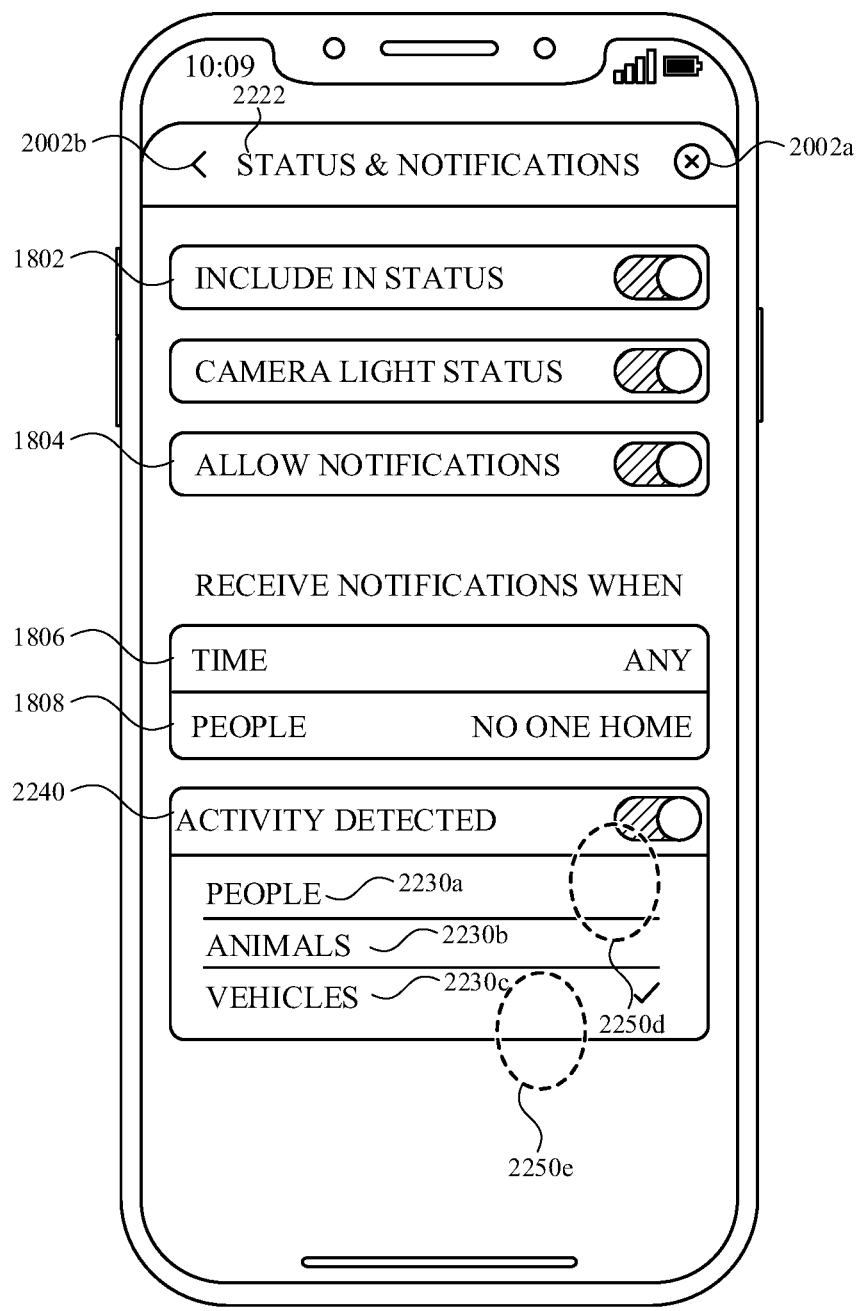

Similar to the configuration of recording settings, device 600 configures notifications settings based on detected user input received from analogous user interfaces as illustrated in FIGS. 22C-22D and discussed below. Device 600 detects user input from status and notifications user interface 2222, illustrated in FIG. 22D. Status and notifications user interface 2222 is analogous to status and notifications user interface 1800 in FIG. 18B. As illustrated in FIG. 22D, status and notifications user interface 2222 includes activity detection affordance 2240 for configuring notifications based on motion detection, which is analogous to activity detection affordance 2040 for configuring recording based on motion detection. As further discussed below with respect to FIGS. 22C-22D, device 600 transmits information (e.g., to Camera 3 or a hub that is in communication with Camera 3) to update the notifications settings of configuration profile of Camera 3 according to the changes made to the motion detection conditions corresponding to notifications settings independently of updating the recording settings as discussed above with respect to FIGS. 20C-20G.

FIGS. 20Q-20X illustrate user interfaces for management of cloud storage when Camera 3 is configured to be in a "RECORD" operational state. In FIG. 20Q, device 600 detects user input 2050o corresponding to selection of the "RECORD" operational mode. In FIG. 20R, in accordance with a determination that device 600 is not linked to a cloud storage plan that includes sufficient memory for (or is enabled for) storing camera recordings (e.g., a subscription-based plan that is over 2 GB), device 600 displays notification 2060a indicating that the user needs to upgrade the current cloud storage plan before the "RECORD" operational mode can be enabled for Camera 3. Notification 2060a includes affordance 2064 for managing cloud storage and a confirmation affordance 2062 to return back to settings user interface 2004 for Camera 3 (without activating the record feature). Affordance 2064 provides the same functionality as affordance 1610 of FIG. 16E, which links to a respective cloud storage management user interface (e.g., 2066 of FIG. 20S and 1612 of FIG. 16G) for configuring cloud storage. At FIG. 20R, device 600 detects user input 2050p corresponding to selection of affordance 2064 to manage cloud storage.

In FIG. 20S, in response to device 600 detecting user input 2050p (as illustrated in FIG. 20R), device 600 displays upgrade cloud storage user interface 2066, which includes a current storage plan user interface 2068 and an upgrade options user interface 2070. User interface 2068 includes the price and amount of storage for the current storage plan in user interface 2068. User interface 2070 includes a menu of subscription plan affordances 2070a (e.g., $X.xx/month for 200 GB) and 2070b (e.g., $Y.yy/month for 2 TB) for different cloud storage plans. Various cloud storage plans support different numbers of cameras. For example, the first-tier storage plan provides storage for the recordings of one camera, and a second-tier storage plan may provide storage for the recordings of ten cameras. Device 600 detects user input 2050q corresponding to selection of affordance 2070a corresponding to selection of the first-tier, subscription-based storage plan. In some embodiments, subsequent to (e.g., in response to) detecting user input 2050q, device 600 enables (or initiates a process for enabling) subscription to the first-tier, subscription-based storage plan associated with affordance 2070a and transmits information (e.g., to Camera 3 or a hub that is in communication with Camera 3) to update the configuration profile of Camera 3 according to the selected "RECORD" operational mode.

FIG. 20T illustrates, in response to device 600 detecting user input 2050q (as illustrated in FIG. 20S), device 600 displays updated user interface 2068 to indicate the current storage plan is the first-tier, subscription-based storage plan and an updated user interface 2070, which removes affordance 2070a associated with the first-tier, subscription-based storage plan from the menu of available subscription-based storage plans for upgrade. Affordance 2070b corresponding to the second-tier, subscription-based storage plan is still displayed in user interface 2070 as this plan is still available for upgrade.

In some embodiments, when device 600 detects a user input to enable recording for a second camera, device 600 determines that the number of cameras exceeds the number of cameras supported by the first-tier storage plan (e.g., the first-tier storage plan only supports recordings of one camera). For example, the first-tier, subscription-based storage plan supports recording for one camera, while the second-tier, subscription-based storage plan supports recording for ten cameras.

FIG. 20U illustrates in response to device 600 detecting the user input to enable recording for a second camera (e.g., doorbell camera) while the current storage plan only supports recording for one camera and determining that the number of cameras requested for recording exceed the number of cameras supported by the current storage plan, device 600 displays notification 2060b indicating that the user needs to upgrade the current storage plan before the "RECORD" operational mode can be enabled for the second camera. Notification 2060b includes an affordance 2064 for managing the cloud storage plan or a confirmation affordance 2062, which returns to settings user interface 2004. At FIG. 20U, device 600 detects user input 2050r corresponding to selection of affordance 2064 to manage the cloud storage plan.

In FIG. 20V, in response to device 600 detecting user input 2050r (as illustrated in FIG. 20U), device 600 displays the current storage plan is the first-tier, subscription-based storage plan in user interface 2068 and affordance 2070b in user interface 2070 corresponding to the second-tier, subscription-based storage plan. Device 600 only displays available subscription-based storage plans for upgrade in user interface 2070 (e.g., does not display the first-tier plan). Device 600 detects user input 2050s corresponding to selection of affordance 2070b.

In FIG. 20V, device 600 detects user input 2050s on affordance 2070b corresponding to the second-tier storage plan. In FIG. 20W, in response to detecting user input 2050s, device 600 displays updated user interface 2068 indicating that the current storage plan is the second-tier, subscription-based storage plan and user interface 2070 is not displayed when there are no additional plans for upgrade. In some embodiments, subsequent to (e.g., in response to) detecting user input 2050s, device 600 enables (or initiates a process for enabling) subscription to the second-tier, subscription-based storage plan associated with affordance 2070b and transmits information (e.g., to Camera 3 or a hub that is in communication with Camera 3) to update the configuration profile of Camera 3 according to the selected "RECORD" operational mode.

As illustrated in FIG. 20X, in response to device 600 detecting user input 2050s to enable recording for an eleventh camera (e.g., doorbell camera) while the current storage plan only supports recording for ten cameras, device 600 displays notification 2060c indicating recording is supported for only ten cameras. Recording is therefore not enabled for the eleventh camera. In some embodiments, the user may remove recording for one of the ten cameras before recording may be enabled for the eleventh camera (resulting in a total of recordings for 10 cameras). In response to device 600 detecting a user input 2050t on confirmation affordance 2002d corresponding to "OK" button 2002d, device 600 displays settings user interface 2004. Device 600 does not transmit information to update the configuration profile of the eleventh camera to operational mode "RECORD" after detecting additional user input on "OK" button 2002d.

FIGS. 21A-21C are a flow diagram illustrating a method for configuring recording settings of an external source of video data using an electronic device in accordance with some embodiments. Method 2100 is performed at a device (e.g., 100, 300, 500, or 600) with a display. Some operations in method 2100 are, optionally, combined, the orders of some operations are, optionally, changed, and some operations are, optionally, omitted.

As described below, method 2100 provides an intuitive way for configuring recording settings based on motion detection conditions for a source of video data for one or more contexts. The method reduces the cognitive burden on a user for configuring recording is enabled for a source of video data for different contexts based on the detection of motion of people, animals, and vehicles, thereby creating a more efficient human-machine interface. Enabling motion detection as a condition for triggering recording reduces the storage space required for maintaining recordings, which creates a more efficient human-machine interface. Recording a fewer number of relevant clips also makes it easier for the user to find particular recordings at a later point in time. Further, since storage space is shared amongst sources of video data (e.g., cameras) linked to the device, reducing the amount of storage space used by one source of video data, provides additional storage space for other sources of video data. For battery-operated computing devices, reducing the amount of recordings allows the source of video data to more efficiently conserve power and increases the time between battery charges.

At block 2102, the device (e.g., 600) receives data identifying a source of video data (e.g., a newly added external camera, selecting a camera from a dashboard such as Camera 3). At block 2104, after (e.g., in response to) receiving the data identifying the source of video data: at block 2106, the device displays a first user interface (e.g., 2014) including a menu for selecting an operational state (e.g., associated with affordances 2016a-2016c) (e.g., off, stream, record, or both stream and record) of the source of video data (wherein the operational state is associated with a context (e.g., someone is home (e.g., 2016), nobody is home (e.g., 2018), etc.)).

At block 2108, while displaying the menu for selecting an operational state (e.g., corresponding to affordances 2016a-2016c) of the source of video data, the device detects a first input (e.g., 2050d) corresponding to a selection of the operational state (e.g., off, stream, record, or both stream and record and associated with a context (e.g., corresponding to affordances 2016, 2018) (e.g., home or away mode)). In some embodiments, the selected operational state (e.g., corresponding to affordances 2016c) (e.g., recording state) and the selected first motion detection condition (e.g., corresponding to affordances 2030a-2030c) (e.g., detecting people) are associated with (e.g., correspond to) a first context (e.g., 2016) (e.g., when someone is home).

At block 2110, in response to detecting the first input (e.g., 2050d) (e.g., selection of the operational state): in accordance with a determination that the selected operational state (e.g., corresponding to affordance 2016c) includes a recording state (e.g., corresponding to affordance 2016c), the device displays an options affordance (e.g., 2020) (e.g., recording options affordance only displayed when recording state is selected). Optionally in response to detecting activation of the options affordance (e.g., recording options affordance), the device displays a menu (e.g., 2010) for selecting a duration (e.g., day, week, month, year (e.g., 2010a-2010d)) for storing video data from the source of video data. In some embodiments, while displaying the menu for selecting a duration (e.g., day, week, month, year) for storing video data from the source of video data, the device detects a fifth input (e.g., 2050n) corresponding to a selection of the duration for storing video data from the source of video data. Subsequent to (e.g., in response to) detecting the fifth input, transmitting information to update the configuration profile of the source of video data according to the selected operational state and the selected duration.

Optionally, in response to detecting the first input (e.g., 2050d), at block 2112, in accordance with a determination that the selected operational state (e.g., corresponding to affordances 2016a, 2016b) does not include the recording state (e.g., corresponding to affordance 2016c), the device forgoes displaying the options affordance (e.g., 2020). In some embodiments, the device only displays the recording options affordance including motion detection affordances (e.g., 2030a-2030c) if the recording state is selected. In some embodiments, when the operational state already includes the recording state prior to detecting the first input (and thus the options affordance is displayed prior to receiving the first input) and the first input does not cause recording state to be excluded from the enabled operational states, the device maintains display of the recording options affordance. In some embodiments, when the operational state does not include the recording state prior to detecting the first input (and thus the options affordance is not displayed prior to receiving the first input) and the first input causes the operational state to include the recording state, the device displays the options affordance. In some embodiments, when the operational state includes the recording state prior to detecting the first input (and thus the options affordance is displayed prior to receiving the first input) and the first input causes the operational state to exclude the recording state, the device ceases to display the options affordance.

The method reduces the cognitive burden on a user for configuring a source of video data for recording, thereby creating a more efficient human-machine interface. Recording options are not displayed unless the device is in the record operational mode. Only displaying recording options when the configuration is set for recording reduces the cognitive burden on the user.

At block 2114, the device detects activation of the options affordance (e.g., 2020). In response to detecting activation of the options affordance: at block 2116, the device displays a plurality of motion detection affordances (e.g., 2030a-2030c) (e.g., motion detection conditions for detecting people, pets, and vehicles), including: at block 2118, a first motion detection affordance (e.g., 2030a) corresponding to a first motion detection condition (e.g., detection of people), and at block 2129, a second motion detection affordance (e.g., 2030b or 2030c) corresponding to a second motion detection condition different from the first motion detection condition; (e.g., detection of people, animals, or vehicles).

At block 2122, the device detects a second input (e.g., 2050f) corresponding to a selection of the first motion detection condition if detecting the selection of the first motion detection affordance (e.g., 2030a) enables the first motion detection condition that was previously disabled, the device displays a checkmark next to the enabled first motion detection condition. If detecting selection of the first motion detection affordance disables the first motion detection condition that was previously enabled, the device does not display a checkmark next to the disabled first motion detection condition.

At block 2124, subsequent to (e.g., in response to) detecting the second input (e.g., 2050f) and optionally, also detecting activation of the "done" affordance, (e.g., in response to detecting the second input), the device transmits information to set a configuration profile of the source of video data according to the selected operational state (e.g., recording state) and the selected first motion detection condition (e.g., detection of people). In some embodiments, at block 2126, the configuration profile causes the source of video data to begin recording when the selected first motion detection condition is satisfied.

Optionally, at block 2128, the device detects a third input corresponding to a selection of the second motion detection condition (e.g., corresponding to affordances 2030b-2030c). Optionally at block 2130, subsequent to (e.g., in response to)

detecting the third input (and, optionally, also detecting activation of the "done" affordance) (e.g., in response to detecting the third input), the device transmits information to update the configuration profile of the source of video data according to the selected operational state and the selected second motion detection condition (e.g., recording state and detection of people). Optionally, at block 2132, the configuration profile causes the source of video data to begin recording when the selected first motion detection condition (e.g., detected motion of a person) or the selected second motion detection condition (e.g., detected motion of a pet) is satisfied. Thus, the configuration profile causes the source of video data to monitor for both the first motion detection condition (e.g., corresponding to affordance 2030*a*) and the second motion detection condition (e.g., corresponding to affordances 2030*b* or 2030*c*), and to begin recording when either the first motion detection condition or the second motion detection condition (or both) is satisfied.

Configurations to trigger recording for a source of video data based on the detection of motion of people, animals, and vehicles saves computer resources and reduces power usage. Enabling motion detection as a condition for triggering recording reduces the storage space required for storing the recordings, which saves computer resources and limits the processing computers perform. Having fewer, but more relevant recordings also makes it easier for the user to find particular recordings at a later point in time. Further, since storage space is often shared amongst sources of video data (e.g., cameras) linked to the device, reducing the amount of storage space required allows storage space to be more efficiently shared. For battery-operated computing devices, reducing the amount of recordings allows the source of video data to more efficiently conserve power and increases the time between battery charges.

In some embodiments, the device detects a fourth input corresponding to a selection of a second operational state (e.g., corresponding to affordance 2016*b*). In some examples, the second operational state is the same as the first operational state. In some embodiments, the second operational state is associated with a second context (e.g., corresponding to affordance 2018) (e.g., when no one is home) different from the first context. In some embodiments, subsequent to (e.g., in response to) detecting the fourth input (e.g., optionally after detecting activation of the "done" affordance; e.g., in response to detecting the fourth input), the device transmits information to update the second operational mode of the second context of the configuration profile of the source of video data according to the selected the second operational mode associated with the second context (e.g., not recording state when no one is home) without transmitting information to update the operational mode of the first context (e.g., recording state with motion detection of people when someone is home) of the configuration profile of the source of video data (and without transmitting information to update any operational mode of the second context of the configuration profile of the source of video data according to the selected second operational mode associated with the second context).

Selecting different operational modes for different contexts for configuring a source of video data provides a more efficient human-machine interface that gives the user more control over the source of video data. A user may only want to record in a first context, but not in a second context. Recording only in a particular context reduces the storage required for storing the recordings, which creates a more efficient human-machine interface. Having fewer, but more relevant recordings also makes it easier for the user to find particular recordings at a later point in time. Further, since storage is shared amongst sources of video data linked to the device, reducing the amount of storage required allows storage to be more efficiently shared. For battery-operated computing devices, reducing the amount of recordings allows the source of video data to more efficiently conserve power and increases the time between battery charges.

In some embodiments, in response to detecting activation of the options affordance (e.g., 2020), the device displays an activity detection affordance (e.g., 2040) concurrently with the plurality of motion detection affordances (e.g., 2030*a*-2030*c*) (e.g., the enabled motion detection conditions (e.g., corresponding to affordances 2030*b* in FIG. 20F) are displayed with a check mark next to the motion detection condition to indicate that it is enabled and the disabled motion detection conditions (e.g., corresponding to affordances 2030*a* and 2030*c* in FIG. 20F) are displayed without a checkmark next to the motion detection condition to indicate that it is disabled). In some embodiments, (while displaying the activity detection affordance) the device detects a first activation (e.g., 2050*g*) of the activity detection affordance (e.g., detecting a tap on the activity detection affordance). In some embodiments, in response to detecting the first activation of the activity detection affordance (e.g., thereby toggling activity detection to the off state, resulting in the electronic device ceasing to display the plurality of motion detection affordances), the device ceases to display the first motion detection affordance (e.g., 2030*a*) and the second motion detection affordance (e.g., 2030*b* or 2030*c*) (e.g., motion detection conditions for a person, a pet, and a vehicle). Optionally, in response to detecting the first activation of the activity detection affordance, the electronic device transmits information to update the configuration profile of the source of video data to disable motion detection conditions. Thus, the first activation of the activity detection affordance clears the selected motion detection conditions and ceases to display the motion detection affordances so that none of the motion detection conditions are selected. Accordingly, the corresponding source of video data receives information instructing it to no longer begin recording based on the enabled motion detection conditions. Also, the activity detection affordance being toggled optionally results in the motion detection affordances being hidden from view.

In some embodiments, subsequent to (e.g., in response to) detecting the first activation of the activity detection affordance, the device transmits information to update the configuration profile of the source of video data such that the first motion detection condition (e.g., 2030*a*) and the second motion detection condition (e.g., 2030*b* or 2030*c*) are disabled. In some embodiments, the device sends information to update the source of video data to not record based on the first and second motion detection conditions that may have been enabled prior to when the user first activated the activity detection affordance.

In some embodiments, while not displaying the plurality of motion detection affordances (e.g., 2030*a*-2030*c*), (e.g., none of the plurality of motion detection affordances are displayed, but continuing to display the activity detection affordance), the device detects a second activation (e.g., 2050*h*) of the activity detection affordance (subsequent to (e.g., in response to) detecting the first activation of the activity detection affordance). In some embodiments, detecting the second activation of the activity detection affordance, by the device, causes the plurality of motion detection affordances (e.g., 2030*a*-2030*c*) to be displayed again. In some embodiments, in response to detecting the second activation of the activity detection affordance, the device displays the plurality of motion detection affordances (e.g., motion detection conditions for people, pets, and vehicles), including: the first motion detection affordance (e.g., 2030a in FIG. 20J) (e.g., with a first indication (e.g., a checkmark next to the first affordance) that the first motion detection condition is selected (e.g., without user input)), and the second motion detection affordance (e.g., 2030b in FIG. 20J) (e.g., with a second indication (e.g., a checkmark next to the second affordance) that the second motion detection condition is selected (e.g., without user input)) (e.g., the first motion detection condition is enabled by default and the second motion detection condition is enabled by default as a result of the activity detection affordance being toggled on). In some embodiments, the checkmarks are displayed next to each of the displayed plurality of motion detection affordances.

Displaying checkmarks next to enabled motion detection conditions provides a more efficient human-machine interface, by conveying to the user, which motion detection conditions are enabled, thereby reducing the cognitive burden of the user.

In some embodiments, subsequent to (e.g., in response to) detecting the second activation (e.g., 2050h) of the activity detection affordance, the device transmits information to update the configuration profile of the source of video data such that the first motion detection condition and the second motion detection condition are enabled. (sending information to update the source of video data to start recording based on the first and second motion detection conditions that may have been enabled prior to when the user first activated the activity detection affordance).

In some embodiments, the device detects activation of a notifications settings affordance (e.g. 2012) (e.g., status and notifications affordance), wherein the notifications settings affordance is for enabling notifications by the source of video data independent (e.g., without changing the motion detection conditions associated with the recording state) of an operational state of the source of video data (e.g., notifications to the electronic device). In some embodiments, in response to detecting activation (e.g., 2250c in FIG. 22C) of the notifications settings affordance, the device displays a plurality of motion detection affordances (e.g., 2230a-2230c in FIG. 22C). In some embodiments, while displaying the plurality of motion detection affordances, the device detects a sixth input (e.g., 2250d in FIG. 22D) corresponding to a selection of a first motion detection condition.

In some embodiments, subsequent to (e.g., in response to) detecting the sixth input (e.g., 2250D in FIG. 22D), the device transmits information to update notifications settings (e.g., enable notifications or notifications based on motion detection conditions of people, pets, or vehicles) of the configuration profile of the source of video data according to the selected first motion detection condition without transmitting information to update the operational state (e.g., recording state) of the configuration profile of the source of video data.

Note that details of the processes described above with respect to method 2100 (e.g., FIGS. 21A-21C) are also applicable in an analogous manner to the methods described above/below. For example, method 2100 optionally includes one or more of the characteristics of the various methods described above with reference to method 700, 900, 1100, 1300, 1500, 1700, 2300, 2500, and 2700. For example, the controllable external device described in method 900 can be the controllable external device of method 2100 for which a configuration profile is set. For brevity, these details are not repeated below.

FIGS. 22A-22H illustrate exemplary user interfaces for configuring notifications settings based on activity detected by a camera, in accordance with some embodiments. The user interfaces of FIGS. 22A-22H are used to illustrate the processes described below, including the processes in FIGS. 23A-23C.

FIG. 22A illustrates device 600 displaying user interface 604, which is the same as user interface 604 illustrated in FIG. 6A, FIG. 12A, and FIG. 20A. At FIG. 20A, device 600 detects user input 2250a to select displayed living room camera (Camera 3) (e.g., 610c) (as described in further detail with respect to FIG. 12A). As illustrated in FIG. 22B, in response to receiving user input 2250a, device 600 displays individual camera user interface 1200 for Camera 3, which is the same as user interface 608 in FIG. 6B, and 1200 in FIG. 12D and FIG. 20B and is described in further detail with respect to FIG. 6B and FIG. 12D. Individual camera user interface 1200 for the living room camera is analogous to individual camera user interface 608 for the front door camera (e.g., doorbell camera) illustrated in and described with respect to, for example, FIG. 6B. Individual camera user interface 1200 includes settings affordance 1202. As illustrated in FIG. 22B, device 600 detects user input 2250b corresponding to selection of settings affordance 1202.

In response to receiving user input 2250b at FIG. 22B, device 600 displays settings user interface 2004 for Camera 3, as illustrated in FIG. 22C, which is the same as user interface 2004 illustrated in FIG. 20C and is analogous to user interface 1204 illustrated in FIG. 12E. Settings user interface 2004 includes graphical representations and affordances that correspond to those illustrated in (and described with respect to) settings user interface 2004 of FIG. 20C, including status and notifications affordance 2012. Status and notifications affordance 2012 enables access to settings for configuring when notifications are sent (e.g., by Camera 3) as a result of detecting motion in a field of view of Camera 3 from a specified subject (e.g., person, animal, and vehicle).

As illustrated in FIG. 22C, device 600 detects user input 2250c corresponding to selection of status and notifications affordance 2012. FIG. 22D illustrates, in response to detecting user input 2250c (as illustrated in FIG. 22C), device 600 displays status and notifications user interface 2222. Status and notifications user interface 2222 is analogous to status and notifications user interface 1800 as illustrated in FIG. 18B and is further described respective to FIG. 18B. Status and notifications user interface 2222 includes status affordance 1802, notifications affordance 1804, time affordance 1806, people affordance 1808, and activity detection affordance 2240. As described above with respect to FIG. 18B-18D, status affordance 1802 is used to configure whether a representation of the source of video data is included in a status user interface (e.g., the "CAMERAS" portion of home user interface 604) on device 600. Notifications affordance 1804 is used to configure whether notifications from the source of video data (e.g., Camera 3) are displayed by device 600 (e.g., a notification is displayed when the source of video data has detected motion). When notifications affordance 1804 is disabled, device 600 has determined that Camera 3 is not configured to send notifications and, therefore, device 600 does not receive notifications from Camera 3 and affordances 1806, 1808, and 2240 are not displayed when notifications affordance 1804 is disabled. When device 600 receives input to enable notifications affordance 1804, device 600 sends information to Camera 3 to enable notifications to be triggered by time, people, or activity detection as configured by the corresponding affordances 1806, 1808, and 2240. Time affordance 1806 is used to configure notifications settings associated with time (e.g., ranges of time in which notifications related with the source of video data are or are not to be displayed by device 600). People affordance 1808 is used to configure notifications settings associated with people (e.g., notification triggered when motion of a person is detected). Activity detection affordance 2240 is analogous to activity detection affordance 2040 in FIG. 20E and includes a menu of motion detection affordances 2230a-2230c corresponding to motion detection conditions for triggering notifications.

Motion detection affordances 2230a-2230c correspond to motion detection conditions that configure Camera 3 to trigger notifications when motion is detected from "People", "Animals", and "Vehicles" respectively in the field of view of Camera 3. Notifications settings based on motion detection conditions are set independently of recording settings based on motion detection conditions as discussed with respect to FIGS. 20C-20J. For example, configuring Camera 3 to trigger recording based on the detected motion of "People" does not enable notifications to be triggered by "People", unless the user has independently enabled notifications to be triggered by "People". Similarly, setting notifications to be triggered based on the detected motion of "People" does not cause recordings to be triggered by the detected motion of "People", unless the user has independently set recordings to be triggered by "People". Thus, motion detection conditions are separately configured for notifications and for recording settings. Notifications settings based on motion detection conditions are also set independently of the first context and the second context in which Camera 3 is operating. For example, notifications may be triggered independent of whether Camera 3 is in operational modes "OFF", "STREAM", or "RECORD". Similarly notifications may be triggered independent of whether Camera 3 is operating in the first context when someone is home or in the second context when no one is home.

In FIG. 22D, device 600 detects user input 2250d corresponding to selection of the motion detection affordance 2230a corresponding to the motion detection of "People". Device 600 also detects user input 2250e corresponding to selection of the motion detection affordance 2230c corresponding to the motion detection of "Vehicles." In some embodiments, a motion detection condition is based on detection of motion or presence of types of subjects (e.g., a person, an animal, a vehicle). In some embodiments, any motion detected from a person, an animal or a vehicle will trigger notifications based motion detection. In some embodiments, a motion detection condition is based on the detection of the presence of particular subjects specified in a list (e.g., certain people). In some embodiments, affordance 2230a configures Camera 3 to trigger notifications when specific people are detected in the room (e.g., JOHN APPLESEED). Similarly, affordance 2230b configures Camera 3 to trigger notifications when specific animals (e.g., cat or dog) or vehicles (e.g., based on license plate) are determined to be present in the field of view of the camera. In some embodiments, when motion detection conditions are not enabled, device 600 configures the camera such that notifications are triggered when the camera detects any motion (not necessarily from certain people, animals, or vehicles).

Figure 22E:
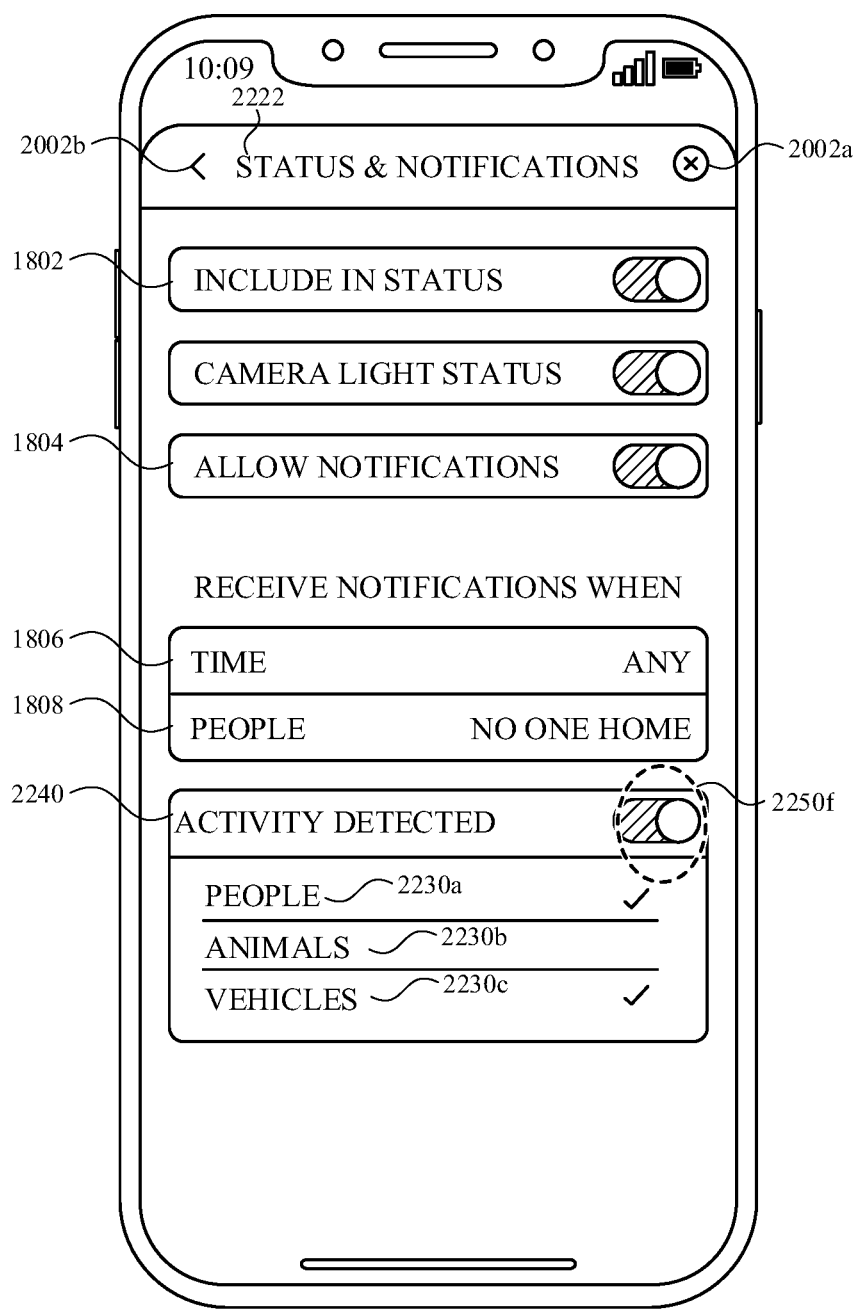

In FIG. 22E, device 600 displays a check mark indicator next to motion detection condition "People" and "Vehicles," that have been enabled by user input 2250d and 2250e respectively. When one or more motion detection conditions are enabled on Camera 3, recording will be triggered when any of the one or more motion detection conditions are satisfied (e.g., motion from a person, vehicle, or animal is detected). In some embodiments, when one or more motion detection conditions are enabled, activity detection affordance 2240 is toggled to an enabled state, as illustrated in FIG. 22E. In some embodiments, when no motion detection conditions are enabled, activity detection affordance 2240 is toggled to a disabled state. In some embodiments, subsequent to (e.g., in response to) detecting user input 2050e at FIG. 22D, device 600 transmits information (e.g., to Camera 3 or a hub that is in communication with Camera 3) to update the notifications settings of the configuration profile of Camera 3 according to the enabled motion detection conditions for "People" and "Vehicles" that were previously disabled. In some embodiments, device 600 transmits information (e.g., to Camera 3 or a hub that is in communication with Camera 3) to update the notifications settings of the configuration profile of Camera 3 according to the changes made to the motion detection conditions after detecting additional user input on a confirmation affordance (e.g., "X" button 2002a or back button 2002b).

Figure 22F:
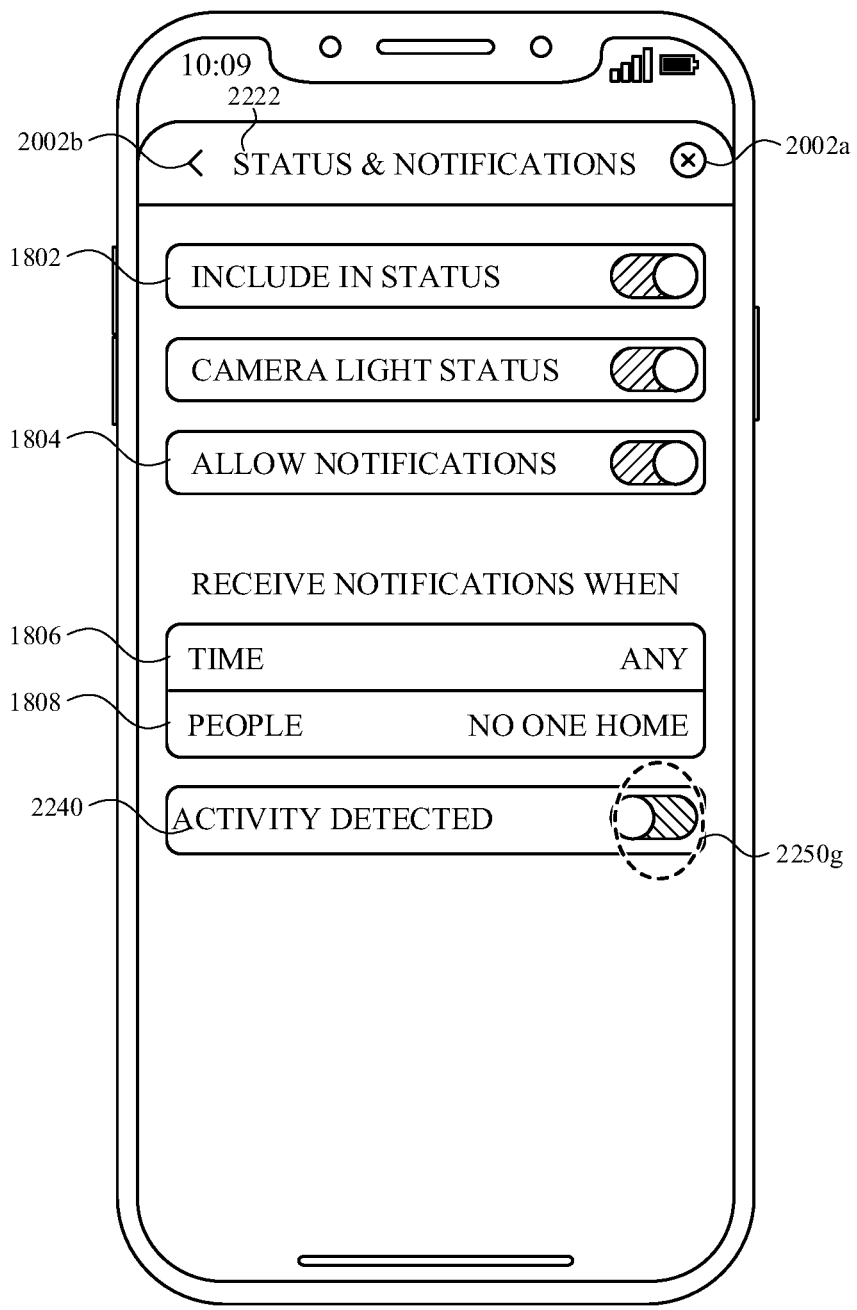

FIG. 22E illustrates device 600 detecting user input 2250f to disable activity detection such that motion detection is not used to trigger notifications on Camera 3. In FIG. 22F, in response to device 600 detecting user input 2250f, device 600 ceases to display motion detection affordances 2230a-2230c, such that activity detection affordance 2240 is displayed in the disabled state (without displaying motion detection affordances 2230a-2230c). In some embodiments, when activity detection affordance 2240 is disabled, any type of motion detected (e.g., from an object such as a rolling ball, not specifically people or animals) may trigger notifications. In some embodiments, subsequent to (e.g., in response to) device 600 receiving user input 2250f, device 600 transmits information (e.g., to Camera 3 or a hub that is in communication with Camera 3) to update the configuration profile of Camera 3 in accordance with detected user input 2250f to disable triggering notifications by motion detection. In some embodiments, device 600 transmits information (e.g., to Camera 3 or a hub that is in communication with Camera 3) to update the configuration profile of Camera 3 according to the disabled motion detection settings after detecting further user input on a confirmation affordance (e.g., "X" button 202a or back button 2002b).

Figure 22G:
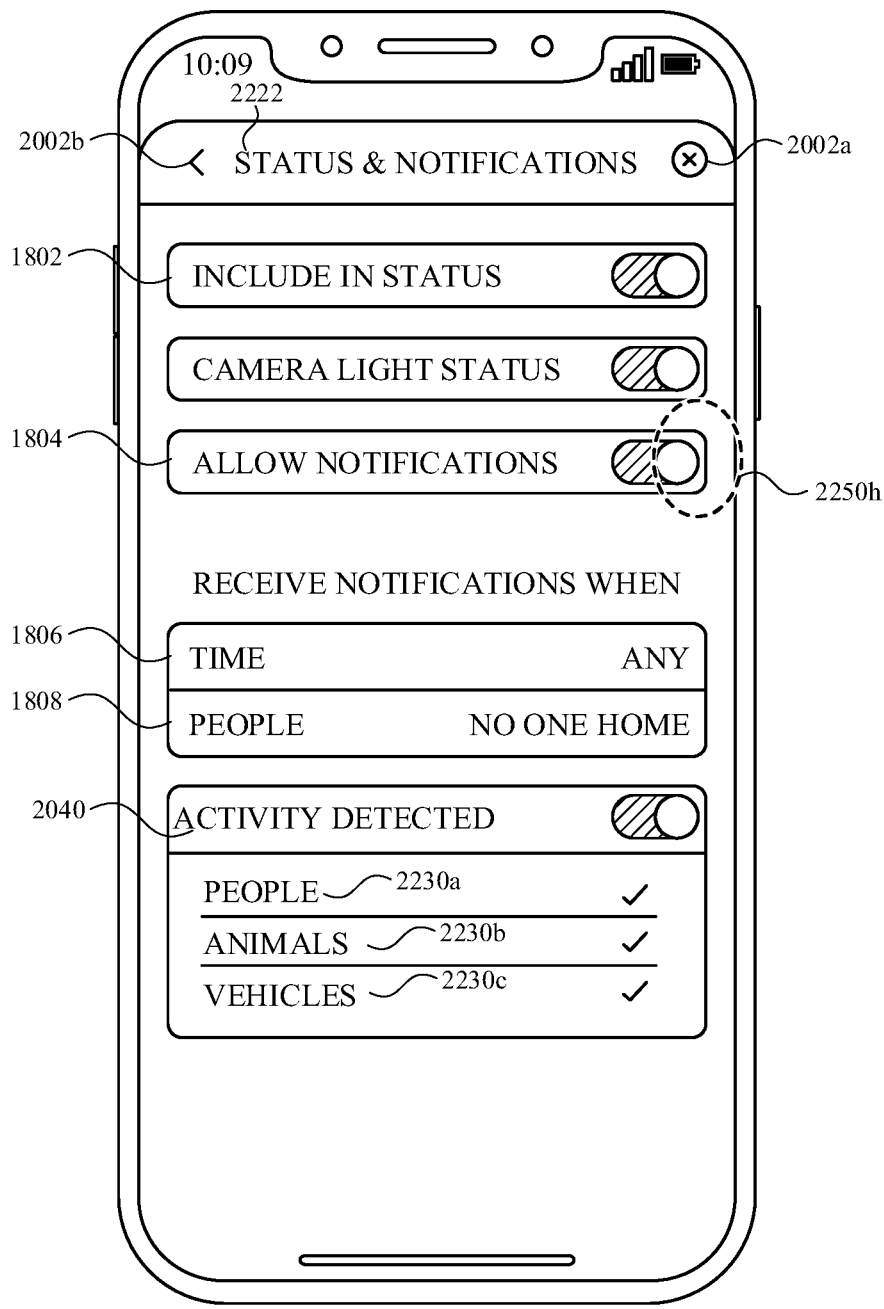

In FIG. 22F, device 600 detects user input 2250g to enable activity detection on activity detection affordance 2240, which was previously disabled. In FIG. 22G, in response to device 600 detecting user input 2250g (as illustrated in FIG. 22F), device 600 displays activity detection affordance 2240 concurrently with motion detection affordances 2230a-2230a, where motion detection affordances 2230a-2230a are automatically enabled without additional user input. Check mark indicators are displayed next to each of the displayed motion detection affordances to indicate that the corresponding motion detection conditions are enabled. In response to device 600 detecting user input 2250g, notifications triggered by motion detection conditions are enabled. In some embodiments, subsequent to (e.g., in response to) device 600 receiving user input 2250g, device 600 transmits (e.g., to Camera 3) information to update the notifications settings of configuration profile of Camera 3 in accordance with the enabled motion detection conditions that were previously disabled. In some embodiments, device 600 transmits information (e.g., to Camera 3 or a hub that is in communication with Camera 3) to update the notifications settings of configuration profile of Camera 3 according to the changes made to the motion detection conditions after detecting additional user input on a confirmation affordance (e.g., "X" button 2002*a* or back button 2002*b*).

In some embodiments, in response to receiving a notification (e.g., 810) from Camera 1, a front door camera, based on motion detected by Camera 1, device 600 displays a notification (e.g., 810 in FIG. 8E), which represents a representative image from Camera 1 along with a message indicating information provided by Camera 1 (e.g., front door movement detected). Notifications received by device 600 are described with respect to FIG. 8E and optionally include controls for accessing at least one controllable external device associated with Camera 1 (e.g., 814*b* turning on front door lights or 814*c* enabling sound from the intercom as illustrated in FIG. 8G). In some embodiments, device 600 displays the received notification (e.g., 810) with affordances to play back a recorded clip of video from Camera 3, which is further described with respective to FIG. 8G. In some embodiments, notifications are received by device 1900 as discussed in FIGS. 19A-19D.

Figure 22H:
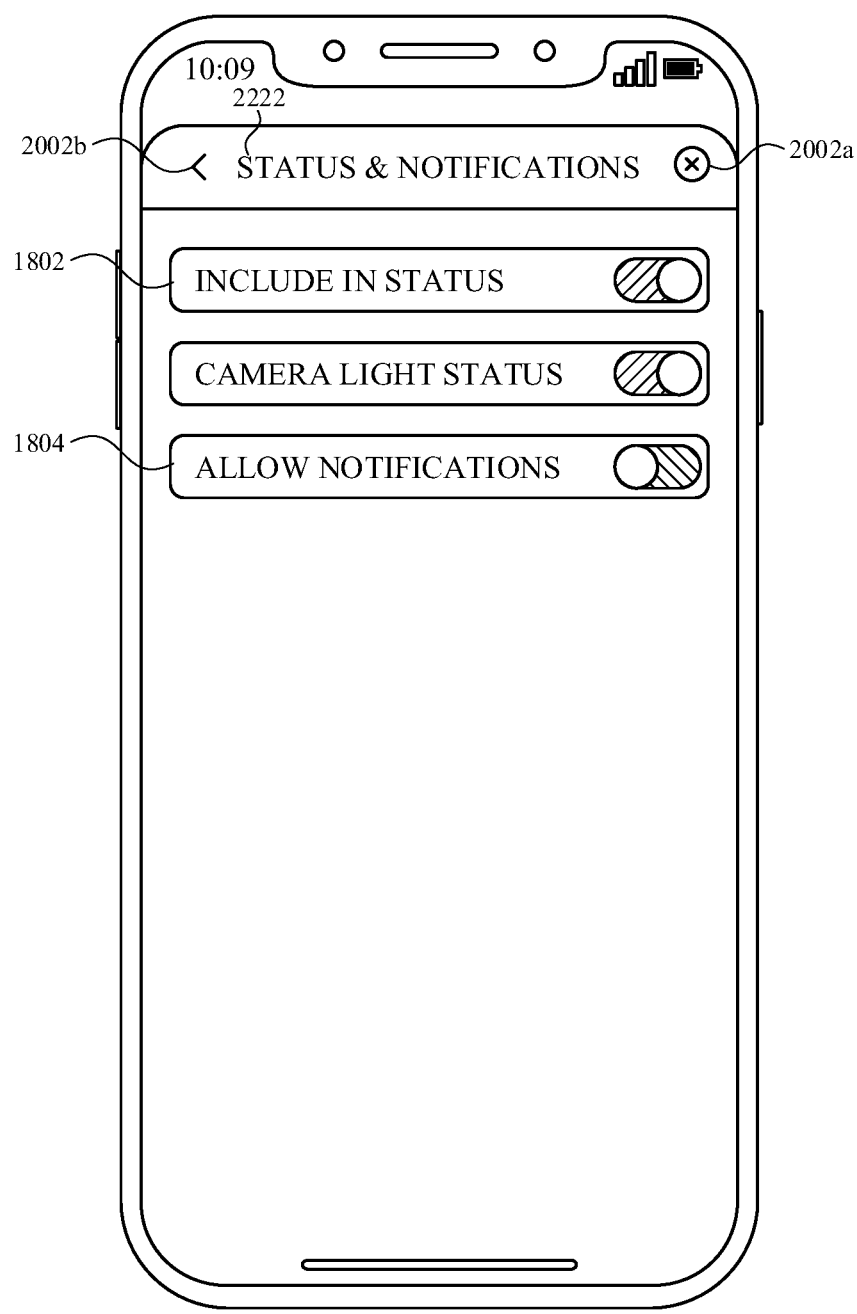

In FIG. 22G, device 600 detects user input 2250*h*, corresponding to selection of notifications affordance 1804, which is enabled prior to receiving the input. In FIG. 22H, in response to detecting user input 2250*h* (as illustrated in FIG. 22G), device 600 disables notifications from Camera 3 and does not display affordances 1806, 1808, and 2040, while maintaining display of notifications affordance 1804 in the disabled state. In some embodiments, when notifications affordance 1804 is disabled, device 600 does not receive any notifications from Camera 3. In some embodiments, subsequent to (e.g., in response to) device 600 receiving user input 2250*h*, device 600 transmits information (e.g., to Camera 3 or a hub that is in communication with Camera 3) to update the configuration profile of Camera 3 in accordance with detected user input 2250*h* to disable notifications from Camera 3. In some embodiments, device 600 transmits information (e.g., to Camera 3 or a hub that is in communication with Camera 3) to update the configuration profile of Camera 3 according to the disabled notifications settings after detecting additional user input on a confirmation affordance (e.g., "X" button 2002*a* or back button 2002*b*).

FIGS. 23A-23C are a flow diagram illustrating a method for configuring notifications settings of an external camera using an electronic device in accordance with some embodiments. Method 2300 is performed at a device (e.g., 100, 300, 500, or 600) with a display. Some operations in method 2300 are, optionally, combined, the orders of some operations are, optionally, changed, and some operations are, optionally, omitted.

As described below, method 2300 provides an intuitive way for configuring notifications settings based on motion detection conditions. The method reduces the cognitive burden on a user for managing notifications by allowing the user to configure a device to only receive notifications based on motion detection of people, animals, or vehicles instead of any type of motion (e.g., motion from leaves at the front door). For battery-operated computing devices, enabling a user to configure a source of video data to only send notifications based on motion detection of relevant subjects allows both the device to more efficiently conserves power and increases the time between battery charges as fewer notifications are received.

At block 2302, the device (e.g., 600) receives data identifying a source of video data (e.g., a newly added external camera). At block 2304, after receiving the data identifying the source of video data, at block 2306, the device detects activation (e.g., 2250*c*) of a notifications settings affordance (e.g., status and notifications affordance), wherein the notifications settings affordance is for enabling notifications by the source of video data independent (e.g., without changing the motion detection conditions associated with the recording state) of an operational state of the source of video data (e.g., notifications to the electronic device). In some embodiments, at block 2308, the operational state (e.g., corresponding to the operational states indicated in affordances 2016 and 2018) of the source of video data is not a recording state (e.g., camera is configured to stream) when the notifications settings affordance is activated (e.g., notifications are enabled even though the camera is not configured to record or stream, thus the user can receive notifications that motion is detected without requiring the camera be configured to record or stream). In some embodiments, at block 2310, the notifications settings of the source of video data are not associated with (e.g., do not correspond to) a context of the source of video data. In some embodiments, the notifications settings is independent of whether the context is when someone is home or when someone is away. In some embodiments, the device configures the source of video data to trigger notifications regardless of the operational states associated with the context. In some embodiments, the device configures the source of video data to trigger notifications based on motion detection conditions and not based on whether the camera is recording.

Configuring notifications settings for different contexts reduces the cognitive burden on a user for managing notifications. For example, a user may only want to receive notifications when no one is home. Allowing the user to specify the context in which the user wants to receive notifications provides the user with a more efficient user interface and reduces the cognitive burden on the user as fewer notifications are displayed. For battery-operated computing devices, enabling a user to configure a source of video data to only send notifications based on motion detection of relevant subjects allows both the device to more efficiently conserves power and increases the time between battery charges as fewer notifications are received.

At block 2314, in response to detecting activation (e.g., 2250*c*) of the notification setting affordance, the device displays a plurality of motion detection affordances (e.g., 2230*a*-2230*c*), including: at block 2316, a first motion detection affordance (e.g., 2230*a*) corresponding to the first motion detection condition (e.g., detection of people), and at block 2318, a second motion detection affordance (e.g., 2230*b*) corresponding to the second motion detection condition different from the first motion detection condition (e.g., detection of animals, or vehicles).

At block 2320, the device detects (e.g., while displaying the plurality of motion detection affordances) a first input (e.g., 2250*d*) corresponding to a selection of the first motion detection condition (e.g., corresponding to affordance 2230*a*). At block 2322, subsequent to detecting the first input (and also tapping "done"), the device transmits information to update notifications settings (e.g., the device transmits notifications when motion is detected from people) of a configuration profile of the source of video data according to the first motion detection condition without transmitting information to update motion detection conditions associated with an operational state (e.g., recording state and detection of people) of the configuration profile of the source of video data.

Optionally at block 2312, the device receives an alert associated with an event from the source of video data when the first motion detection condition is enabled in the configuration profile of the source of video data and the first motion detection condition is satisfied (e.g., the camera transmits notifications to the electronic device when motion is detected from people).

Optionally at block 2324, the device detects a second input (e.g., 2250e) corresponding to a selection of the second motion detection condition (e.g., corresponding to affordance 2250e). Optionally, at block 2326, subsequent to detecting the second input (and, optionally, also detecting activation of the "done" affordance) (e.g., in response to detecting the second input), the device transmits information to update notifications settings of the configuration profile of the source of video data according the selected second motion detection condition (e.g., detection of pets or vehicles), wherein the configuration profile causes the source of video data to transmit an alert when the first selected motion detection condition (e.g., people) or the selected second motion detection condition (e.g., pets) is satisfied. Thus, the configuration profile causes the source of video data to monitor for both the first motion detection condition and the second motion detection condition, and to transmit an alert when either the first motion detection condition or the second motion detection condition (or both) is satisfied.

In some embodiments, the device detects a third input (e.g., 2050d in FIG. 20D) corresponding to a selection of the operational state (associated with the context (e.g., home or away mode)), wherein the operational state is a recording state. In some embodiments, in response to detecting the third input (e.g., selection of the recording state), the device displays a second plurality of motion detection affordances (e.g., 2030a-2030c in FIG. 20F) (e.g., people, pets, vehicles).

In some embodiments, while displaying the second plurality of motion detection affordances (e.g., 2030a-2030c), the device detects a fourth input (e.g., 2030a in FIG. 20D) corresponding to a selection of a third motion detection condition (e.g., corresponding to affordance 2030a) (e.g., a condition that is satisfied when the source of the video data detects motion of a person within a field of view of the source of the video data). In some embodiments, subsequent to detecting the fourth input (selection of the first motion detection condition), the device transmits information to update the operational state of the configuration profile of the source of video data according to the selected operational state and the selected first motion detection condition (e.g., recording when motion from a person is detected) without transmitting information to update notifications settings (e.g., motion detection conditions of notifications) of the configuration profile of the source of video data.

In some embodiments, in response to detecting activation of the notifications settings affordance (e.g., 2250c), the device displays an activity detection affordance (e.g., 2240) concurrently with the plurality of motion detection affordances. In some embodiments, enabled motion detection conditions (e.g., corresponding to affordance 2230c) are displayed with a check mark next to the motion detection condition to indicate that it is enabled and the disabled motion detection conditions (e.g., corresponding to affordances 2230a-2230b) are displayed without a checkmark next to the motion detection condition to indicate that it is disabled.

In some embodiments, (while displaying the activity detection affordance), the device detects a first activation (e.g., 2250f) of the activity detection affordance (e.g., detecting a tap on the activity detection affordance). In some embodiments, in response to detecting the first activation of the activity detection affordance (e.g., thereby toggling activity detection to the off state, resulting in the electronic device ceasing to display the plurality of motion detection affordances (e.g., 2230a-2230c)), the device ceases to display the first motion detection affordance (e.g., 2230a) and the second motion detection affordance (e.g., 2230b or 2230c) (e.g., motion detection conditions for a person, a pet, and a vehicle). Optionally, in response to detecting the first activation of the activity detection affordance, the electronic device transmits information to update the configuration profile of the source of video data to disable motion detection conditions. Thus, the first activation of the activity detection affordance clears the selected motion detection conditions and ceases to display the motion detection affordances so that none of the motion detection conditions are selected. Accordingly, the corresponding source of video data receives information instructing it to not trigger notifications based on the enabled motion detection conditions. Also, the activity detection affordance being toggled optionally results in the motion detection affordances being hidden from view.

In some embodiments, subsequent to (e.g., in response to) detecting the first activation (e.g., 2250f) of the activity detection affordance, transmitting information to update the notifications settings of the configuration profile of the source of video data such that the first motion detection condition and the second motion detection condition are disabled. In some embodiments, the device sends information to update the source of video data to not trigger notifications based on the first and second motion detection conditions that may have been enabled prior to when the user first activated the activity detection affordance.

In some embodiments, while not displaying the plurality of motion detection affordances (e.g., 2230a-2230c) (e.g., none of the plurality of motion detection affordances are displayed, but continuing to display the activity detection affordance), the device detects a second activation (e.g., 2250g) of the activity detection affordance (subsequent to detecting the first activation of the activity detection affordance). Detecting the second activation of the activity detection affordance, causes the plurality of motion detection affordances to be displayed again.

In some embodiments, in response to detecting the second activation (e.g., 2250g) of the activity detection affordance, the device displays the plurality of motion detection affordances (e.g., 2230a-2230c) (e.g., motion detection conditions for people, pets, and vehicles), including: the first motion detection affordance (e.g., 2230a) (e.g., with a first indication (e.g., a checkmark next to the first affordance) that the first motion detection condition is selected (e.g., without user input)), and the second motion detection affordance (e.g., 2230b or 2230c) (e.g., with a second indication (e.g., a checkmark next to the second affordance) that the second motion detection condition is selected (e.g., without user input)). In some embodiments, the first motion detection condition is enabled by default and the second motion detection condition is enabled by default as a result of the activity detection affordance being toggled on. In some embodiments, checkmarks are displayed next to each of the displayed plurality of motion detection affordances.

In some embodiments, subsequent to (e.g., in response to) detecting the second activation (e.g., 2250g) of the activity detection affordance, transmitting information to update the notifications settings of the configuration profile of the source of video data such that the first motion detection condition and the second motion detection condition are enabled (sending information to update the source of video data to trigger notifications based on the first and second motion detection conditions that may have been enabled prior to when the user first activated the activity detection affordance).

Enabling the motion detection conditions automatically when the activity detection affordance is enabled provides a more efficient user interface that reduces the cognitive burden on the user for setting up notifications more efficiently. The activity detection affordance configures the source of video data to send notifications to the device when motion is detected from certain subjects instead of any motion triggering a notification. Enabling motion detection as a condition for triggering notifications reduces the volume of notifications that would otherwise be received, which creates a more efficient human-machine interface and user experience. For battery-operated computing devices, the lower volume of received notifications allows the device to more efficiently conserve power and increases the time between battery charges.

Note that details of the processes described above with respect to method 2300 (e.g., FIGS. 23A-23C are also applicable in an analogous manner to the methods described above/below. For example, method 2300 optionally includes one or more of the characteristics of the various methods described above with reference to method 700, 900, 1100, 1300, 1500, 1700, 2100, 2500, and 2700. For example, the controllable external device described in method 900 can be the controllable external device of method 2300 for which a configuration profile is set. For brevity, these details are not repeated below.

FIGS. 24A-24J illustrate exemplary user interfaces for configuring notifications settings for a first type of notifications based on activity detection by a first type of external camera and a second type of notifications based on activity detected by a second type of external camera, in accordance with some embodiments. The user interfaces of FIGS. 24A-24J are used to illustrate the processes described below, including the processes in FIGS. 25A-25D.

Figure 24A:
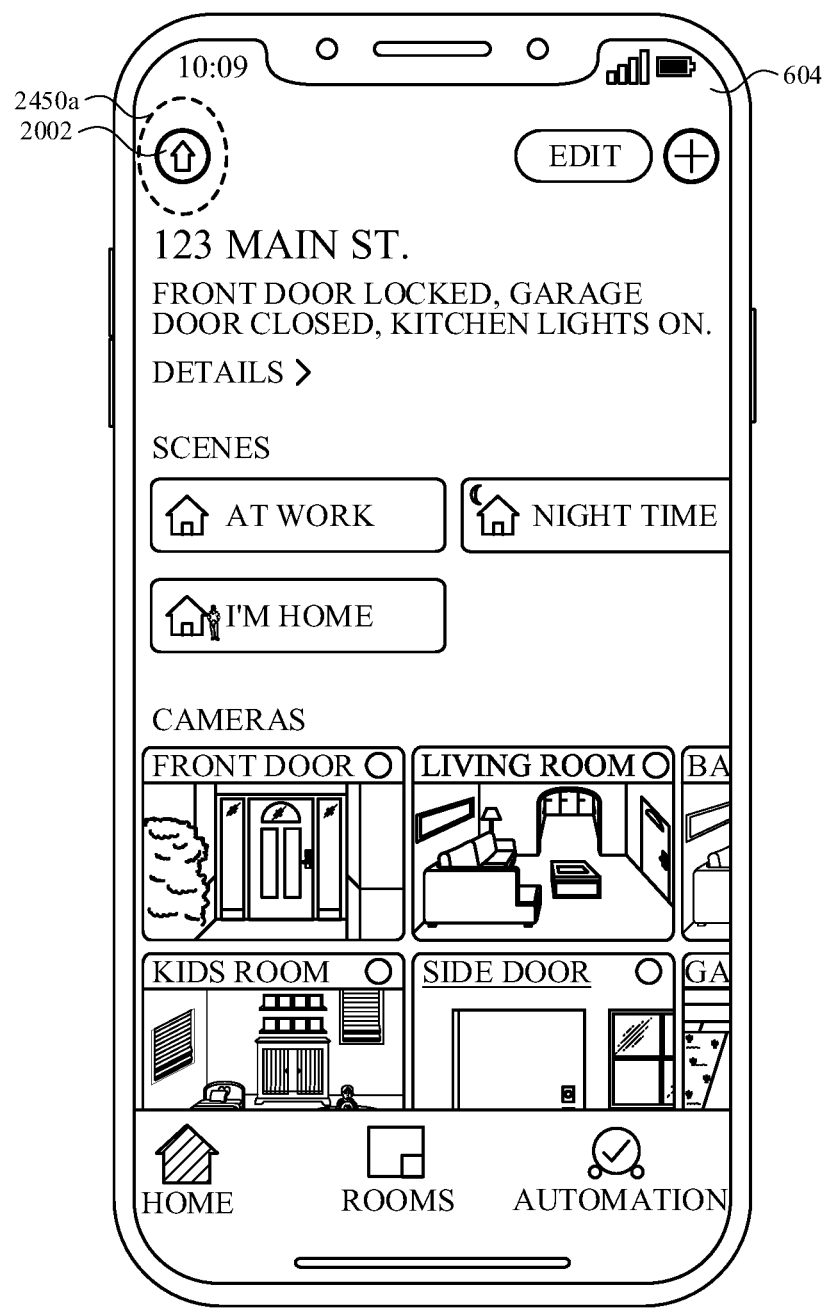
FIGS. 24A-24J illustrate exemplary user interfaces for configuring a first type of notifications for a first type of source of video data and a second type of notifications for a second type of source of video data in accordance with some embodiments.
Figure 24B:
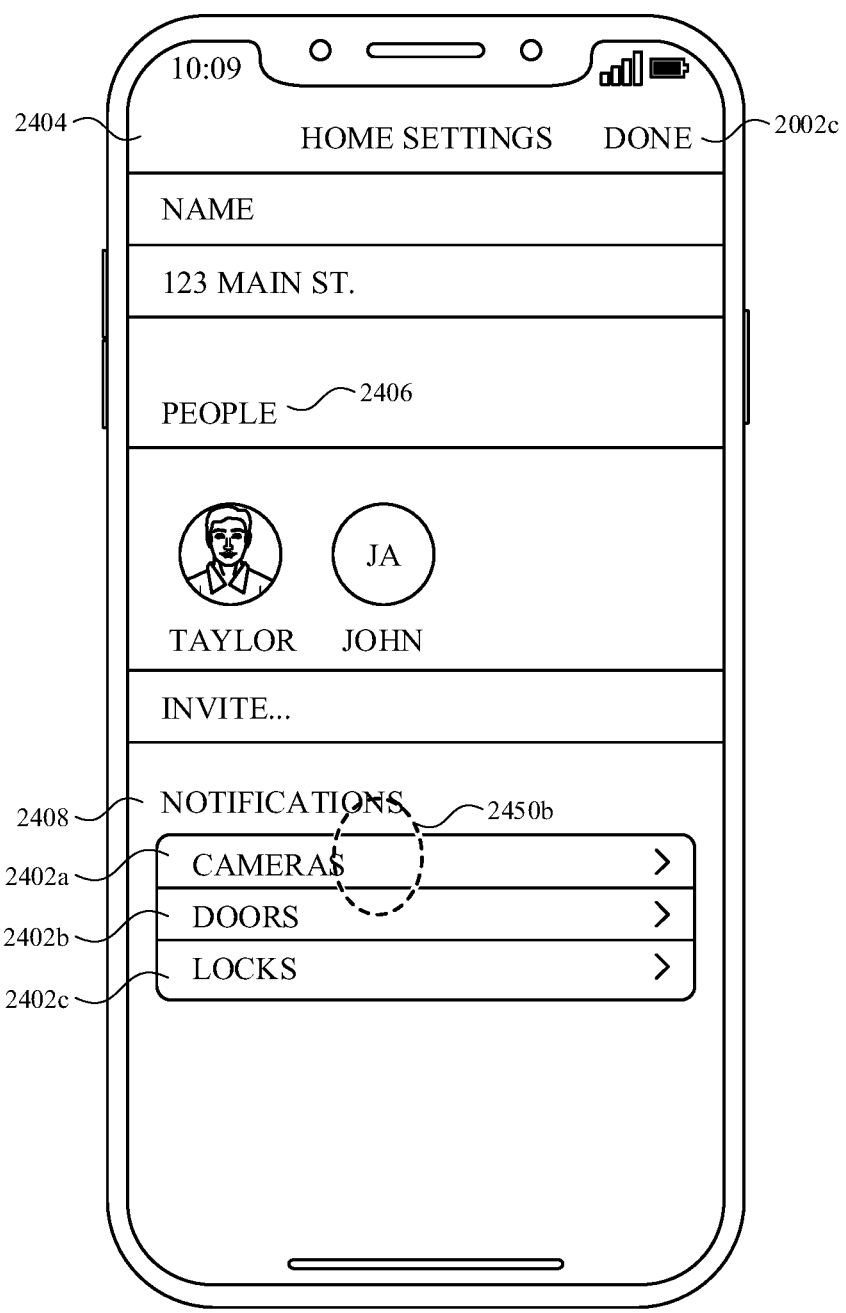

FIG. 24A illustrates device 600 displaying user interface 604, which is the same as user interface 604 illustrated in FIG. 6A, FIG. 12A, FIG. 20A, and FIG. 22A. At FIG. 20A, device 600 detects user input 2450a corresponding to selection of home settings affordance 2002. As illustrated in FIG. 24B, in response to detecting user input 2050a (as illustrated in FIG. 24A), device 600 displays user interface 2404, including affordances 2406 and 2408 for configuring various settings for smart appliances (e.g., cameras, doors, locks) in, for example, a user's home. People section 2406, includes a list of people authorized to interact with the smart appliances in the home. Device 600 also displays an invite button for adding people to people section 2406. Notifications affordance 2408 includes a menu of affordances 2402a-2402c corresponding respectively to cameras, doors, and locks, which can be configured by device 600 to send notifications.

Figure 24C:
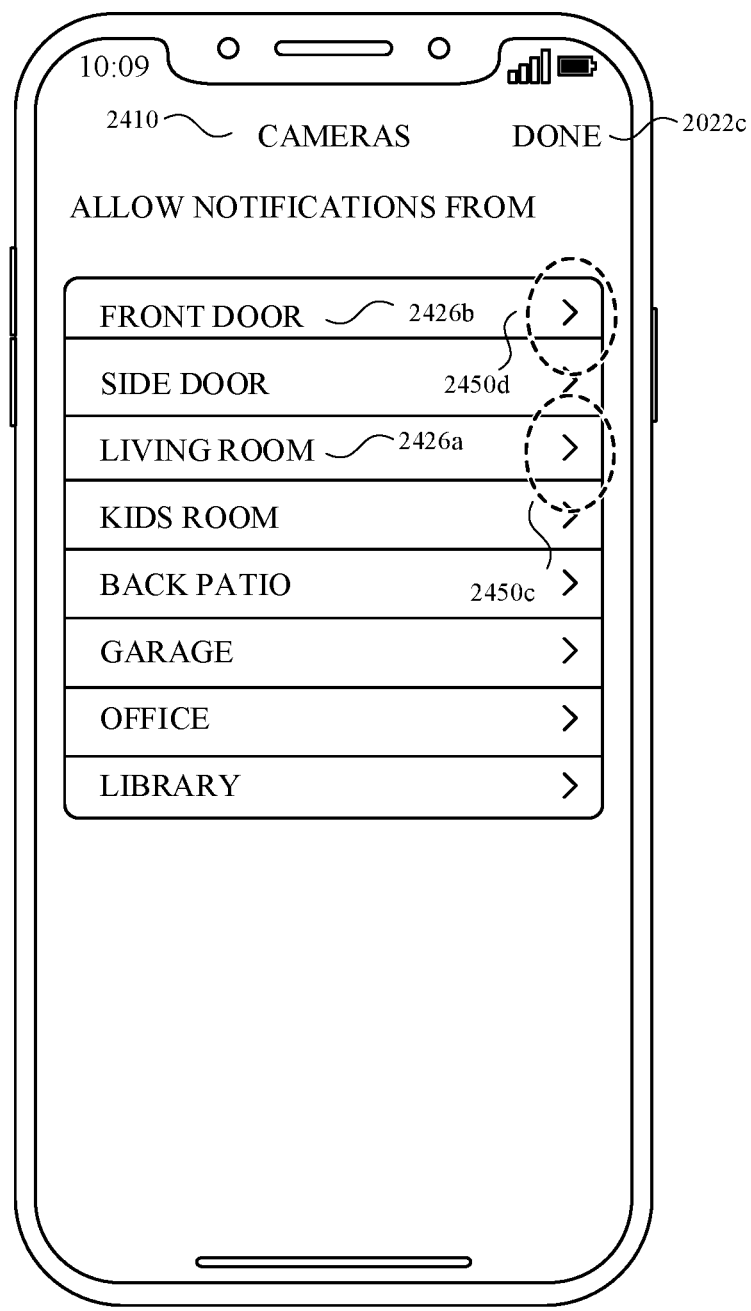
Figure 24D:
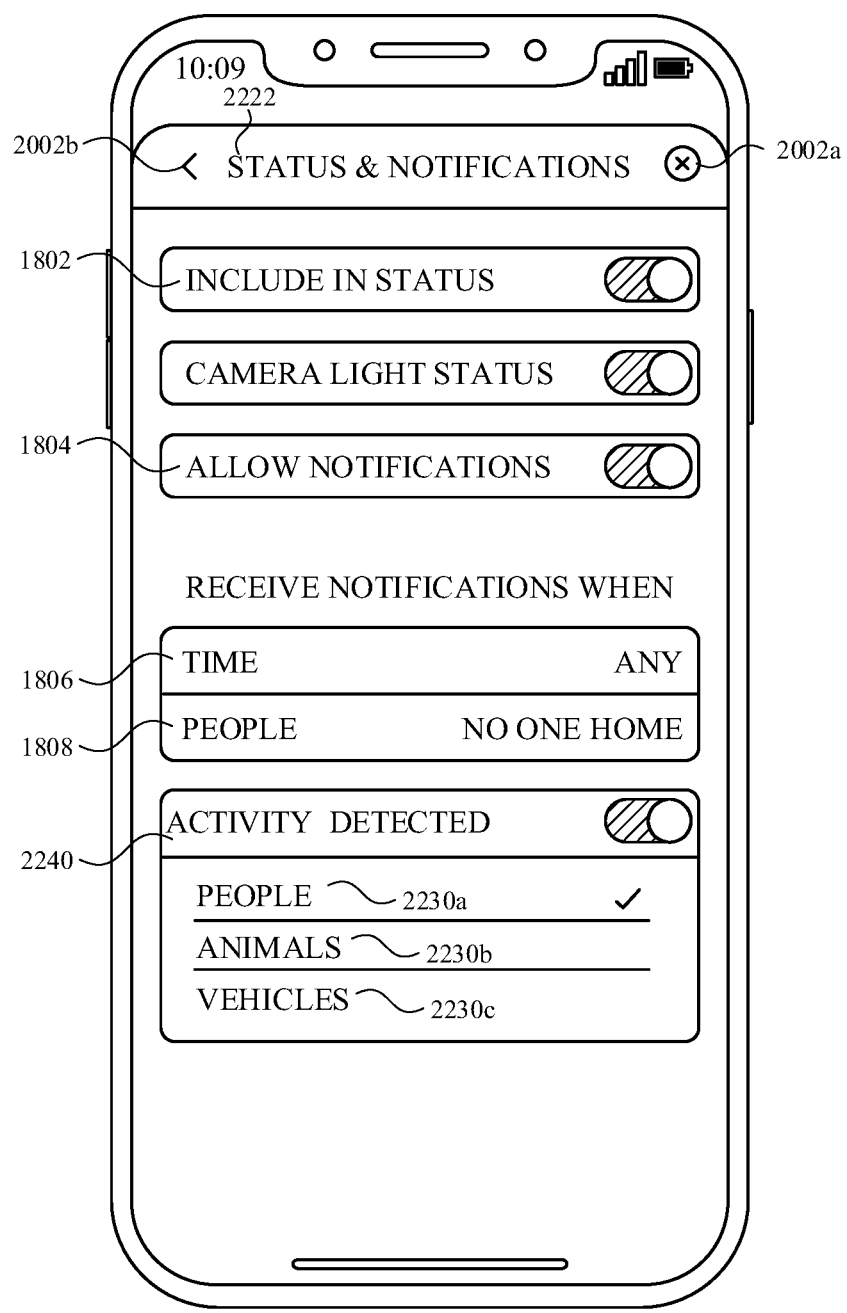
Figure 24E:
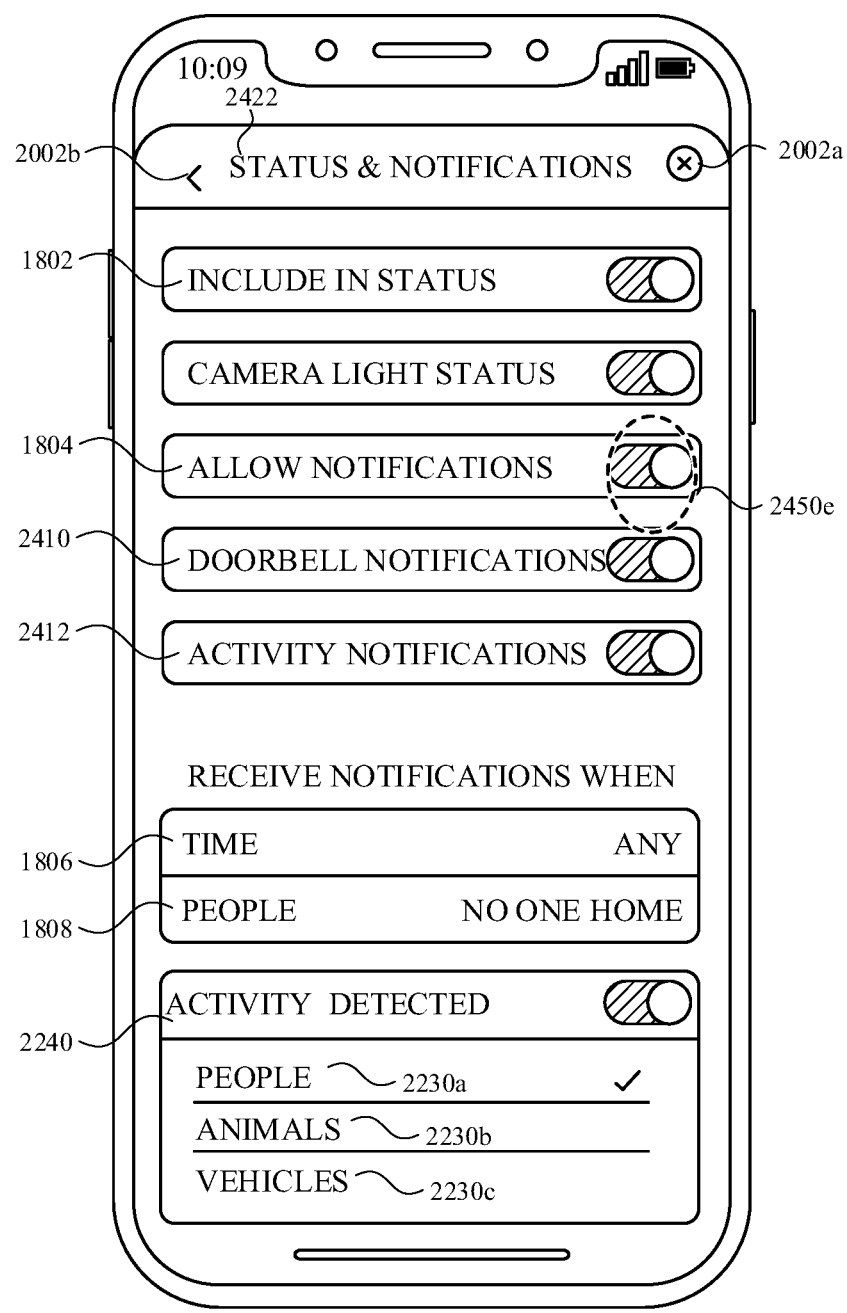

In FIG. 24B, in response to device 600 detecting user input 2450b, corresponding to selection of cameras affordance 2402a, device 600 displays cameras user interface 2410 in FIG. 24C. Cameras user interface 2410 includes a menu of affordances (e.g., living room camera affordance 2426a and front door (doorbell) camera affordance 2426b) for configuring respective cameras that have been added to device 600. In accordance with a determination that the type of the selected camera is a first type (e.g., a non-doorbell camera), device 600 displays a status and notifications user interface 2222, as illustrated in FIG. 24D. In accordance with a determination that the type of the selected camera is a second type (e.g., a doorbell camera), device 600 displays a status and notifications user interface 2422 is displayed as illustrated in FIG. 24E. In some embodiments, device 600 determines whether a camera is a first type of camera or a second type of camera based on whether the camera has an input mechanism such as a doorbell or an intercom. In FIG. 24C, when device 600 detects user input 2450c corresponding to selection of the living room camera (e.g., Camera 3, a first type of camera), status and notifications user interface 2222 is displayed as illustrated in FIG. 24D. In FIG. 24C, when device 600 detects user input 2450d corresponding to selection of the front door (doorbell) camera (e.g., Camera 1, a second type of camera) status and notifications user interface 2422 is displayed as illustrated in FIG. 24E.

FIG. 24D illustrates in response to detecting user input 2450c (as illustrated in FIG. 24C), device 600 displays status and notifications user interface 2222 corresponding to notifications settings for Camera 3, which is the same as user interface 2222 for Camera 3 in FIG. 22D and is described in detail with respect to FIG. 22D above. Status and notifications user interface 2222 is displayed when the selected camera is a first type of camera (e.g., not a doorbell camera). Status and notifications user interface 2222 includes notifications affordance 1804 for toggling whether device 600 receives notifications from Camera 3. When notifications affordance 1804 is enabled, device 600 displays affordances 1806, 1808, and 2240 to configure when notifications are sent by Camera 3. Affordances 1804, 1806, and 1808, are discussed above with respect to FIGS. 18C-18D, FIG. 22D, and FIG. 22H. When notifications affordance 1804 is disabled, device 600 does not display affordances 1806, 1808, and 2240 because the user has selected to not trigger notifications from Camera 3 based on the settings corresponding to affordances 1806, 1808, and 2240, as illustrated in FIG. 22H. When notifications affordance 1804 is enabled, device 600 detects user input to configure motion detection settings relative to affordances 2230a-2230c, which is the same as user interface 2240 in FIG. 22D and is described in further detail with respect to FIG. 22D above. In some embodiments, subsequent to (e.g., in response to) device 600 receiving user input to configure motion detection settings relative to affordances 2230a-2230c, device 600 transmits information to update the notifications settings of configuration profile of Camera 3 in accordance with the enabled motion detection conditions. In some embodiments, device 600 transmits information (e.g., to Camera 3 or a hub that is in communication with Camera 3) to update the notifications settings of configuration profile of Camera 3 according to the changes made to the motion detection conditions after detecting an additional user input on a confirmation affordance (e.g., "X" button 2002a or back button 2002b).

In FIG. 24C, device 600 detects user input 2450d corresponding to selection of front door (doorbell) camera affordance 2450d. FIG. 24E illustrates in response to detecting user input 2450d (as illustrated in FIG. 24C), device 600 displays status and notifications user interface 2422 corresponding to the front door (doorbell) camera (Camera 1).

In FIG. 24E, status and settings user interface 2422 for the front door (doorbell) camera is analogous to status and notifications user interface 2222 for the living room camera. Status and notifications user interface 2422 is displayed when the selected camera is a second type of camera (e.g., a doorbell camera). Status and notifications user interface 2422 includes notifications affordance 1804, time affordance 1806, people affordance 1808, and activity detection affordance 2240. Status and notifications user interface 2422 also includes additional doorbell notifications affordance 2410 and activity notifications affordance 2412 that are displayed when the selected camera is a second type of camera and that are not displayed when the selected camera is a first type of camera. Activity affordance 2412 enables Camera 1 to transmit a first type of notification based on detected activity (e.g., notifications triggered by motion detection) by Camera 1. Doorbell notifications affordance 2410 enables Camera 1 to transmit a second type of notification based on user interaction with the doorbell (or any accessory associated with the doorbell camera such as an intercom). The first type of notification and second type of notification are set independently by corresponding affordances 2412 and 2410. When activity detection affordance 2240 is enabled, affordances 1806, 1808, and 2240 are displayed. When activity detection affordance 2412 is disabled, affordances 1806, 1808, and 2240 are hidden. Affordances 1804, 1806, and 1808, are discussed above with respect to FIGS. 18C-18D.

Figure 24F:
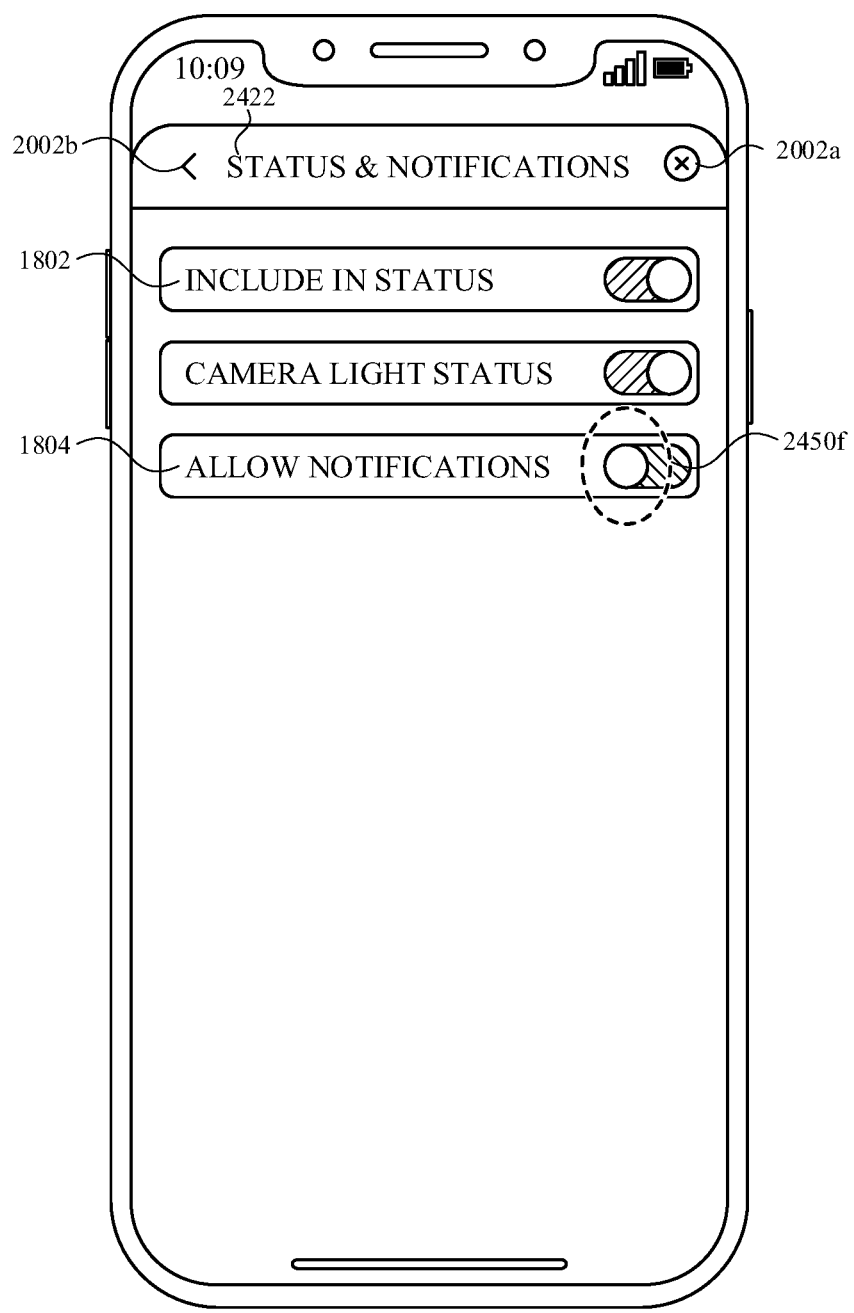

In FIG. 24E, device 600 detects user input 2450e corresponding to selection of notifications affordance 1804 to turn off notifications from Camera 1. As illustrated in FIG. 24F, when notifications affordance 1804 is disabled, Camera 1 is configured to not transmit notifications. Thus, disabling notifications affordance 1804 results in doorbell notifications affordance 2410 and activity notifications affordance 2412 automatically being disabled without additional user input. In addition, disabling activity notifications affordance 2412 results in device 600 ceasing to display affordances 1806, 1808, and 2240, as discussed with respect to FIGS. 22H and 24D device 600 also ceases to display doorbell notifications affordance 2410 and activity notifications affordance 2412. In some embodiments, in response to detecting user input 2450e, device 600 displays doorbell notifications affordance 2410 and activity notifications affordance 2412, but both affordances are disabled and cannot be enabled unless notifications affordance 1804 is enabled. In some embodiments, subsequent to (e.g., in response to) detecting user input 2450e, device 600 transmits information (e.g., to Camera 1 or a hub that is in communication with Camera 1) to update the configuration profile of Camera 1 to disable notifications for Camera 1 including disabling both activity notifications and doorbell notifications. In some embodiments, device 600 transmits information (e.g., to Camera 1 or a hub that is in communication with Camera 1) to update the configuration profile of the Camera 1 to disable notifications for the doorbell camera after detecting an additional user input on a confirmation affordance (e.g., "X" button 2002a or back button 2002b).

Figure 24G:
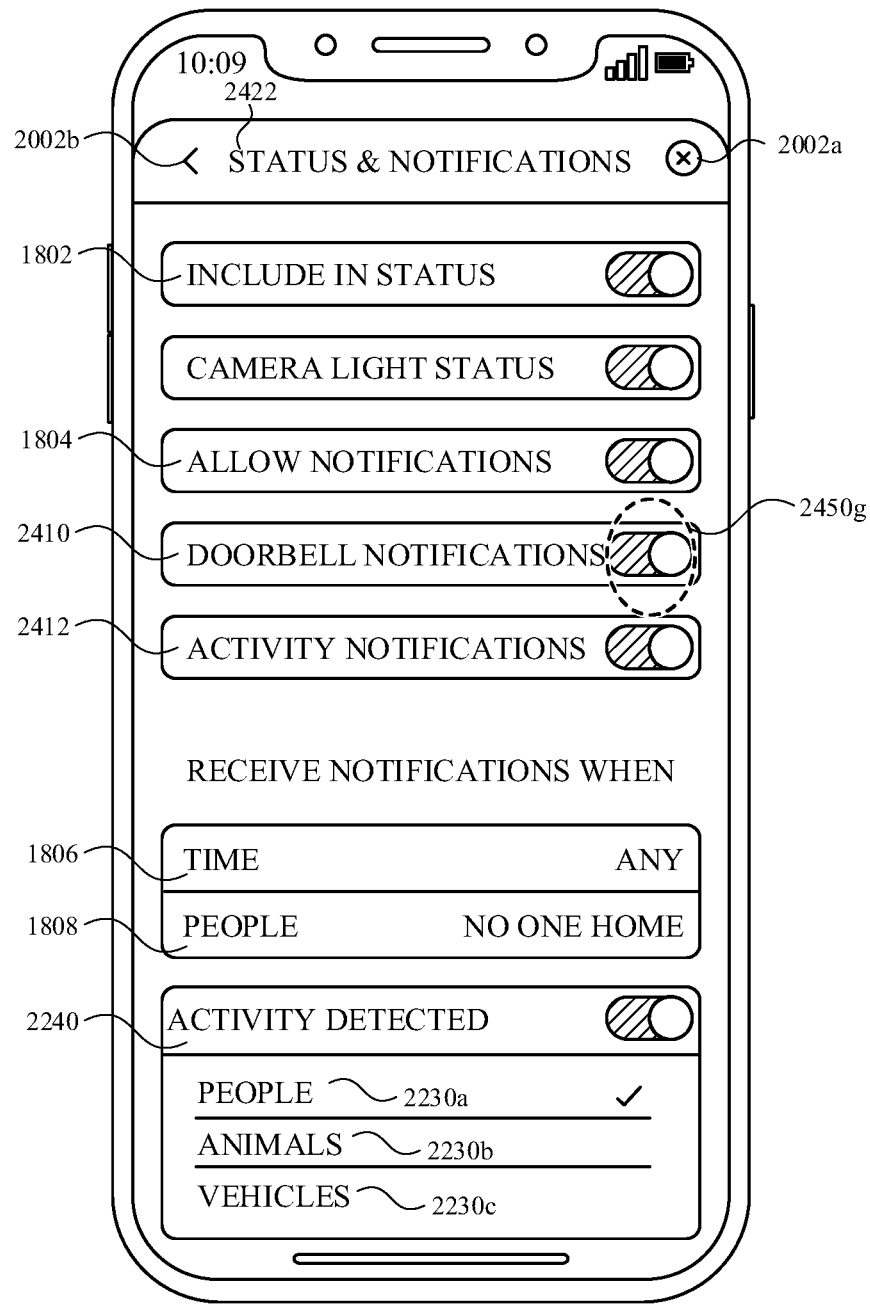

In FIG. 24F, device 600 detects user input 2450f corresponding to selection of notifications affordance 1804 corresponding to enabling notifications on Camera 1, which was previously disabled. As illustrated in FIG. 24G, when notifications affordance 1804 is enabled, device 600 displays doorbell notifications affordance 2410, activity notifications affordance 2412, time affordance 1805, people affordance 1808, and activity detection affordance 2240 including motion detection affordances 2230a-2230c. In some embodiments, subsequent to (e.g., in response to) detecting user input 2450f, device 600 transmits information (e.g., to Camera 1 or a hub that is in communication with Camera 1) to update the configuration profile of Camera 1 to enable notifications for Camera 1. In some embodiments, device 600 transmits information (e.g., to Camera 1 or a hub that is in communication with Camera 1) to update the configuration profile of Camera 1 to enable notifications for Camera 1 after detecting an additional user input on a confirmation affordance (e.g., "X" button 2002a or back button 2002b).

Figure 24H:
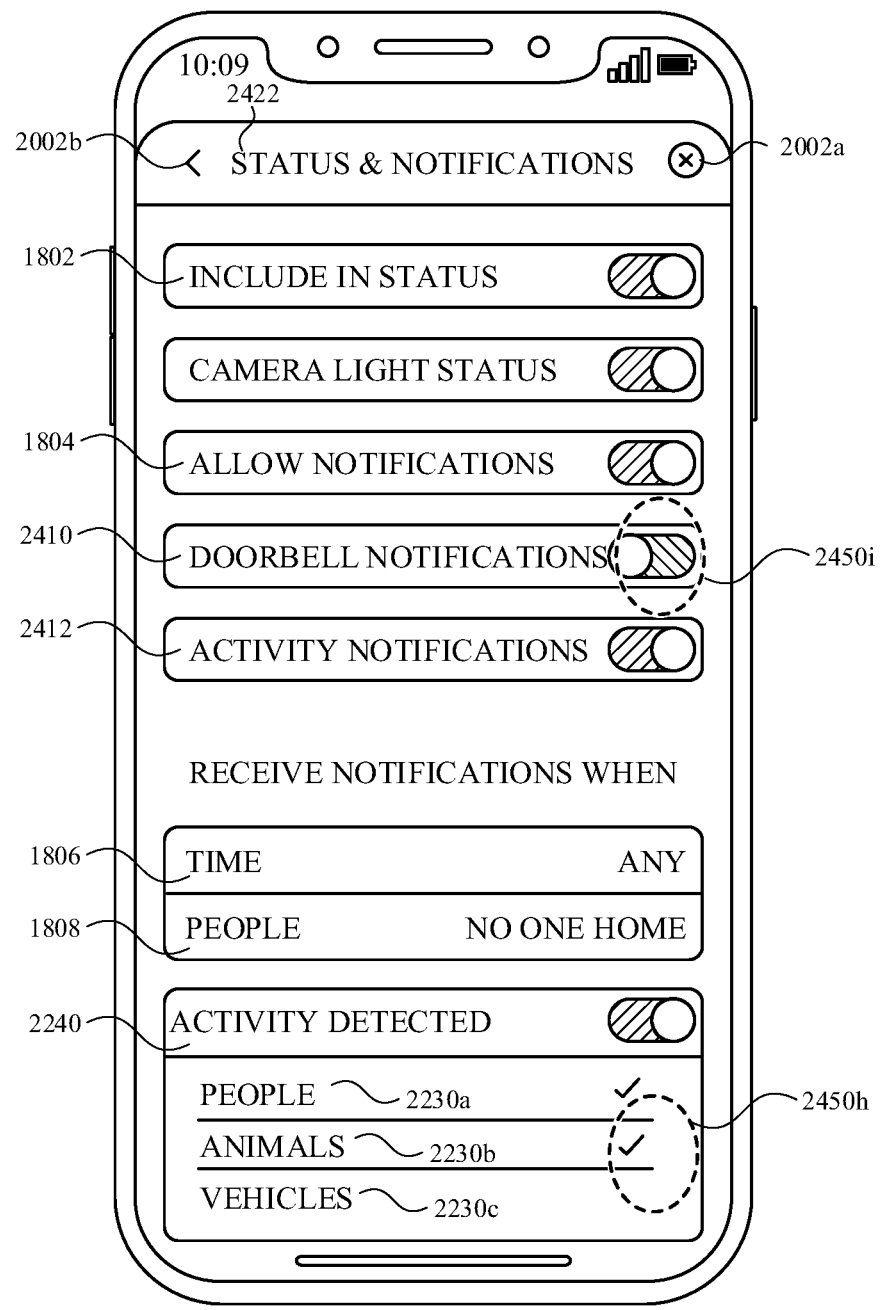

In FIG. 24G, device 600 detects user input 2450g corresponding to selection of doorbell notifications affordance 2410 to disable doorbell notifications (e.g., the second type of notifications sent when someone presses the doorbell or intercom button or a doorbell) as illustrated in FIG. 24H. However, disabling doorbell notifications does not disable activity notifications (e.g., a first type of notifications triggered by activity such as the detected motion of people), which are set independently of the doorbell notifications. Activity notifications are configured by activity notifications settings, which remain enabled. Thus, activity notifications may be triggered even when doorbell notifications are turned off. In some embodiments, subsequent to (e.g., in response to detecting user input 2450g), device 600 transmits information (e.g., to Camera 1 or a hub that is in communication with Camera 1) to update the configuration profile of Camera 1 to disable doorbell notifications without updating the activity notifications settings. In some embodiments, device 600 transmits information (e.g., to Camera 1 or a hub that is in communication with Camera 1) to update the configuration profile of Camera 1 to disable doorbell notifications for Camera 1 without updating the activity notifications settings after detecting an additional user input on a confirmation affordance (e.g., "X" button 2002a or back button 2002b).

As illustrated in FIG. 24H, device 600 detects user input 2450h corresponding to selection of a motion detection affordance 2230b to trigger activity notifications (e.g., the first type of notifications) based on the detected motion of "Animals", while doorbell notifications remain disabled. The selected motion detection condition "Animals" is displayed with a check mark indicator to indicate that the condition is enabled. In some embodiments, subsequent to (e.g., in response to) detecting user input 2450h, device 600 transmits information (e.g., to Camera 1 or a hub that is in communication with Camera 1) to update the configuration profile of Camera 1 to enable notifications based on the selected motion detection condition without updating the doorbell notifications settings. In some embodiments, device 600 transmits information (e.g., to Camera 1 or a hub that is in communication with Camera 1) to update the configuration profile of Camera 1 to enable activity notifications for Camera 1 based on the selected motion detection condition without updating the doorbell notifications settings after detecting an additional user input on a confirmation affordance (e.g., "X" button 2002a or back button 2002b).

Figure 24I:
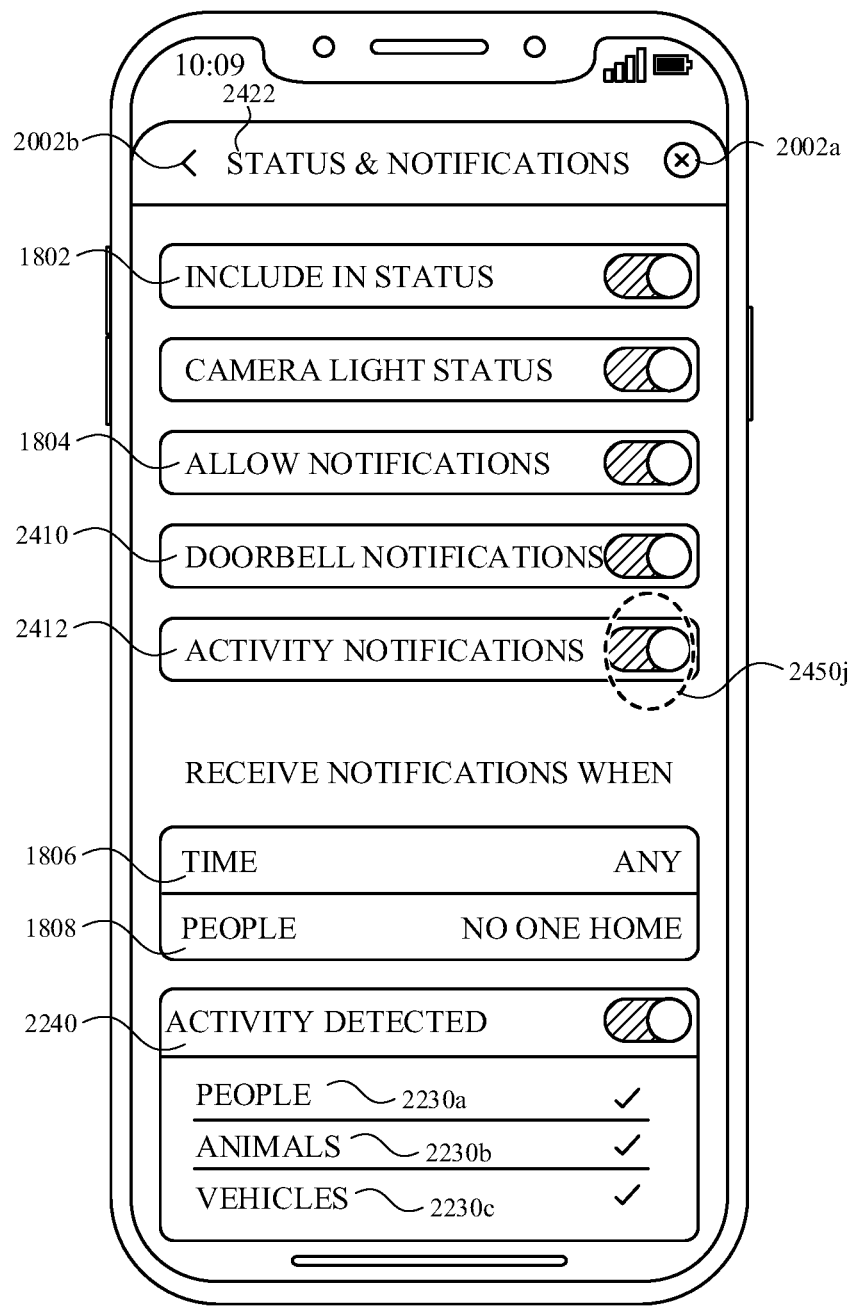

In FIG. 24H, device 600 detects user input 2450i corresponding to enabling doorbell notifications affordance 2410. Enabling doorbell notifications in response to user input 2450i does not affect the activity notifications settings (e.g., motion detection settings) set by user input 2450h to enable notifications based on motion detection of "Animals". As illustrated in FIG. 24I, the activity detection settings remain the same (motion detection of "Animals" is still enabled) as when doorbell notifications were disabled. In some embodiments, in response to detecting user input 2450i, device 600 transmits information (e.g., to Camera 1 or a hub that is in communication with Camera 1) to update the configuration profile of Camera 1 to enable doorbell notifications for Camera 1 without updating activity notification based on motion detection. In some embodiments, device 600 transmits information (e.g., to Camera 1 or a hub that is in communication with Camera 1) to update the configuration profile of Camera 1 to enable doorbell notifications without updating the activity notifications settings based on motion detection after detecting an additional user input on a confirmation affordance (e.g., "X" button 2002*a* or back button 2002*b*).

Figure 24J:
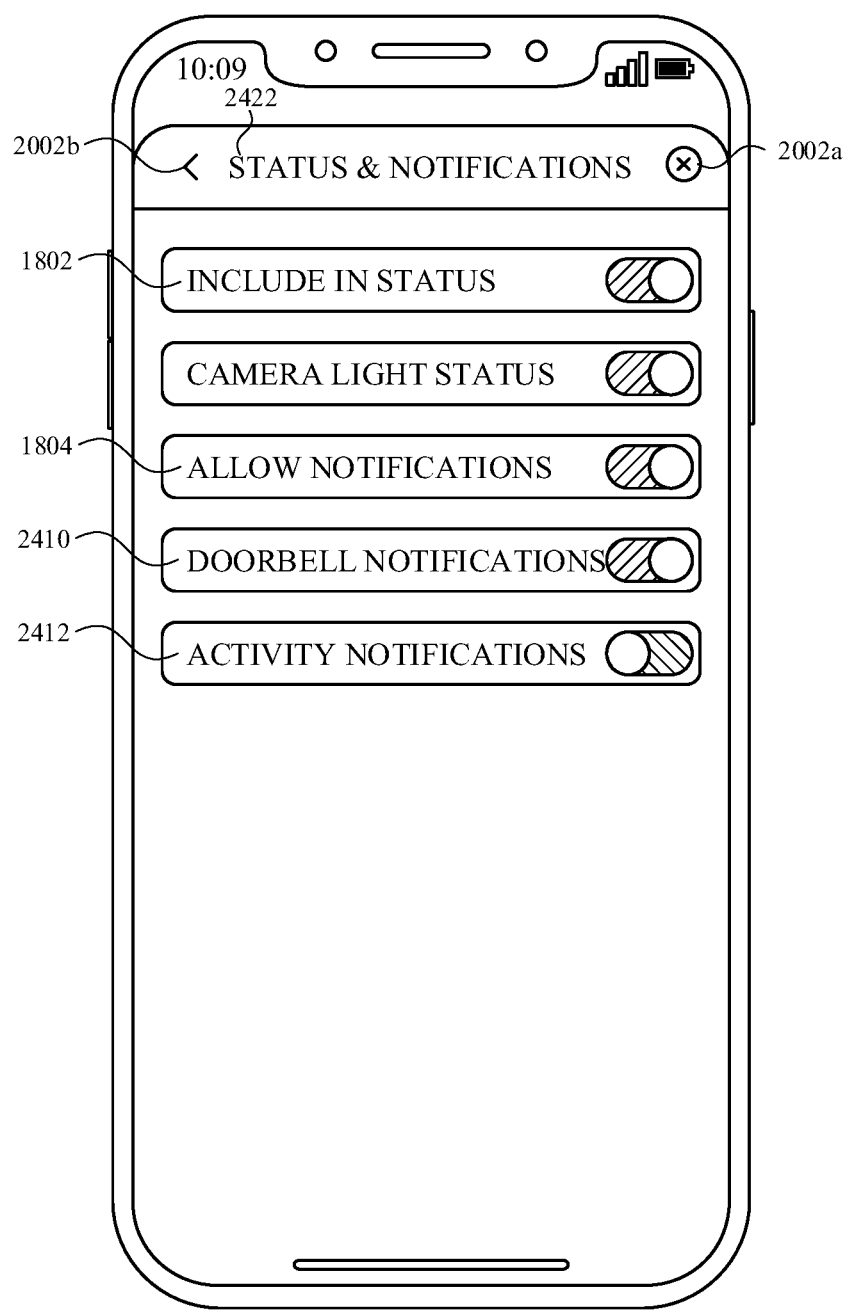

As illustrated in FIG. 24I, while doorbell notifications are enabled, device 600 detects user input 2450*j* corresponding to disabling activity notifications affordance 2412. As illustrated in FIG. 24J, in response to detecting user input 2450*j* (as illustrated in FIG. 24I), activity notifications affordance 2412 is disabled, resulting in all activity based notifications (e.g., the first type of notifications based on time, people, and motion detection) being disabled. FIG. 24J illustrates that in response to disabling activity notifications affordance 2422, device 600 does not display time affordance 1806, people affordance 1808, activity detection affordance 2240, and motion detection affordances 2230*a*-2230*c*. Disabling activity notifications affordance 2422 in notifications setting user interface 2422 for the doorbell camera has the same effect as disabling notifications affordance 1804 in notifications setting user interface 2222 for other types of non-doorbell cameras (e.g., living room camera), which is to disable Camera 3 from transmitting the first type of notifications. However, disabling activity notifications on Camera 1 does not disable doorbell notifications (the second type of notifications), which remain enabled as doorbell notifications are independently configured. In some embodiments, in response to detecting user input 2450*j*, device 600 transmits information (e.g., to Camera 1 or a hub that is in communication with Camera 1) to update the configuration profile of Camera 1 to disable activity notification without disabling doorbell notifications. In some embodiments, device 600 transmits information (e.g., to Camera 1 or a hub that is in communication with Camera 1) to update the configuration profile of Camera 1 to disable activity without disabling doorbell notifications after detecting an additional user input on a confirmation affordance (e.g., "X" button 2002*a* or back button 2002*b*).

FIGS. 25A-25D are a flow diagram illustrating a method for configuring notifications settings of an external camera using an electronic device in accordance with some embodiments. Method 2500 is performed at a device (e.g., 100, 300, 500, or 600) with a display. Some operations in method 2500 are, optionally, combined, the orders of some operations are, optionally, changed, and some operations are, optionally, omitted.

As described below, method 2500 provides an intuitive way for configuring a first type of notifications based on activity detection by a first type of external camera and a second type of notifications based on activity detected by a second type of external camera. Allowing users to receive a particular type of notifications (e.g., doorbell notifications) while excluding other types of notifications (e.g., activity notifications) reduces the cognitive burden on a user so that fewer notifications are displayed, thereby creating a more efficient human-machine interface. For battery-operated computing devices, enabling a user to configure the type of notifications the user wants to receive allows the user to efficiently conserve power on the device and increases the time between battery charges.

At block 2502, the device (e.g., 600) receives data identifying a source of video data. Optionally at block 2504, sources of video data of the first type (e.g., non-doorbell camera) include a camera and do not include an input mechanism for generating alerts. Optionally, at block 2506, sources of video data of the second type (e.g., doorbell camera) include a camera and an input mechanism for generating alerts (e.g., a doorbell). In some embodiments, the electronic device determines whether sources of video data are of a first type or of a second type (e.g., not of the first type) based on whether the respective sources of video data include an input mechanism (that is optionally integrated into the device of the source of video data) (e.g., a mechanical button, a capacitive button) for generating alerts (e.g., a chime by a speaker, an alert sent to another device that causes a notification on the another device). The device optionally categorizes sources of video data that do not include an input mechanism (as described) as being of the first type and sources of video data that do include an input mechanism (as described) as being of the second type.

In response to receiving the data identifying the source of video data, at block 2508, in accordance with a determination that the source of video data is a first type of source of video data (e.g., a non-doorbell camera) the device displays, on the display device, a first notifications settings affordance (e.g., 1804) (e.g., camera activity notifications) without displaying a second notifications settings affordance (e.g., 2410)(e.g., doorbell notifications), wherein the first notifications settings affordance enables (and disables) a first type of notifications (e.g., notifications based on activity detection/motion detection by the source of video data) for the source of video data.

At block 2510, in accordance with a determination that the source of video data is a second type of source of video data (e.g., doorbell camera), the device concurrently displays, on the display device: at block 2512, the first notifications settings affordance (e.g., 1804) (activity notifications), and at block 2514, the second notifications settings affordance (e.g., 2410) (for enabling (or disabling) notifications for doorbell notifications), wherein the second notifications settings affordance enables (and disables) a second type of notifications (e.g., notifications based on detecting user input with the doorbell or intercom) for the source of video data. In some embodiments, the second notifications settings affordance is associated with an accessory (e.g., doorbell) of the source of video data (e.g., doorbell camera).

Allowing users to configure whether to configure the device to receive notifications for a first type of camera while not receiving notifications for a second type of camera, creates a more efficient human-machine interface. Users may want to receive particular types of notification sent by a particular type of camera (e.g., notifications only sent when someone is at the front door). For battery-operated computing devices, enabling a user to configure the type of notifications the user wants to receive allows the user to efficiently conserve power on the device and increases the time between battery charges.

At block 2516, (while displaying at least the first notifications settings affordance (e.g., 1804) and, optionally, the second notifications settings affordance (e.g., 2410)) the device detects a first input (e.g., 2450*e*). At block 2518, in accordance with a determination that the first input corresponds to activation (e.g., toggling on/off) of the first notifications settings affordance (e.g., 1804), the device transmits information to set the configuration profile of the source of video data according to the first notifications settings affordance such that first type of notifications are enabled.

At block 2520, in accordance with a determination that the first input (e.g., 2450*g*) corresponds to activation (e.g., toggling on/off) of the second notifications settings affordance (e.g., 2410), the device transmits information to set the configuration profile of the source of video data according to the second notifications settings affordance such that the second type of notifications are enabled.

Optionally, at block 2522, the device displays, on the display device, a plurality of motion detection affordances (e.g., 2230*a*-2230*c*), including, at block 2524, a first motion detection affordance (e.g., 2230*a*) corresponding to a first motion detection condition (e.g., a motion detection condition that is satisfied when the source of video data (e.g., a camera) detections motion of a person within a field of view of the source of video data), and at block 2526, a second motion detection affordance (e.g., 2230*b* or 2230*c*) corresponding to a second motion detection condition different from the first motion detection condition (e.g., a motion detection condition that is satisfied when motion of an animal or a vehicle is detected).

Allowing a user to configure the first type of notifications independently of settings for the second type of notifications creates a more efficient human-machine interface and provides the user with flexibility to manage notifications from multiple camera sources. For battery-operated computing devices, enabling a user to configure the type of notifications the user wants to receive allows the user to efficiently conserve power on the device and increases the time between battery charges.

Optionally, at block 2528, the device detects a second input corresponding to a selection of the first motion detection condition (e.g., 2450*h*). Optionally, at block 2530, subsequent to (e.g., in response to) detecting the second input (and, optionally, also tapping "done"), the device transmits information to update notifications settings of the configuration profile of the source of video data (e.g., doorbell cameras) according to the selected motion detection condition without updating the notifications settings of the second type of notifications.

Optionally at block 2532, while displaying the second notifications settings affordance (2410) (in accordance with a determination that the source of video data is the second type of source of video data), the device detects a third input (e.g., 2450*g*) corresponding to activation of the second notifications settings affordance (e.g., turning off doorbell notifications, but leaving on motion detection). Optionally, at block 2534, subsequent to detecting the third input (and, optionally, also tapping "done"), the device transmits information to update notifications settings of the configuration profile of the source of video data (e.g., doorbell camera) according to the second notifications settings affordance such that the second type of notifications are disabled without updating the notifications settings of the first type of notifications (e.g., doorbell camera can still send notifications based on detected motion of people, but not based on detection of someone pressing the doorbell).

In some embodiments, in accordance with a determination that the source of video data is a second type of source of video data (e.g., doorbell camera): while displaying the second notifications settings affordance (e.g., 2412), the device detects a fourth input (e.g., 2450*i*) corresponding to activation of the second notifications settings affordance (e.g., enable doorbell notifications). In some embodiments, the device displays a third notifications settings affordance (e.g., 2410) (to toggle all activity notifications on the camera but not doorbell notifications) concurrently with the first notifications settings affordance and the second notifications settings affordance.

In some embodiments, while displaying the third notifications settings affordance (e.g., 2410), the device detects a fifth input (e.g., 2450*j*) corresponding to activation of the third notifications settings affordance (e.g., turn off all of the first type of notifications such as motion detection triggered notifications from the doorbell camera). In some embodiments, in response to detecting the fifth input, the device ceases display of the plurality of motion detection affordances (e.g., 2230*a*-2230*c*). In some embodiments, subsequent to detecting the fifth input (and, optionally, also tapping "done"), the device transmits information to update the notifications settings of the configuration profiles of the source of video data (e.g., doorbell cameras) according to the third notifications settings affordance (turn off all motion detection conditions for triggering notifications for the camera) such that the first type of notifications are disabled without updating the notifications settings of the second type of notifications (e.g., doorbell settings remain the activated).

In some embodiments, in accordance with a determination that the source of video data is a second type of source of video data: while displaying the first notifications settings affordance (e.g., 1804), the device detects a sixth input (2450*e*) corresponding to activation of the first notifications settings affordance (e.g., disable all notifications on camera). In some embodiments, in response to detecting the sixth input, the device ceases display of the plurality of motion detection affordances (e.g., 2230*a*-2230*c*) and the second notifications settings affordance (e.g., 2410). In some embodiments, subsequent to detecting the sixth input (and, optionally, also tapping "done"), the device transmits information to update notifications settings of the configuration profiles of the source of video data (e.g., doorbell cameras) such that (turn off all notifications for the camera including doorbell notifications) the first type of notifications and the second type of notifications for the source of video data are disabled.

Note that details of the processes described above with respect to method 2500 (e.g., FIGS. 25A-25D) are also applicable in an analogous manner to the methods described above/below. For example, method 2500 optionally includes one or more of the characteristics of the various methods described above with reference to method 700, 900, 1100, 1300, 1500, 1700, 2100, 2300, and 2700. For example, the controllable external device described in method 900 can be the controllable external device of method 2500 for which a configuration profile is set. For brevity, these details are not repeated below.

FIGS. 26A-26I illustrate exemplary video media user interfaces displaying clip representations and indicators that indicate the type of conditions that triggered the recording, in accordance with some embodiments, in accordance with some embodiments. The user interfaces of FIGS. 26A-26H are used to illustrate the processes described below, including the processes in FIGS. 27A-27B.

Figure 26A:
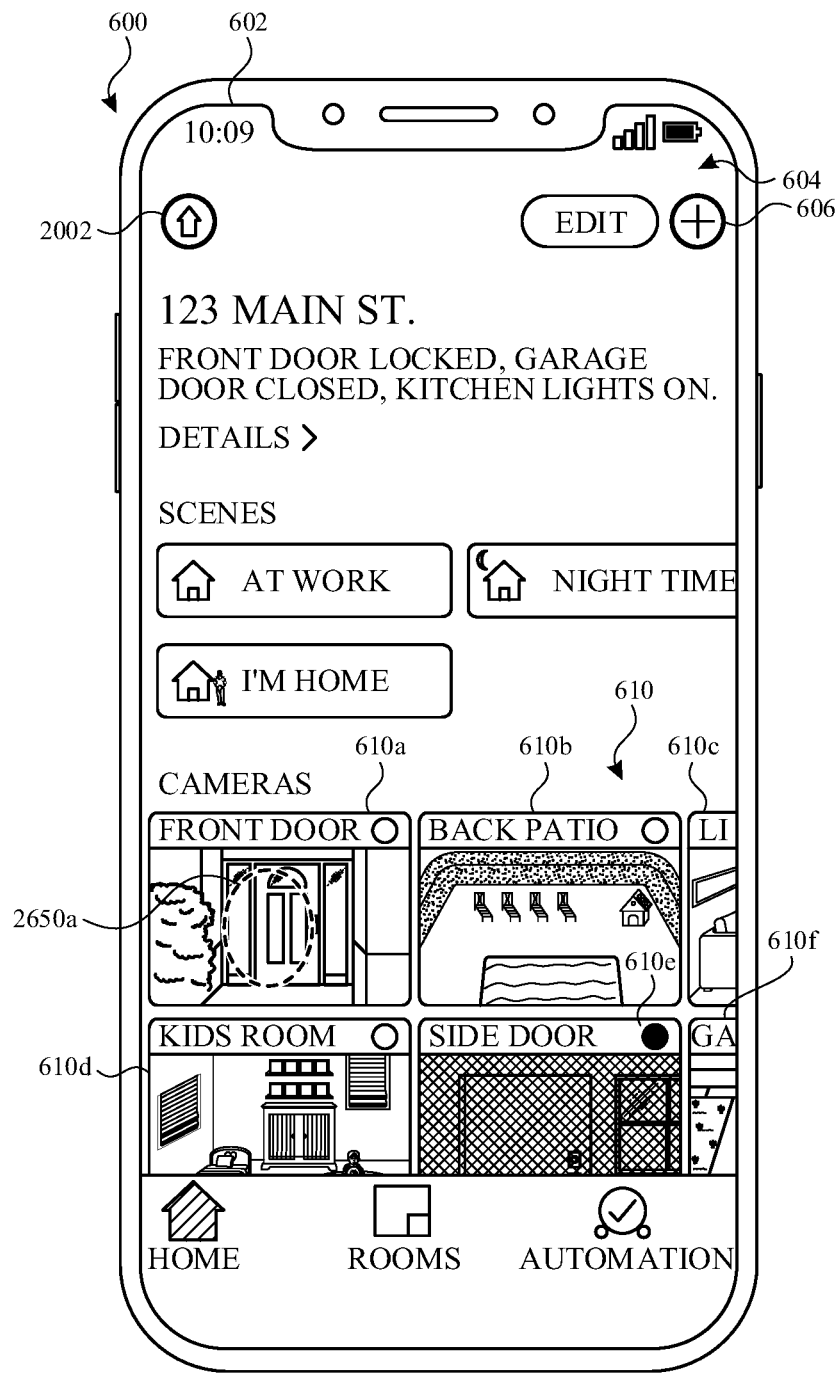
FIGS. 26A-26I illustrate exemplary user interfaces for displaying clip representations and indicators that indicate the type of conditions that triggered the recording in accordance with some embodiments.
Figure 26B:
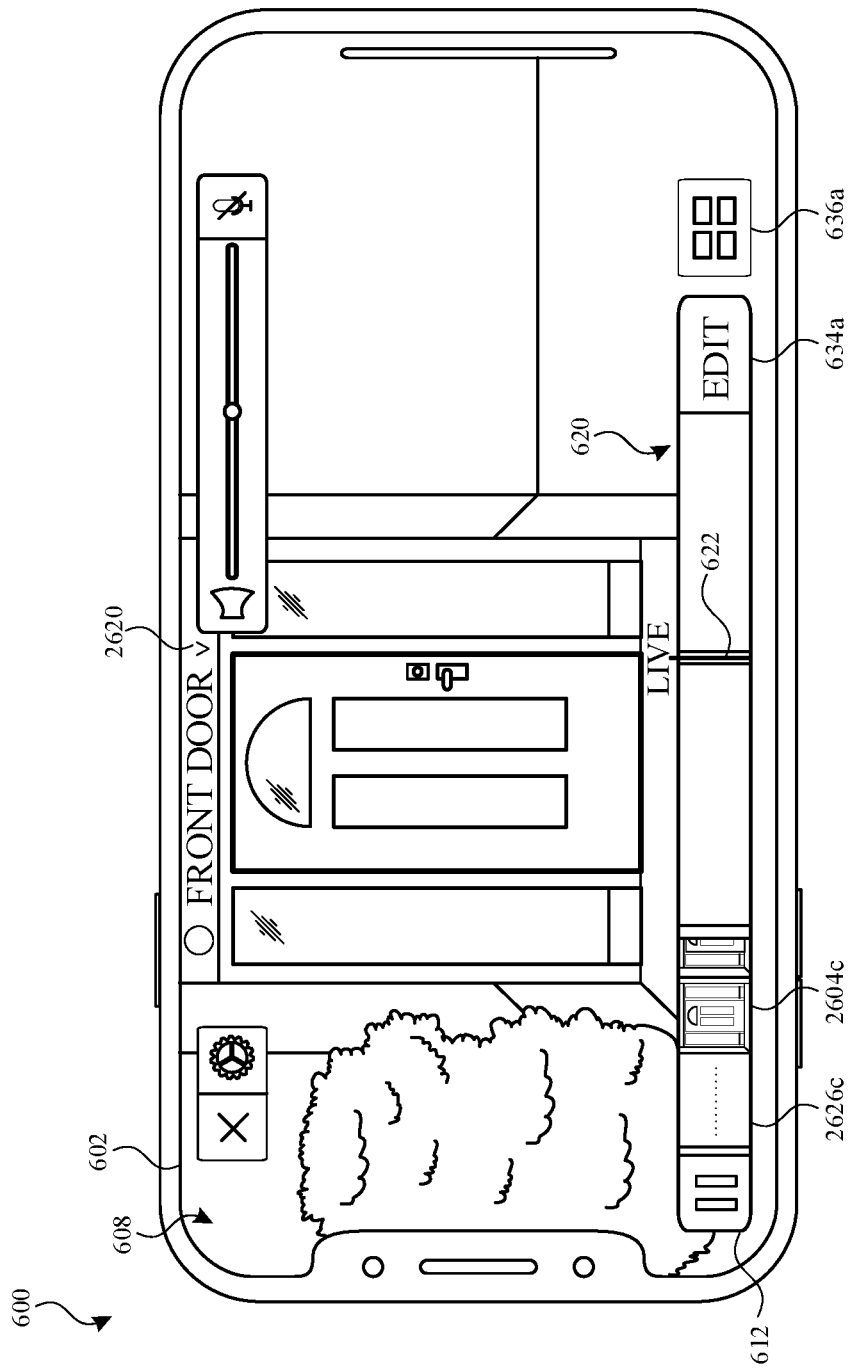

FIG. 26A illustrates device 600 displaying user interface 604, which is the same as user interface 604 illustrated in FIG. 6A and FIG. 12A. At FIG. 20A, device 600 receives (e.g., detects) user input 2650*a* (e.g., a tap) to select a displayed front door camera (e.g., Camera 1 610*a*) (as described in further detail with respect to FIG. 6A). As illustrated in FIG. 26B, in response to receiving user input 2650*a*, device 600 displays video media user interface 608 that includes a live (e.g., non-recorded, real-time) video feed from Camera 1. In some embodiments, video media user interface 608 includes an add button for adding a new scene or automation associated with Camera 1. Play/pause affordance 612 can be selected (e.g., with a tap input on display 602) to pause the live video feed. Video media user interface 608 also includes scrubber bar 620. As illustrated in FIG. 26B, scrubber bar 620 includes an interactive, elongated region on display 602 that includes a representation of media content that can be scrolled along the direction parallel to direction of elongation. Video media user interface 608 is the same as the video media user interface 608 of FIG. 6B and is further described with respect to FIG. 6B.

Current display indicator 622 in scrubber bar 620 indicates the portion of scrubber bar 620 that corresponds to the currently displayed image. Positions on scrubber bar 620 to the left of the current display indicator correspond to previously recorded clips, whereas positions on scrubber bar 620 to the right of the current display indicator 622 correspond to times after the time associated with the currently displayed image.

As illustrated in FIG. 26B, scrubber bar 620 includes clip representation 2604c which is a recorded clip of video from Camera 1. Scrubber bar 620 of FIG. 26B has the same functionality as scrubber bar 620 of FIG. 6B. As illustrated in FIG. 26B, a recorded clip of video (e.g., 2604c) is represented by a rectangular representation that includes a representative image from the respective recorded clip of video (e.g., a thumbnail representation or an actual image from the clip, such as a key frame from the clip). In some embodiments, the image represents the first frame or a frame in the middle of the recorded clip of video (e.g., a representative frame). Scrubber bar 620 also includes break indication 2626c of periods of time during which recorded video from the Camera 1 is not available. As illustrated in FIG. 26B, the periods of time during which recorded video from Camera 1 is not available are indicated by spaces (e.g., areas with uniform color) and dots between representations of recorded clips of video, and do not have a representative frame from the video. The length of the representations of recorded clips of video and the spacing between the representations of recorded clips of video are further described above with respect to FIG. 6B. Device 600 displays representations of clips that were recorded from a previous day (or other time period) in a prior recordings section that is adjacent to live section in the scrubber bar, as illustrated by clip representation 2604c.

Figure 26C:
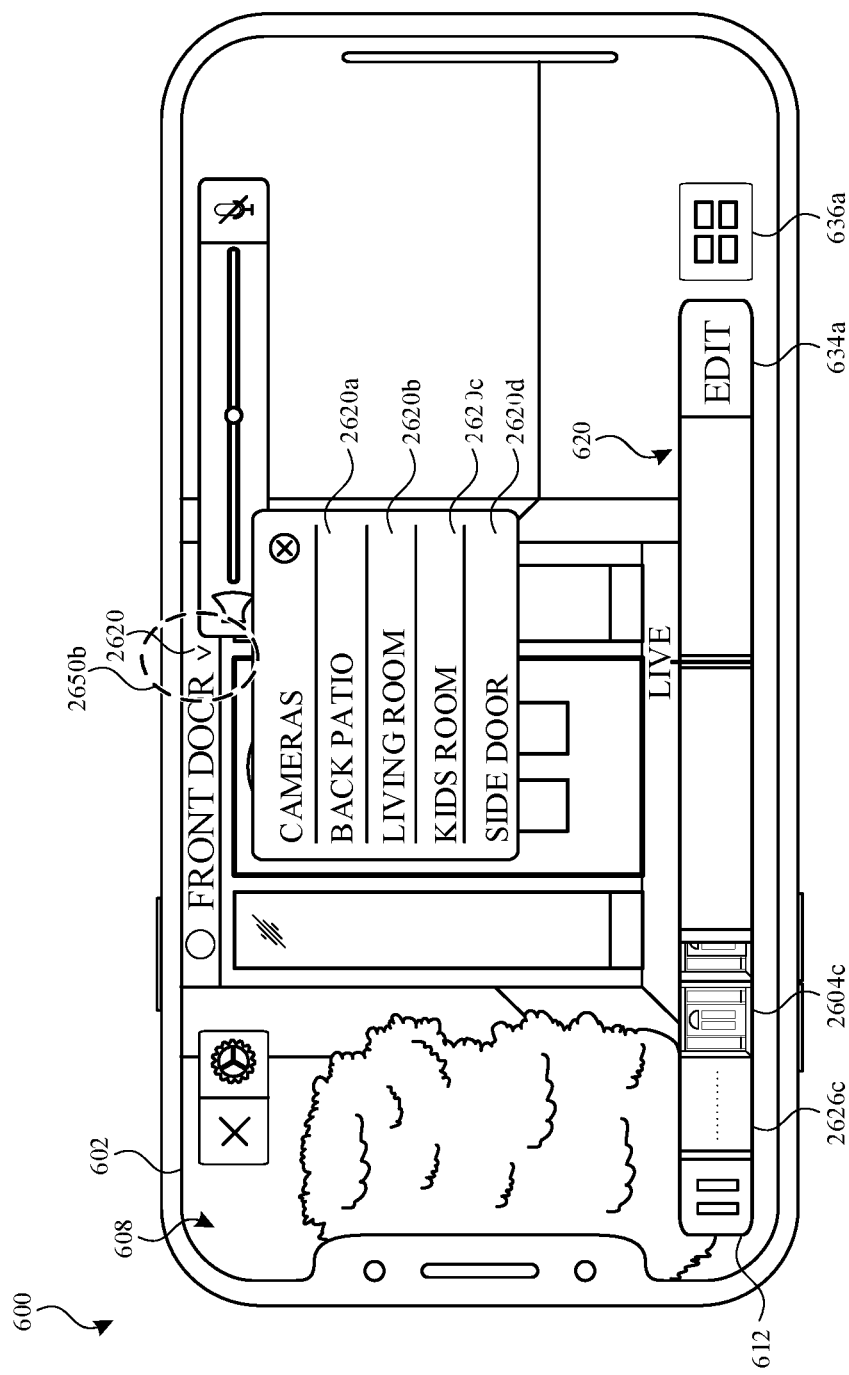

In FIG. 26C, device 600 displays affordance 2620, represented by a chevron in video media user interface 608. Device 600 detects user input 2650b to expand affordance 2620. Affordance 2120 provides the user with a shortcut to switch between cameras without navigating back to user interface 610 to select a different camera. Expanded affordance 2620 includes a menu listing affordances 2620a-2620d corresponding to cameras linked to the device. In some embodiments, when device 600 detects activation of one of affordances 2620a-20620d, device 600 changes the display of the front door camera to a display of the back patio camera.

Figure 26D:
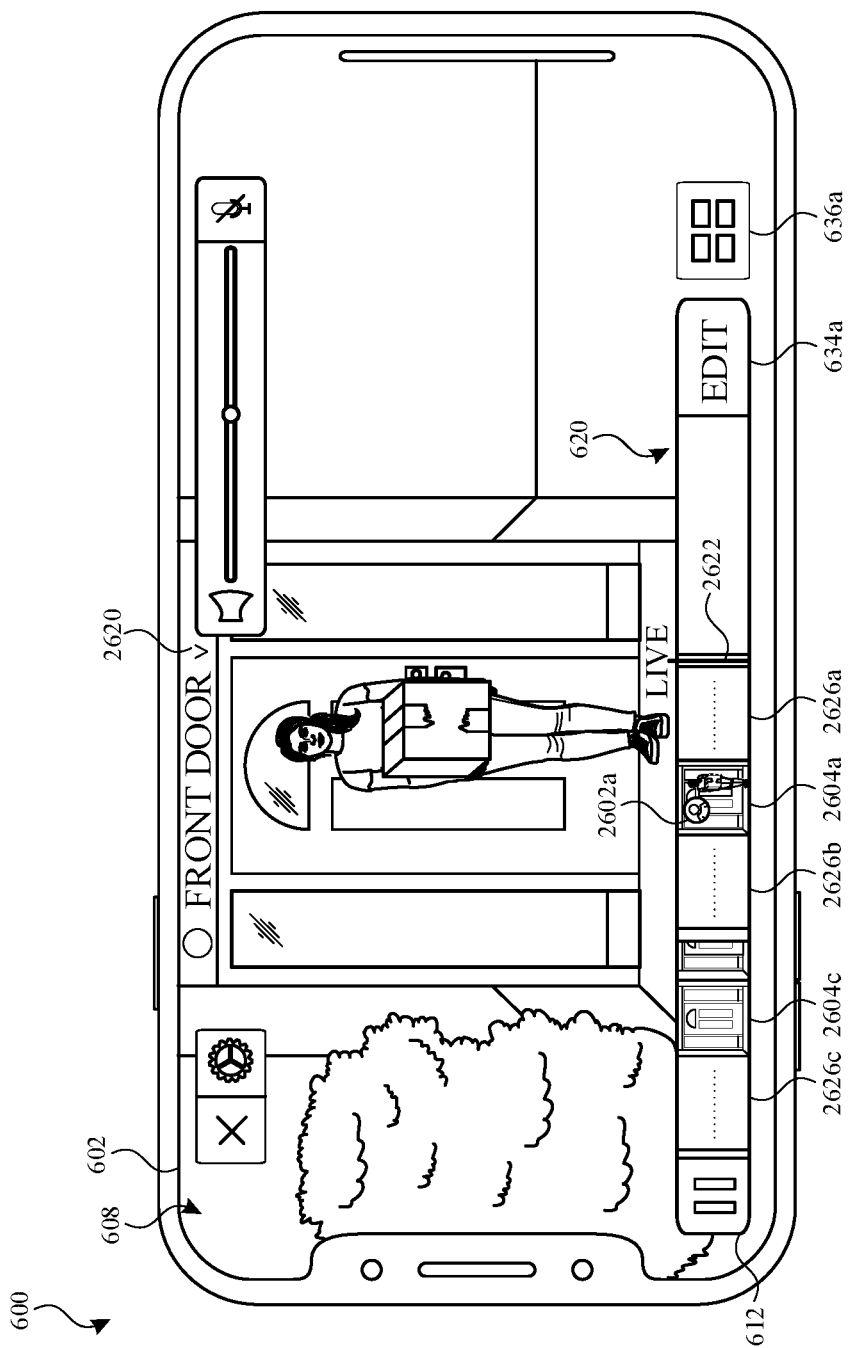

FIG. 26D illustrates a live video feed showing a package on the front door step, (which is captured by the camera later in time as compared to FIG. 26C). As illustrated in FIG. 26D, a person picks up the package. The motion of the person in the field of view of Camera 1 triggers recording on Camera 1 (e.g., via motion detection processing by Camera 1). Recording is triggered when motion of a person is detected in accordance with a motion detection condition setting (e.g., record when motion of a person is detected) being enabled in the configuration profile of Camera 1. In response to detecting the motion, the live video feed from Camera 1 is recorded (e.g., by Camera 1 and sent to a server remote to Camera 1 or device 600). In some embodiments, a video data from Camera 1 is recorded for a predetermined amount of time (e.g., 10 seconds from the time motion is detected or from the time motion is detected until 10 seconds after motion ceases to be detected).

In FIG. 26D, Camera 1 starts recording based on the detected motion from the person (based on the configurations to record based on motion detection) and sends data representing the newly recorded clip to device 600 (or a server) with information indicating the triggering condition for recording. Device 600 receives data representing the newly recorded clip of video and information indicating that the triggering condition is the detected motion of a person. In response to receiving data representing the recorded clip of the video, device 600 displays a clip representation 2604a of the recorded clip in scrubber bar 620 at a position representative of the time the clip was recorded. Device 600 determines corresponding indicator 2602a to display with clip representation 2604a, based on the triggering condition provided in the corresponding clip information. Optionally, indicator 2602a does not include content captured by the camera (e.g., indicator 2601a is not a frame (or part thereof) captured by Camera 1). The image used in indicator 2602a is an image corresponding to the type of triggering condition (e.g., icon of a person for the triggering condition being motion detection of a person, icon of an animal for the triggering condition being motion detection of a dog) that cause the recording to occur. Device 600 concurrently displays indicator 2602a with clip representation 2604a in scrubber bar 620, wherein indicator 2602a includes an indication of a person based on the information indicating motion detection of a person was the triggered condition. In some embodiments, the information indicates the triggering condition is a motion detection condition based on the detected motion of an animal or vehicle (and so a corresponding indication of an animal or vehicle, respectively, would be displayed). In some embodiments, the information indicates the triggering condition is a condition that was satisfied when an accessory of the camera (e.g., a doorbell, lock, light, or intercom) detected user input (e.g., someone pressed a doorbell button of a camera). In some embodiments, device 600 displays indicator 2602a overlaid on top of clip representation 2604a in scrubber bar 602. In some embodiments, indicator 2602a is smaller than the size of clip representation 2604a and overlaps with a portion of clip representation 2604a (and not another portion of clip representation 2604a) when displayed in scrubber bar 620. In some embodiments, indicator 2602a is displayed adjacent to clip representation 2604a, as illustrated in FIG. 26E.

Figure 26E:
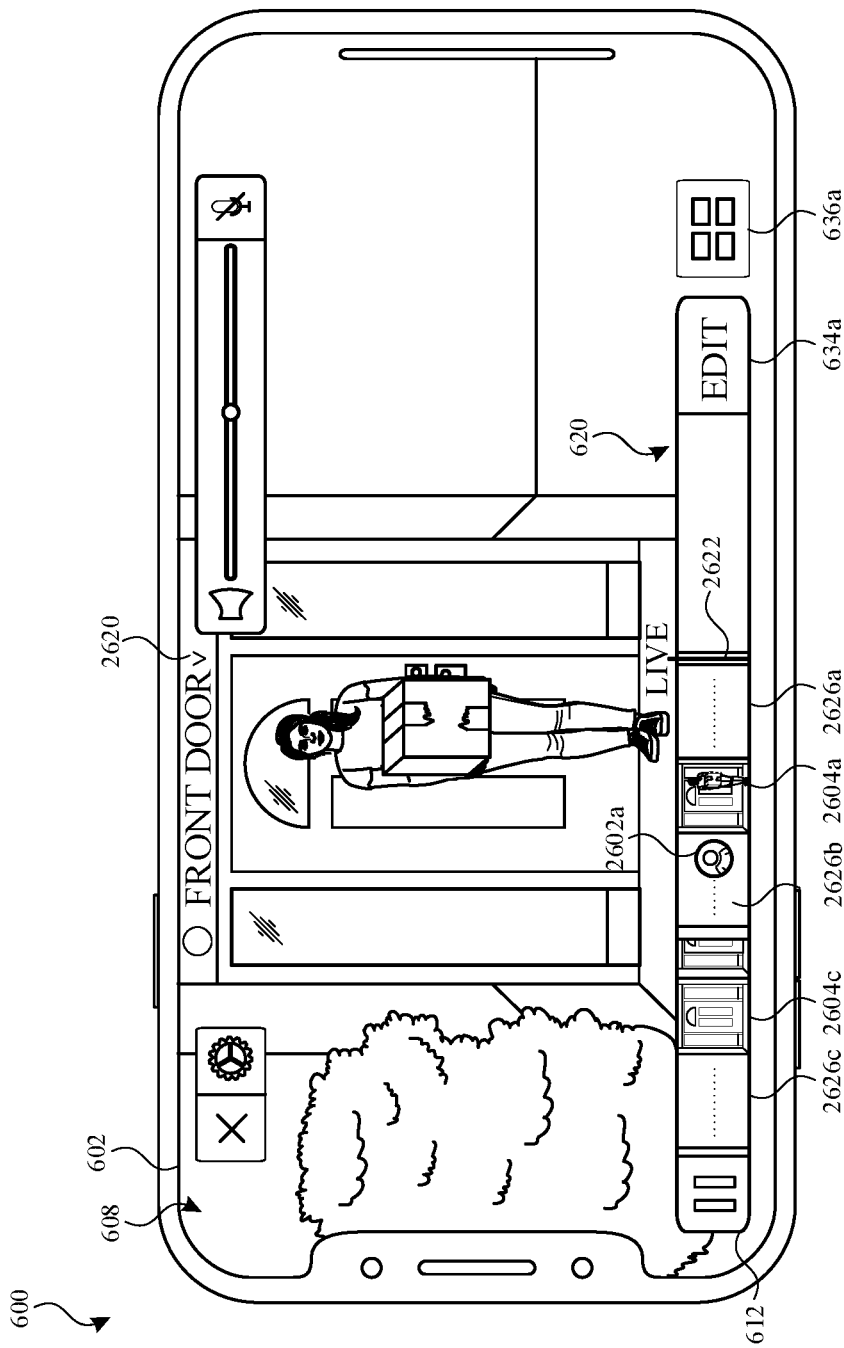
Figure 26F:
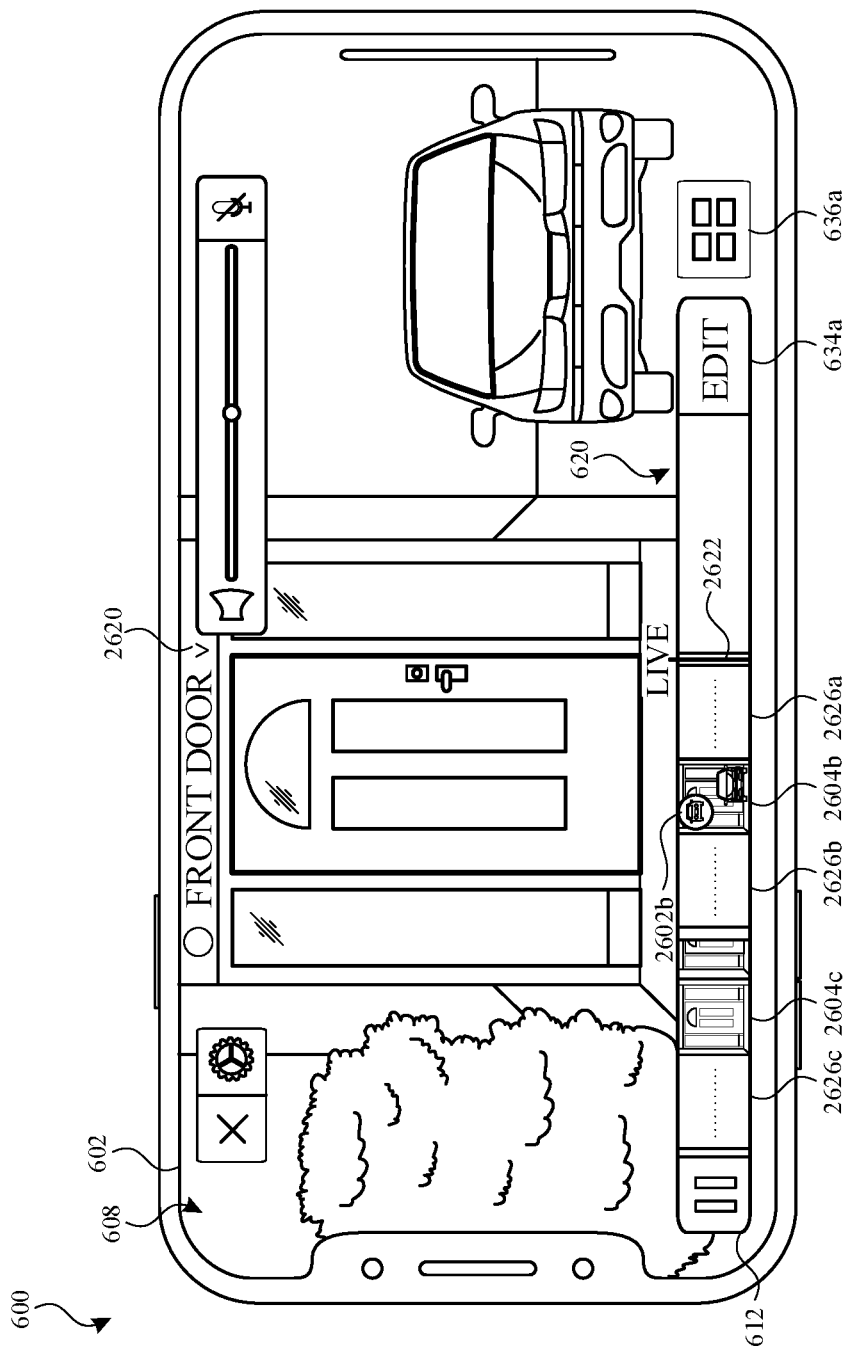

In FIG. 26F, Camera 1 detects motion of a car outside of the front door. Camera 1 starts recording based on the detected motion of the vehicle (based on the configurations to record based on motion detection) and sends data representing the newly recorded clip to device 600 (or a server) with information that detected motion of a vehicle triggered recording. Device 600 receives data representing the newly recorded clip of video and information indicating that the detected motion of a vehicle triggered recording from Camera 1. As illustrated in FIG. 26F, in response to receiving data representing a recorded clip of the video, device 600 displays a clip representation 2604b of the recorded clip with indicator 2602b in scrubber bar 620 at a position representative of the time the clip was recorded. Device 600 determines that the triggering condition for recording is the detected motion of the vehicle and displays indicator 2602b with an image of a vehicle to reflect the triggering condition. In this example, indicator 2602b does not include content captured by the camera (e.g., indicator 2601a is not a frame (or part thereof) captured by Camera 1). In some embodiments, information regarding the triggering condition for recording is not available or does not indicate a triggering condition. When the triggering condition is not provided, device 600 displays clip representation 2604c without an indicator. In some embodiments, device 600 displays clip representation 2604c with an indicator indicating the triggering condition is not known.

Figure 26G:
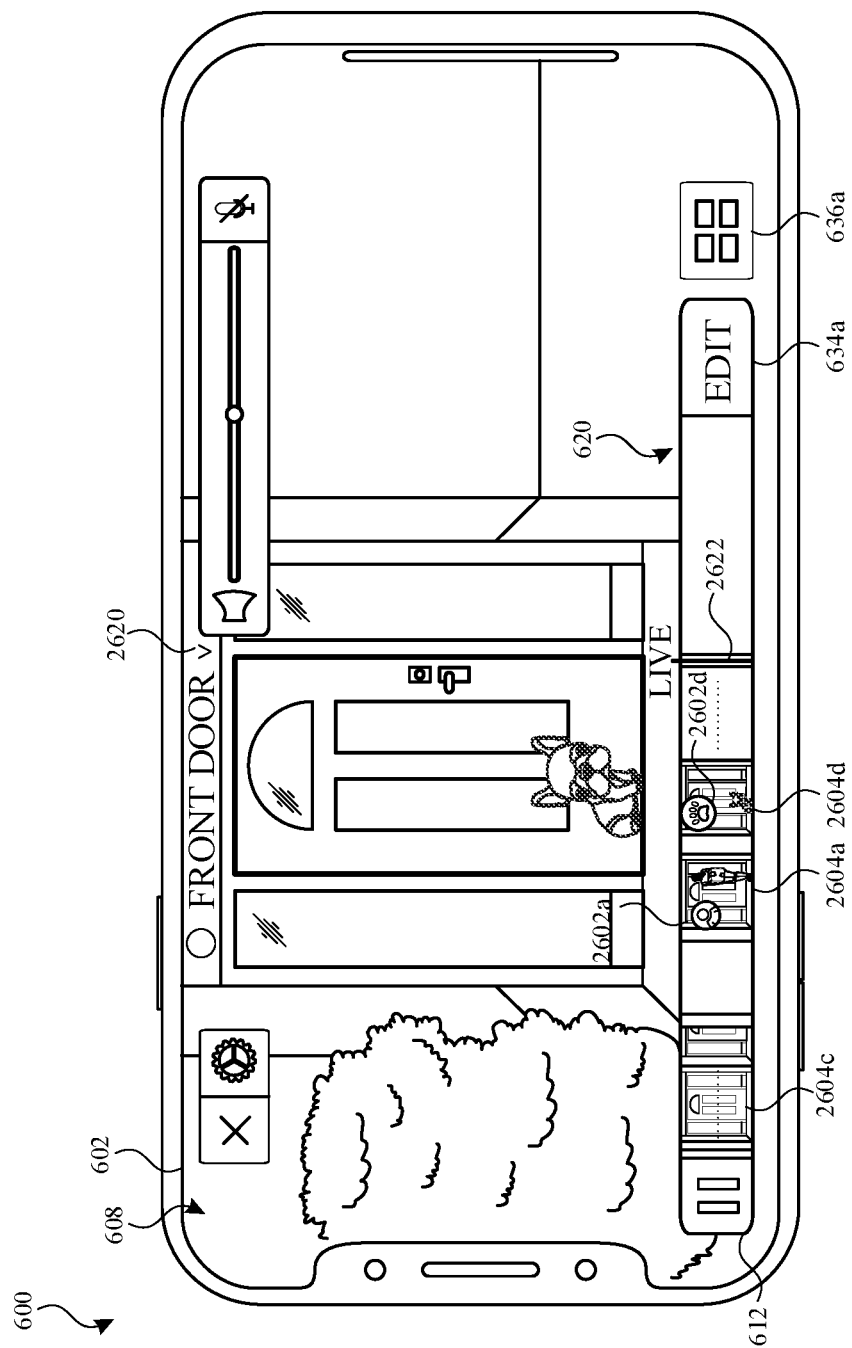

In FIG. 26G, after recording the clip when motion was detected from the person as illustrated in FIG. 26E, Camera 1 detects a dog outside of the front door (as an alternative to the scenario in FIG. 26F). Camera 1 starts recording based on the detected motion of the animal (based on the configurations to record based on motion detection) and sends data representing the newly recorded clip to device 600 (or a server) with information that detected motion of an animal triggered the recording. Device 600 receives data representing the newly recorded clip of video and information indicating that the detected motion of an animal triggered the recording from Camera 1. As illustrated in FIG. 26G, in response to receiving data representing a recorded clip of the video, device 600 displays a clip representation 2604*d* of the recorded clip with indicator 2602*d* in scrubber bar 620 at a position representative of the time the clip was recorded, where the position is sequentially after previously received clip representation 2604*a*. Device 600 determines that the triggering condition for recording is the detected motion of an animal and displays indicator 2604*b* with an image of an animal to reflect the triggering condition. Both representative clips 2604*a* and 2604*d* are currently displayed in scrubber bar with corresponding indicators 2602*a* and 2602*d* respectively. As additional representative clips are added in, clips representations 2604*a* and 2604*d* are shifted with corresponding indicators 2602*a* and 2602*d* such that the indicators remain in unison with the respective representative clip.

Figure 26H:
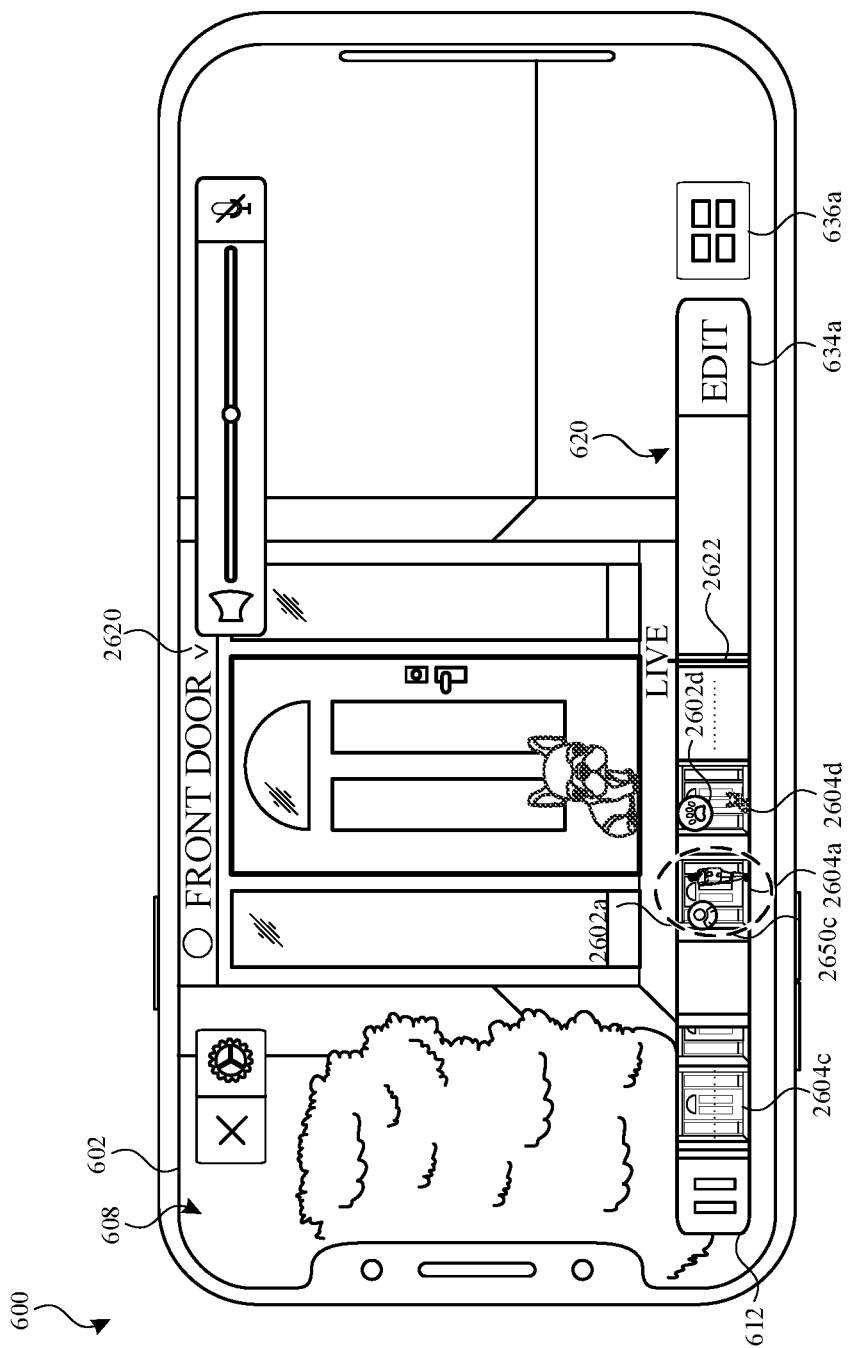
Figure 26I:
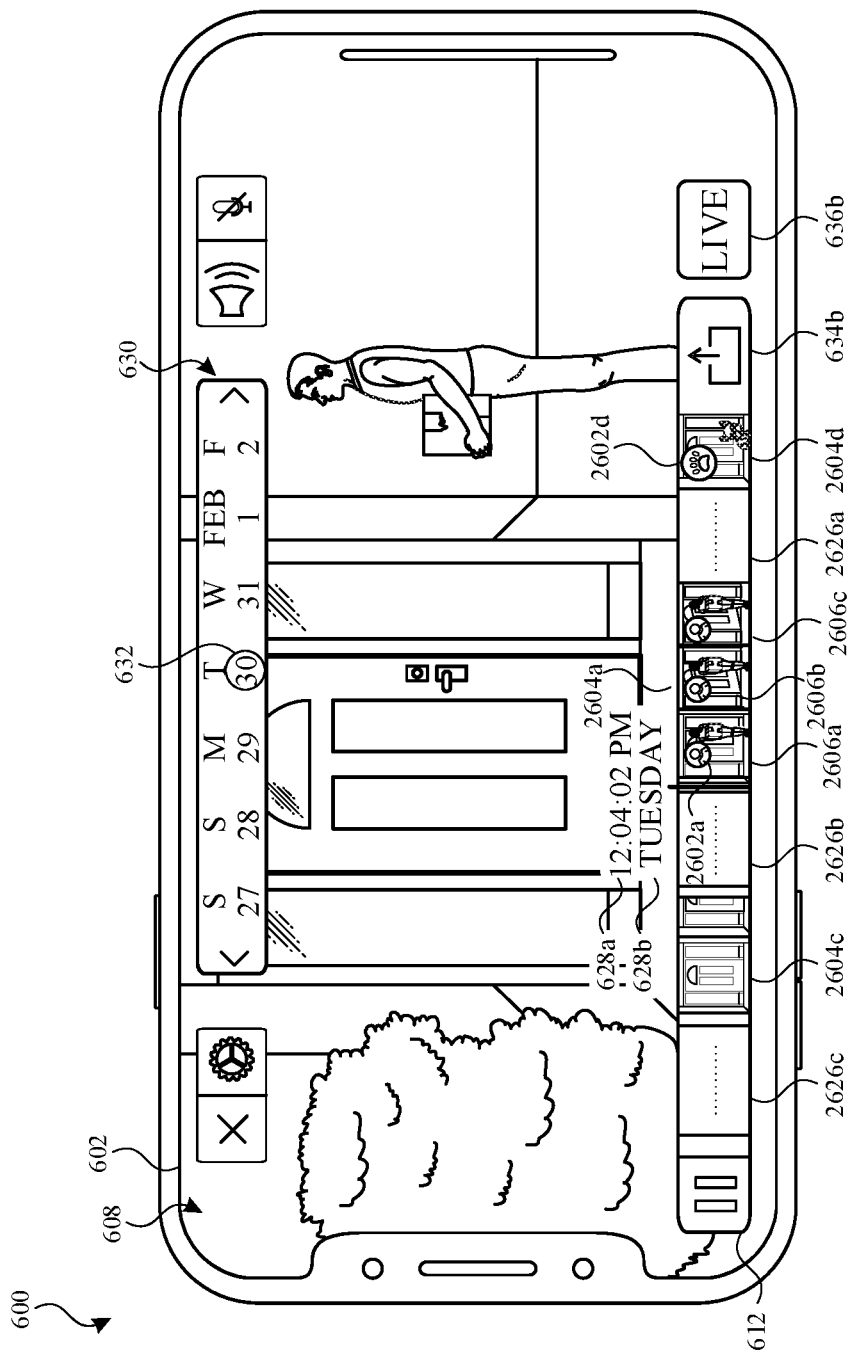

In FIG. 26H, device 600 detects user input 2650*c* corresponding to selection of representative clip 2604*a*. In FIG. 26I, in response to detecting user input 2650*c*, device 600 displays the corresponding recorded video data from Camera 1 in display 602. In some embodiments, the display of the recorded clip of video is based on the position of user input 2650*c* (e.g., the selected clip is played from a frame corresponding to the portion of clip representation 2604*a* contacted by user input 2650*c*). User interaction with scrubber bar 620 to play back a particular clip of recorded video shown in scrubber bar 620 is further discussed above with respect to FIGS. 6G-6R.

In FIG. 26I, in response to detecting user input 2650*c* (as illustrated in FIG. 26H), device 600 expands the selected clip representation 2604*a* to display a plurality of frames 2606*a*-2606*c* of the selected recorded clip of video. In some embodiments, the plurality of frames 2606*a*-2606*c* each include a representative image from the recorded clip along with indicator 2602*a* that is associated with clip representation 2604*a*. Thus, each frame (e.g., 2606*a*-2606*c*) is displayed with indicator 2602*a* indicating that the recorded clip of video was recorded when motion of a person was detected. In some embodiments, one of the frames in clip representation 2604*a* includes indicator 2602*a*, but other frames do not include the indicator. Further, when device 600 detects input that causes the display frames 2606*a*-2606*c* and clip representations 2604*a* and 2604*b* to shift in scrubber bar 620, indicators corresponding to each displayed frame or clip representation are shifted in unison with the corresponding frame or clip representation.

FIGS. 27A-27B are a flow diagram illustrating a method for displaying video media user interfaces including clip representations and indicators that indicate the type of conditions that triggered the recording. Method 2700 is performed at a device (e.g., 100, 300, 500, or 600) with a display. Some operations in method 2700 are, optionally, combined, the orders of some operations are, optionally, changed, and some operations are, optionally, omitted.

As described below, method 2700 provides an intuitive way for displaying video media user interfaces which display clip representations and indicators that indicate the type of conditions that triggered the recording from a source of video data (e.g., a camera) using an electronic device. The method reduces the cognitive burden on a user for interacting with recorded video by being able to navigate to particular recorded clips based on a triggering condition, thereby creating a more efficient human-machine interface. For battery-operated computing devices, enabling a user to navigate to relevant recorded clips more efficiently allows the user to spend less time playing back content that the user is not interested in. This helps the device to conserves power and increases the time between battery charges.

At block 2702, the device (e.g., 600) displays, on the display device, a video media user interface (e.g., 608), including concurrently displaying: a video feed (e.g., a live video feed, or a pre-recorded video feed) from a source of video data (e.g., an external camera) and a scrubber bar (e.g., 612). In some embodiments, the scrubber bar is an interactive, elongated region on the display that includes a representation of media content that can be scrolled along the direction parallel to direction of elongation. In some embodiments, the media content (e.g., the video) can be played back at arbitrary and variable rates based on a characteristic (e.g., the speed of a received user input.

At block 2704, the device receives, (e.g., from the source of video data) first data (e.g., a frame, a key frame) including a first representation (e.g., 2604*a*) of a first recorded clip of video (e.g., recorded by the source of video data), and first triggering information for the first recorded clip of video (e.g., that indicates a condition that caused (started) the recording (e.g., at the source of video data) of the first recorded clip of video).

At block 2706, (in response to receiving the first data and the first triggering information) in accordance with a determination that the first triggering information indicates recording of the first recorded clip of video was triggered by a first type of condition (e.g., recording was triggered by motion detection of a person), the device concurrently displays, on the display device, in the scrubber bar (e.g., 612): a first indication (e.g., 2602*a*) (e.g., the indicator is an icon showing a person) corresponding to the first type of condition (e.g., the recording condition is motion detection of a person) (e.g., without displaying a second indication), and the first representation (e.g., 2604*a*) of the first recorded clip of video. In some embodiments, the device displays the first indication (or second indication) adjacent to (next to) the first representation (e.g., the indication is displayed next to the clip such that the indication does not overlap with the frame). In some embodiments, the device displays the first indication (or second indication) and the first representation of the first recorded clip of video includes displaying the first indication (or second indication) overlaid on a portion of the first representation (e.g., the indication is displayed on top of the clip such that the indication overlaps with at least a portion of the frame, the indication is displayed on top of the clip such that the indication completely overlaps the frame). In some embodiments, the displayed respective (e.g., first, second) indication is smaller than the displayed first (and second) representation of the first recorded clip. Thus, the display of the indication lets the user know what cause the clip to be recorded, but display of the indication does not prevent display of the representation of the clip (because the indication is smaller in size.

Displaying indicators with the corresponding representation of the recorded clip provides additional context for each clip representation. This allows the user to more efficiently skip to the relevant clip based on the indicator, which provides information on the triggering condition for recording. Displaying clip representations and indicators that indicate the type of conditions that triggered the recording help the user to better navigate through recorded video, thereby reducing the cognitive burden on a user and creating a more efficient human-machine interface. For battery-operated computing devices, enabling a user to navigate to relevant recorded clips more efficiently allows the user to spend less time playing back content that the user is not interested in. This helps the device to conserves power and increases the time between battery charges.

At block 2708, (in response to receiving the first data and the first triggering information) in accordance with a determination that the first triggering information indicates recording of the first recorded clip of video was triggered by the second type of condition (e.g., recording is triggered by motion detection of an animal) different from the first type of condition (e.g., recording is triggered by motion detection of a person), the device concurrently displays, on the display device, in the scrubber bar (e.g., 612): a second indication (e.g., 2602d) (e.g., the indicator is an icon of an animal) corresponding to the second type of condition (e.g., the recording condition is motion detection of an animal), wherein the second indication is different from the first indication (e.g., without displaying the first indication) and the first representation (e.g., 2604a) of the first recorded clip of video.

Displaying a different indicator for each type of condition that triggers recording provides the user with additional context about the recorded clip, which is useful for finding a particular recorded clip. This allows the user to more efficiently navigate to the relevant clip based on the indicator, which provides information on the triggering condition for recording, thereby reducing the cognitive burden on a user and creating a more efficient human-machine interface. For battery-operated computing devices, enabling a user to navigate to relevant recorded clips more efficiently allows the user to spend less time playing back content that the user is not interested in. This helps the device to conserves power and increases the time between battery charges.

Optionally, at block 2710, in accordance with a determination that first triggering information does not indicate recording of the first clip of video was triggered by a condition, displaying, in the scrubber bar, the first representation (e.g., 2604c) of the first recorded clip of video without concurrently displaying an indication corresponding to a condition (e.g., without displaying an indication that the recorded clip of video was triggered by a condition and without displaying the first indication or the second indication).

Optionally, at block 2712, while displaying on the display device, a video media user interface (e.g., 608), the device detects a first input (e.g., 2650c) (e.g., a right swipe on the display or a tap on the clip in the scrubber bar) corresponding to a selection of a portion (e.g., a certain time) of the first recorded clip of video (or of a third recorded clip of video).

Optionally at block 2714, in response to detecting the first user input the device updates the display of the video feed to correspond to the selected portion of the first recorded clip of video (or to the corresponding third clip of video).

Optionally at block 2716, the device concurrently shifts display of the first representation of the first recorded clip (e.g., 2604a) of video and the respective (e.g., first, second) indication (e.g., 2602a) to a new position in the scrubber bar (e.g., 612). In some embodiments, a pointer element is moved to the representation of the clip. In some embodiments, the representation of the clip is moved to a different position in the scrubber bar (e.g., the center). In some embodiments, the representation of the entire video content in the scrubber bar is scrolled such that the content represented at a fixed position (e.g., the center) in the scrubber bar is displayed in the main region), wherein the first representation of the first recorded clip and the respective indicator are shifted in unison (e.g., first representation and indication are moved together to preserve their relative positions to each other).

Displaying a corresponding indicator for each recorded clip, even if the clip is expanded into frames or shifted in the scrubber bar, allows the user to differentiate between multiple recorded clips (and frames within a recorded clip) in the video media user interface. This allows the user to more efficiently navigate to the relevant clip based on the indicator, which provides information on the triggering condition for recording. Displaying clip representations and indicators that indicate the type of conditions that triggered the recording, help the user to better navigate through recorded video, thereby reducing the cognitive burden on a user and creating a more efficient human-machine interface. For battery-operated computing devices, enabling a user to navigate to relevant recorded clips more efficiently allows the user to spend less time playing back content that the user is not interested in. This helps the device to conserves power and increases the time between battery charges.

In some embodiments, while displaying, on the display device, the first representation (e.g., 2604a) of the first recorded clip of video and the first indication (e.g., 2602a) in the scrubber bar (e.g., 612): the device receives (e.g., from the source of video data): second data (e.g., from the source of video data) including a second representation (e.g., 2604b) of a second recorded clip of video (e.g., recorded by the source of video data), and second triggering information for the second recorded clip of video (that indicates a condition that caused (started) the recording (e.g., at the source of video data) of the second recorded clip of video).

In some embodiments, (in response to receiving the second data and the second triggering information) in accordance with a determination the second triggering information indicates recording of the second recorded clip of video was triggered by the second type of condition (e.g., recording was triggered by motion detection of an animal), the device concurrently displaying, on the display device, in the scrubber bar: a second indication (e.g., 2602b) (e.g., the indicator is an icon showing a vehicle) corresponding to the second type of condition, wherein the second indication is different from the first indication (e.g., the recording condition is motion detection of a vehicle) (e.g., without displaying a first indication), and the second representation of the second recorded clip of video.

Note that details of the processes described above with respect to method 2700 (e.g., FIGS. 27A-27B) are also applicable in an analogous manner to the methods described above/below. For example, method 2700 optionally includes one or more of the characteristics of the various methods described above with reference to method 700, 900, 1100, 1300, 1500, 1700, 2100, 2300, and 2500. For example, the motion detection, recording configurations described in method 2100 are used to determine the type of indicator that is displayed with each clip representation in the video media user interface described in method 2700. For brevity, these details are not repeated below.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the capture and viewing of video feeds and recordings. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to provide improved monitoring of devices and property and to generally improve security (e.g., home security). Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. In addition, for added privacy, the techniques described above with capabilities to detect particular individuals, animals, or cars would incorporate an "opt in" system that would require users to opt into enabling the feature. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of video feed monitoring and storage, the present technology can be configured to allow users to select to "opt in" or "opt out" of participation in the collection of personal information data during registration for services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content (e.g., video content) can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
a display,
one or more processors; and
memory storing one or more programs configured to be executed by the one or more processors, the one or more programs including instructions for:
receiving data identifying a source of video data; and
after receiving the data identifying the source of video data:
displaying a first user interface including a menu for selecting a context for placing the source of video data in a record mode;
while displaying the menu for selecting a context for placing the source of video data in a record mode, detecting a first input corresponding to a selection of the context;
in response to detecting the first input:
in accordance with a determination that the selected context includes a recording state, displaying an options affordance;
detecting activation of the options affordance;
in response to detecting activation of the options affordance:
displaying a plurality of motion detection affordances, including:
a first motion detection affordance corresponding to recording the video data in response to a first motion detection condition, and a second motion detection affordance corresponding to recording the video data in response to a second motion detection condition different from the first motion detection condition;

detecting a second input corresponding to a selection of the first motion detection condition; and subsequent to detecting the second input, transmitting information to set a configuration profile of the source of video data to record video data according to the selected context for placing the source of video data in the record mode and the selected first motion detection condition, wherein the configuration profile causes the source of video data to begin recording when the selected first motion detection condition is satisfied.

2. The electronic device of claim 1, the one or more programs further including instructions for:

in response to detecting the first input:
in accordance with a determination that the selected context does not include the recording state, forgoing displaying the options affordance.

3. The electronic device of claim 1, the one or more programs further including instructions for:

while displaying the plurality of motion detection affordances, detecting a third input corresponding to a selection of the second motion detection condition; and subsequent to detecting the third input, transmitting information to update the configuration profile of the source of video data according to the selected context and the selected second motion detection condition, wherein the configuration profile causes the source of video data to begin recording when the selected first motion detection condition or the selected second motion detection condition is satisfied.

4. The electronic device of claim 1, wherein:

the selected context and the selected first motion detection condition are associated with a first context; and the one or more programs further including instructions for:

detecting a fourth input corresponding to a selection of a second context different from the first context; and subsequent to detecting the fourth input, transmitting information to update the second context of the configuration profile of the source of video data according to the selected second context without transmitting information to update the first context of the configuration profile of the source of video data.

5. The electronic device of claim 1, the one or more programs further including instructions for:

in response to detecting activation of the options affordance, displaying an activity detection affordance concurrently with the plurality of motion detection affordances;

detecting a first activation of the activity detection affordance;

in response to detecting the first activation of the activity detection affordance, ceasing to display the first motion detection affordance and the second motion detection affordance;

subsequent to detecting the first activation of the activity detection affordance, transmitting information to update the configuration profile of the source of video data such that the first motion detection condition and the second motion detection condition are disabled;

while not displaying the plurality of motion detection affordances, detecting a second activation of the activity detection affordance;

in response to detecting the second activation of the activity detection affordance, displaying the plurality of motion detection affordances, including:
the first motion detection affordance, and
the second motion detection affordance; and subsequent to detecting the second activation of the activity detection affordance, transmitting information to update the configuration profile of the source of video data such that the first motion detection condition and the second motion detection condition are enabled.

6. The electronic device of claim 1, the one or more programs further including instructions for:

in response to detecting activation of the options affordance, displaying a menu for selecting a duration for storing video data from the source of video data;

while displaying the menu for selecting a duration for storing video data from the source of video data, detecting a fifth input corresponding to a selection of the duration for storing video data from the source of video data; and subsequent to detecting the fifth input, transmitting information to update the configuration profile of the source of video data according to the selected context and the selected duration.

7. The electronic device of claim 1, the one or more programs further including instructions for:

detecting activation of a notifications settings affordance, wherein the notifications settings affordance is for enabling notifications by the source of video data independent of a context of the source of video data;

in response to detecting activation of the notifications settings affordance, displaying a plurality of motion detection affordances;

while displaying the plurality of motion detection affordances, detecting a sixth input corresponding to a selection of a first motion detection condition; and subsequent to detecting the sixth input, transmitting information to update notifications settings of the configuration profile of the source of video data according to the selected first motion detection condition without transmitting information to update the context of the configuration profile of the source of video data.

8. A non-transitory computer-readable storage medium storing one or more programs configured to be executed by one or more processors of an electronic device with a display, the one or more programs including instructions for:

receiving data identifying a source of video data; and after receiving the data identifying the source of video data:

displaying a first user interface including a menu for selecting a context for placing the source of video data in a record mode;

while displaying the menu for selecting a context for placing the source of video data in a record mode, detecting a first input corresponding to a selection of the context;

in response to detecting the first input:
in accordance with a determination that the selected context includes a recording state, displaying an options affordance;

detecting activation of the options affordance;

in response to detecting activation of the options affordance:

displaying a plurality of motion detection affordances, including:
a first motion detection affordance corresponding to recording the video data in response to a first motion detection condition, and
a second motion detection affordance corresponding to recording the video data in response to a second motion detection condition different from the first motion detection condition;
detecting a second input corresponding to a selection of the first motion detection condition; and
subsequent to detecting the second input, transmitting information to set a configuration profile of the source of video data to record video data according to the selected context for placing the source of video data in the record mode and the selected first motion detection condition, wherein the configuration profile causes the source of video data to begin recording when the selected first motion detection condition is satisfied.

9. A method, comprising:
at an electronic device with a display:
receiving data identifying a source of video data; and
after receiving the data identifying the source of video data:
displaying a first user interface including a menu for selecting a context for placing the source of video data in a record mode;
while displaying the menu for selecting a context for placing the source of video data in a record mode, detecting a first input corresponding to a selection of the context;
in response to detecting the first input:
in accordance with a determination that the selected context includes a recording state, displaying an options affordance;
detecting activation of the options affordance;
in response to detecting activation of the options affordance:
displaying a plurality of motion detection affordances, including:
a first motion detection affordance corresponding to recording the video data in response to a first motion detection condition, and
a second motion detection affordance corresponding to recording the video data in response to a second motion detection condition different from the first motion detection condition;
detecting a second input corresponding to a selection of the first motion detection condition; and
subsequent to detecting the second input, transmitting information to set a configuration profile of the source of video data to record video data according to the selected context for placing the source of video data in the record mode and the selected first motion detection condition, wherein the configuration profile causes the source of video data to begin recording when the selected first motion detection condition is satisfied.

10. The non-transitory computer-readable storage medium of claim 8, the one or more programs further including instructions for:
in response to detecting the first input:
in accordance with a determination that the selected context does not include the recording state, forgoing displaying the options affordance.

11. The non-transitory computer-readable storage medium of claim 8, the one or more programs further including instructions for:
while displaying the plurality of motion detection affordances, detecting a third input corresponding to a selection of the second motion detection condition; and
subsequent to detecting the third input, transmitting information to update the configuration profile of the source of video data according to the selected context and the selected second motion detection condition, wherein the configuration profile causes the source of video data to begin recording when the selected first motion detection condition or the selected second motion detection condition is satisfied.

12. The non-transitory computer-readable storage medium of claim 8, wherein:
the selected context and the selected first motion detection condition are associated with a first context; and
the one or more programs further including instructions for:
detecting a fourth input corresponding to a selection of a second context different from the first context; and
subsequent to detecting the fourth input, transmitting information to update the second context of the configuration profile of the source of video data according to the selected second context without transmitting information to update the first context of the configuration profile of the source of video data.

13. The non-transitory computer-readable storage medium of claim 8, the one or more programs further including instructions for:
in response to detecting activation of the options affordance, displaying an activity detection affordance concurrently with the plurality of motion detection affordances;
detecting a first activation of the activity detection affordance;
in response to detecting the first activation of the activity detection affordance, ceasing to display the first motion detection affordance and the second motion detection affordance;
subsequent to detecting the first activation of the activity detection affordance, transmitting information to update the configuration profile of the source of video data such that the first motion detection condition and the second motion detection condition are disabled;
while not displaying the plurality of motion detection affordances, detecting a second activation of the activity detection affordance;
in response to detecting the second activation of the activity detection affordance, displaying the plurality of motion detection affordances, including:
the first motion detection affordance, and
the second motion detection affordance; and
subsequent to detecting the second activation of the activity detection affordance, transmitting information to update the configuration profile of the source of video data such that the first motion detection condition and the second motion detection condition are enabled.

14. The non-transitory computer-readable storage medium of claim 8, the one or more programs further including instructions for:
in response to detecting activation of the options affordance, displaying a menu for selecting a duration for storing video data from the source of video data;
while displaying the menu for selecting a duration for storing video data from the source of video data, detecting a fifth input corresponding to a selection of the duration for storing video data from the source of video data; and subsequent to detecting the fifth input, transmitting information to update the configuration profile of the source of video data according to the selected context and the selected duration.

15. The non-transitory computer-readable storage medium of claim 8, the one or more programs further including instructions for:

detecting activation of a notifications settings affordance, wherein the notifications settings affordance is for enabling notifications by the source of video data independent of a context of the source of video data;

in response to detecting activation of the notifications settings affordance, displaying a plurality of motion detection affordances;

while displaying the plurality of motion detection affordances, detecting a sixth input corresponding to a selection of a first motion detection condition; and subsequent to detecting the sixth input, transmitting information to update notifications settings of the configuration profile of the source of video data according to the selected first motion detection condition without transmitting information to update the context of the configuration profile of the source of video data.

16. The method of claim 9, further comprising:
in response to detecting the first input:
in accordance with a determination that the selected context does not include the recording state, forgoing displaying the options affordance.

17. The method of claim 9, further comprising:
while displaying the plurality of motion detection affordances, detecting a third input corresponding to a selection of the second motion detection condition; and
subsequent to detecting the third input, transmitting information to update the configuration profile of the source of video data according to the selected context and the selected second motion detection condition, wherein the configuration profile causes the source of video data to begin recording when the selected first motion detection condition or the selected second motion detection condition is satisfied.

18. The method of claim 9, wherein:
the selected context and the selected first motion detection condition are associated with a first context; and
the method further comprising:
detecting a fourth input corresponding to a selection of a second context different from the first context; and
subsequent to detecting the fourth input, transmitting information to update the second context of the configuration profile of the source of video data according to the selected second context without transmitting information to update the first context of the configuration profile of the source of video data.

19. The method of claim 9, further comprising:
in response to detecting activation of the options affordance, displaying an activity detection affordance concurrently with the plurality of motion detection affordances;
detecting a first activation of the activity detection affordance;
in response to detecting the first activation of the activity detection affordance, ceasing to display the first motion detection affordance and the second motion detection affordance;
subsequent to detecting the first activation of the activity detection affordance, transmitting information to update the configuration profile of the source of video data such that the first motion detection condition and the second motion detection condition are disabled;
while not displaying the plurality of motion detection affordances, detecting a second activation of the activity detection affordance;
in response to detecting the second activation of the activity detection affordance, displaying the plurality of motion detection affordances, including:
the first motion detection affordance, and
the second motion detection affordance; and
subsequent to detecting the second activation of the activity detection affordance, transmitting information to update the configuration profile of the source of video data such that the first motion detection condition and the second motion detection condition are enabled.

20. The method of claim 9, further comprising:
in response to detecting activation of the options affordance, displaying a menu for selecting a duration for storing video data from the source of video data;
while displaying the menu for selecting a duration for storing video data from the source of video data, detecting a fifth input corresponding to a selection of the duration for storing video data from the source of video data; and
subsequent to detecting the fifth input, transmitting information to update the configuration profile of the source of video data according to the selected context and the selected duration.

21. The method of claim 9, further comprising:
detecting activation of a notifications settings affordance, wherein the notifications settings affordance is for enabling notifications by the source of video data independent of a context of the source of video data;
in response to detecting activation of the notifications settings affordance, displaying a plurality of motion detection affordances;
while displaying the plurality of motion detection affordances, detecting a sixth input corresponding to a selection of a first motion detection condition; and
subsequent to detecting the sixth input, transmitting information to update notifications settings of the configuration profile of the source of video data according to the selected first motion detection condition without transmitting information to update the context of the configuration profile of the source of video data.

* * * * *